United States Patent [19]

Peyser et al.

[11] 4,160,129

[45] Jul. 3, 1979

[54] TELEPHONE COMMUNICATIONS CONTROL SYSTEM HAVING A PLURALITY OF REMOTE SWITCHING UNITS

[75] Inventors: Alan Peyser, McLean, Va.; William Von Meister, Silver Spring, Md.

[73] Assignee: TDX Systems, Inc., Vienna, Va.

[21] Appl. No.: 793,428

[22] Filed: May 3, 1977

[51] Int. Cl.[2] .......................... H04M 3/42; H04Q 3/58

[52] U.S. Cl. ................................ 179/18 E; 179/18 B; 179/18 ES

[58] Field of Search ......... 179/18 ES, 18 EA, 18 FC, 179/18 AD, 18 E, 18 D, 18 B, 8 R, 7 R, 18 BG

[56] References Cited

U.S. PATENT DOCUMENTS

| | | | |
|---|---|---|---|
| Re. 28,607 | 11/1975 | Richards | 179/18 ES |
| 3,274,343 | 9/1966 | Lucas et al. | 179/18 ES X |
| 3,492,430 | 1/1970 | Vigliante | 179/15 AT |
| 3,553,384 | 1/1971 | Lucas et al. | 179/18 ES |
| 3,576,398 | 4/1971 | Dejean et al. | 179/18 EA |
| 3,731,000 | 5/1973 | Joel, Jr. | 179/8 R |
| 3,916,124 | 10/1975 | Joel, Jr. | 179/18 GE |
| 3,934,095 | 1/1976 | Matthews et al. | 179/18 D |
| 4,021,619 | 5/1977 | Potter et al. | 179/18 FC |

OTHER PUBLICATIONS

"New Switching Concept for Multilocation Customers," Carlson, et al., *Bell Labs. Record*, vol. 49, No. 8, Sep. 1971.

*Primary Examiner*—Thomas W. Brown

*Attorney, Agent, or Firm*—Cushman, Darby & Cushman

[57] ABSTRACT

Local to long-distance interconnections at the remote units are effected without necessity of voice connections through the centrally located processing unit.

11 Claims, 11 Drawing Figures

TELEPHONE COMMUNICATIONS CONTROL SYSTEM HAVING A PLURALITY OF REMOTE SWITCHING UNITS

BACKGROUND OF THE INVENTION

This invention relates to a communications line control system and more specifically relates to a control system for controlling and recording the use of long-distance communication circuits.

In the past the control and recordation of long-distance telephone calls was performed by a PABX or CENTREX operator who selected the outgoing long-distance lines over which a call was to be placed either by selecting bulk rate lines, such as WATS lines, foreign exchange lines or tie lines, or in the alternative, if these lines were not available, selected a local trunk line. This method of controlling and recording telephone calls has proved to be costly and inefficient and accordingly, attempts have been made to control the placing of telephone calls and the recordation thereof on a more efficiently controlled basis. Thus, for example, with respect to the recordation of telephone calls, a number of systems have been developed for recording the use of long-distance telephone communication circuits. Baichtal, et al. disclosed in U.S. Pat. No. 3,825,689 an automatic message metering and storage system. Each of a plurality of subscriber lines is scanned in sequence with each subscriber line having an associated unique location in a memory unit. This system records information resulting from long-distance, toll and other type of telephone services. However, it does not provide any means for selectively connecting long-distance lines so as to minimize the cost of the telephone call. Along somewhat the same technological lines as the Baichtal et al development, LeStrat et al. developed, as disclosed in U.S. Pat. No. 3,651,269, a telephone accounting system wherein each of a plurality of toll junctures associated with each of a plurality of trunk lines is scanned by command of a computer. Predetermined storage areas in the computer are allotted to each trunk line wherein data regarding the time of transfer of the long-distance call is stored in the memory location associated with the line being scanned, with this information being utilized later to generate a bill to the calling party. The system is located in a toll exchange so that centralized charging of each of the subscribers using the long-distance lines can be achieved.

Caithmaer, et al. provided a central telephone message accounting system as disclosed in U.S. Pat. No. 3,829,617 which has a central processing unit for receiving data with respect to the identity of a calling party, the nature of the call and the duration of the call. Thus, a juncture is positioned on each of a plurality of trunk lines with the junctures being scanned for telephone calls being placed. When a telephone call is detected, the call is connected via a branch line to a data receiver. The data is stored and then re-sent to a remote toll office where the call is completed. Other systems have been developed for recording the use of long-distance trunk lines on an automatic basis to thereby provide information to a central processing unit for preparing telephone bills as disclosed in Joel U.S. Pat. No. 3,760,110 and Woolf, et al. U.S. Pat. No. 3,806,652. However, none of these systems discloses a switching system wherein telephone calls are switched at remote satellite locations such that the cost of any particular call is minimized.

Telephone metering systems have been combined with private automatic branch exchanges to provide a combined switching and metering function. Thus, Gayler, et al. disclosed in U.S. Pat. No. 3,870,823 a metering system for use with a PABX in connection with direct distance dialed, WATS and extended area service telephone communications lines. The system includes both a PABX and a central processing unit with switching matrices and detecting circuits for addressing each of a plurality of long-distance trunk lines with sample addresses synchronous with the addressing of receivers within the metering system so that the receiver can sample and analyze the information on the trunk line. As in the case of the aforementioned traffic metering developments, this system does not provide a method or apparatus for switching long-distance communications lines in order to minimize the cost of long-distance telephone calls.

Of even greater importance to telephone subscribers is the fact that the hardware for controlling the connection of long-distance telephone lines in accordance with any criteria, such as line availability, is expensive. To control the connection of long-distance lines in accordance with the criterion that the least expensive available line will be connected first, wherein the least expensive line may vary with many parameters such as, the line type, restricted use and position in a rotary, results in even additional expenses. Accordingly, in the past it has not been commercially feasible to provide at each PABX or CENTREX unit, a switching system having computerized control so as to connect long-distance lines in order to minimize the cost of long-distance telephone calls except through the provision of dedicated costly computerized switching equipment. Steps have been taken in the art, as exemplified by Gebhardt, et al. U.S. Pat. No. 3,225,144, Vigliante, et al. U.S. Pat. No. 3,268,669 and Joel U.S. Pat. No. 3,731,000 for controlling the interconnection of telephone lines between a local office and a toll office by means of a remotely positioned central processing unit. The advantage of such a system is that only one computer is required to control a plurality of remote switching circuits. Thus, the cost of the computer per switching circuit is substantially reduced. None of the systems disclosed in the aforementioned patents, however, teaches or suggests an arrangement wherein an efficient and inexpensive means is provided for controlling and monitoring the connection of long-distance telephone circuits for the purpose of minimizing the cost of the long-distance telephone calls connected through the switching systems between the customer's location(s) and one or more local or central toll offices.

It accordingly is an object of this invention to provide an improved system for controlling and monitoring the connection of long-distance telecommunications lines for the purpose of minimizing the cost of long-distance telephone communications.

It is another object of this invention to provide an improved method and apparatus for remotely controlling the connection of long distance telecommunications lines on the basis of a least cost routing.

SHORT STATEMENT OF THE INVENTION

Accordingly, this invention relates to a method and apparatus for switching long-distance telecommunications circuits wherein a central processing system is coupled to each of a plurality of remote satellite switching units. Each remote satellite switching unit includes a circuit routing matrix for connecting a local station to a selected long-distance line which may, for example, be a local trunk line, bulk rate lines such as WATS, foreign exchange or tie lines or lines between remote units. The remote satellite switching unit also includes a microcomputer system for detecting the status of outgoing lines from a PABX or CENTREX and the destination of a requested call. This information is transmitted to the central processing system which in turn selects the least expensive line at any given time for transmitting the long-distance call. This information is transmitted back to the microcomputer system which provides command signals to the circuit routing matrix to connect the requested call to the selected outgoing long distance line. The central processing system compiles a record of the party placing the call, the long-distance line used, the time duration of the call, and line utilization of the system as well as observes the status of the remote unit, etc., to compute a periodic account statement for the subscriber. The system is capable of providing camp-on call-back services as well as providing a decision making function of selecting which of a plurality of call requests are connected first and determines the time interval during which the calling party must await the availability of a less expensive long-distance line before the call is placed over a more expensive line.

BRIEF DESCRIPTION OF THE DRAWINGS

Other objects, features and advantages of the present invention will become more fully apparent with reference to the following detailed description of the preferred embodiment, the appended claims and the accompanying drawings in which:

DETAILED DESCRIPTION OF THE PREFERRED EMBODIMENT

Figure 1:
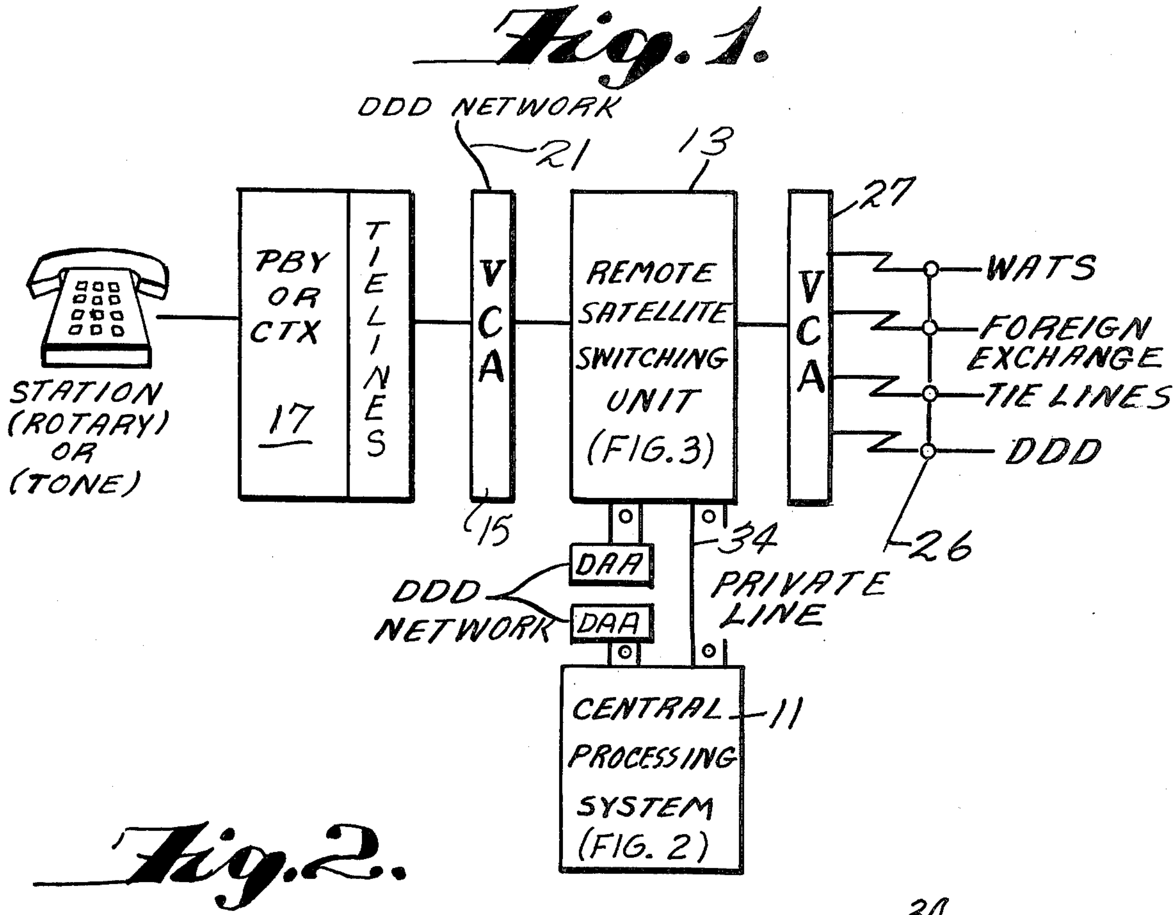
FIG. 1 is a simplified diagram of the system configuration of the present invention.

At the outset, a general overview of the operation and advantages of the system of the present invention will be presented, followed by a detailed description of the preferred embodiment thereof.

The present invention achieves cost reduction in long-distance telecommunications calls through the highly efficient use of bulk-rate communications facilities including WATS, foreign exchange (FX) and tie lines. Because a business organization pays a fixed monthly amount for each such facility, the higher the traffic load or usage per facility, the lower the cost of long-distance telephone calls on a per minute basis. Thus, in operation the present system determines from the area code of the number being called whether the subscriber or calling party has an FX or tie line terminated in that area. If not, or if these lines are presently in use, a determination is made as to the lowest cost WATS line available. If the appropriate bulk facility is not available, the user is given an indication of this and enters his extension into the system in order to be called back. The user is placed in the appropriate queue for the particular bulk facility and the system continues to process calls, keeping the user in the queue for a preselected interval, e.g. ten minutes if necessary, and calls back the user when the line becomes available. Thus, the present invention achieves effective utilization of bulk communications lines which may approach a 95% time utilization during peak hours. The availability of local lines insures that no call will wait longer than the predetermined selected interval.

To achieve this, a central processing system communicates with a substantial plurality of remote satellite switching units via telephone lines or other communication links such as, for example, satellite communications links. In the preferred embodiment, data is transferred between the central processing system and the satellite switching units in block mode using a suitable variable length message format such as ASCII. The central processing unit controls all switching functions and records the necessary data required for billing, generating traffic statistics, etc. from the remote satellite switching unit.

Three classes of trunk lines serve as an input to the satellite switching units, namely, rotary dial or tone dial branch trunks which pass from a subscriber's CENTREX or PBX system, standard local lines, and incoming WATS service lines. The output trunks from the satellite switching units also fall into three classes, that is, bulk rate lines including outgoing WATS line, tie lines and/or foreign exchange (FX) lines, local trunk lines and lines to recording devices. The present invention is capable of detecting either tone or rotary dial from the input telephone circuits thereto and addresses the output telecommunication circuit, by means of tone or rotary dial signalling.

To place a long-distance call, a subscriber dials a special access number via the PABX or CENTREX unit. The satellite switching unit responds with a first dial tone. The subscriber then enters a one to seven digit account number. The satellite acknowledges the number with a second dial tone if the account number is valid or with an error signal if the number is invalid. In the case of an invalid number, the first dial tone is reconnected after providing an error tone, thus permitting a second try. After a second invalid attempt, the subscriber is disconnected and the central processing system flags that attempt. If valid, a second dial tone is heard by the subscriber who then dials the desired long-distance number. In response thereto, if no usable trunks are available, the system returns a busy signal, e.g., three tone bursts, and then returns a dial tone to the subscriber. The subscriber may then hange up or may enter his call-back number which is up to seven digits. This call-back number is generally the telephone extension of the subscriber but may be an access code plus the extension of the subscriber. Assuming that a number of subscribers have encountered busy bulk rate lines and have requested the system to call them back when a line becomes available, the system preferably has three queues. Subscribers are called back in the descending order of queues depending upon their respective positions within the queues. The number of subscribers that can use the first or second queues is limited so that those in the highest priority queues can have their calls connected to long distance lines first. When an appropriate trunk is available for the subscriber who is waiting for a call-back, the subscriber is called back. When the subscriber goes off-hook, the tone signalling is transmitted into the network and at the same time is fed back to the subscriber's telephone unit so that the subscriber knows the call has been placed.

When the subscriber is called back, the unit will allow three rings to occur before aborting the call-back. If the subscriber's extension is busy, the system will recognize this and place the call-back in the appropriate queue. If the subscriber desired to cancel the call, he may go back on-hook at any time after hearing the transmission of the tone signalling.

If desired, a special account number can be utilized on long-distance calls in order that a particular account can be billed for the call. Thus, the subscriber enters his subaccount number and upon receipt of the second dial tone, the #key on the telephone tone keyboard and any number up to ten digits followed by a second # key is keyed into the system. The system records the number and returns the dial tone after which the subscriber then dials the desired long-distance telephone number.

An abbreviated dial number can be keyed into the system in order to simplify the calling procedure on the part of a subscriber. Thus, for example, if there is a group of numbers which are used most frequently, these numbers can be coded into a two-digit number and utilized in lieu of dialing or keying an entire number. To use an abbreviated dial number, upon receipt of the second dial tone, the subscriber enters an *, a two-digit number corresponding to the number desired to be dialed followed by the entry of a #. From rotary phones two digits are entered but the second digit cannot be a zero or one. The system then automatically retrieves the full number from storage and places the call to the desired party. To enter an abbreviated dial number into the system, the subscriber first enters his account number and upon hearing the second dial tone, enters an *, any two digits followed by an * and then a ten-digit telephone number. The system signals its acceptance of the telephone number with a single tone burst or signals its rejection with a two tone burst. In connection with the aforementioned, it should be understood that the specific format for placing an abbreviated dial number call, etc., can be varied in keeping with the invention by simply changing the logic, i.e., the algorithm, in the central processing system and in the remote satellite unit.

SYSTEM CONFIGURATION

Refer now to FIG. 1, where there is disclosed, in simplified block diagram form the preferred embodiment of the communications switching system of the present invention. The switching system of the present invention includes central processing system 11 of conventional design known in the art and a plurality of remote satellite switching units 13. As contemplated in the preferred embodiment, the central processing system 11 can provide control signals for controlling multiple satellite switching units separately and in tandem. Each satellite switching unit 13 has a plurality of input lines connected thereto from voice connecting arrangements 15. The voice connecting arrangement 15 provides isolation between the output lines of a PABX or CENTREX unit 17 and the satellite switching unit 13. Also connected to the input of the satellite switch 13 are local telephone lines 21 which are connected to the switch 13 via the voice connecting arrangement 15. If desired, an INWATS line can be connected to the satellite switching unit 13.

At the output of the switching unit, a plurality of bulk rate and DDD telephone circuits 26 are coupled to an output voice connecting arrangement 27. As illustrated, the bulk rate lines typically include OUTWATS lines, foreign exchange lines, and tie lines. In order to assure the availability of long-distance lines, the output of the switch 13 is also connected to conventional business DDD lines which can be utilized to convey long-distance communications, as desired.

The satellite switch 13 is operated in accordance with command signals from the central processing unit 11. These signals are coupled to the satellite switching unit 13 via a private data line 34 of conventional arrangement known in the art. Should for any reason the private date line become unusable, an alternative data line interconnect is obtained by automatic dial up via the DDD network in a conventional manner known in the art.

It should be understood that information signals containing, in coded form, information with respect to the party called, the calling party, the status of lines, etc., are conveyed via the data line switch 34 to the Central Processing System 11 to provide the Central Processing System with information by which a decision can be made as to which output lines should be connected, disconnected, etc. It should also be understood that while a private data line is used in the preferred embodiment of the present invention, other data circuit methods for transmitting command signals to the satellite switches and information from the switches to the Central Processing System 11 can be utilized.

CENTRAL PROCESSING SYSTEM

Figure 2:
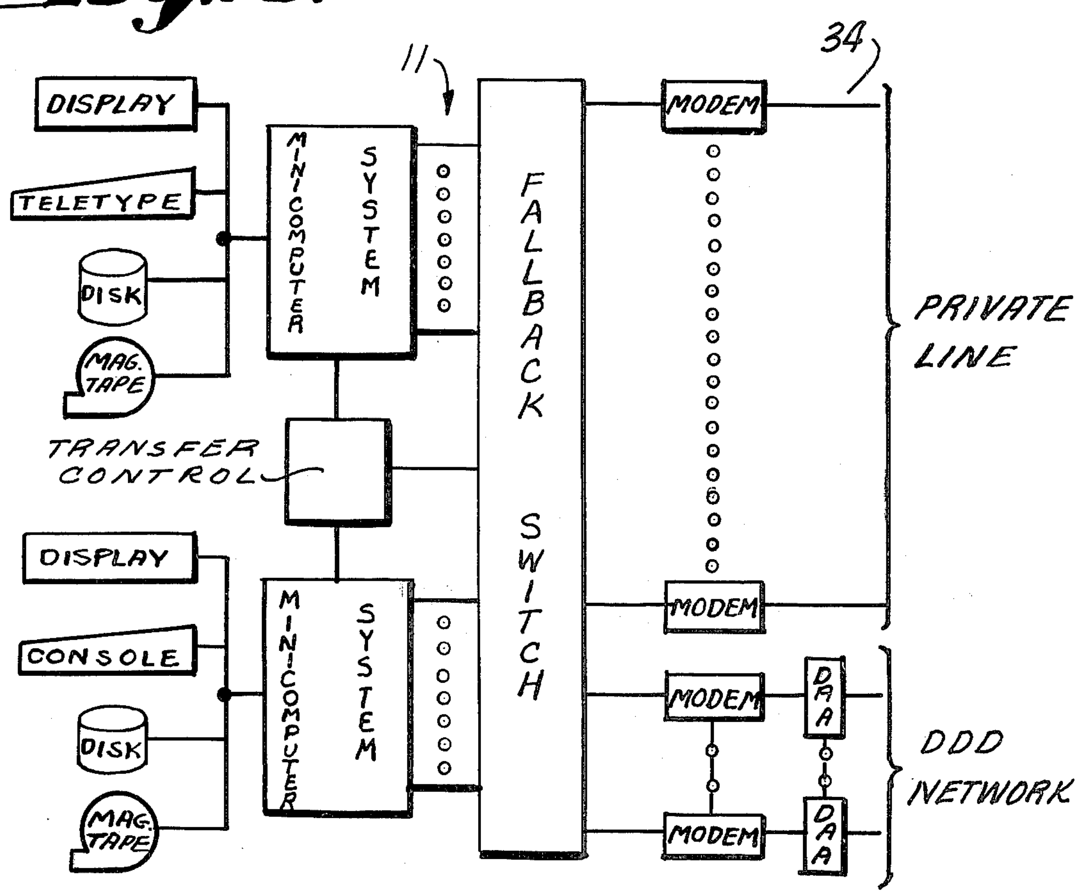
FIG. 2 is a schematic block diagram of the central processing system of the present invention.

Refer now to FIG. 2, where there is disclosed a more detailed schematic block diagram of the Central Processing System 11. The central processing system employs a minicomputer system which includes a digital computer for performing the processing of the data from the remote satellite units. In the preferred embodiment, the minicomputer system is an assembly of standard components from the Interdata, Inc., Model 7/32 Computer System; however, it should be understood that a number of other systems in the industry meet the application requirements of the invention. Interdata standard components are used in the operation of the Central Processing, and include both hardware and software packages as identified in the appendix A. Further, the application program package used in the interoperation of the remote satellite unit 13 is also appendixed in its entirety as appendix B.

The interoperation with the remote satellite unit is via data communication circuits as aforementioned. The data communication circuits include private line facilities and alternately can employ the switched network on a dial-up basis. The interface with these facilities are commercially available and, for example, are provided by the Bell Telephone System and other independent companies. By convention, the interface between the Minicomputer System and the telephone circuit includes a data modem which, in the preferred embodiment, employs a Bell 103 type unit or equivalent. Further, the interface with the DDD network employs data access arrangements (DAA) which, in the preferred embodiment are commercially available CBS data couplers.

Finally, as illustrated in FIG. 2, the central processing unit is redundant with 100% duplication of the minicomputer system and related peripheral components for the purpose of reliability. Interconnection between either system and the data channel's modem hardware is via the Fall Back Switch arrangement, which in the preferred embodiment, employs a commercially available Spectron Corporation Model FBS 1224.

REMOTE SATELLITE UNIT

Figure 3:
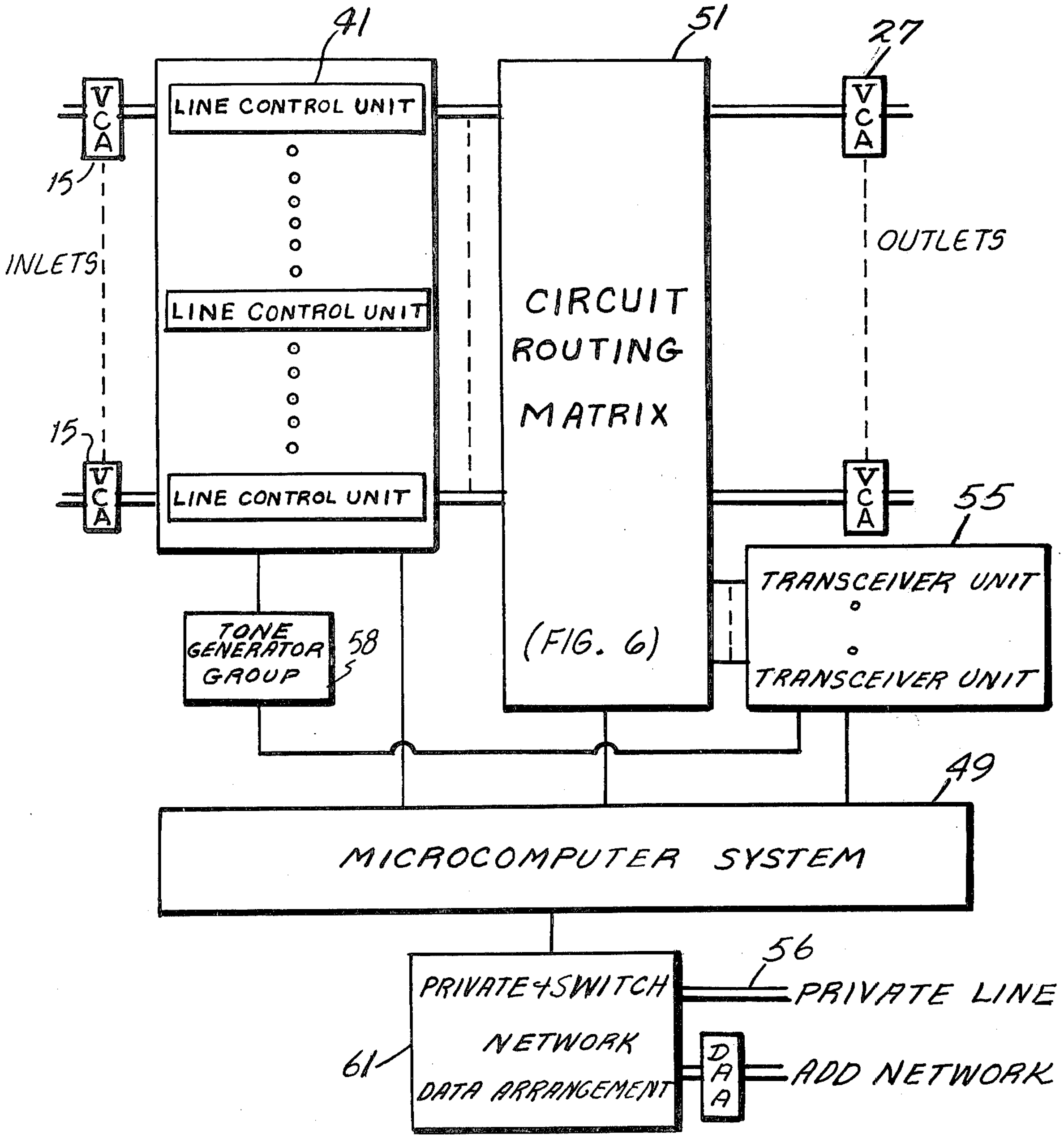
FIG. 3 is a block diagram of the remote satellite unit of the present invention.

Refer now to FIG. 3, where there is disclosed a more detailed schematic block diagram of the remote satellite switching unit 13. Trunk lines from one or more inlet exchanges are connected to a line control unit 41 of the switching satellite unit 13 via the voice connecting arrangements 15. Trunk lines to the outlet exchanges are connected from the circuit routing matrix 51 via voice connecting arrangements 27.

The line control units 41 have the function of providing detection and control of analog and DC signals on the trunk lines by means of a stored program in the microcomputer system 49. The line control units 41 interconnect directly with the inlet voice connecting arrangements 15 and with outlet voice connecting arrangements 27 via the circuit routing matrix 51. The voice connecting arrangements typically employed for interposition with Bell facilities are Bell VCA - CDQ2W for tie trunks interconnect and CDH for any of the other aforementioned interconnects.

Each inlet voice connecting arrangement 15 is assigned to a line control unit 41 and the associated inlet port on the circuit routing matrix 51. Each outlet voice connecting arrangement 27 is assigned to an outlet port on the circuit routing matrix. The voice connecting arrangements include six interface leads per circuit which are conventionally identified as CT/CR, CS/CG, and CBS1/CBS2. The CTR and CR leads carry voice transmission, tone address signalling and call progress signalling as is known in the art. The CS/CG lines carry service request, answer/disconnect and DC dial pulsing information. Finally, the CBS1/CBS2 lines carry line status indication, seize/-release and DC dial pulsing information. In the preferred embodiment, two of these leads, that is, the CG and CBS2 leads, are used as signal ground return for both of the voice connecting arrangements 15 and 27 and the remote switching unit 13. These leads are bonded to a common ground electrode. Accordingly, a four lead interface per circuit is employed in the present invention and the circuit routing matrix 51 is of the four pole type.

The output of each line control unit 41 is connected to the matrix switch assembly 51 which, as will be more fully explained hereinbelow, includes a matrix switching arrangement together with decoders and drivers therefor. The circuit routing matrix 51 has the function of providing an interconnect for the voice and signalling path between the line control units 41 and the 2-of-8 tone transceiver 55 and the trunk lines to the outlet exchanges. The circuit routing matrix is controlled by means of control signals from the microcomputer system 49.

The 2-of-8 tone transceivers 55 have the function of providing detection of touch-tone signals keyed into the system from a local subscriber telephone unit. These signals are converted to binary digital signals which are coupled to the central processing unit via the data line. In addition, the push button tone transceivers 55 transmit 2-of-8 tone signals via the circuit routing matrix 51 to outlet exchanges under the control of the microcomputer system 49.

Private and Switch Network Data Arrangement 61 provides transmission of signals on the data line linking the central processing system 11 with the microcomputer system 49. The arrangement for passing low speed data signals is of conventional design for the purpose of converting the digital signals from the microcomputer 49 to appropriate analog signals for transmission over the data link and for receiving analog signals over the data link and converting these signals to digital signals for processing by the microcomputer system 49. In the preferred embodiment, a dedicated line 56 is provided so that access between the central processing system 11 and the microcomputer 49 is on a continuous basis. Should the private line for some reason be out of order, a backup line, which preferably is a direct dial line, is also connected to the data transceiver. The use of a DDD network for data communications is a conventional technique employing Bell Data Access Arrangement CBS.

The operation of the line control unit 41, the switch matrix assembly 51 and the push button tone transceivers 55 is controlled by the microcomputer system 49 which includes a central processing unit and memory. Conventional control logic known in the art is employed in interfacing the microcomputer system 49 with the line control unit 41, the circuit routing matrix 51, the push button tone transceivers 55 and the data transceivers 61. Finally, a progress tone signal generator 58 is provided for generating busy signals, error signals, etc., to advise the local subscriber of the status of the telephone call being placed. The progress tone signal generator accordingly is a conventional audio signal generator which is connected to the line control unit through a matrix to be explained more fully hereinbelow.

FIGS. 4–10 and the following description thereof is a more detailed description and schematic presentation of the remote satellite unit. The unit is a hardware assembly of modules manufactured specifically for performing the aforementioned control of communications circuits. The hardware assembly is referred to in the preferred embodiment as a SST-1 Satellite Switch Terminal. As depicted in FIG. 3, it is composed of a Microcomputer System 49, a Line Control Group 41, a Circuit Routing Matrix 51, a Tone Transceiver Group 55, a Tone Generator Group 58, and a Private and Switch Network Data Line Arrangement 61. A detailed disclosure of each of these equipments is given hereinbelow. Although one embodiment will be described, it is to be understood that various changes and modifications may be made by those skilled in the art without departing from the spirit of the invention.

Figure 4:
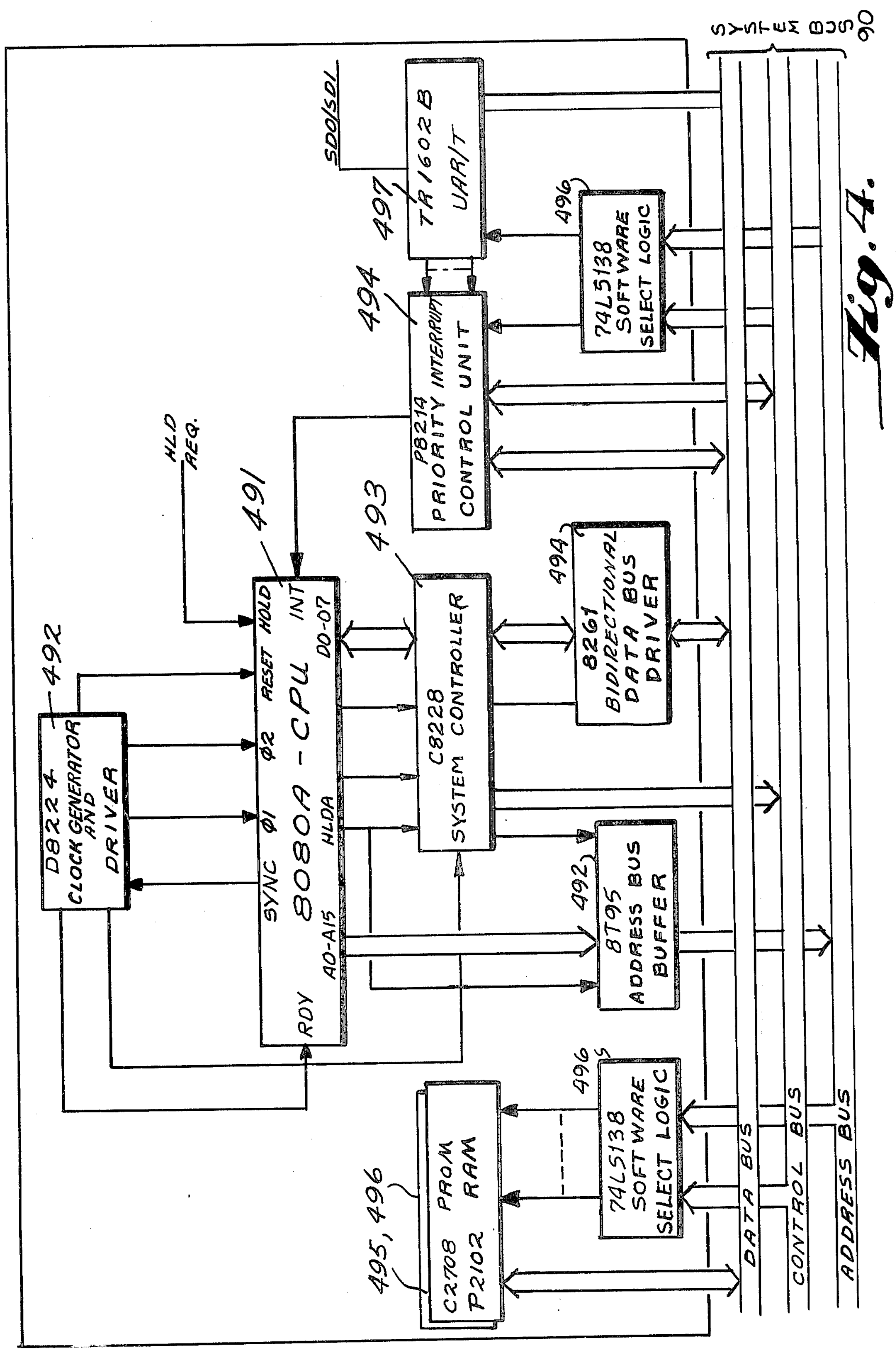
FIG. 4 through FIG. 10 are more detailed schematic illustrations of the components employed in the remote satellite unit.

Refer now to FIG. 4, which is a detailed schematic illustration of the microcomputer system 49. The microcomputer system 49 is used in the preferred embodiment as UP-607 Processor and SI-609 Scanner/Interrupt and consists of commercially available components and elements that interface with one another in an industry conventional configuration as shown in FIG. 4. The microcomputer system controls and communicates with external components and equipment 41, 51, 55 and 61, in software selectable modes by industry conventional methods through a system bus 90.

The basic central processing unit is a group of Large Scale Integration (LSI) elements, which define the characteristics of the bus 90 and are a part of the Intel Corp. MCS-80 Microcomputer System. These elements are a C8080A CPU 491, a D8224 Clock Generator and Driver 492, a C8228 System Controller 493 and a P8214 Priority Interrupt Control Unit 494. In addition, the 8T95 and 8216 Interface Elements 492 and 494, respectively, provide requisite bus buffer/driver capability.

An industry standard configuration of memory elements is employed in the Microcomputer System and, as illustrated in FIG. 4, includes commercially available C2708 UV Erasable Programmable Read-Only Memorys (PROM) 495 and P2102 Read Alternate Memorys (RAM) 496. The stored program contained in the PROM which is used in the remote satellite unit is in appendix B and is presented in its entirety in the assembly language of the MCS-80 Microcomputer System. Software select logic used in addressing memory and other hardware elements throughout the remote satellite unit employ conventional Small Scale Integration (SSI) and Medium Scale Integration (MSI) logic elements. The specific decode function is accomplished using 74LS138 MSI logic elements 496.

The Microcomputer System provides a conventional serial data interface for linking to the central computer system using a commercially available LSI element Universal Asynchronous Receiver/Transmitter (UAR/T) 497, such as a Western Digital Corporation TR1602B or equivalent.

Figure 5:
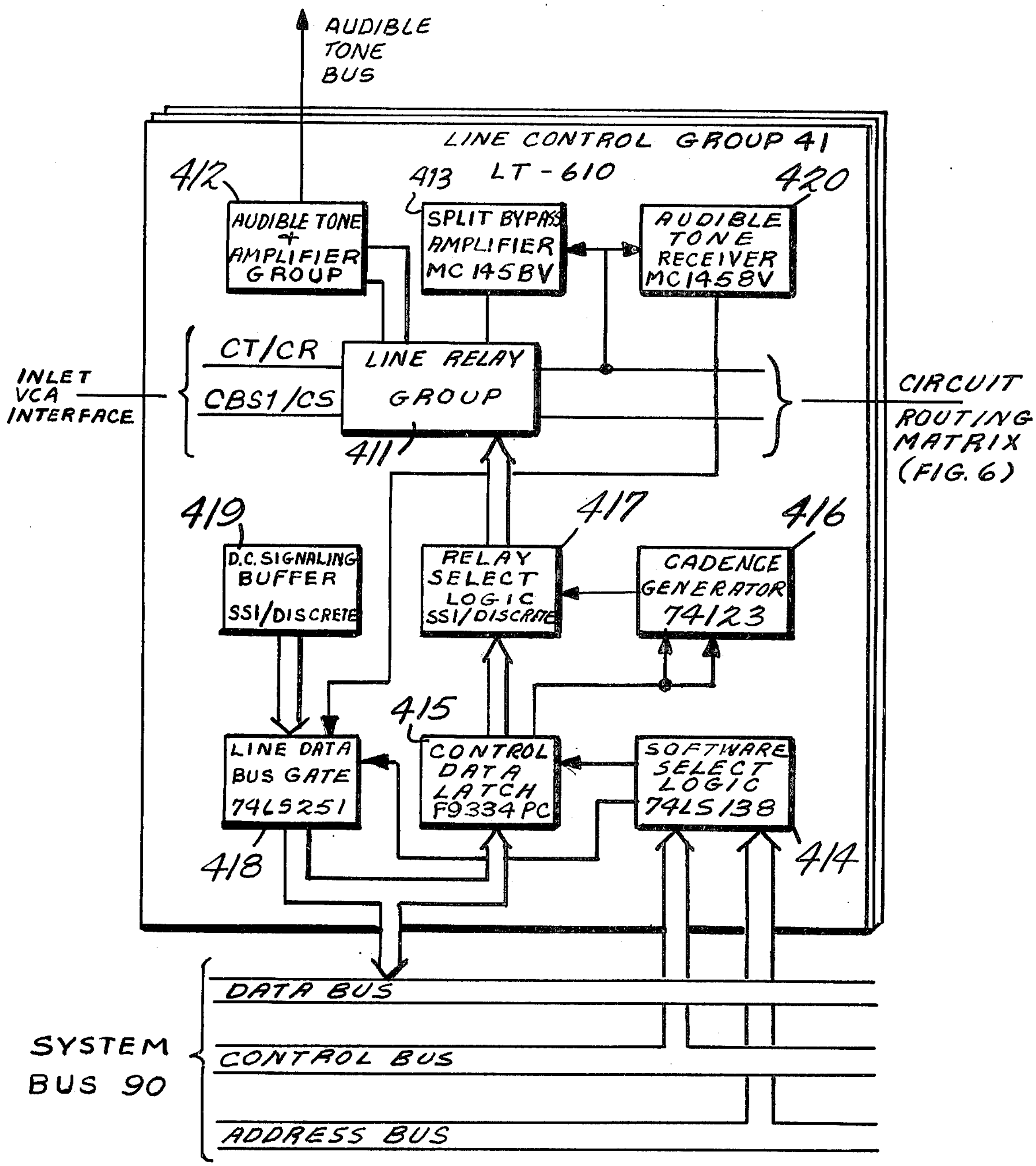

Refer now to FIG. 5, which is a more detailed schematic illustration of the line control group 41. The line control group 41 is an assembly of line control units, as previously depicted in FIG. 3, each unit providing the requisite control between an inlet telephone circuit and an outlet telephone circuit via the circuit routing matrix 51. As aforementioned, the control is performed by a microcomputer system 49, via a system bus 90, in software selectable modes.

The line control unit is referred to in the preferred embodiment of the present invention as an LT-610 Line Terminator. The unit consists of an assembly of elements for the detection and control of analog and DC signals on the trunk line. As aforementioned, the analog signals appear across telephone circuit interface leads CT/CR; and the DC signals appear between CBS1/CS and a signal common electrode.

As presented in FIG. 5, the interconnect between the inlet and outlet telephone circuit is on the line control unit via a line relay group 411, and then via the circuit routing matrix 51, as previously mentioned. The line relay group 411 employs complementary - MOS (CMOS) analog switches and dry reed relays for signal control. The CMOS elements used in the preferred embodiment are commercially available RCA CD4016 units. They are employed in the multiplexing of analog signals from the call progress tone sources via audible tone amplifiers 412 and from other analog inputs from the circuit routing matrix via split bypass amplifier 413. The dry reed relays employed in the preferred embodiment are commercially available Struthers-Dunn MRRN Series units. They are employed in the splitting of the analog signal line between the analog multiplex bus and the inlet signal pair CT/CR; in the splitting of the analog signal line between the circuit routing matrix inlet and the inlet signal pair CT/CR; and in the individual breaking of the DC signal leads interconnected between the circuit routing matrix inlet and the inlet DC signalling pair CBS1/CS.

Further presented in FIG. 5 are the line control unit elements for the detection of analog and DC signals on the trunk line. These signals are detected by sampling, via the micro-computer system application program, the converted output of the audible tone receiver 420 and the DC signalling buffer 419. The audible tone receiver is an AM Detector, as is well known in the art, and is designed for the detection of telephone network type audible tone signals with protection against interference from voice currents or other tone signalling systems; and the DC signalling buffer 419 provides high to low level voltage conversion between the trunk line interface CBS1/CS and the IC logic element interface.

The logic elements requisite to the software selectable line control unit operation by the microcomputer system via the system bus 90, includes standard MSI, SSI and discrete units interconnected in a conventional manner. As shown in FIG. 5, in the preferred embodiment, the decode function 414 employs 74LS138 MSI logic elements; the output data bus interface 415 uses F9334PC MSI logic elements and the input data base interface 418 uses 74LS251 MSI logic elements. In addition, to support the duration of inputted audible tones, a cadence generator 416 makes use of a 74123 MSI logic element. Further, in the preferred embodiment, a conventional analog application of operational amplifiers employing Motorola MC1458V is used for the previously described amplifiers and receivers, 412, 413 and 420.

Figure 6:
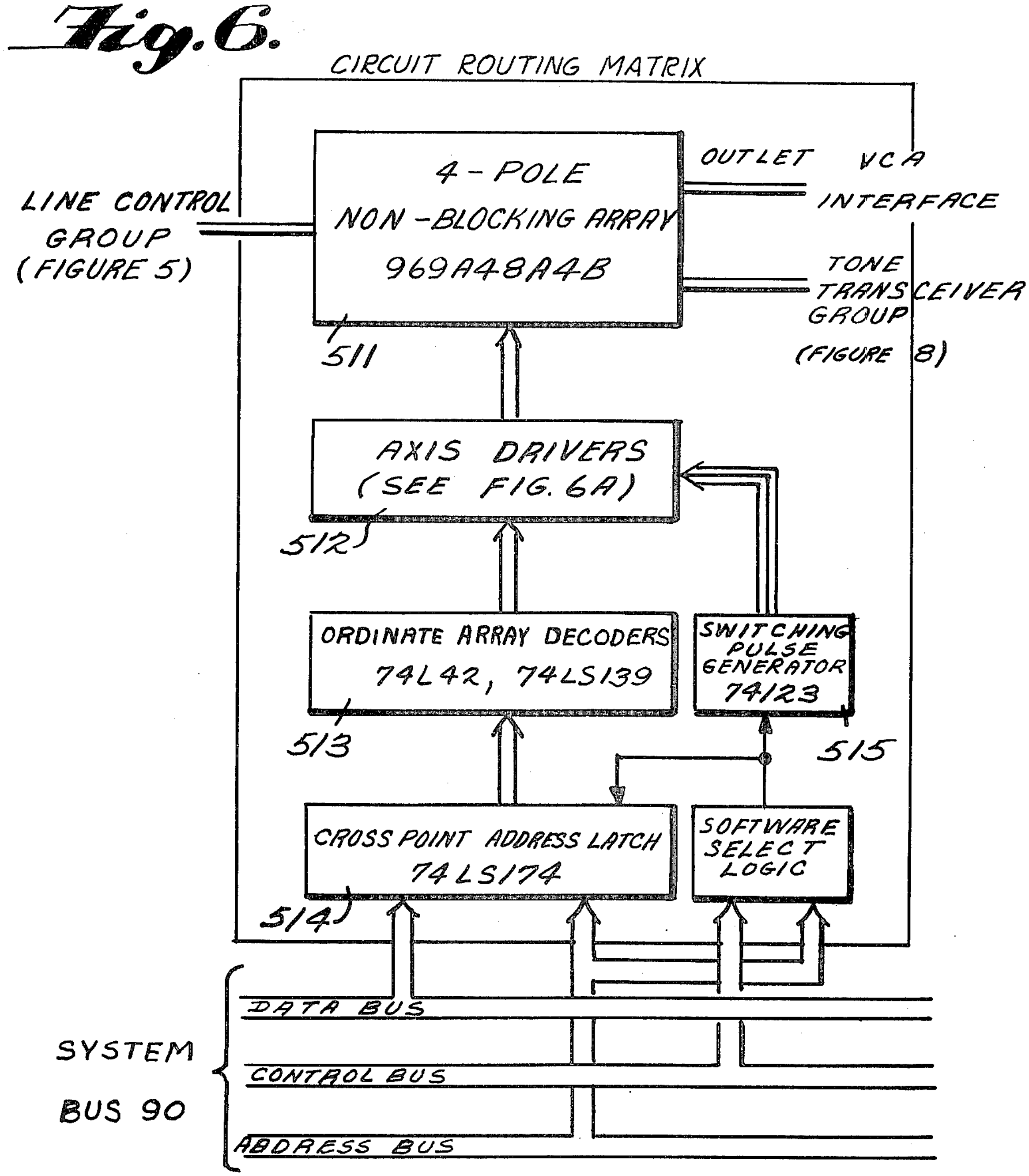

Refer now to FIG. 6, which is a detailed schematic illustration of the circuit routing matrix 51. The circuit routing matrix 51 provides switching between an inlet telephone circuit via a unit in the line control group 41 and an outlet telephone circuit; between an inlet telephone circuit via a unit in the line control group 41 and a unit in the tone transceiver group 55; or between an inlet telephone circuit via a unit in the line control group 41 and both the outlet telephone circuit and a unit in the tone transceiver group 55. As aforementioned, the switching is performed by the microcomputer system 49, via the system bus 90, in software selectable modes.

The circuit routing matrix 51 is referred to in the preferred embodiment of the present invention as an assembly of RY-612 Matrix and a BD-611 Buffer Decoder. The matrix unit consists of a sub-array, related axis drivers and ordinate decoders. The buffer decoder unit consists of array decoders, a switching timing circuit and the requisite logic interface with the system bus 90 for the control by the microcomputer system 49.

Figure 6A:
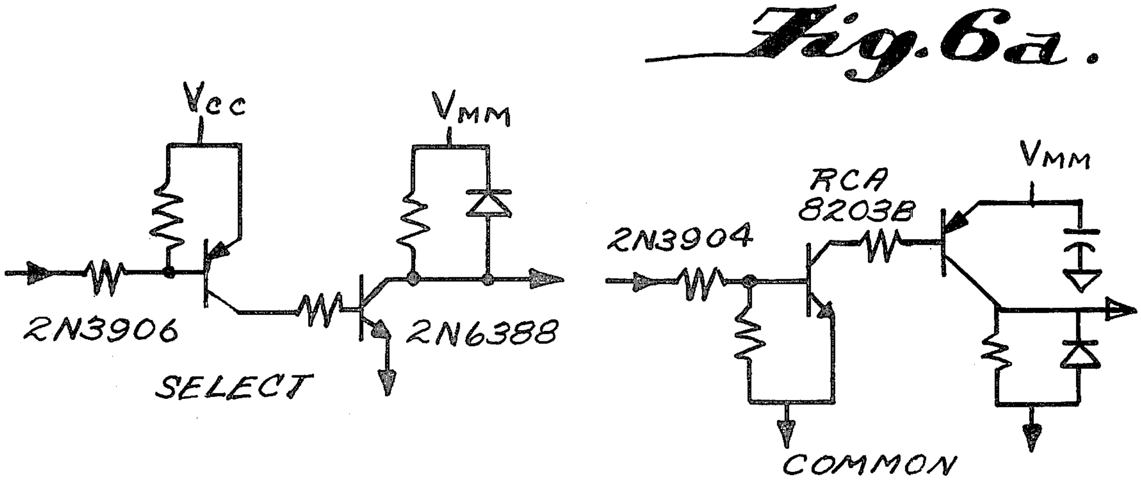

As presented in FIG. 6, the previously described interconnect is by way of a 4-pole non-blocking array 511. The defined array is obtained by cascading standard units of commercially available matrices. The matrix unit used in the preferred embodiment is a C.P. Clare Mini Memory Matrix 969A48A4B. A 4-pole crosspoint in the matrix is switched by axis drivers 512 which employ power transistor circuitry. FIG. 6A provides a discrete component schematic illustration of the circuitry used in the preferred embodiment to operate with the Clare Matrix, specifically identifying the commercially available drive and power transistor employed.

The logic elements requisite to the software selectable circuit routing matrix operation by the microcomputer system, via the system bus 90, consists of standard MSI and SSI units interconnected in a conventional manner. As shown in FIG. 6, for the preferred embodiment, the output data bus interface 514 uses 75LS174 MSI logic elements and the switching pulse duration timing circuit 515 makes use of a 74123 MSI logic element.

Figure 7:
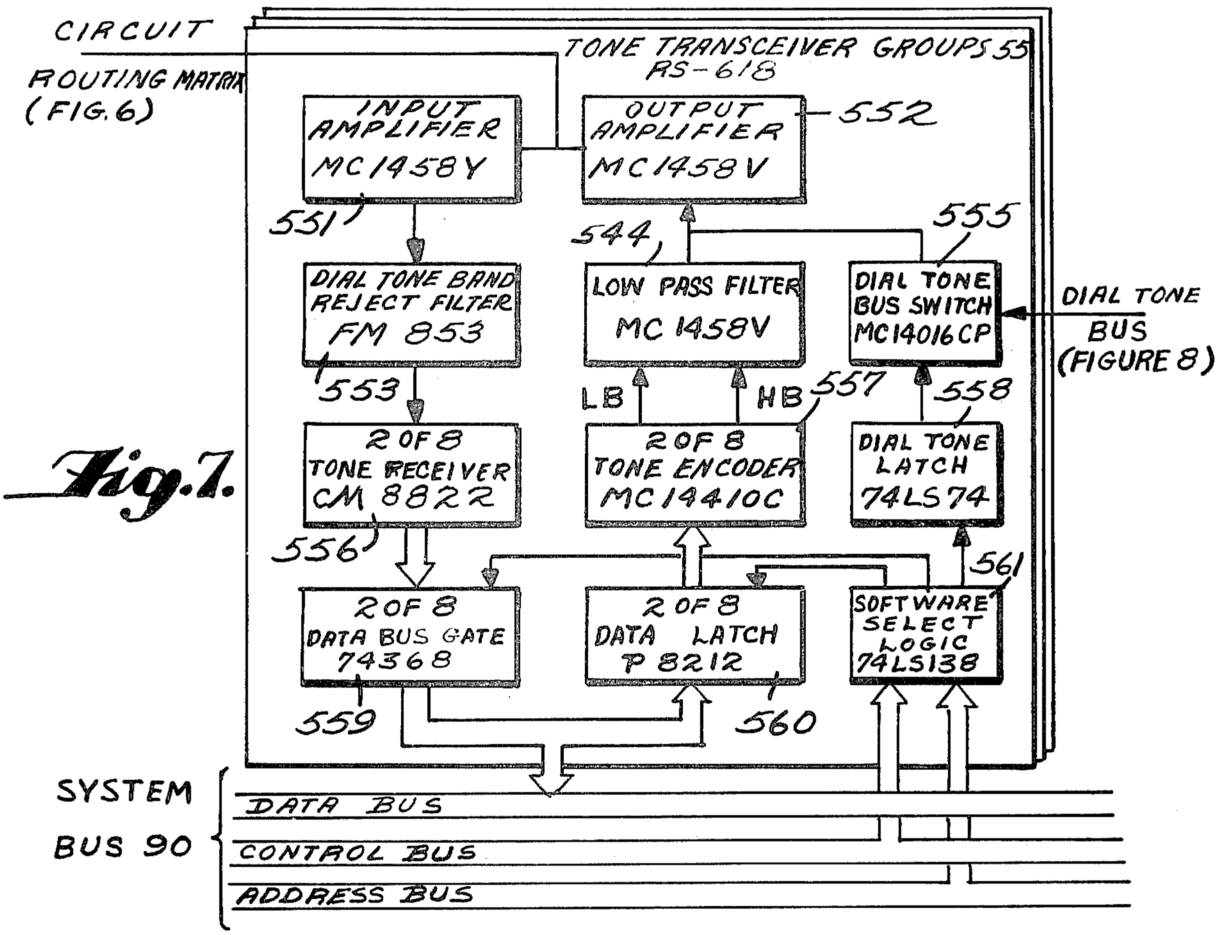

Refer now to FIG. 7, which is a detailed schematic illustration of the tone transceiver group 55. The tone transceived group 55 is an assembly of transceiver units, as previously depicted in FIG. 3. A transceiver unit is used in the activation of the interconnect between an inlet telephone circuit and an outlet telephone circuit via the circuit routing matrix 51. As aforementioned, the control is performed by the microcomputer system 49, via the system bus 90, in software selectable modes.

The transceiver unit is referred to in the preferred embodiment of the present invention as an RS-618 Register/Sender. The unit consists of an assembly of elements for the receiving and transmission of 2-of-8 tone signals on the telephone circuit and the control of a dial tone on the telephone circuit.

As aforementioned, the tone signals appear across telephone circuit interface leads CT/CR and are transmitted to and from the transceiver unit via the line control unit and the circuit routing matrix.

As presented in FIG. 7, the tone signals across the interface signal pair between the transceiver unit and the circuit routing matrix are passed to a 2-of-8 tone receiver 556 via input amplifier 551 and dial tone reject filter 553. Further, tones are passed to the interface signal pair from the 2-of-8 tone encoder 557 via low pass filter 554 and output amplifier 552 or are passed from the dial tone bus via switch 555, and output amplifier 552. The receiver 556 detects the presence of valid high and low band sine waves used in tone dialing in the telephone network. The filter 553 permits the detection of the 2-of-8 tones in the presence of a conventional dial tone as is known in the art. The encoder 557 digitally synthesizes the high and low band sine waves from an inputed 2-of-8 code. The filter 554 removes unwanted frequency components from the signal generated in the digital synthesization. The input amplifier 551, output amplifier 552 and low pass filter 554 are of conventional analog design using operational amplifiers and in the preferred embodiment employs commercially available Motorola MC1458V amplifiers. The dial tone bus switch is a CMOS Analog Switch and in the preferred embodiment employs a commercially available RCA 14016 CD. The dial tone filter 553 is a manufacturing application of hybrid technology as is known in the art and in the preferred embodiment employs a commercially available KTI F853 filter. The 2-of-8 tone receiver 557, also a hybrid package, is a Mitel CM 8822. The 2-of-8 tone encoder is of CMOS construction and, in the preferred embodiment, is an application of a Motorola MC 1441OP device.

The logic elements employed in the interface with the system bus 90 for the transceiver unit operation by the microcomputer system consists of standard MSI and SSI units interconnected in a conventional manner. As shown in FIG. 7, for the preferred embodiment, the software select function 561 employs a 74LS138 MSI logic element; the output register function for the 2-of-8 code 560 employs a P8212 MSI logic element; the output register function for the dial tone switch state 558 employs a 74LS74 MSI logic element, and the input 2-of-8 code data bus interface 559 employs a 74368 MSI logic element.

Figure 8:
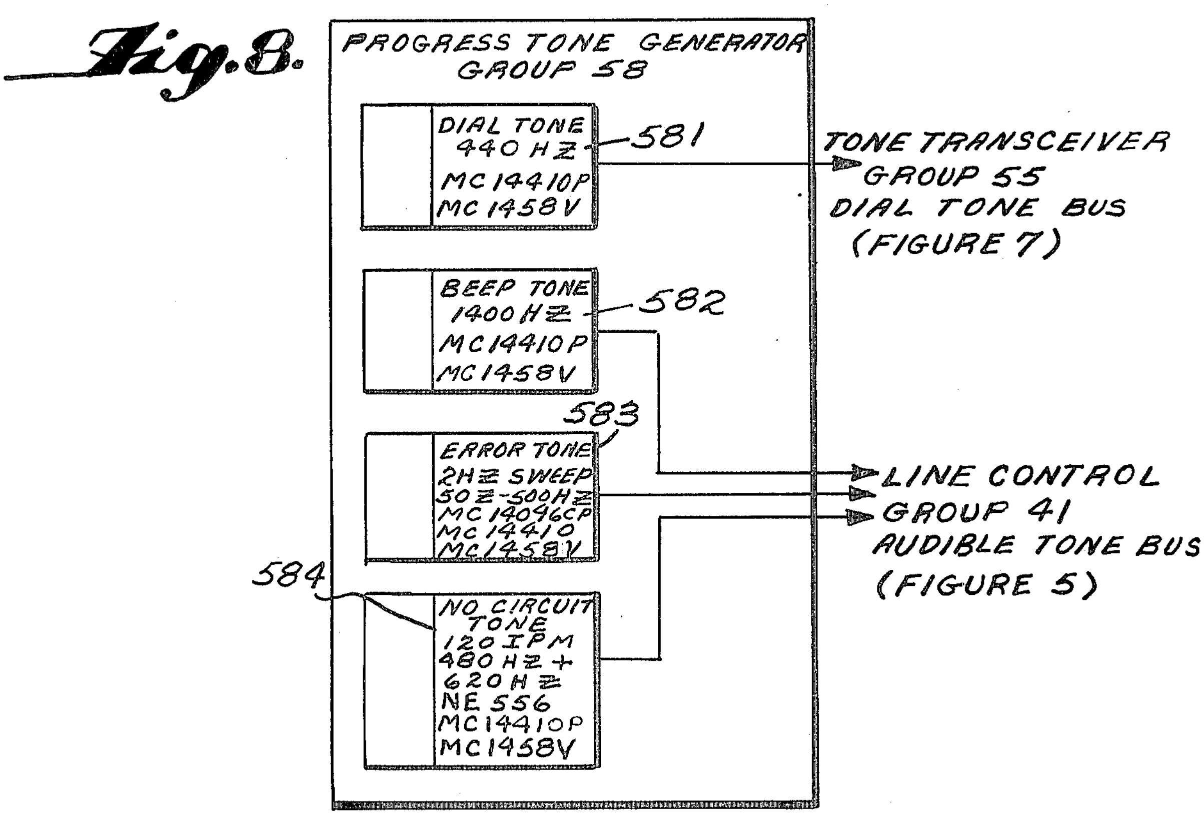

Refer now to FIG. 8, which is a more detailed schematic illustration of the progress tone generator group 58. The Progress Tone Generator Group is an assembly of tone sources used in generating audible tone signals by the tone transceiver group 55, as previously described, and by the line control group 41, as previously described. The signals are employed to give information to system users about the progress or disposition of the telephone call.

The progress tone generator group 58, in the preferred embodiment of the present invention, is a single unit referred to as a MO-619 Master Oscillator. As identified in FIG. 8, the unit employs, for the basic tone source, circuits which are typical semi-conductor applications of commercially available components.

Each of the tones are generated from circuit variations in the application of a Motorola MC14410 tone encoder. The output of each of the tone encoders is one or a pair of digitally synthesized sine waves, and is coupled to the related tone bus via an active filter and output amplifier. The active filter is employed to attenuate unwanted frequency components created in the digital synthesization of the sinewaves. The filters and amplifiers are conventional applications of the Motorola MC1458V operational amplifier.

The MC14410 tone encoder accepts digital coded inputs for the tones. The digital coded inputs control an external clocked frequency generator. The dial tone from generator 581 and the beep tone from generator 582 are single frequencies and are generated from a fixed code which is continuously applied to the encoder, and a crystal clock input.

The error tone from generator 583 is a varying single frequency and is generated from a fixed code for the center frequency which is continuously applied to the encoder and a varying clock input. The varying clock input is from a voltage controlled oscillator (VCO) circuit which, in the preferred embodiment, is a conventional application of the Motorola Mc14046CP Phase-Locked Loop CMOS Integrated Circuit. The control voltage input to the VCO, in effect the frequency modulation of the sweep input, is from a single frequency oscillator output at the sweep frequency. The sweep oscillator circuit is a conventional operational amplifier circuit design employing in the preferred embodiment Motorola MC1458V units.

The no circuit tone from generator 584 is an interrupted single frequency pair and is generated from a fixed code, which is continuously gated to the input of the encoder at the interruption rate and from a crystal clock unit. The gate control, in effect the amplitude modulation of the cadence input, is supplied from a conventional timer circuit design, which in the preferred embodiment, employs as the basic element the Signetics NE556 unit.

Figure 9:
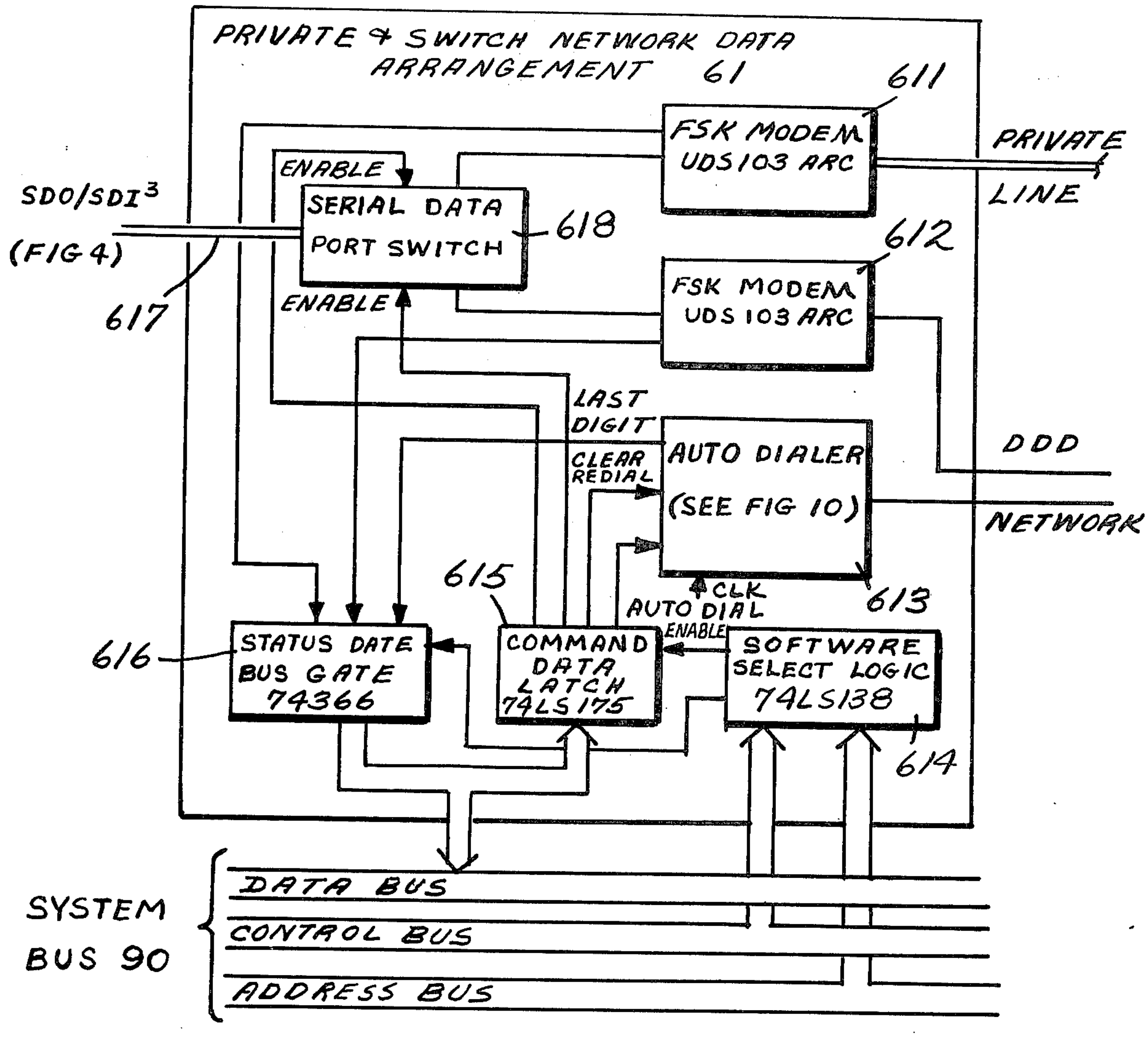

Refer now to FIG. 9, which is a more detailed schematic illustration of the private and switched network data arrangement 61. As previously depicted in FIG. 3 and here in FIG. 9, the data arrangement is that element of the remote satellite unit which provides the interface with a private line facility and alternately the switched network for the data communication between the microcomputer system and the central computer system. As aforementioned, the selection of which data communications path is to be employed is performed by the microcomputer system 49 via system bus 90 in software selectable modes.

As illustrated in FIG. 9, the private and switched network data arrangement 61 is a data access interface which includes two modems 611 and 612, one for the primary path (Private Wire) and one for the alternative path (DDD Network), an automatic dialer 613; and an interface with the system bus 90 for software control. In the preferred embodiment, the modem is referred to as an MM-620 Modem Module and the autodialer and system bus interface as a DB-621 Dial Back Up Unit.

The FSK Modem 611 and 612 provide 2 wire full duplex operation in support of 300BPS frequency shift keying (FSK) data transmission and is commonly referred to in the art by Bell hardware model numbers 103/113. The unit used in the preferred embodiment is Universal Data System, Model UDS103ARC. As identified, the carrier detect signal output from both modems are inputs to the microcomputer interface logic and are used in the software selection of the communication path. Further as shown, the communications path selected is interconnected with microcomputer System serial data interface 617 by a software output command, which enables the appropriate path in the data port switch 618.

The autodialer 613, upon software command, provides a fully automatic dial up operation into the DDD network. Signals from the microcomputer System via the system bus interface logic are, as identified, an Enable (Auto Dial Enabler), Done (Last Digit), and a Reset/Retry (Clear/Redial). The autodialer performs all other functions requisite to automatic calling through the network via a Bell provided Data Access Arrangement (DAA) which, by standard Bell reference designation, is data coupler CBS.

The logic elements requisite to the software selectable private and switch data arrangement by the microcomputer system via the system bus 90, consists of standard MSI and SSI units interconnected in a conventional manner. As shown in FIG. 9, for the preferred embodiment, the select function 614 employs a 74LS 138MSI logic element; the output register function for the command data 615 employs a 74LS175 MSI logic element; and the input data bus interface 616 employs a 74366 MSI logic element.

Figure 10:
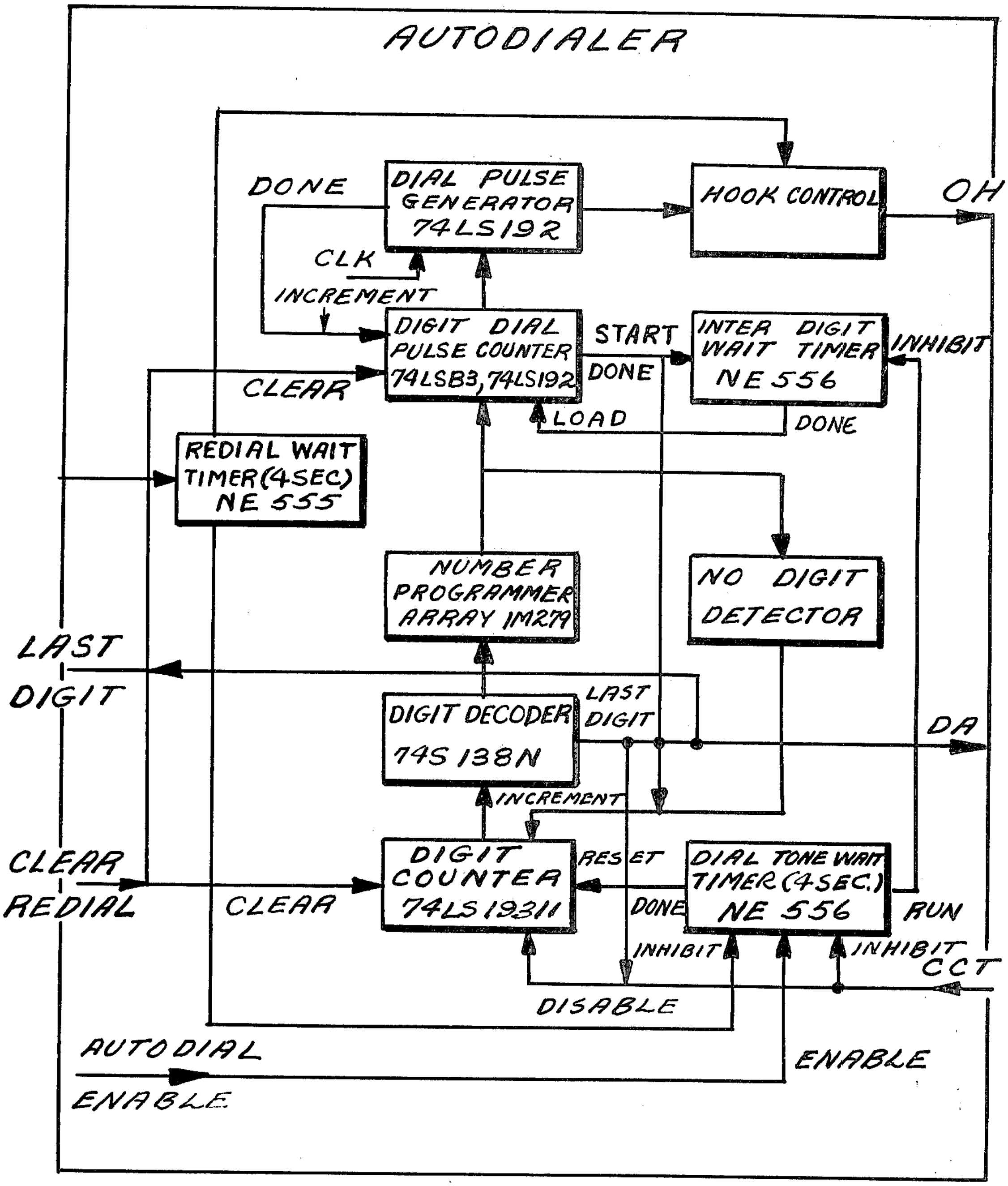

Refer now to FIG. 10, which details the autodialer 613 circuitry. Identified is the CBS data coupler control lead interface as required for call originations consisting of OH, DA and CCT, as known by Bell reference. The autodialer is a sequence controller operating in accordance with Dial Pulse Origination sequence criteria, as established for operations in the DDD network.

The sequence controller employs conventional SSI and MSI logic elements in standard applications. As shown, the time delay requirements of Redial Wait, Dial Tone Wait, and Interdigit Wait make use of a commercially available general purpose timer as referenced. The more critical timing needs for dial pulse accuracy are obtained from a clock input which is CPU crystal sourced. The final dial pulse make/break rates derive from up counts of 10 ms. The count sequence for the make/break ratio, dial pulse count, and digit count employ MSI counter logic elements as referenced. Dial number programmability is by BCD switch control of a diode array employing a general purpose diode as referenced, with digit selection achieved with MSI decoder logic element as referenced. The referenced full adder MSI logic element, as part of the digit counter, is used to decrement the loaded number by one, for subsequent correct count. The remaining controller logic is standard application of SSI elements.

While the present invention has been described in connection with a single remote switching circuit, it should be understood that the central computer 11 can be utilized to control in tandem a plurality of such remote switching units. Thus, for example, assume that a caller wishes to place a call to a long-distance city, but the cheapest bulk rate lines available are through one or more other remote switching units. In this case, the central processing unit, after determining the area code of the party being called, interrogates a number of other remote switching units to determine whether bulk rate lines are available for transmitting the call to the remote party. If such lines are available, the central processing unit provides command signals to the respective remote switching units to route the call therethrough to the remote telephone unit being called.

While the present invention has been disclosed with respect to a preferred embodiment thereof, it should be understood that there may be other embodiments which fall within the spirit and scope of the invention as defined by the appended claims.

Appendix A is a printout of the program for controlling the operation in the central processing system by the minicomputer system. The minicomputer system is of conventional design known in the art; however, included in Annex A to the Appendix is the structure of the computer as set out in the preferred embodiment. The attached program listing will enable those skilled in the art to implement the present invention to achieve the functions set out hereinabove.

Appendix B is a printout of the program for carrying out the various operations in the remote satellite unit by the microcomputer of the present invention. The remote satellite unit hardware structure, including the microcomputer system, is an assembly of modules interconnected specifically to meet the requirements set forth herein. The modules, as incorporated in the assembly, are as illustrated in FIG. 4.

ANNEX "A" TO APPENDIX "A"
Minicomputer System
Interdata 7/32 Computer
System Components

| Item | Product Number | Description | Quantity |
|---|---|---|---|
| 1. | M73-023 | Model 7/32 with 32KB Core Memory | 1 |
| 2. | M73-307 | 32KB Memory Expansion Module | * |
| 3. | M71-102 | Hexadecimal Display Panel | 1 |
| 4. | M73-100 | Power Fail Detection/Auto Restart | |
| 5. | M73-104 | Memory Access and Protect Controller | 1 |
| 6. | M73-107 | Processor Parity Control | 1 |
| 7. | M73-105 | Extended Memory Selector Channel | 2 |
| 8. | M48-000 | Universal Clock Module | 1 |
| 9. | M70-104 | Loader Storage Unit Controller | 1 |
| 10. | M46-470 | 9 Track Mag Tape Interface | 1 |
| 11. | M46-460 | 9 Track Mag Tape Expansion Transport | 2 |
| 12. | M48-024 | Carousel 30 Interface | 1 |
| 13. | M46-433 | Removable Cartridge Disc Controller | 1 |
| 14. | M47-100 | Asynchronous Line Module Controller | 1 |
| 15. | M47-101 | Programmable Asynch. Line Module | * |
| 16. | M49-021 | PALS Chassis | * |
| 17. | M49-026 | Switching Regulated Power Supply | 3 |
| 18. | M49-020 | System Chassis | 1 |
| 19. | M49-030 | System Cabinet | 3 |
| 20. | M10-054 | Data Set Cable | * |
| 21. | S90-006-31 | OS/32 MT | 1 |
| 22. | S90-008-31 | ITAM | 1 |
| 23. | M49-024 | Switching Regulated Power Supply | 1 |
| 24. | M48-005 | Multiplexer Bus Buffer | 1 |
| 25. | M73-106 | Local Memory Bank Interface | 1 |
| 26. | M73-111 | LMBI Chassis | 1 |
| 27. | AMPEX DM323 | 40 Megbyte Disk Drive | * |
| 28. | DEC LA36 | DECwriter | 1 |

Appendix A

```
     TOX SYSTEM MAIN CONTROL PROGRAM                       PAGE   1   15:42:00  01/27/77

PROG= TOXMAIN     ASSEMBLED BY CAL 03-066R04-01 (32-BIT)

                          SCRAT
                          TARGT   32
                          WIDTH   120
                          CROSS
 000000I                  ENTRY   REGOUT,REGLINE,REGFLAG
 000000T                  EXTRN   MONTOR3
 000000T                  ENTRY   LOSTLINE,DATAIN,IOLN,LN
 000000T                  ENTRY   LOADPARM
 000000I                  ENTRY   NBR,DISC,TTYMSG,NBR,CALL
 000000I                  ENTRY   M1,ASGN,M2,ASGN
 000000T                  ENTRY   NBR,CGS,TIMER,MC
 000000T                  ENTRY   MAGTAPE,N,MAGLU,CHANGREG
 000000I                  EXTRN   MONTOR,DATAOUT
 000000T                  EXTRN   COMMAND
 000000T                  COPY    TOXLPF
                  * LAST MODIFIED 12/4/75                                          ASC03340
                  *                                                                ASC03360
                  * TOX CORE IMAGE FILE TOXLPF(LOAD PARAMETER FILE)                ASC03380
                  *                                                                ASC03400
                  TOXLPF.  STRUC             LENGTH OF TOX PARM TABLE              ASC03420
 000000           NUMBR.CS DS      2         NUMBER OF CUSTOMERS                   ASC03440
 000002           NUMBR.IA DS      2         NUMBER OF INVALID ACCOUNTS            ASC03460
 000004           ADR.PORT DS      4         A(LINE PORT TABLE)                    ASC03480
 000008           ADR.DCOR DS      4         A(DISK BUFFER POOL)                   ASC03500
 00000C           ADR.TCOR DS      4         A(TEMP BUFFER POOL)                   ASC03520
 000010           NWORDS   DS      2         NUMBER OF WORDS IN DISK BIT MAP       ASC03540
 000012           CWORDS   DS      2         NUMBER OF WORDS IN TEMP BIT MAP       ASC03560
 000014           T.ILLACT DS      4         A(ILLEGAL ACCOUNT NUMBERS)            ASC03580
 000018           ADR.TBUF DS      4         A(TAPE BUFFERS)                       ASC03600
 00001C           ADR.TTYB DS      4         A(TTY BUFFERS)                        ASC03620
 000020           TWORDS   DS      2         NUMBER OF WORDS IN TTY BIT MAP        ASC03640
 000022           TDIS.END DS      2         END ADDR DISK TEMP(PRIOR TO +32)      ASC03660
 000024           TDIS.EXT DS      4         BIT MAP * OI EXTRA FOR TEMP           ASC03680
 000028           SEC.CD   DS      2         NUMBER OF SECTORS IN CORE IMAGE       ASC03700
 00002A           SEC.PRM  DS      2         NUMBER OF SECTORS IN PARM/PORT FILE(BINASC03720
 00002C           NUMBR.PT DS      2         NUMBER OF PORTS IN SYSTEM             ASC03740
 00002E           SYS.PARM DS      1         SYSTEM PARAMETER                      ASC03760
 00002F           FLAG1    DS      1         SYSTEM FLAG                           ASC03780
 000030           CDIS.MAP DS      4         A(CALL BACK FILE SECTOR MAP)          ASC03800
 000034           CDIS.NWD DS      2         NUM WORDS IN SECTOR BIT MAP           ASC03820
 000036           TOXLP.F1 DS      2         TWO BYTE FILLER FOR FULL WORD ALIGNMENTASC03840
 000038                    ENDS                                                    ASC03860
        0000 000A L.ACT    EQU     8
        0000 0006 L.SACT   EQU     8
 000000T                   COPY    TOXSC15
                  * SET UP 11/25/75                                                ASC07540
                  * MODIFIED 2/24/76                                               ASC07560
                  *MOD 3/1/76                                                      ASC07580
                  TOXSC15. STRUC             LENGTH OF SVC15 PARM BLOCK            ASC07600
 000000           SC15.FUN DS      0         FUNC CODE(STAND. CONV. 1/2 WD ENTRY)  ASC07620
 000000           SC15.FU  DS      1         FUNC CODE (BYTE ENTRY)                ASC07640
 000001           SC15.LU  DS      1         LOGICAL UNIT                          ASC07660
 000002           SC15.STA DS      1         STATUS(1ST BYTE)                      ASC07680
 000003           SC15.ST2 DS      1         2ND BYTE OF STATUS FIELD              ASC07700

     TOX SYSTEM MAIN CONTROL PROGRAM                       PAGE   2   15:42:15  01/27/77

 000004           SC15.DCW DS      0         A(DEVICE COMMAND STATUS WORD)         ASC07720
 000004           SC15.NCE DS      4         NUM CMD EXEC (TOP BYTE OF DCW)        ASC07740
 000008           SC15.LLR DS      2         LENGTH OF LAST READ                   ASC07760
 00000A           SC15.LLW DS      2         LENGTH OF LAST WRIET                  ASC07780
 00000C           SC15.WB  DS      1         WRITE BEGIN SLOT                      ASC07800
 00000D           SC15.AWB DS      3         A(WRITE BEGIN)                        ASC07820
 000010           SC15.WE  DS      1         WRITE END SLOT                        ASC07840
 000011           SC15.AWE DS      3         A(WRITE END)                          ASC07860
 000014           SC15.PC  DS      1         PREPARE CHR SLOT                      ASC07880
 000015           SC15.APC DS      3         A(PREPARE CHR SLOT)                   ASC07900
 000018           SC15.RB  DS      1         READ BEGIN SLOT                       ASC07920
 000019           SC15.ARB DS      3         A(READ BEGIN)                         ASC07940
 00001C           SC15.TCW DS      4         TOP OF DCW                            ASC07960
 000020           SC15.PO  DS      4         PREPARE OPT                           ASC07980
 000024           SC15.WBF DS      32        3/1/76 WRITE BUFFER                   ASC08000
 000044           SC15.IRB DS      4         INDIRECT READ BUFFER                  ASC08020
 000048           SC15.RBF DS      32        3/1/76 AVAILABLE READ BUFFER          ASC08040
 000068                    ENDS                                                    ASC08060
 000000T                   COPY    TOXCOR
                  * SET UP 11/25/75                                                ASC05840
                  * LAST MODIFIED 11/26/75                                         ASC05860
                  * MODIFIED 7/22/76 * MARRIAGE,GEO,&EXTEN NUMS                    ASC05880
                  * MODIFIED 9/21/76 * ADDING LDBEEPER AND CALLB.TM                ASC05900
                  TOXCOR.  STRUC            LENGTH OF CUSTOMER CORE DATA BASE      ASC05920
                  *MODIFIED 9/7/76 * BACKUP & XBACKUP ADDED                        ASC05940
                  * MODIFIED 9/10/76 * ADDING BEEPER                               ASC05960
                  * MODIFIED 10/8/76 ADDING TYSAT.FG                               ASC05980
 000000           DEV.MN   DS      4        MNEMONIC NAME OF PORT                  ASC06000
 000004           DEV.LOG  DS      2        LOGICAL PORT ASSIGNMENT                ASC06020
 000006           NU.LINES DS      1        NUMBER OF LINES TO SATELLITE(BINARY)   ASC06040
 000007           CALL.CD  DS      1        CALL BACK ALGORITHM CODE               ASC06060
 000008           ADR.ARCD DS      4        A(AREA CODE TABLE)                     ASC06080
 00000C           ADR.LNTB DS      4        A(LINE TABLE)                          ASC06100
 000010           ADR.SVC  DS      4        A(SVC15 PARM BLOCK)                    ASC06120
 000014           ADR.CMP1 DS      4        CAMP-ON QUEUE 1                        ASC06140
 000018           ADR.CMP2 DS      4        CAMP-ON QUEUE 2                        ASC06160
 00001C           ADR.DISC DS      2        MASTER FILE DISK ADDRESS               ASC06180
 00001E           ADR.ADN  DS      2        ADN FILE DISK ADDRESS                  ASC06200
 000020           SYS.FG   DS      1        SYSTEM FLAG                            ASC06220
 000021           PULSE    DS      1        CIRCLE DIFIT PULSE GIGIT(BINARY)       ASC06240
 000022           PHN.MSTR DS      10       MASTER PHONE NUMBER                    ASC06260
 00002C           PHN.DVRS DS      10       DIVERSION PHONE NUMBER                 ASC06280
 000036           COD.DVRS DS      1        DIVERSION CODE                         ASC06300
```

-continued

```
•  TDX SYSTEM MAIN CONTROL PROGRAM                     PAGE   2   15:42:15  01/27/77

000037           CONF.FG  DS    1              CONFERENCE FLAG                    ASC06320
000038           TIE1.CD  DS    1              TIE LINE 1 ACCESS DIGIT            ASC06340
000039           TIE2.CD  DS    1              TIE LINE 2 ACCESS DIGIT            ASC06360
00003A           TIE3.CD  DS    1              TIE LINE 3 ACCESS DIGIT            ASC06380
00003B           TIE4.CD  DS    1              TIE LINE 4 ACCESS DIGIT            ASC06400
00003C           THRS.CP1 DS    2              THRESHOLD COUNT QUEUE 1            ASC06420
00003E           THRS.CP2 DS    2              THRESHOLD COUNT QUEUE 2            ASC06440
000040           ACTV.IN  DS    4              INPUT LINE ACTIVITY BIT MAP        ASC06460
000044           ACTV.OUT DS    4              OUTPUT LINE ACTIVITY BIT MAP       ASC06480
000048           CINIT.IN DS    4              INPUT INITIALIZATION WORD          ASC06500
00004C           CINIT.OU DS    4              OUTPUT INITIALIZATION WORD         ASC06520
000050           SUS.TOT  DS    2              SUS TOTAL                          ASC06540
000052           PRNT.FLG DS    1              PRINT BILLING FLAG                 ASC06560

   TDX SYSTEM MAIN CONTROL PROGRAM                     PAGE   3   15:42:32  01/27/77

000053           QUE.FLG  DS    1              QUEUE FLAG(0=CALL BACK:1=CAMP ON)  ASC06580
000054           ADR.EXCH DS    4              ADDR OF EXCHANGE TBL               ASC06600
000058           PEAK.R1  DS    1              PEAK HOUR REST 1                   ASC06620
000059           PEAK.R2  DS    1              PEAK HOUR RET 2                    ASC06640
00005A           PEAK.R3  DS    1              PEAK HOUR REST 3                   ASC06660
00005B           ACT.DGTS DS    1              NUM DIGITS IN ACCT NUMBER          ASC06680
00005C           OUTT.FLG DS    1              OUTPUT TIE LINE FLAG               ASC06700
00005D           TONE.FG1 DS    1              TONE(1),600MILLS(0)                ASC06720
00005E           NBR.EXCH DS    2              NUMBER OF EXCHANGE TABLES          ASC06740
                 * 7/22/76 ADDITIONS * NEXT 5 EQUATES                             ASC06760
000060           SPOUSE   DS    8              8 MARRIAGE SLOTS - 1 BYTE EACH     ASC06780
000068           ADR.CMP3 DS    4              A(QUEUE3) SAME SIZE AS NORMAL QUE  ASC06800
00006C           G.RESTR  DS    1              GEO. REST(0=NONE)                  ASC06820
00006D           MIN.EXT  DS    1              MIN DIGITS IN EXTENSION            ASC06840
00006E           MAX.EXT  DS    1              MAX DIGITS IN EXTENSION            ASC06860
                 * BEEPER ADDED 9/10/76                                           ASC06880
00006F           BEEPER   DS    1              (0:WILL GET 3 MINUTE BEEPER)       ASC06900
                 * 9/7/76 ADDITION NEXT TWO EQUATES                               ASC06920
                 * FOLLOWING TWO LABELS ADDED 9/21/76                             ASC06940
000070           LDBEEPER DS    1                                                 ASC06960
000071           CALLB.TM DS    1              CALL BACK HOLDING TIME             ASC06980
                 * 10/8/76 ADDITION                                               ASC07000
000072           TYSAT.FG DS    1              0(OLD),NON-0(NEW,POLARITY GUARD FEA) ASC07020
000073           MFILLCDE DS    0                                                 ASC07040
000073           CALLB.CD DS    1              (DIGITS-1 OR FF)                   ASC07060
000074           EXPED.FG DS    1              0(NO EXP QUE)                      ASC07080
000075           NAKCNT   DS    1                                                 ASC07100
000076           ADNHGH   DS    1              1/14/77                            ASC07124
000077           CBTIEFLG DS    1              1/14/77                            ASC07128
000078           X.ILLACT DS    4              1/14/77                            ASC07132
00007C           MOREF.CD DS    2              1/14/77                            ASC07134
00007E           BACKUP   DS    1              0(NORMAL),FF(LINE-BACKER)          ASC07140
00007F           XBACKUP  DS    1              FF(USED FOR CROSS-REF)             ASC07160
000080                    ENDS                                                    ASC07180
       0000 0038 REGE.01  EQU   TIE1.CD        OUTPUT BYTE FOR FIRST 4 REGISTERS
       0000 0039 REGE.02  EQU   TIE2.CD        OUTPUT BYTE FOR LAST 4 REGISTERS
       0000 003A REGE.ST  EQU   TIE3.CD        STATUS OF REGISTER OUTPUT BYTES
       0000 003B IN.70R10 EQU   TIE4.CD        7 OR 10 DIGIT INTRASTATE CALL
       0000 0073 CALLB.DC EQU   CALLB.CD
       0000 007D LDCP     EQU   BACKUP-1
000080T                   COPY  TDXIOL
                 * SET UP 11/25/75                                                ASC08120
                 * MOD 3/17/76 ADD SUB.CLSS,CAMP.CNT & FREE.IOL                   ASC08140
                 TDXIOL.  STRUC                LENGTH OF USER I/O LINE TABLE      ASC08160
000000           STAT.IN  DS    1              STATUS OF INPUT LINE               ASC08180
000001           CLASS.IN DS    1              CLASS OF INPUT LINE                ASC08200
000002           SYS.STAT DS    1              LINE STATE                         ASC08220
000003           SYS.FLAG DS    1              LINE FLAG                          ASC08240
000004           LN.TEMP  DS    4              TEMP WORKING AREA                  ASC08260
000008           LN.WAT   DS    1              WATTS BAND NEEDED                  ASC08280
000009           LN.OUT   DS    1              OUTPUT LINE REGERENCED             ASC08300
00000A           DISC.ADR DS    2              WORKING DOSK ADDRESS               ASC08320
00000C           STAT.OUT DS    1              STATUS OF OUTPUT LINE              ASC08340
00000D           LN.IN    DS    1              INPUT LINE REFERENCE               ASC08360
00000E           CLASS.OT DS    2              CLASS OF OUTPUT LINE               ASC08380
000010           SUS.IN   DS    1              SUSPICION COUNT - INPUT            ASC08400

   TDX SYSTEM MAIN CONTROL PROGRAM                     PAGE   4   15:42:49  01/27/77

000011           CB.FLAG  DS    1              CALL BACK FLAG                     ASC08420
000012           SUS.OUT  DS    1              SUSPICION COUNT - OUTPUT           ASC08440
000013           PREM.OUT DS    1              PREMATURE RELEASE CT               ASC08460
000014           SUB.CLSS DS    1              TIE OR FX SUBCLASS                 ASC08480
000015           CAMP.CNT DS    1              CAMP ON TIMER COUNT                ASC08500
000016           FREE.IOL DS    2              TWO BYTE FILLER                    ASC08520
000018                    ENDS                                                    ASC08540
       0000 0016 CON.FLAG EQU   FREE.IOL
       0000 0017 LN.SUBC  EQU   FREE.IOL+1
                 *
                 TDXIDISC STRUC
000000           TD.TYPE  DS    1              RECORD TYPE
000001           TD.INLN  DS    1              INPUT LINE NUMBER
000002           TD.PORT  DS    2              CUSTOMER LOGICAL PORT
000004           TD.OUTLN DS    1              OUTPUT LINE NUMBER
000005           TD.ASERV DS    1              ACTUAL SERVICE CODE
000006           TD.BSERV DS    1              BILLABLE SERVICE CODE
000007           TD.ACCT  DS    L.ACT          USER ACCOUNT NUMBER
00000F           TD.SPACT DS    L.SACT         SPECIAL ACCOUNT NUMBER
000017           TD.SYSTM DS    1              SYSTEM BUMBER
000018           TD.PMN   DS    4              CUSTOMER PORT MNEMONIC
00001C           TD.SECS  DS    4              START TIME,SEC
000020           TD.STIME DS    6              START TIME,HHMMSS
000026           TD.DATE  DS    5              DATE
00002B           TD.PHN   DS    20             PHONE NUMBER
00003F           TD.OPT   DS    1              OPTIONS FLAG
000040           TD.ADN   DS    1              ADN USAGE INDICATOR
000041           TD.DIVR  DS    1              DIVERSION USAGE INDICATOR
```

-continued

```
TDX SYSTEM MAIN CONTROL PROGRAM                         PAGE   4   15:42:49  01/27/77

000042        196  TD.LNTB   DS     4              LINE TABLE ADDRESS
000046        197  TD.CDUR   DS     4              CALL BACK QUEUE TIME.SECONDS
00004A        198  TD.CSTIM  DS     6              TIME CUSTOMER PACED IN CALL BACK QUEUE
000050        199  TD.CALL   DS     1              CALL BACK ACTIVE FLAG
000051        200  TD.CRTRY  DS     1              NUMBER OF RETRIES ON EXTENSION BUSY
000052        201  TD.END    DS     0
000052        202            ENDS
              203  ADNFILE.  STRUC
000000        204  ADNF.FG   DS     1              WATTS OR TIE TRUNK FLAG
000001        205  ADNF.NT   DS     1              NUMBER OF ACCESSES
000002        206  ADNF.CL   DS     1              TIE TRUNK CLASS
000003        207  ADNF.T1   DS     6
000009        208  ADNF.T3   DS     3
00000C        209  ADNF.T4   DS     3
00000F        210  ADNF.PHN  DS     20             20 DIGIT PHONE NUMBER
000023        211  ADNF.EL   DS     0              LENGTH
000023        212            ENDS
              213  CB.       STRUC
000000        214  CB.TYPE   DS     1
000001        215  CB.DISP   DS     1
000002        216  CB.PORT   DS     2
000004        217  CB.RETRY  DS     1
000005        218  CB.ACT    DS     1
000006        219  CB.BILL   DS     1
000007        220  CB.ACCT   DS     L.ACT
00000F        221  CB.SPACT  DS     L.SACT
000017        222  CB.SYSTM  DS     1
000019        223  CB.PMN    DS     4

TDX SYSTEM MAIN CONTROL PROGRAM                         PAGE   5   15:43:01  01/27/77

00001C             224  CB.DUR    DS     4
000020             225  CB.STIME  DS     6
000026             226  CB.FILL   DS     2
000028             227  CB.DATE   DS     8
000030             228            ENDS
                   229  FX.       STRUC              EXCHANGE TABLE FORMAT
000000             230  EXCH.CD   DS     0           CALL BACK CODE
000000             231  EXCH.AC   DS     2           AREA CODE
000002             232  EXCH.NT   DS     1           NUMBER OF TIE LINE ACCESSES
000003             233  EXCH.TC   DS     1           OUTPUT LINE SUBCLASS
000004             234  EXCH.T1   DS     3           3 BYTE ACCESS CODE FOR TIE LINES
000007             235  EXCH.T2   DS     3
00000A             236  EXCH.T3   DS     3
00000D             237  EXCH.T4   DS     3
000010             238  EXCH.TB   DS     100         EXCHANGE TABLE CODES
000074             239            ENDS
                   240  *
                   241  *         BILLING  RECORD
                   242  *
        0000 0000  243  BR.TYPE   EQU    TD.TYPE
        0000 0001  244  BR.INLN   EQU    TD.INLN
        0000 0002  245  BR.PORT   EQU    TD.PORT
        0000 0004  246  BR.OUTLN  EQU    TD.OUTLN
        0000 0005  247  BR.ASERV  EQU    TD.ASERV
        0000 0006  248  BR.PSERV  EQU    TD.PSERV
        0000 0007  249  BR.ACCT   EQU    TD.ACCT
        0000 000F  250  BR.SPACT  EQU    TD.SPACT
        0000 0017  251  BR.SYSTM  EQU    TD.SYSTM
        0000 0018  252  BR.PMN    EQU    TD.PMN
        0000 001C  253  BR.DURTN  EQU    TD.SECS
        0000 0020  254  BR.STIME  EQU    TD.STIME
        0000 0026  255  BR.DATE   EQU    TD.DATE
        0000 002B  256  BR.PHN    EQU    TD.PHN
        0000 003F  257  BR.OPT    EQU    TD.OPT
        0000 0040  258  BR.ADN    EQU    TD.ADN
        0000 0041  259  BR.DIVR   EQU    TD.DIVR
                   260  TDXCLBKF  STRUC
000000             261  CMP.UACT  DS     L.ACT       USER ACCOUNT NUMBER
000008             262  CMP.SACT  DS     L.SACT      SACTIAL ACCOUNT NUMBER
000010             263  CMP.PHN   DS     16          PHONE NUMBER
000020             264  CMP.WAT   DS     1           WATTS BAND NEEDED
000021             265  CMP.TIE   DS     1           TIE LINE GROUP
000022             266  CMP.EXT   DS     10          CALL BACK EXTENSION
00002C             267  CMP.INP   DS     1           INPUT LINE CLASS
00002D             268  CMP.SUB   DS     1           TIE OR FX LINE SUB-CLASS
00002E             269  CMP.ARCD  DS     1
00002F             270  CMP.BEEP  DS     1           BEEPER INDICATOR
000030             271  CMP.TIME  DS     4           TIME PLACED IN CALL BACK QUEUE
000034             272  CMP.ASTM  DS     6           START TIME IN ASCII
00003A             273            DS     2           ALIGN ON FULL WORD BOURDRY
00003C             274  CMP.TAND  DS     10          TANDEM FLAG + 9 DIGITS OF ACCESS
000046             275  CMP.END   DS     0
000046             276            ENDS
                   277  *
                   278  *         CALL BACK QUEUE FORMAT
                   279  *

TDX SYSTEM MAIN CONTROL PROGRAM                         PAGE   6   15:43:13  01/27/77

                   280  CAMP.     STRUC
000000             281  CAMP.DAD  DS     2           CALL BACK DISC ADDRESS
000002             282  CAMP.RTY  DS     1           RETRY COUNT
000003             283  CAMP.TCT  DS     1           QUEUE TIMER COUNT
000004             284  CAMP.WAT  DS     1           WATTS AREA NEEDED
000005             285  CAMP.CBC  DS     1           CALL BACK CODE
000006             286  CAMP.SUB  DS     1           TIE OR FX SUB CLASS
000007             287  CAMP.INP  DS     1           INPUT LINE CLASS
000008             288  CAMP.EXT  DS     4           CALLBACK EXTENTION NU.MBER
```

```
00000C                    ENDS
        0000 0006         FRSTDGT  EQU   6              FIRST PHONE DIGIT OF ADN PHONE ADDITION
        0000 01B8         L.MAGBUF EQU   440            LENGTH OF TAPE BUFFER
        0000 01CC         L.MAGSVC EQU   460            LENGTH OF BUFFER PLUS SVC BLOCK
        0000 0003         ADNREF   EQU   3              ADN REFERENCE
        0000 0014         RDWORKSP EQU   20             READ IN WORK SPACE
        0000 000B         RDCBACK  EQU   11             READ IN CALL BACK QUEIE
        0000 0006         LINES    EQU   NU.LINES
        0000 0006         CRT1     EQU   6
        0000 0020         CONFUNC  EQU   X'20'
        0000 0022         CRTFUNC  EQU   X'22'
        0000 0001         N.1      EQU   1
        0000 0002         N.2      EQU   2
        0000 0003         N.3      EQU   3
        0000 0004         N.4      EQU   4
        0000 0005         N.5      EQU   5
        0000 0006         N.6      EQU   6
        0000 0007         N.7      EQU   7
        0000 0008         N.8      EQU   8
        0000 0009         N.9      EQU   9
        0000 000A         N.10     EQU   10
        0000 000B         N.11     EQU   11
        0000 0001         BIT1     EQU   1
        0000 0002         BIT2     EQU   2
        0000 0004         BIT3     EQU   4
        0000 0008         BIT4     EQU   Y'8'
        0000 0010         BIT5     EQU   Y'10'
        0000 0020         BIT6     EQU   Y'20'
        0000 0040         BIT7     EQU   Y'40'
        0000 0080         BIT8     EQU   Y'80'
        0000 0100         BIT9     EQU   Y'100'
        0000 0200         BIT10    EQU   Y'200'
        0000 0400         BIT11    EQU   Y'400'
        0000 0800         BIT12    EQU   Y'800'
        0000 1000         BIT13    EQU   Y'1000'
        0000 2000         BIT14    EQU   Y'2000'
        0000 4000         BIT15    EQU   Y'4000'
        0000 8000         BIT16    EQU   Y'8000'
        0001 0000         BIT17    EQU   Y'10000'
        0002 0000         BIT18    EQU   Y'20000'
        0004 0000         BIT19    EQU   Y'40000'
        0008 0000         BIT20    EQU   Y'80000'
        0010 0000         BIT21    EQU   Y'100000'
        0020 0000         BIT22    EQU   Y'200000'
        0040 0000         BIT23    EQU   Y'400000'
        0080 0000         BIT24    EQU   Y'800000'
        0100 0000         BIT25    EQU   Y'1000000'
```

```
        0200 0000         BIT26    EQU   Y'2000000'
        0400 0000         BIT27    EQU   Y'4000000'
        0800 0000         BIT28    EQU   Y'8000000'
        1000 0000         BIT29    EQU   Y'10000000'
        2000 0000         BIT30    EQU   Y'20000000'
        4000 0000         BIT31    EQU   Y'40000000'
        8000 0000         BIT32    EQU   Y'80000000'
        0000 00FF         TIME.MSK EQU   X'FF'
        0000 000A         TIE      EQU   10             TIE LINE CODE
        0000 0001         B.TIE    EQU   1
        0000 0002         B.FX     EQU   2
        0000 0004         B.WATTS  EQU   4
        0000 0008         B.ODD    EQU   8
        0000 0020         B.MCI    EQU   X'20'
        0000 000D         MCI      EQU   13             MCI SPECIAL FX TYPE LINES
        0000 0010         B.INTRA  EQU   X'10'
        0000 0009         TLD      EQU   9
        0000 000A         FXD      EQU   10
        0000 0041         TLDCD    EQU   X'41'
        0000 0020         SPCALLCD EQU   B.MCI
        0000 0042         FXDCD    EQU   X'42'
        0000 0040         B.DROP   EQU   X'40'
        0000 0080         B.TIEPRX EQU   X'80'
        0000 FF00         M.SUBCLS EQU   Y'FF00'
        0000 0008         B.LD     EQU   B.ODD
        0000 0004         B.WATT   EQU   B.WATTS
        FF00 0000         M.WATTS  EQU   Y'FF000000'
        FF00 0000         M.WATT   EQU   M.WATTS
        0000 00FF         M.INPUT  EQU   X'FF'
        0000 FF00         RETR.MSK EQU   X'FF00'
        0100 0000         TWO.24   EQU   16777216
        0001 0000         TWO.16   EQU   65536
        0000 0018         SC15.BRA EQU   24
        0000 000C         BUF.WRT  EQU   SC15.WR
        0000 0010         BUF.EWRT EQU   SC15.WF
        0000 000F         ADNDELT  EQU   ADNDEL
        0000 0080         XMASK    EQU   X'80'
        0000 003A         XZERO    EQU   X'3A'
        0000 0090         XORBLANK EQU   X'90'
        0000 000C         CBMODE   EQU   12
        0000 0010         RDCH1    EQU   16
        0000 0011         ADNTIE   EQU   17
        0000 000D         RCMODE   EQU   13
        0000 000D         ADNADD   EQU   13
        0000 000F         N.MODES  EQU   15             NUMBER OF STATE PROCEERERS
        0000 000E         MODETT   EQU   14
        0000 0009         CMPMODE  EQU   9              CAMP ON STATE
        0000 000F         ADNDEL   EQU   15
```

```
TDX SYSTEM MAIN CONTROL PROGRAM                      PAGE   7   15:43:25  01/27/77
                                  -continued
       0000 0046          384  L.CALLB   EQU    CMP.END            LENGTH OF CALL BACK FILE
       0000 0052          385  L.TDBUF   EQU    TD.END             LENGTH OF TEMPORARY DISC FILE
       0000 0046          386  LNGTHCMP  EQU    L.CALLB
       0000 0002          387  NUMR.IA   EQU    NUMBR.IA
       0000 008C          388  POUND     EQU    X'8C'
       0000 000E          389  WATTS     EQU    14
       0000 0187          390  LNG.TAPE  EQU    L.MAGBUF-1
       0000 0100          391  BUFL      EQU    H'256'


TDX SYSTEM MAIN CONTROL PROGRAM                      PAGE   8   15:43:37  01/27/77

       0000 008A          392  PRIORITY  EQU    X'8A'
       0000 0081          393  EXPEDITE  EQU    X'81'
       8009 0011          394  RINGCMD   EQU    Y'80090011'
       0000 0019          395  HANGUP    EQU    X'0019'
       0000 0007          396  CC.CODE   EQU    7
       0000 000B          397  CALBKORI  EQU    11
       0000 0000          398  INTRA     EQU    0
       0000 0001          399  FX        EQU    1                 FX LINE TYPE
       0000 0009          400  LD        EQU    9
       0000 000E          401  INWATTS   EQU    WATTS
       0000 00A0          402  WTDIALT   EQU    X'A0'
       0000 00A9          403  OUTSIDE   EQU    X'09'+WTDIALT
       0000 0020          404  TD.THH    EQU    TD.STIME
       0000 0024          405  TD.TSS    EQU    TD.STIME+4
       0000 0022          406  TD.TM1    EQU    TD.STIME+2
       0000 0023          407  TD.TM2    EQU    TD.STIME+3
       0000 0008          408  TMPWORK   EQU    8
       0000 0007          409  ADNFILE   EQU    7
       0000 0009          410  CALLFILE  EQU    9
       0000 0007          411  M0.MASK   EQU    BIT1+BIT2+BIT3
       0008 0006          412  M1.MASK   EQU    BIT2+BIT3+BIT20
       0788 0038          413  M2.MASK   EQU    BIT4+BIT5+BIT6+BIT24+BIT25+BIT26+BIT27+BIT20
       0008 4000          414  M5.MASK   EQU    BIT15+BIT20
       203C 00C0          415  M6.MASK   EQU    BIT19+BIT20+BIT21+BIT22+BIT30+BIT7+BIT8
       0008 0000          416  M8.MASK   EQU    BIT20
       303F 8040          417  M12.MASK  EQU    BIT16+BIT17+BIT18+BIT19+BIT20+BIT21+BIT22+BIT29+BIT30+BI   7
       1003 8000          418  M12A.MSK  EQU    BIT16+BIT17+BIT18+BIT29
       0000 0000          419  ACTB1     EQU    0
       0000 0010          420  L.TACT    EQU    L.ACT+L.SACT
       6000 0000          421  $P        EQU    Y'60000000'       POWER RESTORATION TRAP ENABLE
       1000 0000          422  $S        EQU    Y'10000000'       SVC 14 TRAP ENABLE
       0800 0000          423  $Q        EQU    Y'08000000'       TASK QUEUE SERVICE TRAP ENABLE
       0000 4000          424  $T        EQU    Y'4000'           ENABLE QUEUE ENTRY ON TASK CALL
       0000 0400          425  $O        EQU    Y'400'            ENABLE QUEUE ENTRY ON I/O COMPLETION
       0000 0100          426  $F        EQU    Y'100'            ENABLE QUEUE ENTRY ON SVC 15
       0000 000F          427  $CC       EQU    Y'F'              CURRENT CONDITION CODE
       0000 0001          428  R1        EQU    1
       0000 0002          429  R2        EQU    2
       0000 0003          430  R3        EQU    3
       0000 0004          431  R4        EQU    4
       0000 0005          432  R5        EQU    5
       0000 0006          433  R6        EQU    6
       0000 0007          434  R7        EQU    7
       0000 0008          435  R8        EQU    8
       0000 0009          436  R9        EQU    9
       0000 000A          437  R10       EQU    10
       0000 000B          438  R11       EQU    11
       0000 000C          439  R12       EQU    12
       0000 000D          440  R13       EQU    13
       0000 000E          441  R14       EQU    14
       0000 000F          442  R15       EQU    15
       0000 0000          443  R0        EQU    0
       8000 0000          444  $W        EQU    Y'80000000'
       0400 0000          445  $M        EQU    Y'04000000'       MEMORY ACCESS FAULT TRAP ENABLE
       0200 0000          446  $I        EQU    Y'02000000'
       0000 0200          447  $Z        EQU    Y'200'            ENABLE TASK QUEUE ON TIMEOUT


TDX SYSTEM MAIN CONTROL PROGRAM                      PAGE   9   15:43:49  01/27/77

       0000 0006          448  MAX       EQU    6                 MAX NUMBER OF TAPE BLOCKS
       0000 03E8          449  MS.COUNT  EQU    1000              1 SEC INTERVAL
       0000 003C          450  INT.CNT   EQU    60000/MS.COUNT    NUMBER OF CLOCK INTERRUPTS / MIN
                          451  *
                          452  *              USER DEDICATED LOCATIONS (UDL)
                          453  *
       0000 0000I         454  UDL       EQU    *
000000I 0000 0000         455            DC     Y'0'              CTOP -SET FROM SVC 2-CODE 5
000004I 0000 0000         456            DC     Y'0'              UTOP -SET FROM SVC 2-CODE 5
000008I 0000 0000         457            DC     Y'0'              UBOT -SET FROM SVC 2-CODE 5
00000CI 0000 0000         458            DC     Y'0'              RESERVED
000010I 0000 59B0I        459  UDL.TASQ  DC     A(QUELIST)        ADDRESS OF TASK QUEUE
000014I 0000 0000         460            DC     Y'0'              RESERVED
000018I 0000 5778I        461  UDL.MSGB  DC     A($MESBUF)        ADDRESS OF 76 BYTE MESSAGE BUFFER
00001CI 0000 0000         462  SVC14AR   DC     Y'0'              SVC 14 ARGUMENT ADDRESS
000020I 0000 0000         463            DC     Y'0',Y'0',Y'0',Y'0'RESERVED
000024I 0000 0000
000028I 0000 0000
00002CI 0000 0000
000030I 0000 0000         464  UDL.OPRS  DC     Y'0',Y'0'         POWER RESTORE OLD TSW
000034I 0000 0000
000038I 7600 4700         465  UDL.NPRS  DC     $P+$T+$O+$F+Y'0'+$M+$Z+$S+$I NEW TSW
00003CI 0000 0106I        466            DC     A($RESTRT1)       NEW POWER RESTART ADDRESS
000040I 0000 0000         467  UDL.OARF  DC     Y'0',Y'0'         ARITHMETIC FAULT OLD TSW
000044I 0000 0000
000048I 7600 4700         468  UDL.NARF  DC     Y'0'+$P+$M+$T+$O+$F+$Z+$S+$INEW ARITHMETIC FAULT TSW
```

TDX SYSTEM MAIN CONTROL PROGRAM PAGE 9 15:43:49 01/27/77

-continued

```
00004CI  0000 0116I                      DC     A($RESTRT2)          ARITHMETIC RESTART ADDRESS
000050I  0000 0000                       DC     Y'0',Y'0',Y'0',Y'0'RESERVED
000054I  0000 0000
000058I  0000 0000
00005CI  0000 0000
000060I  0000 0000          UDL.OS14     DC     Y'0',Y'0'            SVC 14 OLD TSW
000064I  0000 0000
000068I  6600 4700                       DC     Y'0'+$P+$T+$O+$F+$M+$Z+$I
00006CI  0000 0F96I                      DC     A(SVC14.PR)
000070I  0000 0000          UDL.OTSW     DC     Y'0',Y'0'            TASK QUEUE OLD TSW
000074I  0000 0000
000078I  7600 4700          UDL.NTSW     DC     Y'0'+$P+$T+$O+$F+$M+$Z+$I+$STASK QUEUE NEW TSW
00007CI  0000 083CI                      DC     A(QUETRAP)           ADDRESS OF QUEUE TRAP
000080I  0000 0000          UDL.OMAC     DC     Y'0',Y'0'            MEMORY ACCESS FAULT TRAP
000084I  0000 0000
000088I  7600 4700          UDL.NMAC     DC     Y'0'+$P+$M+$T+$O+$F+$Z+$I+$S  NEW MEMORY FAULT TSW
00008CI  0000 012AI                      DC     A($RSTRT3)           NEW ADDRESS
000090I  0000 0000          UDL.OILL     DC     Y'0',Y'0'            ILLEGAL INSTRUCTION OLD TWS
000094I  0000 0000
000098I  6400 4700          UDL.NILL     DC     Y'0'+$P+$M+$T+$O+$F+$Z
00009CI  0000 0144I                      DC     A($RSTRT4)
0000A0I                     UDL.RSER     DSF    24                   RESERVED  96 BYTES
                            *
         0000 0014          N.LINES      EQU    20                   NUMBER OF COMMUNICATIONS LINE
         0000 000A          N.FAULTS     EQU    10                   NUMBER OF FAULT INTERRUPTS
         0000 0005          N.IOS        EQU    5                    NUMBER OF DIFFERT I/O OPERATIONS
         0000 001E          N.TTYB       EQU    N.LINES+10           NUMBER OF TTY BUFFERS
         0000 0019          N.DISCB      EQU    N.LINES+5            NUMBER OF DISC BUFFERS
         0000 0003          N.TAPES      EQU    3                    NUMBER OF TAPE BUFFERS
                            *
```

TDX SYSTEM MAIN CONTROL PROGRAM PAGE 10 15:44:01 01/27/77

```
                            *                   TDX SYSTEM INITIALIZATION
                            *
000100I  4300 4000 0168I    START        B      TDXINIT
         0000 0106I         $RESTRT1     EQU    *
000106I  D000 4000 57C4I                 STM    R0,MLOOP.RG
00010CI  E120 4000 655CI                 SVC    2,LOGPW
000112I  E130 0001                       SVC    3,1
         0000 0116I         $RESTRT2     EQU    *
000116I  D000 4000 57C4I                 STM    R0,MLOOP.RG
00011CI  E120 4000 6564I                 SVC    2,LOGAR
000122I  E190 FF1A                       SVC    9,UDL.OARF
000126I  E130 0002                       SVC    3,2
         0000 012AI         $RSTRT3      EQU    *
00012AI  D000 4000 57C4I                 STM    R0,MLOOP.RG
000130I  E120 4000 656CI                 SVC    2,LOGMM
000136I  E120 4000 658CI                 SVC    2,PAUSE
00013CI  E190 FF40                       SVC    9,UDL.OMAC
000140I  E130 0003                       SVC    3,3
         0000 0144I         $RSTRT4      EQU    *
000144I  D000 4000 57C4I                 STM    R0,MLOOP.RG
00014AI  E120 4000 657CI                 SVC    2,LOGIL
000150I  E120 4000 658CI                 SVC    2,PAUSE
000156I  E190 FF36                       SVC    9,UDL.OILL
00015AI  E130 0004                       SVC    3,4
00015EI  D000 4000 57C4I    FREXIT       STM    R0,MLOOP.RG
000164I  E130 0005                       SVC    3,5
         0000 0168I         TDXINIT      EQU    *
                            *
                            *                   CLEAR ALL STACKS
                            *
000168I  6610 4000 5C44I    TDX.IN1      RTL    R1,TTYSTK
00016EI  2142                            BOS    TDX.IN2
000170I  2204                            BS     TDX.IN1
000172I  6610 4000 5CC4I    TDX.IN2      RTL    R1,MAGSTK
000178I  2142                            BOS    TDX.IN3
00017AI  2204                            BS     TDX.IN2
00017CI  6610 4000 5CD8I    TDX.IN3      RTL    R1,DISCLIST
000182I  2142                            BOS    TDX.IN4
000184I  2204                            BS     TDX.IN3
000186I  6610 4000 5D44I    TDX.IN4      RTL    R1,DISCSTK
00018CI  2142                            BOS    TDX.IN5
00018EI  2204                            BS     TDX.IN4
000190I  6610 4000 5D80I    TDX.IN5      RTL    R1,SVC.MAG
000196I  2142                            BOS    TDXINA
000198I  2204                            BS     TDX.IN5
                            *
         0000 019AI         TDXINA       EQU    *
                            *
00019AI  2551                            LCS    R5,1
00019CI  4050 4000 5F60I                 STH    R5,TIMER.MC          SET TIMER TO NOT CALLED CONDITION
0001A2I  0755                            XR     R5,R5
0001A4I  4050 4000 5F48I                 STH    R5,WORKCNT
0001AAI  4050 4000 5F4AI                 STH    R5,IDLE              IDLE FLAG
0001B0I  4050 4000 5F70I                 STH    R5,MAGREWND
0001B6I  4050 4000 5F2AI                 STH    R5,PROCFLG
0001BCI  4050 4000 5E5EI                 STH    R5,GOODMAG           SET TO ALL TAPES READY TO GO
```

TDX SYSTEM MAIN CONTROL PROGRAM PAGE 11 15:44:12 01/27/77

```
0001C2I  5850 4000 5950I                 L      R5,CNT.INT
0001C8I  5050 4000 5954I                 ST     R5,COUNTS
0001CEI  E170 4000 04CCI                 SVC    7,AS.CON             AS CON:  FOR ERROR MESSAGES
0001D4I  0320 4000 04CFI                 LB     R2,AS.CONST
0001DAI  0822                            LR     R2,R2
```

-continued

```
TDX SYSTEM MAIN CONTROL PROGRAM                         PAGE  11   15:44:12  01/27/77

0001DCI  4230 4000 0296I                BNZ     ASSIGNER             ERROR IN MAKEING THE ASSIGNMENT
0001E2I  E170 4000 04E8I                SVC     7,AS.TTY             TTY DEVICE
0001E8I  D320 4000 04FAI                LB      R2,AS.TTYST
0001EEI  0822                           LR      R2,R2
0001F0I  4230 4000 0296I                BNZ     ASSIGNER
0001F6I  E170 4000 0504I                SVC     7,AS.CRT
0001FCI  D320 4000 0506I                LB      R2,AS.CRTST          WAS TIMER ASSIGNMENT OK?
000202I  0822                           LR      R2,R2
000204I  4230 4000 0296I                BNZ     ASSIGNER             NO
00020AI  E170 4000 0520I                SVC     7,AS.CRT1
000210I  D320 4000 0522I                LB      R2,AS.CR1ST          LOOK AT STAUS
000216I  0822                           LR      R2,R2
000218I  4230 4000 0296I                BNZ     ASSIGNER
00021EI  E170 4000 053CI                SVC     7,AS.MAG1            MAG TAPE 1
000224I  D320 4000 053EI                LB      R2,AS.MAG1S
00022AI  0822                           LR      R2,R2
00022CI  4230 4000 0296I                BNZ     ASSIGNER
000232I  E170 4000 05A8I                SVC     7,AS.TDX             TDX CORE IMAGE FILE
000238I  D320 4000 05AAI                LB      R2,AS.TDXS
00023EI  0822                           LR      R2,R2
000240I  4230 4000 0296I                BNZ     ASSIGNER
000246I  E170 4000 0574I                SVC     7,AS.MAG2            MAG TAPE 2
00024CI  D320 4000 0576I                LB      R2,AS.MAG2S
000252I  0822                           LR      R2,R2
000254I  4230 4000 0296I                BNZ     ASSIGNER
00025AI  E170 4000 05C4I                SVC     7,AS.TMPW            TEMPORARY WORK FILE
000260I  D320 4000 05C6I                LB      R2,AS.TMPWS
000266I  0822                           LR      R2,R2
000268I  4230 4000 0296I                BNZ     ASSIGNER
00026EI  E170 4000 0558I                SVC     7,AS.ADR
000274I  D320 4000 055AI                LB      R2,AS.ADRS
00027AI  0822                           LR      R2,R2
00027CI  4230 4000 0296I                BNZ     ASSIGNER
000282I  E170 4000 05E0I                SVC     7,AS.CALLB           CALL BACK FILE
000288I  D320 4000 05E2I                LB      R2,AS.CALLS
00028EI  0822                           LR      R2,R2
000290I  4330 4000 02A6I                BZ      TDX.IN6
                                *
000296I  E640 4000 6004I        ASSIGNER LA     R4,M.ASER            WRITE OUT MESSAGE
00029CI  E120 4000 04BCI                SVC     2,LOG1
0002A2I  E130 0000                      SVC     3,0                  END OF JOB
                                *
         0000 02A6I             TDX.IN6 EQU     *
0002A6I  E110 4000 05FCI                SVC     1,RD.PARM            READ PARAMETER FILF
0002ACI  E610 4000 7C00                 LA      R1,LOADPARM
0002B2I  5821 0018                      L       R2,ADR.TBUF(R1)
0002B6I  2624                           AIS     R2,4
0002B8I  6520 4000 5D80I                ABL     R2,SVC.MAG
0002BEI  CA20 01CC                      AHI     R2,L.MAGSVC
0002C2I  6520 4000 5D80I                ABL     R2,SVC.MAG
0002C8I  CA20 01CC                      AHI     R2,L.MAGSVC

TDX SYSTEM MAIN CONTROL PROGRAM                         PAGE  12   15:44:24  01/27/77

0002CCI  6520 4000 5D80I                ABL     R2,SVC.MAG
0002D2I  E640 4000 7C00                 LA      R4,LOADPARM
0002D8I  4834 002A                      LH      R3,SEC.CD(R4)        NUMBER OF SECTORS IN LOAD FILE
0002DCI  1138                           SLLS    R3,8                 *256
0002DEI  2731                           SIS     R3,1                 MAKE THE ADDRESS ODD
0002E0I  0A34                           AR      R3,R4                ENDING ADDRESS OF SYSTEM
0002E2I  5030 4000 061CI                ST      R3,SYSEND
0002E8I  E110 4000 0614I                SVC     1,RD.SYSTM           READ IN WHOLE SYSTEM
0002EEI  41C0 4000 0482I                BAL     R12,GETDATE
         0000 02F4I             TDX.IN6B EQU    *
0002F4I  D320 4000 6000I                LB      R2,C.MAGLU           CURRENT MAG TAPE LOGICAL UNIT
0002FAI  41C0 4000 100AI                BAL     R12,HEADER           WRITER A HEADER RECORD TO IT
000300I  0833                           LR      R3,R3
000302I  4330 4000 032AI                BZ      TDX.IN6A             NO ERRORS
000308I  D320 4000 6000I                LB      R2,C.MAGLU           CURRENT LOGICAL UNIT
00030EI  D330 4000 6001I                LB      R3,N.MAGLU           SPARE MAG TAPE
000314I  D230 4000 6000I                STB     R3,C.MAGLU           SWAP THEM
00031AI  D220 4000 6001I                STB     R2,N.MAGLU
000320I  E120 4000 658CI                SVC     2,PAUSE              PAUSE AND WAIT
000326I  4300 FFCA                      B       TDX.IN6B             TRY AGAIN
         0000 032AI             TDX.IN6A EQU    *
                                *
                                *               ASSIGN COMMUNICATIONS LINES
                                *
00032AI  5834 0004                      L       R3,ADR.PORT(R4)      ADDRESS OF LINE PORT TABLE
000330I  4824 002C                      LH      R2,NUMBR.PT(R4)      NUMBER OF PORTS IN SYSTEM
000332I  272A                           STS     R2,10
                                *
                                *
000334I  5853 0028              TDX.IN7 L       R5,40(R3)            PICK UP CUSTOMER DATA BASE
000338I  4330 4000 0374I                BZ      TDX.IN8              NO-ONE THERE
00033EI  2470                           LIS     R7,0
000340I  D275 003A                      STB     R7,REGF.01(R5)       SET UP REGISTER LOCK OUT BYTES
000344I  D275 0039                      STB     R7,REGF.02(R5)
000348I  D275 003A                      STB     R7,REGF.ST(R5)
00034CI  4865 0004                      LH      R6,DEV.LOG(R5)       LOGICAL DEVICE
000350I  D260 4000 0593I                STB     R6,AS.15LU
000356I  5865 0000                      L       R6,DEV.MN(R5)        DEVICE MNEMONIC
00035AI  5060 4000 059AI                ST      R6,AS.15VOL
000360I  E170 4000 0590I                SVC     7,AS.15              DO THE ASSIGN
000366I  D360 4000 0592I                LB      R6,AS.15S            PICK UP STATUS
00036CI  0866                           LR      R6,R6
00036EI  4230 4000 0472I                BNZ     AS.15ER              PRINT ERROR
000374I  2634                   TDX.IN8 AIS     R3,4
```

```
TDX SYSTEM MAIN CONTROL PROGRAM                    PAGE 12    15:44:24   01/27/77
```

-continued

```
000376I  2721                       STS    R2,1
000378I  4230 FEBA                  BNZ    TDX.IN7
                          *
                          *
                          *              ISSUE READS TO ALL SATELLITES FOR RESTART
                          *              MESSAGE
                          *
00037CI  5834 0004                  L      R3,ADR.PORT(R4)      ADDRESS OF LINE PORT TABLE
000380I  4824 002C                  LH     R2,NUMBR.PT(R4)      NUMBER OF PORTS
000384I  272A                       STS    R2,10
                          *
000386I  5853 0028        TDX.IN9   L      R5,40(R3)            CUSTOMER DATA BASE ADDRESS


TDX SYSTEM MAIN CONTROL PROGRAM                    PAGE 13    15:44:35   01/27/77

00038AI  4330 4000 03C6I            BZ     TDX.IN10
000390I  2571                       LCS    R7,1
000392I  D275 0020                  STB    R7,SYS.FG(R5)        SET INITIALIZATION FLAG
000396I  2470                       LIS    R7,0
000398I  D275 0075                  STB    R7,NAKCNT(R5)
00039CI  5875 0010                  L      R7,ADR.SVC(R5)       SVC PARAMETER BLOCK ADDRESS
0003A0I  4865 0004                  LH     R6,DEV.LOG(R5)
0003A4I  D267 0001                  STB    R6,1(R7)             STORE LOGICAL UNIT
0003A8I  D385 007E                  LB     R8,BACKUP(R5)        LINEBACKER FLAG
0003ACI  0888                       LR     R8,R8
0003AEI  4330 4000 03BCI            BZ     T.NOLINE             NOT A LINEBACKER LINE
0003B4I  41C0 4000 041EI            BAL    R12,SETLBCKR         SET UP LINEBACKER LINE
0003BAI  2304                       BS     T.LINEBK
         0000 03BCI       T.NOLINE  EQU    *
0003BCI  41C0 4000 0440I            BAL    R12,SETBUF
         0000 03C2I       T.LINEBK  EQU    *
0003C2I  E1F7 [illegible]           SVC    15,[illegible](R7)   [illegible]
[illegible]  [illegible]  TDX.[illegible] [illegible] [illegible]
[illegible]  2721                   STS    R2,1
[illegible]  423[illegible]         BNZ    TDX.IN9              IF MORE PORTS LEFT,LOOP BACK
                          *
0003C[illegible]  E120 4000 56E4I   SVC    2,TIMEFUNC           START TIMER
[illegible]  2430                   LIS    R3,0
0003D6I  4030 4000 5E60I            STH    R3,[illegible]       [illegible]
[illegible]  6610 [illegible]       [illegible] R1,SVC.[illegible] SET [illegible] FIRST MAG TAPE BUFFER
[illegible]  5010 4000 [illegible]  ST     R1,MAGCUR
[illegible]  CA10 0188              AHI    R1,[illegible].MAGBUF
[illegible]  5010 4000 58C4I        ST     R1,MAGSVC
[illegible]  2411                   LIS    R1,1
[illegible]  4010 4000 5F28I        STH    R1,BUFNO
0003FAI  E640 4000 6022I            LA     R4,M.INITF           WRITE INITIALIZATION FINISHED MESSAGE
000400I  41C0 4000 45D8I            BAL    R12,TTYMSG
000406I  E110 4000 56ECI            SVC    1,TIME1              PICK UP TIME
00040CI  5810 4000 56F4I            L      R1,SPT.TIME          TIME IN SEC FROM MIDNITE
000412I  5010 4000 595AI            ST     R1,LAST.TME          SAVE LAST TIME FOR DATE UPDATE
000418I  4300 4000 0648I            B      MAINLOOP
         0000 041EI       SETLBCKR  EQU    *
00041EI  5887 0004                  L      R8,4(R7)             CAMMANDS + DCW POINTER
000422I  E697 0024                  LA     R9,36(R7)            WRITE ADDRESS
000426I  5087 0010                  ST     R8,16(R7)            WRITE END ADDRESS LOCATION
00042AI  F880 8009 0011             LI     R8,RINGCMD           WAIT FOR RING AND ANSWER IT COMMAND
000430I  5089 0000                  ST     R8,0(R9)
000434I  5097 0004                  ST     R9,4(R7)             SET DCW COMMANDS
000438I  2492                       LIS    R9,2
00043AI  D297 0004                  STB    R9,4(R7)
00043EI  030C                       BR     R12
         0000 0440I       SETBUF    EQU    *
000440I  0847                       LR     R4,R7
000442I  CA40 001E                  AHI    R4,H'30'             POINT TO DCW  CHAIN
000446I  F640 0200 0000             OI     R4,Y'02000000'       NUMBER OF COMMANDS
00044CI  5047 0004                  ST     R4,4(R7)
000450I  5847 000C                  L      R4,12(R7)            WRITE ADDRESS
[illegible]  5867 0014              L      R6,20(R7)            PREPARE ADDRESS
[illegible]  5887 0018              L      R8,24(R7)            READ ADDRESS
[illegible]  5047 0014              ST     R4,20(R7)
[illegible]  5067 000C              ST     R6,12(R7)


[illegible] SYSTEM MAIN CONTROL PROGRAM            PAGE 14    15:44:48   01/27/77

[illegible]  5087 0010              ST     R8,16(R7)
[illegible]  C860 0080              LHI    R6,X'80'             TURN OFF TIMER
00046CI  D267 001E                  STB    R6,30(R7)
000470I  030C                       BR     R12
                          *
[illegible]  C840 4000 [illegible]  [illegible] R4,[illegible].15 SEC
[illegible]  E120 4000 [illegible]  SVC    2,[illegible]
00047EI  4300 FFF2                  B      TDX.IN8              FINISH REST OF THE LINES
000482I  E120 4000 6520I  GETDATE   SVC    2,DATE.SVC
000488I  4800 4000 652AI            LH     R0,DATEBF
[illegible]  4000 4000 5FF4I        STH    R0,DATE
[illegible]  [illegible] 4000 652DI LB     R0,DATEBF+3
[illegible]  [illegible] 4000 5FF6I STB    R0,DATE+2
[illegible]  [illegible] 4000 652CI LB     R0,DATEBF+4
[illegible]  [illegible] 4000 5FF7I STB    R0,DATE+3
[illegible]  [illegible] 4000 652FI LB     R0,DATEBF+7
[illegible]  [illegible] 4000 [illegible] STB R0,DATE+4
[illegible]  030C                   BR     R12
                          *
                          *              ASSIGN SVC BLOCKS
                          *
0004BCI                             ALIGN  4
```

-continued

```
TDX SYSTEM MAIN CONTROL PROGRAM                              PAGE  14   15:44:48  01/27/77

0004BCI  4007                 738  LOG1       DB     X'40',7
0004BEI  001A                 739             DC     X'1A'
0004C0I  0000 6008I           740             DC     A(M.ASER+4)
0004C4I                       741             ALIGN  4
0004C4I  4007                 742  LOG2       DB     X'40',7
0004C6I  002C                 743             DC     X'2C'
0004C8I  0000 604CI           744             DC     A(M.15ASER+4)
0004CCI                       745             ALIGN  4
0004CCI  4080                 746  AS.CON     DC     X'4080'
0004CEI  0000                 747  AS.CONST   DC     X'0'
0004D0I  0000 0000            748             DC     Y'0'
0004D4I  434F4E20             749             DC     C'CON '
0004D8I  0000 0000            750             DC     Y'0',Y'0',Y'0',Y'0'
0004DCI  0000 0000
0004E0I  0000 0000
0004E4I  0000 0000
0004E8I                       751             ALIGN  4
0004E8I  4080                 752  AS.TTY     DC     X'4080'          ASSIGN,SRW,DEFAULT BUFFER,
0004EAI  0004                 753  AS.TTYST   DC     X'0004'          STATUS,LOGICAL UNIT 0
0004ECI  0000 0000            754             DC     Y'0'
0004F0I  54545920             755             DC     C'TTY '
0004F4I  0000 0000            756             DC     Y'0',Y'0',Y'0',Y'0'
0004F8I  0000 0000
0004FCI  0000 0000
000500I  0000 0000
000504I  4080                 757  AS.CRT     DC     X'4080'          EXTERNAL CLOCK TIMER
000506I  0005                 758  AS.CRTST   DC     X'5'             LOGICAL UNIT 5
000508I  0000 0000            759             DC     Y'0'
00050CI  43525432             760             DC     C'CRT2'
000510I  0000 0000            761             DC     Y'0',Y'0',Y'0',Y'0'
000514I  0000 0000
000518I  0000 0000
00051CI  0000 0000
000520I  4080                 762  AS.CRT1    DC     X'4080'

TDX SYSTEM MAIN CONTROL PROGRAM                              PAGE  15   15:44:58  01/27/77

000522I  0006                 763  AS.CRTST   DC     X'6'             MESSAGE DEVICE
000524I  0000 0000            764             DC     Y'0'
000528I  43525431             765             DC     C'CRT1'
00052CI  0000 0000            766             DC     Y'0',Y'0',Y'0',Y'0'
000530I  0000 0000
000534I  0000 0000
000538I  0000 0000
                              767  *
00053CI  4080                 768  AS.MAG1    DC     X'4080'
00053EI  0001                 769  AS.MAG1S   DC     X'0001'
000540I  0000 0000            770             DC     Y'0'
000544I  4D414731             771             DC     C'MAG1'
000548I  0000 0000            772             DC     Y'0',Y'0',Y'0',Y'0'
00054CI  0000 0000
000550I  0000 0000
000554I  0000 0000
000558I  4080                 773  [illegible]  DC   X'4080'
00055AI  0007                 774  [illegible]  DC   X'7'
00055CI  0000 0000            775             DC     Y'0'
000560I  53595331             776             DC     C'SYS1'
000564I  43555341             777             DC     C'CUSADNFL'
         444E464C
00056CI  53595320             778             DC     C'SYS'
000570I  0000 0000            779             DC     Y'0'
                              780  *
000574I  4080                 781  AS.MAG2    DC     X'4080'
000576I  0002                 782  AS.MAG2S   DC     X'0002'
000578I  0000 0000            783             DC     Y'0'
00057CI  4D414732             784             DC     C'MAG2'
000580I  0000 0000            785             DC     Y'0',Y'0',Y'0',Y'0'
000584I  0000 0000
000588I  0000 0000
00058CI  0000 0000
                              786  *
                              787  *
000590I  4098                 788  AS.15      DC     X'4098'
000592I  00                   789  AS.15S     DB     0                STATUS BYTE
000593I  00                   790  AS.15LU    DB     0                LOGICAL UNIT
000594I  0000 0000            791             DC     Y'0'
000598I  0000 0000            792  AS.15VOL   DC     Y'0',Y'0',Y'0',Y'0'
00059CI  0000 0000
0005A0I  0000 0000
0005A4I  0000 0000
0005A8I  4080                 793  AS.TDX     DC     X'4080'
0005AAI  0003                 794  AS.TDXS    DC     X'0003'
0005ACI  0000 0000            795             DC     Y'0'
0005B0I  53595331             796             DC     C'SYS1'
0005B4I  54445849             797             DC     C'TDXIMAGE'
         4D414745
0005BCI  53595320             798             DC     C'SYS '
0005C0I  0000 0000            799             DC     Y'0'
                              800  *
0005C4I  4080                 801  AS.TMPW    DC     X'4080'
0005C6I  0008                 802  AS.TMPWS   DC     X'0008'
0005C8I  0000 0000            803             DC     Y'0'
0005CCI  53595331             804             DC     C'SYS1'

TDX SYSTEM MAIN CONTROL PROGRAM                              PAGE  16   15:45:08  01/27/77

0005D0I  54454D50             805             DC     C'TEMPWORK'
         574F524B
0005D8I  53595320             806             DC     C'SYS'
```

```
0005DCT  0000 0000                   DC     Y'0'
                         *
0005E0T  4080            AS.CALLB    DC     X'4080'
0005E2T  0009            AS.CALLS    DC     X'0009'
0005E4T  0000 0000                   DC     Y'0'
0005E8T  53595331                    DC     C'SYS1'
0005ECT  43414C4C                    DC     C'CALLBACK'
         4241434B
0005F4T  53595320                    DC     C'SYS'
0005F8T  0000 0000                   DC     Y'0'
                         *
0005FCI  5D03 0000       RD.PARM     DC     Y'5D030000'
000600I  0000 7C00                   DC     A(LOADPARM)
000604T  0000 7C36                   DC     A(LOADPARM+54)
000608T  0000 0000                   DC     Y'0',Y'0',Y'0'
00060CT  0000 0000
000610T  0000 0000
                         *
000614I  5D03 0000       RD.SYSTM    DC     Y'5D030000'
000618T  0000 7C00                   DC     A(LOADPARM)
00061CT  0000 0000       SYSEND      DC     Y'0'
000620T  0000 0000                   DC     Y'0',Y'0',Y'0'
000624I  0000 0000
000628I  0000 0000
00062CI  0480            CLOSE       DC     X'0480'            CLOSE MAG TAPE FILE
00062ET  00                          DB     0                  STATUS WORD
00062FT  00              CLOSE.LU    DB     0                  LOGICAL UNIT
000630I  0000 0000                   DC     Y'0'
000634I  4D414720                    DC     C'MAG'
000638I  88              WEOF        DB     X'88'              EOF COMMAND
000639I  00              WEOF.LU     DB     0                  LOGICAL UNIT
00063AI  0000                        DC     X'0'
00063CT  0000 0000                   DCY    0
000640T  C0              REWIND      DB     X'C0'
000641I  00              REWIND.L    DB     0                  LOGICAL UNIT
000642T  0000            REWIND.S    DC     X'0'               STATUS
000644T  0000 0000                   DCY    0
                         *
                         *           MAIN CONTROL LOOP
                         *
         0000 0648I      MAINLOOP    EQU    *
000648I  4810 4000 5F2AI             LH     R1,PROCFLG
00064ET  4210 4000 0680I             BM     WAIT
                         *
                         *           PROCESS ENTRIES ON THE DISC STACK
                         *
000654I  41E0 4000 1110I             BAL    R14,PR.DISC
                         *
                         *           PROCESS ENTRIES ON THE COMMUNICATIONS QUEUE
                         *
00065AI  41E0 4000 1B3EI             BAL    R14,PR.COMMQ
                         *
                         *           CHECK TIMER FUNCTIONS
```

```
                         *
                         *
                         *           CHECK INTERTASK WORK
                         *
000660I  41E0 4000 10F8I             BAL    R14,PR.TASK
000666T  2511                        LCS    R1,1
000668T  4010 4000 5E62I             STH    R1,TIMER.SW        RESET TIMER SWITCH
00066EI  4810 4000 5F48I             LH     R1,WORKCNT         ANY WORK PENDING
000674T  4230 FFD0                   BNZ    MAINLOOP           YES  DO IT
000678I  E1E0 0000                   SVC    14,0               MAKE A FINAL CHECK
00067CT  4300 FFC8                   B      MAINLOOP
000680I  2511            WAIT        LCS    R1,1
000682I  4010 4000 5E62I             STH    R1,TIMER.SW
000688I  4810 4000 5F2AI             LH     R1,PROCFLG
00068EI  4210 FFEE                   BM     WAIT
000692I  4300 FFB2                   B      MAINLOOP
000696I  5800 F982       SVC14.PR    L      R0,SVC14AR
00069AT  4230 4000 06CAI             BNZ    SVC14.2
0006A0I  4810 4000 5F48I             LH     R1,WORKCNT
0006A6T  233B                        BZS    SVC14.1
0006A8T  5000 F970       SVC14.R     ST     R0,SVC14AR         SAVE REG 0
0006ACT  2400                        LIS    R0,0
0006AET  4000 4000 5F1AI             STH    R0,SVC14FG         RESET FLAG
0006B4T  5800 F964                   L      R0,SVC14AR
0006B8T  E190 F9A4                   SVC    9,UDL.OS14
0006BCT  2511            SVC14.1     LCS    R1,1
0006BEI  4010 4000 5F4AI             STH    R1,IDLE            SET SYSTEM TO IDLE
0006C4I  E190 4000 0834I             SVC    9,UDL.IDLE
0006CAT  C500 0001       SVC14.2     CLHI   R0,1               CHECK CALL BACK QUEUE?
0006CET  4230 4000 06EEI             BNE    SVC14.3            NO
0006D4T  41C0 4000 3885T             BAL    R12,CHKCALBK
0006DAT  4300 FFCA                   B      SVC14.R
                         *
0006DET  C500 0002       SVC14.3     CLHI   R0,2               STORE ON DISC QUEUE?
0006E2T  4230 4000 071FT             BNE    SVC14.4            NO
0006E8T  2401                        LIS    R0,1
0006EAT  6100 4000 5F48T             AHM    R0,WORKCNT
0006F0T  2501                        LCS    R0,1
0006F2T  5010 4000 645AT             ST     R1,SVC14.T1
0006F8T  D310 4000 5FEFT             LB     R1,DISCFREE
0006FET  0811                        LR     R1,R1
000700T  2134                        BGZS   SVC14.3A
000702T  D200 4000 5FEFT             STB    R0,DISCFREE
```

```
00070RI  E115 0000                     SVC     1,0(R5)
00070CI  5810 4000 6458I     SVC14.3B  L       R1,SVC14.T1
000712I  4300 FF92                     B       SVC14.R
000716I  6550 4000 5044I     SVC14.3A  ABL     R5,DISCSTK
00071CI  2208                          BS      SVC14.3B
                             *
00071EI  C500 0003           SVC14.4   CLHI    R0,3                   STORE ON TTY QUEUE?
000722I  4230 4000 076CI               BNE     SVC14.5
000728I  2561                          LCS     R6,1
00072AI  0370 4000 5FEAI               LH      R7,TTYFREE
000730I  0877                          LR      R7,R7
000732I  213C                          BNZS    TTYM3
000734I  2470                          LIS     R7,0
```

```
000736I  E115 0000                     SVC     1,0(R5)
00073AI  4230 4000 0754I               BNZ     TTYM4                  RETURN BUFFER.
000740I  D260 4000 5FEAI               STH     R6,TTYFREE
000746I  4300 FF5E                     B       SVC14.R
00074AI  6550 4000 5C44I     TTYM3     ABL     R5,TTYSTK
000750I  4300 FF54                     B       SVC14.R
000754I  D000 4000 5738I     TTYM4     STM     R0,BACKREGS
00075AI  0815                          LR      R1,R5
00075CI  41C0 4000 532EI               BAL     R12,PUT.TTYB
000762I  D100 4000 5738I               LM      R0,BACKREGS
000768I  4300 FF3C                     B       SVC14.R
                             *
00076CI  C500 0004           SVC14.5   CLHI    R0,4                   SEARCH CALL BACK QUEUE FOR ENTRY
000770I  4230 4000 0780I               BNE     SVC14.6
000776I  4100 4000 4EA8I               BAL     R13,CKEXT
00077CI  4300 FF2A                     B       SVC14.R
000780I  C500 0005           SVC14.6   CLHI    R0,5                   STORE ON MAG TAPE QUEUE?
000784I  4230 4000 07C2I               BNE     SVC14.7A
00078AI  4850 4000 5F70I               LH      R5,MAGREWND            MAG TAPE REWIND FLAG
000790I  2337                          BZS     SVC14.6A
000792I  4850 4000 5CC6I               LH      R5,MAGSTK+2            NUMBER OF ENTRIES IN QUEUE
000798I  6150 4000 5F70I               AHM     R5,MAGREWND            ADD TO COUNT
         0000 079EI          SVC14.6A  EQU     *
00079EI  0350 4000 5FECI               LH      R5,MAGFREE
0007A4I  0855                          LR      R5,R5
0007A6I  2336                          BZS     WRTMG.3
0007A8I  6570 4000 5CC4I               ABL     R7,MAGSTK
0007AEI  4300 FFF6                     B       SVC14.R
0007B2I  2551                WRTMG.3   LCS     R5,1
0007B4I  D250 4000 5FECI               STH     R5,MAGFREE
0007BAI  E117 0000                     SVC     1,0(R7)
0007BEI  4300 FFE6                     B       SVC14.R
0007C2I  C500 000A           SVC14.7A  CLHI    R0,N.10
0007C6I  4230 4000 07D6I               BNE     SVC14.7B
0007CCI  41E0 4000 5412I               BAL     R11,SEARCH
0007D2I  4300 FFD2                     B       SVC14.R
0007D6I  C500 000B           SVC14.7B  CLHI    R0,N.11
0007DAI  4230 4000 07EAI               BNE     SVC14.7
0007E0I  41B0 4000 5440I               BAL     R11,RESTORE
0007E6I  4300 FFBE                     B       SVC14.R
0007EAI  C500 0006           SVC14.7   CLHI    R0,6
0007EEI  4230 4000 07FEI               BNE     SVC14.8
0007F4I  41C0 4000 5380I               BAL     R12,GET.TTYB           PICK UP BUFFER
0007FAI  4300 FFAA                     B       SVC14.R
0007FEI  C500 0007           SVC14.8   CLHI    R0,7
000802I  4230 4000 080CI               BNE     SVC14.9
000808I  4300 FF9C                     B       SVC14.R
00080CI  C500 0008           SVC14.9   CLHI    R0,8
000810I  4230 4000 0820I               BNE     SVC14.10
000816I  41C0 4000 3886I               BAL     R12,CALLTIME
00081CI  4300 FF88                     B       SVC14.R
000820I  C500 0009           SVC14.10  CLHI    R0,9                   MAG TAPE CHECK?
000824I  4230 FF80                     BNE     SVC14.R                NO
000828I  4190 4000 09C6I               BAL     R9,MAGCHK
00082EI  4300 FF76                     B       SVC14.R
000834I                                ALIGN   4
```

```
000834I  FE00 4700           HOL.IDLE  DC      Y'0'+$W+$P+$T+$O+$F+$M+$Z+$S+$I+$Q
000838I  0000 083CI                    DC      A(QUETRAP)
                             *
                             *        QUEUE TRAP PROCESSOR
                             *          ENTRY IS FROM OS -ENTRIES ARE PUT ON BOTTOM OF LIST
                             *          CODE BITS ARE 0-7
                             *           'A' - I/O PROCEED COMPLETE FROM SVC 1
                             *           'C' - SVC 15  TERMINATION
                             *          BITS 8-31 HAVE ADDRESS OF SVC BLOCK
                             *
00083CI  D000 4000 56F8I     QUETRAP   STM     R0,QUESAVE             SAVE ALL REGISTERS
000842I  6610 4000 5B80I     QUENEXT   RTL     R1,QUELIST             TAKE OFF ENTRY
000848I  4240 4000 0896I               BO      TRAPRTN                LIST WAS EMPTY,EXIT
00084EI  4820 4000 5B82I               LH      R2,QUELIST+2
000854I  4920 4000 5F26I               CH      R2,BIGQ
00085AI  2114                          BMS     Q.BIG
00085CI  4020 4000 5F26I               STH     R2,BIGQ
         0000 0862I          Q.BIG     EQU     *
000862I  E810 0008                     RLL     R1,8                   PICK UP CODE BITS
000866I  9321                          LBR     R2,R1                  SAVE IT
000868I  1018                          SRLS    R1,8                   RESTORE SVC ADDRESS
```

-continued

```
TDX SYSTEM MAIN CONTROL PROGRAM                          PAGE  19   15:45:41  01/27/77
0008 64I  C520 0001                          CLHI   R2,X'1'
00086 EI  4330 4000 08E0I                    BE     QUE.SVC6          INTERTASK MESSAGE
000874I   C520 000C                          CLHI   R2,X'C'           COMMUNICATIONS?
000878I   4330 4000 0A64I                    BE     QUECOMM           YES
00087EI   C520 000B                          CLHI   R2,X'B'           SVC 1
000882I   4230 4000 0E82I                    BNE    QUE.TIME          LOOK FOR TIMER
000888I   D331 0001                          LB     R3,1(R1)          PICK UP LOGICAL UNIT
00088CI   1132                               SLLS   R3,2              *4 FOR ADDRESS
00088EI   5843 4000 59F4I                    L      R4,LUTABL(R3)     ADDRESS FOR LOGICAL UNIT
000894I   0304                               BR     R4                GO TO IT
                                    *
000896I   4810 4000 5F4AI           TRAPRTN  LH     R1,IDLE
00089CI   4230 4000 08ACI                    BNZ    TRP.2
0008A2I   0160 4000 56F0I           TRP.1    LM     R0,WUFSAVE
0008A8I   E190 F7C4                          SVC    9,UDL.OTSW
0008ACI   4810 4000 5F4AI           TRP.2    LH     R1,WORKCNT
0008B2I   4330 FFEC                          BZ     TRP.1
0008B6I   0711                               XR     R1,R1
0008B8I   4010 4000 5F4AI                    STH    R1,IDLE
0008BEI   E190 4000 5868I                    SVC    9,MAIN.TSW
          0000 08C4I                QUE.CRT  EQU    *
0008C4I   4300 FE7A                          B      QUENEXT
                                    *
          0000 08C8I                QUE.TTY  EQU    *                 TTY-LOGICAL UNIT 0,SKIP STATUS CK
0008C8I   41C0 4000 532EI                    BAL    R12,PUT.TTYB      RETURN BLOCK TO QUEUE
0008CEI   6620 4000 5C44I                    RTL    R2,TTYSTK         ANY MORE I/O'S WAITING
0008D4I   2145                               BES    Q.LUTTY           NO,RESET FREE FLAG
0008D6I   E112 0000                 Q.MSVC   SVC    1,0(R2)           ISSUE NEXT CALL
0008DAI   4300 FE64                          B      QUENEXT           LOOK AT NEXT ENTRY
0008DEI   0722                      Q.LUTTY  XR     R2,R2
0008E0I   D220 4000 5EFAI                    STB    R2,TTYFREE        SET TTY FREE
0008E6I   4020 4000 5F2AI                    STH    R2,PROCFLG
0008ECI   4300 FE52                          B      QUENEXT           LOOK FOR MORE WORK
                                    *
          0000 08F0I                QUE.MAG  EQU    *                 MAG-TAPE LU 1

TDX SYSTEM MAIN CONTROL PROGRAM                          PAGE  20   15:45:52  01/27/77

0008F0I   D341 0002                          LB     R4,2(R1)          PICK UP STATUS BYTE
0008F4I   0844                               LR     R4,R4
0008F6I   4230 4000 0D62I                    BNZ    Q.MAGERR          MAG TAPE ERROR,ISSUE MESSAGE
0008FCI   4040 4000 5F08I                    STH    R4,ERCNT.MG
000902I   5821 0004                          L      R2,4(R1)          STARTING ADDRESS
000906I   6520 4000 5D50I                    ABL    R2,SVC.MAG        RETURN TO QUEUE
00090CI   4840 4000 5F70I                    LH     R4,MAGREWND
000912I   4230 4000 092CI                    BNZ    Q.MAGRW
          0000 0918I                Q.MAG1   EQU    *
000918I   6620 4000 5CC4I                    RTL    R2,MAGSTK         ANY MORE ENTRIES
00091EI   4240 4000 0A22I                    BO     Q.LUMAG           NO,SET DEVICE UNAVAILABLE
000924I   E112 0000                          SVC    1,0(R2)           ISSUE NEXT CALL
000928I   4300 FE16                          B      QUENEXT
          0000 092CI                Q.MAGRW  EQU    *
00092CI   2741                               SIS    R4,1              DECREMENT FILES  LEFT
00092EI   4040 4000 5F70I                    STH    R4,MAGREWND
000934I   4230 FFE0                          BNZ    Q.MAG1
000938I   4300 4000 095EI                    B      Q.MAG4            SKIP THE HEADER
00093EI   0722                      Q.MAG3   XR     R2,R2
000940I   4020 4000 5F70I                    STH    R2,MAGREWND
000946I   4230 FEF8                          BNZ    QUENEXT           NO
00094AI   D320 4000 6001I                    LB     R2,N.MAGLU        SEE IF WE CAN WRITE A HEADER RECORD
000950I   41C0 4000 100AI                    BAL    R12,HEADER        TRY IT
000956I   0833                               LR     R3,R3             ANY ERRORS
000958I   4230 4000 09B6I                    BNZ    Q.MAG5
          0000 095EI                Q.MAG4   EQU    *
00095EI   D320 4000 6000I                    LB     R2,C.MAGLU        CURRENT LOGICAL UNIT
000964I   D220 FCD1                          STB    R2,WEOF.LU
000968I   E110 FCCC                          SVC    1,WEOF            WRITE AN EOF
00096CI   D330 4000 6001I                    LB     R3,N.MAGLU        NEXT MAG TAPE LU
000972I   D230 4000 6000I                    STB    R3,C.MAGLU
000978I   D220 4000 6001I                    STB    R2,N.MAGLU
00097EI   D220 FCA0                          STB    R2,CLOSE.LU
000982I   2541                               LCS    R4,1
000984I   C520 0001                          CLHI   R2,1
000988I   2135                               BNES   Q.MAG2A
00098AI   D240 4000 5FEBI                    STB    R4,M1.ASGN
000990I   2304                               BS     Q.MAG2B
000992I   D240 4000 5FECI           Q.MAG2A  STB    R4,M2.ASGN
          0000 0998I                Q.MAG2B  EQU    *
000998I   E170 FC90                          SVC    7,CLOSE           CLOSE THE TAPE UNIT
00099CI   CA20 0030                          AHI    R2,C'0'
0009A0I   D220 4000 625FI                    STB    R2,MAGLU
0009A6I   E640 4000 624AI                    LA     R4,M.MAGTAP
0009ACI   41C0 4000 4508I           Q.MAG2   BAL    R12,TTYMSG
0009B2I   4300 FF62                          B      Q.MAG1
0009B6I   E640 4000 62B4I           Q.MAG5   LA     R4,M.TPHDER       HEADER ERROR MESSAGE
0009BCI   41C0 4000 4508I                    BAL    R12,TTYMSG
0009C2I   4300 FF52                          B      Q.MAG1
          0000 09C6I                MAGCHK   EQU    *
0009C6I   D330 4000 6001I                    LB     R3,N.MAGLU        NEXT LOGICAL UNIT
0009CCI   D230 FC71                          STB    R3,REWIND.L       SET LOGICAL UNIT
0009D0I   E110 FC6C                          SVC    1,REWIND
0009D4I   D330 FC6A                          LB     R3,REWIND.S       STATUS
0009D8I   0833                               LR     R3,R3
0009DAI   2135                               BNZS   MAG.NODV          DEVICE ERROR

TDX SYSTEM MAIN CONTROL PROGRAM                          PAGE  21   15:46:04  01/27/77

0009DCI   4020 4000 5E5EI                    STH    R2,GOODMAG
0009E2I   0309                               BR     R9                EXIT
```

```
TDX SYSTEM MAIN CONTROL PROGRAM                                   PAGE  21   15:46:04  01/27/77
```

-continued

```
0009E4I  4820 4000 5E5EI   1081  MAG.NODV LH    R2,GOODMAG
0009EAI  0239              1082           BNZR  R9               ERROR ALREADY PRINTED
0009ECI  4030 4000 5E5EI   1083           STH   R3,GOODMAG
0009F2I  D330 4000 6001I   1084           LB    R3,M.MAGLU
0009F8I  CA30 6001I        1085           AHI   R3,M.MAGLU
0009FCI  CA30 0030         1086           AHI   R3,C'0'
000A00I  D230 4000 6314I   1087           STB   R3,L.MAGLU
000A06I  5090 4000 5884I   1088           ST    R9,MAGT1
000A0CI  E640 4000 62F8I   1089           LA    R4,M.NOMAG       ADDRESS OF MESSAGE
000A12I  41C0 4000 45D8I   1090           BAL   R12,TTYMSG
000A18I  5890 4000 5884I   1091           L     R9,MAGT1
000A1EI  2531              1092           LCS   R3,1
000A20I  0309              1093           BR    R9               EXIT
000A22I  0722              1094  Q.LUMAG  XR    R2,R2
000A24I  D220 4000 5FEDI   1095           STB   R2,MAGFREE       SET MAG-TAPE UNIT FREE
000A2AI  4300 FF14         1096           B     QUENEXT          LOOK FOR NEXT ENTRY
         0000 0A2EI        1097  QUE.DISC EQU   *                DISC UNITS
000A2EI  2421              1098           LIS   R2,1
000A30I  5120 4000 5890I   1099           AM    R2,NBR.DISC
000A36I  D341 0002         1100           LB    R4,2(R1)         PICK UP STATUS
000A3AI  0844              1101           LR    R4,R4
000A3CI  4230 4000 0D00I   1102           BNZ   D.DISCER         DISC ERROR,WRITE IT OUT
000A42I  6510 4000 5CD8I   1103  QUE.DIS2 ABL   R1,DISCLIST      STORE ON WORK LIST
000A48I  6620 4000 5D44I   1104  QUE.DIS1 RTL   R2,DISCSTK       REMOVE FROM STACK
000A4EI  2145              1105           BNS   Q.LUDISC         NO MORE ENTRIES
000A50I  E112 0000         1106           SVC   1,0(R2)          ISSUE NEXT CALL
000A54I  4300 FDEA         1107           B     QUENEXT          LOOK FOR NEXT ENTRY
000A58I  0722              1108  Q.LUDISC XR    R2,R2
000A5AI  D220 4000 5FEEI   1109           STB   R2,DISCFREE      SET DISC FREE
000A60I  4300 FDDE         1110           B     QUENEXT          LOOK FOR MOR  WORK
                           1111  *
         0000 0A64I        1112  QUECOMM  EQU   *
000A64I  D321 0001         1113           LB    R2,1(R1)
000A68I  1122              1114           SLLS  R2,2
000A6AI  E650 4000 7C00    1115           LA    R5,LOADPARM
000A70I  5875 0004         1116           L     R7,ADR.PORT(R5)
000A74I  5832 4700 0000    1117           L     R3,0(R2,R7)
000A7AI  4841 0002         1118           LH    R4,2(R1)         PICK UP ERROR HALF WORD
000A7EI  C440 F000         1119           NHI   R4,X'F000'       PARITY ERRORS
000A82I  4230 4000 0BECI   1120           BNZ   QUE.RSND         YES
000A88I  D343 0020         1121           LB    R4,SYS.FG(R3)
000A8CI  C540 0002         1122           CLHI  R4,2
000A90I  4230 4000 0AD0I   1123           BNE   Q.COM1
000A96I  4840 4000 5EF4I   1124           LH    R4,LOSTLINE      RESET COUNTER BACK BY 1
000A9CI  2741              1125           SIS   R4,1
000A9EI  2312              1126           BNMS  Q.LINEOK
000AA0I  2440              1127           LIS   R4,0
000AA2I  4040 4000 5EF4I   1128  Q.LINEOK STH   R4,LOSTLINE
000AA8I  D341 0001         1129           LB    R4,1(R1)
000AACI  41C0 4000 0D42I   1130           BAL   R12,DIVIDE
000AB2I  D240 4000 6213I   1131           STB   R4,LNB.2
000AB8I  D250 4000 6212I   1132           STB   R5,LNB.1
000ABEI  2541              1133           LCS   R4,1
000AC0I  D243 0020         1134           STB   R4,SYS.FG(R3)
```

```
TDX SYSTEM MAIN CONTROL PROGRAM                                   PAGE  22   15:46:15  01/27/77

000AC4I  E640 4000 620AI   1135           LA    R4,M.COMBAK
000ACAI  41C0 4000 45D8I   1136           BAL   R12,TTYMSG
         0000 0AD0I        1137  Q.COM1   EQU   *
000AD0I  D343 007F         1138           LB    R4,BACKUP(R3)    LINEBACKER MODE
000AD4I  0844              1139           LR    R4,R4            IF ZERO,NO
000AD6I  4330 4000 0BCEI   1140           BZ    Q.COM2D          NORMAL MESSAGE QUEUE IT
000ADCI  C540 0070         1141           CLHI  R4,X'70'
000AE0I  4330 4000 0BCEI   1142           BE    Q.COM2D
000AE6I  C540 0007         1143           CLHI  R4,X'7'
000AEAI  4330 4000 0BCEI   1144           BE    Q.COM2D
000AF0I  E650 4000 7C00    1145           LA    R5,LOADPARM
000AF6I  5875 0004         1146           L     R7,ADR.PORT(R5)  ADDRESS OF LINE PORT TABLE
000AFAI  C540 000F         1147           CLHI  R4,X'F'          REGULAR LINE COMMING BACK?
000AFEI  4230 4000 0B24I   1148           BNE   Q.BCK1           NO
                           1149  *
                           1150  *  LOOKS LINE REGULAR LINE IS COMING BACK UP
                           1151  *
000B04I  D343 007F         1152           LB    R4,XBACKUP(R3)   LINEBACKER LINE NUMBER
000B08I  1142              1153           SLLS  R4,2
000B0AI  5884 4700 0000    1154           L     R8,0(R4,R7)      DUMMY CUSTOMER DATA BASE
000B10I  C840 0030         1155           LHI   R4,X'30'
000B14I  D248 007E         1156           STB   R4,BACKUP(R8)    SET UP LINE TO HANG UP
000B18I  2447              1157           LIS   R4,7
000B1AI  D243 007F         1158           STB   R4,BACKUP(R3)    SET UP REGULAR LINE TO EXPECT RESTART
000B1EI  4300 4000 0BCEI   1159           B     Q.COM2D
         0000 0B24I        1160  Q.BCK1   EQU   *
000B24I  C540 00FF         1161           CLHI  R4,X'FF'         LINEBACKER ANSWERED THE PHONE?
000B28I  4230 4000 0B52I   1162           BNE   Q.BCK2           NO
000B2EI  C840 00F0         1163           LHI   R4,X'F0'         SET UP LINE TO EXPECT A RESTART
000B32I  D243 007F         1164           STB   R4,BACKUP(R3)
000B36I  5841 0010         1165           L     R4,16(R1)        RESET ORIGINAL DCW  BACK
000B3AI  5041 0004         1166           ST    R4,4(R1)
000B3EI  0871              1167           LR    R7,R1
000B40I  41C0 FAFC         1168           BAL   R12,SETBUF       SET UP FOR RESTART
000B44I  2571              1169           LCS   R7,1
000B46I  D273 0020         1170           STB   R7,SYS.FG(R3)
000B4AI  E1F1 0000         1171  Q.BCK1A  SVC   15,0(R1)         REISSUE COMMAND
000B4EI  4300 FCF0         1172           B     QUENEXT
                           1173  *
         0000 0B52I        1174  Q.BCK2   EQU   *
000B52I  C540 00F0         1175           CLHI  R4,X'F0'         MAYBE AN RE
```

-continued

```
TDX SYSTEM MAIN CONTROL PROGRAM                               PAGE  22   15:46:15  01/27/77

000B56I  4330 4000 0BCEI              BE     Q.COM2D          QUEUE IT AND CHECK
000B5CI  C540 0030                    CLHI   R4,X'30'         DO WE NEED TO DISCONNECT
000B60I  4230 4000 0B9AI              BNE    Q.BCK3           NO
         0000 0B66I         Q.BCK2A   EQU    *
000B66I  41C0 4000 0B70I              BAL    R12,HANGITUP     SET UP HANGUP COMMAND
000B6CI  4300 FFDA                    B      Q.BCK1A
         0000 0B70I         HANGITUP  EQU    *
000B70I  5841 0004                    L      R4,4(R1)         TRANSFER DCW BACK
000B74I  5041 0010                    ST     R4,16(R1)        TO TEMP AREA FOR DISCONNECT
000B78I  F840 0000 0019               LI     R4,HANGUP
000B7EI  4041 0024                    STH    R4,36(R1)
000B82I  E641 0024                    LA     R4,36(R1)
000B86I  5041 0004                    ST     R4,4(R1)         NEW DCW ADDRESS
000B8AI  2441                         LIS    R4,1
000B8CI  D241 0004                    STB    R4,4(R1)         NUMBER OF COMMANDS

TDX SYSTEM MAIN CONTROL PROGRAM                               PAGE  23   15:46:27  01/27/77

000B90I  C840 0010                    LHI    R4,X'10'         SET STATE TO DISCONNECT
000B94I  D243 007E                    STB    R4,BACKUP(R3)
000B98I  030C                         BR     R12
                            *
         0000 0B9AI         Q.BCK3    EQU    *
000B9AI  2541                         LCS    R4,1
000B9CI  D243 007E                    STB    R4,BACKUP(R3)    SET BACKUP LINE FREE AGAIN,HANGUP RECEI
000BA0I  E641 001C                    LA     R4,28(R1)
000BA4I  5041 0004                    ST     R4,4(R1)         SET UP ORIGINAL BUFFER POSIOTNS AGAIN
000BA8I  2443                         LIS    R4,3
000BAAI  D241 0004                    STB    R4,4(R1)
000BAEI  E641 0024                    LA     R4,36(R1)
000BB2I  5041 000C                    ST     R4,12(R1)
000BB6I  E641 0022                    LA     R4,34(R1)
000BBAI  FA40 0100 0000               AI     R4,Y'01000000'
000BC0I  5041 0014                    ST     R4,20(R1)
000BC4I  0871                         LR     R7,R1
000BC6I  41C0 FA54          Q.BCK3B   BAL    R12,SETLBCKR     SET CALL FOR LINEBACKER
000BCAI  4300 FF7C                    B      Q.BCK1A
         0000 0BCEI         Q.COM2D   EQU    *
000BCEI  6510 4000 5DC4I              ABL    R1,COMMLIST
         0000 0BD4I         QUE       EQU    *
000BD4I  2411                         LIS    R1,1
000BD6I  6110 4000 5E4AI              AHM    R1,WORKCNT
000BDCI  4300 FC62                    B      QUENEXT
000BE0I  6510 4000 5E2CI    QUE.SVC6  ABL    R1,SVC6LIST
000BE6I  4240 FC58                    BO     QUENEXT          IF LIST IS FULL,DROP ENTRY
000BEAI  2208                         BS     QUE
                            *
         0000 0BECI         QUE.RSNP  EQU    *                NAK THE MESSAGE
000BECI  5873 0010                    L      R7,ADR.SVC(R3)   ADDRESS OF SVC BLOCK
000BF0I  D321 0003                    LB     R2,3(R1)         STATUS BYTE
000BF4I  C520 000A                    CLHI   R2,10            LOSS OF CARRIER?
000BF8I  4330 4000 0C8AI              BE     Q.LLOST
000BFEI  C520 000C                    CLHI   R2,12
000C02I  4330 4000 0C8AI              BE     Q.LLOST          DATA SET READY LOST
000C08I  C520 000B                    CLHI   R2,11            LOSS ON WRITE?
000C0CI  4330 4000 0C8AI              BE     Q.LLOST          YES
000C12I  272F                         SIS    R2,15            DO WE TURN ON THE ALARM?   NO, LOST
000C14I  4210 4000 381AI              BM     NO
         0000 0C1AI         L.LOST    EQU    *
000C1AI  D343 0020                    LB     R4,SYS.FG(R3)    FIRST TIME?
000C1EI  C540 00FF                    CLHI   R4,X'FF'         RESTART RECEIVED?
000C22I  4330 4000 0CD0I              BE     Q.COM2J          NO
000C28I  C540 0000                    CLHI   R4,0
000C2CI  4230 4000 0C56I              BNE    NO.LOST          NO, DON'T TURN ON ALARM AGAIN
000C32I  D341 0001                    LB     R4,1(R1)         PORT NUMBER
000C36I  4540 4000 5EF8I              CLH    R4,TESTL1        TEST LINE?
000C3CI  4330 4000 0C56I              BE     NO.LOST          YES, IGNORE ALARM
000C42I  4540 4000 5EFAI              CLH    R4,TESTL2        OTHER TEST LINE?
000C48I  4330 4000 0C56I              BE     NO.LOST          YES
000C4EI  2441                         LIS    R4,1             SET ALARM SWITCH
000C50I  6140 4000 5EF4I              AHM    R4,LOSTLINE
         0000 0C56I         NO.LOST   EQU    *
000C56I  2452                         LIS    R5,2             SET UP NUMBER OF COMMANDS
000C58I  D257 0004                    STB    R5,4(R7)

TDX SYSTEM MAIN CONTROL PROGRAM                               PAGE  24   15:46:39  01/27/77

000C5CI  D343 0020                    LB     R4,SYS.FG(R3)
000C60I  C540 000F                    CLHI   R4,X'F'          IN A RESTART MODE?
000C64I  4330 4000 0CDAI              BE     Q.COM2C          YES
000C6AI  C540 0000                    CLHI   R4,0
000C6EI  4230 4000 0CDEI              BNE    Q.COM2
000C74I  D351 0003                    LB     R5,3(R1)
000C78I  C550 0008                    CLHI   R5,8             FRAMING ERROR
000C7CI  233C                         BES    Q.COM2A          YES
000C7EI  C550 0009                    CLHI   R5,9
000C82I  2339                         BES    Q.COM2A          REVERSE CHANNEL,YES
000C84I  C550 000E                    CLHI   R5,14            OVERFLOW
000C88I  2336                         BES    Q.COM2A
000C8AI  C550 0005                    CLHI   R5,5             DATA CHECK?
000C8EI  4230 4000 0CDAI              BNE    Q.COM2C          NO
000C94I  E640 4000 647CI    Q.COM2A   LA     R4,M.NAK         JUST NAK THE MESSAGE
000C9AI  0851                         LR     R5,R1
000C9CI  CA50 0024                    AHI    R5,H'36'         RESET ADDRESS
000CA0I  5051 000C                    ST     R5,12(R1)
000CA4I  0851                         LR     R5,R1            SET UP SVC BLOCK
000CA6I  D301 0003                    LB     R0,3(R1)
000CAAI  41F0 4000 4EE2I              BAL    R15,SVC15A       SEND IT OUT
```

TDX SYSTEM MAIN CONTROL PROGRAM PAGE 24 15:46:39 01/27/77

-continued

```
000CB0I  0840                            LR    R4,R0
000CB2I  4300 4000 0CF0I                 B     Q.COM2B             DON'T RESET LINE STATE
         0000 0CB8I         Q.LLOST      EQU   *
000CB8I  D343 007F                       LB    R4,BACKUP(R3)       LINEBACKER FLAG-G
000CBCI  0844                            LR    R4,R4
000CBEI  4330 FF5A                       BZ    L.LOST              NOT IN LINEBACKER MODE
000CC2I  C440 00F0                       NHI   R4,X'F0'
000CC6I  4330 FF50                       BZ    L.LOST
000CCAI  4300 4000 0CECI                 B     Q.LLOST1
000CD0I  E1F1 0000          Q.COM2J      SVC   15,0(R1)            RESEND MESSAGE
000CD4I  4300 4000 0CDEI                 B     Q.COM2
000CDAI  41C0 F762          Q.COM2C      BAL   R12,SETBUF
000CDEI  2451               Q.COM2       LIS   R5,1
000CE0I  D253 0020                       STB   R5,SYS.FG(R3)
000CE4I  C540 0002                       CLHI  R4,2
000CE8I  4330 FA56                       BE    QUENEXT
         0000 0CECI         Q.LLOST1     EQU   *
000CECI  D341 0003                       LB    R4,3(R1)
         0000 0CF0I         Q.COM2B      EQU   *
000CF0I  41C0 4000 0D42I                 BAL   R12,DIVIDE
000CF6I  D250 4000 61FCI                 STB   R5,ER.1
000CFCI  D240 4000 61FDI                 STB   R4,ER.2
000D02I  D341 0001                       LB    R4,1(R1)
000D06I  41C0 4000 0D42I                 BAL   R12,DIVIDE
000D0CI  D250 4000 6206I                 STB   R5,LN.1
000D12I  D240 4000 6207I                 STB   R4,LN.2
000D18I  E640 4000 61FCI                 LA    R4,M.COMER
000D1EI  41C0 4000 450AI                 BAL   R12,TTYMSG
000D24I  D343 007F                       LB    R4,BACKUP(R3)
000D28I  0844                            LR    R4,R4
000D2AI  4330 FB14                       BZ    QUENEXT
000D2EI  C540 0010                       CLHI  R4,X'10'
000D32I  4330 FE64                       BE    Q.BCK3
000D36I  C440 00F0                       NHI   R4,X'F0'
000D3AI  4230 FF2A                       BNZ   Q.BCK2A
```

TDX SYSTEM MAIN CONTROL PROGRAM PAGE 25 15:46:53 01/27/77

```
000D3EI  4300 FB00                       B     QUENEXT
000D42I  4D40 4000 5F6CI    DIVIDE       DH    R4,D.10
000D48I  CA50 0030                       AHI   R5,C'0'
000D4CI  CA40 0030                       AHI   R4,C'0'
000D50I  030C                            BR    R12
                            *
                            *                  ERRORS
                            *
         0000 0D52I         SYSER1       EQU   *
000D52I  E640 4000 6078I                 LA    R4,M.SYSER
000D58I  41C0 4000 450AI    SYS.1        BAL   R12,TTYMSG
000D5EI  4300 FAE0                       B     QUENEXT
         0000 0D62I         Q.MAGERR     EQU   *
000D62I  4820 4000 5EF4I                 LH    R2,LOSTLINE
000D68I  2621                            AIS   R2,1
000D6AI  4020 4000 5EF4I                 STH   R2,LOSTLINE
000D70I  4820 4000 5F08I                 LH    R2,ERCNT.MG         NUMBER OF TAPE ERRORS
000D76I  2621                            AIS   R2,1
000D78I  4020 4000 5F08I                 STH   R2,ERCNT.MG
000D7EI  C520 0004                       CLHI  R2,4
000D82I  4330 4000 0DAEI                 BE    Q.MAG7
000D88I  6410 4000 5CC4I                 ATL   R1,MAGSTK
000D8EI  D320 4000 6000I                 LB    R2,C.MAGLU
000D94I  CA20 0030                       AHI   R2,C'0'
000D98I  D220 4000 61E8I                 STB   R2,M.MAGLU
000D9EI  E640 4000 61CFI                 LA    R4,M.MAGER
000DA4I  41C0 4000 450AI                 BAL   R12,TTYMSG
000DAAI  4300 FB90                       B     Q.MAG3
         0000 0DAEI         Q.MAG7       EQU   *
000DAEI  2420                            LIS   R2,0
000DB0I  4020 4000 5F08I                 STH   R2,ERCNT.MG
000DB6I  5821 0004                       L     R2,4(R1)            RETURN BUFFER TO FREE POOL
000DBAI  6520 4000 5DB0I                 ABL   R2,SVC.MAG
000DC0I  E640 4000 62C0I                 LA    R4,M.LOSTBF
000DC6I  41C0 4000 450AI                 BAL   R12,TTYMSG
000DCCI  4300 FB48                       B     Q.MAG1
         0000 0DD0I         Q.DISCEP     EQU   *
                            *
                            *    SET UP DISC ERROR MESSAGE
                            *
000DD0I  D341 0001                       LB    R4,1(R1)
000DD4I  41C0 FF6A                       BAL   R12,DIVIDE          LOGICAL UNIT
000DD8I  D240 4000 60B1I                 STB   R4,M.DERL2
000DDEI  D250 4000 60B0I                 STB   R5,M.DERL1
000DE4I  D341 0002                       LB    R4,2(R1)            ERROR CODE
000DE8I  41C0 FF56                       BAL   R12,DIVIDE
000DECI  D240 4000 60A4I                 STB   R4,D.ERCD2
000DF2I  D250 4000 60A3I                 STB   R5,D.ERCD1
000DF8I  4841 0014                       LH    R4,20(R1)           PORT NUMBER
000DFCI  41C0 FF42                       BAL   R12,DIVIDE
000E00I  D240 4000 6089I                 STB   R4,M.DERLN2
000E06I  D250 4000 6088I                 STB   R5,M.DERLN1
000E0CI  E660 4000 60A6I                 LA    R6,M.DISER+16
000E12I  5851 000C                       L     R5,12(R1)           SECTOR NUMBER
000E16I  41C0 4000 14A2I                 BAL   R12,CONVTM          FAKE IT LIKE TIME
000E1CI  D341 0000                       LB    R4,0(R1)            FUNCTION CODE
```

TDX SYSTEM MAIN CONTROL PROGRAM PAGE 26 15:47:04 01/27/77

```
000E20I  41C0 FF1F                       BAL   R12,DIVIDE
000E24I  D240 4000 60ABI                 STB   R4,M.DERF2
000E2AI  D250 4000 60AAI                 STB   R5,M.DERF1
```

-continued

```
000E30I  0321 0001          1362              LR     R2,1(R1)            PICK UP LOGICAL UNIT
000E34I  0331 0000          1363              LR     R3,0(R1)            FUNCTION CODE
000E38I  C520 0007          1364              CLHI   R2,7                ADN FILE?
000E3CI  4330 4000 0EA2I    1365              BE     D.ADNER             YES
000E42I  C520 0008          1366              CLHI   R2,8
000E46I  4330 4000 0E78I    1367              BE     D.WRKER             WORK FILE
                            1368   *
                            1369   *    CALL BACK FILE
                            1370   *
000E4CI  C430 0040          1371              NHI    R3,X'40'            READ OR WRITE
000E50I  4230 FREE          1372              BNZ    QUE.DIS2            READ,DROP THE ENTRY
000E54I  41D0 4000 51E6I    1373              BAL    R13,GETCAMP         PICK UP ANOTHER FILE ADDRESS,**** CONTE
000E5AI  0899               1374              LR     R9,R9
000E5CI  4210 F2FE          1375              BM     EREXIT              NOTHING LEFT
000E60I  E640 4000 6096I    1376   D.DISCB    LA     R4,M.DISER          ERROR MESSAGE
000E66I  5091 000C          1377              ST     R9,12(R1)           NEW DISC ADDRESS
000E6AI  E111 0000          1378              SVC    1,0(R1)             TRY AGAIN
000E6EI  41C0 4000 450BI    1379              BAL    R12,TTYMSG          PRINT ERROR
000E74I  4300 F9CA          1380              B      QUENEXT
                            1381   *
                            1382   *  WORK FILE
                            1383   *
000E78I  E650 4000 7C00     1384   D.WRKER    LA     R5,LOADPARM
000E7EI  4895 0022          1385              LH     R9,TDIS.END(R5)     LAST ADDRESS ALLOCATED
000E82I  2691               1386              AIS    R9,1
000E84I  4095 0022          1387              STH    R9,TDIS.END(R5)     SAVE UPDATED SECTOR ADDRESS
000E88I  2521               1388              LCS    R2,1
000E8AI  5125 0024          1389              AM     R2,TDIS.EXT(R5)     ANY MORE LEFT?
000E8EI  4330 F2CC          1390              BZ     EREXIT              NO,QUIT
000E92I  5841 0018          1391              L      R4,24(R1)           LINE TABLE ADDRESS
000E96I  4094 000A          1392              STH    R9,DISC.ADR(R4)     SAVE NEW SECTOR
000E9AI  C430 0040          1393              NHI    R3,X'40'            READ OR WRITE
000E9EI  4330 FF8E          1394              BZ     D.DISCB
                            1395   *
000EA2I  E640 4000 6096I    1396   D.ADNER    LA     R4,M.DISER
000EA8I  41C0 4000 450BI    1397              BAL    R12,TTYMSG
000EAEI  4300 FB90          1398              B      QUE.DIS2
         0000 0EB2I         1399   QUE.TIME   EQU    *
000EB2I  C520 0009          1400              CLHI   R2,X'9'             TIMER?
000EB6I  4230 FF9A          1401              BNE    SYSER1              NO,SYSTEM ERROR
000EBAI  4820 4000 5EF4I    1402              LH     R2,LOSTLINE         ANY ERRORS
000EC0I  4320 4000 0EDCI    1403              BNP    TIME.ON             NO,SEND OUT TIMER MESSAGE
000EC6I  4820 4000 5F12I    1404              LH     R2,BLEEPCNT         LOOK AT BLEEP COUNT,IF > 0,DISABLE TIME
000ECCI  2721               1405              SIS    R2,1
000ECEI  4310 4000 0EE2I    1406              BNM    TIME.OFF
000ED4I  C520 FFFD          1407              CLHI   R2,-3
000ED8I  2132               1408              BNES   TIME.ON
000EDAI  2423               1409              LIS    R2,3
000EDCI  E110 4000 0FF4I    1410   TIME.ON    SVC    1,CRT.CB
000EE2I  4020 4000 5F12I    1411   TIME.OFF   STH    R2,BLEEPCNT
                            1412   *    LOOP THRU CALL BACK QUEUES AND DECREMENT TIMES
                            1413   *
000EE8I  2521               1414              LCS    R2,1
```

```
000EEAI  4020 4000 5E60I    1415              STH    R2,TIMER.MC         SET FLAG FOR TIMER BEING PROCESSED COND
000EF0I  58F0 4000 5954I    1416              L      R15,COUNTS
000EF6I  27F1               1417              SIS    R15,1
000EF8I  50F0 4000 5954I    1418              ST     R15,COUNTS          SAVE UPDATED VALUE
000EFEI  E640 4000 7C00     1419              LA     R4,LOADPARM         LOAD PARM ADDRESS
000F04I  5834 0004          1420              L      R3,ADR.PORT(R4)     ADDRESS OF PORT TABLES
000F08I  4824 002C          1421              LH     R2,NUMBR.PT(R4)     NUMBER OF PORTS
000F0CI  272A               1422              SIS    R2,10
000F0EI  5853 0028          1423   Q.TIMF0    L      R5,40(R3)           CUSTOMER DATA  BASE
000F12I  4330 4000 0F56I    1424              BZ     Q.TIMF1             NO  ONE  THERE
000F18I  08FF               1425              LR     R15,R15
000F1AI  4230 4000 0F3EI    1426              BNZ    Q.T1
000F20I  5865 0014          1427              L      R6,ADR.CMP1(R5)
000F24I  41C0 4000 0FC8I    1428              BAL    R12,TIMF.UPD
000F2AI  5865 0018          1429              L      R6,ADR.CMP2(R5)
000F2EI  41C0 4000 0FC8I    1430              BAL    R12,TIMF.UPD        UPDATE  TIMES
000F34I  5865 006A          1431              L      R6,ADR.CMP3(R5)     EXPEDITED QUEUE
000F38I  41C0 4000 0FC8I    1432              BAL    R12,TIMF.UPD
         0000 0F3EI         1433   Q.T1       EQU    *
000F3EI  0365 0020          1434              LB     R6,SYS.FG(R5)
000F42I  C560 0001          1435              CLHI   R6,1
000F46I  213B               1436              BNES   Q.TIMF1
000F48I  2462               1437              LIS    R6,2
000F4AI  0265 0020          1438              STB    R6,SYS.FG(R5)
000F4EI  5865 001C          1439              L      R6,ADR.SVC(R5)
000F52I  E1F6 0000          1440              SVC    15,0(R6)
000F56I  2634               1441   Q.TIMF1    AIS    R3,4
000F58I  2721               1442              SIS    R2,1
000F5AI  4230 FEB0          1443              BNZ    Q.TIMF0
000F5EI  08FF               1444              LR     R15,R15
000F60I  2137               1445              BNZS   Q.T2
000F62I  59F0 4000 5950I    1446              L      R15,CNT.INT
000F68I  50F0 4000 5954I    1447              ST     R15,COUNTS
         0000 0F6EI         1448   Q.T2       EQU    *
000F6EI  E120 4000 56F4I    1449              SVC    2,TIMEFUNC          RESTART TIMER
000F74I  2420               1450              LIS    R2,0
000F76I  4020 4000 5E60I    1451              STH    R2,TIMER.MC         SET FLAG FOR TIMER ACTIVATED AGAIN,WAITRRUPT
000F7CI  4820 4000 5E4AI    1452              LH     R2,IDLE
000F82I  4210 4000 0FBAI    1453              BM     Q.T3
000F88I  4820 4000 5E62I    1454              LH     R2,TIMER.SW
000F8EI  2621               1455              AIS    R2,1
000F90I  4020 4000 5E62I    1456              STH    R2,TIMER.SW
```

```
TDX SYSTEM MAIN CONTROL PROGRAM                                   PAGE  27   15:47:19  01/27/77
-continued
000F96I  4520 4000 5F68I     1457              CLH    R2.LOOP
000F9CI  4230 4000 0FBAI     1458              BNE    Q.T3
000FA2I  E640 4000 60C8I     1459              LA     R4.MSG.LOOP              LOOP MESSAGE
000FA8I  41C0 4000 45D8I     1460              BAL    R12.TTYMSG               PRINT IT OUT
000FAEI  0722                1461              XR     R2.R2
000FB0I  4020 4000 5E62I     1462              STH    R2.TIMER.SW
000FB6I  4300 F388           1463              B      QUENEXT
000FBAI  4820 4000 5E5EI     1464  Q.T3        LH     R2.GOODMAG
000FC0I  4330 FA7E           1465              BZ     QUENEXT
000FC4I  4300 F976           1466              B      Q.MAG3
                             1467  *
                             1468  *   UPDATE  QUEUE  TIMES
                             1469  *
         0000 0FC8I          1470  TIME.UPD EQU    *

TDX SYSTEM MAIN CONTROL PROGRAM                                   PAGE  28   15:47:32  01/27/77

000FC8I  6676 0000           1471              RTL    R7.0(R6)
000FCCI  024C                1472              BOR    R12                      NO ONE THERE
000FCEI  0887                1473              LR     R8.R7
000FD0I  F480 0000 00FF      1474              NI     R8.TIME.MSK
000FD6I  4330 4000 0FE4I     1475              BZ     TIME.U2
000FDCI  2771                1476              SIS    R7.1
000FDEI  6476 0000           1477  TIME.U1     ATL    R7.0(R6)
000FE2I  030C                1478              BR     R12
         0000 0FE4I          1479  TIME.U2     EQU    *
000FE4I  6686 0000           1480              RTL    R8.0(R6)
000FE8I  F680 0008 0000      1481              OI     R8.Y'80000'              MAKE SURE IT CAN USE LD LINES
000FEEI  6486 0000           1482              ATL    R8.0(R6)                 PUT IT BACK
000FF2I  220A                1483              BS     TIME.U1
000FF4I                      1484              ALIGN  4
000FF4I  2205 0000           1485  CRT.CB      DC     Y'22050000'              ACTIVATE TIMER
000FF8I  0000 1008I          1486              DC     A(CRT.C1)
000FFCI  0000 1009I          1487              DC     A(CRT.C1+1)
001000I  0000 0000           1488              DC     Y'0'.Y'0'
001004I  0000 0000
001008I  4F4B                1489  CRT.C1      DC     C'OK'
                             1490  *
                             1491  *  WRITE OUT MAG TAPE HEADER RECORD
                             1492  *
         0000 100AI          1493  HEADER      EQU    *
00100AI  D220 F633           1494              STB    R2.REWIND.L
00100EI  D220 4000 1071I     1495              STB    R2.WRITE1.L
001014I  D220 4000 1085I     1496              STB    R2.READ1.L               STORE LOGICAL UNIT NUMBER
00101AI  E110 F622           1497              SVC    1.REWIND                 REWIND THE UNIT
00101EI  E120 4000 1060I     1498              SVC    2.HDRTIME                PICK UP CURRENT TIME AND DATE
001024I  E120 4000 1068I     1499              SVC    2.HDRDATE
00102AI  E110 4000 1070I     1500              SVC    1.WRITE1                 WRITE OUT HEADER
001030I  D330 4000 1072I     1501              LB     R3.WRITE1.S              PICK UP STATUS
001036I  0833                1502              LR     R3.R3
001038I  023C                1503              BNZR   R12                      IF NOT ZERO.ERROR
00103AI  E110 F602           1504              SVC    1.REWIND                 PUT BACK TO LOAD POINT
00103EI  E110 4000 1084I     1505              SVC    1.READ1                  READ IT BACK
001044I  D330 4000 1086I     1506              LB     R3.READ1.S               PICK UP STATUS
00104AI  0833                1507              LR     R3.R3
00104CI  033C                1508              BZR    R12                      IF NO ERRORS.EXIT
00104EI  CA20 0030           1509              AHI    R2.C'0'
001052I  D220 4000 6554I     1510              STB    R2.LOGMAGL               SAVE UNIT NUMBER FOR MESSAGE
001058I  E120 4000 6584I     1511              SVC    2.LOGMAG                 LOG ERROR ON CONSOLE
00105EI  030C                1512              BR     R12                      EXIT
001060I                      1513              ALIGN  4
001060I  0008                1514  HDRTIME     DB     0.8
001064I  0000 10BCI          1515              DCF    A(HDRTIMEB)
001068I                      1516              ALIGN  4
001068I  0009                1517  HDRDATE     DB     0.9
00106CI  0000 10B0I          1518              DCF    A(HDRDATEB)
001070I                      1519              ALIGN  4
001070I  39                  1520  WRITE1      DB     X'39'                    IO WRITE WITH WAIT
001071I  00                  1521  WRITE1.L    DB     0                        LOGICAL UNIT
001072I  0000                1522  WRITE1.S    DC     H'0'                     STATUS
001074I  0000 1098I          1523              DC     A(HDRBUFFER)             BUFFER ADDRESS
001078I  0000 10C5I          1524              DC     A(HDRBUFFER+45)          ENDING ADDRESS
00107CI  0000 0000           1525              DCY    0

TDX SYSTEM MAIN CONTROL PROGRAM                                   PAGE  29   15:47:44  01/27/77

001080I  0000 0000           1526              DCY    0
001084I  59                  1527  READ1       DB     X'59'                    READ WITH WAIT
001085I  00                  1528  READ1.L     DB     0
001086I  0000                1529  READ1.S     DCX    0
001088I  0000 10CAI          1530              DC     A(HDRCOPY)
00108CI  0000 10F5I          1531              DC     A(HDRCOPY+45)            ENDING ADDRESS
001090I  0000 0000           1532              DCY    0.0
001094I  0000 0000
001098I                      1533              ALIGN  4
001098I  0054                1534  HDRBUFFER   DC     X'0054'
00109AI  44582C41            1535              DC     C'DX ACCOUNTING RECORDS '
         43434F55
         4E54494E
         47205245
         434F5244
         5320
0010B0I  30303030            1536  HDRDATEB    DC     C'00000000    '
         30303030
         20202020
0010BCI  30303030            1537  HDRTIMEB    DC     C'00000000'
         30303030
```

-continued

```
TDX SYSTEM MAIN CONTROL PROGRAM                      PAGE  29    15:47:44  01/27/77

0010C4I  0000 0000              DCY    0
0010C8I  0000 0000   HARCOPY    DCY    0,0,0,0,0,0,0,0,0,0,0,0,0
0010CCI  0000 0000
0010D0I  0000 0000
0010D4I  0000 0000
0010D8I  0000 0000
0010DCI  0000 0000
0010E0I  0000 0000
0010E4I  0000 0000
0010E8I  0000 0000
0010ECI  0000 0000
0010F0I  0000 0000
0010F4I  0000 0000
                     *
                     *
         0000 10F8I  PR.TASK    EQU    *
0010F8I  6610 4000 5F2CI        RTL    R1,SVC6LIST
0010FEI  024E                   BOR    R14
001100I  41F0 4000 000FI        BAL    R15,COMMAND
001106I  2521                   LCS    R2,1
001108I  6120 4000 5F48I        AHM    R2,WORKCNT
00110CI  030E                   BR     R14
                     *
                     *                DISC I/O QUEUE PROCESSOR
                     *                 CALLED BY  BAL R14,PR.DISC
                     *
                     *
         0000 1110I  PR.DISC    EQU    *
001110I  6610 4000 5CD8I        RTL    R1,DISCLIST         PICK UP NEXT ENTRY
001116I  024E                   BOR    R14                 NONE LEFT,EXIT
001118I  2521                   LCS    R2,1
00111AI  6120 4000 5F48I        AHM    R2,WORKCNT
001120I  2420                   LIS    R2,0
001122I  4020 4000 5F04I        STH    R2,REALADN
001128I  4821 0014              LH     R2,20(R1)

TDX SYSTEM MAIN CONTROL PROGRAM                      PAGE  30    15:47:53  01/27/77

00112CI  4020 4000 5F2CI        STH    R2,PORTNUMR         PORTNUMBER
001132I  4831 0016              LH     R3,22(R1)
001136I  4030 4000 5F2FI        STH    R3,LINENUMR         LINE NUMBER
00113CI  1122                   SLLS   R2,2                *4
00113EI  E640 4000 7C00         LA     R4,LOADPARM
001144I  5854 0004              L      R5,ADR.PORT(R4)     STARTING ADDRESS OF PORT TABLE
001148I  4C30 4000 5F44I        MH     R3,IOLIM.LN         LENGTH OF I/O TABLE
00114EI  5842 4500 0000         L      R4,0(R2,R5)         ADDRESS OF CUSTOMER DATA BASE
001154I  5040 4000 58E8I        ST     R4,CUSTABLE
00115AI  5824 0010              L      R2,ADR.SVC(R4)      SVC BLOCK ADDRESS
00115EI  5020 4000 58DCI        ST     R2,SVCBLK           RESET SVC BUFFER ADDRESS
001164I  5862 001A              L      R6,SC15.BRA(R2)     STARTING READ BUFFER ADDRESS
001168I  2668                   AIS    R6,8                POSITION TO FIRST PHONE DIGIT
00116AI  5824 000C              L      R2,ADR.LNTB(R4)     ADDRESS OF LINE TABLE
00116EI  0A23                   AR     R2,R3               POSITION TO CORRECT LINE
001170I  5020 4000 58CCI        ST     R2,LINEADR
001176I  D341 0000              LB     R4,0(R1)            PICK UP FUNCTION CODE
00117AI  C440 0040              NHI    R4,X'40'            MASK READ/WRITE BIT
00117EI  4330 4000 1566I        BZ     PR.RTNB             WRITE- RETURN THE DISC BUFFER
001184I  D341 0002              LB     R4,2(R1)            STATUS
                     *
                     *                 DISC READ COMPLETED
                     *
001188I  D352 0002              LB     R5,SYS.STAT(R2)     PICK UP CURRENT LINE STATE
00118CI  C550 000D              CLHI   R5,ADNADD           AN ADN ADDITION?
001190I  4230 4000 11F0I        BNE    PR.D1               NO
001196I  0844                   LR     R4,R4
001198I  4230 4000 1586I        BNZ    PR.DADN
00119EI  5851 0004              L      R5,4(R1)            STARTING BUFFER ADDRESS
0011A2I  4871 0018              LH     R7,24(R1)           DISPLACEMENT
0011A6I  0A57                   AR     R5,R7               POSITION TO ENTRY
0011A8I  D385 0000              LB     R8,ADNF.FG(R5)      LOOK AT TYPE OF ENTRY
0011ACI  0888                   LR     R8,R8
0011AEI  4230 4000 1288I        BNZ    PR.D2NO             CAN NOT ADD TO TIE NUMBERS
0011B4I  247A                   LIS    R7,10               10 BYTES TO TRANSFER
0011B6I  D386 0002   PD.0       LB     R8,2(R6)            TRANSFER TO ADN AREA
0011BAI  D285 000F              STB    R8,ADNF.PHN(R5)
0011BEI  2661                   AIS    R6,1
0011C0I  2651                   AIS    R5,1
0011C2I  2771                   SIS    R7,1
0011C4I  2037                   BNZS   PD.0
                     *
                     *                RETURN TEMP BUFFER AND WRITE BLOCK BACK OUT
                     *
0011C6I  D350 4000 5FF7I  PR.21  LB     R5,WRTFUNC          WRITE FUNCTION
0011CCI  D251 0000              STB    R5,0(R1)
0011D0I  0851                   LR     R5,R1
0011D2I  E1E0 0002              SVC    14,N.2
0011D6I  5810 4000 58CCI  PR.25  L      R1,LINEADR
0011DCI  2440                   LIS    R4,0
0011DEI  D242 0017              STB    R4,LN.SUBC(R2)      SET ERROR COUNT TO ZERO
0011E2I  E640 4000 646CI        LA     R4,M.PACK
0011E8I  2432                   LIS    R3,2
0011EAI  4300 4000 21B2I        B      MODE0.1B
                     *
         0000 11F0I  PR.D1      EQU    *

TDX SYSTEM MAIN CONTROL PROGRAM                      PAGE  31    15:48:05  01/27/77

0011F0I  C550 000F              CLHI   R5,ADNDEL           DELETE AN ADN REFERENCE
0011F4I  4230 4000 1220I        BNE    PR.D2               NO
0011FAI  0844                   LR     R4,R4
```

-continued

```
0011FCI  4230 4000 1586I       BNZ   PR.DADN
001202I  4871 0018             LH    R7,24(R1)           DISPLACEMENT INTO BUFFER
001206I  5A71 0004             A     R7,4(R1)            PLUS STARTING BUFFER ADDRESS
00120AI  D387 0000             LB    R8,ADNF.FG(R7)      LOOK AT TYPE
00120EI  0888                  LR    R8,R8
001210I  4230 4000 1288I       BNZ   PR.D2NO             CANNOT DELETE TIE LINE CODES
001216I  0755                  XR    R5,R5
001218I  D257 000F             STB   R5,ADNF.PHN(R7)     SET FIRST BYTE TO ZERO
00121CI  4300 FFA6             B     PR.21
                         *
         0000 1220I      PR.D2  EQU   *
001220I  C550 0011             CLHI  R5,ADNTIE
001224I  4330 4000 12FAI       BE    P.ADNTIE
00122AI  C550 0003             CLHI  R5,ADNREF           ADN REFERENCE?
00122EI  4230 4000 142AI       BNE   PR.D3               NO
001234I  0844                  LR    R4,R4
001236I  4230 4000 1586I       BNZ   PR.DADN
00123CI  4851 0018             LH    R5,24(R1)           PICK UP DISPLACEMENT
001240I  5A51 0004             A     R5,4(R1)            PLUS STARTING BUFFER ADDRESS
001244I  5840 4000 58E8I       L     R4,CUSTABLE
00124AI  D364 006F             LB    R6,BEEPER(R4)
00124EI  4060 4000 5F0AI       STH   R6,BEEPFLG
001254I  D365 0000             LB    R6,ADNF.FG(R5)      LOOK AT TYPE
001258I  0866                  LR    R6,R6
00125AI  4230 4000 1392I       BNZ   PR.TIE              TIE LINE ACCESS
001260I  D365 000F             LB    R6,ADNF.PHN(R5)     FIRST DIGIT OF PHONE NUMBER
001264I  0866                  LR    R6,R6
001266I  4330 4000 1288I       BZ    PR.D2NO             NOT THERE,GIVE RETRY MESSAGE
                         *
00126CI  5840 4000 58E8I       L     R4,CUSTABLE         ADDRESS OF CUSTOMER DATA BASE
001272I  5834 0010             L     R3,ADR.SVC(R4)      PICK UP ADDRESS OF SVC BLOCK
001276I  5843 0018             L     R4,SC15.BRA(R3)     START ADDRESS OF READ BUFFER
00127AI  247A                  LIS   R7,10
00127CI  D365 000F       PR.D21 LB    R6,ADNF.PHN(R5)     REPLACE ADN WITH PHONE NUMBER
001280I  D264 0006             STB   R6,6(R4)
001284I  2641                  AIS   R4,1
001286I  2651                  AIS   R5,1
001288I  2771                  SIS   R7,1
00128AI  2037                  BNZS  PR.D21
00128CI  5030 4000 58DCI       ST    R3,SVCBLK           SAVE SVC BLOCK ADDRESS
001292I  5823 0018             L     R2,SC15.BRA(R3)
001296I  2624                  AIS   R2,4                POSITION BUFFER
001298I  5851 0004             L     R5,4(R1)            RETURN DISC BUFFER TO QUEUE
00129CI  41C0 4000 5356I       BAL   R12,RTNDISBR
0012A2I  5810 4000 58CCI       L     R1,LINEADR          LINE TABLE ADDRESS
0012A8I  4853 001A             LH    R5,26(R3)           ADN USAGE NUMBER
0012ACI  4050 4000 5F76I       STH   R5,ADNIND           SAVE IT FOR BILLING
0012B2I  4300 4000 24E0I       B     MODE2.0
         0000 12B8I      PR.D2NO EQU  *                   ADN DOES NOT EXIST,GIVE RETRY
0012B8I  D332 0017             LB    R3,LN.SUBC(R2)
0012BCI  2631                  AIS   R3,1
0012BEI  D232 0017             STB   R3,LN.SUBC(R2)
0012C2I  C530 0002             CLHI  R3,2
```

```
0012C6I  2136                  BNES  PR.D2N2
0012C8I  2430                  LIS   R3,0
0012CAI  E640 4000 6470I       LA    R4,M.RJHANG
0012D0I  2305                  BS    PR.D2N1
0012D2I  E640 4000 6460I PR.D2N2 LA   R4,M.RETRY
0012D8I  2432                  LIS   R3,2
         0000 12DAI      PR.D2N1 EQU  *
0012DAI  D232 0002             STB   R3,SYS.STAT(R2)
0012DEI  4830 4000 5F2EI       LH    R3,LINENUMR
0012E4I  41F0 4000 4EDCI       BAL   R15,SVC15           PUT IT OUT
0012EAI  5851 0004             L     R5,4(R1)            RETURN DISC BUFFER
0012EEI  41C0 4000 5356I       BAL   R12,RTNDISBR
0012F4I  4300 FF1A             B     PR.DISC             DO NEXT MESSAGE
         0000 12FAI      P.ADNTIE EQU *
0012FAI  0844                  LR    R4,R4
0012FAI  4230 4000 1586I       BNZ   PR.DADN
001300I  5840 4000 58E8I       L     R4,CUSTABLE
001306I  D364 006F             LB    R6,BEEPER(R4)
00130AI  4060 4000 5F0AI       STH   R6,BEEPFLG
001310I  4851 0018             LH    R5,24(R1)
001314I  5A51 0004             A     R5,4(R1)            FIND ADDRESS WITHIN DISC BUFFER
00131AI  D365 0000             LB    R6,ADNF.FG(R5)      TIE LINE ACCESS?
00131CI  0866                  LR    R6,R6
00131EI  4330 FF96             BZ    PR.D2NO             NO , ERROR
001322I  5870 4000 58DCI       L     R7,SVCBLK
001328I  5847 0018             L     R4,SC15.BRA(R7)     ADDRESS OF READ BUFFER
00132CI  2470                  LIS   R7,0
00132EI  D364 4700 000A  P.ADNT1 LB   R6,10(R4,R7)
001334I  D264 4700 0006        STB   R6,6(R4,R7)
00133AI  2671                  AIS   R7,1
00133CI  C560 008C             CLHI  R6,POUND
001340I  233A                  BES   P.ADNT2
001342I  C570 0006             CLHI  R7,6
001346I  4230 FFE4             BNE   P.ADNT1
00134AI  C860 008C             LHI   R6,POUND
00134EI  D264 4700 0005        STB   R6,5(R4,R7)
001354I  0A47            P.ADNT2 AR   R4,R7
001356I  D365 0000             LB    R6,ADNF.FG(R5)
00135AI  C660 00A0             OHI   R6,SPCALLCD+B.TIEPBX      SET UP CALLBACK AS TIE + EXTENT
00135EI  D265 0000             STB   R6,ADNF.FG(R5)
001362I  C360 0004             THI   R6,B.WATTS          CAN WE USE A WAT LINE
001366I  4330 4000 13ECI       BZ    P.ADN2              NO
```

```
00136CI  0375 000C                         LR    R7,ADNF.T4(R5)     LOOK AT AREA CODE
001370I  0877                              LR    R7,R7              INTRASTATE
001372I  4230 4000 139CI                   BNZ   P.ADN1             NO
001378I  C760 0014                         XHI   R6,B.INTRA+B.WATT  TURN ON INTRASTATE,TURN OFF WAT
00137CI  0265 0000                         STB   R6,ADNF.FG(R5)
001380I  4300 4000 139CI                   B     P.ADN1
         0000 1386I             P.ADN2     EQU   *
001386I  247A                              LIS   R7,10
001388I  0275 000C                         STB   R7,ADNF.T4(R5)     SET UP FALSE AREA CODE
00138CI  4300 4000 139CI                   B     P.ADN1
         0000 13921             PR.TIE     EQU   *
001392I  5870 4000 58DCI                   L     R7,SVCBLK
001398I  5847 0018                         L     R4,SC15.BRA(R7)    BUFFER ADDRESS FOR READ
         0000 139CI             P.ADN1     EQU   *
```

```
00139CI  2479                              LIS   R7,9
00139EI  0365 4700 000F         PR.TIE1    LB    R6,ADNF.PHN(R5,R7) TRANSFER PHONE NUMBER
0013A4I  0264 4700 0006                    STB   R6,6(R4,R7)
0013AAI  2771                              SIS   R7,1
0013ACI  2217                              BNMS  PR.TIE1
0013AEI  E670 4000 5870I                   LA    R7,TANDEM
0013B4I  0345 0001                         LB    R4,ADNF.NT(R5)     NUMBER OF ACCESSES
0013BAI  0247 0000                         STB   R4,0(R7)
0013BCI  2468                              LIS   R6,8               NUMBERS OF DIGITS IN ACCESS CODES
0013BEI  0346 4500 0003         PR.TIE2    LB    R4,ADNF.T1(R6,R5)
0013C4I  0246 4700 0001                    STB   R4,1(R6,R7)        SAVE ACCESS CODES
0013CAI  2761                              SIS   R6,1
0013CCI  2217                              BNMS  PR.TIE2
0013CEI  0345 000C                         LB    R4,ADNF.T4(R5)     WATS BAND NEEDED
0013D2I  4040 4000 5F3CI                   STH   R4,ARCDNEED
0013D8I  0345 0000                         LB    R4,ADNF.FG(R5)     CALLBACK CODE
0013DCI  4040 4000 5F5EI                   STH   R4,CALLCODE
0013E2I  0242 0015                         STB   R4,CAMP.CNT(R2)    SAVE CODE
0013E6I  0365 0002                         LB    R6,ADNF.CL(R5)     TIELINE SUBCLASS
0013EAI  4060 4000 5F54I                   STH   R6,EXSUB
0013F0I  2751                              SIS   R5,1
0013F2I  5050 4000 5910I                   ST    R5,SAVER7
0013F8I  5851 0004                         L     R5,4(R1)           DISC BUFFER ADDRESS
0013FCI  41C0 4000 5356I                   BAL   R12,RTNDISBR
001402I  244A                              LIS   R4,TIE             LOOK FOR A TIE LINE
001404I  41C0 4000 3FBEI                   BAL   R12,CHKLNTBL
00140AI  0855                              LR    R5,R5              WAS  A LINE FOUND?
00140CI  4310 4000 26B6I                   BNM   MODE2.E1           YES,A LINE WAS FOUND
001412I  5850 4000 5910I                   L     R5,SAVER7
001418I  0385 0002                         LB    R8,ADNF.NT+1(R5)   WAS THIS A TANDEM TIE
00141CI  0888                              LR    R8,R8
00141EI  4330 4000 2934I                   BZ    MODE2.B            NO,QUEUE IT
001424I  4300 4000 28D6I                   B     MODE2.BC
                                *
         0000 142AI             PR.D3      EQU   *
00142AI  0844                              LR    R4,R4
00142CI  4230 4000 153EI                   BNZ   PR.D32             READ ERROR,GIVE FREE CALL
001432I  C550 0014                         CLHI  R5,RDWORKSP        READ WORK SPACE?
001436I  4230 4000 15A8I                   BNE   PR.D4              NO,LOOK FOR CALL BACK BEING READ IN
00143CI  5861 0004                         L     R6,4(R1)           BUFFER ADDRESS
001440I  0352 0016                         LB    R5,CON.FLAG(R2)
001444I  0256 003F                         STB   R5,BR.OPT(R6)
001448I  E120 4000 56ECI                   SVC   2,TIME1
00144EI  5850 4000 56F4I                   L     R5,SPT.TIME        CURRENT TIME
001454I  41C0 F02A                         BAL   R12,GETDATE        TIME WENT PAST MIDNIGHT,GET NEW DATE
001458I  5050 4000 5958I        PR.D3A     ST    R5,LAST.TME
00145EI  5861 0004                         L     R6,4(R1)           STARTING BUFFER ADDRESS
001462I  5B56 001C                         S     R5,BR.DURTN(R6)    STARTING TIME
001466I  2129                              BPS   PR.D3B
001468I  5850 4000 59BCI                   L     R5,MIDNIGHT
00146EI  5B56 001C                         S     R5,BR.DURTN(R6)
001472I  5A50 4000 5958I                   A     R5,LAST.TME        CLOCK WENT PAST MIDNIGHT
         0000 1478I             PR.D3B     EQU   *
001478I  4B50 4000 5F6AI                   SH    R5,FUDGE           MINUS FUDGE FACTER,GIVES ELAPSED TIME
00147EI  2122                              BPS   PR.D3C
001480I  0755                              XR    R5,R5              IF LESS THAN 0,SET TIME TO ZERO
```

```
         0000 1482I             PR.D3C     EQU   *
001482I  5950 4000 59C0I                   C     R5,MAX.TIME
001488I  2184                              BCS   PR.D3D
00148AI  5850 4000 59C0I                   L     R5,MAX.TIME        TIME GREATER THAN 2.6 HOURS,SO SET TO M
         0000 1490I             PR.D3D     EQU   *
001490I  5050 4000 5948I                   ST    R5,CALL.DUR
001496I  41C0 4000 14A2I                   BAL   R12,CONVTM         CONVERT TIME
00149CI  4300 4000 14C2I                   B     PR.D30
         0000 14A2I             CONVTM     EQU   *
                                *
                                *                CONVERT ELAPSED TIME TO ASCII AND STORE IN BUFFER
                                *
0014A2I  2474                              LIS   R7,4
0014A4I  E680 4000 5F82I                   LA    R8,DIVTABL+2
0014AAI  0845                              LR    R4,R5
0014ACI  4D48 0000              PR.D31     DH    R4,0(R8)
0014B0I  CA50 0030                         AHI   R5,C'0'
0014B4I  D256 001C                         STB   R5,BR.DURTN(R6)
0014B8I  2661                              AIS   R6,1
0014BAI  2682                              AIS   R8,2
0014BCI  2771                              SIS   R7,1
```

-continued

```
0014BET  2039                           BNZS   PR.D31
0014C0T  030C                           BR     R12
         0000 14C2I          PR.D30     EQU    *
                             *
0014C2I  5861 0004                      L      R6,4(R1)           PUT BUFFER TO MAG TAPE
0014C6I  41C0 4000 46E2I                BAL    R12,WRTMAG
                             *
                             * CHECK PRINT/NO PRINT  OPTION
                             * ASSUMES LOGICAL SECTION PRNTBILL PERFORMS
                             * NO PROCESSING EXCEPT TO LIST THE BILLING RECORD
                             * ASSUMES THAT THE CURRENT CUSTOMER RECORD ADDR IS IN CUSTABL
0014CCI  58C0 4000 58E8I                LDA    R12,CUSTABLE       R12 = A(CUSTOMER RECORD)
0014D2I  D3CC 0052                      LB     R12,PRNT.FLG(R12)
0014D6I  08CC                           LDAR   R12,R12            IF ZERO, DO NOT PRINT
0014D8I  4330 4000 14E4T                BZ     PROPT
0014DET  41F0 4000 1946I                BAL    R15,PRNTBILL
         0000 14E4I          PROPT      EQU    *                  END OF PRINT BILL OPTION CODE
0014E4I  5861 0004                      L      R6,4(R1)           BUFFER ADDRESS
0014E8I  D356 0050                      LB     R5,TD.CALL(R6)     LOOK AT TYPE
0014ECT  0855                           LR     R5,R5
0014EEI  4330 4000 153ET                BZ     PR.D32             NO CALL BACK ACTIVE
0014F4I  2453                           LIS    R5,3               CALL BACK RECORD
0014F6I  D256 0000                      STB    R5,CB.TYPE(R6)
0014FAI  D356 0051                      LB     R5,TD.CRTRY(R6)
0014FET  D256 0004                      STB    R5,CB.RETRY(R6)
001502T  5856 004A                      L      R5,TD.CSTIM(R6)
001506I  5056 0020                      ST     R5,CB.STIME(R6)
00150AT  4856 004F                      LH     R5,TD.CSTIM+4(R6)
00150ET  4056 0024                      STH    R5,CB.STIME+4(R6)
001512I  5850 4000 6528T                L      R5,DATEBF
001518I  5056 0028                      ST     R5,CB.DATE(R6)
00151CI  5850 4000 652CI                L      R5,DATEBF+4
001522I  5056 002C                      ST     R5,CB.DATE+4(R6)
001526J  2451                           LIS    R5,1               SET TO CONNECTED CALL
001528I  D256 0001                      STB    R5,CB.DTSP(R6)
```

```
00152CI  5856 0046                      L      R5,TD.CDUR(R6)     DURATUION IN BINARY
001530I  41C0 FF6E                      BAL    R12,CONVTM         CONVERT TO ASCII
001534I  5861 0004                      L      R6,4(R1)
001538I  41C0 4000 46E2I                BAL    R12,WRTMAG         WRITE IT OUT
         0000 153EI          PR.D32     EQU    *
00153EI  5851 0004                      L      R5,4(R1)
001542I  41C0 4000 5356I                BAL    R12,RTNDISBR       RETURN DISC BUFFEE TO QUEUE
001548I  58A0 4000 58E8I                L      R10,CUSTABLE
00154EI  5810 4000 58CCI                L      R1,LINEADR
001554I  41F0 4000 49C2I                BAL    R15,PROC.CLB       SEARCH CALL BACK QUEUE TO SEE
00155AI  0833                           LR     R3,R3              IF LINE CAN BE USED
00155CI  4210 4000 30A0T                BM     MODE6.1            NO LINE AVAILABLE,CLEAR I/O LINE STATUS
001562I  4300 FBAA                      B      PR.DISC            WE CAN USE IT
         0000 1566I          PR.RTNB    EQU    *
001566I  5851 0004                      L      R5,4(R1)
00156AI  41C0 4000 5356I                BAL    R12,RTNDISBR       RETURN DISC
001570T  0341 0002                      LB     R4,2(R1)
001574T  0844                           LR     R4,R4
001576I  4330 FB96                      BZ     PR.DISC            NO DISC ERRORS
00157AI  0812                           LR     R1,R2
00157CI  4100 4000 4D9AI                BAL    R13,CLEAN.UP       HANG UP LINE
001582T  4300 FB8A                      B      PR.DISC
001586T  5851 0004           PR.DADN    L      R5,4(R1)
00158AT  41C0 4000 5356I                BAL    R12,RTNDISBR       RETURN DISC BUFFER
001590I  0812                           LR     R1,R2
001592I  E640 4000 6470T                LA     R4,M.PJHANG
001598I  41F0 4000 4EDCI                BAL    R15,SVC15          TELL SAT TO HANG UP THE LINE
00159EI  41C0 4000 4D9AI                BAL    R13,CLEAN.UP
0015A4I  4300 FB6B                      B      PR.DISC
                             *
0015A8T  C550 0008           PR.C4      CLHI   R5,RDCBACK         READ CALL BACK QUEUE ENTRY
0015ACI  4230 4000 1844I                BNE    PR.D6
                             *
                             *          SET UP SVC BUFFER WITH CALL BACK CODE AND
                             *          EXTENSION NUMBER. WRITE OUT TEMP WORK FILE.
                             *
                             *          R1 = ADR OF SVC BLOCK
                             *          R2 = ADR OF I/O LINE TABLE ENTRY
                             *
0015B2I  2490                           LTS    R9,0
0015B4T  4090 4000 5E02T     PR.D6A     STH    R9,CBF7.10
0015BAT  58D0 4000 58E8T                L      R13,CUSTABLE
0015C0I  5891 000C                      L      R9,12(R1)          CALL BACK SECTOR
0015C4I  5831 0004                      L      R3,4(R1)           BUFFER ADDRESS
0015C8I  5840 4000 58E8I                L      R4,CUSTABLE        ADDRESS OF CUSTOMER TABLE ADDRESS
0015CEI  5854 0010                      L      R5,ADR.SVC(R4)     ADDRESS OF SVC 15 PARAMETER BLOCK
0015D2I  0360 4000 5FFFI                LB     R6,C.STX           START OF MESSAGE CHARACTER
0015D8T  5875 000C                      L      R7,BUF.WRT(R5)     STARTING ADDRESS OF WRITE BUFFER
0015DCT  0267 0000                      STB    R6,0(R7)
0015E0I  C860 0046                      LHI    R6,C'F'            CALL BACK CODE
0015E4I  0267 0001                      STB    R6,1(R7)
0015E8I  4860 4000 5F2ET                LH     R6,LINENUMR        INPUT LINE NUMBER
0015EEI  C660 0080                      OHI    R6,X'80'           SET NUMERIC BIT
0015F2I  0267 0002                      STB    R6,2(R7)
0015F6I  0362 0009                      LB     R6,LN.OUT(R2)      OUTPUT LINE
0015FAI  4060 4000 5F30I                STH    R6,OUTLINE
```

```
001600I  41C0 4000 4F34I                BAL   R12,TONEIT            FIND OUTPUT LINE TONE
001606I  C560 0009                      CLHI  R6,LD                 LOCAL OUTPUT LINE
00160AI  4230 4000 1616I                BNE   PR.LDBEP              NO
001610I  0380 0070                      LR    R8,LDBEEPER(R13)
001614I  0668                           OR    R6,R8                 TURN ON BEEPER INDICATOR
         0000 1616I       PR.LDBEP      EQU   *
001616I  C660 0080                      OHI   R6,X'80'              TURN ON NUMERIC BIT
00161AI  0383 002F                      LR    R8,CMP.BEEP(R3)       BEEPER INDICATOR
00161EI  0888                           LR    R8,R8
001620I  2333                           BZS   PR.BEEP               BEEPER IS NEEDED
001622I  C660 00A0                      OHI   R6,WTDIALT            DISABLE THE BEEPER
         0000 1626I       PR.BEEP       EQU   *
001626I  0267 0003                      STB   R6,3(R7)
00162AI  2674                           AIS   R7,4
00162CI  4860 4000 5F02I                LH    R6,CBF7.10            WAS CALL FROM  AN OP
001632I  4330 4000 164AI                BZ    PR.D4C
001638I  C860 0042                      LHI   R6,C'B'
00163CI  0267 40FF FFFD                 STB   R6,-3(R7)
001642I  2771                           SIS   R7,1
001644I  4300 4000 169AI                B     PR.D6B
00164AI  0363 0022        PR.D4C        LR    R6,CMP.EXT(R3)        STORE EXTENSION NUMBER
00164EI  2480                           LIS   R8,0
001650I  030D 0050                      LR    R0,TONE.FG1(R13)
001654I  0800                           LR    R0,R0                 DO WE NEED DIAL TONE OR 600 MS DELAY
001656I  4230 4000 166AI                BNZ   PR.D4DA               DELAY
00165CI  C660 00A0                      OHI   R6,WTDIALT            WAIT FOR DISL TONE
001660I  2400                           LIS   R0,0
001662I  4300 4000 1670I                B     PR.D4D
         0000 166AI       PR.D4DA       EQU   *
00166AI  030D 0073                      LR    R0,CALLR.DC(R13)
00166CI  C660 00C0                      OHI   R6,X'C0'              WAIT FOR 600MS
001670I  0267 0000        PR.D4D        STB   R6,0(R7)              DIGIT 1
001674I  2671                           AIS   R7,1
001676I  0363 4800 0023                 LR    R6,CMP.EXT+1(R3,R8)
00167CI  2681                           AIS   R8,1
00167EI  0866                           LR    R6,R6
001680I  4330 4000 1690I                BZ    PR.D4E                ALL DONE
001686I  0908                           CR    R0,R8                 ANY MORE DIGITS FOR 600 MS DELAY
001688I  4280 FFE4                      BC    PR.D4D                NO
00168CI  4300 FFDA                      B     PR.D4DA               YES,TURN IT ON
         0000 1690I       PR.D4E        EQU   *
001690I  C860 008B                      LHI   R6,X'8B'              DELIMITER
001694I  0267 0000                      STB   R6,0(R7)
         0000 169AI       PR.D6B        EQU   *
001698I  248A                           LIS   R8,10
00169AI  0362 0008                      LR    R6,LN.WAT(R2)         LOOK AT TYPE OF OUTPUT LINE
00169EI  C560 000A                      CLHI  R6,TIF                TIE LINE?
0016A2I  4330 4000 18BAI                BE    PR.D4BB               YES
0016A8I  0393 0021                      LR    R9,CMP.TIE(R3)        LOOK AT CALLBACK CODE
0016ACI  C390 0020                      THI   R9,SPCALLCD           TIE + EXTENSION?
0016B0I  4330 4000 16CEI                BZ    PR.E50                NO
0016B6I  C390 0001                      THI   R9,B.TIE              TIE BIT ALSO SET?
0016BAI  4330 4000 16CEI                BZ    PR.E50                NO,MUST BE REAL MCI LINE
0016C0I  0393 0010        PR.E51        LR    R9,CMP.PHN(R3)
0016C4I  2631                           AIS   R3,1
0016C6I  C590 008C                      CLHI  R9,POUND              MOVE PAST EXTENSION NUMBER
```

```
0016CAI  4230 FFF2                      BNE   PR.E51
         0000 16CEI       PR.E50        EQU   *
0016CEI  C560 0000                      CLHI  R6,INTRA              INTRASTATE CALL?
0016D2I  4330 4000 1718I                BE    PR.INTRA              YES
0016D8I  C560 0001                      CLHI  R6,FX                 FX LINE?
0016DCI  4330 4000 18B2I                BE    PR.D4CA               YES,SEND ONLY 7 DIGITS
0016E2I  C560 000A                      CLHI  R6,TIE                TIE LINE?
0016E6I  4330 4000 18BAI                BE    PR.D4BB               YES
0016ECI  C560 0009                      CLHI  R6,LD
0016F0I  4230 4000 1864I                BNE   PR.D4F
0016F6I  0363 002E                      LR    R6,CMP.ARCD(R3)       BILLABLE LINE
0016FAI  C560 000A                      CLHI  R6,TIE
0016FEI  4330 4000 1718I                BE    PR.INTRA
001704I  C560 0009                      CLHI  R6,LD                 DDD LINE?
001708I  4330 4000 1718I                BE    PR.INTRA              YES
00170EI  C560 0002                      CLHI  R6,FX+1
001712I  4360 4000 1864I                BNC   PR.D4F
         0000 1718I       PR.INTRA      EQU   *
001718I  0360 003B                      LR    R6,IN.7OR10(R13)      DIAL OUT 7 OR TEN DIGITS
00171CI  0866                           LR    R6,R6                 CHECK FLAG
00171EI  4330 4000 1864I                BZ    PR.D4F                PUT OUT 10
001724I  036D 0022                      LR    R6,PHN.MSTR(R13)
001728I  0463 0010                      CLB   R6,CMP.PHN(R3)
00172CI  4230 4000 1864I                BNE   PR.D4F
001732I  036D 0023                      LR    R6,PHN.MSTR+1(R13)
001736I  0463 0011                      CLB   R6,CMP.PHN+1(R3)
00173AI  4230 4000 1864I                BNE   PR.D4F                NOT EQUAL
001740I  036D 0024                      LR    R6,PHN.MSTR+2(R13)    CHECK LAST DIGIT OF AREA CODE
001744I  0463 0012                      CLB   R6,CMP.PHN+2(R3)
001748I  4330 4000 18B2I                BE    PR.D4CA               YES,ON 7 GO OUT
00174EI  4300 4000 1864I                B     PR.D4F                PUT OUT ALL 10
001754I  2672             PR.D4GK       AIS   R7,2
001756I  4300 4000 177BI                B     PR.D4GJ
         0000 175CI       PR.D4FA       EQU   *
00175CI  0267 0001                      STB   R6,1(R7)              STORE FIRST DIGIT
001760I  0363 0011        PR.D4G        LR    R6,CMP.PHN+1(R3)      STORE REMAINING 9 DIGITS
001764I  C560 008C                      CLHI  R6,POUND              END OF PHONE NUMBER?
001768I  4330 FFEB                      BE    PR.D4GK               YES
00176CI  0267 0002                      STB   R6,2(R7)
```

```
  TDX SYSTEM MAIN CONTROL PROGRAM                         PAGE  37   15:49:30  01/27/77

001770I  2631                 1993            AIS    R3,1
001772I  2671                 1994            AIS    R7,1
001774I  2781                 1995            SIS    R8,1
001776I  2218                 1996            BNMS   PR.D4G
         0000 1778I           1997   PR.D4GJ  EQU    *
001778I  0360 4000 5FF1I      1998            LB     R6,C.ETX            ETX CHARACTER
00177EI  0267 0000            1999            STB    R6,0(R7)
001782I  5075 0010            2000            ST     R7,BUF.FWRT(R5)     STORE ENDING ADDRESS
                              2001   *
                              2002   * QUICK AND DIRTY LINK TO MONITOR
001786I  5030 4000 65ACI      2003            STA    R3,NOGUTS
00178CI  5040 4000 1F0CI      2004            STA    R4,NOGUTS3
001792I  D345 0001            2005            LB     R4,SC15.LU(R5)
001796I  4130 4000 0000F      2006            BAL    R3,MONTOR3          AND AWAY WE GO
00179CI  5830 4000 65ACI      2007   CONMR3A  LDA    R3,NOGUTS
0017A2I  5840 4000 1F0CI      2008            LDA    R4,NOGUTS3
0017A8I  E1F5 0000            2009            SVC    15,0(R5)            WRITE BACK TO SATELLITE

  TDX SYSTEM MAIN CONTROL PROGRAM                         PAGE  38   15:49:41  01/27/77

                              2010   *
                              2011   *                 WRITE OUT TO MAG TAPE
0017ACI  5831 0004            2012            L      R3,4(R1)            STARTING BUFFER ADDRESS
0017B0I  C840 001F            2013            LHI    R4,31
0017B4I  0353 4400 0000       2014   PR.D5    LB     R5,0(R3,R4)
0017BAI  0254 4000 5E6CI      2015            STB    R5,ADN.ACT(R4)
0017C0I  2741                 2016            SIS    R4,1
0017C2I  2217                 2017            BNMS   PR.D5
0017C4I  0353 0021            2018            LB     R5,CMP.TIE(R3)
0017C8I  0252 0015            2019            STB    R5,CAMP.CNT(R2)
0017CCI  D332 0008            2020            LB     R3,LN.WAT(R2)
0017D0I  5851 0004            2021            L      R5,4(P1)            STARTING BUFFER ADDRESS
0017D4I  D365 0020            2022            LB     R6,CMP.SUB(R5)      SUBCLASS OF LINE WE ARE USING
0017D8I  D262 0017            2023            STB    R6,LN.SUBC(R2)      SAVE IT FOR BILLING
0017DCI  D365 002F            2024            LB     R6,CMP.ARCD(R5)
0017E0I  D260 4000 5FF4I      2025            STB    R6,BSERV            BILLABLE SERVICE CODE
0017E6I  0230 4000 5FF3I      2026            STB    R3,ASERV            ACTUAL SERVICE CODE
0017ECI  2461                 2027            LIS    R6,1
0017EEI  D265 0000            2028            STB    R6,TD.TYPE(R5)
0017F2I  D265 0050            2029            STB    R6,TD.CALL(R5)      SET FOR ACTIVE CALL BACK
0017F6I  5865 0034            2030            L      R6,CMP.ASTM(R5)     ASCII START TIME IN THE QUEUE
0017FAI  5065 004A            2031            ST     R6,TD.CSTIM(R5)
0017FEI  4865 0038            2032            LH     R6,CMP.ASTM+4(R5)
001802I  4065 004F            2033            STH    R6,TD.CSTIM+4(R5)
001806I  E110 4000 56ECI      2034            SVC    1,TIME1
00180CI  5860 4000 56F4I      2035            L      R6,SPT.TIME
001812I  5B65 0030            2036            S      R6,CMP.TIME(R5)     PICK UP DURATION
001816I  5065 0046            2037            ST     R6,TD.CDUR(R5)
00181AI  C860 000C            2038            LHI    R6,CBMODE
00181EI  D262 0002            2039            STB    R6,SYS.STAT(R2)     SET UP FOR SENT OUT CALL BACK
001822I  5862 0004            2040            L      R6,LN.TEMP(R2)      TEMP BUFFER ADDRESS
001826I  0346 0002            2041            LB     R4,2(R6)            RETRY COUNT
00182AI  D245 0051            2042            STB    R4,TD.CRTRY(R5)     SAVE RETRY COUNT
00182EI  E620 4000 5E7CI      2043            LA     R2,ADN.IND
001834I  E640 4000 5E6CI      2044            LA     R4,ADN.ACT
00183AI  41D0 4000 5484I      2045            BAL    R13,WRT.OA          WRITE OUT WORK AREA
001840I  4300 FBCC            2046            B      PR.DISC             LOOK FOR MORE WORK
         0000 1844I           2047   PR.D6    EQU    *
001844I  C550 0010            2048            CLHI   R5,RDCB1
001848I  4230 4000 1854I      2049            BNE    PR.SYSER
00184EI  2491                 2050            LIS    R9,1
001850I  4300 FD60            2051            B      PR.D6A
                              2052   *
         0000 1854I           2053   PR.SYSER EQU    *
001854I  E640 4000 60ECI      2054            LA     R4,M.PRSYSE
00185AI  41C0 4000 4508I      2055            BAL    R12,TTYMSG
001860I  4300 FD02            2056            B      PR.RTNB
001864I  D364 0021            2057   PR.D4F   LB     R6,PULSF(R4)        CIRCLE DIGIT?
00186AI  0866                 2058            LR     R6,R6
00186AI  4330 4000 188CI      2059            BZ     PR.D5F              NO
001870I  C660 00A0            2060            OHI    R6,WTDIALT          TURN ON PROPER BITS
001874I  D267 0001            2061            STB    R6,1(R7)
001878I  D363 0010            2062            LB     R6,CMP.PHN(R3)      LOOK AT FIRST DIGIT
00187CI  C560 008A            2063            CLHI   R6,X'8A'            ZERO AREA CODE?
001880I  4330 4000 18A0I      2064            BE     PR.D4CB             YES
001886I  2671                 2065            AIS    R7,1

  TDX SYSTEM MAIN CONTROL PROGRAM                         PAGE  39   15:49:53  01/27/77

001888I  4300 FFD0            2066            B      PR.D4FA             STORE FIRST DIGIT WITHOUT DIAL TONE
         0000 188CI           2067   PR.D5F   EQU    *
00188CI  D363 0010            2068            LB     R6,CMP.PHN(R3)      LOOK AT FIRST DIAL DIGIT
001890I  C560 008A            2069            CLHI   R6,X'8A'            ZERO AREA CODE?
001894I  233F                 2070            BES    PR.D4CA             YES
001896I  4660 4000 5F0CI      2071            OH     R6,LINETONE         TURN ON UOTPUT LINE TONE
00189CI  4300 FFBC            2072            B      PR.D4FA
0018A0I  2633                 2073   PR.D4CB  AIS    R3,3
0018A2I  2487                 2074            LIS    R8,7
0018A4I  D363 0010            2075            LB     R6,CMP.PHN(R3)      PICK UP NEXT DIGIT
0018A8I  4660 4000 5F0CI      2076            OH     R6,LINETONE
0018AEI  4300 FFAA            2077            B      PR.D4FA
0018B2I  2633                 2078   PR.D4CA  AIS    R3,3
0018B4I  2487                 2079            LIS    R8,7
0018B6I  4300 FFAA            2080            B      PR.D4F
         0000 18BAI           2081   PR.D4PB  EQU    *
0018BAI  D363 003C            2082            LB     R6,CMP.TAND(R3)     DO WE HAVE A TANDEM TIE LINE?
0018BEI  0866                 2083            LR     R6,R6
0018C0I  4330 4000 1904I      2084            BZ     PR.D4PC             NO
```

```
0018C6I  E693 003D               LA    R9,CMP.TAND+1(R3)   ADDRESS OF ACCESS CODES
0018CAI  D309 0000     PR.D4BE   LB    R0,0(R9)            PICK UP FIRST BYTE
0018CEI  C600 00A0               OHI   R0,WTDIALT          TURN ON WAIT FOR DIAL TONE
0018D2I  D207 0001               STB   R0,1(R7)
0018D6I  2671                    AIS   R7,1                UPDATE BUFFER
0018DAI  D309 0001               LB    R0,1(R9)            PICK UP 2ND DIGIT
0018DCI  0800                    LR    R0,R0
0018DEI  4330 4000 18FCI         BZ    PR.D4BD
0018E4I  D207 0001               STB   R0,1(R7)
0018E8I  2671                    AIS   R7,1
0018EAI  D309 0002               LB    R0,2(R9)            3RD ACCESS DIGIT
0018EEI  0800                    LR    R0,R0
0018F0I  4330 4000 18FCI         BZ    PR.D4BD
0018F6I  D207 0001               STB   R0,1(R7)
0018FAI  2671                    AIS   R7,1
         0000 18FCI    PR.D4BD   EQU   *
0018FCI  2693                    AIS   R9,3
0018FEI  2761                    SIS   R6,1
001900I  4230 FFC6               BNZ   PR.D4BE
         0000 1904I    PR.D4BC   EQU   *
001904I  D363 0021               LB    R6,CMP.TIE(R3)
001908I  C3F0 0020               THI   R6,SPCALLCD         TIE + EXTENSION BITS SET
00190CI  4230 4000 192EI         BNZ   PR.ADC1             YES
001912I  C460 00B0               NHI   R6,P.TIEPBX         ONLY GOING TO THE PBX?
001916I  4230 4000 193BI         BNZ   PR.D4J              YES
00191CI  C860 00A9               LHI   R6,OUTSIDE          SET UP BYTE FOR REQUESTING AN OUTSIDE L
001920I  D267 0001               STB   R6,1(R7)            STORE IT
001924I  2671                    AIS   R7,1                UPDATE BUFFER POSITION
                               *   ONLY SEND OUT 7 DIGITS,JUST LIKE FX LINE
001926I  2633          PR.D4BA   AIS   R3,3
         0000 192AI    PR.ADC1   EQU   *
00192AI  2487                    LIS   R8,7
00192AI  D363 0010               LB    R6,CMP.PHN(R3)
00192EI  4660 4000 5F0CI         OH    R6,LINETONE         TURN ON TONE BIT
001934I  4300 FF24               B     PR.D4FA
         0000 193BI    PR.D4J    EQU   *
00193BI  C860 00A0               LHI   R6,WTDIALT          WAIT FOR DIAL TONE BIT
```

```
00193CI  D267 0001               STB   R6,1(R7)
001940I  2671                    AIS   R7,1                ***** CHANGE FROM 2 TO 1 ,STAN F. FIX *
001942I  4300 FF32               B     PR.D4GJ             END UP BUFFER WITH ETX
                               *
                               *   PRINT BILLING RECORD ON CONSOLE
                               *
001946I  5A61 0004     PRNTBILL  L     R6,4(R1)            ADDRESS OF BUFFER
00194AI  5850 4000 58EAI         L     R5,CUSTABLE         CUSTOMER TABLE ADDRESS
001950I  F840 2020 2020          LI    R4,C'    '
001956I  5040 4000 6494I         ST    R4,PRNT.ACT+1
00195CI  5040 4000 6498I         ST    R4,PRNT.ACT+5
001962I  D345 005B               LB    R4,ACT.DGTS(R5)     NUMBER OF DIGITS  IN ACCOUNT
001966I  D356 4400 0007  PRTBLL.1 LB   R5,BR.ACCT(R6,R4)   SAVE ACCOUNT NUMBER
00196CI  D254 4000 6493I         STB   R5,PRNT.ACT(R4)
001972I  2741                    SIS   R4,1
001974I  2217                    BNMS  PRTBLL.1
001976I  E120 4000 64C4I         SVC   2,PRTDATE           PICK UP DATE AND STORE IN BUFFER
00197CI  C840 0020               LHI   R4,C' '
001980I  D240 4000 6489I         STB   R4,PRNT.DAT+5
001986I  D346 0004               LB    R4,BR.OUTLN(R6)
00198AI  41C0 F3B4               BAL   R12,DIVIDE
00198EI  D250 4000 648AI         STB   R5,PRNT.DAT+6
001994I  D240 4000 648BI         STB   R4,PRNT.DAT+7
00199AI  4846 001B               LH    R4,BR.PMN(R6)       SAVE START TIME
00199EI  4040 4000 648EI         STH   R4,PRNT.TM
0019A4I  4846 001A               LH    R4,BR.PMN+2(R6)
0019A8I  4040 4000 6490I         STH   R4,PRNT.TM+2
0019AEI  CA40 2020               LHI   R4,C'  '
0019B2I  4040 4000 64AAI         STH   R4,PRNT.DR
0019B8I  D240 4000 64ACI         STB   R4,PRNT.DR+2
0019BEI  5840 4000 594BI         L     R4,CALLDUR          DURATION IN SECONDS
0019C4I  4C40 4000 5F6CI         MH    R4,D.10
0019CAI  4D40 4000 5F8AI         DH    R4,$60
0019D0I  0845                    LR    R4,R5               DO NOT NEED REMAINDER
0019D2I  4D40 4000 5F6CI         DH    R4,D.10             MAKE TIME INTO DECIMAL MINUTES
0019D8I  CA40 0030               AHI   R4,C'0'
0019DCI  D240 4000 64AFI         STB   R4,PRNT.DR+4        STORE DECIMAL PART
0019E2I  2472                    LIS   R7,2
         0000 19E4I    PRNT.6    EQU   *
0019E4I  0845                    LR    R4,R5
0019E6I  4330 4000 1A00I         BZ    PRNT.7              TIME LESS THAN 1 MINUTE
0019ECI  4D40 4000 5F6CI         DH    R4,D.10
0019F2I  CA40 0030               AHI   R4,C'0'
0019F6I  D247 4000 64AAI         STB   R4,PRNT.DR(R7)
0019FCI  2771                    SIS   R7,1
0019FEI  2210                    BNMS  PRNT.6
         0000 1A00I    PRNT.7    EQU   *
001A00I  2442                    LIS   R4,2
001A02I  D354 4600 002B  PRTBLL.2 LB   R5,BR.PHN(R4,R6)
001A08I  D254 4000 649DI         STB   R5,PRNT.PHN(R4)
001A0EI  2741                    SIS   R4,1
001A10I  2217                    BNMS  PRTBLL.2
001A12I  2443                    LIS   R4,3
001A14I  D356 4400 0031  PRNT.5  LB    R5,BR.PHN+6(R6,R4)
001A1AI  D254 4000 64A5I         STB   R5,PRNT.PHN+8(R4)
001A20I  2741                    SIS   R4,1
```

```
001A22I  2217                          BNMS   PRNT.5
001A24I  2442                          LIS    R4,2
001A26I  0356 4400 002E      PRTBLL.3  LB     R5,BR.PHN+3(R6,R4)
001A2CI  D254 4000 64A1I               STB    R5,PRNT.PHN+4(R4)   SAVE PHONE NUMBER
001A32I  2741                          SIS    R4,1
001A34I  2217                          BNMS   PRTBLL.3
001A36I  0755                          XR     R5,R5
001A38I  5840 4000 594BI               L      R4,CALLDUR          CALL DURATION IN BINARY
001A3EI  2336                          BZS    PRNT.4A
001A40I  4040 4000 5F8AI               DH     R4,$60
001A46I  0844                          LR     R4,R4
001A48I  2332                          BZS    PRNT.4
         0000 1A4AI          PRNT.4A   EQU    *
001A4AI  2651                          AIS    R5,1
001A4CI  5050 4000 594BI     PRNT.4    ST     R5,CALLDUR          SAVE DURATION IN MINUTES
001A52I  E640 4000 64B2I               LA     R4,STDX             ADDRESS OF PRINT LAYOUT
001A58I  E650 4000 5FACI               LA     R5,TDXCOST          ADDRESS OF COST LIST
001A5EI  41A0 4000 1A90I               BAL    R10,COST            COMPUTE COST
001A64I  E640 4000 64BAI               LA     R4,SMTS
001A6AI  E650 4000 5FC8I               LA     R5,MTSCOST
001A70I  41A0 4000 1A90I               BAL    R10,COST
001A76I  D360 4000 5FFDI               LB     R6,PRNT.LU          PRINT LOGICAL UNIT
001A7CI  D260 4000 5FFBI               STB    R6,TTYLU            SAVE LU FOR PRINT MESSAGES
001A82I  E640 4000 64B0I               LA     R4,PRNTBUFR         ADDRESS OF PRINT BUFFER
001A88I  41C0 4000 45DAI               BAL    R12,TTYMSG          STORE AND PRINT IT
001A8EI  030F                          BR     R15                 EXIT
                             *
001A90I  C870 0020           COST      LHI    R7,X'20'            BLANK OUT DOLLAR POSITIONS
001A94I  D274 0000                     STB    R7,0(R4)
001A98I  D274 0001                     STB    R7,1(R4)
001A9CI  5870 4000 594BI               L      R7,CALLDUR          DURATION
001AA2I  D386 0006                     LB     R8,BR.BSERV(R6)
001AA6I  C480 000F                     NHI    R8,X'F'
001AAAI  1181                          SLLS   R8,1
001AACI  4C78 4500 0000                MH     R7,0(R8,R5)
001AB2I  4070 4000 5F6CI               DH     R7,D.10
001AB8I  CA70 0030                     AHI    R7,C'0'             MAKE ASCII
001ABCI  D274 0004                     STB    R7,4(R4)
001AC0I  0878                          LR     R7,R8
001AC2I  4D70 4000 5F6CI               DH     R7,D.10
001AC8I  CA70 0030                     AHI    R7,C'0'
001ACCI  D274 0003                     STB    R7,3(R4)
001AD0I  2431                          LIS    R3,1
001AD2I  0878                COST.1    LR     R7,R8
001AD4I  033A                          BZR    R10
001AD6I  4D70 4000 5F6CI               DH     R7,D.10
001ADCI  CA70 0030                     AHI    R7,C'0'
001AE0I  D273 4400 0000                STB    R7,0(R3,R4)
001AE6I  2731                          SIS    R3,1
001AE8I  4310 FFE6                     BNM    COST.1
001AECI  030A                          BR     R10
                             *
         0000 1AEEI          CHANGREG  EQU    *
001AEEI  1122                          SLLS   R2,2                FIND CUSTOMER DATA BASE
001AF0I  E650 4000 7C00                LA     R5,LOADPARM         BASE ADDRESS
001AF6I  5865 4200 0004                L      R6,ADR.PORT(R5,R2)  DATA BASE ADDRESS
```

TDX SYSTEM MAIN CONTROL PROGRAM PAGE 42 15:50:29 01/27/77

```
001AFCI  033F                          BZR    R15                 IF NONE THERE,EXIT
001AFEI  C530 0008                     CLHI   R3,8
001B02I  038F                          BNCR   R15                 REGISTER NUMBER OUT OF RANGE,EXIT
001B04I  1131                          SLLS   R3,1                HALFWORD ALIGNMENT
001B06I  0844                          LR     R4,R4               LOCK OR UNLOCK?
001B08I  4230 4000 1B24I               BNZ    REG.1               UNLOCK
001B0EI  4873 4000 5F8CI               LH     R7,LOCK(R3)         LOCK HALF WORD
001B14I  4676 0038                     OH     R7,REGF.01(R6)
001B18I  2441                REG.2     LIS    R4,1
001B1AI  4076 003A           REG.3     STH    R7,REGF.01(R6)      STORE NEW HALF WORD
001B1EI  D246 003A                     STB    R4,REGF.ST(R6)
001B22I  030F                          BR     R15
001B24I  4876 0036           REG.1     LH     R7,REGF.01(R6)      UNLOCK HALFWORD
001B28I  033F                          BZR    R15                 NOTHING THERE TO UNLOCK
001B2AI  4473 4000 5F9CI               NH     R7,UNLOCK(R3)
001B30I  2442                          LIS    R4,2
001B32I  C570 8080                     CLHI   R7,X'8080'
001B36I  4330 FFE0                     BE     REG.3
001B3AI  4300 FFDA                     B      REG.2
                             *
                             *                PICK UP AN ENTRY FROM THE COMMUNICATIONS QUEUE
                             *
         0000 1B3EI          Q.COMM    EQU    *
         0000 1B3EI          PR.COMMQ  EQU    *
001B3EI  2420                          LIS    R2,0
001B40I  4020 4000 5F18I               STH    R2,PACCT
001B46I  4020 4000 5F04I               STH    R2,REALADN
001B4CI  6610 4000 5DC4I               RTL    R1,COMMLIST         ANY ENTRIES
001B52I  024F                          BOR    R14                 NO,EXIT
001B54I  2521                          LCS    R2,1
001B56I  6120 4000 5F48I               AHM    R2,WORKCNT
001B5CI  5010 4000 58DCI               ST     R1,SVCBLK           SAVE SVC 15 BLOCK ADDRESS
001B62I  D321 0001                     LB     R2,1(R1)            PORT NUMBER
001B66I  4020 4000 5F2CI               STH    R2,PORTNUMB
001B6CI  5821 001A                     L      R2,SC15.BRA(R1)     BUFFER ADDRESS
001B70I  4830 4000 5F2CI               LH     R3,PORTNUMB
                             *
                             *QUICK & DIRTY * MONITOR * CANNED CUS 11
001B76I  41D0 4000 000F                BAL    R13,MONTOR
                             * END OF QUICK & DIRTY MONITOR LINK
```

-continued

```
TOX SYSTEM MAIN CONTROL PROGRAM                              PAGE  42    15:50:29  01/27/77

00187CI  1132                      SLLS    R3,2
00187EI  E650 4000 7C00            LA      R5,LOADPARM
001884I  5875 0004                 L       R7,ADR,PORT(R5)     ADDRESS OF PORT LINE TABLE
001888I  5813 4700 0000            L       R1,0(R3,R7)         ADDRESS OF CUSTOMER DATA BASE
00188EI  5010 4000 58E8I           ST      R1,CUSTABLE
001894I  08A1                      LR      R10,R1
001896I  41D0 4000 417CI           BAL     R13,PARSEBUF        LOOK AT MESSAGE TYPE
00189CI  081A                      LR      R1,R10              RESTORE R1 IF ERROR OCCURRED
00189EI  5040 4000 58F4I           ST      R4,PARSECD          SAVE PARSE CODE
0018A4I  E650 4000 7C00            LA      R5,LOADPARM
0018AAI  5831 000C                 L       R3,ADR,LNTB(R1)     LINE TABLE ADDRESS
0018AEI  F540 0800 0000            CLI     R4,BIT28            RESTART OR INITIALIZATION?
0018B4I  4330 4000 1C80I           BE      PR,START            YES
0018BAI  D36A 0020                 LB      R6,SYS,FG(R10)      LOOK AT INITIALIZATION FLAG
0018BEI  C560 00FF                 CLHI    R6,X'FF'            HAS IT BEEN INITIALILIZED
0018C2I  4330 4000 4266I           BE      RE,READ             NO

TOX SYSTEM MAIN CONTROL PROGRAM                              PAGE  43    15:50:43  01/27/77

0018C8I  41B0 4000 1C62I           BAL     R11,SETWRT          SET WRITE ADDRESS BACK
0018CEI  4810 4000 5F2EI           LH      R1,LINENUMR
0018D4I  C510 0020                 CLHI    R1,X'20'            DUMMY LINE NUMBER,CHECK CALL BACK QUEUE
0018D8I  4330 4000 3830I           BE      CHKCAMP             YES
0018DEI  D41A 0006                 CLB     R1,LINES(R10)       LINE NUMBER WITHIN RANGE?
0018E2I  4330 4000 447EI           BE      NOMESG              YES
0018E8I  4380 4000 447EI           BNL     NOMESG              NO.
0018EEI  4C10 4000 5F44I           MH      R1,IOLN,LN          * LENGTH OF A TABLE ENTRY
0018F4I  0A13                      AR      R1,R3
0018F6I  5010 4000 58CCI           ST      R1,LINEADR          INPUT LINE TABLE ADDRESS
0018FCI  D361 0002                 LB      R6,SYS,STAT(R1)     PICK UP CURRENT MODE
001C00I  C560 00FF                 CLHI    R6,X'FF'            HAS LINE BEEN INITIALIZED
001C04I  4330 4000 1C4AI           BE      PR,RSERR            NO- ERROR
001C0AI  0844                      LR      R4,R4
001C0CI  4210 4000 212CI           BM      CHKRETRY
001C12I  2450                      LIS     R5,0
001C14I  4050 4000 5F5AI           STH     R5,CBFLAG           RESET FLAG
001C1AI  025A 0075                 STB     R5,NAKCNT(R10)      RESET NAK COUNT FOR A GOOD MESSAGE
001C1EI  C560 000F                 CLHI    R6,M,MODES          IS STATE WITHIN RANGE?
001C22I  4380 4000 1C32I           BNC     SYSER2              NO,GIVE SYSTEM ERROR
001C28I  1162                      SLLS    R6,2
001C2AI  5836 4000 5A1CI           L       R3,COM,JUMP(R6)     ADDRESS OF MODE ROUTINE
001C30I  0303                      BR      R3
         0000 1C32I       SYSER2   EQU     *
001C32I  D000 4000 57C4I           STM     R0,MLOOP,RG
001C38I  E640 4000 6078I           LA      R4,M,SYSER
001C3EI  41C0 4000 45D8I           BAL     R12,TTYMSG
001C44I  4300 4000 2282I           B       ILL,MSG
                                *
001C4AI  E640 4000 6114I  PR,RSERR LA      R4,M,NOINIT
001C50I  41C0 4000 45D8I           BAL     R12,TTYMSG
001C56I  E640 4000 6470I           LA      R4,M,RJHANG
001C5CI  4300 4000 21B6I           B       MODE0,1F
001C62I  5810 4000 58DCI  SETWRT   L       R1,SVCBLK           ADDRESS OF SVC BLOCK
001C68I  0861                      LR      R6,R1               SAVE STARTING SVC BLOCK ADDRESS
001C6AI  CA60 0024                 AHI     R6,H'36'            POINT TO START OF BUFFER
001C6EI  5061 000C                 ST      R6,12(R1)
001C72I  2768                      SIS     R6,8
001C74I  F660 0300 0000            OI      R6,Y'03000000'
001C7AI  5061 0004                 ST      R6,4(R1)
001C7EI  030B                      BR      R11
                                *
         0000 1C80I       PR,START EQU     *                   RESTART MESSAGE
001C80I  5810 4000 58DCI           L       R1,SVCBLK
001C86I  5851 0018                 L       R5,SC15,BRA(R1)     READ BUFFER ADDRESS
001C8AI  F450 00FF FFFF            NI      R5,Y'FFFFFF'        LEAVE ONLY ADDRESS
001C90I  5870 4000 58E8I           L       R7,CUSTABLE
001C96I  D365 0005                 LB      R6,5(R5)
001C9AI  C560 0052                 CLHI    R6,C'R'             RESTART
001C9EI  4330 4000 1EF2I           BE      PR,STRT1            YES
001CA4I  D36A 0020                 LB      R6,SYS,FG(R10)
001CA8I  C560 00FF                 CLHI    R6,X'FF'
001CACI  4330 4000 4266I           BE      RE,READ
001CB2I  2460                      LIS     R6,0
001CB4I  D26A 0020                 STB     R6,SYS,FG(R10)
001CB8I  41B0 FFA6                 BAL     R11,SETWRT          RESTORE WRITE ADDRESS

TOX SYSTEM MAIN CONTROL PROGRAM                              PAGE  44    15:50:59  01/27/77

001CBCI  D367 0006                 LB      R6,LINES(R7)        NUMBER OF LINES TO SAT
001CC0I  08F7                      LR      R15,R7
001CC2I  587F 000C                 L       R7,ADR,LNTB(R15)
                                *
                                *         FIRST 8 BYTES HAVE HOOK STATUS FOR LINES
                                *
001CC6I  D385 0005        PR,STR0  LB      R8,5(R5)            NEXT FOUR LINES
001CCAI  2404                      LIS     R0,4
001CCCI  2491             PR,STR1  LIS     R9,1
001CCEI  1081                      SRLS    R8,1
001CD0I  4280 4000 1D2EI           BC      PR,STR2
001CD6I  5050 4000 58A0I           ST      R5,CHK,TMP1
001CDCI  5060 4000 58A8I           ST      R6,CHK,TMP2
001CE2I  5080 4000 58ACI           ST      R8,CHK,TMP3
001CE8I  0817                      LR      R1,R7
001CEAI  D341 0002                 LB      R4,SYS,STAT(R1)
001CEEI  C540 000C                 CLHI    R4,12               WA S A CALLBACK IN PROGRESS
001CF2I  4230 4000 1D14I           BNE     PR,STR1A            NO
001CF8I  D341 0003                 LB      R4,SYS,FLAG(R1)     WAS A BUFFER ASSIGNED?
001CFCI  C540 0002                 CLHI    R4,2                BUFFER ASSIGNED?
```

```
TDX SYSTEM MAIN CONTROL PROGRAM                              PAGE  44   15:50:59  01/27/77

001D00I  4230 4000 1D14I               BNF   PR.STR1A           NO
001D06I  5841 0004                     L     R4,LN.TEMP(R1)
001D0AI  5894 0008                     L     R9,8(R4)
001D0EI  41D0 4000 524FI               BAL   R13,PUTCAMP        RETURN CALLBACK SECTOR
         0000 1D14I          PR.STR1A  EQU   *
001D14I  41D0 4000 4D9AI               BAL   R13,CLEAN.UP       CLEAN IO LINE TABLE
001D1AI  5850 4000 58A0I               L     R5,CHK.TMP1
001D20I  5860 4000 58A8I               L     R6,CHK.TMP2
001D26I  5880 4000 58ACI               L     R8,CHK.TMP3
001D2CI  0799                          XR    R9,R9
001D2EI  D297 0000           PR.STR2   STB   R9,STAT.IN(R7)     SET STATUS BIT
001D32I  4A70 4000 5F44I               AH    R7,IOLIN.LN        LENGTH I/O TABLE ENTRY
001D38I  2761                          SIS   R6,1
001D3AI  4330 4000 1D4CI               BZ    PR.STR2A
001D40I  2701                          STS   R0,1
001D42I  4230 FFB6                     BNZ   PR.STR1
001D46I  2651                          AIS   R5,1
001D48I  4300 FF7A                     B     PR.STR0
         0000 1D4CI          PR.STR2A  EQU   *
001D4CI  5810 4000 58DCI               L     R1,SVCBLK          ADDRESS OF SVC BLOCK
001D52I  C850 0090                     LHI   R5,X'90'           ACTIVATE ITAM TIMER
001D56I  D251 001E                     STB   R5,30(R1)
                             *
                             *         NEXT 8 BYTES HAVE EQUIPMENT STATUS
                             *
001D5AI  084F                          LR    R4,R15
001D5CI  5851 0018                     L     R5,SC15.BRA(R1)    READ BUFFER ADDRESS
001D60I  D364 0006                     LB    R6,LINES(R4)       NUMBER OF LINES
001D64I  5874 000C                     L     R7,ADR.LNTB(R4)    ADDRESS OF LINE TABLE
001D68I  D385 000D           PR.STR5   LB    R8,13(R5)          NEXT 4 LINES
001D6CI  2404                          LIS   R0,4
001D6EI  2591                          LCS   R9,1               LINE OUT OF SERVICE INDICATOR
001D70I  1081                PR.STR4   SRLS  R8,1
001D72I  2183                          BCS   PR.STR3            BIT TURNED ON MEANS INSTALLED
001D74I  D297 0000                     STB   R9,STAT.IN(R7)
         0000 1D78I          PR.STR3   EQU   *

TDX SYSTEM MAIN CONTROL PROGRAM                              PAGE  45   15:51:13  01/27/77

001D78I  4A70 4000 5F44I               AH    R7,IOLIN.LN
001D7EI  2761                          SIS   R6,1
001D80I  4330 4000 1D92I               BZ    PR.STR3A
001D86I  2701                          SIS   R0,1
001D88I  4230 FFE4                     BNZ   PR.STR4
001D8CI  2651                          AIS   R5,1
001D8EI  4300 FFD6                     B     PR.STR5
         0000 1D92I          PR.STR3A  EQU   *
                             *
                             *    PASS DDD AND TIE LINE INFO TO SATELLLITE
                             *
001D92I  5851 000C                     L     R5,12(R1)          WRITE BUFFER ADDRESS
001D96I  D330 4000 5FEFI               LB    R3,C.STX           START TRANSMISSION CHARACTER
001D9CI  D235 0000                     STB   R3,0(R5)
001DA0I  D33A 0072                     LB    R3,TYSAT.FG(R10)
001DA4I  4030 4000 5F06I               STH   R3,TYSAT           SAVE INDICATOR
001DAAI  C830 0090                     LHI   R3,LD*16           CHECK FOR DDD LINES
001DAEI  C430 00E0                     LHI   R3,X'F0'           *************  TEMP PATCH *******
001DB2I  41C0 4000 1F1FI               BAL   R12,LINEASSG
001DB8I  C830 00A0                     LHI   R3,TIE*16          CHECK FOR TIE LINES
001DBCI  C430 00E0                     LHI   R3,X'F0'           ****** TEMP PATCH  **********
001DC0I  41C0 4000 1E1FI               BAL   R12,LINEASSG
001DC6I  D330 4000 5FF1I               LB    R3,C.ETX           END TRANSMISSION CHARACTER
001DCCI  D235 0001                     STB   R3,1(R5)
001DD0I  2651                          AIS   R5,1
001DD2I  5051 0010                     ST    R5,16(R1)          STORE ENDING ADDRESS
                             * * MONITOR LINK * * 7/6/76
001DD6I  5030 4000 65ACI               STA   R3,NOGUTS
001DDCI  5040 4000 1F0CI               STA   R4,NOGUTS3
001DE2I  D341 0001                     LB    R4,SC15.LU(R1)
001DE6I  5050 4000 1F08I               STA   R5,NOGUTS2
001DECI  0851                          LDAR  R5,R1
001DEEI  4130 4000 1798I               BAL   R3,MONTOR3
001DF4I  5850 4000 1F08I               LDA   R5,NOGUTS2
001DFAI  5840 4000 1F0CI               LDA   R4,NOGUTS3
001E00I  4300 4000 1E10I               B     CONMR001
001E08I                                ALIGN ADC
001E08I                      NOGUTS2   DS    4
001E0CI                      NOGUTS3   DS    4
001E10I  5830 4000 65ACI     CONMR001  LDA   R3,NOGUTS
                             * * END OF MONITOR LINK * * * * * *
001E16I  E1F1 0000                     SVC   15,0(R1)
001E1AI  4300 FD20                     B     PR.COMMQ           LOOK FOR MORE WORK
                             *
                             *    SUBROUTINE TO STORE LINE ASSIGNMENTS
                             *
                             *    TYPE OF LINE IS IN R3
                             *
         0000 1F1FI          LINEASSG  EQU   *
001E1EI  48F0 4000 5F06I               LH    R15,TYSAT
001E24I  584A 000C                     L     R4,ADR.LNTB(R10)   ADDRESS OF IO LINE TABLE
001E28I  2480                          LIS   R8,0               NUMBER OF LINES TO SATELLTITE
001E2AI  4080 4000 5F06I               STH   R8,TYSAT
001E30I  2490                          LIS   R9,0               NUMBER OF GROUPS OF 4
001E32I  2464                LNAS.0    LIS   R6,4               SHIFT COUNT
001E34I  2470                          LIS   R7,0
```

```
                              2458  *
001E36I  1071                 2459  LNAS.1    SRLS  R7,1
001E38I  08FF                 2460            LR    R15,R15
001E3AI  4330 4000 1E5AI      2461            BZ    LNAS.1A
001E40I  D334 0001            2462            LB    R3,CLASS.IN(R4)     TYPE OF INPUT LINE
001E44I  C530 000F            2463            CLHI  R3,WATTS
001E48I  4330 4000 1E64I      2464            BE    LNAS.2
001E4EI  C530 000F            2465            CLHI  R3,WATTS+1          ODD LINE
001E52I  4330 4000 1E64I      2466            BE    LNAS.2
001E58I  2304                 2467            BS    LNAS.1B
         0000 1F5AI           2468  LNAS.1A   EQU   *
001E5AI  D434 000F            2469            CLB   R3,CLASS.OT(R4)     DOES LINE CLASS MATCH?
001E5EI  2133                 2470            BNES  LNAS.2              NO
         0000 1E60I           2471  LNAS.1B   EQU   *
001E60I  C670 0008            2472            OHI   R7,X'8'             YES,TURN ON BIT
001E64I  2681                 2473  LNAS.2    AIS   R8,1                UPDATE LINE COUNT
001E66I  4A40 4000 5F44I      2474            AH    R4,IOLIN.LN         POINT TO NEXT LINE
001E6CI  D48A 0006            2475            CLB   R8,LINES(R10)
001E70I  4330 4000 1E8CI      2476            BE    LNAS.3              WE HAVE REACHED THE LAST LINE IN THE TA
001E76I  2761                 2477            SIS   R6,1                ANY MORE LINES LEFT FOR THIS BYTE
001E78I  4230 FFBA            2478            BNZ   LNAS.1              YES
001E7CI  C670 0080            2479            OHI   R7,X'80'            TURN ON NUMERIC BIT
001E80I  D275 0001            2480            STB   R7,1(R5)
001E84I  2651                 2481            AIS   R5,1
001E86I  2691                 2482            AIS   R9,1
001E88I  4300 FFA6            2483            B     LNAS.0
001E8CI  2761                 2484  LNAS.3    SIS   R6,1
001E8EI  2333                 2485            BZS   LNAS.4
001E90I  1071                 2486            SRLS  R7,1
001E92I  2203                 2487            BS    LNAS.3
001E94I  C670 0080            2488  LNAS.4    OHI   R7,X'80'
001E98I  D275 0001            2489            STB   R7,1(R5)
001E9CI  2651                 2490            AIS   R5,1
001E9EI  2470                 2491            LIS   R7,0
001EA0I  2691                 2492            AIS   R9,1
001EA2I  C590 0008            2493            CLHI  R9,8
001EA6I  4230 FFEA            2494            BNE   LNAS.4
001EAAI  030C                 2495            BR    R12
001EACI  5810 4000 5ACCI      2496            L     R1,LINEADR          SET UP LINE TABLE ADDRESS
001EB2I  E640 4000 645CI      2497            LA    R4,M.ACK
001EB8I  4300 4000 21B6I      2498            B     MODF0.1F
                              2499  *
001EBEI  41B0 FDA0            2500  PR.INIT2  BAL   R11,SETWRT
001EC2I  0855                 2501            LR    R5,R5
001EC4I  4330 4000 1FFEI      2502            BZ    PR.INT2A
001ECAI  4850 4000 5EF4I      2503            LH    R5,LOSTLINE
001ED0I  2751                 2504            SIS   R5,1
001ED2I  2312                 2505            BNMS  PR.TM0
001ED4I  2450                 2506            LIS   R5,0
001ED6I  4050 4000 5EF4I      2507  PR.TM0    STH   R5,LOSTLINE
001EDCI  4300 4000 1FFEI      2508            B     PR.INT2A
                              2509  *
         0000 1FE2I           2510  PR.STRT1  EQU   *                   RESTART MESSAGE RECEIVED
001EE2I  D35A 007F            2511            LB    R5,BACKUP(R10)      LINEBACKER FLAG
001EE6I  0855                 2512            LR    R5,R5
001EEAI  4330 4000 1FC6I      2513            BZ    PR.STLB1            NO LINEBACKER MODE
```

```
001EEEI  C550 0070            2514            CLHI  R5,X'70'
001EF2I  4330 4000 1FC6I      2515            BE    PR.STLB1
001EF8I  C550 0007            2516            CLHI  R5,X'7'             NORMAL LINE COMING BACK UP
001EFCI  4230 4000 1F32I      2517            BNE   PR.STLB0            NO
001F02I  2551                 2518            LCS   R5,1
001F04I  D25A 007F            2519            STB   R5,XBACKUP(R10)
001F08I  2450                 2520            LIS   R5,0
001F0AI  D25A 007E            2521            STB   R5,BACKUP(R10)      RESET LINEBACKER AND XREF FLAGS
001F0EI  4300 4000 1FC6I      2522            B     PR.STLB1            CONTINUE ON
         0000 1F14I           2523  HANGIT    EQU   *
001F14I  E640 4000 63CCI      2524            LA    R4,FALSFLB          MESSAGE FOR FALSE LINEBACK CONDITION
001F1AI  41C0 4000 45DAI      2525            BAL   R12,TTYMSG          PRINT IT OUT
001F20I  581A 0010            2526            L     R1,ADR.SVC(R10)     SVC ADDRESS
001F24I  083A                 2527            LR    R3,R10              CUSTOMER DATA BASE
001F26I  41C0 EC46            2528            BAL   R12,HANGITUP        SET UP HANG UP COMMAND
001F2AI  E1F1 0000            2529            SVC   15,0(R1)
001F2EI  4300 FC0C            2530            B     Q.COMM
001F32I  C550 00F0            2531  PR.STLB0  CLHI  R5,X'F0'
001F36I  4230 FCF8            2532            BNE   SYSFR2              DON'T UNDERSTAND
001F3AI  D332 0003            2533            LB    R3,3(R2)            FIND OUT PORTNUMBER
001F3EI  C430 000F            2534            NHI   R3,X'F'
001F42I  4C30 4000 5F78I      2535            MH    R3,TEN
001F48I  D352 0004            2536            LB    R5,4(R2)
001F4CI  C450 000F            2537            NHI   R5,X'F'
001F50I  0A35                 2538            AR    R3,R5
001F52I  4C30 4000 5F78I      2539            MH    R3,TEN
001F58I  D352 0005            2540            LB    R5,5(R2)
001F5CI  C450 000F            2541            NHI   R5,X'F'
001F60I  0A35                 2542            AR    R3,R5
001F62I  0853                 2543            LR    R5,R3
001F64I  1132                 2544            SLLS  R3,2
001F66I  E680 4000 7C00       2545            LA    R8,LOADPARM
001F6CI  589A 0004            2546            L     R9,ADR.PORT(R8)     ADDRESS OF PORT TABLE
001F70I  5879 4300 0000       2547            L     R7,0(R9,R3)         LOST LINE CUSTOMER DATA BASE
001F76I  4330 FC8A            2548            BZ    SYSFR2              IF NOONE THER ERROR
001F7AI  D387 002C            2549            LB    R8,SYS.FG(R7)       IS THIS LINE IN ERROR MODE?
001F7EI  08BB                 2550            LR    R8,R8
001F80I  4330 FF90            2551            BZ    HANGIT              NO, LINE IS STILL GOOD
001F84I  48B0 4000 5F2CI      2552            LH    R8,PORTNUMR
```

```
     TDX SYSTEM MAIN CONTROL PROGRAM                          PAGE  47   15:51:37  01/27/77
```

-continued

```
001F8AI  D287 007F            2553             STB   R8,XBACKUP(R7)
001F8EI  D25A 007F            2554             STB   R5,XBACKUP(R10)
001F92I  C830 000F            2555             LHI   R3,X'F'
001F96I  D237 007E            2556             STB   R3,BACKUP(R7)      SET UP TO LINE BACKED POSITION
001F9AI  C830 0070            2557             LHI   R3,X'70'
001F9EI  D23A 007E            2558             STB   R3,BACKUP(R10)     LINEBACKER LINE IN SERVICE
001FA2I  583A 0010            2559             L     R3,ADR.SVC(R10)    SVC BLOCK ADDRESS
001FA6I  D35A 0020            2560             LB    R5,SYS.FG(R10)
001FAAI  C860 007D            2561             LHI   R6,LDCB            LDCB BYTES TO TRANSFER
001FAEI  D386 4700 0000       2562  PR.STLB2   LB    R8,0(R6,R7)
001FB4I  D286 4A00 0000       2563             STB   R8,0(R6,R10)
001FBAI  2761                 2564             SIS   R6,1
001FBCI  2037                 2565             BNZS  PR.STLB2
001FBEI  503A 0010            2566             ST    R3,ADR.SVC(R10)
001FC2I  D25A 0020            2567             STB   R5,SYS.FG(R10)
         0000 1FC6I           2568  PR.STLB1   EQU   *
001FC6I  D35A 0020            2569             LB    R5,SYS.FG(R10)     FIRST INITIALIZATION?
```

```
     TDX SYSTEM MAIN CONTROL PROGRAM                          PAGE  48   15:51:50  01/27/77

001FCAI  C550 00FF            2570             CLHI  R5,X'FF'
001FCEI  4230 FFEC            2571             BNE   PR.INIT2           NO
001FD2I  D351 0004            2572             LB    R5,4(R1)           PICK UP COUNT
001FD6I  C550 0003            2573             CLHI  R5,3               ALREADY RESET?
001FDAI  4330 FFE0            2574             BE    PR.INIT2           YES
001FDEI  2453                 2575             LIS   R5,3
001FE0I  D251 0004            2576             STB   R5,4(R1)
001FE4I  5851 0004            2577             L     R5,4(R1)
001FE8I  2752                 2578             SIS   R5,2
001FEAI  5051 0004            2579             ST    R5,4(R1)
001FEEI  5831 0014            2580             L     R3,20(R1)          ADDRESS OF WRITE
001FF2I  5851 000C            2581             L     R5,12(R1)          ADDRESS OF READ
001FF6I  5031 000C            2582             ST    R3,12(R1)
001FFAI  5051 0014            2583             ST    R5,20(R1)
         0000 1FFEI           2584  PR.INT2A   EQU   *
001FFEI  D35A 0038            2585             LB    R5,REGF.01(R10)    HAVE REGISTERS BEEN MODIFIED
002002I  0855                 2586             LR    R5,R5
002004I  2334                 2587             BZS   PR.INTRG           NO,SO DON'T START NOW
002006I  2451                 2588             LIS   R5,1               REMODIFY THEM
002008I  D25A 003A            2589             STB   R5,REGF.ST(R10)
         0000 200CI           2590  PR.INTRG   EQU   *
00200CI  C850 000F            2591             LHI   R5,X'0F'           SET FLAG FOR RESTART IN PROGRESS
002010I  D25A 0020            2592             STB   R5,SYS.FG(R10)
002014I  5851 000C            2593             L     R5,12(R1)          STARTING BUFFER ADDRESS
002018I  2408                 2594             LIS   R0,8
00201AI  D330 4000 5FEFI      2595             LB    R3,C.STX
002020I  D235 0000            2596             STB   R3,0(R5)           STORE STX CHARACTER
002024I  586A 0048            2597             L     R6,CINIT.IN(R10)
002028I  2302                 2598             BS    PR.STRT2
00202AI  1164                 2599  PR.STRT3   SLLS  R6,4
00202CI  0846                 2600  PR.STRT2   LR    R4,R6
00202EI  F460 F000 0000       2601             NI    R6,Y'F0000000'
002034I  41C0 4000 2114I      2602             BAL   R12,PR.ST20
00203AI  C660 0080            2603             OHI   R6,X'80'
00203EI  D265 0001            2604             STB   R6,1(R5)
002042I  2651                 2605             AIS   R5,1
002044I  0864                 2606             LR    R6,R4
002046I  2701                 2607             SIS   R0,1
002048I  4230 FFDE            2608             BNZ   PR.STRT3
00204CI  2408                 2609             LIS   R0,8
00204EI  586A 004C            2610             L     R6,CINIT.OU(R10)
002052I  2302                 2611             BS    PR.STRT5
002054I  1164                 2612  PR.STRT4   SLLS  R6,4
002056I  0846                 2613  PR.STRT5   LR    R4,R6
002058I  F460 F000 0000       2614             NI    R6,Y'F0000000'
00205EI  41C0 4000 2114I      2615             BAL   R12,PR.ST20
002064I  C660 0080            2616             OHI   R6,X'80'
002068I  D265 0001            2617             STB   R6,1(R5)
00206CI  2651                 2618             AIS   R5,1
00206EI  0864                 2619             LR    R6,R4
002070I  2701                 2620             SIS   R0,1
002072I  4230 FFDF            2621             BNZ   PR.STRT4
002076I  D360 4000 5FF1I      2622             LB    R6,C.ETX
00207CI  D265 0001            2623             STB   R6,1(R5)
002080I  2651                 2624             AIS   R5,1
002082I  5051 0010            2625             ST    R5,16(R1)          STORE ENDING ADDRESS
```

```
     TDX SYSTEM MAIN CONTROL PROGRAM                          PAGE  49   15:52:04  01/27/77

                              2626  * * MONITOR LINK * * 7/6/76
002086I  5030 4000 65ACI      2627             STA   R3,NOGUTS
00208CI  5040 FD7C            2628             STA   R4,NOGUTS3
002090I  D341 0001            2629             LB    R4,SC15.LU(R1)
002094I  5050 FD70            2630             STA   R5,NOGUTS2
002098I  0851                 2631             LDAR  R5,R1
00209AI  4130 4000 10F0I      2632             BAL   R3,MONTOR3
0020A0I  5850 FD64            2633             LDA   R5,NOGUTS2
0020A4I  5840 FD64            2634             LDA   R4,NOGUTS3
0020A8I  5830 4000 65ACI      2635  COMMR003   LDA   R3,NOGUTS
0020AEI  C840 2020            2636             LHI   R4,C'  '
0020B2I  4040 4000 639AI      2637             STH   R4,RST.2+1
0020B8I  4040 4000 639CI      2638             STH   R4,RST.2+3
0020BEI  5851 0018            2639             L     R5,24(R1)          READ BUFFER ADDRESS
0020C2I  D345 0007            2640             LB    R4,7(R5)
0020C6I  C540 0003            2641             CLHI  R4,X'03'
0020CAI  4330 4000 20FAI      2642             BE    PR.LL
0020D0I  D240 4000 639BI      2643             STB   R4,RST.2+2
```

TDX SYSTEM MAIN CONTROL PROGRAM PAGE 49 15:52:04 01/27/77

```
0020D6I  0345 0008                          LB     R4,8(R5)
0020DAI  0240 4000 639CI                    STB    R4,RST.2+3
0020E0I  0345 0009                          LB     R4,9(R5)
0020E4I  0240 4000 639DI                    STB    R4,RST.2+4
         0000 20EAI               PR.IL     EQU    *
0020EAI  E1F1 0000                          SVC    15,0(R1)              SEND IT OUT
0020EEI  4840 4000 5F2CI                    LH     R4,PORTNUMR
0020F4I  41C0 EC4A                          BAL    R12,DIVIDE
0020F8I  D250 4000 6398I                    STB    R5,RST.1
0020FEI  D240 4000 6399I                    STB    R4,RST.2
002104I  E640 4000 637CI                    LA     R4,M.RESTRT
00210AI  41C0 4000 45D8I                    BAL    R12,TTYMSG
002110I  4300 FA2A                          B      PR.COMMO
         0000 2114I               PR.ST20   EQU    *
002114I  0777                               XR     R7,R7
002116I  2484                               LIS    R8,4
002118I  1161                     PR.ST2B   SLLS   R6,1
00211AI  2383                               BNCS   PR.ST2A
00211CI  C670 0010                          OHI    R7,X'10'
002120I  1071                     PR.ST2A   SRLS   R7,1
002122I  2781                               SIS    R8,1
002124I  4230 FFF0                          BNZ    PR.ST2B
002128I  0867                               LR     R6,R7
00212AI  030C                               BR     R12
         0000 212CI               CHKRETRY  EQU    *
00212CI  D35A 0075                          LB     R5,NAKCNT(R10)        PICK UP NUMBER OF NAKS SENT OUT
002130I  2651                               AIS    R5,1
002132I  D25A 0075                          STB    R5,NAKCNT(R10)        UPDATE COUNT
002136I  C550 0003                          CLHI   R5,3
00213AI  4330 4000 2158I                    BF     CHK.NAK1              COUNT EXCEEDED,MUST BE REAL MISTAKE
002140I  2451                               LIS    R5,1                  UPDATE NAK COUNT
002142I  6150 4000 5F74I                    AHM    R5,NAKCOUNT
002148I  E640 4000 647CI                    LA     R4,M.NAK
00214EI  41F0 4000 4EDCI                    BAL    R15,SVC15
002154I  4300 F9E6                          B      Q.COMM
002158I  2751                     CHK.NAK1  SIS    R5,1                  SET UP FOR NEXT MESSAGE
00215AI  D25A 0075                          STB    R5,NAKCNT(R10)
00215EI  D341 0017                          LB     R4,LN.SURC(R1)        LOOK AT RETRY COUNT
```

TDX SYSTEM MAIN CONTROL PROGRAM PAGE 50 15:52:18 01/27/77

```
002162I  2641                               AIS    R4,1
002164I  C540 0002                          CLHI   R4,2                  TRIED ENOUGH?
002168I  4380 4000 2282I                    BNC    ILL.MSG               YES,HANG UP
00216EI  D241 0017                          STB    R4,LN.SURC(R1)
002172I  E640 4000 6470I                    LA     R4,M.RJHANG           HANG UP THE LINE
002178I  4300 4000 21B6I                    B      MODE0.1F
                                  *        WAITING FOR CALL TO GO OFF HOOK
                                  *
         0000 217EI               MODE0     EQU    *
00217EI  F540 0008 0000                     CLI    R4,BIT20              DT?
002184I  4330 4000 2302I                    BF     MODE1.3               S
00218AI  F540 0001 0000                     CLI    R4,BIT17              RACE CONDITION?
002190I  4330 4000 21AAI                    BF     MODE0.0
002196I  F440 0000 0007                     NI     R4,M0.MASK            MASK MESSAGE TYPE WITH THOSE EXPECTED
00219CI  4330 4000 2282I                    BZ     ILL.MSG               ILLEGAL MESSAGE RECEIVED
0021A2I  1041                               SRLS   R4,1                  LOOK FOR OFF HOOK CONDITION
0021A4I  4380 4000 21E6I                    BNC    MODE0.1               NO
         0000 21AAI               MODE0.0   EQU    *
0021AAI  E640 4000 645CI                    LA     R4,M.ACK              SAT HAS ASSIGNED A REGISTER,NO ACCT YET
0021B0I  2431                     MODE.1    LIS    R3,1                  SET MODE TO 1
0021B2I  D231 0002                MODE0.1B  STB    R3,SYS.STAT(R1)
0021B6I  41F0 4000 4EDCI          MODE0.1F  BAL    R15,SVC15             SEND BACK MESSAGE
0021BCI  D321 0002                          LB     R2,SYS.STAT(R1)
0021C0I  0822                               LR     R2,R2
0021C2I  4330 F978                          BZ     Q.COMM
0021C6I  D321 0000                          LB     R2,0(R1)              STATUS OF LINE
0021CAI  C420 00F0                          NHI    R2,X'F0'              LEAVE ONLY ERROR BITS
0021CEI  4230 F96C                          BNZ    Q.COMM                TERMINAL IS LOCKED OUT
0021D2I  D321 0000                          LB     R2,0(R1)              SET LINE TO BUSY
0021D6I  C420 0007                          NHI    R2,X'7'
0021DAI  C620 0001                          OHI    R2,X'01'              TURN ON BUSY BIT
0021DEI  D221 0000                          STB    R2,0(R1)
0021E2I  4300 F958                          B      Q.COMM                LOOK FOR MORE WORK
                                  *
0021E6I  1041                     MODE0.1   SRLS   R4,1                  OFF HOOK + ACCOUNT NUMBER?
0021E8I  4380 4000 2358I                    BNC    MODE1.2               NO
0021EEI  E6C0 4000 7C00           MODE1.1   LA     R12,LOADPARM          ADDRESS OF PARAMETER TABLE
0021F4I  4830 4000 5F72I                    LH     R3,MSGCNT
0021FAI  C530 0004                          CLHI   R3,4                  MESSAGE TIMEOUT?
0021FEI  4330 4000 2268I                    BF     MODE0.T0              YES
002204I  4330 4000 2282I                    BZ     MODE0.1E              NO ONE THERE
00220AI  0777                               XR     R7,R7
00220CI  2450                               LIS    R5,0
00220EI  D365 4200 0003           MOD.UP    LB     R6,3(R5,R2)
002214I  C460 000F                          NHI    R6,X'F'               LEAVE ONLY 4 BITS
002218I  C560 000A                          CLHI   R6,X'A'               ZERO?
00221CI  2132                               BNFS   MOD.UP1               NO
00221EI  2460                               LIS    R6,0
         0000 2220I               MOD.UP1   EQU    *
002220I  1174                               SLLS   R7,4
002222I  0676                               OR     R7,R6
002224I  2651                               AIS    R5,1
002226I  D45A 005B                          CLB    R5,ACT.DGTS(R10)
00222AI  4230 FFE0                          BNE    MOD.UP
00222EI  48D0 4000 5F2CI                    LH     R13,PORTNUMR
         0000 2234I               NXTACT    EQU    *
```

```
    TDX SYSTEM MAIN CONTROL PROGRAM                          PAGE  51   15:52:31  01/27/77

002234I   583C 0014            2738            L      R3,T.ILLACT(R12)   TABLE OF ILLEGAL ACCOUNTS
002238I   484C 0002            2739            LH     R4,NUMR.IA(R12)    NUMBER OF ILLEGAL ACCOUNTS
00223CI   41F0 4000 2254I      2740            BAL    R15,CHKACT         CHECK FOR IT ON LIST
002242I   D3DA 0060            2741            LB     R13,SPOUSE(R10)    IS THIS A MARRIAGE?
002246I   08DD                 2742            LR     R13,R13
002248I   4330 4000 22ACI      2743            BZ     CHKACT.1           NO,ACCOUNT IS OK
00224EI   26A1                 2744            AIS    R10,1              POINT TO NEXT MARRIAGE
002250I   4300 FFE0            2745            B      NXTACT
          0000 2254I           2746   CHKACT   EQU    *
002254I   59D3 0000            2747            C      R13,0(R3)
002258I   4230 4000 22A2I      2748            BNE    MODE0.1A           NO MATCH
00225EI   5973 0004            2749            C      R7,4(R3)
002262I   4230 4000 22A2I      2750            BNE    MODE0.1A           NO MATCH
          0000 2268I           2751   MODE0.T0 EQU    *
002268I   D351 0017            2752            LB     R5,LN.SUBC(R1)     LOOK AT TRIES MADE.
00226CI   C550 0002            2753            CLHI   R5,2               MAX REACHED
002270I   4230 4000 2292I      2754            BNE    MODE0.1C
002276I   0755                 2755            XR     R5,R5
002278I   D251 0017            2756            STB    R5,LN.SUBC(R1)     RESET FLAG FOR NO BUFFER
00227CI   4300 4000 2358I      2757            B      MODE1.2
                               2758   *                 SEND OUT DISCONNECT MESSAGE
          0000 2282I           2759   MODEE    EQU    *
          0000 2282I           2760   ILL.MSG  EQU    *
002282I   41D0 4000 409AI      2761            BAL    R13,CLEAN.UP
002288I   E640 4000 6470I      2762            LA     R4,M.RJHANG        REJECT,HANG UP
00228EI   4300 FF24            2763            B      MODE0.1F
                               2764   *
          0000 2292I           2765   MODE0.1C EQU    *                  ENTRY FOUND ON ILLEGAL LIST
002292I   2651                 2766            AIS    R5,1
002294I   D251 0017            2767            STB    R5,LN.SUBC(R1)     UPDATE NUMBER OF RETRIES
002298I   E640 4000 6460I      2768            LA     R4,M.RETRY         REJECT-RETRY MESSAGE
00229EI   4300 FF0E            2769            B      MODE.1
                               2770   *
0022A2I   2638                 2771   MODE0.1A AIS    R3,8               UPDATE TO NEXT ENTRY
0022A4I   2741                 2772            SIS    R4,1               ANY MORE ENTRIES?
0022A6I   4230 FFAA            2773            BNZ    CHKACT             YES
0022AAI   030F                 2774            BR     R15
0022ACI   58A0 4000 58E8I      2775   CHKACT.1 L      R10,CUSTABLE
                               2776   *
          0000 22B2I           2777   MODE0.1E EQU    *                  ENTRY NOT ON ILLEGAL LIST
0022B2I   5841 0004            2778            L      R4,LN.TEMP(R1)
0022B6I   D331 0003            2779            LB     R3,SYS.FLAG(R1)
0022BAI   C530 0002            2780            CLHI   R3,2
0022BEI   4330 4000 22D4I      2781            BE     MODE0.P1
0022C4I   41C0 4000 52AEI      2782            BAL    R12,GETBUFR        PICK UP A TEMP BUFFER
0022CAI   2432                 2783            LIS    R3,2
0022CCI   D231 0003            2784            STB    R3,SYS.FLAG(R1)
0022D0I   5041 0004            2785            ST     R4,LN.TEMP(R1)     SAVE BUFFER ADDRESS
          0000 22D4I           2786   MODE0.P1 EQU    *
0022D4I   D33A 005B            2787            LB     R3,ACT.DGTS(R10)   NUMBER OF DIGITS IN ACCOUNT
0022D8I   2731                 2788            SIS    R3,1               MINUS 1
0022DAI   F850 9090 9090       2789   MD.0     LI     R5,Y'90909090'
0022E0I   5054 0000            2790            ST     R5,ACTB1(R4)       SET UP AS ALL BLANKS
0022E4I   5054 0004            2791            ST     R5,ACTB1+4(R4)
0022E8I   F850 9090 9090       2792            LI     R5,Y'90909090'     SET UP SPECIAL ACCOUNT AS BLANKS
0022EEI   5054 0008            2793            ST     R5,ACTB1+8(R4)
```

```
    TDX SYSTEM MAIN CONTROL PROGRAM                          PAGE  52   15:52:44  01/27/77

0022F2I   5054 000C            2794            ST     R5,ACTB1+12(R4)
0022F6I   D352 4300 0003       2795   MD.1     LB     R5,3(R2,R3)
0022FCI   D254 4300 0000       2796            STB    R5,ACTB1(R4,R3)
002302I   2731                 2797            SIS    R3,1
002304I   2217                 2798            BNMS   MD.1
002306I   0744                 2799            XR     R4,R4
002308I   D241 0017            2800            STB    R4,LN.SUBC(R1)
00230CI   D241 0010            2801            STB    R4,SUS.IN(R1)
                               2802   *
002310I   E640 4000 646CI      2803            LA     R4,M.PACK          ACCOUNT VALID MESSAGE
002316I   2432                 2804            LIS    R3,2               SET MODE TO PICK UP PHONE NUMBER
002318I   4300 FF96            2805            B      MODE0.1B
                               2806   *
                               2807   *   MODE1 -  OFF HOOK WAITING FOR ACCOUNT NUMBER
                               2808   *
          0000 231CI           2809   MODE1    EQU    *
00231CI   F540 0001 0000       2810            CLI    R4,BIT17           RACE CONDITION?
002322I   4330 FF84            2811            BE     MODE0.0
002326I   D351 0000            2812            LB     R5,0(R1)           PICK UP STATUS BITS
00232AI   C450 00F0            2813            NHI    R5,X'F0'           LEAVE ONLY LOCK OUT BITS
00232EI   4330 4000 2340I      2814            BZ     MODE1.0            IF NOT SET ,CONTINUE
002334I   2430                 2815            LIS    R3,0               SET,SO LETS HANG UP THE LINE
002336I   E640 4000 6470I      2816            LA     R4,M.RJHANG
00233CI   4300 FF72            2817            B      MODE0.1B
002340I   F440 0008 0006       2818   MODE1.0  NI     R4,M1.MASK
002346I   4330 FF3A            2819            BZ     ILL.MSG            BAD MESSAGE,SEND NAK BACK
00234AI   1042                 2820            SRLS   R4,2
00234CI   4280 FF9E            2821            BC     MODE1.1            ACCOUNT NUMBER GIVEN
002350I   1041                 2822            SRLS   R4,1               ILLEGAL ACCT RECEIVED
002352I   4380 4000 2302I      2823            BNC    MODE1.3            NO- CUSTOMER MUST OF HUNG UP
                               2824   *
          0000 2358I           2825   MODE1.2  EQU    *                  ILLEGAL ACCT NUMBER,DISPLAY IT
002358I   E6D0 4000 614CI      2826            LA     R13,LNUMBR         ADDRESS OF WHERE LINE NUMBER GOES
00235EI   4840 4000 5F2CI      2827            LH     R4,PORTNUMR
002364I   41C0 E90A            2828            BAL    R12,DIVIDE
002368I   D250 0000            2829            STB    R5,0(R13)
00236CI   D240 0001            2830            STB    R4,1(R13)
002370I   E6C0 4000 6138I      2831            LA     R12,ILL.MESG       ADDRESS OF MESSAGE
002376I   E630 4000 615AI      2832            LA     R3,ADR.ACT         ADDRESS OF ACCOUNT NUMBER
          0000 237CI           2833   MOD1.GEO EQU    *
```

```
    TDX SYSTEM MAIN CONTROL PROGRAM                                  PAGE  52   15:52:44  01/27/77
                                                  -continued
00237CI  C840 2020          2834            LHI    R4,C'  '
002380I  035A 005B          2835            LB     R5,ACT.DGTS(R10)    NUMBER OF DIGITS
002384I  2751               2836            SIS    R5,1
002386I  4043 0000          2837            STH    R4,0(R3)
00238AI  4043 0002          2838            STH    R4,2(R3)
00238EI  4043 0004          2839            STH    R4,4(R3)
002392I  4043 0006          2840            STH    R4,6(R3)
002396I  0342 4500 0003     2841   MD1.2B   LB     R4,3(R2,R5)
00239CI  C440 000F          2842            NHI    R4,X'F'
0023A0I  C540 000A          2843            CLHI   R4,X'A'             PHONE ZERO
0023A4I  4230 4000 23ACI    2844            BNE    MD1.2C              NO
0023AAI  2440               2845            LIS    R4,0
0023ACI  C440 0030          2846   MD1.2C   AHI    R4,C'0'
0023B0I  0243 4500 0000     2847            STB    R4,0(R3,R5)
0023B6I  2751               2848            SIS    R5,1
0023B8I  4310 FFDA          2849            BNM    MD1.2B

    TDX SYSTEM MAIN CONTROL PROGRAM                                  PAGE  53   15:52:55  01/27/77

0023BCI  084C               2850            LR     R4,R12
0023BEI  C8C0 0006          2851            LHI    R12,CRT1
0023C2I  02C0 4000 5FFBI    2852            STB    R12,TTYLU
0023C8I  41C0 4000 45D8I    2853            BAL    R12,TTYMSG
0023CEI  4300 FEB0          2854            B      ILL.MSG             CLEAN IT UP
0023D2I  E640 4000 645CI    2855   MODE1.3  LA     R4,M.ACK
0023D8I  2430               2856            LIS    R3,0
0023DAI  D231 0000          2857            STB    R3,0(R1)            SET LINE FREE
0023DEI  4300 FDD0          2858            B      MODE0.1B
0023E2I  E640 4000 6460I    2859   ARCD3    LA     R4,M.RETRY
0023E8I  D331 0017          2860            LB     R3,LN.SUBC(R1)
0023ECI  2631               2861            AIS    R3,1
0023EEI  C530 0002          2862            CLHI   R3,2
0023F2I  4380 FE8C          2863            BNC    ILL.MSG
0023F6I  D231 0017          2864            STB    R3,LN.SUBC(R1)
0023FAI  4300 FDB8          2865            B      MODE0.1F
         0000 23FEI         2866   MOD2.GEO EQU    *
0023FEI  4840 4000 5F2CI    2867            LH     R4,PORTNUMR
002404I  41C0 E93A          2868            BAL    R12,DIVIDE
002408I  0250 4000 6441I    2869            STB    R5,GEOLN1
00240EI  0240 4000 6442I    2870            STB    R4,GEOLN2
002414I  E630 4000 644FI    2871            LA     R3,GEO.ACCT
00241AI  E6C0 4000 6430I    2872            LA     R12,GEO.ERR
002420I  4300 FF5A          2873            B      MOD1.GEO
                            2874   *
         0000 2424I         2875   MODE2    EQU    *
002424I  F540 0001 0000     2876            CLI    R4,BIT17
00242AI  4330 FD7C          2877            BE     MODE0.0             THIS IS A LATE BI MESSAGE ,IGNORE IT
00242EI  F440 07F8 0038     2878            NI     R4,M2.MASK          CHECK FOR LEGAL MESSAGE
002434I  4330 FF4A          2879            BZ     ILL.MSG             BAD MESSAGE,SEND BACK NAK
002438I  1044               2880            SRLS   R4,4                PHONE NUMBER GIVEN?
00243AI  4380 4000 2A04I    2881            BNC    MODE2.1             NO-CHECK OTHER MESSAGE TYPES
002440I  C840 00FF          2882            LHI    R4,X'FF'
002444I  4040 4000 5F76I    2883            STH    R4,ADNIND
00244AI  D240 4000 5FF5I    2884            STB    R4,OPTIONS
002450I  4300 4000 249AI    2885            B      PEAK.8
         0000 2456I         2886   PEAK     EQU    *
                            2887   *
                            2888   *    CHECK FOR PEAK HOUR RESSTRICTIONS
                            2889   *
002456I  D361 0004          2890            LB     R6,LN.TEMP(R1)      MAYBE FIRST BYTE OF ACCOUNT
00245AI  D351 0003          2891            LB     R5,SYS.FLAG(R1)     BUT,DO WE HAVE A BUFFER?
00245EI  C550 0002          2892            CLHI   R5,2
002462I  2135               2893            BNES   PEAK.1              NO
002464I  5851 0004          2894            L      R5,LN.TEMP(R1)      YES,PICK UP BUFFER ADDRESS
002468I  D365 0000          2895            LB     R6,0(R5)            PICK UP REAL FIRST BYTE
00246CI  C560 0088          2896   PEAK.1   CLHI   R6,X'88'            RESTRICTED ACCOUNT
002470I  4330 4000 247CI    2897            BE     PEAK.2              YES
002476I  C560 0089          2898            CLHI   R6,X'89'            NO,HOW ABOUT '9' SERIES
00247AI  023C               2899            BNER   R12                 NO,ACCOUNTS ARE OK
         0000 247CI         2900   PEAK.2   EQU    *
00247CI  584A 0018          2901            L      R4,ADR.CMP2(R10)
002480I  4864 0002          2902            LH     R6,2(R4)            SIZE OF QUEUE
002484I  D38A 005B          2903            LB     R8,PEAK.R1(R10)     PEAK DIVIDE NU,BER
002488I  0888               2904            LR     R8,R8               DO THEY WANT PEAK HOUR?
00248AI  033C               2905            BZR    R12                 NO

    TDX SYSTEM MAIN CONTROL PROGRAM                                  PAGE  54   15:53:09  01/27/77

00248CI  4060 4000 5F22I    2906            CH     R6,THREE            NUMBER OF CURRENT ENTRIES
002492I  0978               2907            CR     R7,R8
002494I  028C               2908            BCR    R12
002496I  4300 FDE8          2909            B      ILL.MSG             HANG PERSON UP
         0000 249AI         2910   PEAK.8   EQU    *
00249AI  5851 0004          2911            L      R5,LN.TEMP(R1)      PICK UP TEMP BUFFER
00249EI  D365 0000          2912            LB     R6,0(R5)
0024A2I  C560 008A          2913            CLHI   R6,PRIORITY         PRIORITY ACCOUNT?
0024A6I  2333               2914            BES    PEAK.BP
0024A8I  D36A 006F          2915            LB     R6,BEEPER(R10)      DO THEY WANT A BEEPER?
0024ACI  4060 4000 5F0AI    2916   PEAK.BP  STH    R6,BEEPFLG          SAVE BEEPER CODE
0024B2I  D261 0011          2917            STB    R6,CB.FLAG(R1)      SAVE CODE IN IO LINE TABLE
0024B6I  D341 0001          2918            LB     R4,CLASS.IN(R1)
0024BAI  C440 000F          2919            NHI    R4,X'F'
0024BEI  C540 000F          2920            CLHI   R4,WATTS
0024C2I  4380 4000 2776I    2921            BNC    MODE2.W             GIVES WATTS AND LOCAL
0024C8I  4850 4000 5F56I    2922            LH     R5,IND
0024CEI  2139               2923            BNZS   MODE2.0             IF INTERNATIONAL,SKIP LENGTH CHECK
0024D0I  4840 4000 5F72I    2924            LH     R4,MSGCNT
0024D6I  C540 0008          2925            CLHI   R4,11
```

```
0024DAI  4330 4000 2776I                 BF    MODE2.W
0024E0I  C850 004E           MODE2.0     LHI   R5,C'N'
0024E4I  D250 4000 5FF6I                 STB   R5,DIVER            SET FOR NO DIVERSION
0024EAI  5840 4000 58EAI     MODE2.1P    L     R4,CUSTABLE         RESTORE THE AREA CODE
0024F0I  D352 0002                       LB    R5,2(R2)            FOR THE LOOKUP ROUTINE
0024F4I  4050 4000 5F34I                 STH   R5,AREACD
0024FAI  D352 0003                       LB    R5,3(R2)
0024FEI  D250 4000 5F3AI                 STB   R5,AREACD1
002504I  D352 0004                       LB    R5,4(R2)
002508I  D250 4000 5F3BI                 STB   R5,AREACD1+1
00250EI  4850 4000 5F56I                 LH    R5,IND              INTERNATIONAL CALL?
002514I  233B                            BZS   MODE2.R1
         0000 2516I          MODE2.1C    EQU   *
002516I  2449                            LIS   R4,LD
002518I  4040 4000 5F3CI                 STH   R4,ARCDNEED
00251EI  4040 4000 5F42I                 STH   R4,LDFG
002524I  4300 4000 268EI                 B     MODE2.J1
         0000 252AI          MODE2.R1    EQU   *
00252AI  C850 0085                       LHI   R5,X'85'            LETS LOOK FOR INFORMATION NUMBER
00252EI  D452 0005                       CLB   R5,5(R2)
002532I  4230 4000 2560I                 BNE   MODE2.C6            NOT IT
002538I  D452 0006                       CLB   R5,6(R2)
00253CI  4230 4000 2560I                 BNE   MODE2.C6
002542I  D452 0007                       CLB   R5,7(R2)            LAST ONE
002546I  4230 4000 2560I                 BNE   MODE2.C6
00254CI  4050 4000 5F34I                 STH   R5,AREACD           SET UP DUMMY AREA CODE
002552I  C850 8A8A                       LHI   R5,X'8A8A'          SET UP AREA CODE 500
002556I  4050 4000 5F3AI                 STH   R5,AREACD1
00255CI  4300 FFB6                       B     MODE2.1C
         0000 2560I          MODE2.C6    EQU   *
002560I  D361 0004                       LB    R6,LN.TEMP(R1)      PICK UP FIRST ACCOUNT DIGIT
002564I  D351 0003                       LB    R5,SYS.FLAG(R1)     WAS THERE A BUFFER
002568I  C550 0002                       CLHI  R5,2
00256CI  2135                            BNES  MD.C6               NO
00256EI  5851 0004                       L     R5,LN.TEMP(R1)      PICK UP REAL FIRST DIGIT
002572I  D365 0000                       LB    R6,0(R5)
```

```
         0000 2576I          MD.C6       EQU   *
002576I  0755                            XR    R5,R5
002578I  C560 008A                       CLHI  R6,PRIORITY
00257CI  2132                            BNES  MODE2.C             NO
00257EI  2451                            LIS   R5,1                SET PRIORITY
002580I  4050 4000 5F42I     MODE2.C     STH   R5,LDFG
002586I  4040 4000 5F18I                 STH   R4,PACCT            SAVE CODE FOR PRIORITY
00258CI  5824 0018                       L     R2,ADR.CMP2(R4)     NUMBER OF ENTRIES IN QUEUE
002590I  C560 0081                       CLHI  R6,EXPEDITE         SUB PRIOTITY ACCOUNT
002594I  2133                            BNES  MODE2.CA
002596I  5824 006A                       L     R2,ADR.CMP3(R4)
         0000 259AI          MODE2.CA    EQU   *
00259AI  4862 0002                       LH    R6,2(R2)
00259EI  4D60 4000 5F22I                 DH    R6,THREE            TURN INTO CUSTOMERS
0025A4I  4974 003E                       CH    R7,THRS.CP2(R4)     COMPARE IT TO MAX ALLOWED
0025A8I  2325                            BNPS  MODE2.C2
         0000 25AAI          MODE2.C5    EQU   *
0025AAI  2451                            LIS   R5,1
0025ACI  4050 4000 5F42I                 STH   R5,LDFG             THRESHOLD EXCEEDED, LOOK FOR A LOCAL LI
         0000 25B2I          MODE2.C2    EQU   *
0025B2I  5850 4000 58DCI                 L     R5,SVCBLK           ADDRESS OF SVC BLOCK
0025B8I  5825 0018                       L     R2,SC15.BRA(R5)     BUFFER ADDRESS
0025BCI  2626                            AIS   R2,6
0025BEI  5020 4000 58E0I                 ST    R2,PHONE
0025C4I  5824 000A                       L     R2,ADR.ARCD(R4)     ADDRESS OF AREA CODE TABLE
0025C8I  41D0 4000 4782I                 BAL   R13,ARCDSR
0025CEI  4830 4000 5F3CI                 LH    R3,ARCDNEED         LOOK FOR LINE IN USE
0025D4I  C530 0009                       CLHI  R3,LD               IS IT A LOCAL ONE?
0025D8I  2333                            BES   MODE2.P             YES ,NO CHECK NEEDED
0025DAI  41C0 FF7A                       BAL   R12,PEAK            CHECK BUSY HOUR RESTRICTION
         0000 25DEI          MODE2.P     EQU   *
0025DEI  4830 4000 5F18I                 LH    R3,PACCT            LOOK FOR PRIORITY ACCOUNT
0025E4I  4230 4000 2614I                 BNZ   MODE2.R2            IGNOE CHECK IF PRIORITY
0025EAI  D33A 006C                       LB    R3,G.RESTR(R10)     IS USER RESTRICTED FOR CERTAIN AREA COD
0025EEI  0833                            LR    R3,R3
0025F0I  4330 4000 2614I                 BZ    MODE2.R2            FOR A GROUP,NO
0025F6I  5821 0004                       L     R2,LN.TEMP(R1)      LOOK AT USERS ACCOUNT CODE
0025FAI  D362 0001                       LB    R6,1(R2)            LOOK AT RESTRICTION BYTE
0025FEI  C460 000F                       NHI   R6,X'F'
002602I  C560 000A                       CLHI  R6,X'A'             ZERO?
002606I  2132                            BNES  MOD2.G1             NO
002608I  2460                            LIS   R6,0                YES,SET CODE TO ZERO
         0000 260AI          MOD2.G1     EQU   *
00260AI  2723                            SIS   R2,3                SET UP FOR PRINTOUT
00260CI  2661                            AIS   R6,1
00260EI  0964                            CR    R6,R4
002610I  4280 F0EA                       BC    MOD2.GF0            USER CANNOT GO TO THIS AREA
         0000 2614I          MODE2.R2    EQU   *
002614I  41D0 4000 38FCI                 BAL   R13,EXCHLOOK        LOOK UP AREA CODE IN EXCHANGE TABLE
00261AI  5870 4000 58CCI                 L     R7,LINEADR          RELOAD I/O LINE TABLE ADDRESS
002620I  0855                            LR    R5,R5               WAS A LINE FOUND?
002622I  4210 4000 2640I                 BM    MODE2.J0            NO,DO OTHER CHECKS
                             *
                             *     SET UP OUTPUT OF A TIE OR FX LINE
                             *
002628I  5890 4000 5910I                 L     R9,SAVER7
```

```
00262EI  4880 4000 5F52I                 LH     R8,EXCODE               EXCHANGE CODE
002634I  4080 4000 5F5EI                 STH    R8,CALLCODE             SAVE CALLBACK CODE
00263AI  4300 4000 26B6I                 B      MODE2.E1                GO STORE IT
                                *
                                *   NO LINE COULD BE FOUND
                                *
         0000 2640I             MODE2.JO EQU    *
002640I  4850 4000 5F5AI                 LH     R5,CBFLAG               DO WE HAVE A CALLBACK CASE?
002646I  4330 4000 288AI                 BZ     MODE.MAR                LOOK FOR MARRIED SATELLITES
         0000 264CI             MODE2.M1 EQU    *
00264CI  5850 4000 5910I                 L      R5,SAVER7               LOOK FOR A TANDEM TIE LINE
002652I  0385 0002                       LB     R8,EXCH.NT(R5)          LOOK AT NUMBER OF ACCESSES
002656I  4840 4000 5F52I                 LH     R4,EXCODE               CALLBACK CODE
00265CI  4040 4000 5F5EI                 STH    R4,CALLCODE             SAVE IT
002662I  0854                            LR     R5,R4
002664I  4840 4000 5F3CI                 LH     R4,ARCDNEED             WATS BAND NEEDED
00266AI  48C0 4000 5F1PI                 LH     R12,PACCT
002670I  4230 4000 26A8I                 BNZ    MODE2.J3                PRIORITY ACCOUNT, GET ANOTHER LINE
002676I  C450 0008                       NHI    R5,X'8'                 CAN WE ALSO LOOK FOR A WATTS LINE?
00267AI  4230 4000 26A8I                 BNZ    MODE2.J3                YES
002680I  0888                            LR     R8,R8                   IF NON TANDEM OR FX , QUEUE IT
002682I  4330 4000 2934I                 BZ     MODE2.8
002688I  4300 4000 28D6I                 B      MODE2.BC
                                *
                                *   TANDEM TIE-LINE , LOOK FOR A WATTS
                                *
         0000 268EI             MODE2.J1 EQU    *
00268EI  C850 0008                       LHI    R5,B.DDD                DDD LINE ONLY
002692I  4340 4000 5F3CI                 LH     R4,ARCDNEED             WATTS BAND NEEDED
002698I  C540 0009                       CLHI   R4,LD                   DO WE NEED A LOCAL LINE?
00269CI  2333                            BES    MODE2.J2                YES
00269EI  C850 000C                       LHI    R5,B.WATTS+B.DDD        SET CALLLBACK CODE FOR WATTS + DDD
         0000 26A2I             MODE2.J2 EQU    *
0026A2I  4050 4000 5F5EI                 STH    R5,CALLCODE
         0000 26A8I             MODE2.J3 EQU    *
0026A8I  41C0 4000 3FBEI                 BAL    R12,CHKLNTBL
         0000 26AEI             MODE2.C4 EQU    *
0026AEI  0855                            LR     R5,R5                   ATB?
0026B0I  4210 4000 2934I                 BM     MODE2.8
         0000 26B6I             MODE2.E1 EQU    *
0026B6I  5810 4000 58DCI                 L      R1,SVCBLK               SVC BLOCK ADDRESS
0026BCI  5821 0018                       L      R2,SC15.BRA(R1)         READ BUFFER ADDRESS
0026C0I  2626                            AIS    R2,6                    POSITION TO PHONE NUMBER
         0000 26C2I             MODE2.C3 EQU    *
0026C2I  5020 4000 58F0I                 ST     R2,PHONE                SAVE IT
0026C8I  5820 4000 58F0I                 L      R2,PHONE
0026CEI  4840 4000 5F5EI                 LH     R4,CALLCODE
0026D4I  D247 0015                       STB    R4,CAMP.CNT(R7)         SAVE CALLBACK CODE
0026D8I  4840 4000 5F3CI                 LH     R4,ARCDNEED
0026DEI  D247 0016                       STB    R4,CON.FLAG(R7)
         0000 26E2I             MODE2.CM EQU    *
0026E2I  2486                            LIS    R8,6
0026E4I  D257 000B                       STB    R5,LN.WAT(R7)           WATTS BAND BEING USED
0026E8I  D340 4000 5FF3I                 LB     R4,ASERV                ACTUAL SERVICE CODE
0026EEI  C540 000A                       CLHI   R4,TIE                  TIE LINE
0026F2I  4230 4000 2708I                 BNE    MODE2.CL                NO
```

```
0026F8I  5840 4000 5910I                 L      R4,SAVER7
0026FEI  D3D4 0004                       LB     R13,EXCH.T1(R4)         TANDEM TIE LINE?
002702I  08DD                            LR     R13,R13
002704I  2332                            BZS    MODE2.CL                NO
002706I  248E                            LIS    R8,MODETT               SET SET UP SPECIAL STATE
         0000 2708I             MODE2.CL EQU    *
002708I  0843                            LR     R4,R3
00270AI  D287 0002                       STB    R8,SYS.STAT(R7)
00270EI  41D0 4000 4F58I                 BAL    R13,IDOPHONE            SEND OUT RESPONE
002714I  5820 4000 58F0I                 L      R2,PHONE
00271AI  41D0 4000 545CI        MODE2.C1 BAL    R13,WRTWAREA            WRITE OUT WORK AREA
002720I  D341 0003                       LB     R4,SYS.FLAG(P1)
002724I  C540 0002                       CLHI   R4,2                    DO WE HAVE A BUFFER
002728I  4330 4000 2756I                 BE     MODE2.D1                YES
00272EI  41C0 4000 52AFI                 BAL    R12,GETBUFR
002734I  2452                            LIS    R5,2
002736I  D251 0003                       STB    R5,SYS.FLAG(R1)
00273AI  5851 0004                       L      R5,LN.TEMP(R1)          PICK UP ACCOUNT CODE
00273EI  5054 000C                       ST     R5,CMP.UACT(R4)
002742I  5041 0004                       ST     R4,LN.TEMP(R1)          SAVE TEMP BUFFER ADDRESS
002746I  2457                            LIS    R5,L.SACT-1
002748I  C860 0090                       LHI    R6,XORBLANK
00274CI  D265 4400 000B         MODE2.D3 STB    R6,CMP.SACT(R5,R4)
002752I  2751                            SIS    R5,1
002754I  2214                            BNMS   MODE2.D3
002756I  5841 0004              MODE2.D1 L      R4,LN.TEMP(R1)
00275AI  5820 4000 58F0I                 L      R2,PHONE                ADDRESS OF PHONE NUMBER
002760I  2459                            LIS    R5,9
002762I  D362 4500 0000         MODE2.D2 LB     R6,0(R2,R5)             STORE PHONE NUMBER IN TEMP BUFFER
002768I  D264 4500 0016                  STB    R6,CMP.PHN(R4,R5)
00276EI  2751                            SIS    R5,1
002770I  2217                            BNMS   MODE2.D2
002772I  4300 F3C8                       B      Q.COMM
002776I  4840 4000 5F72I        MODE2.W  LH     R4,MSGCNT               LOOK FOR MORE WORK
00277CI  C540 000B                       CLHI   R4,11                   LENGTH OF MESSAGE
002780I  4230 4000 27E0I                 BNE    MODE2.W1                LOCAL CALL
002786I  C840 004E                       LHI    R4,C'N'                 NO
00278AI  D240 4000 5FF6I                 STB    R4,DIVER                SET FOR NO DIVERSION
002790I  2541                            LCS    R4,1
002792I  4040 4000 5F42I                 STH    R4,LDFG
```

```
TDX SYSTEM MAIN CONTROL PROGRAM                                    PAGE  57   15:53:45  01/27/77
-continued
0027981  4040 4000 5F40I        3114          STH    R4,PCKARCD           SET UP PACKED AREA CODE
00279FT  C840 000E              3115          LHI    R4,B.ODD             LOCAL LINE FOR CALLBACK
0027A2I  4040 4000 5F5EI        3116          STH    R4,CALLCODE
0027A8I  2449                   3117          LIS    R4,LD                LOCAL LINE
0027AAT  4040 4000 5F3CI        3118          STH    R4,ARCDNEED
0027B0I  0240 4000 5E9CI        3119          STB    R4,ATB.BSER
0027B6T  41C0 4000 3FBFI        3120          BAL    R12,CHKLNTBL
0027BCI  0855                   3121          LR     R5,R5
0027BFI  4210 4000 2934I        3122          BM     MODE2.B
0027C4T  5810 4000 5BDCI        3123          L      R1,SVCBLK
0027CAT  5821 001A              3124          L      R2,SC15.BRA(R1)
0027CEI  C880 8A8A              3125          LHI    R8,X'8A8A'
0027D2T  0282 0003              3126          STB    R8,3(R2)
0027D6I  4082 0004              3127          STH    R8,4(R2)
0027DAT  2623                   3128          AIS    R2,3
0027DCT  4300 FFE2              3129          B      MODE2.C3

TDX SYSTEM MAIN CONTROL PROGRAM                                    PAGE  58   15:53:59  01/27/77

0027E0I  5880 4000 5BEBI        3130 MODE2.W1 L      R8,CUSTABLE          CUSTOMER TABLE ADDRESS
0027E6I  D358 0036              3131          LB     R5,COD.DVRS(R8)      DIVERSION CODE
0027EAI  0855                   3132          LR     R5,R5
0027ECT  4330 4000 2848I        3133          BZ     MODE2.W3             NO DIVERSION CODE GIVEN
0027F2T  2439                   3134          LIS    R3,9
0027F4T  D343 4200 0002         3135 MODE2.W2 LB     R4,2(R3,R2)          CHECK CALLED NUMBER FOR MASTER
0027FAI  D443 4800 0022         3136          CLB    R4,PHN.MSTR(R3,R8)   EQUAL?
002800T  4230 4000 2848I        3137          BNE    MODE2.W3             NO
002806T  2731                   3138          SIS    R3,1
002808T  221A                   3139          BNMS   MODE2.W2             STILL DIGITS LEFT
                                3140 *  NUMBER MATCHES,CHECK FOR DIVERSION TIME
00280AI  E120 4000 56ECI        3141          SVC    2,TIME1              PICK UP CURRENT TIME
002810T  C450 000F              3142          NHI    R5,Y'F'
002814I  1152                   3143          SLLS   R5,2                 PUT TO ADDRESS MODE
002816T  5865 4000 5958I        3144          L      R6,LAST.TME(R5)      PICK UP DIVERSION TIME
00281CT  5960 4000 56F4I        3145          C      R6,SPT.TIME          COMPARE TO CURRENT TIME
002822I  4380 4000 2848T        3146          BNC    MODE2.W3             NOT TIME YET
002828T  C860 0059              3147          LHI    R6,C'Y'
00282CT  D260 4000 5FF6I        3148          STB    R6,DIVER             SET UP DIVERSIUON MODE
002832T  2439                   3149          LIS    R3,9
002834I  D343 4800 002C         3150 MODE2.W4 LB     R4,PHN.DVRS(R3,R8)   REPLACE WITH DVERSION NUMBER
00283AI  0243 4200 0002         3151          STB    R4,2(R3,R2)
002840T  2731                   3152          SIS    R3,1
002842T  2217                   3153          BNMS   MODE2.W4
002844T  4300 FCA2              3154          B      MODE2.1B             CONTINUE ON
         0000 2848I             3155 MODE2.W3 EQU    *
002848T  0341 0001              3156          LB     R4,CLASS.IN(R1)      INPUT LINE CLASS
00284CI  C540 000E              3157          CLHI   R4,WATTS             INWATTS CALL?
002850T  4230 FC8C              3158          BNE    MODE2.0              NO,MUST BE LOCAL. SET IT UP AS NORMAL C
002854T  C840 8A8A              3159          LHI    R4,X'8A8A'           SET AREA CODE TO ZERO
002858T  4042 0002              3160          STH    R4,2(R2)
00285CT  D242 0004              3161          STB    R4,4(R2)
002860T  2541                   3162          LCS    R4,1
002862T  4040 4000 5F42I        3163          STH    R4,LDFG
002868T  4040 4000 5F40I        3164          STH    R4,PCKARCD           SET UP PACKED AREA CD
00286ET  C840 000A              3165          LHI    R4,B.DDD             SET UP CALLBACK FOR DDD LINE
002872T  4040 4000 5F5EI        3166          STH    R4,CALLCODE
002878T  2449                   3167          LIS    R4,LD
00287AT  4040 4000 5F3CI        3168          STH    R4,ARCDNEED
002880T  41C0 4000 3FBEI        3169          BAL    R12,CHKLNTBL
002886T  4300 FF24              3170          B      MODE2.C4
                                3171 *
         0000 288AI             3172 MODE.MAR EQU    *                    LOOK FOR MARRIED SATELLITES
00288AT  58A0 4000 5BEBI        3173          L      R10,CUSTABLE
002890I  24B8                   3174          LIS    R11,8                MAX OF 8 MARRIAGES
002892T  D34A 0060              3175 MODE.M2  LB     R4,SPOUSE(R10)       ANY MORE LEFT
002896T  0844                   3176          LR     R4,R4
002898T  4330 FDF2              3177          BZ     MODE2.J1             ALL DONE,LOOK FOR WATTS LINE
00289CI  1142                   3178          SLLS   R4,2
00289ET  E650 4000 7C00         3179          LA     R5,LOADPARM
0028A4T  5865 0004              3180          L      R6,ADR.PORT(R5)
0028A8T  5894 4600 0000         3181          L      R9,0(R4,R6)
0028AFT  4100 4000 38F4I        3182          BAL    R13,EXCH.MAR         CKECK EXCHANGE TABLE
0028B4T  5870 4000 58CCI        3183          L      R7,LINEADR           RESTORE LINE ADDRESS
0028BAT  4860 4000 5F5AI        3184          LH     R6,CBFLAG            WAS  AN ENTRY FOUND?
0028C0T  4230 FD88              3185          BNZ    MODE2.M1             YES

TDX SYSTEM MAIN CONTROL PROGRAM                                    PAGE  59   15:54:17  01/27/77

0028C4T  26A1                   3186          AIS    R10,1                NO , LOOK UP NEXT ENTRY
0028C6T  27B1                   3187          SIS    R11,1
0028C8T  4230 FFC6              3188          BNZ    MODE.M2
0028CCT  58A0 4000 5BEBI        3189          L      R10,CUSTABLE         RELOAD CUSTOMER DATA BASE
0028D2T  4300 FDB8              3190          B      MODE2.J1             ALL DONE LOOK FOR WATTS
         0000 28D6I             3191 MODE2.BC EQU    *
0028D6T  4080 4000 5EF6I        3192          STH    R8,CALL.COD
0028DCI  5050 4000 5910I        3193          ST     R5,SAVER7
0028E2T  0357 0001              3194          LB     R5,CLASS.IN(R7)      CHECK FOR PROPER INPUT LINE FOR CALL BA
0028E6I  C450 000F              3195          NHI    R5,X'F'
0028EAT  C550 000E              3196          CLHI   R5,WATTS             WATS OR LOCAL LINE?
0028EET  4380 4000 2AC2T        3197          BNL    MODE2.B6             YES
0028F4T  41C0 4000 52AFI        3198          BAL    R12,GETBUFR          PICK UP 2ND BUFFER
0028FAI  5857 0004              3199          L      R5,LN.TEMP(R7)       ADDRESS OF 1ST TEMP BUFFER
0028FEI  5865 000A              3200          L      R6,L.SACT(R5)
002902I  5064 0000              3201          ST     R6,0(R4)
002906T  5045 000A              3202          ST     R4,L.SACT(R5)        SAVE ADDRESS
00290AT  5860 4000 5870I        3203          L      R6,TANDEM
002910I  5064 0004              3204          ST     R6,4(R4)
```

```
     TDX SYSTEM MAIN CONTROL PROGRAM                                PAGE  59   15:54:17  01/27/77

002914I  5860 4000 5874I                L     R6,TANDEM+4
00291AI  5064 0008                      ST    R6,8(R4)
00291EI  5860 4000 5878I                L     R6,TANDEM+8
002924I  5064 000C                      ST    R6,12(R4)
00292AI  5850 4000 5910I                L     R5,SAVER7
00292EI  4300 4000 2948I                B     MODE2.CB
                                 *
         0000 2934I              MODE2.B  EQU   *                 ALL TRUNKS BUSY
002934I  4830 4000 5F56I                LH    R3,IND              INTERNATIONAL CALL?
00293AI  4230 4000 2ACCI                BNZ   MODE2.B7            YES,DONOT QUEUE
002940I  0733                           XR    R3,R3
002942I  4030 4000 5EF6I                STH   R3,CALL.COD         SET CODE FOR NON TANDEM TIELINE
         0000 2948I              MODE2.CB EQU   *
002948I  2485                           LIS   R8,5                ATB  CODE
00294AI  D287 0002                      STB   R8,SYS.STAT(R7)     SAVE IT
00294EI  D357 0001                      LB    R5,CLASS.IN(R7)     LOOK AT INPUT LINE CLASS
002952I  C450 000F                      NHI   R5,X'F'
002956I  C550 000F                      CLHI  R5,WATTS            PBX OR CENTREX LINE?
00295AI  4360 4000 2AC2I                BNL   MODE2.B6            NO,GIVE ATB BUT HANG UP LINE LATER
002960I  4340 4000 5F0AI                LH    R4,BEEPFLG          BEEPER FLAG
002966I  D247 0011                      STB   R4,CB.FLAG(R7)      SAVE BEEPER FLAG
00296AI  4840 4000 5F3CI                LH    R4,ARCDNEED         RESTORE AREA CODE NEEDED
002970I  D247 0016                      STB   R4,CON.FLAG(R7)
002974I  4840 4000 5F60I                LH    R4,LINENEED
00297AI  D247 0008                      STB   R4,LN.WAT(R7)       SAVE AREA CODE NEEDED
00297EI  D240 4000 5E9CI                STB   R4,ATB.BSER         SAVE AREA SERVICE CODE
002984I  4840 4000 5F5EI                LH    R4,CALLCODE
00298AI  D247 0015                      STB   R4,CAMP.CNT(R7)
00298EI  4840 4000 5F54I                LH    R4,EXSUB
002994I  D247 0017                      STB   R4,LN.SUBC(R7)
002998I  D347 0003                      LB    R4,SYS.FLAG(R7)
00299CI  C540 0002                      CLHI  R4,2                DO WE HAVE A TEMP BUFFER
0029A0I  4330 4000 29CFI                BE    MOD2.B2
0029A6I  41C0 4000 52AFI                BAL   R12,GETBUFR         PICK UP 24 BYTE BUFFER
0029ACI  2452                           LIS   R5,2
0029AEI  D257 0003                      STB   R5,SYS.FLAG(R7)
0029B2I  5857 0004                      L     R5,LN.TEMP(R7)      ACCOUNT NUMBER


     TDX SYSTEM MAIN CONTROL PROGRAM                                PAGE  60   15:54:30  01/27/77

0029B6I  5054 0000                      ST    R5,CMP.UACT(R4)
0029BAI  5047 0004                      ST    R4,LN.TEMP(R7)
0029BEI  2457                           LIS   R5,L.SACT-1
0029C0I  C860 0090                      LHI   R6,XORBLANK         FILL IN REST AS BLANKS
0029C4I  D265 4400 0008          MODE2.B1 STB   R6,CMP.SACT(R5,R4)
0029CAI  2751                           SIS   R5,1
0029CCI  2214                           BNMS  MODE2.B1
                                 *
                                 *            FILL IN PHONE NUMBER
         0000 29CFI              MOD2.B2  EQU   *
0029CEI  5850 4000 58DCI                L     R5,SVCBLK
0029D4I  5825 001A                      L     R2,SC15.BRA(R5)     OUTPUT BUFFER ADDRESS
         0000 29DAI              MODE2.B2 EQU   *
0029DAI  5847 0004                      L     R4,LN.TEMP(R7)      ADDRESS OF BLOCK
0029DCI  4850 4000 5EF6I                LH    R5,CALL.COD
0029E2I  D254 0020                      STB   R5,CMP.PHN+16(R4)
0029E6I  245F                           LIS   R5,15               NUMBER OF DIGITS
0029E8I  D362 4500 0006          MODE2.B3 LB    R6,6(R2,R5)
0029EEI  D264 4500 0010                 STB   R6,CMP.PHN(R4,R5)
0029F4I  C760 0080                      XHI   R6,XMASK            TURN IT INTO ASCII
0029FAI  C560 003A                      CLHI  R6,XZERO
0029FCI  2133                           BNES  MODE2.B4
0029FEI  C860 0030                      LHI   R6,X'30'
002A02I  D265 4000 5EA2I         MODE2.B4 STB   R6,ATB.PHN(R5)
002A08I  2751                           SIS   R5,1
002A0AI  4310 FFDA                      BNM   MODE2.B3
002A0EI  4860 4000 5F2EI                LH    R6,LINENUMR         INPUT LINE NUMBER
002A14I  D260 4000 5E99I                STB   R6,ATB.INLN
002A1AI  4860 4000 5F2CI                LH    R6,PORTNUMR         LOGICAL PORT NUMBER
002A20I  4060 4000 5E9AI                STH   R6,ATB.PORT
002A26I  E120 4000 56CCI                SVC   2,TIME              PICK UP CURRENT TIME
002A2CI  4860 4000 56D4I                LH    R6,TIME.HH
002A32I  4060 4000 5EB6I                STH   R6,ATB.TIME
002A38I  4860 4000 56DAI                LH    R6,TIME.SS
002A3EI  4060 4000 5EBAI                STH   R6,ATB.TIME+4
002A44I  D360 4000 56D7I                LB    R6,TIME.M1
002A4AI  D260 4000 5EB8I                STB   R6,ATB.TIME+2
002A50I  D360 4000 56D8I                LB    R6,TIME.M2
002A56I  D260 4000 5EB9I                STB   R6,ATB.TIME+3
002A5CI  E640 4000 5FF4I                LA    R4,DATE
002A62I  2454                           LIS   R5,4
002A64I  D364 4500 0000          MODE2.B5 LB    R6,0(R4,R5)
002A6AI  D265 4000 5E9DI                STB   R6,ATB.DATE(R5)
002A70I  2751                           SIS   R5,1
002A72I  2217                           BNMS  MODE2.B5
002A74I  E660 4000 5E98I                LA    R6,ATB.MESG
                                 *                      IGNORE WRITE FOR NOW ********************
                                 *BAL*R12,WRTMAG
                                 *
                                 *    CHECK FOR CAMP ON
                                 *
002A7AI  5810 4000 58CCI                L     R1,LINEADR          LINE TABLE ADDRESS
002A80I  D34A 0053                      LB    R4,QUF.FLG(R10)
002A84I  0844                           LR    R4,R4
002A86I  4330 4000 2AC2I                BZ    MODE2.B6            NO CAMP-ON,USE CALLBACK
002A8CI  C540 0004                      CLHI  R4,4                EVERY ONE ON CAMP ON?
```

```
002A98I  4380 4000 2ABCI               BNC    MD2.CMP              YES
002A96I  5851 0004                     L      R5,LN.TEMP(R1)       TEMP BUBFER ADDRESS
002A9AI  0365 0000                     LB     R6,0(R5)             LOOK FOR PRIORITY ACCOUNT
002A9EI  C560 0082                     CLHI   R6,X'82'             ACCOUNT START WITH A 2
002AA2I  4230 4000 2AC2I               BNE    MODE2.B6             NO,PUT INTO CALLBACK
002AA4I  0241 0011           MD2.1     STB    R4,CR.FLAG(R1)       SAVE CAMP CODE
002AACI  2449                          LIS    R4,CMPMODE           SET UP CAMP MODE
002AAEI  0241 0002                     STB    R4,SYS.STAT(R1)
002AB2I  E640 4000 6468I     MD2.2     LA     R4,M.CMP             CAMP ON MESSAGE
002AB8I  4300 F6FA                     B      MODE0.1F
         0000 2ABCI          MD2.CMP   EQU    *
002ABCI  2743                          SIS    R4,3
002ABEI  4300 FFE6                     B      MD2.1
                             *
         0000 2AC2I          MODE2.B6  EQU    *
002AC2I  E640 4000 6464I               LA     R4,M.ATB             WRITE OUT ATB CODE
002AC8I  4300 F6EA                     B      MODE0.1F
         0000 2ACCI          MODE2.B7  EQU    *
002ACCI  4100 4000 4D9AI               BAL    R13,CLEAN.UP         CLEAR THE LINE
002AD2I  2208                          BS     MODE2.B6
                             *
                             *
002AD4I  1041                MODE2.1   SRLS   R4,1                 ADN REFERENCE NUMBER
002AD6I  4380 4000 2AECI               BNC    MODE2.2              NO
002ADCI  2433                          LIS    R3,ADNREF            SET FUNTION TO ADN REFERENCE
002ADEI  D230 4000 5FFEI     MODE2.1A  STB    R3,ADNFUNC
002AE4I  4100 4000 482AI               BAL    R13,READ.ADN
002AEAI  030F                          BR     R14
                             *
002AECI  1041                MODE2.2   SRLS   R4,1                 SPECIAL ACCOUNT NUMBER?
002AEEI  4380 4000 2B2CI               BNC    MODE2.3              NO - MUST BE SYSTEM COMMAND
                             *
002AF4I  2438                          LIS    R3,L.SACT
002AF6I  0352 0003           MODE2.2A  LB     R5,3(R2)
002AFAI  C550 00BC                     CLHI   R5,FOUND             END
002AFEI  4330 4000 2B1AI               BE     MODE2.2B
002B04I  D254 000B                     STB    R5,L.ACT(R4)
002B08I  2621                          AIS    R2,1
002B0AI  2641                          AIS    R4,1
002B0CI  2731                          SIS    R3,1
002B0EI  203C                          BNZS   MODE2.2A
002B10I  E640 4000 646CI     MODE2.2C  LA     R4,M.PACK            ACK MESSAGE WITH DIAL TONE
002B16I  4300 F69C                     B      MODE0.1F
                             *
002B1AI  C850 0090           MODE2.2B  LHI    R5,XORBLANK          BLANK FILL REST OF MESSAGE
002B1EI  D254 000B           MODE2.2D  STB    R5,L.ACT(R4)
002B22I  2641                          AIS    R4,1
002B24I  2731                          SIS    R3,1
002B26I  2034                          BNZS   MODE2.2D
002B28I  4300 FFE4                     B      MODE2.2C
                             *
002B2CI  104F                MODE2.3   SRLS   R4,14                CUSTOMER HUNG UP?
002B2EI  4380 4000 2B44I               BNC    MODE2.4              NO
002B34I  4100 4000 4D9AI     MODE2.3A  BAL    R13,CLEAN.UP         CLEAR THE I/O TABLE
002B3AI  E640 4000 645CI     MODE2.3B  LA     R4,M.ACK             ACK MESSAGE,NO DIAL TONE
002B40I  4300 F672                     B      MODE0.1F
```

```
                             *
         0000 2B44I          MODE2.4   EQU    *
002B44I  1044                          SRLS   R4,4                 ADN ADD
002B46I  4380 4000 2BBEI               BNC    MODE2.5              NO
002B4CI  C830 0011                     LHI    R3,ADNTIE
002B50I  4840 4000 5F04I               LH     R4,REALADN
002B56I  4230 FF84                     BNZ    MODE2.1A
                             *
                             *     MAKE SURE ADN IS VALID
                             *
002B5AI  D332 0007                     LB     R3,FRSTDGT+1(R2)     MAKE SURE A ZERO OR 1  IS 2ND DIGIT
002B5EI  C530 008A                     CLHI   R3,X'8A'
002B62I  2335                          BES    MODE2.4E
002B64I  C530 0081                     CLHI   R3,X'81'
002B68I  4230 F876                     BNE    ARCD3
         0000 2B6CI          MODE2.4E  EQU    *
002B6CI  2449                          LIS    R4,9
         0000 2B6EI          MODE2.4F  EQU    *
002B6EI  D334 4200 0006                LB     R3,FRSTDGT(R4,R2)
002B74I  C530 008B                     CLHI   R3,X'8B'
002B78I  4380 F866                     BNL    ARCD3
002B7CI  2741                          SIS    R4,1
002B7EI  2218                          BNMS   MODE2.4F
002B80I  243D                          LIS    R3,ADNADD
002B82I  D341 0003           MODE2.4C  LB     R4,SYS.FLAG(R1)
002B86I  5851 0004                     L      R5,LN.TEMP(R1)       ACCOUNT NUMBER
002B8AI  C540 0002                     CLHI   R4,2                 BUFFER?
002B8EI  2133                          BNES   MODE2.4A
002B90I  5855 0000                     L      R5,0(R5)             CHECK FOR LEGAL ACCOUNT NUMBER
002B94I  1058                MODE2.4A  SRLS   R5,8                 REMOVE LOWER BYTE
002B96I  5950 4000 EABBI               C      R5,OKACCT            IS IT VALID
002B9CI  4300 4000 2BA6I               B      MODE2.4B             11/12/76
002BA2I  4300 FF38                     B      MODE2.1A             PROCESS IT
                             *
002BA6I  4100 4000 4D9AI     MODE2.4B  BAL    R13,CLEAN.UP
002BACI  E640 4000 6470I               LA     R4,M.RJHANG          REJECT,HANG UP
002BB2I  4300 F600                     B      MODE0.1F
                             *
002BB6I  243F                MODE2.5   LIS    R3,ADNDELT
002BB8I  1041                          SRLS   R4,1                 ADN DELETE?
```

```
TDX SYSTEM MAIN CONTROL PROGRAM                          PAGE  62   15:54:58  01/27/77
```

-continued

```
002BBAI  4280 FFC4                    BC     MODE2.4C           YES
002BBEI  1041                         SRLS   R4,1               ENTER A DIVERSION NUMBER
002BC0I  4380 4000 2BE2I              BNC    MODE2.6            NO,MUST BE DELETE DIVERSION
                            *
                            *                STORE NEW DIVERSION NUMBER IN DATA BASE
                            *
002BC6I  5840 4000 58E8I              L      R4,CUSTABLE        CUSTOMER TABLE ADDRESS
002BCCI  2459                         LIS    R5,9
002BCEI  D362 4500 0005     MODE2.5A  LB     R6,5(R2,R5)
002BD4I  D264 4500 002C               STB    R6,PHN.DVRS(R4,R5)
002BDAI  2751                         SIS    R5,1
002BDCI  2217                         BNMS   MODE2.5A
002BDEI  4300 FF2E                    B      MODE2.2C           GIVE ACK MESSAGE WITH DIAL TONE
                            *
002BE2I  2551               MODE2.6   LCS    R5,1
002BE4I  5840 4000 58E8I              L      R4,CUSTABLE        SET DIVERSION NUMBER TO NOT AVAILABL
```

```
TDX SYSTEM MAIN CONTROL PROGRAM                          PAGE  63   15:55:11  01/27/77

002BEAI  4054 002C                    STH    R5,PHN.DVRS(R4)
002BEEI  4300 FF1F                    B      MODE2.2C
                            *
                            *                MODE 5  ATB SENT OUT. REPLIES COME HERE
                            *
         0000 2BF2I         MODE5     EQU    *
002BF2I  F440 0008 4000               NI     R4,M5.MASK         CHECK FOR LEGAL MESSAGE
002BF8I  4330 F686                    BZ     ILL.MSG            NOT A VALID RESPONSE
002BFCI  104F                         SRLS   R4,15              LOOK FOR CALL BACK
002BFEI  4380 4000 2F60I              BNC    MODE5.C3           NO-MUST OF HUNG UP,CLEAR TABLES
002C04I  4850 4000 5F72I              LH     R5,MSGCNT          MESSAGE COUNT
002C0AI  C550 0005                    CLHI   R5,5
002C0EI  4280 4000 2F60I              BC     MODE5.C3
002C14I  D351 0001                    LB     R5,CLASS.IN(R1)    LOOK AT INPUT LINE CLASS
002C18I  C450 000F                    NHI    R5,X'F'
002C1CI  C550 000F                    CLHI   R5,WATTS           INWATTS OR LOCAL LINE?
002C20I  4380 4000 2F60I              BNL    MODE5.C3           YES,IGNORE IT
                            *                SET UP CALL BACK QUEUE ENTRY
002C26I  4100 4000 51F6I              BAL    R13,GETCAMP        PICK UP CAMP-ON DISC ADDRESS IN R9
002C2CI  5090 4000 594CI              ST     R9,CAMPSAVE
002C32I  41C0 4000 53CAI              BAL    R12,DISCBUFR       PICK UP A DISC BUFFER
002C38I  5890 4000 594CI              L      R9,CAMPSAVE
002C3EI  0855                         LR     R5,R5              ANY MORE LEFT
002C40I  4210 4000 2F7CI              BM     MODE5.4A           NO- ERROR - RETURN DISC ADDRESS
002C46I  5841 0004                    L      R4,LN.TEMP(R1)     24 BYTE TEMP BUFFER
002C4AI  D364 002D                    LB     R6,CMP.PHN+16(R4)  DO WE HAVE A TANDEM TIELINE
002C4EI  0866                         LR     R6,R6
002C50I  4230 4000 2F1AI              BNZ    MODE5.CB           YES
002C56I  D265 003C                    STB    R6,CMP.TAND(R5)    SET FOR NO TANDEM
         0000 2C5AI         MODE5.BC  EQU    *
002C5AI  C860 001F                    LHI    R6,31              32 BYTES TO TRANSFER
002C5EI  D374 4600 0000     MODE5.1   LB     R7,0(R4,R6)
002C64I  D275 4600 0000               STB    R7,0(R5,R6)        TRANFER ACCOUNT,SPECIAL ACCOUNT
002C6AI  D274 4000 5ECAI              STB    R7,CBACCT(R6)
002C70I  2761                         SIS    R6,1               AND PHONE NUMBERS TO CALL BACK FILE
002C72I  221A                         BNMS   MODE5.1
002C74I  D361 0008                    LB     R6,LN.WAT(R1)
002C78I  D265 002F                    STB    R6,CMP.ARCD(R5)
002C7CI  D260 4000 5EC9I              STB    R6,CBBILL          SAVE FOR BILLING
                            *
002C82I  D361 0016                    LB     R6,CON.FLAG(R1)    WATTS CODE NEEDED
002C86I  D265 0020                    STB    R6,CMP.WAT(R5)
002C8AI  D371 0011                    LB     R7,CB.FLAG(R1)     BEEPER FLAG
002C8EI  D275 002F                    STB    R7,CMP.BEEP(R5)    SAVE BEEPER FLAG
002C92I  D371 0017                    LB     R7,LN.SUBC(R1)
002C96I  D275 002D                    STB    R7,CMP.SUB(R5)
002C9AI  D3A1 0015                    LB     R10,CAMP.CNT(R1)
002C9EI  D2A5 0021                    STB    R10,CMP.TIE(R5)
002CA2I  D371 0001                    LB     R7,CLASS.IN(R1)    CLASS OF INPUT LINE
002CA6I  C470 000F                    NHI    R7,X'F'
002CAAI  D275 002C                    STB    R7,CMP.INP(R5)
002CAEI  E120 4000 56ECI              SVC    2,TIME1
002CB4I  5840 4000 56F4I              L      R4,SPT.TIME        START TIME FOR QUEUE
002CBAI  5045 0030                    ST     R4,CMP.TIME(R5)
002CBEI  E120 4000 56CCI              SVC    2,TIME             PICK UP TIME IN ASCII AND SAVE IT
002CC4I  4840 4000 56D4I              LH     R4,TIME.HH
```

```
TDX SYSTEM MAIN CONTROL PROGRAM                          PAGE  64   15:55:23  01/27/77

002CCAI  4045 0034                    STH    R4,CMP.ASTM(R5)
002CCEI  4840 4000 56DAI              LH     R4,TIME.SS
002CD4I  4045 003A                    STH    R4,CMP.ASTM+4(R5)
002CD8I  D340 4000 56D7I              LB     R4,TIME.M1
002CDEI  D245 0036                    STB    R4,CMP.ASTM+2(R5)
002CE2I  D340 4000 56D8I              LB     R4,TIME.M2
002CE8I  D245 0037                    STB    R4,CMP.ASTM+3(R5)
                            *
002CECI  5095 010C                    ST     R9,BUFL+12(R5)     STORE DISC ADDRESS
002CF0I  3499                         EXHR   R9,R9              PUT DISC ADDRESS IN UPPER HALF
002CF2I  5880 4000 58E8I              L      R8,CUSTABLE
002CF8I  D348 0071                    LB     R4,CALLB.TM(R8)
002CFCI  0694                         OR     R9,R4              PUT IT TOGETHER
002CFEI  D341 0017                    LB     R4,LN.SUBC(R1)     SUBCLASS
002D02I  1148                         SLLS   R4,8
002D04I  0647                         OR     R4,R7
002D06I  1168                         SLLS   R6,8               WATTS LINE NEEDED
002D08I  06A6                         OR     R10,R6             CALL BACK CODE
002D0AI  34AA                         EXHR   R10,R10
```

```
TDX SYSTEM MAIN CONTROL PROGRAM                         PAGE 64   15:55:23  01/27/77

002D0CI  06A4                           OR    R10,R4
                              *
                              *         PICK UP CALL BACK EXTENSION,UP TO 5 DIGITS
                              *
002D0EI  0777                           XR    R7,R7
002D10I  0744                           XR    R4,R4
002D12I  D364 4200 0003       MODE5.2   LB    R6,3(R4,R2)        PICK UP AN EXTENSION DIGIT
002D18I  D460 4000 5FF1I                CLB   R6,C.ETX           FINISHED?
002D1EI  4330 4000 2F24I                BE    MODE5.2B           YES
002D24I  D460 008C                      CLB   R6,POUND
002D28I  4330 4000 2E24I                BE    MODE5.2B           ANOTHER TERMINATOR
002D2EI  08R6                           LR    R8,R6
002D30I  C460 00F0                      NHI   R8,X'F0'
002D34I  C580 0080                      CLHI  R8,X'80'           NUMERIC DIGIT
002D38I  4230 4000 2F02I                BNE   MODE5.4            NO,GIVE RETRY MESSAGE
002D3EI  C560 008B                      CLHI  R6,X'8B'           *?
002D42I  2134                           BNES  MD.5A              NO
002D44I  2621                           AIS   R2,1               YES,SKIP PAST IT
002D46I  4300 FFC8                      B     MODE5.2            LOOK AT NEXT ONE
         0000 2D4AI           MD.5A     EQU   *
002D4AI  D264 4500 0022                 STB   R6,CMP.EXT(R4,R5)
002D50I  1178                           SLLS  R7,8
002D52I  0676                           OR    R7,R6
002D54I  2641                           AIS   R4,1
002D56I  C540 0008                      CLHI  R4,8               MAX RECEIVED?
002D5AI  4230 FFB4                      BNE   MODE5.2            NO
002D5EI  5880 4000 58E8I      MODE5.2A  L     R8,CUSTABLE        DATA BASE ADDRESS
002D64I  24F1                           LIS   R15,1              SET UP DROP CODE
002D66I  D448 006D                      CLB   R4,MIN.EXT(R8)     MEET MIN. NUMBER
002D6AI  4280 4000 2E78I                BC    MODE5.3            NO,DON'T STORE IT
002D70I  D448 006E                      CLB   R4,MAX.EXT(R8)     GREATER THAN MAX VALUE?
002D74I  2334                           BFS   GOOD.1             NO
002D76I  4380 4000 2E78I                BNC   MODE5.3            YES,OUT OF RANGE
002D7CI  0385 0000            GOOD.1    LB    R8,0(R5)           FIRST BYTE OF  ACCOUNT
002D80I  5840 4000 58E8I                L     R4,CUSTABLE        ADDRESS OF CUSTOMER TABLE
002D86I  5884 0014                      L     R8,ADR.CMP1(R4)    CALL BACK QUEUE 1
002D8AI  E1F0 0004                      SVC   14,N.4


TDX SYSTEM MAIN CONTROL PROGRAM                         PAGE 65   15:55:35  01/27/77

002D8EI  24F2                           LIS   R15,2              SET UP DROP CODE
002D90I  0800                           LR    R0,R0
002D92I  4210 4000 2E78I                BM    MODE5.3
002D98I  5884 0068                      L     R8,ADR.CMP3(R4)    EXPEDITE QUEUE
002D9CI  E1E0 0004                      SVC   14,N.4
002DA0I  0800                           LR    R0,R0
002DA2I  4210 4000 2E78I                BM    MODE5.3
002DA8I  5884 0018                      L     R8,ADR.CMP2(R4)    CALL BACK QUEUE 2
002DACI  E1F0 0004                      SVC   14,N.4
002DB0I  0800                           LR    R0,R0
002DB2I  4210 4000 2E78I                BM    MODE5.3
002DB8I  0385 0000                      LB    R8,CMP.UACT(R5)    FIRST BYTE OF USER ACCOUNT
002DBCI  C580 008A                      CLHI  R8,PRIORITY        PRIORITY ACCOUNT
002DC0I  4330 4000 2E30I                BE    MODE5.2C
002DC6I  C580 0081                      CLHI  R8,X'81'           LOWER OF THE PRIORITY ACCOUNTS
002DCAI  4330 4000 2E4EI                BE    MODE5.2J           YES,PUT IN PRIORITY QUEUE
002DD0I  5884 0018            MODE5.2D  L     R8,ADR.CMP2(R4)    ADDRESS OF CALL BACK QUEUE
002DD4I  F490 FFFF FF00                 NI    R9,Y'FFFFFF00'
002DDAI  0304 0071                      LB    R0,CALLB.TM(R4)
002DDEI  0690                           OR    R9,R0              COMBINE TIME
002DE0I  E1E0 0008                      SVC   14,N.8
002DE4I  24F3                           LIS   R15,3              SET UP DROP CODE
002DE6I  6599 0000                      ARL   R9,0(R8)           ADD IT
002DEAI  4240 4000 2E78I                BO    MODE5.3            OVERFLOW,DROP ENTRY
         0000 2DF0I           MODE5.2K  EQU   *
002DF0I  65A8 0000                      ARL   R10,0(R8)
002DF4I  6578 0000                      ARL   R7,0(R8)           ADD EXTENTION
                              *
                              *         WRITE FILE OUT TO DISC
                              *
002DF8I  C450 0100            MODE5.2E  AHI   R5,BUFL            POSITION TO START OF SVC BLOCK
002DFCI  0380 4000 5FF7I                LB    R8,WRTFUNC         WRITE FUNCTION
002E02I  D285 0000                      STH   R8,0(R5)
002E06I  0380 4000 5FFEI                LB    R8,CMPLU           LOGICAL UNIT OF FILE
002E0CI  D285 0001                      STB   R8,1(R5)
002E10I  5885 0004                      L     R8,4(R5)           STARTING BUFFER ADDRESS
002E14I  CA80 0046                      AHI   R8,L.CALLB         LENGTH OF CALL BACK FILE
002E18I  5085 0008                      ST    R8,8(R5)           ENDING ADDRESS
002E1CI  E1F0 0002                      SVC   14,N.2             ADD TO DISC STACK
002E20I  4300 FF10                      B     MODE2.3A           CLEAN TABLES AND SEND ACK MESSAGE
                              *
         0000 2E24I           MODE5.2B  EQU   *
002E24I  0766                           XR    R6,R6              END IT WITH A NULL
002E26I  D264 4500 0022                 STB   R6,CMP.EXT(R4,R5)
002E2CI  4300 FF2F                      B     MODE5.2A           FINISH
                              *
         0000 2E30I           MODE5.2C  EQU   *
002E30I  5884 0014                      L     R8,ADR.CMP1(R4)    PRIORITY CALL BACK QUEUE
002E34I  E1E0 0008                      SVC   14,N.8
002E38I  6598 0000                      ARL   R9,0(R8)           ADD PARAMETER
002E3CI  4240 4000 2E58I                BO    MODE5.2L           OVERFLOW,STORE ON OTHER QUEUE
002E42I  65A8 0000                      ARL   R10,0(R8)
002E46I  6578 0000                      ARL   R7,0(R8)           ADD EXTENSION
002E4AI  4300 FFAA                      B     MODE5.2E           WRITE IT OUT
         0000 2E4EI           MODE5.2J  EQU   *
002E4EI  D384 0074                      LB    R8,EXPED.FG(R4)    CAN WE USE EXPEDITED QUEUE
```

```
002E52I  08A8                3578             LR     R8,R8
002E54I  4330 FF78           3579             BZ     MODE5.2D
         0000 2F5AI          3580  MODE5.2L   EQU    *
002E5AI  5884 006A           3581             L      R8,ADR.CMP3(R4)    EXPEDITE QUEUE
002E5CI  F490 FFFF FF00      3582             NI     R9,Y'FFFFFF00'
002E62I  0304 0071           3583             LB     R0,CALLB.TM(R4)
002E66I  0690                3584             OR     R9,R0
002E68I  E1F0 0008           3585             SVC    14,N.8
002E6CI  6598 0000           3586             ABL    R9,0(R8)
002E70I  4240 FF5C           3587             BO     MODE5.2D
002E74I  4300 FF78           3588             B      MODE5.2K
                             3589  *
002E78I  5895 010C           3590  MODE5.3    L      R9,BUFL+12(R5)     PICK UP DISC ADDRESS
002E7CI  0805                3591             LR     R0,R5
002E7EI  41D0 4000 524EI     3592             BAL    R13,PUTCAMP        RETURN CALL BACK DISC ADDRESS
002E84I  0850                3593             LR     R5,R0
002E86I  41C0 4000 5356I     3594             BAL    R12,RTNDISBR       RETURN DISC BUFFER
002E8CI  41D0 4000 2E96I     3595             BAL    R13,CBANALY        WRITE OUT CALLBACK ANALYSIS RECORD
002E92I  4300 FC9E           3596             B      MODE2.3A
         0000 2E96I          3597  CBANALY    EQU    *
                             3598  *  WRITE OUT CALL BACK ANALYSIS RECORD
002E96I  2452                3599             LIS    R5,2
002E98I  D250 4000 5EC5I     3600             STB    R5,CBDISP          SET TO LOST ENTRY
002E9EI  2451                3601             LIS    R5,1               SYSTEM NUMBER
002EA0I  D250 4000 5F08I     3602             STB    R5,CBSYST
002EA6I  2450                3603             LIS    R5,0
002EA8I  5050 4000 5EE0I     3604             ST     R5,CBDUR           QUEUE DURATUION IS 0
002EAEI  5050 4000 5EE4I     3605             ST     R5,CBSTIME         START TIME IS 0
002EB4I  5050 4000 5EE8I     3606             ST     R5,CBSTIME+4
002EBAI  4850 4000 5F2CI     3607             LH     R5,PORTNUMR
002EC0I  4050 4000 5EC6I     3608             STH    R5,CBPORT
002EC6I  5850 4000 652BI     3609             L      R5,DATEBF
002ECCI  5050 4000 5EECI     3610             ST     R5,CBDATE
002ED2I  5850 4000 652CI     3611             L      R5,DATEBF+4
002ED8I  5050 4000 5EF0I     3612             ST     R5,CBDATE+4
002EDEI  5850 4000 58F8I     3613             L      R5,CUSTABLE
002EE4I  5845 0000           3614             L      R4,DEV.MN(R5)
002EE8I  5040 4000 5EDCI     3615             ST     R4,CBPMN
002EEEI  D2F0 4000 5EC8I     3616             STB    R15,CPTYPE         SAVE DROP CODE
002EF4I  E660 4000 5EC4I     3617             LA     R6,CB
002EFAI  41C0 4000 46E2I     3618             BAL    R12,WRTMAG         WRITE IT OUT
002F00I  030D                3619             BR     R13                EXIT
002F02I  5895 010C           3620  MODE5.4    L      R9,BUFL+12(R5)
002F06I  0805                3621             LR     R0,R5
002F08I  41D0 4000 524EI     3622             BAL    R13,PUTCAMP
002F0EI  0850                3623             LR     R5,R0
002F10I  41C0 4000 5356I     3624             BAL    R12,RTNDISBR
002F16I  4300 FC1A           3625             B      MODE2.3A
         0000 2F1AI          3626  MODE5.CB   EQU    *
002F1AI  5874 0008           3627             L      R7,L.SACT(R4)      ADDRESS OF SECOND BUFFER
002F1EI  5867 0000           3628             L      R6,0(R7)
002F22I  5064 0008           3629             ST     R6,L.SACT(R4)
002F26I  5867 0004           3630             L      R6,4(R7)
002F2AI  5065 003C           3631             ST     R6,CMP.TAND(R5)
002F2EI  5867 0008           3632             L      R6,8(R7)
002F32I  5065 0040           3633             ST     R6,CMP.TAND+4(R5)
```

```
002F36I  5867 000C           3634             L      R6,12(R7)
002F3AI  5065 0044           3635             ST     R6,CMP.TAND+8(R5)
002F3EI  5050 4000 590CI     3636             ST     R5,SAVER5
002F44I  0847                3637             LR     R4,R7
002F46I  41C0 4000 530AI     3638             BAL    R12,PUTBUFR        RETURN TEMP BUFFER
002F4CI  5850 4000 590CI     3639             L      R5,SAVER5
002F52I  5890 4000 594CI     3640             L      R9,CAMPSAVE
002F58I  5841 0004           3641             L      R4,LN.TEMP(R1)
002F5CI  4300 FCFA           3642             B      MODE5.BC
         0000 2F60I          3643  MODE5.C3   EQU    *
002F60I  5851 0004           3644             L      R5,LN.TEMP(R1)
002F64I  D365 0020           3645             LB     R6,CMP.PHN+16(R5)
002F68I  0966                3646             LR     R6,R6
002F6AI  4330 FBC6           3647             BZ     MODE2.3A           NO TANDEM TIE LINE
002F6EI  5845 0008           3648             L      R4,L.SACT(R5)      2ND BUFFER ADDRESS
002F72I  41C0 4000 530AI     3649             BAL    R12,PUTBUFR
002F78I  4300 FBB8           3650             B      MODE2.3A
                             3651  *
002F7CI  41D0 4000 524EI     3652  MODE5.4A   BAL    R13,PUTCAMP        RESTORE CALL BACK QUEUE DISC ADDRESS
002F82I  4300 FBAF           3653             B      MODE2.3A
                             3654  *
         0000 2F86I          3655  MODE6      EQU    *                  WAITING FOR CALLED PARTY TO ANSWER
002F86I  F440 203C 00C0      3656             NI     R4,M6.MASK
002F8CI  4330 F2F2           3657             BZ     ILL.MSG            ILLEGAL MESSAGE HANG UP LINE
002F90I  F540 2000 0000      3658             CLI    R4,BIT30           OUTPUT LINE HAS NO RESPONSE
002F96I  4330 4000 30F6I     3659             BE     MODE6.3
002F9CI  5040 4000 580DI     3660             ST     R4,DTEMP.1
002FA2I  F540 0000 0080      3661             CLI    R4,BIT8            TANDEM TIE LINE BUSY?
002FA8I  4330 4000 2FF8I     3662             BE     MODE6.BZ           YES,LOOK FOR WATTS LINE
002FAEI  D331 0003           3663             LB     R3,SYS.FLAG(R1)
002FB2I  C530 0002           3664             CLHI   R3,2
002FB6I  4230 4000 2FCCI     3665             BNE    MODE6.A1
002FBCI  5841 0004           3666             L      R4,LN.TEMP(R1)
002FC0I  41C0 4000 530AI     3667             BAL    R12,PUTBUFR
002FC6I  2430                3668             LIS    R3,0
002FC8I  D231 0003           3669             STB    R3,SYS.FLAG(R1)
002FCCI  5840 4000 580DI     3670  MODE6.A1   L      R4,DTEMP.1
002FD2I  1947                3671             SRLS   R4,7               'CQ'
002FD4I  4280 4000 30F6I     3672             BC     MODE6.2B
```

```
TDX SYSTEM MAIN CONTROL PROGRAM      -continued      PAGE 67   15:55:59   01/27/77

002FCAI  104C                        SRLS  R4,12                   NO ANSWER?
002FDCI  4380 4000 308AI             BNC   MODE6.2                 NO
002FE2I  4300 4000 308AI             B     MODE8.1
         0000 2FE8I        MODE6.BZ  EQU   *
002FE8I  2451                        LIS   R5,1
002FEAI  6150 4000 5F0EI             AHM   R5,BZCOUNT              UPDATE NUMBER OF BZ CALLS
002FF0I  0351 0009                   LB    R5,LN.OUT(R1)           OUTPUT LINE BEING USED
002FF4I  4050 4000 5F30I             STH   R5,OUTLINE
002FFAI  4C50 4000 5F44I             MH    R5,TABLNGTH
003000I  5A5A 000C                   A     R5,ADR.LNTB(R10)        POINT TO LINE NUMBER
003004I  C840 00FF                   LHI   R4,X'FF'
003008I  4045 0000                   STH   R4,LN.IN(R5)            RESET LINE TABLE XREF
00300CI  0241 0009                   STB   R4,LN.OUT(R1)
003010I  2440                        LIS   R4,0                    SET OUTPUT LINE FREE AGAIN
003012I  03F5 000C                   LB    R15,STAT.OUT(R5)        OUTPUT LINE STATUS
003016I  C5F0 0006                   CLHI  R15,6                   FREE LINE?
00301AI  2136                        BNES  MODE6.F0
```

```
TDX SYSTEM MAIN CONTROL PROGRAM                      PAGE 68   15:56:11   01/27/77

00301CI  C8F0 00F0                   LHI   R15,X'F0'               SET LINE BUSY
003020I  02F5 000C                   STB   R15,STAT.OUT(R5)
003024I  2303                        BS    MODE6.E1
         0000 3026I        MODE6.E0  EQU   *
003026I  0245 000C                   STB   R4,STAT.OUT(R5)
         0000 302AI        MODE6.E1  EQU   *
00302AI  0241 0000                   STB   R4,STAT.IN(R1)          INPUT FREE FOR AWHILE
00302EI  41F0 4000 4812I             BAL   R15,TALK1
003034I  2441                        LIS   R4,1
003036I  0241 0000                   STB   R4,STAT.IN(R1)
00303AI  0341 0016                   LB    R4,CON.FLAG(R1)         WATTS BAND NEEDED
00303EI  41C0 4000 3FBEI             BAL   R12,CHKLNTBL            SEARCH FOR IT
003044I  5821 0004                   L     R2,LN.TEMP(R1)
003048I  CA20 0010                   AHI   R2,CMP.PHN              POSITION TO PHONE NUMBER
00304CI  0855                        LR    R5,R5
00304EI  2316                        BNMS  MODE6.Z1                NO LINE FOUND,SEND OUT ATB
003050I  2485                        LIS   R8,5                    SET UP ATB CODE
003052I  0287 0002                   STB   R8,SYS.STAT(R7)
003056I  4300 F97F                   B     MODE2.B2
         0000 305AI        MODE6.Z1  EQU   *
00305AI  0381 0008                   LB    R8,LN.WAT(R1)
00305EI  0280 4000 5FF4I             STB   R8,BSERV                SET UP PROPER BILLABLE LINE
003064I  5020 4000 58F0I             ST    R2,PHONE                SAVE PHONE NUMBER ADDRESS
00306AI  4300 F674                   B     MODE2.CM
                           *
                           *               NO ANSWER,CHECK TO SEE IF SOMEONE ELSE CAN USE LINE
                           *
                           *               R1 = LINE TABLE ADDRESS FOR CURRENT LINE
                           *               R2 = INPUT BUFFER ADDRESS
                           *               R0 = CUSTOMER DATA-BASE ADDRESS
                           *
00306EI  2448              MODE6.0A  LIS   R4,8
003070I  0241 0002                   STB   R4,SYS.STAT(R1)
003074I  E640 4000 6470I             LA    R4,M.RJHANG
00307AI  4300 F138                   B     MODE0.1F
                           *
                           *  CALL IN PROGRESS , WAIT FOR HANG UP
                           *
00307EI  F440 0008 0000    MODE8.    NI    R4,M8.MASK
003084I  4330 F1FA                   BZ    ILL.MSG
003088I  58A0 4000 5AEPI   MODE8.1   L     R10,CUSTABLE
00308EI  41F0 4000 49C2I             BAL   R15,PROC.CLB            PROCESS CALL BACK QUEUE
         0000 3094I        MODE8.2   EQU   *
003094I  0833                        LR    R3,R3
003096I  4210 4000 30A0I             BM    MODE6.1
00309CI  4300 FA9F                   B     Q.COMM                  LOOK FOR MORE WORK
                           *
                           *               THE LINE CANNOT BE USED,CLEAR THE LINE TABLES
                           *
0030A0I  0361 0009         MODE6.1   LB    R6,LN.OUT(R1)           OUTPUT LINE
0030A4I  4C60 4000 5F44I             MH    R6,TABLNGTH             * LENGTH OF TABLE ENTRY
0030AAI  5A6A 000C                   A     R6,ADR.LNTB(R10)        PLUS STARTING ADDRESS
0030AEI  2470                        LIS   R7,0
0030B0I  0276 0012                   STB   R7,SUS.OUT(R6)
0030B4I  4300 FA7C                   B     MODE2.3A                CLEAN INPUT LINE AND SEND OUT ACK
                           *
```

```
TDX SYSTEM MAIN CONTROL PROGRAM                      PAGE 69   15:56:22   01/27/77

0030B8I  1041              MODE6.2   SRLS  R4,1                    TERMINATED WHILE DIALING?
0030BAI  4280 FFCA                   BC    MODE8.1                 YES
0030BEI  1041                        SRLS  R4,1                    CALLED PARTY BUSY?
0030C0I  4280 FFAA                   BC    MODE6.0A                YES
0030C4I  1041                        SRLS  R4,1                    CALL CONNECTED?
0030C6I  4360 4000 30F6I             BNC   MODE6.3                 NO,MUST BE FAILURE ON OUTPUT LINE
0030CCI  C840 004F                   LHI   R4,C'N'                 CC CALL
0030D0I  0241 0016         MODE6.2A  STB   R4,CON.FLAG(R1)
0030D4I  2447                        LIS   R4,CC.CODE              CALL CONNECTED CODE
0030D6I  0241 0002                   STB   R4,SYS.STAT(R1)
0030DAI  2441                        LIS   R4,1
0030DCI  5140 4000 5894I             AM    R4,NBR.CALL
0030E2I  4300 FA54                   B     MODE2.3B                SEND BACK ACK
                           *
0030E6I  C840 0059         MODE6.2P  LHI   R4,C'Y'
0030EAI  2451                        LIS   R5,1
0030ECI  5150 4000 58A4I             AM    R5,NBR.CQS
0030F2I  4300 FFDA                   B     MODE6.2A
         0000 30F6I        MODE6.3   EQU   *                       OUTPUT LINE OUT OF SERVICE
```

```
0030F6I  D341 0009                   LB    R4,LN.OUT(R1)       OUTPUT LINE NUMBER
0030FAI  C540 00FF                   CLHI  R4,X'FF'
0030FEI  4330 F180                   BE    ILL.MSG             I'M IN TROUBLE,HANG UP LINE
003102I  41C0 DC3C                   BAL   R12,DIVIDE
003106I  D250 4000 6334I             STB   R5,BL.1
00310CI  D240 4000 6335I             STB   R4,BL.2
003112I  D250 4000 636AI             STB   R5,LNOUT.1
003118I  D240 4000 636BI             STB   R4,LNOUT.2
00311EI  4840 4000 5F2CI             LH    R4,PORTNUMR
003124I  41C0 DC1A                   BAL   R12,DIVIDE
003128I  D250 4000 631FI             STB   R5,BL.3
00312EI  D240 4000 631FI             STB   R4,BL.4
003134I  D250 4000 635AI             STB   R5,LNOUT.3
00313AI  D240 4000 635BI             STB   R4,LNOUT.4
003140I  4840 4000 5F2FI             LH    R4,LINENUMR
003146I  41C0 DBF8                   BAL   R12,DIVIDE
00314AI  D250 4000 6344I             STB   R5,BL.5
003150I  D240 4000 6345I             STB   R4,BL.6
003156I  C850 002C                   LHI   R5,M19L
00315AI  4840 4000 5FFCI             LH    R4,REGISTER         WAS A REGISTER GIVEN?
003160I  4210 4000 317AI             BM    MODE6.NO            NO
003166I  41C0 DBDA                   BAL   R12,DIVIDE          STORE IT IN MESSAGE
00316AI  D250 4000 6350I             STB   R5,R.1
003170I  D240 4000 6351I             STB   R4,R.2
003176I  C850 003A                   LHI   R5,M19L.A           NEW MESSAGE LENGTH
         0000 317AI         MODE6.NO EQU   *
00317AI  E640 4000 6316I             LA    R4,BADLINE
003180I  5054 0000                   ST    R5,0(R4)            STORE MESSAGE LENGTH
003184I  C8C0 0006                   LHI   R12,CRT1
003188I  D2C0 4000 5FFEI             STB   R12,TTYLU
00318EI  41C0 4000 450EI             BAL   R12,TTYMSG          PRINT OUT ERROR MESSAGE FOR BAD LINE
003194I  D341 0009                   LB    R4,LN.OUT(R1)       OUTPUT LINE
003198I  4C40 4000 5F44I             MH    R4,TABLNGTH         LENGTH OF TABLE ENTRY
00319EI  5A4A 000C                   A     R4,ADR.LNTB(R10)
0031A2I  D354 0012                   LB    R5,SUS.OUT(R4)
0031A6I  48C0 4000 5F2CI             LH    R12,PORTNUMR        PORT FOR TESTING?
0031ACI  49C0 4000 5FFEI             CH    R12,TESTL1          IS THIS A TEST LINE?
```

```
0031B2I  233A                        BES   MODE.3T             YES,DON'T UPDATE
0031B4I  49C0 4000 5EFAI             CH    R12,TESTL2
0031BAI  2334                        BES   MODE.3T
0031BCI  2651                        AIS   R5,1
0031BEI  D254 0012                   STB   R5,SUS.OUT(R4)      UPDATE SUSPICION COUNTER
         0000 31C2I         MODE.3T  EQU   *
0031C2I  5040 4000 5BB4I             ST    R4,OUTADR           SAVE OUTPUT TABLE ADDRESS
0031C8I  C550 0006                   CLHI  R5,6
0031CCI  213B                        BNES  MODE6.3C            LINE IS STILL A MAYBE
0031CEI  C850 00F0                   LHI   R5,X'F0'            SET LINE STATUS TO OUT OF SERVICE
0031D2I  D254 000C                   STB   R5,STAT.OUT(R4)
0031D6I  E640 4000 6352I             LA    R4,LINEOUT
0031DCI  41C0 4000 450EI             BAL   R12,TTYMSG          SEND OUT MESSAGE FOR LINE OUT OF SERVIC
         0000 31E2I         MODE6.3C EQU   *
0031E2I  2451                        LIS   R5,1
0031E4I  5841 0004                   L     R4,LN.TEMP(R1)
0031E8I  D321 0000                   LB    R2,CMP.UACT(R1)     LOOK FOR PRIORITY ACCOUNT
0031ECI  C520 008A                   CLHI  R2,PRIORITY
0031F0I  2332                        BES   MODE6.3B
0031F2I  2450                        LIS   R5,0                SET TO NO PRIORITY
         0000 31F4I         MODE6.3B EQU   *
0031F4I  4050 4000 5F42I             STH   R5,LDFG             SET FOR PRIORITY
0031FAI  5821 0004                   L     R2,LN.TEMP(R1)
0031FEI  CA20 0010                   AHI   R2,CMP.PHN          POSITION TO PHONE NUMBER
003202I  5020 4000 5BF0I             ST    R2,PHONE
003208I  D341 0017                   LB    R4,LN.SUBC(R1)
00320CI  4040 4000 5F54I             STH   R4,EXSUB
003212I  D341 000B                   LB    R4,LN.WAT(R1)       WATTS BAND NEEDED
003216I  C540 0009                   CLHI  R4,LD               IS CURRENT LINE A LOCAL LINE?
00321AI  2134                        BNES  MODE6.A             NO
00321CI  4040 4000 5F42I             STH   R4,LDFG             YES,ALLOW NEXT LINE TO BE LOCAL ALSO
         0000 3222I         MODE6.A  EQU   *
003222I  5820 4000 5BB4I             L     R2,OUTADR           OUTPUT TABLE ADDRESS
003228I  D331 0009                   LB    R3,LN.OUT(R1)       OUTPUT LINE NUMBER
00322CI  4030 4000 5F30I             STH   R3,OUTLINE
003232I  2490                        LIS   R9,0                SET LINE FREE FOR  A WHILE
003234I  D291 0000                   STB   R9,STAT.IN(R1)
003238I  41F0 4000 4B12I             BAL   R15,TALK1           SEND MESSAGE TO OTHER MACHINE
00323EI  2491                        LIS   R9,1                SET LINE BUSY AGAIN
003240I  D291 0000                   STB   R9,STAT.IN(R1)
003244I  2591                        LCS   R9,1
003246I  D291 0009                   STB   R9,LN.OUT(R1)       SET THIS LINE UNATTENTED
00324AI  D292 000D                   STB   R9,LN.IN(R2)        CLEAN UP FOR XREF
00324EI  41C0 4000 3FCAI             BAL   R12,CHKLNT          LOOK FOR A NEW LINE ABOVE THIS ONE
003254I  5880 4000 5BB4I             L     R8,OUTADR           OUTPUT TABLE ADDRESS
00325AI  D398 000C                   LB    R9,STAT.OUT(R8)
00325EI  C590 00F0                   CLHI  R9,X'F0'            IS LINE OUT OF SERVICE?
003262I  233A                        BES   MODE6.3D            YES,DON'T SET IT FREE
003264I  C590 0006                   CLHI  R9,6                PUT IT OUT OF SERVICE
003268I  2134                        BNES  MODE6.L0
00326AI  C890 00F0                   LHI   R9,X'F0'            PUT LINE OUT OF SERVICE
00326EI  2302                        BS    MODE6.L1
         0000 3270I         MODE6.L0 EQU   *
003270I  0799                        XR    R9,R9
         0000 3272I         MODE6.L1 EQU   *
003272I  D298 000C                   STB   R9,STAT.OUT(R8)     SET OLD OUTPUT LINE FREE AGAIN
```

```
          0000 3276I       3858  MODE6.3D EQU   *
003276I   5820 4000 58F0I  3859           L     R2,PHONE
00327CI   0855             3860           LR    R5,R5               ATB?
00327EI   4210 4000 32C2I  3861           BM    MODE6.3A            YES
003284I   D341 0011        3862           LB    R4,CB.FLAG(R1)
003288I   4040 4000 5F0AI  3863           STH   R4,BEEPFLG
00328EI   E640 4000 5944I  3864           LA    R4,FAKETIE
003294I   D351 0015        3865           LB    R5,CAMP.CNT(R1)     CALLBACK CODE
003298I   D254 0000        3866           STB   R5,0(R4)
00329CI   5040 4000 5910I  3867           ST    R4,SAVER7
0032A2I   D341 0002        3868           LB    R4,SYS.STAT(R1)     DID WE COME FROM A CALLBACK?
0032A6I   C540 000C        3869           CLHI  R4,12               CALLBACK CODE
0032AAI   4330 4000 33E6I  3870           BE    MODE6.12            YES,REREAD FROM DISC AGAIN
0032B0I   2446             3871           LIS   R4,6
0032B2I   D241 0002        3872           STB   R4,SYS.STAT(R1)
0032B6I   0843             3873           LR    R4,R3
0032B8I   41D0 4000 4F5AI  3874           BAL   R13,IDOPHONE
0032BEI   4300 F87C        3875           B     O.COMM              LOOK FOR MORE WORK
                           3876  *
          0000 32C2I       3877  MODE6.3A EQU   *                   ALL LINES USED NOW
0032C2I   D371 0002        3878           LB    R7,SYS.STAT(R1)
0032C6I   C570 000C        3879           CLHI  R7,12               DID WE COME FROM A CALLCACK
0032CAI   4330 4000 361CI  3880           BE    MODE6.52            YES
0032D0I   2475             3881           LIS   R7,5
0032D2I   D271 0002        3882           STB   R7,SYS.STAT(R1)     SET STATE UP CORRECTLY
0032D6I   2726             3883           SIS   R2,6                FAKE OUT INPUT BUFFER POSITION
0032D8I   0871             3884           LR    R7,R1
0032DAI   4300 F6FA        3885           B     MODE2.B2
                           3886  *
                           3887  *
                           3888  *                MODE 7 - WAITING FOR HANG UP
                           3889  *
                           3890  *                WE ARE ONLY ACCEPTING A TERMINATING CALL.
                           3891  *
          0000 32DEI       3892  MODE7    EQU   *
0032DEI   F540 0040 0000   3893           CLI   R4,BIT23
0032E4I   4230 EF9A        3894           BNE   ILL.MSG             HANG UP IF NOT DISCONNECT
0032E8I   41C0 4000 53CAI  3895           BAL   R12,DISCBUFR        PICK UP A DISC BUFFER
0032EEI   0855             3896           LR    R5,R5
0032F0I   4210 4000 381AI  3897           BM    NO                  NO BUFFER AVAILABLE
0032F6I   4A50 4000 5F64I  3898           AH    R5,BUFLN1           POSITION TO START OF SVC BLOCK
0032FCI   D360 4000 5FFAI  3899           LB    R6,READFN
003302I   D265 0000        3900           STB   R6,0(R5)
003306I   D360 4000 5FF8I  3901           LB    R6,WRKSPLU          LOGICAL UNIT
00330CI   D265 0001        3902           STB   R6,1(R5)
003310I   4860 4000 5F2CI  3903           LH    R6,PORTNUMR         STORE PORT AND LINE NUMBER
003316I   4065 0014        3904           STH   R6,20(R5)
00331AI   4860 4000 5F2EI  3905           LH    R6,LINENUMR
003320I   4065 0016        3906           STH   R6,22(R5)
003324I   4861 000A        3907           LH    R6,DISC.ADR(R1)     PICK UP WORK AREA DISC ADDRESS
003328I   5065 000C        3908           ST    R6,12(R5)
00332CI   5865 0004        3909           L     R6,4(R5)            STARTING BUFFER ADDRESS
003330I   CA60 0052        3910           AHI   R6,L.TDBUF          LENGTH OF BLOCK
003334I   5065 0008        3911           ST    R6,8(R5)
003338I   C860 0014        3912           LHI   R6,RDWORKSP
00333CI   D261 0002        3913           STB   R6,SYS.STAT(R1)     SET UP PROPER STATE
```

```
003340I   E1E0 0002        3914           SVC   14,0,2
003344I   4300 E7E6        3915           B     PR.COMMO
                           3916  *
                           3917  *      MODE 9   CAMP ON IN PROGRESS
                           3918  *
                           3919  *    ONLY ACCEPTING A DT OR CW MESSAGE
                           3920  *
          0000 3348I       3921  MODE9    EQU   *
003348I   F540 0000 0100   3922           CLI   R4,BIT9
00334EI   4330 4000 3362I  3923           BE    MODE9.1             CW MESSAGE RECEIVED
003354I   F540 0008 0000   3924           CLI   R4,BIT20            DT?
00335AI   4230 EF24        3925           BNE   ILL.MSG             NO,HANG UP THE LINE
00335EI   4300 F7D2        3926           B     MODE2.3A            CLEAR THE LINE
003362I   D351 0011        3927  MODE9.1  LB    R5,CB.FLAG(R1)      30 SEC COUNTER
003366I   2751             3928           SIS   R5,1
003368I   D251 0011        3929           STB   R5,CB.FLAG(R1)      ANY MORE INTERVALS LEFT?
00336CI   4230 F742        3930           BNZ   MD2.2               YES,SEND OUT MESSAGE
003370I   5841 0004        3931           L     R4,LN.TEMP(R1)
003374I   D354 0000        3932           LB    R5,0(R4)            CAN USER USE A LD LINE?
003378I   C450 000F        3933           NHI   R5,X'F'
00337CI   C550 000A        3934           CLHI  R5,X'A'             PRIORITY?
003380I   4330 4000 338EI  3935           BE    MODE9.3             YES
003386I   C550 0003        3936           CLHI  R5,X'3'             ACCOUNT > 2?
00338AI   4380 F73E        3937           BNC   MODE2.B7            YES,GIVE ATB AND HANG UP
          0000 338EI       3938  MODE9.3  EQU   *
00338EI   2451             3939           LIS   R5,1
003390I   4050 4000 5F0AI  3940           STH   R5,BEEPFLG
003396I   2449             3941           LIS   R4,LD
003398I   4040 4000 5F42I  3942           STH   R4,LDFG             LOOK FOR A DDD LINE NOW
00339EI   4040 4000 5F36I  3943           STH   R4,MEASURED         SET UP FOR MEASURED WATS LINE
0033A4I   D340 0017        3944           LB    R4,LN.SUBC
0033A8I   4040 4000 5F54I  3945           STH   R4,EXSUB            LINE SUBCLASS
0033AEI   D341 0008        3946           LB    R4,LN.WAT(R1)       LINE TYPE NEEDED
0033B2I   41C0 4000 3FBEI  3947           BAL   R12,CHKLNTBL        CHECK THE LINE TABLE
0033B8I   5810 4000 58CCI  3948           L     R1,LINEADR          LINE TABLE ADDRESS
0033BEI   0855             3949           LR    R5,R5               WAS A LINE FOUND
0033C0I   4210 4000 33DAI  3950           BM    MODE9.2             NO,SEND OUT ATB
0033C6I   5821 0004        3951           L     R2,LN.TEMP(R1)      POSITION TO PHONE NUMBER
0033CAI   CA20 0010        3952           AHI   R2,CMP.PHN
```

TDX SYSTEM MAIN CONTROL PROGRAM PAGE 72 15:56:58 01/27/77

```
0033CEI  5020 4000 58F0I             ST    R2,PHONE
003304I  4300 F30A                   B     MODE2.CM
00330?I  2455              MODE9.2   LTS   R5,5
00330AI  D251 0002                   STB   R5,SYS.STAT(R1)
0033DEI  D251 0011                   STB   R5,CB.FLAG(R1)
0033E2I  4300 F60C                   B     MODE2.B6          SEND OUT ATB
         0000 33E6I        MODE6.12  EQU   *
0033E6I  41C0 4000 53C8I             BAL   R12,DISCBUFR
0033ECI  0855                        LR    R5,R5
0033EEI  4210 4000 34D6I             B4    MODE12.1
0033F4I  4300 4000 36E6I             B     MODE6.21          RE-READ IT BACK IN
         0000 33FAI        MODE12    EQU   *
0033FAI  0804                        LR    R0,R4             SAVE CODE
0033FCI  F540 0000 0001              CLI   R4,BIT1           OFF HOOK?
003402I  4330 4000 361CI             BF    MODE6.52
003408I  F540 0000 8000              CLI   R4,BIT16          EXTENSION BUSY?
00340EI  4330 4000 3406I             BF    MODE12.1          YES,RESTORE ON QUEUE
```

TDX SYSTEM MAIN CONTROL PROGRAM PAGE 73 15:57:10 01/27/77

```
003414I  F540 0001 0000              CLI   R4,BIT17          INPUT TRUNK BUSY (BI)
00341AI  4330 4000 35C4I             BE    MODE12.4
003420I  F540 1000 0000              CLI   R4,BIT29          NO RESPONSE ON INPUT TRUNK (IP)
003426I  4330 4000 3752I             BF    MODE12.8
00342CI  F500 2000 0000              CLI   R0,BIT30          OUTPUT LINE NO RESPONSE?
003432I  4330 FCC0                   BE    MODE6.3           YES
003436I  0744                        XR    R4,R4
003438I  D241 0010                   STB   R4,SUS.IN(R1)     RESET SUSSPECION COUNTER
00343CI  5841 0004         MODE12.3  L     R4,LN.TEMP(R1)    ADDRESS OF TEMP STORAGE BLOCK
003440I  5894 0008                   L     R9,8(R4)          ADDRESS OF CALL BACK ADDRESS
003444I  41D0 4000 524EI             BAL   R13,PUTCAMP       RETURN SECTOER
00344AI  5841 0004         MODE12.2  L     R4,LN.TEMP(R1)
00344EI  D301 0003                   LB    R0,SYS.FLAG(R1)   IS IT GONE ALREADY?
003452I  C500 0002                   CLHI  R0,2
003456I  2134                        BNES  MOD12.2A          ALREADY GONE
00345AI  41C0 4000 530AI             BAL   R12,PUTBUFR       RETURN TEMP BUFFER
         0000 345EI        MOD12.2A  EQU   *
00345EI  0744                        XR    R4,R4
003460I  D241 0003                   STB   R4,SYS.FLAG(R1)
003464I  5800 4000 58F4I             L     R0,PARSECD        RESTORE PARSE CODE
00346AI  F500 0000 0001              CLI   R0,BIT1           OFF HOOK FROM RACE CONDITION?
003470I  4330 4000 34C0I             BF    MODE12.Y          YES
003476I  F500 2000 0000              CLI   R0,BIT30          OUTPUT LINE NO RESPONSE?
00347CI  4330 F64C                   BF    MODE2.B7
003480I  0840                        LR    R4,R0
003482I  F400 303F 8040              NI    R0,M12.MASK
003488I  4330 EDF6                   BZ    ILL.MSG           ILLEGAL MESSAGE
00348CI  F400 1003 8000              NI    R0,M12A.MSK
003492I  4330 FAF0                   BZ    MODE6
003496I  5830 4000 5908I             L     R3,SAVER3
00349CI  F540 0000 8000              CLI   R4,BIT16          WAS THIS A BO?
0034A2I  4330 FREE                   BF    MODE8.2           YES
0034A6I  F540 0001 0000              CLI   R4,BIT17
0034ACI  4330 4000 34C0I             BF    MODE12.Y
0034B2I  F540 1000 0000              CLI   R4,BIT29          IP?
0034B8I  4330 F678                   BF    MODE2.3A          YES
0034BCI  4300 FBC8                   B     MODE8.1           SEE IF SOMEONE ELSE CAN USE THE LINE
0034C0I  41D0 4000 4D9AI   MODE12.Y  BAL   R13,CLEAN.UP      CLEAN LINE TABLE
0034C6I  2431                        LTS   R3,1
0034C8I  D231 0000                   STB   R3,STAT.IN(R1)
0034CCI  E640 4000 645CI             LA    R4,M.ACK          SEND BACK AN ACK
0034D2I  4300 FCE8                   B     MODE0.1F
                                 *
         0000 34D6I        MODE12.1  EQU   *
0034D6I  5841 0004                   L     R4,LN.TEMP(R1)    SAVEW ALL THE CALL BACK INFO
0034DAI  5854 000C                   L     R5,12(R4)         QUEUE ADDRESS
0034DEI  5834 0000                   L     R3,0(R4)          DISC ADDRESS
0034E2I  5894 0008                   L     R9,8(R4)          CALL BACK DISC ADDRESS
0034E6I  5864 0004                   L     R6,4(R4)          EXTENTION NU,BER
0034EAI  5804 0010                   L     R0,16(R4)
0034EEI  5000 4000 5914I             ST    R0,SAVER0
0034F4I  5050 4000 590CI             ST    R5,SAVER5
0034FAI  5030 4000 5928I             ST    R3,SAVE3
003500I  5060 4000 5920I             ST    R6,SAVER6
003506I  5090 4000 5924I             ST    R9,SAVER9
00350CI  58A0 4000 58E8I             L     R10,CUSTABLE
```

TDX SYSTEM MAIN CONTROL PROGRAM PAGE 74 15:57:22 01/27/77

```
003512I  41F0 4000 49C2I             BAL   R15,PROC.CLB
003518I  5800 4000 58F4I             L     R0,PARSECD
00351EI  5030 4000 5908I             ST    R3,SAVER3
003524I  5850 4000 590CI             L     R5,SAVER5
00352AI  5830 4000 5928I             L     R3,SAVE3
003530I  5860 4000 5920I             L     R6,SAVER6
003536I  CA30 0100                   AHI   R3,X'100'         NUMBER OF RETRIES
00353AI  0873                        LR    R7,R3
00353CI  F470 0000 FF00              NI    R7,RETR.MSK       ANY MODE TRIES LEFT?
003542I  C570 0500                   CLHI  R7,X'500'
003546I  4320 4000 356CI             BZ    MODE12.T          NO,COUNT OVERFLOWED
00354CI  0893                        LR    R9,R3             SET UP PROPER TIMES AGAIN
00354EI  0885                        LR    R8,R5
003550I  D3FA 0071                   LB    R15,CALLB.TM(R10) CALLBACK TIME
003554I  F490 FFFF FF00              NI    R9,Y'FFFFFF00'
00355AI  069F                        OR    R9,R15
00355CI  E1E0 000A                   SVC   14,P.8            CHECK AGAINST REST OF QUEUE
003560I  5860 4000 5920I             L     R6,SAVER6
003566I  5800 4000 5914I             L     R0,SAVER0
```

```
TDX SYSTEM MAIN CONTROL PROGRAM                                   PAGE  74   15:57:22  01/27/77

00356CI  5830 4000 590SI      4045             L      R3,SAVER3          DID WE FIND SOMEONE ELSE?
003572I  4310 4000 35A2I      4046             BNM    MODE12.9           YES
         0000 3578I           4047  MODE12.P   EQU    *
003578I  6595 0000            4048             ABL    R9,0(R5)
00357CI  4240 FEBC            4049             BO     MODE12.3           IF OVERFLOW,DROP
003580I  6505 0000            4050             ABL    R0,0(R5)
003584I  6565 0000            4051             ABL    R6,0(R5)
003588I  4300 FEBE            4052             B      MODE12.2
         0000 358CI           4053  MODE12.T   EQU    *
00358CI  24F0                 4054             LIS    R15,0              SET UP FOR IP DROP
00358EI  4100 F904            4055             BAL    R13,CBANALY        WRITE OUT ANALYSIS RECORD
003592I  5830 4000 5908I      4056             L      R3,SAVER3          WAS ANYONE FOUND?
003598I  4310 4000 35B4I      4057             BNM    MODE12.A           YES,FIRST RETURN DISC ADDRESS
00359FI  4300 FF9A            4058             B      MODE12.3           NO RESTORE QUEUE JUNK
0035A2I  6595 0000            4059  MODE12.9   ABL    R9,0(R5)           CAN WE STILL STORE ON QUEUE?
0035A6I  2147                 4060             BOS    MODE12.A           NO
0035A8I  6505 0000            4061             ABL    R0,0(R5)
0035ACI  6565 0000            4062             ABL    R6,0(R5)
0035B0I  4300 E58A            4063             B      Q.COMM             LOOK FOR MORE WORK
0035B4I  5890 4000 5924I      4064  MODE12.A   L      R9,SAVER9          CALL BACK DISC ADDRESS
0035BAI  4100 4000 524EI      4065             BAL    R13,PUTCAMP        RESTORE IT
0035C0I  4300 E57A            4066             B      Q.COMM             LOOK FOR MORE WORK
0035C4I  41C0 4000 53C8I      4067  MODE12.4   BAL    R12,DISCBUFR       PICK UP A DISC BUFFER
0035CAI  0355                 4068             LR     R5,R5              WAS ONE FOUND?
0035CCI  4210 FF06            4069             BM     MODE12.1           NO,RESTORE ENTRY ON QUEUE
0035D0I  5050 4000 58D0I      4070             ST     R5,DTEMP.1         SAVE REGISTER
0035D6I  D331 0001            4071             LB     R3,CLASS.IN(R1)    TYPE OF INPUT LINE
0035DAI  586A 000C            4072             L      R6,ADR.LNTB(R10)   ADDRESS OF IO LINE TABLE
0035DEI  D35A 0006            4073             LB     R5,LINES(R10)      NUMBER OF LINES FOR THIS CUSTOMER
0035E2I  D346 0000            4074  MODE12.5   LB     R4,STAT.IN(R6)     CURRENT STATUS OF THIS PORT
0035E6I  0844                 4075             LR     R4,R4
0035E8I  4230 4000 3604I      4076             BNZ    MODE12.6           LINE IS BUSY
0035EEI  D346 0010            4077             LB     R4,SUS.IN(R6)      LINE IN ERROR
0035F2I  0844                 4078             LR     R4,R4
0035F4I  4230 4000 3604I      4079             BNZ    MODE12.6
0035FAI  D436 0001            4080             CLB    R3,CLASS.IN(R6)    LINE IS FREE,ARE THEY THE SAME TYPE?
0035FEI  4330 4000 3648I      4081             BF     MODE12.7           YES,LETS USE IT

TDX SYSTEM MAIN CONTROL PROGRAM                                   PAGE  75   15:57:35  01/27/77

003604I  4A60 4000 FE84I      4082  MODE12.6   AH     R6,IOLIM.LE        POINT TO NEXT ENTRY IN TABLE
00360AI  2751                 4083             SIS    R5,1
00360CI  4230 FFD2            4084             BNZ    MODE12.5           STILL SOME ENTRIES LEFT
003610I  5850 4000 58D0I      4085             L      R5,DTEMP.1
003616I  41C0 4000 5356I      4086             BAL    R12,RTNDISBR       NO ENTRIES LEFT,RETURN DISC BUFFER
         0000 361CI           4087  MODE6.52   EQU    *
00361CI  5841 0004            4088             L      R4,LN.TEMP(R1)
003620I  5894 0000            4089             L      R9,0(R4)
003624I  F490 FFFF FF00       4090             NI     R9,Y'FFFFFF00'     MASK OFF TIME FIELD
00362AI  D3CA 0071            4091             LB     R12,CALLB.TM(R10)  RESET CALLBACK TIME
00362EI  069C                 4092             OR     R9,R12             RESTORE NEW TIME
003630I  5884 000C            4093             L      R8,12(R4)          QUEUE ADDRESS
003634I  E1E0 0008            4094             SVC    14,N.8             RESET TIME IN QUEUE
003638I  5804 0010            4095             L      R0,16(R4)
00363CI  5864 0004            4096             L      R6,4(R4)
003640I  5854 000C            4097             L      R5,12(R4)
003644I  4300 FF30            4098             B      MODE12.P
003648I  2431                 4099  MODE12.7   LIS    R3,1
00364AI  D236 0000            4100             STB    R3,STAT.IN(R6)     SET NEW LINE BUSY
00364EI  D231 0010            4101             STB    R3,SUS.IN(R1)      SET UP FOR NO TOGGLE CONDITION
003652I  0733                 4102             XR     R3,R3
003654I  D231 0000            4103             STB    R3,STAT.IN(R1)     SET OLD LINE FREE
003658I  4831 0002            4104             LH     R3,SYS.STAT(R1)    TRANSFER NEW LINE INFORMATION
00365CI  4036 0002            4105             STH    R3,SYS.STAT(R6)
003660I  5831 0004            4106             L      R3,LN.TEMP(R1)
003664I  5036 0004            4107             ST     R3,LN.TEMP(R6)
003668I  4831 0008            4108             LH     R3,LN.NAT(R1)
00366CI  4036 0008            4109             STH    R3,LN.NAT(R6)
[illegible]  [illegible]      4110             L      R3,LN.OUT(R1)      OUTPUT LINE [illegible]
[illegible]  [illegible]      4111             ST     R3,OUTLINE
[illegible]  [illegible]      4112             [illegible] R3,IOLI[illegible]  RESET UP CORRECT XREF
[illegible]  58FA 000C        4113             L      R15,ADR.LNTB(R10)
[illegible]  0AF3             4114             AR     R15,R3
003686I  D331 0015            4115             LB     R3,CAMP.CNT(R1)    CALL BACK CODE
00368AI  D236 0015            4116             STB    R3,CAMP.CNT(R6)
00368EI  4831 0016            4117             LH     R3,CON.FLAG(R1)
003692I  4036 0016            4118             STH    R3,CON.FLAG(R6)
003696I  D33A 0006            4119             LB     R3,LINES(R10)
00369AI  0B35                 4120             SR     R3,R5              DETERMINE NEW LINE NUMBER
00369CI  D23F 000D            4121             STB    R3,LN.IN(R15)      SET UP NEW XREF LINE
0036A0I  4030 4000 5F14I      4122             STH    R3,TLINENBR        SAVE IT TEMP LOCATION
0036A6I  2450                 4123             LIS    R5,0               RESET BUFFER AND LINE STATE
0036A8I  4051 0002            4124             STH    R5,SYS.STAT(R1)
0036ACI  41F0 4000 4B12I      4125             BAL    R15,TALK1          SEND INFO TO OTHER MACHINE
0036B2I  4830 4000 5F14I      4126             LH     R3,TLINENBR
0036B8I  4030 4000 5F2EI      4127             STH    R3,LINENUMR
0036BEI  2551                 4128             LCS    R5,1
0036C0I  D251 0009            4129             STB    R5,LN.OUT(R1)
0036C4I  5800 4000 58F4I      4130             L      R0,PARSECD
0036CAI  F500 0001 0000       4131             CLI    R0,BIT17           (BI)
0036D0I  2134                 4132             BNES   MODE12.Z           NO
0036D2I  2451                 4133             LIS    R5,1               SET LINE BUSY
0036D4I  D251 0000            4134             STB    R5,STAT.IN(R1)
         0000 36D8I           4135  MODE12.Z   EQU    *
0036D8I  0816                 4136             LR     R1,R6
0036DAI  41F0 4000 4B12I      4137             BAL    R15,TALK1          SEND NEW INFO TO OTHER MACHINE
```

```
TDX SYSTEM MAIN CONTROL PROGRAM                              PAGE  76   15:57:47  01/27/77

0036E I   58E0 4000 5EC0I     4138                  L      R5,LTEMP.1
          0000 36EEI          4139  MODE6.21 EQU    *
0036EEI   CA50 0100           4140           AHI    R5,BUFL
0036EAI   D360 4000 5EEAI     4141           LB     R6,READEN           SET UP TO READ DATA BACK FROM DISC
0036F0I   D265 0000           4142           STB    R6,0(R5)
0036F4I   D360 4000 5EFFI     4143           LB     R6,CMPLU            LOGICAL UNIT
0036FAI   D265 0001           4144           STB    R6,1(R5)
0036FEI   5841 0004           4145           L      R4,LN.TEMP(R1)
003702I   5834 0008           4146           L      R3,8(R4)            DISC ADDRESS
003706I   5035 000C           4147           ST     R3,12(R5)           SAVE IT IN THE BUFFER
00370AI   5035 0004           4148           ST     R3,4(R5)            STARTING BUFFER ADDRESS
00370EI   CA30 0046           4149           AHI    R3,LECTHCMP         LENGTH OF CALL BACK FILE
003712I   5035 0008           4150           ST     R3,8(R5)            ENDING ADDRESS
003716I   4860 4000 5F2CI     4151           LH     R6,PORTNUMR
00371CI   4065 0014           4152           STH    R6,20(R5)
003720I   4860 4000 5F2EI     4153           LH     R6,LINENUMR
003726I   4065 0016           4154           STH    R6,22(R5)
00372AI   5800 4000 5EF4I     4155           L      R0,PARSECD
003730I   F500 2000 0000      4156           CLI    R0,BIT30            OP FROM CALLBACK?
003736I   4330 4000 374AI     4157           BE     MODE6.22
00373CI   2466                4158           LIS    R6,RDCBACK
          0000 373EI          4159  MODE6.23 EQU    *
00373EI   D261 0002           4160           STB    R6,SYS.STAT(R1)
003742I   E1E0 0002           4161           SVC    14,N.2
003746I   4300 E3F4           4162           B      PR.COMMQ
          0000 374AI          4163  MODE6.22 EQU    *
00374AI   C860 0010           4164           LHI    R6,RDCB1
00374EI   4300 FFEC           4165           B      MODE6.23
003752I   D331 0010           4166  MODE12.8 LB     R3,SUS.IN(R1)
003756I   2631                4167           AIS    R3,1
003758I   D231 0010           4168           STB    R3,SUS.IN(R1)       UPDATE NUMBER OF LINE ERRORS
00375CI   4840 4000 5F2CI     4169           LH     R4,PORTNUMR
003762I   41C0 D5DC           4170           BAL    R12,DIVIDE
003766I   D250 4000 63A6I     4171           STB    R5,BIL.1
00376CI   D240 4000 63A7I     4172           STB    R4,BIL.2
003772I   4840 4000 5F2EI     4173           LH     R4,LINENUMR
003778I   41C0 D5C6           4174           BAL    R12,DIVIDE
00377CI   D250 4000 63BCI     4175           STB    R5,BIL.3
003782I   D240 4000 63BDI     4176           STB    R4,BIL.4
003788I   C850 001C           4177           LHI    R5,M22L             LENGTH OF MESSAGE
00378CI   4840 4000 5EFCI     4178           LH     R4,REGISTER
003792I   4210 4000 37ACI     4179           BM     MOD12.NO            NO REGISTER GIVEN
003798I   41C0 D5A6           4180           BAL    R12,DIVIDE
00379CI   D250 4000 63C8I     4181           STB    R5,R.3
0037A2I   D240 4000 63C9I     4182           STB    R4,R.4
0037A8I   C850 0028           4183           LHI    R5,M22L.A           NEW MESSAGE LENGTH
          0000 37ACI          4184  MOD12.NO EQU    *
0037ACI   E640 4000 639FI     4185           LA     R4,PAR.INLE
0037B2I   5054 0000           4186           ST     R5,0(R4)            SAVE MESSAGE BYTE COUNT
0037B6I   C8C0 000E           4187           LHI    R12,CRT1
0037BAI   D2C0 4000 5EEBI     4188           STB    R12,TTYLU
0037C0I   41C0 4000 45D8I     4189           BAL    R12,TTYMSG
0037C6I   5841 0004           4190           L      R4,LN.TEMP(R1)
0037CAI   5854 0000           4191           L      R5,0(R4)            DISC ADDRESS AND RETRY COUNT
0037CEI   CA50 0100           4192           AHI    R5,X'100'           UPDATE NUMBER OF RETRIES
0037D2I   5054 0000           4193           ST     R5,0(R4)            RESAVE IT

TDX SYSTEM MAIN CONTROL PROGRAM                              PAGE  77   15:58:00  01/27/77

0037D6I   0875                4194           LR     R7,R5
0037D8I   F470 0000 FF00      4195           NI     R7,RETR.MSK         LEAVE ONLY RETRY COUNT
0037DEI   C570 0500           4196           CLHI   R7,X'500'           COUNT EXCEEDED?
0037E2I   4230 FD0F           4197           BNZ    MODE12.4            NO,TRY IT AGAIN
0037E6I   5894 0008           4198           L      R9,8(R4)
0037EAI   4100 4000 524EI     4199           BAL    R13,PUTCAMP         RETURN  DISC ADDRESS
0037F0I   4300 F894           4200           B      MODE8.1
          0000 37F4I          4201  MODE13   EQU    *
0037F4I   F540 0001 0000      4202           CLI    R4,BIT17
0037FAI   4330 FDC6           4203           BE     MODE12.4
0037FEI   F540 1000 0000      4204           CLI    R4,BIT29
003804I   4330 FF4A           4205           BE     MODE12.8
003808I   4300 EA76           4206           B      ILL.MSG
          0000 380CI          4207  MODE14   EQU    *
00380CI   F540 2000 0000      4208           CLI    R4,BIT30            OP MESSAGE?
003812I   4330 F7D2           4209           BE     MODE6.BZ            YES,SET IT UP AS A BZ
003816I   4300 F76C           4210           B      MODE6
                              4211  *
          0000 381AI          4212  NO       EQU    *
00381AI   5810 4000 58DCI     4213           L      R1,SVCBLK
003820I   6510 4000 50C4I     4214           ABL    R1,COMMLIST
003826I   2411                4215           LIS    R1,1
003828I   6110 4000 5F48I     4216           AHM    R1,WORKCNT
00382EI   030C                4217           BR     R12
          0000 3830I          4218  CHKCAMP  EQU    *
003830I   585A 0014           4219           L      R5,ADR.CMP1(R10)    PRIORITY ACCOUNTS
003834I   2561                4220           LCS    R6,1
003836I   2541                4221           LCS    R4,1
003838I   E1E0 0001           4222           SVC    14,N.1              LOOK IN QUEUES
00383CI   0833                4223           LR     R3,R3
00383EI   4210 4000 384EI     4224           BM     CHKC1
003844I   41F0 4000 4C3AI     4225  CHKC2    BAL    R15,PROC.C2
00384AI   4300 F2F0           4226           B      O.COMM
          0000 384EI          4227  CHKC1    EQU    *
00384EI   585A 0064           4228           L      R5,ADR.CMP3(R10)
003852I   2561                4229           LCS    R6,1
003854I   2541                4230           LCS    R4,1
003856I   E1E0 0001           4231           SVC    14,N.1
00385AI   0833                4232           LR     R3,R3
00385CI   4310 FFE4           4233           BNM    CHKC2
```

```
TDX SYSTEM MAIN CONTROL PROGRAM                    PAGE  77   15:58:00  01/27/77

003860I  585A 0018                    L     R5,ADR.CMP2(R10)
003864I  2561                         LIS   R6,1
003866I  2541                         LIS   R4,1
003868I  E1E0 0001                    SVC   14,M.1
00386CI  0833                         LR    R3,R3         DID WE FIND ONE?
00386EI  4310 FF02                    BNM   CHKC2
003872I  E640 4000 645CI              LA    R4,M.ACK      *********** NEED TO FIX *********
003878I  D35A 003A                    LB    R5,REGF.ST(R10)  DO WE NEED TO SEND OUT REGISTER MESSAGE
00387CI  0855                         LR    R5,R5
00387EI  4330 F934                    BZ    MODE0.1F      NO
003882I  D35A 0038                    LB    R5,REGF.01(R10)  BYTE WITH FIRST 4 REGISTERS
003886I  D250 4000 6477I              STB   R5,M.REGF4
00388CI  D35A 0039                    LB    R5,REGF.02(R10)  BYTE WITH LAST 4 REGISTERS
003890I  D250 4000 6478I              STB   R5,M.REGL4
003896I  E640 4000 6474I              LA    R4,M.REG
00389CI  D35A 003A                    LB    R5,REGF.ST(R10)  STATUS BYTE

TDX SYSTEM MAIN CONTROL PROGRAM                    PAGE  78   15:58:11  01/27/77

0038A0I  C550 0002                    CLHI  R5,2          AL DONE?
0038A4I  2134                         BNES  REG.6         NO
0038A6I  2450                         LIS   R5,0          YES,RESET EVERYTHING TO ZERO
0038A8I  405A 0038                    STH   R5,REGF.01(R10)
         0000 38ACI         REG.6     EQU   *
0038ACI  2450                         LIS   R5,0
0038AEI  025A 003A                    STB   R5,REGF.ST(R10)  RESET INDICATOR
0038B2I  4300 E900                    B     MODE0.1F
                            *
                            *   SET TIME VALUES IN CALL BACK QUEUE
                            *
         0000 38B6I         CALLTIME EQU    *
0038B6I  5040 4000 58D0I              ST    R4,DTEMP.1
0038BCI  6648 0000                    RTL   R4,0(R8)
0038C0I  024C                         BOR   R12
0038C2I  6448 0000                    ATL   R4,0(R8)
0038C6I  F440 0000 00FF               NI    R4,TIME.MSK   KEEP TIME
0038CCI  0869                         LR    R6,R9
0038CEI  F460 0000 00FF               NI    R6,TIME.MSK
0038D4I  0B64                         SR    R6,R4
0038D6I  F460 0000 00FF               NI    R6,TIME.MSK
0038DCI  F490 FFFF FF00               NI    R9,Y'FFFFFF00'
0038E2I  0696                         OR    R9,R6
0038E4I  5840 4000 58D0I              L     R4,DTEMP.1
0038EAI  030C                         BR    R12
                            *
                            *
                            *
                            *
                            *     EXCHANGE TABLE LOOK UP ROUTINE
                            *
                            *             AREA CODE IN 'AREACD+1,+2,+3
                            *
                            *
                            *
                            *
         0000 38ECI         EXCHLOOK EQU    *
0038ECI  5890 4000 58E8I              L     R9,CUSTABLE
0038F2I  2450                         LIS   R5,0
0038F4I  4050 4000 5F62I    EXCH,MAR  STH   R5,MARFLAG    SAVE MARRIAGE CODE FLAG
0038FAI  2450                         LIS   R5,0
0038FCI  4050 4000 5F5AI              STH   R5,CBFLAG     SAVE FLAG
003902I  4889 005E                    LH    R8,NBR.EXCH(R9)  # OF EXCHANGES IN TABLE
003906I  4330 4000 380EI              BZ    EXCH.NO       NO ONE THERE,EXIT
00390CI  5879 0054                    L     R7,ADR.EXCH(R9)  ADDRESS OF EXCHANGE TABLE
003910I  5860 4000 58F0I              L     R6,PHONE
003916I  2493                         LIS   R9,3
003918I  D346 0000          EXCH.0    LB    R4,0(R6)      PICK UP ASCII AREA CODE
00391CI  C440 000F                    NHI   R4,X'F'       AND PACK IT 4 BITS/DIGIT
003920I  C540 000A                    CLHI  R4,X'A'
003924I  2132                         BNES  EXCH.1
003926I  2440                         LIS   R4,0
003928I  1154               EXCH.1    SLLS  R5,4
00392AI  0654                         OR    R5,R4
00392CI  2661                         AIS   R6,1
00392EI  2791                         SIS   R9,1

TDX SYSTEM MAIN CONTROL PROGRAM                    PAGE  79   15:58:22  01/27/77

003930I  4230 FFE4                    BNZ   EXCH.0
003934I  4050 4000 5F40I              STH   R5,PCKARCD    SAVE THE PACKED AREA CODE
                            *
00393AI  2493                         LIS   R9,3          CONVERT THREE DIGIT EXCHANGE
00393CI  245A                         LIS   R5,10         INTO A BINARY NUMBER
00393EI  2430                         LIS   R3,0
003940I  D346 0000          EXCH.2    LB    R4,0(R6)
003944I  C440 000F                    NHI   R4,X'F'
003948I  C540 000A                    CLHI  R4,X'A'
00394CI  2132                         BNES  EXCH.3
00394EI  2440                         LIS   R4,0
? 003950I  9C35             EXCH.3    MHR   R3,R5
003952I  0A34                         AR    R3,R4
003954I  2661                         AIS   R6,1
003956I  2791                         SIS   R9,1
003958I  4230 FFE4                    BNZ   EXCH.2
00395CI  C330 00C8                    SHI   R3,200        MAKE SURE ITS WITHIN RANGE
003960I  4210 4000 380EI              BM    EXCH.NO       NOT A VALID NUMBER
003966I  4030 4000 5F4CI              STH   R3,PCKEXCH    SAVE PACKED EXCHANGE
00396CI  4857 0000          EXCH.6    LH    R5,0(R7)      PICK UP AREA CODE
```

```
00397 0I  C450 0FFF                 NHI    R5,X'FFF'             REMOVE LINE CODE
003974I   4950 4000 5F40I           CH     R5,PCKARCD            EQUAL?
00397AI   4230 4000 3B04I           BNE    EXCH.NXT              NO,LOOK AT NEXT ONE
                               *
                               *    AN AREA CODE MATCH HAS BEEN MADE,CHECK XCHANGE CODE
                               *
                               *  R3 = BIT DISPLACEMENT
                               *  R7 = ADDRESS OF EXCHAGE TABLE
                               *  BITMAP IS DISPLACED BY 16 BITS INTO THE TABLE
                               *
00398 0I  7437 0010                 TBT    R3,16(R7)             CHECK FOR BIT TURNED ON (1)
003984I   4230 4000 3B04I           BNZ    EXCH.NXT              TURNED ON (1) , NOT VALID
                               *
                               *    EXCHANGE CODE MATCH
                               *
00398AI   4857 0000                 LH     R5,0(R7)              PICK UP CODE
00398EI   F450 0000 FFFF            NI     R5,X'FFFF'
003994I   105C                      SRLS   R5,12
003996I   C550 0003                 CLHI   R5,3                  TIE+FX =MCI LINE
00399AI   213A                      BNES   EXCH.JK
00399CI   C850 0028                 LHI    R5,X'28'              CALLBACK CODE
0039A0I   2440                      LIS    R4,MCT                MCI CODE - 13
0039A2I   4050 4000 5F52I           STH    R5,EXCODE             SAVE CODE
0039A8I   4300 4000 3A34I           B      EXCH.5C
          0000 39AEI       EXCH.JK  EQU    *
0039AEI   C550 0009                 CLHI   R5,TLD
0039B2I   4230 4000 39BCI           BNE    EXCH.JK1
0039B8I   C850 0041                 LHI    R5,TLDCD
0039BCI   C550 000A        EXCH.JK1 CLHI   R5,FXD
0039C0I   4230 4000 39CAI           BNE    EXCH.JK2
0039C6I   C850 0042                 LHI    R5,FXDCD
          0000 39CAI       EXCH.JK2 EQU    *
0039CAI   C350 0004                 THI    R5,B.WATT             CAN WE GO OUT TO WATTS?
0039CEI   4330 4000 39F4I           BZ     EXCH.JK4              NO
0039D4I   4840 4000 5F3CI           LH     R4,ARCONEED           NEEDED AREA CODE
0039DAI   4230 4000 39F4I           BNZ    EXCH.JK4              IF NOT INTRASTAE , SKIP
```

```
0039E0I   C750 0014                 XHI    R5,B.INTRA+B.WATT  TURN OFF WAT ,TURN ON INTRASTATE
          0000 39E4I       EXCH.JK4 EQU    *
0039E4I   C350 0001                 THI    R5,B.TIE              TIE LINE?  ****************
0039E8I   4330 4000 3A04I           BZ     EXCH.JK3              NO      *****************
0039EEI   5860 4000 58F6I           L      R6,CUSTABLE
0039F4I   D346 005C                 LB     R4,OUTT.FLG(R6)
0039F8I   0844                      LR     R4,R4                 IF NON ZERO PUT OUT ALL 7 DIGITS
0039FAI   4230 4000 3A04I           BNZ    EXCH.JK3
003A00I   C650 0080                 OHI    R5,X'80'              SET UP FOR PBX DIALTONE ONLY  *******
          0000 3A04I       EXCH.JK3 EQU    *                     ***************
003A04I   4050 4000 5F52I           STH    R5,EXCODE
003A0AI   D347 0003                 LB     R4,EXCH.TC(R7)        SUB CLASS
003A0EI   4040 4000 5F54I           STH    R4,EXSUB
003A14I   C350 0001                 THI    R5,B.TIE
003A18I   2335                      BZS    EXCH.4
003A1AI   244A                      LIS    R4,TIE                SET LINE TO A TIE LINE
003A1CI   4300 4000 3A34I           B      EXCH.5C
          0000 3A22I       EXCH.4   EQU    *
003A22I   C350 0002                 THI    R5,B.FX               FX LINE NEEDED
003A26I   2333                      BZS    EXCH.5                NO
003A28I   2441                      LIS    R4,FX
003A2AI   2305                      BS     EXCH.5C
          0000 3A2CI       EXCH.5   EQU    *
003A2CI   2449                      LIS    R4,LD                 SET IT TO A LOCAL LINE
003A2EI   4040 4000 5F3CI           STH    R4,ARCONEED
          0000 3A34I       EXCH.5C  EQU    *
003A34I   4040 4000 5F58I           STH    R4,EXCLASS            SAVE LINE CLASS NEEDED
003A3AI   4040 4000 5F60I           STH    R4,LINENEED           11/12/76
                               *
                               *    LOOK FOR A LINE IN THE TABLE
                               *
003A40I   5080 4000 5918I           ST     R8,SAVER8
003A46I   5090 4000 5924I           ST     R9,SAVER9
003A4CI   5070 4000 5910I           ST     R7,SAVER7
003A52I   E680 4000 5870I           LA     R8,TANDEM
003A58I   D397 0002                 LB     R9,EXCH.NT(R7)        NUMBER OF EXCHANGES
003A5CI   D298 0000                 STB    R9,0(R8)
003A60I   2468                      LIS    R6,8
003A62I   D397 4600 0004   EXCH.5D  LB     R9,EXCH.T1(R7,R6)
003A68I   D296 4800 0001            STB    R9,1(R6,R8)
003A6EI   2761                      SIS    R6,1
003A70I   2217                      BNMS   EXCH.5D
003A72I   4870 4000 5F62I           LH     R7,MARFLAG            LOOK AT FLAG
003A78I   4230 4000 3AFAI           BNZ    EXCH.7A               MARRIAGE INDICATOR,JUST SET FLAG
003A7EI   41C0 4000 3FFFI           BAL    R12,CHKLNTBL          LOOK FOR AN AVAILABLE LINE
003A84I   0855                      LR     R5,R5
003A86I   4310 4000 3ACAI           BM     EXCH.5A
003A8CI   4890 4000 5F58I           LH     R9,EXCLASS
003A92I   C590 0009                 CLHI   R9,LD                 DO WE HAVE A LOCAL CALL?
003A96I   4230 4000 3AB2I           BNE    EXCH.5B               NO
003A9CI   5870 4000 58F0I           L      R7,PHONE              YES,CHANGE AREA CODE TO 000
003AA2I   C880 008A                 LHI    R8,X'8A'
003AA6I   D287 0000                 STB    R8,0(R7)
003AAAI   C287 0001                 STB    R8,1(R7)
003AAEI   D287 0002                 STB    R8,2(R7)
          0000 3AB2I       EXCH.5B  EQU    *
```

```
   TDX SYSTEM MAIN CONTROL PROGRAM                        PAGE  81    15:58:46  01/27/77

003AB2I   5880 4000 5918I              L      R8,SAVER8
003AB8I   5890 4000 5924I              L      R9,SAVER9          RESTORE REGISTERS
003ABEI   5870 4000 5910I              L      R7,SAVER7
003AC4I   4300 4000 3AFAI              B      EXCH.7A
          0000 3ACAI         EXCH.5A   EQU    *
003ACAI   4890 4000 5F58I              LH     R9,EXCLASS
003AD0I   C590 0009                    CLHI   R9,LO              LOCAL LINE?
003AD4I   4230 4000 3AF2I              BNE    EXCH.7             NO-LOOK FOR TIE LINE
003ADAI   5860 4000 58F0I              L      R6,PHONE
003AE0I   C880 008A                    LHI    R8,X'8A'           SET AREA CODE TO 000
003AE4I   D286 0000                    STB    R8,0(R6)           SO IT DOESN'T GET
003AE8I   D286 0001                    STB    R8,1(R6)           SENT OUT
003AECI   D286 0002                    STB    R8,2(R6)
003AF0I   030D                         BR     R13
          0000 3AF2I         EXCH.7    EQU    *
003AF2I   C590 000A                    CLHI   R9,TIE
003AF6I   023D                         BNER   R13
003AF8I   030D                         BR     R13
          0000 3AFAI         EXCH.7A   EQU    *
003AFAI   2461                         LIS    R6,1
003AFCI   4060 4000 5F5AI              STH    R6,CBFLAG          SET UP CALLBACK FLAG
003B02I   030D                         BR     R13
                             *
          0000 3B04I         EXCH.NXT  EQU    *
003B04I   CA70 0074                    AHI    R7,116             LENGTH OF EXCHANGE TABLE    0
003B08I   2781                         SIS    R8,1               ANY MORE EXCHANGES LEFT?
003B0AI   4230 FE5F                    BNZ    EXCH.6             YES,GO LOOK AGAIN
003B0EI   2551               EXCH.NO   LCS    R5,1               SET UP FOR NO LINE FOUND
003B10I   030D                         BR     R13                EXIT
                             *
                             *         CHECK FOR A FREE INPUT LINE
                             *
                             *         R5 - QUEUE ADDRESS
                             *         R0 - LINE INFORMATION
                             *         R3 - DISC ADDRESS AND COUNTS
                             *         R7 - EXTENSION NUMBER
                             *
          0000 3B12I         LK.INPUT  EQU    *
003B12I   D0D0 4000 5818I              STM    R13,PARTSAVE       SAVE UPPER REGISTERS
003B18I   58D0 4000 58E8I              L      R13,CUSTABLE       ADDRESS OF CUSTOMER TABLE
003B1EI   588D 000C                    L      R8,ADR.LNTB(R13)   LINE TABLE ADDRESS
003B22I   0860                         LR     R6,R0
003B24I   F460 0000 00FF               NI     R6,M.INPUT         LEAVE INPUT LINE TYPE
003B2AI   03FD 0006                    LB     R14,LINES(R13)     NUMBER OF INPUT LINES
003B2EI   D3F8 0000          LK.IN1    LB     R15,STAT.IN(R8)    LOOK AT LINE STATUS
003B32I   08FF                         LR     R15,R15            IS IT FREE
003B34I   4230 4000 3B76I              BNZ    LN.IN2             NO
003B3AI   D3F8 0010                    LB     R15,SUS.IN(R8)     HAS LINE BEEN GIVING US TROUBLE
003B3EI   C5F0 0005                    CLHI   R15,5
003B42I   4220 4000 3B76I              BP     LN.IN2             YES,DON'T USE IT FOR CALL BACK
003B48I   D3F8 0001                    LB     R15,CLASS.IN(R8)
003B4CI   096F                         CR     R6,R15             TYPE EQUAL
003B4EI   4230 4000 3B76I              BNE    LN.IN2             NO
003B54I   24F1                         LIS    R15,1              SET LINE ACTIVE
003B56I   D2F8 0000                    STB    R15,STAT.IN(R8)
003B5AI   D3FD 0006                    LB     R15,LINES(R13)

   TDX SYSTEM MAIN CONTROL PROGRAM                        PAGE  82    15:58:58  01/27/77

003B5EI   0BFE                         SR     R15,R14
003B60I   40F0 4000 5F2FI              STH    R15,LINENUMR
003B66I   5080 4000 58CCI              ST     R8,LINEADR         SAVE I/O LINE ADDRESS
003B6CI   0818                         LR     R1,R8
          0000 3B6EI         LK.INXT   EQU    *
003B6EI   D1D0 4000 5818I              LM     R13,PARTSAVE
003B74I   030E                         BR     R14
                             *
003B76I   4A80 4000 5F44I    LN.IN2    AH     R8,IOLIN.LN        POINT TO NEXT LINE
003B7CI   27E1                         SIS    R14,1              ANY MORE LINES LEFT
003B7EI   4230 FFAC                    BNZ    LK.IN1             YES,GO LOOK AT THEM
003B82I   2581                         LCS    R8,1
003B84I   4300 FFE6                    B      LK.INXT            EXIT
                             *
                             *
                             *       CHECK THE CALLBACK QUEUE FOR AN ENTRY
                             *       INPUT REQUIREMENTS:
                             *           R8 = OUTPUT SUBCLASS,IF FX OR TIE LINE
                             *           R4 = OUTLINE TYPE
                             *           R5 = ADDRESS OF QUEUE
                             *           R6 = INPUT LINE TYPE
                             *                0 - PBX,CENTREX
                             *                1 THRU D  TIE LINES
                             *                E- INWATTS
                             *                F- LOCAL
                             *             IF R6 < 0, NO INPUT LINE GIVEN
                             *             IF R4 < 0, NO OUTPUT LINE GIVEN
                             *
                             *       EXIT CONDITIONS
                             *         IF R3  < 0, NO ENTRY ENTRY AVAILABLE
                             *                > 0, 1ST WORD OF QUEUE ENTRY
                             *             R0 -      2ND WORD OF QUEUE ENTRY
                             *             R7 -      3RD WORD (EXTENSION)
                             *
                             *
                             *
003B88I   0799               CHKCALBK  XR     R9,R9
003B8AI   6635 0000                    RTL    R3,0(R5)
003B8EI   2142                         BNS    CHKCAL.0           NO ENTRIES,EXIT
003B90I   2303                         BS     CHKCAL.5
```

```
TDX SYSTEM MAIN CONTROL PROGRAM                                   PAGE  82   15:58:58  01/27/77

003B92I  2531               CHKCAL.0 LCS    R3,1               SET NO ENTRY FOUND INDICATOR
003B94I  030C                        BR     R12                EXIT
003B96I  4080 4000 5F5CI    CHKCAL.5 STH    R8,LINESUB         SAVE SUBCLASS
003B9CI  6435 0000                   ATL    R3,0(R5)           PUT ENTRY BACK ON
003BA0I  0866                        LR     R6,R6              INPUT LINE GIVEN?
003BA2I  4210 4000 3D94I             BM     CHK.TIMR           NO
003BA8I  6635 0000          CHKCAL.2 RTL    R3,0(R5)           ANY MORE ENTRIES?
003BACI  4240 4000 3CF2I             BO     CHKCAL.3           NO
003BB2I  6605 0000                   RTL    R0,0(R5)           LINE INFORMATION
003BB6I  6575 0000                   RTL    R7,0(R5)           EXTENSION NUMBER
003BBAI  0880                        LR     R8,R0
003BBCI  F480 0000 00FF              NI     R8,M.INPUT         LEAVE ONLY INPUT LINE TYPE
003BC2I  0866                        LR     R6,R6
003BC4I  2115                        BMS    CHKCL.2A
003BC6I  0986                        CR     R8,R6              ARE LINES EQUAL?
003BC8I  4230 4000 3CB4I             BNE    CHKDM              NO,STORE ON DUMMY LIST

TDX SYSTEM MAIN CONTROL PROGRAM                                   PAGE  83   15:59:09  01/27/77

003BCEI  0880               CHKCL.2A LR     R8,R0
003BD0I  C540 0001                   CLHI   R4,FX              LOOK AT FREE OUTPUT LINE
003BD4I  4330 4000 3C3FI             BE     CHK.FX             FX
003BDAI  4280 4000 3C84I             BC     CHK.INTR           INTRASTATE
003BE0I  C540 000D                   CLHI   R4,MCI             MCI LINE?
003BE4I  4330 4000 3C20I             BE     CHK.MCI            YES
003BEAI  C540 0009                   CLHI   R4,LD              LOCAL?
003BEEI  4330 4000 3C4EI             BE     CHK.LD             YES
003BF4I  4280 4000 3C96I             BC     CHK.WATT           WATTS
                                 *
                                 *     WE HAVE A TIE LINE
                                 *
003BFAI  F380 0001 0000              TI     R8,B.TIE*TWO.16    CAN CALL BACK LINE USE A TIE LINE?
003C00I  4330 4000 3CB4I             BZ     CHKDM              NO
003C06I  F480 0000 FF00     CHK.TIE1 NI     R8,M.SUBCLS        ARE SUBCLASSES EQUAL?
003C0CI  1088                        SRLS   R8,8
003C0EI  4980 4000 5F5CI             CH     R8,LINESUB
003C14I  4330 4000 3CE0I             BE     CHK.GOOD           YES,LETS USE IT
003C1AI  4300 4000 3CB4I             B      CHKDM              NO-FORGET IT
003C20I  F380 0020 0000     CHK.MCI  TI     R8,B.MCI*TWO.16    CAN WE USE THE LINE
003C26I  4330 4000 3CB4I             BZ     CHKDM
003C2CI  F380 0001 0000              TI     R8,B.TIE*TWO.16    SPECIAL CALLBACK CODE
003C32I  4230 4000 3CB4I             BNZ    CHKDM
003C38I  4300 4000 3CE0I             B      CHK.GOOD
003C3EI  F380 0002 0000     CHK.FX   TI     R8,B.FX*TWO.16     CAN WE USE A FX
003C44I  4330 4000 3CB4I             BZ     CHKDM              NO
003C4AI  4300 FFBA                   B      CHK.TIE1           YES,CHECK SUBCLASS
003C4EI  F380 0008 0000     CHK.LD   TI     R8,B.LD*TWO.16     CAN WE USE LD
003C54I  4330 4000 3CB4I             BZ     CHKDM              NO
003C5AI  F480 FF00 0000              NI     R8,M.WATT
003C60I  4330 4000 3CE0I             BZ     CHK.GOOD           IF INTRASTATE CALL ,USE LINE
003C66I  F580 0900 0000              CLI    R8,LD*TWO.24       DO WE NEED A LD LINE?
003C6CI  4330 4000 3CE0I             BE     CHK.GOOD           YES
003C72I  4880 4000 5F42I             LH     R8,LDFG            IS LD FLAG SET
003C78I  4330 4000 3CB4I             BZ     CHKDM              NO- IGNORE IT
003C7EI  4300 4000 3CE0I             B      CHK.GOOD
003C84I  F380 0010 0000     CHK.INTR TI     R8,B.INTRA*TWO.16  INTRA*TWO.16STATE OK?
003C8AI  4330 4000 3CB4I             BZ     CHKDM              NO
003C90I  4300 4000 3CE0I             B      CHK.GOOD
                                 *
003C96I  F380 0004 0000     CHK.WATT TI     R8,B.WATT*TWO.16   WATTS LINE
003C9CI  4330 4000 3CB4I             BZ     CHKDM
003CA2I  F480 FF00 0000              NI     R8,M.WATTS
003CA8I  108C                        SRLS   R8,12
003CAAI  108C                        SRLS   R8,12
003CACI  0948                        CR     R4,R8              IF LINE IS EQUAL OR LESS, WE ARE O.K.
003CAEI  4380 4000 3CE0I             BNC    CHK.GOOD
                                 *
                                 *     ENTRY NOT FOUND, STORE ON DUMMY LIST
                                 *
003CB4I  6530 4000 5A58I    CHKDM    ABL    R3,DUMMLIST
003CBAI  6500 4000 5A58I             ABL    R0,DUMMLIST
003CC0I  6570 4000 5A58I             ABL    R7,DUMMLIST
003CC6I  2691                        AIS    R9,1
003CC8I  4300 FF0C                   B      CHKCAL.2
                                 *

TDX SYSTEM MAIN CONTROL PROGRAM                                   PAGE  84   15:59:20  01/27/77

003CCCI  0880                        LR     R8,R0
003CCEI  F480 FF00 0000              NI     R8,M.WATTS
003CD4I  108C                        SRLS   R8,12
003CD6I  108C                        SRLS   R8,12              POSITION NEEDED WATTS LINE
003CD8I  0984                        CR     R8,R4              HOW DO THEY COMPARE
003CDAI  2333                        BES    CHK.GOOD           IF EQUAL OR LESS WE CAN USE IT
003CDCI  4280 FFD4                   BL     CHKDM              NO GOOD, STORE IT ON DUMMY LIST
                                 *
         0000 3CE0I         CHK.GOOD EQU    *
003CE0I  0866                        LR     R6,R6
003CE2I  4210 4000 3FA4I             BM     CHK.INP            LOOK FOR GOOD INPUT LINE
003CE8I  0899               CHK.GD1  LR     R9,R9              WAS THIS THE FIRST ENTRY ON LIST
003CEAI  4330 4000 3D02I             BZ     CHK.GD2            YES, UPDATE ALL TIMES
003CF0I  2302                        BS     CHKCAL.4
003CF2I  2531               CHKCAL.3 LCS    R3,1
003CF4I  6790 4000 5A58I    CHKCAL.4 RBL    R9,DUMMLIST        RESTORE ALL ENTRIES BACK TO
003CFAI  024C                        BOR    R12                ORIGINAL QUEUE
003CFCI  6495 0000                   ATL    R9,0(R5)
003D00I  2206                        BS     CHKCAL.4
                                 *
```

```
TDX SYSTEM MAIN CONTROL PROGRAM                              PAGE  84   15:59:20  01/27/77
                                        -continued
003D02I  0883                 CHK.GD2  LR    R8,R3
003D04I  F480 0000 00FF                NI    R8,TIME.MSK        IF NO TIME REMAINS WE ARE O.K.
         0000 3D0AI           CHK.GD2A EQU   *
003D0AI  4080 4000 58A0I               STH   R8,CHK.TMP1        TIME LEFT FROM FIRST ENTRY
003D10I  6685 0000                     RTL   R8,0(R5)           THIS IS NOW THE FIRST ENTRY
003D14I  024C                          BOR   R12                THERE ONLY WAS ONE ENTRY
003D16I  0898                          LR    R9,R8
003D18I  F490 0000 00FF                NI    R9,TIME.MSK        KEEP CURRENT TIME LEFT
003D1EI  4090 4000 58A8I               STH   R9,CHK.TMP2
003D24I  4A90 4000 58A0I               AH    R9,CHK.TMP1        PLUS TIME FROM FIRST ENTRY
003D2AI  F490 0000 00FF                NI    R9,TIME.MSK        CHECK FOR ERROR
003D30I  F480 FFFF FF00                NI    R8,Y'FFFFFF00'     GIVES NEW FI-ST ENTRY TIME LEFT
003D36I  0689                          OR    R8,R9
003D38I  6580 4000 5A58I               ABL   R8,DUMMLIST
003D3EI  6685 0000                     RTL   R8,0(R5)           LINE INFORMATION
003D42I  6580 4000 5A58I               ABL   R8,DUMMLIST
003D48I  6685 0000                     RTL   R8,0(R5)
003D4CI  6580 4000 5A58I               ABL   R8,DUMMLIST        EXTENSION NUMBER
                              *
                              *         LOOP ON THE REMAINDER OF THE QUEUE
                              *
003D52I  6695 0000            CHKCAL.6 RTL   R9,0(R5)
003D56I  4240 FF9A                     EQ    CHKCAL.4           ALL DONE,RESTORE LIST
003D5AI  0889                          LR    R8,R9
003D5CI  F480 0000 00FF                NI    R8,TIME.MSK        UPDATE TIME REMAINING
003D62I  4880 4000 58A8I               SH    R8,CHK.TMP2
003D68I  F480 0000 00FF                NI    R8,TIME.MSK
003D6EI  F490 FFFF FF00                NI    R9,Y'FFFFFF00'
003D74I  0698                          OR    R9,R8
003D76I  6590 4000 5A58I               ABL   R9,DUMMLIST
003D7CI  6685 0000                     RTL   R8,0(R5)           LINE STATUS
003D80I  6580 4000 5A58I               ABL   R8,DUMMLIST
003D86I  6695 0000                     RTL   R8,0(R5)           EXTENSION NUMBER
003D8AI  6580 4000 5A58I               ABL   R8,DUMMLIST
003D90I  4300 FFBE                     B     CHKCAL.6           FINISH UP
                              *

TDX SYSTEM MAIN CONTROL PROGRAM                              PAGE  85   15:59:32  01/27/77

                              *
                              *
                              *
         0000 3D94I           CHK.TIMR EQU   *
003D94I  0844                          LR    R4,R4              OUTPUT LINE GIVEN
003D96I  4310 FF0F                     BNM   CHKCAL.2           YES,SEARCH QUEUE FOR ENTRY
003D9AI  2491                          LIS   R9,1
003D9CI  4090 4000 5F38I               STH   R9,ENTRY.1
003DA2I  0799                          XR    R9,R9
003DA4I  F430 0000 00FF                NI    R3,TIME.MSK        LEAVE TIME REMAINING
003DAAI  2334                          BZS   CHK.T1
003DACI  4090 4000 5F38I               STH   R9,ENTRY.1
                              *         NO INPUT OR OUTPUT LINE GIVEN
                              *
003DB2I  F430 0000 00FF       CHK.T1   NI    R3,TIME.MSK        LEAVE ONLY TIME LEFT
003DB8I  4230 4000 3F1EI               BNZ   CHK.IOL            NO,LOOK FOR OTHER FREE LINES
003DBEI  6635 0000                     RTL   R3,0(R5)
003DC2I  6605 0000                     RTL   R0,0(R5)           LINE INFORMATION
003DC6I  6675 0000                     RTL   R7,0(R5)           EXTENSION NUMBER
003DCAI  F300 0040 0000                TI    R0,F.DROP*TWO.16
003DD0I  2337                          BZS   CHK.D1
003DD2I  4880 4000 5F38I               LH    R8,ENTRY.1         IS  LD FLAG SET
003DD8I  4230 4000 3E04I               BNZ   CHK.DP             YES,DOP ENTRY
         0000 3DDEI           CHK.D1   EQU   *
003DDEI  0880                          LR    R8,R0
003DE0I  F380 0008 0000                TI    R8,F.LD*TWO.16     CAN WE USE AN LD*TWO.16 LINE
003DE6I  4230 4000 3E58I               BNZ   CHK.TOK            YES
003DECI  6530 4000 5A58I      CHK.T2   ABL   R3,DUMMLIST        RESTORE ENTRY ON WORK LIST
003DF2I  6500 4000 5A58I               ABL   R0,DUMMLIST
003DF8I  6570 4000 5A58I               ABL   R7,DUMMLIST
003DFEI  4300 4000 3E46I               B     CHK.DP1
         0000 3E04I           CHK.DP   EQU   *
003E04I  5090 4000 593CI               ST    R9,PSAVE9
003E0AI  3493                          EXHR  R9,R3              PUT CALLBACK SECTOR IN LOW BITS
003E0CI  F490 0000 FFFF                NI    R9,Y'FFFF'         LEAVE ONLY SECTOR ADDRESS
003E12I  50D0 4000 5940I               ST    R13,PSAVE13
003E18I  5050 4000 5938I               ST    R5,PSAVE5
003E1EI  41D0 4000 524EI               BAL   R13,PUTCAMP        RETURN SECTOR
003E24I  5850 4000 5938I               L     R5,PSAVE5
003E2AI  5890 4000 593CI               L     R9,PSAVE9
003E30I  58D0 4000 5940I               L     R13,PSAVE13
003E36I  0899                          LR    R9,R9              WAS THIS FIRST ENTRY ON LIST?
003E38I  4230 4000 3E46I               BNZ   CHK.DP1            NO
003E3EI  2531                          LCS   R3,1               SET TO NO ENTRY FOUND
003E40I  2480                          LIS   R8,0               SET TIME TO ZERO
003E42I  4300 FFC4                     B     CHK.GD2A           READJUST QUEUE
         0000 3E46I           CHK.DP1  EQU   *
003E46I  6635 0000                     RTL   R3,0(R5)
003E4AI  4240 FEA4                     EQ    CHKCAL.3           IF LIST EMPTY,EXIT
003E4EI  6435 0000                     ATL   R3,0(R5)           PICK UP NEXT ENTRY AND CHECK IT
003E52I  2691                          AIS   R9,1
003E54I  4300 FF5A                     B     CHK.T1
                              *
003E58I  4880 4000 5F38I      CHK.TOK  LH    R8,ENTRY.1         ODD ONLY IF FIRST ENTRY IN QUEUE WAS 0
003E5EI  4080 4000 5F42I      CHK.TOK1 STH   R8,LDFG
003E64I  4080 4000 5F36I               STH   R8,MEASURED        SET UP FOR MEASURED WATS LINE IF AVAILA
```

```
TDX SYSTEM MAIN CONTROL PROGRAM                                      PAGE  86    15:59:44  01/27/77

003E64T  4080 4000 5F36I                STH    R8,MEASURED         SET UP FOR MEASURED WATS IF THERE
003E70T  5090 4000 58ACI                ST     R9,CHK.TMP3
003E76T  50E0 4000 591CI                ST     R14,SAVF14
003E7CT  41E0 FF92                      BAL    R14,LK.INPUT        CHECK FOR 11 FREE INPUT LINE
003E80T  5890 4000 58ACI                L      R9,CHK.TMP3
003E86T  58E0 4000 591CI                L      R14,SAVF14
003E8CT  0888                           LR     R8,R8
003E8ET  4210 FF5A                      BM     CHK.T2              NO INPUT LINE AVAILABLE,RESTORE ENTRY
003E92T  5070 4000 5910I                ST     R7,SAVER7           SAVE CALL BACK INFO
003E98T  5000 4000 5914I                ST     R0,SAVER0
003E9ET  5030 4000 5908I                ST     R3,SAVER3
003EA4T  5050 4000 58A0I                ST     R5,CHK.TMP1         SAVE QUEUE ADDRESS
003EAAT  0880                           LR     R8,R0
003EACT  F480 0000 FF00                 NI     R8,M.SUBCLS         SAVE SUBCLASS
003EB2T  1088                           SRLS   R8,8
003EB4T  4080 4000 5F54I                STH    R8,EXSUB
003EBAT  F300 0002 0000                 TI     R0,B.FX*TWO.16      CAN WE USE AN FX LINE?
003EC0T  4230 4000 3F30T                BNZ    CHK.IOL1            YES
003EC6T  F300 0001 0000                 TI     R0,B.TIE*TWO.16     CAN WE USE A TIE LINE
003ECCT  4230 4000 3F60T                BNZ    CHK.IOL2            YES
         0000 3F02I            CHK.IOL3 EQU    *
003ED2T  0840                           LR     R4,R0
003ED4T  F440 FF00 0000                 NI     R4,M.WATT
003EDAT  104C                           SRLS   R4,12               POSITION WATTS BAND OVER
003EDCT  104C                           SRLS   R4,12
003EDET  50C0 4000 58A8T                ST     R12,CHK.TMP2
003EE4T  41C0 4000 3FBEI                BAL    R12,CHKLNTBL
003EEAT  58C0 4000 58A8I                L      R12,CHK.TMP2
003EF0T  5890 4000 58ACT                L      R9,CHK.TMP3
003EF6T  D257 C008                      STB    R5,LN.WAT(R7)       SET UP PROPER LINE IS USE
003EFAT  5870 4000 5910I       CHK.IOL4 L      R7,SAVER7
003F00T  5800 4000 5914I                L      R0,SAVER0
003F06T  5830 4000 5908I                L      R3,SAVER3           RESTORE CALLBACK INFO
003F0CI  0855                           LR     R5,R5               DID WE FIND A FREE LINE
003F0ET  4210 4000 3F8EI                BM     CHK.NOL             NO
003F14T  5850 4000 58A0I                L      R5,CHK.TMP1
003F1AT  4300 FDCA                      B      CHK.GD1
         0000 3F1EI            CHK.IOL  EQU    *
003F1ET  6635 0000                      RTL    R3,0(R5)
003F22T  6605 0000                      RTL    R0,0(R5)
003F26T  6675 0000                      RTL    R7,0(R5)
003F2AT  2480                           LTS    R8,0
003F2CT  4300 FF2F                      B      CHK.TOK1
                               *
003F30T  2441                  CHK.IOL1 LIS    R4,FX               LOOK FOR FX LINE
003F32T  50C0 4000 58A8I       CHK.IOL5 ST     R12,CHK.TMP2
003F38T  41C0 4000 3FBET                BAL    R12,CHKLNTBL
003F3ET  58C0 4000 58A8I                L      R12,CHK.TMP2
003F44T  5890 4000 58ACT                L      R9,CHK.TMP3
003F4AT  D257 0008                      STB    R5,LN.WAT(R7)       SAVE CODE IF LINE FOUND
003F4ET  5800 4000 5914I                L      R0,SAVER0
003F54T  0855                           LR     R5,R5               WAS A LINE FOUND
003F56I  4210 4000 3F66I                BM     CHK.IOL6            NO,LOOK FOR WATTS LINE
003F5CT  4300 FF9A                      B      CHK.IOL4
003F60T  244A                  CHK.IOL2 LIS    R4,TIE              LOOK FOR A TIE LINE
003F62T  4300 FFCC                      B      CHK.IOL5


TDX SYSTEM MAIN CONTROL PROGRAM                                      PAGE  87    15:59:56  01/27/77

         0000 3F66T            CHK.IOL6 EQU    *
003F66I  5830 4000 5908T                L      R3,SAVER3           IF TIME RAN OUT ,SET UP FOR WATS LINE
003F6CT  F430 0000 00FF                 NI     R3,TIME.MSK
003F72I  4330 FF5C                      BZ     CHK.IOL3
003F76T  F300 0004 0000                 TI     R0,B.WATT*TWO.16
003F7CT  4230 FF52                      BNZ    CHK.IOL3
003F80T  F300 0008 0000                 TI     R0,B.LD*TWO.16
003F86T  4230 FF48                      BNZ    CHK.IOL3
003F8AT  4300 FF6C                      B      CHK.IOL4
                               *
         0000 3F8EI            CHK.NOL  EQU    *                   NO FREE OUTPUT PORT
003F8ET  5850 4000 58A0T                L      R5,CHK.TMP1         RESTORE ADDRESS
003F94T  5880 4000 58CCI                L      R8,LINEADR
003F9AI  2460                           LTS    R6,0
003F9CT  D268 0000                      STB    R6,STAT.IN(R8)      SET INPUT LINE FREE
003FA0T  4300 FF48                      B      CHK.T2              LOOK AT NEXT ENTRY
                               *
                               *
         0000 3FA4I            CHK.INP  EQU    *                   OUTPUT LINE FOUND,LOOK FOR INPUT
003FA4T  50E0 4000 591CT                ST     R14,SAVF14
003FAAT  41E0 FB64                      BAL    R14,LK.INPUT
003FAET  58E0 4000 591CI                L      R14,SAVF14
003FB4T  0468                           LR     R6,R8               WAS AN INPUT LINE FOUND?
003FB6T  4210 FCFA                      BM     CHKDM               NO,LOOK FOR ANOTHER LINE
003FBAI  4300 FD2A                      B      CHK.GD1             YES,PROCESS IT.
                               *
                               *        CHKLNTBL - CHECK LINE TABLE FOR
                               *                   A FREE OUTPUT LINE
                               *
                               *                   R4 - OUTPUT LINE TYPE NEEDED
                               *                   LDFG = 0,NO LOCAL LINE CAN BE USED
                               *                        = 1,CAN USE A LOCAL LINE
                               *                   PACKARCD - PACKED 3 DIGIT AREA CODE
                               *                   FXSUB - SUBCLASS OF LINE NEEDED IF FX OR TIE
                               *
         0000 0008             MWAT     EQU    11                  MEASURED WATS LINE
         0000 3FBEI            CHKLNTBL EQU    *
003FBET  5860 4000 58F8I                L      R6,CUSTABLE         CUSTOMER DATA BASE TABLE
003FC4T  0733                           XR     R3,R3               START LOOKING AT LINE 0
003FC6T  5826 000C                      L      R2,ADR.LNTB(R6)     ADDRESS OF I/O LINE TABLE
         0000 3FCAI            CHKLNT   EQU    *
```

```
TDX SYSTEM MAIN CONTROL PROGRAM                                    PAGE  87   15:59:56  01/27/77
003FCAI  4040 4000 5F60I      4795            STH    R4,LINENEED
003FD0I  C470 0008            4796            LHI    R7,B.DDD
003FD4I  C540 0000            4797            CLHI   R4,INTRA
003FD8I  2134                 4798            BNES   CHKLN.2A
003FDAI  4070 4000 5F5EI      4799            STH    R7,CALLCODE
         0000 3FE0I           4800  CHKLN.2A  EQU    *
003FE0I  5860 4000 58E8I      4801            L      R6,CUSTABLE
003FE6I  262C                 4802            AIS    R2,12          POINT TO OUTPUT LINES
003FE8I  0799                 4803            XR     R9,R9          SET FOR NO INTA-STATE LINES
003FEAI  0372 0002            4804            LB     R7,2(R2)       IS FIRST LINE INTRASTATE?
003FEEI  0877                 4805            LR     R7,R7
003FF0I  213C                 4806            BNZS   CHKLN.2        NO
003FF2I  C540 0000            4807            CLHI   R4,INTRA       INTRASTATE LINE NEEDED?
003FF6I  4230 4000 4008I      4808            BNE    CHKLN.2        NO,LEAVE IT ALONE
003FFCI  2591                 4809            LCS    R9,1           YES,RESET FLAG

TDX SYSTEM MAIN CONTROL PROGRAM                                    PAGE  88   16:00:08  01/27/77

003FFEI  C870 0010            4810            LHI    R7,B.INTRA
004002I  4070 4000 5F5EI      4811            STH    R7,CALLCODE    SET UP CALLBACK CODE FOR INTRA PLUS DDD
004008I  0372 0000            4812  CHKLN.2   LB     R7,0(R2)       PICK UP STATUS BYTE
00400CI  0877                 4813            LR     R7,R7          FREE OR BUSY
00400EI  4230 4000 409CI      4814            BNZ    CHKLN.4        BUSY,LOOK AT NEXT ONE
004014I  0372 0002            4815            LB     R7,2(R2)       PICK UP LINE CLASSIFICATION
004018I  C470 00F0            4816            NHI    R7,X'F0'       LEAVE ONLY LINE TYPE
00401CI  C540 0000            4817            CLHI   R4,INTRA       DO WE NEED AN INTRATE LINE
004020I  4330 4000 4154I      4818            BE     CHKLN.7        YES
004026I  C540 000D            4819            CLHI   R4,MCI
00402AI  4330 4000 408CI      4820            BE     CHKLN.MC
004030I  C540 0001            4821            CLHI   R4,FX          DO WE NEED A FX LINE
004034I  4230 4000 405AI      4822            BNE    CHKLN.3        NO,LOOK FOR TIE OR WATTS
00403AI  1074                 4823  CHKLN.8   SRLS   R7,4
00403CI  0974                 4824            CR     R7,R4          IS THIS A FX LINE
00403EI  4230 4000 409CI      4825            BNE    CHKLN.4        NO-LOOK AT NEXT ONE
004044I  D352 0008            4826  CHKLN.9   LB     R5,8(R2)       PICK UP FX SUBCLASS
004048I  4950 4000 5F54I      4827            CH     R5,FXSUB       ARE THEY EQUAL?
00404CI  4230 4000 409CI      4828            BNE    CHKLN.4        NO,LOOK AT THE NEXT LINE
004054I  4300 4000 40D6I      4829            B      CHKLN.6        FIX UP LINE
         0000 405AI           4830  CHKLN.3   EQU    *
00405AI  C540 000A            4831            CLHI   R4,TIE         DO WE NEED A TIE LINE
00405EI  4330 FFD8            4832            BE     CHKLN.8        YES
004062I  1074                 4833            SRLS   R7,4           POSITION LINE TYPE
004064I  0574                 4834            CLR    R7,R4          ARE THEY EQUAL
004066I  4330 4000 40D6I      4835            BE     CHKLN.6        YES,USE IT
00406CI  4280 4000 409CI      4836            BL     CHKLN.4        NOT WITHIN RANGE
004072I  C570 000B            4837            CLHI   R7,MWAT        MEASURED WATS LINE?
004074I  4330 4000 4146I      4838            BE     CHKLN.MW       YES
00407CI  C570 0009            4839            CLHI   R7,LD          A LOCAL LINE OR HIGHER
004080I  4380 4000 40C8I      4840            BNL    CHKLN.5        YES,CHECK IT OUT
004086I  4300 4000 40D6I      4841            B      CHKLN.6        WE CAN USE THIS WATTS LINE
         0000 408CI           4842  CHKLN.MC  EQU    *
00408CI  1074                 4843            SRLS   R7,4
00408EI  0574                 4844            CLR    R7,R4
004090I  4230 4000 409CI      4845            BNE    CHKLN.4
004096I  4300 4000 40D6I      4846            B      CHKLN.6
                              4847  *
         0000 409CI           4848  CHKLN.4   EQU    *
00409CI  4A20 4000 5F44I      4849            AH     R2,IOLIN.LN    POINT TO NEXT IN GROUP
0040A2I  2631                 4850            AIS    R3,1           UPDATE LINE NUMBER
0040A4I  0436 0006            4851            CLB    R3,LINES(R6)   ANY LINES LEFT
0040A8I  4280 FF5C            4852            BL     CHKLN.2
0040ACI  4870 4000 5F2EI      4853            LH     R7,LINENUMR
0040B2I  4C70 4000 5F44I      4854            MH     R7,TABLNGTH
0040B8I  5476 000C            4855            A      R7,ADR.LNTB(R6)
0040BCI  2450                 4856            LIS    R5,0
0040BEI  4050 4000 5F36I      4857            STH    R5,MEASURED    RESET FLAG
0040C4I  2551                 4858            LCS    R5,1           SET UP ATB INDICATOR
0040C6I  030C                 4859            BR     R12
                              4860  *
0040C8I  4230 FFD0            4861  CHKLN.5   BNE    CHKLN.4
0040CCI  4850 4000 5F42I      4862            LH     R5,LDFG        CAN WE USE A LOCAL LINE
0040D2I  4330 FFC6            4863            BZ     CHKLN.4        NO,LOOK AT NEXT ONE
                              4864  *
0040D6I  0857                 4865  CHKLN.6   LR     R5,R7          SET UP LINE USED

TDX SYSTEM MAIN CONTROL PROGRAM                                    PAGE  89   16:00:20  01/27/77

0040D8I  2471                 4866            LIS    R7,1
0040DAI  D272 0000            4867            STB    R7,0(R2)       SET OUTPUT LINE BUSY
0040DEI  4870 4000 5F2EI      4868            LH     R7,LINENUMR
0040E4I  D272 0001            4869            STB    R7,1(R2)       INPUT LINE USING THIS OUTPUT LINE
0040E8I  4C70 4000 5F44I      4870            MH     R7,TABLNGTH
0040EEI  5A76 000C            4871            A      R7,ADR.LNTB(R6)  INPUT LINE TABLE ADDRESS
0040F2I  D237 0009            4872            STB    R3,LN.OUT(R7)  STORE OUTPUT LINE FOR XREF
0040F6I  4030 4000 5F30I      4873            STH    R3,OUTLINE     SAVE NUMBER FOR BILLING
0040FCI  4890 4000 5F56I      4874            LH     R9,IND         INTERNATIONAL CALL?
004102I  2332                 4875            BZS    CHKLN.6A
004104I  244C                 4876            LIS    R4,12
         0000 4106I           4877  CHKLN.6A  EQU    *
004106I  D240 4000 5FF4I      4878            STB    R4,BSFRV       SAVE SERVICE CODES
00410CI  D250 4000 5FF3I      4879            STB    R5,ASFRV
004112I  4890 4000 5F54I      4880            LH     R9,FXSUB
004118I  D297 0017            4881            STB    R9,LN.SUBC(R7) SAVE SUBC(R7)LASS USED
00411CI  5010 4000 58A8I      4882            ST     R1,FUEL1
004122I  0817                 4883            LR     R1,R7
004124I  50F0 4000 5904I      4884            ST     R15,SAVF15
00412AI  41F0 4000 4812I      4885            BAL    R15,TALK1
004130I  5810 4000 58A8I      4886            L      R1,FUEL1
```

```
TDY SYSTEM MAIN CONTROL PROGRAM                                  PAGE  89   16:00:20  01/27/77

00413 6I  24F0                          LIS    R15,0           RESET MEASURED FLAG
004138I   40F0 4000 5F36I               STH    R15,MEASURED
00413EI   58F0 4000 5904I               L      R15,SAVE15
004144I   030C                          BR     R12             EXIT
          0000 4146I          CHKLN.MW  EQU    *
004146I   4850 4000 5F36I               LH     R5,MEASURED     CAN WE USE A MEASUDED WATS LINE?
00414CI   4330 FF4C                     BZ     CHKLN.4         NO
004150I   4300 FF82                     B      CHKLN.6         YES
                              *
          0000 4154I          CHKLN.7   EQU    *
004154I   1074                          SRLS   R7,4            POSITION IT
004156I   4570 0004                     CLH    R7,R4           ARE THEY EQUAL
00415AI   4330 FF78                     BE     CHKLN.6         YES,USE IT
00415EI   4850 4000 5F42I               LH     R5,LDFG         CAN WE USE A LOCAL LINE
004164I   4230 4000 4170I               BNZ    CHKLN.7A        YES,IGNORE NEXT CHECK
00416AI   0899                          LR     R9,R9           WAS AN INTRA LINE GIVEN
00416CI   4230 FF2C                     BNZ    CHKLN.4         YES,IGNORE A LOCAL
004170I   C570 0009           CHKLN.7A  CLHI   R7,LD           CAN WE USE A LOCAL LINE
004174I   4330 FF5F                     BE     CHKLN.6         YES
004178I   4300 FF20                     B      CHKLN.4         CHECK NEXT LINE
                              *
                              *    PARSE INPUT BUFFER TO CLASSIFY MESSAGE TYPE
                              *
          0000 417CI          PARSEBUF  EQU    *
00417CI   2561                          LCS    R6,1            SET UP FOR NO REGISTER GIVEN
00417EI   4060 4000 5EFCI               STH    R6,REGISTER
004184I   F420 00FF FFFF                NI     R2,Y'FFFFFF'    LEAVE ONLY ADDRESS
00418AI   4862 0002                     LH     R6,2(R2)        PICK UP CHARACTER COUNT
00418EI   2624                          AIS    R2,4
                              *
                              *    IF NEW MESSAGE FORMAT,ELIMINATE THE REGISTER NUMBER
                              *
004190I   D332 0001                     LB     R3,1(R2)
004194I   C430 00F0                     NHI    R3,X'F0'
004198I   C530 00C0                     CLHI   R3,X'C0'
```

```
TDY SYSTEM MAIN CONTROL PROGRAM                                  PAGE  90   16:00:31  01/27/77

00419CI   4230 4000 41C6I               BNE    P.NONEW
0041A2I   D332 0001                     LB     R3,1(R2)
0041A6I   C430 000F                     NHI    R3,X'F'         SAVE REGISTER NUMBER
0041AAI   4030 4000 5EFCI               STH    R3,REGISTER
0041B0I   0842                          LR     R4,R2           REPACK INPUT BUFFER WITHOUT REGISTER NU
0041B2I   D334 0002           P.NEW1    LB     R3,2(R4)
0041B6I   D234 0001                     STB    R3,1(R4)
0041BAI   2641                          AIS    R4,1
0041BCI   C530 0003                     CLHI   R3,X'03'
0041C0I   4230 FFEF                     BNE    P.NEW1
0041C4I   2761                          SIS    R6,1
          0000 41C6I          P.NONEW   EQU    *
0041C6I   4060 4000 5F72I               STH    R6,MSGCNT       SAVE MESSAGE LENGTH
0041CCI   D332 0001                     LB     R3,1(R2)        PICK UP LINE NUM.BER
0041D0I   C530 00A1                     CLHI   R3,X'A1'
0041D4I   4380 4000 447EI               BNL    NOMESG
0041DAI   C430 003F                     NHI    R3,X'3F'        LEAVE ONLY 5 BITS
0041DEI   4030 4000 5F2EI               STH    R3,LINENUMR
0041E4I   D332 0002                     LB     R3,2(R2)        PICK UP THIRD CHARACTER
0041E8I   F330 0000 0080                TI     R3,X'80'        NUMERIC BIT TURNED ON?
0041EEI   4230 4000 4292I               BNZ    P.DIAL          YES,DIAL DIGITS
0041F4I   244C                P.N1      LIS    R4,NENTRIES     NO. OF ENTRIES
0041F6I   E650 4000 59C4I               LA     R5,P.TABLE      PARDSE TABLE ADDRESS
0041FCI   D435 0000           P.NEXT    CLB    R3,0(R5)
004200I   4330 4000 4224I               BE     P.FOUND
004206I   2654                          AIS    R5,4
004208I   2741                          SIS    R4,1
00420AI   4230 FFEF                     BNZ    P.NEXT
          0000 420EI          SEND.NAK  EQU    *               SEND BACK REJECT /RETRY MESSAGE
00420EI   D36A 002C                     LB     R6,SYS.FG(R10)
004212I   C560 00FF                     CLHI   R6,X'FF'
004216I   4330 4000 4266I               BE     RE.READ
00421CI   41B0 0A42                     BAL    R11,SETWRT
004220I   2541                          LCS    R4,1
004222I   030D                          BR     R13
          0000 4224I          P.FOUND   EQU    *
004224I   5845 0000                     L      R4,0(R5)
004228I   F440 00FF FFFF                NI     R4,Y'FFFFFF'    LEAVE ONLY ADDRESS
00422EI   0304                          BR     R4              GO TO MESSAGE TYPE
                              *
004230I   D35A 005B           P.OFFHK   LB     R5,ACT.DGTS(R10) NUMBER OF DIGITS IN ACCOUNT
004234I   C560 0004                     CLHI   R6,4
004238I   4330 4000 4246I               BE     P.OFF1
00423EI   2764                          SIS    R6,4            MINUS MESSAGE FORMAT BYTES
004240I   0965                          CR     R6,R5           ARE THEY EQUAL
004242I   4230 FFC8                     BNE    SEND.NAK        NO,SEND NAK
          0000 4246I          P.OFF1    EQU    *
004246I   2442                          LIS    R4,BIT2
004248I   D335 4200 0002                LB     R3,2(R5,R2)     ILLEGAL ATTEMPT BYTE
00424EI   C530 004C                     CLHI   R3,C'L'         ILLEGAL ATTEMPT
004252I   2132                          BNES   P.OFFHK1        NO
004254I   1141                          SLLS   R4,1            BIT3
004256I   030D                P.OFFHK1  BR     R13
                              *
004258I   2441                P.OFFHK2  LIS    R4,BIT1
00425AI   D332 0001                     LB     R3,1(R2)
```

TDX SYSTEM MAIN CONTROL PROGRAM PAGE 91 16:00:43 01/27/77

```
00425ET  D430 4000 5FF0I      4978             CLB    R3,C.NAK          NAK RECEIVED?
004264T  023D                 4979             BNER   R13               NO
         0000 4266I           4980  RE.READ    EQU    *
004266T  5850 4000 58DCI      4981             L      R5,SVCBLK
                              4982  * * MONITOR LINK  * * 7/6/76
00426CT  5030 4000 65ACI      4983             STA    R3,MOGUTS
004272T  5040 DR96            4984             STA    R4,MOGUTS3
004276T  D345 0001            4985             LB     R4,SC15.LU(R5)
00427AT  4130 4000 209CI      4986             BAL    R3,MONTOR3
00428DT  5830 4000 65ACI      4987  CONMR002 LDA      R3,MOGUTS
004286T  5840 DR82            4988             LDA    R4,MOGUTS3
                              4989  * * END OF MONITOR LINK
00428AT  E1F5 0000            4990             SVC    15,0(R5)          RESEND IT
00428ET  4300 D8AC            4991             B      Q.COMM
                              4992  *
                              4993  *
004292T  2448                 4994  P.DIAL     LIS    R4,BIT4           SET UP FOR PHONE NUMBER
004294T  2450                 4995             LIS    R5,0
00429ET  4050 4000 5F56I      4996             STH    R5,IND            SET UP FOR NO INTERNATIONAL CALL
00429CT  C560 0012            4997             CLHI   R6,18             RESTART ?
0042A0T  4330 4000 42F8I      4998             BE     P.DIAL2           MAYBE,CHECK FLAG
0042A6T  C530 008B            4999             CLHI   R3,X'8B'          NUMERIC?
0042AAT  4380 FF46            5000             BNL    P.N1              NO
         0000 42AEI           5001  P.DIALIT EQU      *
0042AET  D332 0002            5002             LB     R3,2(R2)          PICK UP AREA CODE
0042B2T  1138                 5003             SLLS   R3,8
0042B4T  D352 0003            5004             LB     R5,3(R2)
0042B8T  0635                 5005             OR     R3,R5
0042BAT  D352 0004            5006             LB     R5,4(R2)
0042BET  1138                 5007             SLLS   R3,8
0042C0T  0635                 5008             OR     R3,R5
0042C2T  F930 008A 8181       5009             CI     R3,Y'8A8181'      INTERNATIONAL CALL?
0042C8T  4230 4000 42D8I      5010             BNE    P.DIAL3           NO,CHECK PHONE LENGTH
0042CET  2531                 5011             LCS    R3,1
0042D0T  4030 4000 5F56I      5012             STH    R3,IND            SET INTERNATIONAL FLAG
0042D6T  030D                 5013             BR     R13
         0000 42D8I           5014  P.DIAL3    EQU    *
0042D8T  C560 000D            5015             CLHI   R6,13             PHONE NUMBER IS EITHER
0042DCT  4330 4000 42F6I      5016             BE     P.DIAL1           13 OR 10 DIGITS LONG
0042E2T  C560 000B            5017             CLHI   R6,11
0042E6T  4230 FF24            5018             BNE    SEND.NAK          IF NEITHER,SEND RETRY
0042EAT  D332 0009            5019             LB     R3,9(R2)          LOOK FOR POUND AS TERMINATOR
0042EET  C530 008C            5020             CLHI   R3,POUND
0042F2T  4230 FF18            5021             BNE    SEND.NAK          NOT THERE,ERROR
0042F6T  030D                 5022  P.DIAL1    BR     R13
0042F8T  D36A 0020            5023  P.DIAL2    LB     R6,SYS.FG(R10)    READY FOR RESET MESSAGE?
0042FCT  0866                 5024             LR     R6,R6
0042FET  4330 FFAC            5025             BZ     P.DIALIT          NO,MUST BE INTERNATIONAL CALL
004302T  F840 0800 0000       5026             LI     R4,BIT28
004308T  030D                 5027             BR     R13
         0000 430AI           5028  P.BUSY     EQU    *
00430AT  C840 0080            5029             LHI    R4,BIT8
00430ET  030D                 5030             BR     R13
                              5031  *
                              5032  *
004310T  D332 0005            5033  P.ASTER    LB     R3,5(R2)          PICK UP 5TH CHARACTER
```

TDX SYSTEM MAIN CONTROL PROGRAM PAGE 92 16:00:55 01/27/77

```
004314T  C840 0010            5034             LHI    R4,BIT5           SET TYPE FOR ADN
004318T  C530 008C            5035             CLHI   R3,POUND          2 DIGIT ADN?
00431CT  4330 FFD6            5036             BE     P.DIAL1           YES
004320T  C530 008B            5037             CLHI   R3,X'8B'          ADN PLUS EXTENSION?
004324T  4330 4000 4406I      5038             BE     P.SYSCMD          YES
00432AT  2452                 5039             LIS    R5,2
00432CT  D332 0006            5040             LB     R3,6(R2)          LOOK FOR 3 DIGIT ADN
004330T  C530 008C            5041             CLHI   R3,POUND          IS IT?
004334T  4330 4000 436AI      5042             BE     P.ASCHK           YES,CHECK TO SEE IF VALID
00433AT  C530 008B            5043             CLHI   R3,X'8B'          3 DIGIT + EXTENSION?
00433ET  4330 4000 435CI      5044             BE     P.ASK2            CHECK FOR VALID
004344T  2453                 5045             LIS    R5,3              SET UP FOR 4 DIGIT ADN
004346T  D332 0007            5046             LB     R3,7(R2)
00434AT  C530 008C            5047             CLHI   R3,POUND          CHECK OK
00434ET  4330 4000 436AI      5048             BE     P.ASCHK           YES,DO IT
004354T  C530 008B            5049             CLHI   R3,X'8B'          ADN + X
004358T  4230 FFB2            5050             BNE    SEND.NAK          NO , BAD MESSAGE
         0000 435CI           5051  P.ASK2     EQU    *
00435CT  D45A 0076            5052             CLB    R5,ADNHGH(R10)    IS IT WITHIN RANGE?
004360T  4280 4000 4406I      5053             BC     P.SYSCMD          YES
004366T  4300 FEA4            5054             B      SEND.NAK
         0000 436AI           5055  P.ASCHK    EQU    *
00436AT  D45A 0076            5056             CLB    R5,ADNHGH(R10)
00436ET  4280 FF84            5057             BC     P.DIAL1
004372T  4300 FE98            5058             B      SEND.NAK
                              5059  *
004376T  C840 0020            5060  P.POUND    LHI    R4,BIT6           SET TO SPECIAL ACCOUNT NUMBER
00437AT  030D                 5061             BR     R13               EXIT
                              5062  *
                              5063  *
                              5064  *
         0000 437CI           5065  P.CAMPON EQU      *                 CAMP ON CALL - 3RD CHR = F
00437CT  F840 0000 4000       5066             LI     R4,BIT15          SET FOR CALLBACK
004382T  030D                 5067             BR     R13
004384T  F840 0001 0000       5068  P.CAMPB    LT     R4,BIT17
00438AT  D352 0003            5069             LB     R5,3(R2)
00438ET  C550 0049            5070             CLHI   R5,C'I'
004392T  033D                 5071             BFR    R13               OUTLINE BUSY
004394T  1041                 5072             SRLS   R4,1
```

```
TDX SYSTEM MAIN CONTROL PROGRAM                                PAGE  92   16:00:55  01/27/77

004396I  C550 005A                       CLHI    R5,C'Z'          BZ MESSAGE
00439AI  4330 FF6C                       BF      P.BUSY
00439EI  C550 004F                       CLHI    R5,C'O'          EXTENTION  BUSY?
0043A2I  0330                            BFR     R13              YES
0043A4I  4300 FF66                       B       SEND.NAK         NO,ERROR
                                 *
                                 *                              TERMINATION MESSAGES
0043A8I  F840 0004 0000          P.TERMN LI      R4,BIT19         NO ANSWER
0043AEI  4300 4000 43F8I                 B       P.TERM
0043B4I  F840 0008 0000          P.TERMD LI      R4,BIT20         TERMINATED WHILE DIALING
0043BAI  4300 4000 43F8I                 B       P.TERM
         0000 43C0I              P.TERMO EQU     *                CALLED PARTY BUSY
0043C0I  0342 0003                       LB      R4,3(R2)
0043C4I  C540 0050                       CLHI    R4,C'P'
0043C8I  4330 4000 4474I                 BF      P.FAILO
0043CEI  F840 0010 0000                  LI      R4,BIT21
0043D4I  4300 4000 43F8I                 B       P.TERM

TDX SYSTEM MAIN CONTROL PROGRAM                                PAGE  93   16:01:06  01/27/77

0043DAI  F840 0020 0000          P.TERMC LI      R4,BIT22
0043E0I  D352 0003                       LB      R5,3(R2)
0043E4I  C550 0043                       CLHI    R5,C'C'          CALL CONNECTED?
0043E8I  2338                            BFS     P.TERM           YES
0043EAI  C550 0051                       CLHI    R5,C'Q'
0043EEI  2336                            BFS     P.CQ
0043F0I  C550 0057                       CLHI    R5,C'W'          CW ?
0043F4I  2336                            BFS     P.CW
0043F6I  1141                            SLLS    R4,1             NO,CALL TERMINATED
0043F8I  0300                    P.TERM  BR      R13
0043FAI  C840 0040               P.CQ    LHI     R4,BIT7
0043FEI  030D                            BR      R13
                                 *
004400I  C840 0100               P.CW    LHI     R4,BIT9
004404I  030D                            BR      R13
         0000 4406I              P.SYSCMD EQU    *                SYSTEM COMMANDS
004406I  F840 0400 0000                  LI      R4,BIT27
00440CI  D352 0004                       LB      R5,4(R2)
004410I  C550 008C                       CLHI    R5,POUND         DELETE DIVERSION NUMBER?
004414I  4230 4000 4424I                 BNE     P.SYSC1          NO
00441AI  C560 0006                       CLHI    R6,6             LENGTH OK
00441EI  4230 FDEC                       BNE     SEND.NAK         NO
004422I  030D                            BR      R13
004424I  1041                    P.SYSC1 SRLS    R4,1
004426I  C550 008B                       CLHI    R5,X'8B'         ENTER DIVERSION NUMBER?
00442AI  4230 4000 443AI                 BNE     P.SYSC2          NO
004430I  C560 0010                       CLHI    R6,16            LENGTH OK?
004434I  0330                            BFR     R13
004436I  4300 FD04                       B       SEND.NAK
00443AI  1041                    P.SYSC2 SRLS    R4,1
00443CI  D352 0006                       LB      R5,6(R2)
004440I  C550 008C                       CLHI    R5,POUND         DELETE ADN?
004444I  4230 4000 4454I                 BNE     P.SYSC3          NO
00444AI  C560 0008                       CLHI    R6,8
00444EI  4230 FDBC                       BNE     SEND.NAK
004452I  030D                            BR      R13
004454I  1041                    P.SYSC3 SRLS    R4,1             ENTER ADN
004456I  C560 0011                       CLHI    R6,17
00445AI  0330                            BFR     R13
00445CI  4060 4000 5F04I                 STH     R6,REALADN
004462I  030D                            BR      R13
                                 *
                                 *
004464I  F840 0800 0000          P.FAILE LI      R4,BIT28         RESTART
00446AI  2309                            BS      P.FAIL
00446CI  F840 1000 0000          P.FAILI LI      R4,BIT29         INPUT LINE FAILURE
004472I  2305                            BS      P.FAIL
004474I  F840 2000 0000          P.FAILO LI      R4,BIT30         OUTPUT LINE FAILURE
00447AI  2301                            BS      P.FAIL
         0000 447CI              P.FAIL  EQU     *
00447CI  030D                            BR      R13
00447EI  E640 4000 647CI         NOMESG  LA      R4,M.NAK
004484I  035A 0075                       LB      R5,NAKCNT(R10)   UPDATE NUMBER OF NAKS SENT
004488I  2651                            AIS     R5,1
00448AI  025A 0075                       STB     R5,NAKCNT(R10)
00448EI  C550 0003                       CLHI    R5,3             MAX?

TDX SYSTEM MAIN CONTROL PROGRAM                                PAGE  94   16:01:18  01/27/77

004492I  2134                            BNFS    NOMSG1
004494I  E640 4000 645CI                 LA      R4,M.ACK
         0000 449AI              NOMSG1  EQU     *
00449AI  41F0 4000 4EDCI                 BAL     R15,SVC15
0044A0I  4840 4000 5F2CI                 LH      R4,PORTNUMR
0044A6I  41C0 C09A                       BAL     R12,DIVIDE
0044AAI  D240 4000 622FI                 STB     R4,BLN.2
0044B0I  D250 4000 622EI                 STB     R5,BLN.1
0044B6I  E640 4000 6226I                 LA      R4,M.BADLNE
0044BCI  41C0 4000 450AI                 BAL     R12,TTYMSG
0044C2I  4300 0678                       B       Q.COMM
                                 *
         0000 44C6I              DATAIN  EQU     *
0044C6I  D060 4000 5804I                 STM     R11,SAVEHIGH
0044CCI  48E0 4000 5F20I                 LH      R14,DI
0044D2I  58CB 0000                       L       R12,0(R11)
0044D6I  48D0 4000 5F16I                 LH      R13,COMMPRNT
0044DCI  2334                            BZS     DATA.0
```

```
TDX SYSTEM MAIN CONTROL PROGRAM                      PAGE  94   16:01:18  01/27/77
```

-continued

```
0044DET  41F0 4000 4E18I               BAL    R15,PRNTCOMM
         0000 44E4I          DATA.0    EQU    *
0044E4I  D3CB 0000                     LB     R12,0(R11)         PORT NUMBER
0044E8I  E6D0 4000 7C00                LA     R13,LOADPARM
0044EEI  49CD 002C                     CH     R12,NUMBR.PT(R13)  PORT NUMBER WITHIN RANGE?
0044F2I  4330 4000 44FEI               BE     DATA.1             MAYBE
0044F8I  4380 4000 45C4I               BNC    DATAN.7            NO
         0000 44FEI          DATA.1    EQU    *
0044FEI  11C2                          SLLS   R12,2              CONVERT FOR ADDRESS
004500I  58ED 0004                     L      R14,ADR.PORT(R13)  PORT TABLE ADDRESS
004504I  58DC 4E00 0000                L      R13,0(R12,R14)     CUSTOMER DATA BASE
00450AI  4330 4000 4594I               BZ     DATAN.3            NO CUSTOMER DATA BASE
004510I  08ED                          LR     R14,R13
004512I  58CD 000C                     L      R12,ADR.LNTB(R13)  I/O LINE TABLE
004516I  D3DE 0020                     LB     R13,SYS.FG(R14)    SEE IF USER IS ON LINE NOW
00451AI  08DD                          LR     R13,R13
00451CI  4330 4000 45CEI               BZ     DATAN.8            YES,ERROR
004522I  D3DB 0003                     LB     R13,3(R11)         OUTPUT LINE NUMBER
004526I  D4DE 0006                     CLB    R13,LINES(R14)     WITHIN RANGE?
00452AI  4330 4000 45BAI               BE     DATAN.5            NO
004530I  4380 4000 45BAI               BNL    DATAN.5            NO
004536I  D3DB 0001                     LB     R13,1(R11)         LINE NUMBER
00453AI  D4DE 0006                     CLB    R13,LINES(R14)     LINE NUMBER WITHIN RANGE
00453EI  4330 4000 45BAI               BE     DATAN.5            NO
004544I  4380 4000 45BAI               BNL    DATAN.5            NO
00454AI  4CD0 4000 5F44I               MH     R13,IOLN.LN        LENGTH OF LINE TABLE
004550I  0ADC                          AR     R13,R12
004552I  D3EB 0003                     LB     R14,3(R11)         OUTPUT LINE NUMBER
004556I  4CE0 4000 5F44I               MH     R14,IOLN.LN
00455CI  0AEC                          AR     R14,R12
00455EI  D3FB 0002                     LB     R15,2(R11)         INPUT LINE STATUS
004562I  D2FD 0000                     STB    R15,STAT.IN(R13)   SET INPUT LINE
004566I  D2FE 000C                     STB    R15,STAT.OUT(R14)  SET OUTPUT LINE
00456AI  08FF                          LR     R15,R15            EXAME CODE
00456CI  4330 4000 458AI               BZ     DATAN.1            IF FREE SET XREF
004572I  D3FB 0001                     LB     R15,1(R11)         INPUT LINE NUMBER
004576I  D2FE 000D                     STB    R15,LN.IN(R14)     XREF TO OUTPUT LINE
00457AI  D3FB 0003                     LB     R15,3(R11)         OUTPUT LINE
```

```
TDX SYSTEM MAIN CONTROL PROGRAM                      PAGE  95   16:01:29  01/27/77

00457EI  D2FD 0009           DATAN.2   STB    R15,LN.OUT(R13)    XREF TO INPUT LINE
         0000 4582I          DATAN.4   EQU    *
004582I  D1B0 4000 5804I               LM     R11,SAVEHIGH
004588I  030D                          BR     R13
         0000 458AI          DATAN.1   EQU    *
00458AI  25F1                          LCS    R15,1
00458CI  D2FE 000D                     STB    R15,LN.IN(R14)
004590I  4300 FFEA                     B      DATAN.2
         0000 4594I          DATAN.3   EQU    *
004594I  E640 4000 63ECI               LA     R4,DATERM1
         0000 459AI          DATAN.6   EQU    *
00459AI  41C0 4000 45DAI               BAL    R12,TTYMSG
0045A0I  5880 4000 5804I               L      R11,SAVEHIGH       RESTORE 11
0045A6I  58CB 0000                     L      R12,0(R11)         PICK UP BAD DATA
0045AAI  48E0 4000 5F20I               LH     R14,DI
0045B0I  41F0 4000 4E18I               BAL    R15,PRNTCOMM
0045B6I  4300 FFC8                     B      DATAN.4            EXIT
                                *
0045BAI  E640 4000 63FBI     DATAN.5   LA     R4,DATERM2
0045C0I  4300 FFD6                     B      DATAN.6
0045C4I  E640 4000 6404I     DATAN.7   LA     R4,DATERM3
0045CAI  4300 FFCC                     B      DATAN.6
0045CEI  E640 4000 6410I     DATAN.8   LA     R4,DATERM4
0045D4I  4300 FFC2                     B      DATAN.6
                                *
         0000 45DAI          TTYMSG    EQU    *
0045DAI  5030 4000 589CI               ST     R3,TTYTMP.2
0045DEI  50C0 4000 5898I               ST     R12,TTYTMP.1
0045E4I  4850 4000 5F2AI               LH     R5,PROCFLG
0045EAI  4210 4000 466CI               BM     TTYRTN             RETURN
0045F0I  E1E0 0006                     SVC    14,N.6             PICK UP BUFFER
0045F4I  5830 4000 589CI               L      R3,TTYTMP.2
0045FAI  58C0 4000 5898I               L      R12,TTYTMP.1
004600I  0855                          LR     R5,R5
004602I  4210 4000 466CI               BM     TTYRTN             NO MORE BUFFERS
004608I  D360 4000 5FF8I               LB     R6,TTYLU           LOGICAL UNIT
00460EI  D265 0001                     STB    R6,1(R5)
004612I  C880 0020                     LHI    R8,CONFUNC         COMMAND FOR OPERATORS CONSOLE
004616I  D460 4000 5FFCI               CLB    R6,TTYLU.R         IS THIS WHERE WE ARE GOING?
00461CI  2333                          BES    TTYF               YES
00461EI  C880 0022                     LHI    R8,CRTFUNC         NO,SET UP COMMAND FOR CRT
004622I  D2F5 0000           TTYF      STB    R8,0(R5)
004626I  5865 0004                     L      R6,4(R5)           STARTING BUFFER ADDRESS
                                *    STOPRE CURRENT TIMEW IN BUFFER
00462AI  E120 4000 56CCI               SVC    2,TIME
004630I  5880 4000 56D4I               L      R8,TIMEBFR
004636I  5086 0000                     ST     R8,0(R6)
00463AI  5880 4000 56D8I               L      R8,TIMEBFR+4
004640I  5086 0004                     ST     R8,4(R6)
004644I  C880 2020                     LHI    R8,C'  '
004648I  4086 0008                     STH    R8,8(R6)
00464CI  266A                          AIS    R6,10
00464EI  4874 0002                     LH     R7,2(R4)           MESSAGE BYTE COUNT
004652I  D384 0004           TTYM1     LB     R8,4(R4)
004656I  D286 0000                     STB    R8,0(R6)           STORE THE MESSAGE
00465AI  2641                          AIS    R4,1
```

```
TDX SYSTEM MAIN CONTROL PROGRAM                              PAGE  96    16:01:41   01/27/77

00465CI   2661                           AIS     R6,1
00465EI   2771                           SIS     R7,1
004660I   2037                           BNZS    TTYM1
004662I   2761                           SIS     R6,1
004664I   5065 0008                      ST      R6,8(R5)             ENDING ADDRESS
004668I   E1E0 0003                      SVC     14,N.3
00466CI   0360 4000 5FFCI      TTYRTN    LB      R6,TTYLU,R
004672I   0260 4000 5FFBI                STB     R6,TTYLU             RESET CORRECT LU
004678I   030C                           BR      R12
                               *
00467AI   2461                 TTYM2     LIS     R6,1
00467CI   6160 4000 5E5CI                AHM     R6,LOSTCNT           LOST MESSAGES
004682I   030C                           BR      R12
004684I   50C0 4000 588CI      MAGTAPE   ST      R13,MAGT2
00468AI   D320 4000 6001I                LB      R2,N.MAGLU           NEW MAGTAPE LOGICAL UNIT
004690I   41C0 C976                      BAL     R12,HEADER           WRITE OUT HEADER
004694I   0533                           LR      R3,R3
004696I   4230 4000 46D0I                BNZ     MAG.ER1              ERROR WRITING HEADER
00469CI   0777                           XR      R7,R7
00469EI   4070 4000 5E5EI                STH     R7,GOODMAG
0046A4I   4870 4000 5F28I                LH      R7,BUFNO
0046AAI   2134                           BNZS    MAGTP.1              NO NEED FOR A NEW BUFFER
0046ACI   41F0 4000 4726I                BAL     R15,WRTMG1           PICK IT UP
0046B2I   2475                 MAGTP.1   LIS     R7,5                 SET TO MAX RECODS
0046B4I   2461                           LIS     R6,1
0046B6I   40F0 4000 5F70I                STH     R6,MAGREWND          SET UP REWIND FLAG
0046BCI   E660 4000 5EBEI                LA      R6,EOFBF             END OF FILE BUFFER
0046C2I   41C0 4000 46E0I                BAL     R12,WRTMG.0
0046C8I   58D0 4000 588CI                L       R13,MAGT2
0046CEI   030D                           BR      R13
          0000 46D0I           MAG.ER1   EQU     *
0046D0I   E640 4000 6284I                LA      R4,M.TPHDER          WRITE OUT HEADER  ERROR MESSAGE
0046D6I   41C0 FFFF                      BAL     R12,TTYMSG
0046DAI   58D0 4000 588CI                L       R13,MAGT2
0046E0I   030D                           BR      R13
                               *
                               *                WRITE OUT MESSAGE TO MAG-TAPE
                               *
                               *                R6 = ADDRESS OF MESSAGE
                               *                R12 = CALLING REGISTER
                               *
          0000 46E2I           WRTMAG    EQU     *
0046E2I   4870 4000 5F28I                LH      R7,BUFNO             POSITION IN BUFFER
0046E8I   2134                           BNZS    WRTMG.0
0046EAI   41F0 4000 4726I                BAL     R15,WRTMG1           PICK UP A NEW MAG TAPE BUFFER
0046F0I   5880 4000 58C0I      WRTMG.0   L       R8,MAGCUR            CURRENT MAG TAPE POSITION
0046F6I   4890 4000 5F66I                LH      R9,BUFLN2            LENGTH OF WRITE IN HALF-WORDS
0046FCI   4856 0000            WRTMG.1   LH      R5,0(R6)
004700I   4058 0000                      STH     R5,0(R8)
004704I   2662                           AIS     R6,2
004706I   2682                           AIS     R8,2
004708I   2791                           SIS     R9,1
00470AI   2037                           BNZS    WRTMG.1
00470CI   5080 4000 58C0I                ST      R8,MAGCUR            SAVE CURRENT POSITION
004712I   2671                           AIS     R7,1
004714I   4070 4000 5F28I                STH     R7,BUFNO             UPDATE MAG BLOCK COUNT

TDX SYSTEM MAIN CONTROL PROGRAM                              PAGE  97    16:01:53   01/27/77

00471AI   C570 0006                      CLHI    R7,MAX               MAX REACHED?
00471EI   4330 4000 474CI                BE      WRTMG.2              YES,ISSUE IO
004724I   030C                           BR      R12
                               *
          0000 4726I           WRTMG1    EQU     *
004726I   6650 4000 50B0I                RTL     R5,SVC.MAG           PICK UP BUFFER
00472CI   214F                           BMS     WRTMG2               NO BUFFERS AVAILABLE
00472EI   5050 4000 58C0I                ST      R5,MAGCUR
004734I   CA50 01B8                      AHI     R5,L.MAGBUF
004738I   5050 4000 58C4I                ST      R5,MAGSVC
00473EI   2471                           LIS     R7,1
004740I   4070 4000 5F28I                STH     R7,BUFNO             NUMBER OF BUFFER WE ARE WORKING ON
004746I   030F                           BR      R15                  EXIT
                               *
          0000 4748I           WRTMG2    EQU     *
004748I   4300 FFDA                      B       WRTMG1               LETS WAIT   ***********
                               *
00474CI   0777                 WRTMG.2   XR      R7,R7
00474EI   4070 4000 5F28I                STH     R7,BUFNO             SET UP TO GET A NEW BUFFER
004754I   5870 4000 58C4I                L       R7,MAGSVC            ADDRESS OF SVC BLOCK
00475AI   D350 4000 6000I                LB      R5,C.MAGLU
004760I   D257 0001                      STB     R5,1(R7)
004764I   5857 0004                      L       R5,4(R7)             STARTING ADDRESS
004768I   CA50 0167                      AHI     R5,LNG.TAPE
00476CI   5057 0008                      ST      R5,8(R7)
004770I   D000 4000 5738I                STM     R0,BACKREGS
004776I   E1E0 0005                      SVC     14,N.5
00477AI   D100 4000 5738I                LM      R0,BACKREGS
004780I   030C                           BR      R12                  EXIT
                               *
                               *               AREA CODE LOOK-UP ROUTINE
                               *               ASCII AREA CODE IS IN LOCATION AREACD,AREACD+1
                               *                 ADDRESS OF AREA CODE TABLE IS IN REG R2
                               *
                               *
                               *                 RETURNS WATTS AREA CODE IN R4,
                               *                         OUTPUT LINE IN R3,IF NEG NO LINE AVAILABLE
                               *                         ADDRESS OF OUTPUT LINE TABLE IN R2
                               *                  BAL R13,ARCDSR
                               *
```

```
          0000 4782I  ARCESH   EQU   *
004782I   4830 4000 5F34I      LH    R3,ARFACD
004788I   C430 000F            NHI   R3,X'F'
00478CI   C530 000A            CLHI  R3,X'A'
004790I   2135                 BNES  AR.1
004792I   2430                 LIS   R3,0
004794I   4300 4000 4810I      B     AR.1A
          0000 479AI  AR.1     EQU   *
00479AI   244A                 LIS   R4,10
00479CI   2732                 SIS   R3,2          RESULT GOES TO R3
00479EI   4210 0C40            BM    ARCD3
? 0047A2I 0C34                 MHR   R3,R4
0047A4I   4850 4000 5F3AI      LH    R5,ARFACD1
0047AAI   C450 0F0F            NHI   R5,X'F0F'     REMOVE ASCII
0047AEI   9256                 STBR  R5,R6         STORE LOW ORDER DIGIT IN R6
0047B0I   1058                 SRLS  R5,8
```

```
0047B2I   C550 000A            CLHI  R5,X'A'
0047B6I   2132                 BNES  AR.2
0047B8I   2450                 LIS   R5,0
          0000 47BAI  AR.2     EQU   *
0047BAI   C550 0000            CLHI  R5,0          2ND DIGIT NEEDS TO BE 0 OR 1
0047BEI   2335                 BES   AR.2A
0047C0I   C550 0001            CLHI  R5,1
0047C4I   4230 0C1A            BNE   ARCD3
          0000 47C8I  AR.2A    EQU   *
? 0047C8I 0C54                 MHR   R5,R4
0047CAI   C560 000A            CLHI  R6,X'A'
0047CEI   2132                 BNES  AR.3
0047D0I   2460                 LIS   R6,0
          0000 47D2I  AR.3     EQU   *
0047D2I   0A56                 AR    R5,R6
0047D4I   0766                 XR    R6,R6         CLEAR ODD/EVEN BIT
0047D6I   1051                 SRLS  R5,1
0047D8I   2382                 BNCS  ARCD1
0047DAI   2461                 LIS   R6,1
0047DCI   0A35        ARCD1    AR    R3,R5
0047DEI   D342 4300 0000       LB    R4,0(R2,R3)   PICK UP BYTE FROM TABLE
0047E4I   0866                 LR    R6,R6         CHECK ODD/EVEN BIT
0047E6I   2138                 BNZS  ARCD2
0047E8I   1044                 SRLS  R4,4          SHIFT OVER LEFT BITS
0047EAI   C530 003C            CLHI  R3,60
0047EEI   2134                 BNES  ARCD2         NO 800 AREA CODE
0047F0I   4040 4000 5F42I      STH   R4,LDFG       SET FLAG FOR OK LOCAL CALL
0047F6I   C440 000F   ARCD2    NHI   R4,X'F'       LEAVE ONLY 4 BITS FOR WATTS ZONE
                      *
                      *              CHECK FOR AN AVAILABLE LINE
                      *
0047FAI   4040 4000 5F3CI      STH   R4,ARCDNEED
004800I   C540 0009            CLHI  R4,LD
004804I   2135                 BNES  AR.3A         DON'T NEED A LOCAL LINE
004806I   2431                 LIS   R3,1          A LOCAL LINE IS NEEDED,SO SET IT UP
004808I   4030 4000 5F42I      STH   R3,LDFG
          0000 480EI  AR.3A    EQU   *
00480EI   030D                 BR    R13
004810I   4850 4000 5F3AI AR.1A LH   R5,ARFACD1
004816I   C550 8A8A            CLHI  R5,X'8A8A'    ZERO AREA CODE?
00481AI   4230 FF7C            BNE   AR.1          NO
00481EI   2449                 LIS   R4,LD         YES SET TO LOCAL CALL
004820I   4040 4000 5F42I      STH   R4,LDFG       SET OK FLAG
004826I   4300 FFCC            B     ARCD2
                      *
                      *              SET UP READ OF ADN FILE
                      *              R1 =LINE TABLE,R2 =INPUT BUFFER
                      *
          0000 482AI  READ.ADN EQU   *
00482AI   41C0 4000 53C8I      BAL   R12,DISCBUFR  PICK UP A DISC BUFFER
004830I   0855                 LR    R5,R5
004832I   4210 4000 4984I      BM    READ.A1       NO BUFFER AVAILABLE
004838I   CA50 0100            AHI   R5,BUFL
00483CI   2460                 LIS   R6,0          SET RESULT TO 0
00483EI   24C3                 LIS   R12,3
004840I   D34C 4200 0000 READ.A3A LB R4,0(R12,R2)  PICK UP NEXT DIGIT
```

```
004846I   C540 008B            CLHI  R4,X'8B'      TERMINATOR?
00484AI   4330 4000 4874I      BE    READ.A2       YES
004850I   C540 008C            CLHI  R4,X'8C'      POUND
004854I   4330 4000 4874I      BE    READ.A2       YES
00485AI   C440 000F            NHI   R4,X'F'       MAKE BINARY
00485EI   C540 000A            CLHI  R4,X'A'
004862I   2132                 BNES  READ.A3       NO A 0
004864I   2440                 LIS   R4,0          SET A TO 0
004866I   4C60 4000 5F78I READ.A3 MH R6,TEN
00486CI   0A64                 AR    R6,R4
00486EI   25C1                 AIS   R12,1
004870I   4300 FFCC            B     READ.A3A
          0000 4874I  READ.A2  EQU   *
004874I   4D60 4000 5F6CI      DH    R6,D.10       10 ENTRIES/SECTOR
00487AI   5830 4000 5FE8I      L     R3,CUSTABLE   CUSTOMER TABLE ADDRESS
004880I   4A73 001F            AH    R7,ADR.ADN(R3) STARTING ADN FILE ADDRESS
004884I   4075 000F            STH   R7,14(R5)     DISC ADDRESS
004888I   D340 4000 5FF9I      LB    R4,ADNLU      ADN FILE LOGICAL UNIT
00488EI   D245 0001            STB   R4,1(R5)
```

-continued

```
00489?I  0340 4000 5FFAI     5445            LR    R4,READFN            READ FUNCTION
00489?I  0245 0000           5446            STB   R4,0(R5)
00489CI  4C60 4000 5F6FI     5447            MH    R6,D.25              DISPLAXCEMENT INTO SECTOR
00489A2I 0340 4000 5FFFI     5448            LB    R4,ADNFUNC           ADN FUNCTION
0049A8?I 0241 0002           5449            STB   R4,SYS.STAT(R1)      SET LINE STATE
0048ACI  4065 0018           5450            STH   R6,24(R5)            STORE DISPLACEMENT
0048B0I  4840 4000 5F2CI     5451  READ.AR1  LH    R4,PORTNUMR          KEEP COPY OF PORT NUMBER
0048B6I  4045 0014           5452            STH   R4,20(R5)
0048BAI  4040 4000 5E66I     5453            STH   R4,ADN.PORT
0048C0I  4840 4000 5F2EI     5454            LH    R4,LINENUMR          KEEP COPY OF LINE NUMBER
0048C6I  4045 0016           5455            STH   R4,22(R5)
0048CAI  0240 4000 5E65I     5456            STB   R4,ADN.IN
0048D0I  5845 0004           5457            L     R4,4(R5)             STARTING BUFFER ADDRESS
0048D4I  4A40 4000 5F7FI     5458            AH    R4,D.256
0048DAI  5045 0008           5459            ST    R4,8(R5)             ENDING BUFFER ADDRESS
0048DEI  0340 4000 5FFFI     5460            LB    R4,ADNFUNC           FUNCTION CODE
0048E4I  C540 0003           5461            CLHI  R4,ADNREF
0048E8I  4330 4000 497FI     5462            BE    READ.AR2             ADN REFERENCE,IGNORE
0048EEI  C540 0011           5463            CLHI  R4,ADNTIE
0048F2I  4330 4000 497EI     5464            BE    READ.AR2
         0000 48F8I          5465  READ.J0   EQU   *
0048F8I  C860 0032           5466            LHI   R6,C'2'              SET FOR DELETE
0048FCI  C540 000F           5467            CLHI  R4,ADNDEL            DELFTE ADN
004900I  4330 4000 4922I     5468            BE    READ.AR4             YES
004906I  E660 4000 5E7FI     5469            LA    R6,ADN.PHN
00490CI  2479                5470            LIS   R7,9
00490EI  0342 4700 0006      5471  READ.AR3  LB    R4,6(R2,R7)          LEAVE NUMBER IN BINARY FORMAT
004914I  0246 4700 0000      5472            STB   R4,0(R6,R7)
00491AI  2771                5473            SIS   R7,1
00491CI  2217                5474            BNMS  READ.AR3
00491EI  C860 0031           5475            LHI   R6,C'1'
004922I  0260 4000 5E7CI     5476  READ.AR4  STB   R6,ADN.IND
004928I  5863 0000           5477            L     R6,DEV.MN(R3)
00492CI  5060 4000 5E68I     5478            ST    R6,ADN.DMN
004932I  0361 0003           5479            LB    R6,SYS.FLAG(R1)
004936I  C560 0002           5480            CLHI  R6,2
00493AI  4330 4000 499AI     5481            BE    R.AR4C
```

```
004940I  2477                5482            LIS   R7,L.ACT-1
004942I  0361 4700 0004      5483  R.AR4A    LB    R6,LN.TEMP(R1,R7)
004948I  C760 00F0           5484            XHI   R6,XMASK
00494CI  C560 003A           5485            CLHI  R6,XZERO
004950I  2133                5486            BNES  A.7
004952I  C860 0030           5487            LHI   R6,X'30'
004956I  0267 4000 5E6CI     5488  A.7       STB   R6,ADN.ACT(R7)
00495CI  2771                5489            SIS   R7,1
00495EI  221E                5490            BNMS  R.AR4A
004960I  2477                5491            LIS   R7,L.SACT-1
004962I  C860 0020           5492            LHI   R6,X'20'
004966I  0267 4000 5E74I     5493  R.AR4B    STB   R6,ADN.SACT(R7)
00496CI  2771                5494            SIS   R7,1
00496EI  2214                5495            BNMS  R.AR4B
         0000 4970I          5496  R.AR4E    EQU   *
004970I  0845                5497            LR    R4,R5
004972I  E660 4000 5E64I     5498            LA    R6,ADN
004978I  41C0 F066           5499            BAL   R12,WRTMAG
00497CI  0854                5500            LR    R5,R4
         0000 497EI          5501  READ.AR2  EQU   *
00497EI  E1F0 0002           5502            SVC   14,N.2
004982I  030D                5503            BR    R13
                             5504  *
         0000 4984I          5505  READ.A1   EQU   *
004984I  2411                5506            LIS   R1,1
004986I  6110 4000 5E48I     5507            AHM   R1,WORKCNT
00498CI  5810 4000 5FDCI     5508            L     R1,SVCBLK            WAIT TILL LATER AND TRY AGAIN
004992I  6510 4000 5DC4I     5509            ARL   R1,COMMLIST
004998I  030D                5510            BR    R13
00499AI  247F                5511  R.AR4C    LIS   R7,L.TACT-1
00499CI  5841 0004           5512            L     R4,LN.TEMP(R1)
0049A0I  0364 4700 0000      5513  R.AR4D    LB    R6,0(R4,R7)
0049A6I  C760 00F0           5514            XHI   R6,XMASK
0049AAI  C560 003A           5515            CLHI  R6,XZERO
0049AEI  2133                5516            BNES  A.10
0049B0I  C860 0030           5517            LHI   R6,X'30'
0049B4I  0267 4000 5E6CI     5518  A.10      STB   R6,ADN.ACT(R7)
0049BAI  2771                5519            SIS   R7,1
0049BCI  221F                5520            BNMS  R.AR4D
0049BEI  4300 FFAF           5521            B     R.AR4E
                             5522  *
                             5523  *
                             5524  *               PROCESS CALL BACK QUEUE
                             5525  *
                             5526  *               R0 = CUSTOMER DATA BASE ADDRESS
                             5527  *               R1 = LINE TABLE ADDRESS
                             5528  *
         0000 49C2I          5529  PROC.CLB  EQU   *
0049C2I  0381 0017           5530            LB    R8,LN.SUBC(R1)       SUBCLASS OF LINE
0049C6I  0361 0002           5531            LB    R6,SYS.STAT(R1)      CURRENT SYSTEM MODE
0049CAI  C560 000D           5532            CLHI  R6,RCMODE            IS THIS FROM RACE MODE?
0049CEI  2336                5533            BES   PROC.00              YES,SET FLAG
0049D0I  0361 0001           5534            LB    R6,CLASS.IN(R1)      CLASS OF INPUT LINE
0049D4I  C560 000F           5535            CLHI  R6,WATTS             INWATTS OR ODD LINE?
0049D8I  2182                5536            BLS   PROC.01              NO
         0000 49DAI          5537  PROC.00   EQU   *
```

```
00490AI 2561                         LCS   R6,1              YES,SET FOR NO INPUT LINE GIVEN
        0000 49DCI         PROC.01   EQU   *
00490CI 0341 0008                    LR    R4,LN.WAT(R1)     TYPE OF OUTPUT LINE
0049E0I 4060 4000 5F46I              STH   R6,LINE
0049E6I 4870 4000 5F2EI              LH    R7,LINENUMR
0049ECI 4070 4000 5F1CI              STH   R7,SAVEIN
0049F2I 0371 0009                    LR    R7,LN.OUT(R1)
0049F6I 4070 4000 5F30I              STH   R7,OUTLINE
0049FCI 4C70 4000 5F44I              MH    R7,TABLNGTH
004A02I 5A7A 000C                    A     R7,ADR.LNTB(R10)  STARTING ADDRESS
004A06I 0337 000C                    LR    R3,STAT.OUT(R7)   STATUS OF OUTPUT LINE
004A0AI C530 0006                    CLHI  R3,6              TO GO OUT OF SERVICE?
004A0EI 4330 4000 4096I              BE    PROC.C4A
004A14I 5010 4000 58E4I              ST    R1,LINE1          SAVE CODES
                           *
                           *     CHECK FOR CAMP ON USERS
                           *
004A1AI 2490                         LIS   R9,0
004A1CI 2431                         LIS   R3,1
004A1EI 4030 4000 5F0AI              STH   R3,BEEPFLG
004A24I 583A 000C                    L     R3,ADR.LNTB(R10)  ADDRESS OF IO LINE TABLE
004A28I 030A 0006                    LR    R0,LINES(R10)
004A2CI 0353 0002          CK.CMPO   LR    R5,SYS.STAT(R3)   STATE OF LINE
004A30I C550 0009                    CLHI  R5,CMPMODE        CAMP ON USER?
004A34I 4230 4000 4B6AI              BNE   CK.CMP1           NO,LOOK AT NEXT
004A3AI 0373 0008                    LR    R7,LN.WAT(R3)
004A3EI C540 0001                    CLHI  R4,FX
004A42I 4330 4000 4A5EI              BE    CK.CMPF           YES
004A48I 4280 4000 4A6AI              BC    CK.CMPD           INTRASTATE
004A4EI C540 0009                    CLHI  R4,LD
004A52I 4330 4000 4A6AI              BE    CK.CMPD
004A58I 4280 4000 4B5EI              BC    CK.CMPW
                           *
                           *     OUTPUT LINE IS A TIE LINE
                           *
004A5EI 0483 0017          CK.CMPF   CLB   R8,LN.SUBC(R3)    SUBCLASS THE SAME
004A62I 4230 4000 4B6AI              BNE   CK.CMP1           NO,LOOK AT NEXT LINE
004A68I 0947               CK.CMPD   CR    R4,R7             LINE CLASS THE SAME
004A6AI 4230 4000 4B6AI              BNE   CK.CMP1           NO
004A70I E670 4000 5944I              LA    R7,FAKETIE
004A76I 0301 0015                    LB    R0,CAMP.CNT(R1)   CALLBACK CODE
004A7AI 0207 0000                    STB   R0,0(R7)
004A7EI 5070 4000 5910I              ST    R7,SAVER7
                           *
                           *     A LINE WAS FOUND THAT WE COULD USE
004A84I 4871 0008          CK.CMPOK  LH    R7,LN.WAT(R1)     REASSIGN OUTPUT LINE
004A88I 4073 0008                    STH   R7,LN.WAT(R3)
004A8CI 2501                         LCS   R0,1
004A8EI 0240 4000 5FF4I              STB   R4,BSERV
004A94I 0270 4000 5FF3I              STB   R7,ASERV
004A9AI 4090 4000 5F2EI              STH   R9,LINENUMR
004AA0I 0323 0009                    LB    R2,LN.OUT(R3)
004AA4I 4020 4000 5F30I              STH   R2,OUTLINE        SAVE OUTPUT LINE NUMBER
004AAAI 4C20 4000 5F44I              MH    R2,TABLNGTH       LENGTH OF TABLE
004AB0I 5A2A 000C                    A     R2,ADR.LNTB(R10)
004AB4I 0292 000D                    STB   R9,LN.IN(R2)
```

```
004AB8I 0201 0009                    STB   R0,LN.OUT(R1)
004ABCI 5030 4000 58CCI              ST    R3,LINEADR
004AC2I 4100 4000 409AI              BAL   R13,CLEAN.UP      RESET ORIGINAL LINE
004AC8I 5870 4000 58CCI              L     R7,LINEADR
004ACEI 2426                         LIS   R2,6
004AD0I 0227 0002                    STB   R2,SYS.STAT(R7)   SET UP PROPER STATE
004AD4I 5827 0004                    L     R2,LN.TEMP(R7)
004AD8I CA20 0010                    AHI   R2,CMP.PHN
004ADCI 5020 4000 58F0I              ST    R2,PHONE
004AE2I 4840 4000 5F30I              LH    R4,OUTLINE        OUTPUT LINE NUMBER
004AE8I 50F0 4000 58B8I              ST    R15,DUEL1
004AEEI 0817                         LR    R1,R7
004AF0I 41F0 4000 4B12I              BAL   R15,TALK1         SEND INFO TO OTHER MACHINE
004AF6I 58F0 4000 58B8I              L     R15,DUEL1
004AFCI 4100 4000 4F58I              BAL   R13,IDOPHONE      SEND MESSAGE BACK
004B02I 5820 4000 58F0I              L     R2,PHONE
004B08I 4100 4000 545CI              BAL   R13,WRTWAREA
004B0EI 2430                         LIS   R3,0
004B10I 030F                         BR    R15
                           *
        0000 4B12I         TALK1     EQU   *
004B12I D0B0 4000 5804I              STM   R11,SAVEHIGH      SAVE REGISTERS
004B18I 48B0 4000 5F2CI              LH    R11,PORTNUMR      PORT NUMBER
004B1EI 11B8                         SLLS  R11,8
004B20I 4AB0 4000 5F2EI              AH    R11,LINENUMR      INPUT LINE NUMBER
004B26I 34BB                         EXHR  R11,R11           SHIFT OVER
004B28I D3C1 0000                    LB    R12,STAT.IN(R1)   INPUT LINE STATUS
004B2CI 11C8                         SLLS  R12,8
004B2EI 4AC0 4000 5F30I              AH    R12,OUTLINE       OUTPUT LINE NUMBER
004B34I 06BC                         OR    R11,R12
004B36I 41D0 4000 000F               BAL   R13,DATAOUT
004B3CI 48D0 4000 5F16I              LH    R13,COMMPRNT
004B42I 4330 4000 4B56I              BZ    TALK1.1
004B48I 08CB                         LR    R12,R11
004B4AI 48E0 4000 5F1EI              LH    R14,DO
004B50I 41F0 4000 4E18I              BAL   R15,PRNTCOMM
        0000 4B56I         TALK1.1   EQU   *
004B56I D1B0 4000 5804I              LM    R11,SAVEHIGH
004B5CI 030F                         BR    R15
```

-continued

```
                              *
         0000 485EI           CK.CMPW  EQU   *
00485ET  0947                          CR    R4,R7
004860T  4330 FF20                     BF    CK.CMPOK
004864T  4280 FF1C                     BL    CK.CMPOK            OK TO USE LINE
                              *
004868T  4A30 4000 5F44I      CK.CMP1  AH    R3,IOLIN.LN         POINT TO NEXT LINE
00486ET  2691                          AIS   R9,1
004870T  049A 0006                     CLB   R9,LINES(R10)
004874T  4280 FFB4                     BL    CK.CMP0
         0000 4878I           PR.CK1   EQU   *
004878T  585A 0014                     L     R5,ADR.CMP1(R10)    ADDRESS OF PRIORITY QUEUE
00487CT  24C1                          LIS   R12,1
00487ET  40C0 4000 5F42I               STH   R12,LDFG
004884T  E1F0 0001                     SVC   14,N,1              LOOK IN QUEUE FOR ENTRY
004888T  0833                          LR    R3,R3
00488AT  4210 4000 4D0FI               BM    PROC.C1             NO-ONE THERE
```

```
                              *                          R3 HAS DISC ADDRESS
                              *
                              *              R3 HAS QUEUE ENTRY,ISSUE DISC READ
                              *
         0000 4890I           PROC.02  EQU   *
004890T  4840 4000 5F46T               LH    R4,LINE
004896T  4310 4000 4C3AT               BNM   PROC.C2             IF INPUT LINE WAS GIVEN,SKIP
00489CT  5840 4000 5AE4I               L     R4,LINE1            OLD LINE TABLE ADDRESS
0048A2T  2460                          LIS   R6,0
0048A4T  D3C4 0002                     LB    R12,SYS.STAT(R4)    CURRENT MODE FROM OLD LINE
0048A8T  0264 0000                     STB   R6,STAT.IN(R4)
0048ACT  4884 0002                     LH    R8,SYS.STAT(R4)
0048B0T  5890 4000 5ACCI               L     R9,LINEADR          NEW LINE TABLE ADDRESS
0048B6T  4089 0002                     STH   R8,SYS.STAT(R9)
0048BAT  5884 0004                     L     R8,LN.TEMP(R4)
0048BET  5089 0004                     ST    R8,LN.TEMP(R9)
0048C2T  4064 0002                     STH   R6,SYS.STAT(R4)
0048C6T  4884 0008                     LH    R8,LN.WAT(R4)
0048CAT  4089 0008                     STH   R8,LN.WAT(R9)
0048CEI  D389 0009                     LB    R8,LN.OUT(R9)       OUTPUT LINE NUMBER
0048D2T  4080 4000 5F30I               STH   R8,OUTLINE
0048D8T  4C80 4000 5F44T               MH    R8,IOLIN.LN
0048DET  5A8A 000C                     A     R8,ADR.LNTB(R10)
0048E2T  4860 4000 5F2ET               LH    R6,LINENUMB         INPUT LINE NUMBER
0048E8T  D268 0003                     STB   R6,LN.IN(R8)        SET UP XREF
0048ECT  C880 00FF                     LHI   R8,X'FF'
0048F0T  D284 0009                     STB   R8,LN.OUT(R4)       SET LOUTE FREE FOR THIS OUTPUT LOUTE
0048F4T  0814                          LR    R1,R4
0048F6T  4880 4000 5F1CI               LH    R8,SAVEIN
0048FCT  4860 4000 5F2ET               LH    R6,LINENUMB
004C02T  4080 4000 5F2ET               STH   R8,LINENUMB
004C08T  4060 4000 5F1CI               STH   R6,SAVEIN
004C0ET  50F0 4000 5A88I               ST    R15,DUFL1
004C14T  41F0 FFFA                     BAL   R15,TALK1
004C18T  4880 4000 5F1CT               LH    R8,SAVEIN
004C1ET  4080 4000 5F2ET               STH   R8,LINENUMB
004C24T  58F0 4000 5A88T               L     R15,DUFL1
004C2AT  C5C0 0000                     CLHI  R12,RCMODE          RACE MODE?
004C2ET  4230 4000 4C3AI               BNE   PROC.C2             NO
004C34T  2481                          LIS   R8,1
004C36T  0284 0000                     STB   R8,STAT.IN(R4)      SET LINE BUSY
004C3AT  5050 4000 5AECI      PROC.C2  ST    R5,QUEUE
004C40T  5030 4000 5AF0I               ST    R3,QUEUE1
004C46T  5000 4000 5AE0T               ST    R0,QUEUE2           SAVE LINE INFORMATION
004C4CT  5810 4000 5ACCI               L     R1,LINEADR
004C52T  50F0 4000 5A88I               ST    R15,DUFL1
004C58T  41F0 FFB6                     BAL   R15,TALK1
004C5CT  58F0 4000 5A88T               L     R15,DUEL1
004C62T  41C0 4000 53CFT               BAL   R12,DISCBUFR        PICK UP A DISC BUFFER
004C68T  0855                          LR    R5,R5               ANY DISC BUFFER?
004C6AT  4210 4000 4D62T               BM    PROC.C4             NO-PUT ENTRY BACK ON QUEUE
004C70T  CA50 0100                     AHI   R5,BUFL             POINT TO BEGINNING OF SVC BLOCK
004C74T  D360 4000 5FFAT               LB    R6,READFN
004C7AT  0265 0000                     STB   R6,0(R5)            SET UP TO READ
004C7ET  D360 4000 5FFEI               LB    R6,CMPLU            CALL BACK FILE LOGICAL UNIT
004C84T  0265 0001                     STB   R6,1(R5)
```

```
004C88T  3433                          EXHR  R3,R3               PUT DISC FILE IN LOWER BITS
004C8AT  F430 0000 FFFF                NI    R3,X'FFFF'
004C90T  5035 000C                     ST    R3,12(R5)           STORE RANDOM ADDRESS
004C94T  5865 0004                     L     R6,4(R5)            STARTING BUFFER ADDRESS
004C98T  CA60 0046                     AHI   R6,LNGTHCMP         LENGTH OF CALL BACK FILE
004C9CT  5065 0008                     ST    R6,8(R5)            ENDING BUFFER ADDRESS
004CA0T  4860 4000 5F2CT               LH    R6,PORTNUMB         PORT NUMBER
004CA6T  4065 0014                     STH   R6,20(R5)
004CAAT  4860 4000 5F2EI               LH    R6,LINENUMB
004CB0I  4065 0016                     STH   R6,22(R5)
004CB4T  2468                          LIS   R6,PDCBACK          READ CALL BACK CODE
004CB6T  D261 0002                     STB   R6,SYS.STAT(R1)     SET STATE
004CBAT  2430                          LIS   R3,0
004CBCT  E1E0 0002                     SVC   14,N,2              DO DISC READ
004CC0T  D361 0003                     LB    R6,SYS.FLAG(R1)
```

```
004CC4I  C560 0002        5721            CLHI   R6,2               DO WE HAVE A BUFFER?
004CC8I  4330 4000 4CDEI  5722            BF     PROC.C2A           YES
004CCFI  41C0 4000 52AFI  5723            BAL    R12,GETBUFR        PICK UP A WORKING BUFFER
004CD4I  2462             5724            LIS    R6,2
004CD6I  D261 0003        5725            STB    R6,SYS.FLAG(R1)
004CDAI  5041 0004        5726            ST     R4,LN.TEMP(R1)
004CDEI  5861 0004        5727  PROC.C2A  L      R6,LN.TEMP(R1)
004CE2I  5840 4000 58BCI  5728            L      R4,QUEUE1
004CE8I  5046 0000        5729            ST     R4,0(R6)
004CECI  5076 0004        5730            ST     R7,4(R6)           EXTENSION NUMBER
004CF0I  5845 000C        5731            L      R4,12(R5)          CALL BACK DISC ADDRESS
004CF4I  5046 0008        5732            ST     R4,8(R6)
004CF8I  5840 4000 58ECI  5733            L      R4,QUEUE           ADDRESS OF QUEUE
004CFEI  5046 000C        5734            ST     R4,12(R6)
004D02I  5800 4000 58E0I  5735            L      R0,QUEUE2          LINE INFORMATION
004D08I  5006 0010        5736            ST     R0,16(R6)          LINE INFO
004D0CI  030F             5737            BR     R15                EXIT
                          5738  *
         0000 4D0EI       5739  PROC.C1   EQU    *
004D0EI  585A 006A        5740            L      R5,ADR.CMP3(R10)
004D12I  24C0             5741            LIS    R12,0
004D14I  40C0 4000 5F42I  5742            STH    R12,LDEG
004D1AI  0381 0017        5743            LB     R8,LN.SUBC(R1)     RESTORE SUBCLASS AGAIN
004D1EI  E1F0 0001        5744            SVC    14,N.1
004D22I  0833             5745            LR     R3,R3
004D24I  4310 FF68        5746            BBM    PROC.02
004D28I  585A 0018        5747            L      R5,ADR.CMP2(R10)
004D2CI  24C0             5748            LIS    R12,0
004D2EI  40C0 4000 5F42I  5749            STH    R12,LDEG
004D34I  0381 0017        5750            LB     R8,LN.SUBC(R1)     RESTORE SUBCLASS
004D38I  E1F0 0001        5751            SVC    14,N.1
004D3CI  0833             5752            LR     R3,R3
004D3EI  021F             5753            BMR    R15                EXIT
004D40I  4300 FE4C        5754            B      PROC.02
004D44I  5810 4000 58E4I  5755            L      R1,LINE1
004D4AI  0341 0008        5756            LB     R4,LN.WAT(R1)
004D4EI  4860 4000 5F46I  5757            LH     R6,LINE
004D54I  021F             5758            BMR    R15
004D56I  2561             5759            LCS    R6,1
004D58I  4060 4000 5F46I  5760            STH    R6,LINE
004D5EI  4300 FF16        5761            B      PR.CK1
```

```
                          5762  *
004D62I  5850 4000 58ECI  5763  PROC.C4   L      R5,QUEUE
004D68I  5890 4000 58BCI  5764            L      R9,QUEUE1          DISC ADDRESS AND TIMER INFO
004D6EI  F490 FFFF FF00   5765            NI     R9,Y'FFFFFF00'     EXTRACT OLD TIME
004D74I  030A 0071        5766            LB     R0,CALLB.TM(R10)   CALLBACK TIME
004D78I  0690             5767            OR     R9,R0
004D7AI  E1F0 0008        5768            SVC    14,N.8             ADJUST ACCORDING TO THE QUEUE TIME
004D7EI  6595 0000        5769            ABL    R9,0(R5)           RESTORE ON QUEUE
004D82I  4240 4000 4D96I  5770            BO     PROC.C4A
004D88I  5830 4000 58E0I  5771            L      R3,QUEUE2
004D8EI  6535 0000        5772            ABL    R3,0(R5)
004D92I  6575 0000        5773            ABL    R7,0(R5)
         0000 4D96I       5774  PROC.C4A  EQU    *
004D96I  2531             5775            LCS    R3,1               SET TO NO ENTRY FOUND
004D98I  030F             5776            BR     R15
                          5777  *
                          5778  *                CLEAN UP THE I/O TABLE ON A DISCONNECT OR HANG UP
                          5779  *
         0000 4D9AI       5780  CLEAN.UP  EQU    *
004D9AI  58A0 4000 58F8I  5781            L      R10,CUSTABLE
004DA0I  0341 0003        5782            LB     R4,SYS.FLAG(R1)
004DA4I  C540 0002        5783            CLHI   R4,2
004DA8I  2136             5784            BNES   CLEAN.1
004DAAI  5841 0004        5785            L      R4,LN.TEMP(R1)
004DAEI  41C0 4000 530AI  5786            BAL    R12,PUTBUFR
004DB4I  0744             5787  CLEAN.1   XR     R4,R4
004DB6I  D241 0017        5788            STB    R4,LN.SUBC(R1)
004DBAI  4041 0002        5789            STH    R4,SYS.STAT(R1)
004DBEI  D241 0006        5790            STB    R4,STAT.IN(R1)     SET LINE FREE
004DC2I  D241 0017        5791            STB    R4,LN.SUBC(R1)
004DC6I  2541             5792            LCS    R4,1
004DC8I  03C1 0009        5793            LB     R12,LN.OUT(R1)
004DCCI  C5C0 00FF        5794            CLHI   R12,X'FF'          LINE USED?
004DD0I  033D             5795            BER    R13                NO
004DD2I  58A0 4000 58F8I  5796            L      R10,CUSTABLE       CUSTOMER DATA BASE
004DD8I  40C0 4000 5F30I  5797            STH    R12,OUTLINE        SAVE OUTPUT LINE NUMBER
004DDEI  4CC0 4000 5F44I  5798            MH     R12,TABLNGTH
004DE4I  5ACA 000C        5799            A      R12,ADR.LNTB(R10)  POINT TO OUTPUT LINE
004DE8I  D24C 000D        5800            STB    R4,LN.IN(R12)
004DECI  D241 0009        5801            STB    R4,LN.OUT(R1)
004DF0I  034C 000C        5802            LB     R4,STAT.OUT(R12)
004DF4I  C540 0006        5803            CLHI   R4,6               PUT LINE OUT OF SERVICE?
004DF8I  2134             5804            BNES   CLEAN.2
004DFAI  C840 00F0        5805            LHI    R4,X'F0'           PUT LINE OUT OF SERVICE
004DFEI  2302             5806            BS     CLEAN.3
         0000 4E00I       5807  CLEAN.2   EQU    *
004E00I  0744             5808            XR     R4,R4
         0000 4E02I       5809  CLEAN.3   EQU    *
004E02I  D24C 000C        5810            STB    R4,STAT.OUT(R12)   SET OUTPUT LINE FREE
004E06I  50F0 4000 5904I  5811            ST     R15,SAVE15
004E0CI  41F0 FD02        5812            BAL    R15,TALK1          SEND INFO TO OTHER MACHINE
004E10I  58F0 4000 5904I  5813            L      R15,SAVE15
004E16I  030D             5814            BR     R13
                          5815  *
         0000 4E18I       5816  PRNTCOMM  EQU    *
004E18I  D900 4000 5828I  5817            STM    R0,COMMSAVE
```

```
TDX SYSTEM MAIN CONTROL PROGRAM                                 PAGE 106   16:03:37  01/27/77

004E1E1   4810 4000 5F1AI                     LH    R1,SVC14FG
004E24I   4230 4000 4EA0I                     BNZ   PRNTC.1            IF IN SVC14  IGNOR PRINT
004E2AI   40E0 4000 6420I                     STH   R14,CM
004E30I   50C0 4000 5880I                     ST    R12,COMDATA
004E36I   D340 4000 5880I                     LB    R4,COMDATA
004E3CI   41C0 4000 0042I                     BAL   R12,DIVIDE
004E42I   D250 4000 6423I                     STB   R5,CN3
004E48I   D240 4000 6424I                     STB   R4,CN4
004E4EI   D340 4000 5881I                     LB    R4,COMDATA+1
004E54I   41C0 4000 0042I                     BAL   R12,DIVIDE
004E5AI   D250 4000 6426I                     STB   R5,CN6
004E60I   D240 4000 6427I                     STB   R4,CN7
004E66I   D340 4000 5882I                     LB    R4,COMDATA+2
004E6CI   41C0 4000 0042I                     BAL   R12,DIVIDE
004E72I   D250 4000 6429I                     STB   R5,CN9
004E78I   D240 4000 642AI                     STB   R4,CN10
004E7EI   D340 4000 5883I                     LB    R4,COMDATA+3
004E84I   41C0 4000 0042I                     BAL   R12,DIVIDE
004E8AI   D250 4000 642CI                     STB   R5,CN12
004E90I   D240 4000 642DI                     STB   R4,CN13
004E96I   E640 4000 641CI                     LA    R4,COMMSG
004E9CI   41C0 F738                           BAL   R12,TTYMSG
          0000 4EA0I           PRNTC.1        EQU   *
004EA0I   D100 4000 5828I                     LM    R0,COMMSAVE
004EA6I   030F                                BR    R15
                               *
                               *              CHECK CAMP-ON QUEUE FOR A DUPLICATE ENTRY
                               *
                               *              ADDRESS OF QUEUE IN REG 8
                               *              4 DIGIT EXTENSION IN REG7
                               *                BAL R12,CKEXT
                               *                ERROR RETURN
                               *                NORMAL RETURN
                               *
          0000 4EA8I           CKEXT          EQU   *
004EA8I   0700                                XR    R0,R0              SET FOR NORMAL RETURN
004EAAI   4868 0002                           LH    R6,2(R8)           NUMBER OF ENTRIES
004EAEI   033D                                BZR   R13                IF EMPTY EXIT
004EB0I   6638 0000            CKEXT.1        RTL   R3,0(R8)           DISC ADDRESS
004EB4I   6538 0000                           ABL   R3,0(R8)           PLACE BACK ON BOTTOM
004EB8I   6638 0000                           RTL   R3,0(R8)
004EBCI   6538 0000                           ABL   R3,0(R8)
004EC0I   6638 0000                           RTL   R3,0(R8)           EXTENSION NUMBER
004EC4I   6538 0000                           ABL   R3,0(R8)           PUT IT BACK
004EC8I   0937                                CR    R3,R7              EQUAL?
004ECAI   4330 4000 4ED8I                     BE    CKEXT.E            YES SET TO ERROR
004ED0I   2763                 CKEXT.2        SIS   R6,3               DECREMENT NUMBER OF ENTRIES
004ED2I   033D                                BZR   R13
004ED4I   4300 FF0A                           B     CKEXT.1            CHECK NEXT ENTRY
004ED8I   2501                 CKEXT.E        LCS   R0,1
004EDAI   2205                                BS    CKEXT.2            PUT QUEUE BACK IN ORDER
                               *
                               *        SVC15 - BUILDS PARAMETER BLOCK FOR SVC15 CALL
                               *                BAL R15,SVC15
                               *
                               *                REG R3- LINE NUMBER

TDX SYSTEM MAIN CONTROL PROGRAM                                 PAGE 107   16:03:48  01/27/77

                               *                R4- MESSAGE ADDRESS
                               *
          0000 4EDCI           SVC15          EQU   *
004EDCI   5850 4000 58DCI                     L     R5,SVCBLK          PICK UP ADDRESS OF SVC PARAMETER BLOCK
          0000 4EE2I           SVC15A         EQU   *
004EE2I   5825 000C                           L     R2,BUF.WRT(R5)     BUFFER ADDRESS FOR INPUT/OUTPUT
004EE6I   D364 0000                           LB    R6,0(R4)           BYTE COUNT OF MESSAGE
004EEAI   C560 0003                           CLHI  R6,3               MESSAGE NEEDS LINE NUMBER
004EEEI   2138                                BNFS  SVC15.1            NO
004EF0I   4830 4000 5F2FI                     LH    R3,LINENUMR
004EF6I   C630 0080                           OHI   R3,X'80'
004EFAI   D234 0003                           STB   R3,3(R4)           STORE LINE
004EFEI   D334 0001            SVC15.1        LB    R3,1(R4)
004F02I   D232 0000                           STB   R3,0(R2)
004F06I   2641                                AIS   R4,1
004F08I   2621                                AIS   R2,1
004F0AI   D330 4000 5FF1I                     LB    R3,C.ETX
004F10I   D232 0000                           STB   R3,0(R2)
004F14I   2761                                SIS   R6,1
004F16I   203C                                BNZS  SVC15.1
004F18I   5025 0010                           ST    R2,BUF.EWRT(R5)
                               *
                               * QUICK & DIRTY LINK TO MONITOR
                               * ASSUMES R3 IS FREE
004F1CI   5040 CFEC                           STA   R4,NOGUTS3
004F20I   D345 0001                           LB    R4,SC15.LU(R5)
004F24I   4130 4000 427CI                     BAL   R3,MONTOR3
004F2AI   5840 CFDE                           LOA   R4,NOGUTS3
          0000 4F2EI           CONMR3         EQU   *                  END OF LINK TO MONITOR
004F2EI   E1E5 0000                           SVC   15,0(R5)           START MESSAGE
004F32I   030F                                BR    R15                RETURN
                               *
          0000 4F34I           TONFIT         EQU   *                  FIX UP TONE BIT FOR OUTPUT LINES
004F34I   0886                                LR    R8,R6
004F36I   4C80 4000 5F44I                     MH    R8,TABLNGTH
004F3CI   5A84 000C                           A     R8,ADR.LNTB(R4)    ADDRESS OF I/O LINE TABLE
004F40I   D308 000F                           LB    R0,CLASS.OT+1(R8)
004F44I   C800 00A0                           LHI   R8,WTDIALT         WAIT FOR DIAL TONE BIT
004F48I   0800                                LR    R0,R0              DO WE WAIT FOR DIAL TONE?
```

-continued

```
004F4AI  2333                      BZS   PR.TONE             YES
004F4CI  C880 00C0                 LHI   R8,X'C0'            NO,DO A BLIND DIAL
004F50I  4080 4000 5F0CI PR.TONE   STH   R8,LINETONE         SAVE LINE TONE
004F56I  030C                      BR    R12                 EXIT
                         *
                         *         IDOPHONE - SEND PHONE NUMBER TO SAT.
                         *
         0000 4F58I      IDOPHONE  EQU   *
004F58I  5870 4000 59F8I           L     R7,CUSTABLE         CUSTOMER TABLE
004F5EI  5850 4000 58DCI           L     R5,SVCBLK
004F64I  5835 000C                 L     R3,12(R5)           STARTING WRITE BUFFER ADDRESS
004F68I  D360 4000 5FFFI           LB    R6,C.STX            STX CHARACTER
004F6EI  D263 0000                 STB   R6,0(R3)
004F72I  50C0 4000 5900I           ST    R12,SAVE12
004F78I  4040 4000 5F30I           STH   R4,OUTLINE
004F7EI  0864                      LR    R6,R4
004F80I  0847                      LR    R4,R7               CUSTOMER DATA BASE
```

```
004F82I  41C0 FFAE                 BAL   R12,TONEFIT
004F86I  58C0 4000 5900I           L     R12,SAVE12
004F8CI  4840 4000 5F30I           LH    R4,OUTLINE
004F92I  D360 4000 5FF3I           LB    R6,ASERV
004F98I  C560 0009                 CLHI  R6,LD
004F9CI  4230 4000 4FAAI           BNE   IDO.LDBP
004FA2I  D367 0070                 LB    R6,LDBEEPER(R7)
004FA6I  0646                      OR    R4,R6
         0000 4FAAI      IDO.LDBP  EQU   *
004FAAI  C640 0080                 OHI   R4,X'80'
004FAEI  4880 4000 5F0AI           LH    R8,BEEPFLG
004FB2I  2333                      BZS   IDOBEEP
004FB4I  C640 00A0                 OHI   R4,WTDIALT
         0000 4FB8I      IDOBEEP   EQU   *
004FB8I  D243 0003                 STB   R4,3(R3)            OUTPUT LINE
004FBCI  4840 4000 5F2EI           LH    R4,LINENUMB
004FC2I  C640 0080                 OHI   R4,X'80'
004FC6I  D243 0002                 STB   R4,2(R3)            INPUT LINE
004FCAI  C840 0042                 LHI   R4,C'B'
004FCEI  D243 0001                 STB   R4,1(R3)            CONNECT CODE
004FD2I  5880 4000 58CCI           L     R8,LINEADR
004FD8I  2449                      LIS   R4,9
004FDAI  D360 4000 5FF3I           LB    R6,ASERV            ACTUAL SERVICE CODE
004FE0I  C560 000A                 CLHI  R6,TIE              TIE LINE?
004FE4I  4330 4000 513AI           BE    IDOTIE              YES
004FEAI  C560 0000                 CLHI  R6,INTRA            INTRASTATE CALL?
004FEEI  4330 4000 5036I           BE    IDOP.INT            YES
004FF4I  C560 0009                 CLHI  R6,LD
004FF8I  4330 4000 5012I           BE    IDOP.LD
004FFEI  C560 0001                 CLHI  R6,FX               FX LINE
005002I  4230 4000 506AI           BNE   IDOPHN.3            NO
         0000 5008I      IDOP.IN1  EQU   *
005008I  2623                      AIS   R2,3                POSION BUFFER
00500AI  2446                      LIS   R4,6
00500CI  4300 4000 5082I           B     IDOPHN.0
         0000 5012I      IDOP.LD   EQU   *
005012I  D360 4000 5FF4I           LB    R6,BSERV
005018I  C560 000A                 CLHI  R6,TIE
00501CI  4330 4000 5036I           BE    IDOP.INT
005022I  C560 0009                 CLHI  R6,LD               LOCAL LINE?
005026I  4330 4000 5036I           BE    IDOP.INT            YES,CHECK IT
00502CI  C560 0002                 CLHI  R6,FX+1
005030I  4380 4000 506AI           BNC   IDOPHN.3
         0000 5036I      IDOP.INT  EQU   *
005036I  D367 003B                 LB    R6,IN.7OR10(R7)     7 OR 10 DIGIT INTRASTATE CALL?
00503AI  0866                      LR    R6,R6               CHECK FLAG
00503CI  4330 4000 506AI           BZ    IDOPHN.3            NO CHECK NEEDED,PUT OUT 10
005042I  D362 0000                 LB    R6,0(R2)
005046I  D467 0022                 CLB   R6,PHN.MSTR(R7)
00504AI  4230 4000 506AI           BNE   IDOPHN.3
005050I  D362 0001                 LB    R6,1(R2)
005054I  D467 0023                 CLB   R6,PHN.MSTR+1(R7)
005058I  4230 4000 506AI           BNE   IDOPHN.3
00505EI  D362 0002                 LB    R6,2(R2)
005062I  D467 0024                 CLB   R6,PHN.MSTR+2(R7)
005066I  4330 FF9F                 BE    IDOP.IN1            YES
```

```
         0000 506AI      IDOPHN.3  EQU   *
00506AI  D368 0001                 LB    R6,CLASS.IN(R8)
00506EI  C560 000E                 CLHI  R6,INWATTS
005072I  2138                      BNES  IDOPHN.0
005074I  4860 4000 5F76I           LH    R6,ADNIND           WAS THIS AN ADN
00507AI  C560 FFFF                 CLHI  R6,X'FFFF'
00507EI  2132                      BNES  IDOPHN.0            YES ,SEND OUT 10 DIGITS
005080I  2446                      LIS   R4,6                SET NUMBER OF DIGITS TO 7
005082I  2634            IDOPHN.0  AIS   R3,4                BYTES ALREADY STORED
005084I  D367 0021                 LB    R6,PULSE(R7)        DO WE NEED A CIRCLE DIGIT?
005088I  0866                      LR    R6,R6
00508AI  4330 4000 50BAI           BZ    IDOPHN.1            NO
005090I  C660 00A0                 OHI   R6,WTDIALT          TURN ON PTOPER BITS
005094I  D263 0000                 STB   R6,0(R3)
005098I  D362 0000                 LB    R6,0(R2)            LOOK AT FIRST DIAL DIGIT
00509CI  4880 4000 5F56I           LH    R8,IND              INTERNATIONAL CALL?
0050A2I  4230 4000 51CCI           BNZ   IDOIND.2            YES
0050A8I  C560 008A                 CLHI  R6,X'8A'            ZERO AREA CODE?
```

-continued

```
0050ACI  4330 4000 512EI    6004             BE    IDOLOCAL          YES
0050B2I  2631               6005             AIS   R3,1
0050B4I  4300 4000 50DAI    6006             B     IDOPHN.6          FINISH IT UP
0050BAI  D362 0000          6007  IDOPHN.1   LB    R6,0(R2)          PICK UP FIRST DIGIT
0050BEI  4880 4000 5F56I    6008             LH    R8,INO            INTERNATIONAL?
0050C4I  4230 4000 51C2I    6009             BNZ   IDOINO            YES
0050CAI  C560 008A          6010             CLHI  R6,X'8A'          ZERO AREA CODE?
0050CEI  4330 4000 512EI    6011             BE    IDOLOCAL
0050D4I  4660 4000 5F0CI    6012  IDOPHN.4   OH    R6,LINETONE       TURN ON TONE BIT
         0000 50DAI         6013  IDOPHN.6   EQU   *
0050DAI  D263 0000          6014             STB   R6,0(R3)
0050DEI  2631               6015  IDOPHN.2   AIS   R3,1              UPDATE WRITE BUFFER POINTER
0050E0I  2621               6016             AIS   R2,1              UPDATE PHONE NUMBER POINTER
0050E2I  D362 0000          6017             LB    R6,0(R2)
0050E6I  C560 008C          6018             CLHI  R6,POUND
0050EAI  4330 4000 50FCI    6019             BE    IDOPHN.5
0050F0I  D263 0000          6020             STB   R6,0(R3)
0050F4I  2741               6021             SIS   R4,1              ANY MORE DIGITS LEFT
0050F6I  4230 FFE4          6022             BNZ   IDOPHN.2          YES
0050FAI  2631               6023             AIS   R3,1
         0000 50FCI         6024  IDOPHN.5   EQU   *
0050FCI  D360 4000 5FF1I    6025             LB    R6,C.ETX
005102I  D263 0000          6026             STB   R6,0(R3)
005106I  5035 0010          6027             ST    R3,16(R5)         STORE ENDING BYTE ADDRESS
                            6028  *
                            6029  * QUICK & DIRTY LINK TO MONITOR
00510AI  5030 4000 65ACI    6030             STA   R3,NOGUTS
005110I  5040 CCF8          6031             STA   R4,NOGUTS3
005114I  D345 0001          6032             LB    R4,SC15.LU(R5)
005118I  4130 4000 4F26I    6033             BAL   R3,MONTOR3
00511EI  5830 4000 65ACI    6034  COMMR36    LDA   R3,NOGUTS
005124I  5840 CCE4          6035             LDA   R4,NOGUTS3
005128I  E1F5 0000          6036             SVC   15,0(R5)          ISSUE CALL
00512CI  030D               6037             BR    R13               EXIT
00512EI  2623               6038  IDOLOCAL   AIS   R2,3
005130I  2446               6039             LIS   R4,6
005132I  D362 0000          6040             LB    R6,0(R2)
005136I  4300 FF9A          6041             B     IDOPHN.4
```

```
         0000 513AI         6042  IDOTIE     EQU   *
00513AI  2634               6043             AIS   R3,4              POSITION OUTPUT BUFFER
00513CI  0878               6044             LR    R7,R8
00513EI  5860 4000 5910I    6045             L     R6,SAVER7         EXCHANGE TABLE ADDRESS
005144I  D346 0002          6046             LB    R4,EXCH.NT(R6)    NUM.BER OF ACCESSES
005148I  0844               6047             LR    R4,R4
00514AI  4330 4000 5186I    6048             BZ    IDOTIF.3          IF ZERO,NO TANDEM TIE LINE
005150I  D386 0004          6049  IDOTIE.0   LB    R8,EXCH.T1(R6)    PICK UP FIRST BYTE
005154I  C680 00A0          6050             OHI   R8,WTDIALT        TURN ON WAIT FOR DIAL TONE BIT
005158I  D283 0000          6051             STB   R8,0(R3)
00515CI  D386 0005          6052             LB    R8,EXCH.T1+1(R6)
005160I  2631               6053             AIS   R3,1
005162I  0888               6054             LR    R8,R8
005164I  4330 4000 517FI    6055             BZ    IDOTIE.2
00516AI  D283 0000          6056             STB   R8,0(R3)          DIGIT 2
00516EI  2631               6057             AIS   R3,1
005170I  D386 0006          6058             LB    R8,EXCH.T1+2(R6)
005174I  0888               6059             LR    R8,R8
005176I  2334               6060             BZS   IDOTIE.2
005178I  D283 0000          6061             STB   R8,0(R3)          DIGIT 3
00517CI  2631               6062             AIS   R3,1
         0000 517EI         6063  IDOTIE.2   EQU   *
00517EI  2663               6064             AIS   R6,3
005180I  2741               6065             SIS   R4,1
005182I  4230 FFCA          6066             BNZ   IDOTIE.0
         0000 5186I         6067  IDOTIE.3   EQU   *
005186I  D387 0015          6068             LB    R8,CAMP.CNT(R7)   CALLBACK CODE
00518AI  C480 0080          6069             NHI   R8,B.TIEPBX       DO WE ONLY GO TO PBX
00518EI  4230 4000 51A2I    6070             BNZ   IDOTIF.4          YES
005194I  C880 00A9          6071             LHI   R8,OUTSIDE
005198I  D283 0000          6072             STB   R8,0(R3)          PUT OUT BYTE TO WAIT FOR DIAL TONE
00519CI  2631               6073             AIS   R3,1
00519EI  4300 FF8C          6074             B     IDOLOCAL
0051A2I  C880 00A0          6075  IDOTIE.4   LHI   R8,WTDIALT
0051A6I  D283 0000          6076             STB   R8,0(R3)
0051AAI  2630               6077             AIS   R3,0              ****** CHANGE FROM 1 TO 0 .STAN F. FIX
0051ACI  D387 0015          6078             LB    R8,CAMP.CNT(R7)
0051B0I  C380 0020          6079             THI   R8,SPCALLCD       SPECIAL  ADN TO EXTENTION
0051B4I  4330 FF44          6080             BZ    IDOPHN.5          NO
0051B8I  2444               6081             LIS   R4,4
0051BAI  D362 0000          6082             LB    R6,0(R2)
0051BEI  4300 FF12          6083             B     IDOPHN.4
         0000 51C2I         6084  IDOINO     EQU   *
0051C2I  C660 00A0          6085             OHI   R6,WTDIALT        TURN ON DIAL TONE BIT
0051C6I  D263 0000          6086  IDOINO.1   STB   R6,0(R3)
0051CAI  2621               6087             AIS   R2,1
0051CCI  2631               6088  IDOINO.2   AIS   R3,1
0051CEI  D362 0000          6089             LB    R6,0(R2)
0051D2I  C560 0003          6090             CLHI  R6,X'03'          ETX
0051D6I  4330 FF22          6091             BE    IDOPHN.5          YES,END
0051DAI  C560 008C          6092             CLHI  R6,POUND          END?
0051DEI  4330 FF1A          6093             BE    IDOPHN.5          YES
0051E2I  4300 FFE0          6094             B     IDOINO.1          NO,STORE IT
                            6095  *
                            6096  *          GETCAMP - PICK UP A DISC ADDRESS FOR CALL BACK
                            6097  *                  - RETURN DISC ADDRESS IN R9
```

```
                              *
         0000 51E6I           GETCAMP  EQU    *
0051E6I  5040 4000 592CI               ST     R4,PUTSAV4
0051ECI  5030 4000 5930I               ST     R3,TTYSAV3
0051F2I  E630 4000 7C00                LA     R3,LOADPARM
0051F8I  0799                          XR     R9,R9              SET FIRST FREE SECTOR TO ZERO
0051FAI  5843 0030                     L      R4,CDIS.MAP(R3)    ADDRESS OF CALL BACK SECTOR MAP
0051FEI  4853 0034                     LH     R5,CDIS.NWD(R3)    NUMBER OF WORDS IN SECTOR BIT MAP
005202I  5860 4000 5880I      GETC.0   L      R6,BIT.31
005208I  5874 0000                     L      R7,0(R4)           PICK UP FIRST WORD
00520CI  1171                 GETC.1   SLLS   R7,1
00520EI  4380 4000 523CI               BNC    GETC.FND
005214I  2691                          AIS    R9,1
005216I  1061                          SRLS   R6,1
005218I  2286                          BNCS   GETC.1
00521AI  2644                          AIS    R4,4
00521CI  2751                          SIS    R5,1
00521EI  4230 FFE0                     BNZ    GETC.0
005222I  E640 4000 6162I               LA     R4,M.NOCBKD        NO MORE SECTORS
005228I  41C0 F3AC                     BAL    R12,TTYMSG         SEND MESSAGE OUT
00522CI  2591                          LCS    R9,1
00522EI  5830 4000 5930I               L      R3,TTYSAV3         RESTORE
005234I  5840 4000 592CI               L      R4,PUTSAV4
00523AI  030D                          BR     R13
                              *
         0000 523CI           GETC.FND EQU    *
00523CI  5874 0000                     L      R7,0(R4)
005240I  0676                          OR     R7,R6              TURN SECTOR BUSSY BIT ON
005242I  5074 0000                     ST     R7,0(R4)
005246I  5830 4000 5930I               L      R3,TTYSAV3         RESTORE
00524CI  030D                          BR     R13
                              *
                              *                 PUTCAMP  - RETURN CALL BACK SECTOR TO BIT MAP
                              *                   R9 HAS SECTOR ADDRESS
                              *
         0000 524EI           PUTCAMP  EQU    *
00524EI  50A0 4000 58FCI               ST     R10,SAVE10
005254I  5040 4000 592CI               ST     R4,PUTSAV4
00525AI  5030 4000 5930I               ST     R3,TTYSAV3
005260I  E630 4000 7C00                LA     R3,LOADPARM
005266I  5843 0030                     L      R4,CDIS.MAP(R3)    ADDRESS OF CALL BACK SECTOR MAP
00526AI  5860 4000 5880I               L      R6,BIT.31
005270I  0899                          LR     R9,R9              SECTOR ZERO WAS USED
005272I  4330 4000 5290I               BZ     PUTC.2
005278I  4D90 4000 5F7AI               DH     R9,N.32            FIND DISPLACEMENT
00527EI  11A2                          SLLS   R10,2
005280I  0A4A                          AR     R4,R10
005282I  0899                          LR     R9,R9
005284I  4330 4000 5290I               BZ     PUTC.2
00528AI  1061                 PUTC.1   SRLS   R6,1
00528CI  2791                          SIS    R9,1
00528EI  2032                          BNZS   PUTC.1
                              *
005290I  5854 0000            PUTC.2   L      R5,0(R4)
005294I  0756                          XR     R5,R6
005296I  5054 0000                     ST     R5,0(R4)
```

```
00529AI  58A0 4000 58FCI               L      R10,SAVE10
0052A0I  5830 4000 5930I               L      R3,TTYSAV3
0052A6I  5840 4000 592CI               L      R4,PUTSAV4
0052ACI  030D                          BR     R13
                              *
                              *                GETBUFR - PICK UP A 24 BYTE DATA BUFFER
                              *                        - BUFFER ADDRESS IN R4
                              *
         0000 52AEI           GETBUFR  EQU    *
0052AEI  5050 4000 58D8I               ST     R5,GTEMP.1
0052B4I  5070 4000 58D4I               ST     R7,DTEMP.2
0052BAI  E670 4000 7C00       GETBFR.1 LA     R7,LOADPARM        ADDRESS OF TEMP WORK TABLE
0052C0I  4847 0012                     LH     R4,CWORDS(R7)      NUMBER OF WORDS IN BIT MAP
0052C4I  5857 000C                     L      R5,ADR.TCOR(R7)    STARTING ADDRESS OF BUFFER POOL
0052C8I  C860 0024                     LHI    R6,36              NUMBER OF WORDS IN ENTRY
0052CCI  E1E0 000A                     SVC    14,N.10
0052D0I  5870 4000 58D4I               L      R7,DTEMP.2
0052D6I  0845                          LR     R4,R5              DID IT FIND ONE
0052D8I  5850 4000 58D8I               L      R5,GTEMP.1
0052DEI  0844                          LR     R4,R4
0052E0I  4220 4000 52FCI               BP     GETBFR.2
                              *
0052E6I  50C0 4000 58D0I               ST     R12,DTEMP.1
0052ECI  E640 4000 6188I               LA     R4,M.NOCBUF
0052F2I  41C0 F2E2                     BAL    R12,TTYMSG         WE ARE IN TROUBLE
0052F6I  4300 4000 015FI               B      EREXIT
0052FCI  2450                 GETBFR.2 LIS    R5,0
0052FEI  D254 0020                     STB    R5,CMP.PHN+16(R4)  SET NON TANDEM FLAG
005302I  5850 4000 58D8I               L      R5,GTEMP.1
005308I  030C                          BR     R12
                              *
                              *                PUTBUFR - RESTORE A 24 BYTE BUFFER
                              *                        - R4 HAS BUFFER ADDRESS
                              *
         0000 530AI           PUTBUFR  EQU    *
00530AI  5070 4000 58D4I               ST     R7,DTEMP.2
005310I  E670 4000 7C00                LA     R7,LOADPARM
005316I  4857 0012                     LH     R5,CWORDS(R7)
00531AI  5867 000C                     L      R6,ADR.TCOR(R7)
00531EI  C870 0024                     LHI    R7,36
```

-continued

```
00532?T  E1E0 000B                SVC    14,M.11
005326T  5870 4000 58D4T          L      R7,DTEMP.2
00532CT  030C                     BR     R12
                       *
                       *          PUT.TTYB - RESTORE TTY BUFFER TO BUFFER POOL
                       *                   - R1 HAS SVC BLOCK ADDRESS
00532ET  5841 0004     PUT.TTYB   L      R4,4(R1)         PICK UP STARTING BUFFER ADDRESS
005332T  E670 4000 7C00           LA     R7,LOADPARM
005338T  4857 0020                LH     R5,TWORDS(R7)
00533CT  5867 001C                L      R6,ADR.TTYB(R7)
005340T  4870 4000 5F7CT          LH     R7,LTTY.BLK      LENGTH OF TTY BLOCK
005346T  41B0 4000 5440T          BAL    R11,RESTORE
00534CT  24B0                     LIS    R11,0
00534ET  40B0 4000 5F2AT          STH    R11,PROCFLG
005354T  030C                     BR     R12
                       *
```

```
                       *          RTNDISBR - RETURN DISC BUFFER TO QUEUE
                       *
                       *           - R5 HAS ADDRESS OF BUFFER
                       *
         0000 5356T    RTNDISBR EQU      *
005356T  5030 4000 5930T          ST     R3,TTYSAV3
00535CT  E630 4000 7C00           LA     R3,LOADPARM      ADDRESS OF LOAD PARAMETER FILE
005362T  0845                     LR     R4,R5
005364T  4853 0010                LH     R5,NWORDS(R3)    NUMBER OF WORDS IN BIT MAP
005368T  5863 0008                L      R6,ADR.DCOR(R3)  ADDRESS OF BIT MAP AND BUFFERS
00536CT  4870 4000 5F3ET          LH     R7,BUFLN         LENGTH OF BUFFER ENTRY
005372T  41B0 4000 5440T          BAL    R11,RESTORE
005378T  5830 4000 5930T          L      R3,TTYSAV3
00537ET  030C                     BR     R12
                       *
                       *          GET.TTYB - PICK UP A TTY BUFFER
                       *
005380T  0804          GET.TTYB   LR     R0,R4            SAVE ADDRESS OF MESSAGE
005382T  5030 4000 5930T          ST     R3,TTYSAV3
005388T  E630 4000 7C00           LA     R3,LOADPARM      ADDRESS OF LOAD PARAM BLOCK
00538ET  4843 0020                LH     R4,TWORDS(R3)    NUMBER OF WORDS IN BIT MAP
005392T  5853 001C                L      R5,ADR.TTYB(R3)  STARTING ADDRESS OF TABLE
005396T  4860 4000 5F7CT          LH     R6,LTTY.BLK      LENGTH OF TABLE EMTRY
00539CT  41B0 4000 5412T          BAL    R11,SEARCH
0053A2T  0855                     LR     R5,R5
0053A4T  4210 4000 53B8T          BM     GET.TTYN
0053AAT  CA50 0048                AHI    R5,72            POSITION TO START OF BLOCK
0053AET  0840                     LR     R4,R0
0053B0T  5830 4000 5930T          L      R3,TTYSAV3
0053B6T  030C                     BR     R12
0053B8T  2551          GET.TTYN   LCS    R5,1
0053BAT  4050 4000 5F2AT          STH    R5,PROCFLG
0053C0T  E120 4000 6574T          SVC    2,LOGTTYB
0053C6T  030C                     BR     R12
                       *
                       *          DISCBUFR - PICK UP A DISC BUFFER
                       *
                       *                  BUFFER ADDRESS IS RETURNED IN R5
         0000 53C8T    DISCBUFR EQU      *
0053C8T  5070 4000 58D4T          ST     R7,DTEMP.2
0053CET  E670 4000 7C00           LA     R7,LOADPARM      LOAD PARAMETER TABLE ADDRESS
0053D4T  4847 0010                LH     R4,NWORDS(R7)    NUMBER OF WORDS IN BIT MAP
0053D8T  5857 0008                L      R5,ADR.DCOR(R7)  ADDRESS OF DISC BUFFER POOL
0053DCT  4860 4000 5F3ET          LH     R6,BUFLN         LENGTH OF A TABLE ENTRY
0053E2T  41B0 4000 5412T          BAL    R11,SEARCH       SEARCH BIT MAP
0053E8T  5870 4000 58D4T          L      R7,DTEMP.2
0053EET  0855                     LR     R5,R5            DID WE FIND ONE
0053F0T  032C                     BNMR   R12              YES
0053F2T  50C0 4000 58D0T          ST     R12,DTEMP.1
0053F8T  E640 4000 61AAT          LA     R4,M.NODISC
0053FET  41C0 F1D6                BAL    R12,TTYMSG
005402T  2551                     LCS    R5,1
005404T  58C0 4000 58D0T          L      R12,DTEMP.1
00540AT  5870 4000 58D4T          L      R7,DTEMP.2
005410T  030C                     BR     12
                       *
```

```
                       *     SEARCH - LOOKS THRU BIT MAP FOR A FREE BLOCK
                       *              -IN BIT MAP 0= FREE
                       *                          1= BUSY
                       *     ENTER WITH R4 = NUMBER OF WORDS IN BIT MAP
                       *                R5 = ADDRESS OF BUFFER POOL
                       *                R6 = LENGTH OF TABLE ENTRY
                       *              -IF A BLOCK IS FOUND THE BIT POSITION IS SET
                       *               BUSY AND THE BLOCK ADDRESS IS RETURNED IN R5
                       *              -IF R5 IS NEG,NO FREE BLOCK COULD BE FOUND
                       *
         0000 5412T    SEARCH   EQU      *
005412T  0894                     LR     R9,R4            POSITION STARTING BUFFER ADDRESS
005414T  1192                     SLLS   R9,2             PAST BIT MAP
005416T  0885                     LR     R8,R5
005418T  0A59                     AR     R5,R9            STARTING BUFFER ADDRESS
00541AT  4C40 4000 5F7AT          MH     R4,M.32          NUMBER OF AVAILABLE ENTRIES
005420T  2470                     LIS    R7,0             START DISPLACEMENT WITH 0
005422T  7478 0000     SEARCH.0 TBT      R7,0(R8)         LOOK FOR A ZERO BIT
```

-continued

```
00542 6I  4330 4000 5430I          BZ    SEARCH.F          FOUND IT
00542CI   2671                     AIS   R7,1              POINT TO NEXT BIT
00542EI   0A56                     AR    R5,R6             UPDATE BUFFER POSITION
005430I   0974                     CR    R7,R4             LAST ONE REACHED?
005432I   4230 FFEC                BNE   SEARCH.0          NO
005436I   2551                     LCS   R5,1              ERROR EXIT
005438I   0308                     BR    R11
00543AI   7578 0000      SEARCH.F  SBT   R7,0(R8)          TURN BIT ON
00543EI   0308                     BR    R11
                         *
                         *               RESTORE - FILL IN BIT MAP WITH RETURNED BUFFER
                         *
                         *                 INPUT - R4 = BUFFER ADDRESS
                         *      R5 = NUMBER OF WORDS IN BIT MAP
                         *                         R6 = STARTING ADDRESS OF MAP AND BUFFERS
                         *                         R7 = LENGTH OF TABLE ENTRY
                         *
          0000 5440I     RESTORE   EQU   *
005440I   1152                     SLLS  R5,2              CONVERT TO ADDRESS OFFSET
005442I   0A56                     AR    R5,R6             POSITION TO FIRST BUFFER POSITION
005444I   0B45                     SR    R4,R5             FIND BUFFER DISPLACEMENT
? 005446I 0D47                     DHR   R4,R7             BIT DISPLACEMENT LEFT IN R5
005448I   7656 0000                RBT   R5,0(R6)          SET BIT TO ZERO
00544CI   023B                     BNZR  R11               WAS 1, IS NOW 0
00544EI   D000 4000 57C4I          STM   R0,MLOOP,R6       BIT WAS ALREADY ZERO
005454I   E120 4000 6590I          SVC   2,LOGSE           LOG ON CONSOLE
00545AI   030B                     BR    R11               EXIT
                         *
                         *               WRITE WORK AREA OUT TO DISC
                         *
                         *               FILLS IN ALL NECCESSARY DATA
                         *
                         *               R2 = ADDRESS OF WHERE PHONE NUMBER EXISTS
                         *
          0000 545CI     WRTWAREA  EQU   *
00545CI   41C0 FF68                BAL   R12,DISCBUFR      PICK UP A DISC BUFFER
005460I   0855                     LR    R5,R5
005462I   4210 4000 567CI          BM    WRT.SERR          NO MORE BUFFERS AVAILABLE
```

```
005468I   5050 4000 58C8I          ST    R5,WRTEMP         SAVE ADDRESS
00546EI   0733                     XR    R3,R3
005470I   D235 0050                STB   R3,TD.CALL(R5)    SET TO NO CALL BACK ENTRY
005474I   5810 4000 58CCI          L     R1,LINEADR        LINE TABLE ADDRESS
00547AI   2431                     LIS   R3,1              SET TYPE FOR BILLING RECORD
00547CI   D235 0000                STB   R3,TD.TYPE(R5)
005480I   5841 0004                L     R4,LN.TEMP(R1)    ADDRESS OF BUFFER
          0000 5484I     WRT.0A    EQU   *
005484I   243F                     LIS   R3,L.TACT-1
005486I   D364 4300 0000 WRT.0     LB    R6,0(R4,R3)
00548CI   C760 00B0                XHI   R6,XMASK
005490I   C560 003A                CLHI  R6,XZERO
005494I   2133                     BNES  A.1
005496I   C860 0030                LHI   R6,X'30'
          0000 549AI     A.1       EQU   *
00549AI   D265 4300 0007           STB   R6,TD.ACCT(R5,R3)
0054A0I   2731                     SIS   R3,1
0054A2I   221F                     BNMS  WRT.0
                         *
0054A4I   4860 4000 5F2CI          LH    R6,PORTNUMB       USER PORT NUMBER
0054AAI   4065 0002                STH   R6,TD.PORT(R5)
0054AEI   4860 4000 5F2FI          LH    R6,LINENUMB       INPUT LINE NUMBER
0054B4I   D265 0001                STB   R6,TD.INLN(R5)
0054B8I   4860 4000 5F30I          LH    R6,OUTLINE
0054BEI   D265 0004                STB   R6,TD.OUTLN(R5)   OUTPUT LINE NUMBER
0054C2I   D360 4000 5FF2I          LB    R6,SYSNUMBR
0054C8I   D265 0017                STB   R6,TD.SYSTM(R5)   SYSTEM NUMBER
0054CCI   E120 4000 56CCI          SVC   2,TIME            PICK UP TIME IN ASCII
0054D2I   4860 4000 56D4I          LH    R6,TIME.HH
0054D8I   4065 0020                STH   R6,TD.THH(R5)
0054DCI   4860 4000 56DAI          LH    R6,TIME.SS
0054E2I   4065 0024                STH   R6,TD.TSS(R5)
0054E6I   D360 4000 56D7I          LB    R6,TIME.M1
0054ECI   D265 0022                STB   R6,TD.TM1(R5)
0054F0I   D360 4000 56D8I          LB    R6,TIME.M2
0054F6I   D265 0023                STB   R6,TD.TM2(R5)
0054FAI   E120 4000 56ECI          SVC   2,TIME1           PICK UP TIME IN BINARY
005500I   5860 4000 56F4I          L     R6,SPT.TIME       TIME IN SECONDS,BINARY
005506I   5065 001C                ST    R6,TD.SECS(R5)
00550AI   E640 4000 5FE4I          LA    R4,DATE           STORE THE DATE
005510I   2434                     LIS   R3,4
005512I   D364 4300 0000 WRT.4     LB    R6,0(R4,R3)
005518I   D265 4300 0026           STB   R6,TD.DATE(R5,R3)
00551EI   2731                     SIS   R3,1
005520I   2217                     BNMS  WRT.4
005522I   4830 4000 5F56I          LH    R3,IND
005528I   4230 4000 5680I          BNZ   WRT.IND
00552EI   5810 4000 58CCI          L     R1,LINEADR
005534I   D360 4000 5FF3I          LB    R6,ASERV
00553AI   C560 000A                CLHI  R6,TIE            TIE LINE?
00553EI   4230 4000 5552I          BNE   WRT.4B            NO
005544I   D331 0015                LB    R3,CAMP.CNT(R1)
005548I   C330 0020                THI   R3,SPCALLCD       EXTENTION ON ADN
00554CI   4230 4000 5618I          BNZ   WRT.SPC           YES
          0000 5552I     WRT.4B    EQU   *
                         *
```

```
00552I  2439                        LIS   R3,9
005554I  D362 4300 0000   WRT.5     LB    R6,0(R2,R3)
00555AI  C760 00B0                  XHI   R6,XMASK
00555EI  C560 003A                  CLHI  R6,XZERO
005562I  2133                       BNES  A.5
005564I  C860 0030                  LHI   R6,X'30'
         0000 5568I       A.5       EQU   *
005568I  D265 4300 002B             STB   R6,TD.PHN(R5,R3)
00556EI  2731                       SIS   R3,1
005570I  221E                       BNMS  WRT.5
005572I  2439                       LIS   R3,9          FILL IN REST WITH ZERO
005574I  2460                       LIS   R6,0
005576I  D265 4300 0035   WRT.5A    STB   R6,TD.PHN+10(R5,R3)
00557CI  2731                       SIS   R3,1
00557EI  2214                       BNMS  WRT.5A
005580I  4060 4000 5F56I  WRT.5B    STH   R6,IND
005584I  D360 4000 5FF3I            LB    R6,ASERV      ACTUAL SERVICE CODE
00558CI  D265 0005                  STB   R6,TD.ASERV(R5)
005590I  D360 4000 5FF4I            LB    R6,BSERV      BILLABLE SERVICE CODE
005596I  D265 0006                  STB   R6,TD.BSERV(R5)
00559AI  5860 4000 5AE8I            L     R6,CUSTABLE
0055A0I  5846 0000                  L     R4,DEV.MN(R6)
0055A4I  5045 0018                  ST    R4,TD.PMN(R5)
0055A8I  D360 4000 5FF5I            LB    R6,OPTIONS    OPTIONS CODE
0055AEI  D265 003F                  STB   R6,TD.OPT(R5)
0055B2I  4860 4000 5F76I            LH    R6,ADNIND     ADN INDICATOR
0055B8I  D265 0040                  STB   R6,TD.ADN(R5)
0055BCI  D361 0017                  LB    R6,LN.SUBC(R1)  FX OR TIE SUBCLASS
0055C0I  D265 0041                  STB   R6,TD.DIVR(R5)
                          *
                          *                  PICK UP DISC ADDRESS AND WRITE
                          *                  BUFFER OUT TO DISC
                          *
0055C4I  0865                       LR    R6,R5         STARTING BUFFER ADDRESS
0055C6I  CA60 0100                  AHI   R6,BUFL       POINT TO BEGINNING OF SVC BLOCK
0055CAI  5056 0004                  ST    R5,4(R6)      STARTING ADDRESS
0055CEI  CA50 0052                  AHI   R5,L.TDBUF    LENGTH OF BUFFER
0055D2I  5056 0008                  ST    R5,8(R6)      ENDING ADDRESS
0055D6I  4850 4000 5F2CI            LH    R5,PORTNUMB
0055DCI  4056 0014                  STH   R5,20(R6)
0055E0I  4850 4000 5F2EI            LH    R5,LINENUMB
0055E6I  4056 0016                  STH   R5,22(R6)
0055EAI  5840 4000 58CCI            L     R4,LINEADR    LINE TABLE ADDRESS
0055F0I  5046 0018                  ST    R4,24(R6)     SAVE IT
0055F4I  4854 000A                  LH    R5,DISC.ADR(R4)  DISC ADDRESS
0055F8I  5056 000C                  ST    R5,12(R6)
0055FCI  D350 4000 5FF7I            LB    R5,WRTFUNC    WRITE FUNCTION
005602I  D256 0000                  STB   R5,0(R6)
005606I  D350 4000 5FF8I            LB    R5,WRKSPLU    WORK SPACE LOGICAL UNIT
00560CI  D256 0001                  STB   R5,1(R6)
005610I  0856                       LR    R5,R6
005612I  E1E0 0002                  SVC   14,N.2        STORE ON DISC QUEUE
005616I  030D                       BR    R13
         0000 5618I       WRT.SPC   EQU   *
005618I  5020 4000 5934I            ST    R2,TIETEMP    SAVE REAL BUFFER ADDRESS
00561EI  2430                       LIS   R3,0          SKIP PAST EXTENTION TO PHONE NUMBER
```

```
005620I  D362 4300 0000   WRT.SPC0  LB    R6,0(R2,R3)
005626I  2631                       AIS   R3,1
005628I  C560 008C                  CLHI  R6,POUND      ARE WE THER?
00562CI  4330 4000 5644I            BE    WRT.SPC1      YES
005632I  C530 0006                  CLHI  R3,6
005636I  4230 FFE6                  BNE   WRT.SPC0      MAX COUNT NOT REACHED
00563AI  D360 008C                  LB    R6,POUND
00563EI  D262 43FF FFFF             STB   R6,-1(R2,R3)
         0000 5644I       WRT.SPC1  EQU   *
005644I  0A23                       AR    R2,R3
005646I  2439                       LIS   R3,9
005648I  D362 4300 0000   WRT.SPC2  LB    R6,0(R2,R3)
00564EI  C760 00B0                  XHI   R6,XMASK
005652I  C560 003A                  CLHI  R6,XZERO
005656I  2133                       BNES  WRT.SPC3
005658I  C860 0030                  LHI   R6,X'30'
00565CI  D265 4300 002B   WRT.SPC3  STB   R6,TD.PHN(R5,R3)
005662I  2731                       SIS   R3,1
005664I  221F                       BNMS  WRT.SPC2
005666I  C860 002A                  LHI   R6,X'2A'      * AS A SEPERATOR
00566AI  D265 0035                  STB   R6,TD.PHN+10(R5)
00566EI  5820 4000 5934I            L     R2,TIETEMP
005674I  243B                       LIS   R3,11
005676I  4300 4000 5682I            B     WRT.IND1      STORE EXTENTION
         0000 567CI       WRT.SEPR  EQU   *
00567CI  4300 FDDC                  B     WRTWAREA      ***************************
         0000 5680I       WRT.IND   EQU   *
005680I  2430                       LIS   R3,0
005682I  D362 0000        WRT.IND1  LB    R6,0(R2)      PICK UP DIGIT
005686I  C560 0004                  CLHI  R6,X'04'
00568AI  4260 4000 56B6I            BL    WRT.IND2
005690I  C560 008C                  CLHI  R6,POUND
005694I  4330 4000 56B6I            BE    WRT.IND2
00569AI  C760 00B0                  XHI   R6,XMASK
00569EI  C560 003A                  CLHI  R6,XZERO
0056A2I  2133                       BNES  A.5A
0056A4I  C860 0030                  LHI   R6,X'30'
         0000 56A8I       A.5A      EQU   *
0056A8I  D265 4300 002B             STB   R6,TD.PHN(R5,R3)
0056AEI  2631                       AIS   R3,1
```

-continued

```
0056B0I  2621                  6474              AIS     R2,1
0056B2I  4300 FFCC             6475              B       WRT.IND1
0056B6I  2460                  6476  WRT.IND2    LIS     R6,0
0056B8I  D265 4300 002B        6477  WRT.IND3    STB     R6,TD.PHN(R5,R3)
0056BEI  2631                  6478              AIS     R3,1
0056C0I  C530 0014             6479              CLHI    R3,20
0056C4I  2036                  6480              BNES    WRT.IND3
0056C6I  4300 FFB6             6481              B       WRT.5P
                               6482  *
0056CCI                        6483              ALIGN   4
0056CCI  0008                  6484  TIMF        DB      0,8
0056D0I  0000 56D4I            6485              DCF     A(TIMEBFR)
0056D4I  0000 0000             6486  TIMEBFR     DC      0,0,0,0
0056D8I  0000 0000
0056DCI  0000 0000
0056E0I  0000 0000
```

```
         0000 56D4I            6487  TIME.HH     EQU     TIMEBFR
         0000 56DAI            6488  TIME.SS     EQU     TIMEBFR+6
         0000 56D7I            6489  TIME.M1     EQU     TIMEBFR+3
         0000 56D8I            6490  TIME.M2     EQU     TIMEBFR+4
0056E4I                        6491              ALIGN   4
0056E4I  0017                  6492  TIMEFUNC    DB      0,23
0056E6I  0000                  6493              DC      H'0'
0056E8I  1000 03E8             6494              DC      Y'10000000'+MS.COUNT
0056ECI                        6495              ALIGN   4
0056ECI  8008                  6496  TIMF1       DB      X'80',8
0056F0I  0000 56F4I            6497              DCF     A(SPT.TIME)
0056F4I  0000 0000             6498  SPT.TIME    DC      Y'0'
                               6499  *
0056F8I                        6500              ALIGN   4
                               6501  *
                               6502  *                  TEMPORARY WORKING STORAGE LOCATIONS
                               6503  *
                               6504  *
                               6505  *                  FULL WORD LOCATIONS
                               6506  *
0056F8I                        6507  QUESAVE     DSF     16
005738I                        6508  BACKREGS    DSF     16
005778I                        6509  $MESBUF     DSF     19              TTY BUFFER
0057C4I                        6510  MLOOP.RG    DSF     16              SAVE REGISTER AREA
005804I                        6511  SAVEHIGH    DSF     5
005818I                        6512  PARTSAVE    DSF     4
005828I                        6513  COMMSAVE    DSF     16
005868I  7E00 4700             6514  MAIN.TSW    DC      Y'7E004700'
00586CI  0000 064EI            6515              DC      A(MAINLOOP)
005870I  0000 0000             6516  TANDEM      DCY     0,0,0
005874I  0000 0000
005878I  0000 0000
00587CI  0000 0000             6517  SEAR.T1     DCY     0
005880I  8000 0000             6518  BIT.31      DC      BIT32
005884I  0000 0000             6519  MAGT1       DCY     0
005888I  0000 0000             6520  DUEL1       DCY     0
00588CI  0000 0000             6521  MAGT2       DCY     0
005890I  0000 0000             6522  NBR.DISC    DCY     0
005894I  0000 0000             6523  NBR.CALL    DCY     0
005898I  0000 0000             6524  TTYTMP.1    DCY     0
00589CI  0000 0000             6525  TTYTMP.2    DCY     0
0058A0I  0000 0000             6526  CHK.TMP1    DCY     0
0058A4I  0000 0000             6527  NBR.CQS     DCY     0
0058A8I  0000 0000             6528  CHK.TMP2    DCY     0
0058ACI  0000 0000             6529  CHK.TMP3    DCY     0
0058B0I  0000 0000             6530  COMDATA     DCY     0
0058B4I  0000 0000             6531  OUTADR      DCY     0
0058B8I  0000 0000             6532  OKACCT      DC      Y'0'
0058BCI  0000 0000             6533  QUEUF1      DCY     0
0058C0I  0000 0000             6534  MAGCUR      DC      Y'0'            CURRENT MAGTAPE BUFFER POSITION
0058C4I  0000 0000             6535  MAGSVC      DC      Y'0'            MAG TAPE SVC ADDRESS
0058C8I  0000 0000             6536  WRTEMP      DC      Y'0'            CURRENT BUFFER ADDRESS FOR MAGTAPE WRIT
0058CCI  0000 0000             6537  LINEADR     DC      Y'0'            LINE TABLE ADDRESS
0058D0I  0000 0000             6538  DTEMP.1     DC      Y'0'            TEMP LOCATIONS
0058D4I  0000 0000             6539  DTEMP.2     DC      Y'0'            TEMP LOCATIONS
0058D8I  0000 0000             6540  GTEMP.1     DCY     0
```

```
0058DCI  0000 0000             6541  SVCBLK      DC      Y'0'            ADDRESS OF SVC BLOCK
0058E0I  0000 0000             6542  QUEUF2      DCY     0               2ND WORD OF CALLBACK QUEUE ENTRY
0058E4I  0000 0000             6543  LINE1       DCY     0
0058E8I  0000 0000             6544  CUSTABLE    DC      Y'0'            CUSTOMER TABLE ADDRESS
0058ECI  0000 0000             6545  QUEUE       DC      Y'0'            ADDRESS OF QUEUE ENTRY
0058F0I  0000 0000             6546  PHONE       DC      Y'0'            ADDRESS OF PHONE NUMBER
0058F4I  0000 0000             6547  PARSECP     DCY     0
0058F8I  0000 0000             6548  SAVEADN     DCY     0
0058FCI  0000 0000             6549  SAVE10      DCY     0
005900I  0000 0000             6550  SAVE12      DCY     0
005904I  0000 0000             6551  SAVE15      DCY     0
005908I  0000 0000             6552  SAVER3      DCY     0
00590CI  0000 0000             6553  SAVER5      DCY     0
005910I  0000 0000             6554  SAVER7      DCY     0
005914I  0000 0000             6555  SAVER0      DCY     0
005918I  0000 0000             6556  SAVER8      DCY     0
00591CI  0000 0000             6557  SAVE14      DCY     0
005920I  0000 0000             6558  SAVER6      DCY     0
005924I  0000 0000             6559  SAVER9      DCY     0
```

-continued

```
005928I  0000 0000        6560  SAVE3     DCY   0
00592CI  0000 0000        6561  PUTSAV4   DCY   0
005930I  0000 0000        6562  TTYSAV3   DCY   0
005934I  0000 0000        6563  TIETEMP   DCY   0
005938I  0000 0000        6564  PSAVE5    DCY   0
00593CI  0000 0000        6565  PSAVE9    DCY   0
005940I  0000 0000        6566  PSAVE13   DCY   0
005944I  0000 0000        6567  FAKETIE   DCY   0
005948I  0000 0000        6568  CALLOUR   DCY   0
00594CI  0000 0000        6569  CAMPSAVE  DCY   0
005950I  0000 003C        6570  CNT.INT   DC    INT.CNT
005954I  0000 0000        6571  COUNTS    DCY   0
005958I  0000 0000        6572  LAST.TME  DCY   0
00595CI  0000 0000        6573  PEAK.TM   DC    0
005960I  0000 0E10        6574            DC    3600       1  AM
005964I  0000 1C20        6575            DC    7200       2  AM
005968I  0000 2A30        6576            DC    10800      3  AM
00596CI  0000 3840        6577            DC    14400      4  AM
005970I  0000 4650        6578            DC    18000      5  AM
005974I  0000 5460        6579            DC    21600      6  AM
005978I  0000 6270        6580            DC    25200      7  AM
00597CI  0000 7080        6581            DC    28800      8  AM
005980I  0000 7E90        6582            DC    32400      9  AM
005984I  0000 8CA0        6583            DC    36000      10  AM
005988I  0000 9AB0        6584            DC    39600      11  AM
00598CI  0000 A8C0        6585            DC    43200      12  NOON
005990I  0000 B6D0        6586            DC    46800      1  PM
005994I  0000 C4E0        6587            DC    50400      2  PM
005998I  0000 D2F0        6588            DC    54000      3  PM
00599CI  0000 E100        6589            DC    57600      4  PM
0059A0I  0000 EF10        6590  DIVER.TA  DC    61200      5:00 PM
0059A4I  0000 FD20        6591  DIVER.TB  DC    64800      6:00 PM
0059A8I  0001 0B30        6592  DIVER.TC  DC    68400      7:00 PM
0059ACI  0001 1940        6593  DIVER.TD  DC    72000      8:00 PM
0059B0I  0001 2750        6594  DIVER.TE  DC    75600      9:00 PM
0059B4I  0001 3560        6595            DC    79200      10  PM
0059B8I  0001 4370        6596            DC    82800      11  PM
```

```
0059BCI  0001 5180        6597  MIDNIGHT  DC    86400      12:00  MIDNIGHT,24  HRS,ELAPSED TIME
0059C0I  0000 270F        6598  MAX.TIME  DC    9999       2.6 HRS
                          6599  *
                          6600  *
         0000 59C4I       6601  P.TABLE   EQU   *
0059C4I  0100 4230I       6602            DC    Y'01000000'+A(P.OFFHK) NULL CHAR.,OFF HOOK CONDITION
0059C8I  0300 4258I       6603            DC    Y'03000000'+A(P.OFFHK2)ETX. OFF HOOK
0059CCI  8A00 4310I       6604            DC    Y'8A000000'+A(P.ASTER) * -SYSTEM CMD OR DIALED NUMBER
0059D0I  4200 4384I       6605            DC    Y'42000000'+A(P.CAMPB)
0059D4I  8C00 4376I       6606            DC    Y'8C000000'+A(P.POUND) NUMBER-SPECIAL ACCT. NUMBER
0059D8I  4600 437CI       6607            DC    Y'46000000'+A(P.CAMPON)F -CAMPON
0059DCI  4E00 43A8I       6608            DC    Y'4E000000'+A(P.TERMN)  N -NO ANSWER
0059E0I  4400 43B4I       6609            DC    Y'44000000'+A(P.TERMD) D -CALL TERMINATED WHILE DIALING
0059E4I  4F00 43C0I       6610            DC    Y'4F000000'+A(P.TERMO) O -CALLED PARTY BUSY,OR OUTPUT B
0059E8I  4300 430AI       6611            DC    Y'43000000'+A(P.TERMC) C -CALL CONNECTED OR TERMINATED
0059ECI  4900 446CI       6612            DC    Y'49000000'+A(P.FAILI) I -NO RESPONSE INPUT LINE
0059F0I  4500 4464I       6613            DC    Y'45000000'+A(P.FAILE)
         0000 000C        6614  NENTRIES  EQU   12
         0000 59F4I       6615  LUTABL    EQU   *                     LOGICAL UNIT TABLE
0059F4I  0000 0ACAI       6616            DC    A(QUE.TTY)            LU 1
0059F8I  0000 08F0I       6617            DC    A(QUE.MAG)            LU 1
0059FCI  0000 08F0I       6618            DC    A(QUE.MAG)            LU 2
005A00I  0000 0A2EI       6619            DC    A(QUE.DISC)           LU 3
005A04I  0000 0ACAI       6620            DC    A(QUE.TTY)            LU  4
005A08I  0000 0AC4I       6621            DC    A(QUE.CRT)            LU 5
005A0CI  0000 0ACAI       6622            DC    A(QUE.TTY)            LU 6
005A10I  0000 0A2EI       6623            DC    A(QUE.DISC)           LU 7
005A14I  0000 0A2EI       6624            DC    A(QUE.DISC)           LU 8
005A18I  0000 0A2EI       6625            DC    A(QUE.DISC)           LU 9
         0000 5A1CI       6626  COM.JUMP  EQU   *
005A1CI  0000 217EI       6627            DC    A(MODE0)
005A20I  0000 231CI       6628            DC    A(MODE1)
005A24I  0000 2424I       6629            DC    A(MODE2)
005A28I  0000 2282I       6630            DC    A(MODEE)
005A2CI  0000 2282I       6631            DC    A(MODEE)
005A30I  0000 28F2I       6632            DC    A(MODE5)
005A34I  0000 2E8EI       6633            DC    A(MODE6)
005A38I  0000 320FI       6634            DC    A(MODE7)
005A3CI  0000 307EI       6635            DC    A(MODE8.)             8
005A40I  0000 3348I       6636            DC    A(MODE9)              9
005A44I  0000 2282I       6637            DC    A(MODEE)              10
005A48I  0000 2282I       6638            DC    A(MODEE)              111
005A4CI  0000 33FAI       6639            DC    A(MODE12)             12
005A50I  0000 37F4I       6640            DC    A(MODE13)             13   RACE CONDITION
005A54I  0000 380CI       6641            DC    A(MODE14)             14  TANDEM TIE LINE
                          6642  *               PROGRAM RESIDENT QUEUES
                          6643  *
005A58I  0054 0000 0000 0000  6644  DUMPLIST  DLIST  H'84'
005BB0I  0023 0000 0000 0000  6645  QUELIST   DLIST  N.LINES+N.FAULTS+N.IOS QUEUE TRAP LIST
005C44I  001F 0000 0000 0000  6646  TTYSTK    DLIST  N.TTYB          TTY WORK STACK
005CC4I  0003 0000 0000 0000  6647  MAGSTK    DLIST  N.TAPES         MAG TAPE WORK STACK
005CD8I  0019 0000 0000 0000  6648  DISCLIST  DLIST  N.DISCB         DISC I/O COMPLETION LIST
005D44I  0019 0000 0000 0000  6649  DISCSTK   DLIST  N.DISCB         DISC I/O WORK TO BE DONE LIST
005DB0I  0003 0000 0000 0000  6650  SVC.MAG   DLIST  N.TAPES         MAG TAPE BUFFER POOL
005DC4I  0018 0000 0000 0000  6651  COMMLIST  DLIST  N.LINES+4
005E2CI  000A 0000 0000 0000  6652  SVC6LIST  DLIST  10
```

```
                           *
                           *                          HALF WORD LOCATIONS
                           *
005E5CI  0000              LOSTCNT   DCX     0                    TTY LOST MESSAGE COUNT
005E5EI  0000              GOODMAG   DCX     0
005E60I  0000              TIMER.MC  DCX     0                    LOOP TIME MAX LOOP COUNT
005E62I  FFFF              TIMER.SW  DCX     -1                   LOOP TIMER SWITCH
005E64I                              ALIGN   4
         0000 5E64I        ADN       EQU     *
005E64I  02                ADN.TYP   DB      2                    ADN UPDATE RECORD
005E65I  00                ADN.IN    DB      0                    INPUT LINE
005E66I  0000              ADN.PORT  DCX     0                    LOGICAL PORT
005E68I  0000              ADN.DMN   DCX     0,0
005E6AI  0000
005E6CI                    ADN.ACT   DS      L.ACT
005E74I                    ADN.SACT  DS      L.SACT
005E7CI  00                ADN.IND   DB      0
005E7DI  0000              ADN.REF   DB      0,0
005E7FI  00000000          ADN.PHN   DB      0,0,0,0,0
         00
005E84I  00000000                    DB      0,0,0,0,0
         00
005E89I  0000                        DB      0,0
005E8BI  00000000                    DB      0,0,0,0,0,0
         0000
005E91I  00000000                    DB      0,0,0,0
005E98I                              ALIGN   4
         0000 5E98I        ATB.MESG  EQU     *
005E98I  04                ATB.TYPE  DB      4                    ATB FILE NUMBER
005E99I  00                ATB.INLN  DB      0
005E9AI  0000              ATB.PORT  DCX     0
005E9CI  00                ATB.BSER  DB      0
005E9DI  00000000          ATB.DATE  DB      0,0,0,0,0
         00
005EA2I  00000000          ATB.PHN   DB      0,0,0,0,0,0
         0000
005EAAI  00000000                    DB      0,0,0,0
005EACI  00000000                    DB      0,0,0,0,0,0,0,0,0,0
         00000000
         0000
005EB6I  00000000          ATB.TIME  DB      0,0,0,0,0,0,0,0
         00000000
005EBEI  0505              EOFHF     DC      X'0505',X'0505'      EOF INDICATOR
005EC0I  0505
005EC4I                              ALIGN   4
         0000 5EC4I        CB        EQU     *
005EC4I  03                          DB      3
005EC5I  00                CBDISP    DB      0
005EC6I  0000              CBPORT    DCX     0
005EC8I  0000 0000                   DCY     0,0,0,0,0
005ECCI  0000 0000
005ED0I  0000 0000
005ED4I  0000 0000
005ED8I  0000 0000
         0000 5EC9I        CBBILL    EQU     CBPORT+3
         0000 5ECAI        CBACCT    EQU     CBPORT+4
```

```
         0000 5EC8I        CBTYPE    EQU     CBPORT+2
005EDCI  0000 0000         CBPMN     DCY     0
         0000 5EDBI        CBSYST    EQU     CBPMN-1
         0000 5EE0I        CBDUR     EQU     *
005EE0I  0000 0000                   DCY     0
005EE4I  0000 0000         CBSTIME   DCY     0
005EE8I  0000 0000                   DCY     0
005EECI  0000 0000         CBDATE    DCY     0,0
005EF0I  0000 0000
005EF4I  0000              LOSTLINE  DCX     0
005EF6I  0000              CALL.COD  DCX     0                    TIELINE CALLBACK CODE
005EF8I  0000              TESTL1    DC      H'13'                PORT NUMBER FOR ARC TEST LINE 1
005EFAI  0010              TESTL2    DC      H'16'                PORT NUMBER FOR ARC TEST LINE 2
005EFCI  0000              REGISTER  DCX     0                    REGISTER NUMBER
005EFEI  0000              REGOUT    DCX     0                    REGISTER NUMBER TO BE CHANGED
005F00I  0000              REGLINE   DCX     0                    PORT NUMBER WITH REGISTER
005F02I  0000              CBF7.10   DCX     0
005F04I  0000              REALADN   DCX     0
005F06I  0000              TYSAT     DCX     0
005F08I  0000              ERCNT.MG  DCX     0
005F0AI  0000              BEEPFLG   DCX     0
005F0CI  0000              LINETONE  DCX     0
005F0EI  0000              BZCOUNT   DCX     0
005F10I  0000              REGFLAG   DCX     0
005F12I  0003              BLEEPCNT  DCX     3
005F14I  0000              TLINENBR  DCX     0
005F16I  0000              COMMPRNT  DCX     0
005F18I  0000              PACCT     DCX     0
005F1AI  0000              SVC14FG   DCX     0
005F1CI  0000              SAVEIN    DCX     0
005F1EI  444F              DO        DC      C'DO'
005F20I  4449              DI        DC      C'DI'
005F22I  0003              THREE     DCX     3
005F24I  0009              NINE      DCX     9
005F26I  0000              BIGQ      DCX     0
005F28I  0000              BUFNO     DCX     0                    MAG TAPE BLOCKING POSITION
005F2AI  0000              PROCFLG   DCX     0
005F2CI  0000              PORTNUMR  DCX     0                    USER PORT NUMBER(LOGICAL UNIT)
005F2EI  0000              LINENUMR  DCX     0                    USER INPUT LINE NUMBER
```

-continued

```
005F30I  0000            6733  OUTLINE  DCX   0            USER OUTPUT LINE NUMBER
005F32I  0000            6734  SAVEOUT  DCX   0
005F34I  0000            6735  AREACD   DCX   0            ASCII AREA CODE
005F36I  0000            6736  MEASURED DCX   0            MEASURED WATS FLAG
005F38I  0009            6737  ENTRY.1  DCX   9
005F3AI  0000            6738  AREACD1  DCX   0            ASCII AREA CODE
005F3CI  0000            6739  ARCDNEED DCX   0            WATTS BAND NEEDED FOR AREA CODE
005F3EI  011C            6740  BUFLN    DC    H'284'       LENGTH OF DISC BUFFER POOL BLOCK
005F40I  0000            6741  PCKARCD  DCX   0            PACKED AREA CODE
005F42I  0000            6742  LDFG     DCX   0            LOCAL LINE FLAG
005F44I  0018            6743  IOLIN.LN DC    H'24'        LENGTH OF I/O LINE TABLE
         0000 5F44I      6744  IOLN.LN  EQU   IOLIN.LN
005F46I  0000            6745  LINE     DCX   0
005F48I  0000            6746  WORKCNT  DCX   0
005F4AI  0000            6747  IDLF     DCX   0
005F4CI  0000            6748  PCKEXCH  DCX   0
005F4EI  0000            6749  SHIFT    DCX   0
```

```
005F50I  0000            6750  WORD     DCX   0
005F52I  0000            6751  EXCODE   DCX   0
005F54I  0000            6752  EXSUB    DCX   0
005F56I  0000            6753  IND      DCX   0            INTERNATIONAL DIALING FLAG
005F58I  0000            6754  EXCLASS  DCX   0
005F5AI  0000            6755  CBFLAG   DCX   0
005F5CI  0000            6756  LINESUB  DCX   0
005F5EI  0000            6757  CALLCODE DCX   0
005F60I  0000            6758  LINENEED DCX   0
005F62I  0000            6759  MARFLAG  DCX   0
005F64I  0100            6760  BUFLN1   DC    H'256'
005F66I  002C            6761  BUFLN2   DC    H'44'        LENGTH OF MAG TAPE RECPRD IN HALF WORDS
005F68I  0020            6762  LOOP     DCX   20
005F6AI  0014            6763  FUDGE    DC    H'20'
         0000 5F44I      6764  TABLNGTH EQU   IOLIN.LN
005F6CI  000A            6765  D.10     DC    H'10'
005F6EI  0019            6766  D.25     DC    H'25'
005F70I  0000            6767  MAGREWND DCX   0
005F72I  0000            6768  MSGCNT   DCX   0
005F74I  0000            6769  NAKCOUNT DCX   0
005F76I  0000            6770  ADNIND   DCX   0
005F78I  000A            6771  TEN      DC    H'10'
005F7AI  0020            6772  N.32     DC    H'32'
005F7CI  005C            6773  LTTY.BLK DC    H'92'
005F7EI  00FF            6774  D.256    DC    H'255'
005F80I  2710            6775  DIVTABL  DC    H'10000'
005F82I  03E8            6776           DC    H'1000'
005F84I  0064            6777           DC    H'100'
005F86I  000A            6778           DC    H'10'
005F88I  0001            6779           DC    H'1'
005F8AI  003C            6780  $60      DC    H'60'
         0000 5F8CI      6781  LOCK     EQU   *
005F8CI  8180            6782           DCX   8180
005F8EI  8280            6783           DCX   8280
005F90I  8480            6784           DCX   8480
005F92I  8880            6785           DCX   8880
005F94I  8081            6786           DCX   8081
005F96I  8082            6787           DCX   8082
005F98I  8084            6788           DCX   8084
005F9AI  8088            6789           DCX   8088
         0000 5F9CI      6790  UNLOCK   EQU   *
005F9CI  8E8F            6791           DCX   8E8F
005F9EI  8D8F            6792           DCX   8D8F
005FA0I  8B8F            6793           DCX   8B8F
005FA2I  878F            6794           DCX   878F
005FA4I  8F8E            6795           DCX   8F8E
005FA6I  8F8D            6796           DCX   8F8D
005FA8I  8F8B            6797           DCX   8F8B
005FAAI  8F87            6798           DCX   8F87
         0000 5FACI      6799  TDXCOST  EQU   *
005FACI  0011            6800           DC    H'17'        INTRASTATE
005FAEI  0014            6801           DC    H'20'        FX
005FB0I  0015            6802           DC    H'21'        WB 1
005FB2I  0017            6803           DC    H'23'        WB 2
005FB4I  001B            6804           DC    H'27'        WB  3
005FB6I  001C            6805           DC    H'28'        WB  4
```

```
005FB8I  001C            6806           DC    H'28'        WB  5
005FBAI  0050            6807           DC    H'80'
005FBCI  0069            6808           DC    H'105'
005FBEI  0000            6809           DC    H'0'
005FC0I  0014            6810           DC    H'20'        TIE LINE
005FC2I  0019            6811           DC    H'25'        MEASURED WATS
005FC4I  0069            6812           DC    H'105'       INTERNATIONAL
005FC6I  0012            6813           DC    H'18'        MCI
         0000 5FC8I      6814  MTSCOST  EQU   *
005FC8I  0015            6815           DC    H'21'        INTRA
005FCAI  001F            6816           DC    H'31'        FX
005FCCI  0022            6817           DC    H'34'        WB 1
005FCEI  0024            6818           DC    H'36'        WB  2
005FD0I  0025            6819           DC    H'37'        WB  3
005FD2I  0027            6820           DC    H'39'        WB  4
005FD4I  0029            6821           DC    H'41'        WB  5
005FD6I  005F            6822           DC    H'95'
```

-continued

```
TDX SYSTEM MAIN CONTROL PROGRAM                                PAGE 124   16:07:05  01/27/77

005FD8I  0070             6823            DC      H'125'
005FDAI  0000             6824            DC      H'0'
005FDCI  001F             6825            DC      H'31'          TIEL LINE
005FDEI  0025             6826            DC      H'37'          MEASURED WATS
005FE0I  0069             6827            DC      H'105'         INTERNATIONAL
005FE2I  0029             6828            DC      H'41'          MCI
005FE4I  35313232         6829   DATE     DC      C'51226'
         3620
                          6830   *
                          6831   *
                          6832   *                BYTE LOCATIONS
                          6833   *
005FEAI  00               6834   TTYFREE  DB      0              TTY BUSY FLAG
005FEBI  00               6835   M1.ASGN  DB      0              0=ASSIGNED,F=NOT ASSIGNED
005FECI  00               6836   M2.ASGN  DB      0
005FEDI  00               6837   MAGFREE  DB      0              MAG TAPE BUSY FLAG
005FEEI  00               6838   DISCFREE DB      0              DISC BUSY FLAG
005FEFI  02               6839   C.STX    DB      02             STX CHARACTER
005FF0I  15               6840   C.NAK    DB      X'15'          NAK CHARACTER
005FF1I  03               6841   C.ETX    DB      03             ETX CHARACTER
005FF2I  31               6842   SYSNUMBR DB      C'1'           SYSTEM NUMBER
005FF3I  00               6843   ASERV    DB      0              ACTUAL SERVICE CODE
005FF4I  00               6844   BSERV    DB      0              BILLABLE SERVICE CODE
005FF5I  00               6845   OPTIONS  DB      0              OPTIONS CODE
005FF6I  00               6846   DIVER    DB      0              DIVERSION CODE
005FF7I  35               6847   WRTFUNC  DB      X'35'          FUNCTION CODE FOR WRITE
005FF8I  08               6848   WRKSPLU  DB      TMPWORK        TEMP WORKSPACE LOGICAL UNIT
005FF9I  07               6849   ADNLU    DB      ADNFILE        ADN FILE LOGICAL UNIT
005FFAI  55               6850   READFN   DB      X'55'          READ FUNCTION CODE
005FFBI  00               6851   TTYLU    DB      0
005FFCI  00               6852   TTYLU.R  DB      0
005FFDI  04               6853   PRNT.LU  DB      4
005FFEI  09               6854   CMPLU    DB      CALLFILE       CALL BACK FILE LOGICAL UNIT
005FFFI  00               6855   ADNFUNC  DB      0              TYPE OF ADN FUNCTION
006000I  01               6856   C.MAGLU  DB      1
006001I  02               6857   N.MAGLU  DB      2
                          6858   *
                          6859   *
006004I                   6860            ALIGN   4

TDX SYSTEM MAIN CONTROL PROGRAM                                PAGE 125   16:07:16  01/27/77

006004I  0000 001A        6861   M.ASER   DC      M1L
006008I  4C4F4749         6862            DC      C'LOGICAL UNIT ASSIGN ERROR'
         43414C20
         554E4954
         20415353
         49474E20
         4552524F
         5220
         0000 001A        6863   M1L      EQU     *-M.ASER-4
                          6864   *
006022I  0000 0022        6865   M.INITE  DC      M2L
006026I  54445820         6866            DC      C'TDX SYSTEM INITIALIZATION COMPLETE'
         53595354
         454D2049
         4E495449
         414C495A
         4154494F
         4E20434F
         4D504C45
         5445
         0000 0022        6867   M2L      EQU     *-M.INITE-4
                          6868   *
006048I  0000 002C        6869   M.15ASER DC      M3L
00604CI  4552524F         6870            DC      C'ERROR ASSIGNING COMMUNICATIONS LOGICAL UNIT'
         52204153
         5349474E
         494E4720
         434F4D4D
         554E4943
         4154494F
         4E53204C
         4F474943
         414C2055
         4E495420
         0000 002C        6871   M3L      EQU     *-M.15ASER-4
                          6872   *
006078I  0000 001A        6873   M.SYSER  DC      M4L
00607CI  51554555         6874            DC      C'QUEUE TRAP SYSTEMS ERROR'
         45205452
         41502053
         59535445
         4D532045
         52524F52
006094I  0707             6875            DC      X'0707'
         0000 001A        6876   M4L      EQU     *-M.SYSER-4
                          6877   *
006096I  0000 002F        6878   M.DISER  DC      M5L
00609AI  44495343         6879            DC      C'DISC ERR'
         20455252
0060A2I  20               6880            DB      X'20'
0060A3I  00               6881   D.ERCD1  DB      0
0060A4I  00               6882   D.ERCD2  DB      0
0060A5I  20               6883            DB      X'20'
0060A6I  2C464320         6884            DC      C',FC '
0060AAI  00               6885   M.DERF1  DB      0
0060ABI  00               6886   M.DERF2  DB      0
```

```
0060ACI  2C4C5520          6887            DC     C',LU '
0060B0I  00                6888  M.DFRL1   DB     0
0060B1I  00                6889  M.DFRL2   DB     0
0060B2I  2C4C494E          6890            DC     C',LINE '
         4520
0060BAI  00                6891  M.DFRLN1  DB     0
0060B9I  00                6892  M.DFRLN2  DB     0
0060BAI  2C534543          6893            DC     C',SECTOR '
         544F5220
0060C2I  30303030          6894  SECTOR    DC     C'0000'
0060C6I  0707              6895            DC     X'0707'
         0000 002E         6896  M5L       EQU    *-M.DISER-4
                           6897  *
0060C8I  0000 0020         6898  MSG.LOOP  DC     M6L
0060CCI  4D415849          6899            DC     C'MAXIMUM LOOP COUNTER EXCEEDED'
         4D554D20
         4C4F4F50
         20434F55
         4E544552
         20455843
         45454445
         4420
0060EAI  0707              6900            DC     X'0707'
         0000 0020         6901  M6L       EQU    *-MSG.LOOP-4
                           6902  *
0060ECI  0000 0024         6903  M.PRSYSE  DC     M7L
0060F0I  44495343          6904            DC     C'DISC PROCESSOR UNDEFINED STATE FOUND'
         2050524F
         43455353
         4F522055
         4E444546
         494E4544
         20535441
         54452046
         4F554E44
         0000 0024         6905  M7L       EQU    *-M.PRSYSE-4
                           6906  *
006114I  0000 0020         6907  M.NOINIT  DC     M8L
006118I  4E4F4E20          6908            DC     C'NON INITIALIZED LINE BEING USED'
         494E4954
         49414C49
         5A454420
         4C494E45
         20424549
         4E472055
         53454420
         0000 0020         6909  M8L       EQU    *-M.NOINIT-4
                           6910  *
006138I  0000 0026         6911  ILL.MFSG  DC     M9L
00613CI  494C4C2E          6912            DC     C'ILL. ACCT., LU  '
         20414343
         542F2C20
         4C552020
00614CI  20202020          6913  LNUMBR    DC     C'    '
006150I  2C414343          6914            DC     C',ACCOUNT'
         4F554E54
```

```
006158I  2020              6915            DC     C'  '
00615AI  20202020          6916  ADR.ACT   DC     C'    '
00615EI  20202020          6917            DC     C'    '
         0000 0026         6918  M9L       EQU    *-ILL.MFSG-4
                           6919  *
006162I  0000 0022         6920  M.NOCBKD  DC     M10L
006166I  52414E20          6921            DC     C'RAN OUR OF CALL BACK DISC SPACE'
         4F555220
         4F462043
         414C4C20
         4241434B
         20444953
         43205350
         41434520
006186I  0707              6922            DC     X'0707'
                           6923  *
         0000 0022         6924  M10L      EQU    *-M.NOCBKD-4
006188I  0000 001F         6925  M.NOCBUF  DC     M11L
00618CI  52414E20          6926            DC     C'RAN OUT OF TEMP CORE BUFFERS'
         4F555420
         4F462054
         454D5020
         434F5245
         20425546
         46455253
0061A8I  0707              6927            DC     X'0707'
         0000 001E         6928  M11L      EQU    *-M.NOCBUF-4
                           6929  *
0061AAI  0000 0020         6930  M.NODISC  DC     M12L
0061AEI  4E4F204D          6931            DC     C'NO MORE DISC BUFFERS AVAILABLE'
         4F524520
         44495343
         20425546
         46455253
         20415641
         494C4142
         4C45
0061CCI  0707              6932            DC     X'0707'
         0000 0020         6933  M12L      EQU    *-M.NODISC-4
0061CEI  0000 001A         6934  M.MAGER   DC     M13L
```

```
0061D2I  4D414720        6935            DC     C'MAG TAPE ERROR'
         54415045
         20455252
         4F52
0061E0I  204F4E20        6936            DC     C' ON LU '
         4C552020
0061E8I  00              6937  M.MAGLU   DB     0
0061EAI  0707            6938            DC     X'0707'
         0000 001A       6939  M13L      EQU    *-M.MAGER-4
0061ECI  0000 001A       6940  M.COMER   DC     M14L
0061F0I  434F4D4D        6941            DC     C'COMM ERROR  '
         20455252
         4F522020
0061FCI  00              6942  ER.1      DB     0
0061FDI  00              6943  ER.2      DB     0
0061FEI  2C4F4E20        6944            DC     C',ON LU  '
```

```
         4C552020
006206I  00              6945  LN.1      DB     0
006207I  00              6946  LN.2      DB     0
006208I  2020            6947            DC     C'  '
         0000 001A       6948  M14L      EQU    *-M.COMER-4
00620AI  0000 001A       6949  M.COMBAK  DC     M15L
00620EI  4C552020        6950            DC     C'LU  '
006212I  00              6951  LNB.1     DB     0
006213I  00              6952  LNB.2     DB     0
006214I  20204241        6953            DC     C'  BACK IN SERVICE'
         434B2049
         4E205345
         52564943
         4520
         0000 0018       6954  M15L      EQU    *-M.COMBAK-4
006226I  0000 0020       6955  M.BADLNE  DC     M16L
00622AI  4C552020        6956            DC     C'LU  '
00622EI  00              6957  BLN.1     DB     0
00622FI  00              6958  BLN.2     DB     0
006230I  2C4C494E        6959            DC     C',LINE NUMBER OUT OF RANGE'
         45204E55
         4D424552
         204F5554
         204F4620
         52414E47
         4520
         0000 0020       6960  M16L      EQU    *-M.BADLNE-4
00624AI  0000 0034       6961  M.MAGTAP  DC     M17L
00624EI  52572040        6962            DC     C'RW MAG TAPE LU '
         41472054
         41504520
         4C552020
00625EI  3020            6963  MAGLU     DB     C'0 '
006260I  2C4D4F55        6964            DC     C',MOUNT A NEW TAPE AND RE-ASSIGN LU'
         4E542041
         204E4557
         20544150
         4520414E
         44205245
         20415353
         49474E20
         4C55
         0000 0034       6965  M17L      EQU    *-M.MAGTAP-4
006284I                  6966            ALIGN  4
006284I  0000 0038       6967  M.TPHDER  DC     M.TAPL
006288I  54415045        6968            DC     C'TAPE ERROR WRITING HEADER,WILL CONTINUE ON CURRENT TAPE'
         20455252
         4F522057
         52495449
         4E472048
         45414445
         522C5749
         4C4C2043
         4F4E5449
         4E554520
         4F4E2043
```

```
         55525245
         4E542054
         41504520
         0000 0038       6969  M.TAPL    EQU    *-M.TPHDER-4
0062C0I  .               6970            ALIGN  4
0062C0I  0000 0024       6971  M.LOSTBF  DC     M.LOSTL
0062C4I  54415045        6972            DC     C'TAPE BUFFER LOST DUE TO TAPE ERRORS'
         20425546
         46455220
         4C4F5354
         20445545
         20544F20
         54415045
         20455252
         4F525320
         0000 0024       6973  M.LOSTL   EQU    *-M.LOSTBF-4
0062E8I                  6974            ALIGN  4
0062E8I  0000 0029       6975  M.NOMAG   DC     M18L
0062ECI  54415045        6976            DC     C'TAPE NOT ASSIGNED OR UNAVAILABLE ON LU '
```

```
          204E4F54
          20415353
          49474E45
          44204F52
          20554E41
          5641494C
          41424C45
          204F4E20
          4C552020
006314I   32             6977  L.MAGLU   DB     C'2'
          0000 0029      6978  M19L      EQU    *-M.NOMAG-4
006316I   0000 002C      6979  BADLINF   DC     M19L
00631AI   204C5520       6980            DC     C' LU '
00631EI   00             6981  BL.3      DB     0
00631FI   00             6982  BL.4      DB     0
006320I   2C204F50       6983            DC     C', OP ON OUTPUT LINE '
          204F4E20
          4F555450
          5554204C
          494E4520
006334I   00             6984  BL.1      DB     0
006335I   00             6985  BL.2      DB     0
006336I   202C494E       6986            DC     C' ,INPUT LINE '
          50555420
          4C494E45
          2020
006344I   00             6987  BL.5      DB     0
006345I   00             6988  BL.6      DB     0
          0000 002C      6989  M19L      EQU    *-BADLINF-4
006346I   2C524547       6990            DC     C',REGISTER '
          49535445
          5220
006350I   00             6991  R.1       DB     0
006351I   00             6992  R.2       DB     0
          0000 0038      6993  M19L.A    EQU    *-BADLINE-4
006352I   0000 0025      6994  LINEOUT   DC     M20L
006356I   204C5520       6995            DC     C' LU '
```

```
00635AI   00             6996  LNOUT.3   DB     0
00635BI   00             6997  LNOUT.4   DB     0
00635CI   2C204F55       6998            DC     C', OUTPUT LINE '
          54505554
          204C494E
          4520
00636AI   00             6999  LNOUT.1   DB     0
00636BI   00             7000  LNOUT.2   DB     0
00636CI   204F5554       7001            DC     C' OUT OF SERVICE'
          204F4620
          53455256
          49434520
          0000 0026      7002  M20L      EQU    *-LINEOUT-4
00637CI                  7003            ALIGN  4
00637CI   0000 001E      7004  M.RESTRT  DC     M21L
006380I   52455354       7005            DC     C'RESTART RECEIVED ON LU '
          41525420
          52454345
          49564544
          204F4E20
          4C552020
006398I   00             7006  RST.1     DB     0
006399I   00             7007  RST.2     DB     0
00639AI   20202020       7008            DC     C'    '
          0000 001E      7009  M21L      EQU    *-M.RESTRT-4
00639EI   0000 001C      7010  BAD.INLE  DC     M22L
0063A2I   4C552020       7011            DC     C'LU  '
0063A6I   00             7012  BIL.1     DB     0
0063A7I   00             7013  BIL.2     DB     0
0063A8I   2C204950       7014            DC     C', IP ON INPUT LINE '
          204F4E20
          494E5055
          54204C49
          4E452020
0063BCI   00             7015  BIL.3     DB     0
0063BDI   00             7016  BIL.4     DB     0
          0000 001C      7017  M22L      EQU    *-BAD.INLE-4
0063BEI   2C524547       7018            DC     C',REGISTER '
          49535445
          5220
0063C8I   00             7019  R.3       DB     0
0063C9I   00             7020  R.4       DB     0
          0000 0028      7021  M22L.A    EQU    *-BAD.INLE-4
0063CCI                  7022            ALIGN  4
0063CCI   0000 001A      7023  FALSELB   DC     M23L
0063D0I   4C494E45       7024            DC     C'LINEBACKER UP ON GOOD LINE'
          4241434B
          45522055
          50204F4E
          20474F4F
          44204C49
          4E45
          0000 001A      7025  M23L      EQU    *-FALSELB-4
0063ECI                  7026            ALIGN  4
0063ECI   0000 0008      7027  DATERM1   DC     M24L
0063F0I   44492045       7028            DC     C'DI ER 1'
```

```
          52203120
          0000 0008          7029  M24L      EQU    *-DATERM1-4
0063F8I   0000 0008          7030  DATERM2   DC     M25L
0063FCI   44492045           7031            DC     C'DI ER 2'
          52203220
          0000 0008          7032  M25L      EQU    *-DATERM2-4
006404I   0000 0008          7033  DATERM3   DC     M26L
006408I   44492045           7034            DC     C'DI ER 3'
          52203320
          0000 0008          7035  M26L      EQU    *-DATERM3-4
006410I   0000 0008          7036  DATERM4   DC     M27L
006414I   44492045           7037            DC     C'DI ER 4'
          52203420
          0000 0008          7038  M27L      EQU    *-DATERM4-4
00641CI                      7039            ALIGN  4
00641CI   0000 000E          7040  COMMSG    DC     L.CMSG
006420I   3030               7041  CM        DC     C'00'
006422I   20303020           7042            DC     C' 00 00 00 00'
          30302030
          30203030
          0000 000E          7043  L.CMSG    EQU    *-COMMSG-4
          0000 6423I         7044  CN3       EQU    CM+3
          0000 6424I         7045  CN4       EQU    CM+4
          0000 6426I         7046  CN6       EQU    CM+6
          0000 6427I         7047  CN7       EQU    CM+7
          0000 6429I         7048  CN9       EQU    CM+9
          0000 642AI         7049  CN10      EQU    CM+10
          0000 642CI         7050  CN12      EQU    CM+12
          0000 642DI         7051  CN13      EQU    CM+13
006430I                      7052            ALIGN  4
006430I   0000 0022          7053  GEO.ERR   DC     L.GEOERR
006434I   47454F20           7054            DC     C'GEO REST..LU'
          52455354
          2E2C4C55
006440I   20202020           7055  GE.R1     DC     C'    '
006444I   2C414343           7056            DC     C',ACCOUNT  '
          4F554E54
          2020
00644EI   20202020           7057  GEO.ACCT  DC     C'        '
          20202020
          0000 0022          7058  L.GEOERR  EQU    *-GEO.ERR-4
          0000 6441I         7059  GEOLN1    EQU    GE.R1+1
          0000 6442I         7060  GEOLN2    EQU    GE.R1+2
                             7061  *
                             7062  *        CANNED MESSAGES TO SATELLITE
                             7063  *
006458I                      7064            ALIGN  4
006458I   0000 0000          7065  SVC14.TI  DCY    0
00645CI   0202 0600          7066  M.ACK     DC     Y'02020600'           02.STX.ACK
                             7067  *
006460I   0302 4300          7068  M.RETRY   DC     Y'03024300'           03.STX.C
                             7069  *
006464I   0302 4500          7070  M.ATR     DC     Y'03024500'           03.STX.E
006468I   0302 4700          7071  M.CMP     DC     Y'03024700'
                             7072  *
00646CI   0302 4100          7073  M.PACK    DC     Y'03024100'           03.STX.A
```

```
006470I   0302 4400          7074  M.RJHANG  DC     Y'03024400'           03.STX.D
006474I   0402 4800          7075  M.REG     DC     Y'04024800'
006478I   0000 0000          7076  M.REGA    DC     Y'0'
          0000 6477I         7077  M.REGF4   EQU    M.REG+3
          0000 6478I         7078  M.REGL4   EQU    M.REGA
                             7079  *
          0000 645CI         7080  M.ACTOK   EQU    M.ACK
00647CI   0202 1500          7081  M.NAK     DC     Y'02021500'           02.STX.NAK
          0000 7C00          7082  LOADPARM  EQU    Y'007C00'
006480I                      7083            ALIGN  4
006480I   0000 0030          7084  PRNTBUFR  DC     L.PRNT
006484I   30312F30           7085  PRNT.DAT  DC     C'01/02/76'
          322F3736
00648CI   2020               7086            DC     C'  '
00648EI   30303030           7087  PRNT.TM   DC     C'0000'
006492I   20303030           7088  PRNT.AC   DC     C' 00000000 '
          30303030
          3020
00649CI   20323133           7089  PRNT.PH   DC     C' 213-585-6310 '
          2D353835
          2D363331
          3020
0064AAI   3030302E           7090  PRNT.DR   DC     C'000.0 C$'
          30205F24
0064B2I   30302E30           7091  $TDX      DC     C'00.00)-('
          30502028
0064BAI   30302E30           7092  $MTS      DC     C'00.00)'
          3029
0064C0I   0A                 7093            DB     X'0A'
          0000 649DI         7094  PRNT.PHN  EQU    PRNT.PH+1
          0000 6493I         7095  PRNT.ACT  EQU    PRNT.AC+1
          0000 0030          7096  L.PRNT    EQU    *-PRNTBUFR-4
0064C4I                      7097            ALIGN  4
0064C4I   0009               7098  PRTDATE   DB     0,9
0064C8I   0000 6484I         7099            DCF    A(PRNT.DAT)
0064CCI                      7100            ALIGN  4
0064CCI   504F5745           7101  M.POWER   DC     C'POWER FAILURE'
          52204641
          494C5552
          4520
```

TDX SYSTEM MAIN CONTROL PROGRAM PAGE 132 16:08:22 01/27/77

-continued

```
00640CI                          7102            ALIGN  4
0064DCI   41524954               7103  M.ARITH   DC     C'ARITHMETIC FAULT'
          4840A554
          49432046
          41554C54
0064ECI                          7104            ALIGN  4
0064ECI   4D454D4F               7105  M.MEMORY  DC     C'MEMORY FAULT'
          52592046
          41554C54
0064F8I                          7106            ALIGN  4
0064F8I   494C4C45               7107  M.ILLGL   DC     C'ILLEGAL INSTRUCTION'
          47414C20
          494E5354
          52554354
          494F4E20
00650CI                          7108            ALIGN  4
```

TDX SYSTEM MAIN CONTROL PROGRAM PAGE 133 16:08:34 01/27/77

```
00650CI   4E4F204D               7109  M.NOTTY   DC     C'NO MORE TTY BUFFERS'
          4F524520
          54545920
          42554646
          45525320
006520I                          7110            ALIGN  4
006520I   0009                   7111  DATE.SVC  DB     0,9                 PICK UP CURRENT DATE
006524I   0000 6528I             7112            DCF    A(DATEBF)
006528I                          7113            ALIGN  4
006528I   0000 0000              7114  DATEBF    DCY    0,0
00652CI   0000 0000
006530I   43414E4E               7115  M.BADMG   DC     C'CANNOT WRITE HEADER TO MAG TAPE LU '
          4F542057
          52495445
          20484541
          44455220
          544F204D
          41472054
          41504520
          4C552020
006554I   00                     7116  LOGMAGL   DB     0
006556I   20202020               7117            DC     C'    '
00655CI                          7118            ALIGN  4
00655CI   4007                   7119  LOGPW     DB     X'40',7
00655EI   000D                   7120            DC     H'13'
006560I   0000 64CCI             7121            DC     A(M.POWER)
006564I                          7122            ALIGN  4
006564I   4007                   7123  LOGAR     DB     X'40',7
006566I   0010                   7124            DC     H'16'
006568I   0000 640CI             7125            DC     A(M.ARITH)
00656CI                          7126            ALIGN  4
00656CI   4007                   7127  LOGMM     DB     X'40',7
00656EI   000C                   7128            DC     H'12'
006570I   0000 64ECI             7129            DC     A(M.MEMORY)
006574I                          7130            ALIGN  4
006574I   4007                   7131  LOGTTYB   DB     X'40',7
006576I   0013                   7132            DC     H'19'
006578I   0000 650CI             7133            DC     A(M.NOTTY)
00657CI                          7134            ALIGN  4
00657CI   4007                   7135  LOGIL     DB     X'40',7
00657EI   0013                   7136            DC     H'19'
006580I   0000 64F8I             7137            DC     A(M.ILLGL)
006584I                          7138            ALIGN  4
006584I   4007                   7139  LOGMAG    DB     X'40',7
006586I   0025                   7140            DC     H'37'
006588I   0000 6530I             7141            DC     A(M.BADMG)
00658CI                          7142            ALIGN  4
00658CI   0001                   7143  PAUSE     DB     0,1
006590I                          7144            ALIGN  4
006590I   4007                   7145  LOGSE     DB     X'40',7
006592I   0014                   7146            DC     H'20'
006594I   0000 659AI             7147            DC     A(M.BUFER)
006598I   42554646               7148  M.BUFER   DC     C'BUFFER RESTORE ERROR'
          45522052
          45535544F
          52452045
```

TDX SYSTEM MAIN CONTROL PROGRAM PAGE 134 16:08:44 01/27/77

```
          52524F52
0065ACI                          7149            ALIGN  ADC
0065ACI                          7150  NOGUTS    DS     4
0065B0I                          7151            END
```

ANNEX "A" TO APPENDIX "B"

Remote Terminal Equipment Assembly

Microprocessor System

UP-607 Processor (1)
SI-609 Scanner/Interrupt (1)

Line Control Group

LT-610 Line Terminator (1 to 32)

Circuit Routing Matrix

RY-612 Matrix (2 to 10)
BD-611 Buffer Decoder (1)

Tone Transceiver Group

RS-618 Register/Sender (1 to 8)

Private and Switched Network Data Arrangement

DB-621 Dial Backup (1)
MM-620 Modem (2)

Progress Tone Generator Group

MO-619 Master Oscillator

APPENDIX B

```
                ;SOURCE:  WA TDXII2
                ;OBJECT:   WC TDXII2
                ;LISTING:  REGSR TDXII3
                ;DATE:       25 OCT, 1976
0000                    ORG 0700H
                ;MESSAGE BUFFERS
0700            MSG0: DS 32
0720            MSG1: DS 32
0740            MSG2: DS 32
0760            MSG3: DS 32
0780            MSG4: DS 32
07A0            MSG5: DS 32
07C0            MSG6: DS 32
07E0            MSG7: DS 32
0800                              ORG 0800H
                                          ;REGISTER SPACE
                                          ;REGISTER 0
                 REG0:
0800 00          DIGAD:   DB      0       ;DIGIT ADRESS
0801 00          INLIN:   DB      0       ;LINE NUMBER ASGD
0802 00          RSTAT:   DB      0       ;REGISTER STATUS
                          ;STATUS FLAG BITS -CALL UP CALL PROC
                          ;BIT 0- 01H DIALING COMPLETE
                          ;BIT 1-02H LINE ON HOOK
                          ;BIT 2- 04H MESSAGE RECEIVED IN BUFFER
                          ;BIT 3- 08H OUTDIALING COMPLETE
                          ;BIT 4- 10H MATRIX SWITCHING DONE
                          ;BIT 5-20H RECALL TIMER DONE
                          ;BIT 6- 40H STAR TONES RECEIVED
                          ;BIT 7- 80H QUEUE UP MESSAGE
0803 00          MXDIG:   DB      0       ;MAX NR OF DIGITS EXPECTED
0804 00          REGST:   DB      0       ;REGISTER SENDER STATE
0805 00          MATR:    DB      0       ;MATRIX CONTROL WORD
0806 00          REGTM:   DB      0       ;REGISTER TIMER
0807 00          GENTM:   DB      0       ;GENERAL TIMER
0808             DIGIT:   DS      23      ;
081F 00          ROLDST:  DB      0       ;REGISTER OLD STATUS
0820             REG1:    DS      20H
0840             REG2:    DS      20H
0860             REG3:    DS      20H
0880             REG4:    DS      20H
```

```
08A0            REG5:   DS      20H
08C0            REG6:   DS      20H
08E0            REG7:   DS      20H
                                        ;LINE SCANNER TABLES
                                        ;STORED BY WORD (8LINES PER WOR
0900                    ORG  0900H
                                        ;STORED BY LINE
0900            LSTATE: DS   33D        ;LINE SCANNER STATE
0921 0000       TIMADR: DW 0            ;ADDR OF NEXT TIMER TO BE UPDAT
0923            T10MS:  DS      38D     ;165 MS TIMER
                                        ;TIME3 MUST FOLLOW T10MS
0949            TIME3:  DS   33D        ;3 MINUTE TIMER
096A 00         NODR:   DB 0    ; IF ZERO- 10 SEC SINCE DR
096B 00         CART1:  DB 0 ; TIMER FOR DEDICATED CARRIER
096C 00         CART2: DB 0 ; TIMER FOR BACKUP CARRIER
096D 00         CART3: DB 0
096E 00         CART4: DB 0
096F            REGAS:  DS   33D        ;REGISTER NUMBER ASSIGNED
0990            HOOKT:  DS 33   ;HOOK TIMER
09B1 00         LINR:   DB   0          ;LINE NUMBER
09B2 00         LPROC:  DB   0          ;LINES TO BE PROCESSED
09B3 0000       NWSTA:  DW   0          ;NEW STATE ADDRESS
09B5 0100       MSGUN:  DW   1          ;ONE TENTH MIN TIMER INIT TO 25
09B7 00         CURST:  DB   0          ;CURRENT HOOK STATUS
09B8 0000       LINST:  DW   0          ;ADR OF STATE OF LINE BEING PRO
09BA 00         MASK:   DB   0          ;MASK OF LINE BEING PROCESSED
09BB            OLDST:  DS   4D         ;OLD STATUS
09BF            NEWST:  DS   4D         ;NEW STATUS
09C3            OULIN:  DS      33D     ;OUT LINE CONNECTED TO
                                                ;INLINE
                                        ;SET ON CONNECT, RESET BY DISCO
09E4            CLASS:  DS 8
09EC                    ORG  0A00H
                                        ;CALL PROCESSING TABLES
                                        ;STORED BY LINE
0A00             CPSTAT: DS   33D        ;CALL PROCESSOR STATE


                                        ;INTERUPT FLAGS
0A21 00         ERRFLG: DB   0          ;RCV DATA ERROR
0A22 00         THREFL: DB   0          ;TRAN HLDG REG EMPTY
0A23 00         DRFLG:  DB   0          ;RCV DATA READY
0A24 00         INTLEV: DB 0;           CURRENT INTERRUPT STATUS

                                        ;COMMUNICATIONS
0A25 00         COMFLG: DB   0          ;STATUS FLAG
                                        ;0=NO COMM IN PROG
                                        ;1=SENDING
                                        ;2=RECEIVING
0A26 0000       REGCOM: DW   0          ;ADR OF STATUS WORD, REGISTER I
0A28 0000       CHTCOM: DW   0          ;CHARACTER ADDRESS
0A2A 0000       REPST:  DW   0          ;LOCATION WHERE REPLY IS TO BE
0A2C 0000       TRNST:  DW   0          ;START OF MSG TO TRANSMIT
                                        ;MATRIX SWITCHING
0A2E 0000       MATREG: DW   0          ;REGISTER BEING PROCESSED BY SW
0A30            TRY:    DS   33          ;1ST OR SECOND TRY - 1 BYTE PE
0A51 0000       RGSTAT: DW 0            ; ADDRESS OF REGISTER STATUS WO
0A53 0000       RGSTX: DW 0              ; ADDRESS OF STX OF CURRENT RE
0A55             SPV:    DS    33          ;0=NONE
                                        ;1=HANG UP
                                         ;2=DIAL TONE
                                        ;3=BUSY
                                        ;6=ANSWER
0A76            TIMEX:  DS 33   ;TIMER FOR SUPERVISORY TONES
0A97            SPCTR: DS 33            ; COUNTERS FOR BUSY AND RING
                                ; 2BITS B60 2 BITS 120IPS 4BITS RING
0040            BLANK   EQU     40H
008B            STAR    EQU     8BH
008C            POUND   EQU     8CH
0002            STX     EQU     02H
0003            ETX     EQU     03H
0001            NULL    EQU     01H
0006            ACK     EQU     06H
0015                    NAK EQU 15H
0AB8            RMASK:  DS  33          ;MASK FOR LINE ASGD
```

```
0AD9 00        RFLAG:  DB    0          ;REGISTER FLAGS
                                        ;0 BIT=HOOK TRANSITION
                                        ;1 BIT - TONES
                                        ;6 BIT - HOOK STATE
                                        ;7 BIT - REG TIME OUT
0ADA 00        LSTRG:  DB      0

0ADB 00        RGFLG: DB 0 ; 0 IF FIRTST TIME RE-FOR REG BUSY
0ADC                  ORG 400H
0400           INLET:  DS 4; INLET TIE LINE = 1
0404           TIE:    DS 4; OUTPUT TIE LINE = 1
0408 00        RGPRES: DB 0 ; REGISTERS PRESENT , 1= NOT
0409 00        RGBUSY: DB 0 ; REGISTERS BUSY, 1=BUSY
040A 00        RGUSE: DB 0 ; REGS ASSIGNED, 1= ASSIGNED
040B 00        RGROT: DB 0; ROTARY BIT FOR REGISTER SELECTION
040C 00        WFLG: DB 0; 1=WAITING REG RELEASE
                               ;FOR WAIT CONTROL
040D           BTIME: DS 33 ; SET TO 3 MIN FOR 3 MIN MSG OR FF TO TURN
042E 00        CRST1: DB 0 ; CARRIER STATE - DEDICATED LINE
042F 00        CRST2: DB 0; CARRIER STATE - BACKUP LINE
0430 00        CARSW: DB 0 ; SWITCH FOR TOGGLE BET 2 CAR DET ROUTINES
0431 00        RSAVE: DB 0 ; TEMP STORAGE FOR RGBUSY
0432           NODE:   DS    33 ;NUMBER OF NODE REACHED
0453           DELAY:  DS 33
0474                   ORG  2000H
2000 C36323            JMP REGSR
               ; - - - - - - - - - - - - - - - - - - - - - - - - - - - -
                                      ;LINE SCANNER
                                        ;LINE SCANNER THIS ROUTINE SCAN
                                        ;8 LINES FOR ACTIVITY EVERY 40M
                                        ;DETECTS HOOK SWITCH TRANSITION
                                        ;WHEN TIMER GOES TO ZERO.
               LSCNR:
2003 3AB109            LDA  LINR        ;GET LINE NUMBER
2006 4F                MOV  C,A
2007 E618              ANI  18H
2009 07                RLC              ;NEW STATE INDEX
200A F608             ORI 8
200C 6F                MOV  L,A         ;PUT IT IN L REG
200D 260C              MVI  H,0CH       ;HOOK STATE BASE ADDR
200F 0F                RRC              ;SHIFT TO LSD PSN
2010 0F                RRC
2011 0F                RRC
2012 0F                RRC
2013 E603             ANI 3
2015 5F                MOV  E,A         ;0-3 WORD NUMBER
2016 1600              MVI  D,0
2018 7E                MOV  A,M         ;NEW HOOK STATE
2019 2F                CMA
201A 21BB09             LXI  H,OLDST
201D 19                DAD  D           ;0-3
201E 46                MOV  B,M         ;DATA IS LAST HOOK ST THIS GP
201F 77                MOV  M,A;REFRESH OLDST
2020 32B709            STA CURST
2023 A8                XRA  B           ;A=BITS TO BE PROC
2024 32B209            STA  LPROC       ;HOOK TRANSITIONS
2027 3E01              MVI  A,1         ;SET MASK
2029 32BA09            STA  MASK
202C 42                MOV  B,D
               CKTIM:
202D 50                MOV D,B
202E 219009            LXI  H,HOOKT     ;GET HOOK TIMER BASE ADDR
2031 09                DAD  B           ;ADD LINE NR
Ø48Ø*                  *HAK FLG:  DWØØ
prime
2032 7E                MOV  A,M         ;HOOK TIMER THIS LINE
2033 B7                ORA  A           ;IS IT ZERO?
2034 CA3E20            JZ   SCHED
2037 FA4820            JM   PROC             ;IF FF NO ACTION
                                        ;
203A 35                DCR  M           ;DECREMENT HOOKT
203B C24820            JNZ  PROC
203E 21BA09    SCHED:  LXI  H,MASK
2041 3AB209            LDA  LPROC
```

```
2044 B6                  ORA  M
2045 32B209              STA  LPROC      ;UP DATE LINES TO BE PROC
                                         ;LINE SCANNER STATE TABLE
               PROC:                     ;B AND C HAVE LINE NUMBER BEING
                                         ;PROCESSED.
2048 21BA09              LXI  H,MASK     ;MASK FOR THIS LINE
204B 3AB209              LDA  LPROC      ;LINES TO BE PROCESSED
204E A6                  ANA  M          ;IF=1 PROCESS THIS LINE
204F CAA420              JZ   NXTLN      ;IF=0 GO TO NEXT LINE
2052 210009              LXI  H,LSTAT    ;GET LINE STATE BASE ADR
2055 09                  DAD  B          ;ADD INDEX
2056 22B809              SHLD LINST      ;SAVE LINE STATE ADR THIS LINE
2059 7E                  MOV  A,M        ;GET STATE THIS LINE
205A 17                  RAL
205B 5F                  MOV  E,A
205C 217020              LXI  H,LSTAB    ;GET LSTAB ADR
205F 19                  DAD  D          ;ADR POINTER
2060 5E                  MOV  E,M        ;GET JUMP TO STATE LOW ADR
2061 2C                  INR  L
2062 56                  MOV  D,M        ;SET JUMP TO STATE HIGH ADR
2063 3AB709             LDA  CURST
2066 21BA09              LXI  H,MASK     ;GET MASK ADR
2069 A6                  ANA  M          ;GET HOOK BIT THIS LINE
206A 219009              LXI  H,HOOKT
206D 09                  DAD  B
206E EB                  XCHG
206F E9                  PCHL
                                         ;B,C CONTAIN LINE NO ON
                                         ;ENTRY TO EACH STATE
               LSTAB:
                                   ;WATCH OUT IF CROSSES PAGE BOUNDRY
2070 2121                DW   LST0
2072 4721                DW   LST1
2074 A420                DW   LST2
2076 A420                DW   LST3
2078 B121                DW   LST4 ;

207A 5323                DW   LST5
207C C621                DW   LST6
207E 6F21               DW   LST7
2080 9C21               DW   LST8
2082 E821               DW   LST9
2084 F721               DW   LSTA
2086 0F22               DW   LSTB
2088 7522               DW   LSTC
208A 7522               DW   LSTD
208C 7522               DW   LSTE
208E 1523               DW   LSTF
2090 3A23               DW LST10
               LSI:
2092 2AB809              LHLD LINST
2095 34                  INR  M          ;INCREMENT STATE
2096 C3A420              JMP  NXTLN
               LSD:
2099 2AB809              LHLD  LINST
209C 35                  DCR  M          ;DECREMENT STATE
209D C3A420              JMP  NXTLN
               LSZ:
20A0 2AB809              LHLD LINST
20A3 77                  MOV  M,A        ;STORE STATE
               LST3:
              LST2:
               NXTLN:
20A4 3AB109              LDA  LINR
20A7 3C                  INR  A          ;NEXT LINE ADDRESS
20A8 E61F                ANI  1FH        ;CLEARS OVER FLOW
20AA 32B109              STA  LINR       ;STORE LINE ADDRESS
20AD 3ABA09              LDA  MASK
20B0 07                  RLC
20B1 32BA09              STA  MASK       ;SET MASK FOR NEXT LINE
20B4 D8                  RC              ;LIMITS GROUP TO 8 LINES
20B5 0C                  INR  C          ;LINE NUMBER
20B6 C32D20              JMP  CKTIM
                                         ;SUBROUTINE ASSIGNS REGISTER TO
                                         ;D & E HAVE HOOK TIMER ADR THIS
```

```
                                                  ;DO NOT CHANGE B & C
                                                  ; REG AVAILABLE- RETURN+3
                   GREG:
                                                  ;USED BY LST0, LST4, LST5
20B9 216F09                 LXI  H,REGAS
20BC 09                     DAD  B
20BD 7E                     MOV  A,M
20BE B7                     ORA  A
20BF F21621                 JP GREGA                    ;LINE HAS REG ALREADY
                   GREG1:

20C2 DB1A                  IN 1AH  ;REGISTER PRESENT
20C4 210804                LXI H,RGPRES
20C7 77                    MOV M,A
20C8 2C                    INR L ; RG BUSY
20C9 B6                    ORA M
20CA 2C                    INR L ; RG IN USE
20CB B6                    ORA M
                  ;RESULT IN A CONTAINS 1'S WHERE REG IS NOT PRESENT
                  ;OR IS BUSY OR IS IN USE
20CC FEFF         CPI 0FFH
20CE CA1221                JZ GR1A ; NO REGS AVAIL
                  ;AT LEAST ONE AVAIL- FIND WHICH ONE IT IS
20D1 47                    MOV B,A ; SAVE ONES AVAIL
20D2 3A0B04       GR1B:    LDA RGROT ; ROTATE BIT
20D5 07                    RLC
20D6 320B04                STA RGROT
20D9 A0                    ANA B ; TEST BIT
20DA C2D220                JNZ GR1B ; NEXT BIT POSITION
                  ;SELECT THIS REGISTER; FIND REGISTER NUMBER
                  GR2A:
20DD 3A0B04                LDA RGROT
20E0 47                    MOV  B,A
20E1 B6                    ORA M ; SET REG IN USE
20E2 77                    MOV  M,A         ;AND SAVE IT!
20E3 78                    MOV A,B          ;ROTATE BIT
20E4 0600                  MVI  B,0
20E6 0F           GR2AB: RRC
20E7 DAEE20                JC GR2AC ; BIT FOUND
20EA 04                    INR B
20EB C3E620                JMP GR2AB ; SHIFT AGAIN
                  ; BIT FOUND, REG NO IS IN B
20EE 78           GR2AC: MOV A,B ;REGISTER NO
20EF 0600                  MVI B,0; CLEAR B
20F1 216F09                LXI H,REGAS
20F4 09                    DAD B
20F5 77                    MOV M,A ; STORE REG ASSIGNED TO LINE
20F6 07                    RLC
20F7 07                    RLC
20F8 07                    RLC
20F9 07                    RLC
20FA 07                    RLC
20FB 32DA0A                STA LSTRG
20FE 210108                LXI H,INLIN
2101 85                    ADD L
2102 6F                    MOV L,A ; INLIN FOR THIS REG
2103 71                    MOV M,C ; SET LINE NUMBER
                   GREGB:
2104 3EFF                   MVI A,0FFH       ; STOP HOOK TIMER
2106 12                     STAX D
2107 214909                 LXI  H,TIME3
210A 09                     DAD  B
210B 70                     MOV  M,B         ;SCHEDULE CALL PROCESSING
210C E3                     XTHL
210D 23                     INX H
210E 23                     INX H
210F 23                     INX H
2110 E3                     XTHL
2111 C9                     RET
                  GR1A:              ; NO REGISTERS AVAILABLE-EXIT
2112 3E03                  MVI A,3 ; SET HOOK TIME = 120 MS
2114 12                    STAX D
2115 C9                    RET
                   ;RESET LSTREG- REG ALREADY ASSIGNED
                   GREGA:
```

```
2116 07                  RLC
2117 07                  RLC
2118 07                  RLC
2119 07                  RLC
211A 07                  RLC
211B 32DA0A              STA LSTRG
211E C30421              JMP GREGB
                         ;STATE 0
                         ;A HAS HOOK BIT THIS LINE
                         ;D & E HAVE HOOK TIMER ADR THIS LINE
                         ;B & C HAVE LINE NUMBER BEING PROCESSED
                         ;DO NOT DESTROY IN THIS ROUTINE
                LST0:
2121 47                  MOV  B,A        ;SAVE HOOK BIT
2122 1A                  LDAX D          ;HOOK TIME IN A
2123 B7                  ORA  A          ;SET FLAGS
2124 78                  MOV  A,B        ;PUT HOOK BIT BACK IN A
2125 0600                MVI  B,0
2127 C23721              JNZ  LST0A      ;HOOK TRANSIT
212A B7                  ORA  A          ;SET FLAGS
212B CA4121              JZ   LST0B      ;ON HOOK
212E CDB920              CALL GREG       ;ASSIGN REGISTER
2131 C3A420              JMP NXTLN
2134 C39220              JMP  LSI        ;GO TO STATE 1
                LST0A:
2137 B7                  ORA  A          ;SET FLAGS
2138 CA4121              JZ   LST0B      ;ON HOOK
                LST6A:
213B 3E0E                MVI  A,0EH
213D 12                  STAX D          ;SET HOOKT=520 MSEC
213E C3A420              JMP  NXTLN
                LST0B:
2141 3EFF                MVI  A,0FFH     ;STOP TIMER
2143 12                  STAX D
2144 C3A420              JMP  NXTLN
                ; - - - - - - - - - - - - - - - - - - - - - - - - - - - - -
                         ;STATE 1--OFF HOOK, WAIT DIALING
                         ;MUST HAVE A REGISTER TO BE IN THIS STATE
                         ;
                LST1:
2147 47                  MOV  B,A        ;SAVE HOOK BIT
2148 1A                  LDAX D          ;HOOK TIME IN A
2149 B7                  ORA  A          ;SET FLAGS
214A 78                  MOV  A,B
214B 0600                MVI  B,0        ;CLEAR B
214D CA5721              JZ   LST1A      ;TIMED OUT
2150 B7                  ORA  A          ;SET FLAGS
2151 CA3B21              JZ   LST6A      ;SET HOOK TIMER TO 600 MSEC
2154 C34121              JMP  LST0B      ;STOP TIMER
                         ;
                LST1A:
2157 216F09              LXI  H,REGAS
215A 09                  DAD  B
215B 7E                  MOV  A,M
215C 07                  RLC
215D 07                  RLC
215E 07                  RLC
215F 07                  RLC
2160 07                  RLC             ;REGISTER INDEX
2161 210208              LXI  H,RSTAT
2164 85                  ADD  L          ;ADD INDEX
2165 6F                  MOV  L,A
2166 3E02                MVI  A,02
2168 B6                  ORA  M          ;SET REG STAT WD ON HOOK
2169 77                  MOV  M,A
216A 3E03                MVI  A,3
216C C3A020              JMP LSZ         ;SET STATE 3

                ; - - - - - - - - - - - - - - - - - - - - - - - - - - - -
                                         ;
                                         ;STATE 7 CALL CONNECTED
                                             ;OR WAITING IN CAMP ON

                                         ;CALL PROCESSOR SETS STATE=7 AN
                                         ;HOOK TIMER=0; ENTER EVERY 40MS
```

```
                                              ;A HAS HOOK BIT
                                              ;B & C HAVE LINE NUMBER THIS LI
                                              ;D & E HAVE HOOK TIMER ADR THIS
                   LST7:            ; CALL IN PROGRESS
2172 3E0E                 MVI  A,0EH      ; 540 MS
2174 12                   STAX D
2175 C39220               JMP  LSI
                                              ;STATE 8
                   LST7B:                     ;CHECK THAT T3 = 0
2178 214909               LXI  H,TIME3
217B 09                   DAD  B              ;ADD INDEX
217C 7E                   MOV  A,M            ; GET TIMER VALUE
217D B7                   ORA  A              ;SET FLAGS
217E C2A420               JNZ  NXTLN
2181 21000A               LXI  H,CPSTAT       ;CALL PROC STATE
2184 09                   DAD  B
2185 7E                   MOV  A,M
2186 FE2C                 CPI  2CH            ;CALL WAITING
2188 CA9721               JZ   LST7C
218B CD1528               CALL BEEP
218E 214909               LXI H,TIME3
2191 09                   DAD B
2192 36B4                 MVI M,180           ; 3MINUTE
2194 C3A420               JMP NXTLN
2197 3E0F          LST7C: MVI  A,0FH
2199 C3A020               JMP  LSZ            ;RECALL REGISTER TO SEND CW MSG
                                              ;STATE 8
                                              ;A HAS HOOK BIT
                                              ;B & C HAVE LINE NR BEING PROC
                                              ;D & E HAVE HOOK TIMER ADR THIS
                                              ;THIS STATE FINDS REGISTER TO
                                              ;HANG UP OR RECALLS REGISTER
                   LST8:            ;CALL IN PROGREESS
219C 1A                   LDAX D              ;HOOK TIME
219D B7                   ORA  A
219E C29920               JNZ LSD             ; RETURN TO STATE 7
                   ;ON HOOK- CLEAR MATRIX
21A1 DB1B                 IN 1BH
21A3 E608                 ANI 8 ; MATRIX READY
21A5 CAB121               JZ LST8A ; NOT READY
21A8 2100C0               LXI H,0C000H
21AB 71                   MOV M,C ; SET POINT
21AC 3E04                 MVI A,4
21AE C3A020               JMP LSZ ; WAIT FOR SWITCHING
                   LST4:
                   LST8A:
                   ; VERIFY ON HOOK
21B1 CDB920               CALL GREG
21B4 C3A420               JMP NXTLN
21B7 210208               LXI  H,RSTAT
21BA 3ADA0A               LDA  LSTRG
21BD 85                   ADD  L
21BE 6F                   MOV  L,A
21BF 3602                 MVI  M,02           ;SET HANGUP BIT
21C1 3E03                 MVI  A,03           ;STATE 3
21C3 C3A020               JMP LSZ

                                              ;STATE 6
                                              ;A HAS HOOK BIT THIS LINE
                                              ;B & C HAVE LINE NR BEING PROC
                                              ;D & E HAVE HOOK TIMER ADR THIS
                   LST6:                      ;WAIT FOR ON HOOK
21C6 C24121               JNZ LST0B           ; STOP TIMER
21C9 1A                   LDAX D              ;HOOK TIME
21CA B7                   ORA  A              ;COMPARE TO FF
21CB FA3B21               JM   LST6A          ;FF, SET TIMER = 600MSEC
21CE C2A420               JNZ  NXTLN          ;TIMER NOT ZERO
21D1 3EFF                 MVI A,0FFH
21D3 12                   STAX D
21D4 CDB920               CALL GREG
21D7 C3A420               JMP NXTLN
```

```
  21DA 210208         LXI H,RSTAT
  21DD 3ADA0A         LDA LSTRG
  21E0 85             ADD L
I 21E1 6F             MOV L,A
  21E2 3602           MVI M,2;HANGUP
  21E4 7E             MOV A,M              ;ATATE 2
  21E5 C3A020         JMP LSZ ; WAIT FOR DT TO BE ACKED
                      ;
                ; SUPERVISORY TONE ALGORITHM
                ; ON ENTRY, SPV =0 FOR EXTENSION DIALING
                ; AND =377 FOR OUTWARD DIALING
                ;STATE 9- INITIALIZATION
                ; CLEAR COUNTERS
  21E8 21970A   LST9:   LXI H,SPCTR
  21EB 09               DAD B
  21EC 70               MOV M,B
  21ED 21760A   LST9T:  LXI H,TIMEX
  21F0 09               DAD B
  21F1 70               MOV M,B             ; CLEAR TIMEX
  21F2 3E0A             MVI A,0AH
  21F4 C3A020           JMP LSZ
                ;STATEA - WAIT FOR TONE
                LSTA:
  21F7 CD2523           CALL TRANS          ;CHECK FOR TRANSITION
  21FA C23223           JNZ CHECK
  21FD CD5826           CALL DIALT
  2200 C29220           JNZ LSI             ; TIME TONE ON
                CKTMR:
  2203 214909           LXI H,TIME3
  2206 09               DAD B
  2207 7E               MOV A,M
  2208 B7               ORA A
  2209 CA4F23           JZ SPCQ             ; TIMEOUT- SEND NO DETECT
  220C C3A420           JMP NXTLN
                ;STATEB- TIME ON TIME
  220F CD2523   LSTB:   CALL TRANS          ; CHECK IF TRANSITION HAS OCCURE
  2212 C23223           JNZ CHECK
  2215 21760A           LXI H,TIMEX
  2218 09               DAD B
  2219 34               INR M
  221A CD5826           CALL DIALT
  221D C23C22           JNZ CKDT            ; -CHECK DIAL TONE
                ;TONE STILL ON
                ;TONE HAS STOPPED
  2220 21760A           LXI H,TIMEX
  2223 09               DAD B
  2224 7E               MOV A,M             ;TIME ON
  2225 70               MOV M,B
  2226 21970A           LXI H,SPCTR
  2229 09               DAD B
  222A DE0A             SBI 10              ; 160-360MS
  222C FA5A22           JM LS120            ;120 IPS
  222F DE07             SBI 7               ; 360-640MS
  2231 FA6322           JM LS60             ; 60 IPS
  2234 DE27             SBI 39              ; 640MS-2.2SEC
  2236 FA6C22           JM LSTRNG           ;RING
  2239 C3E821           JMP LST9            ; >1.2SECS
                CKDT:
                ;CHECK DIAL TONE
  223C 21760A           LXI H,TIMEX
  223F 09               DAD B
  2240 7E               MOV A,M
  2241 FE19             CPI 25 ; 1 SEC
  2243 DA0322           JC CKTMR
  2246 21000A           LXI  H,CPSTAT       ;CALL PROC STATE
  2249 09               DAD  B
  224A 7E               MOV  A,M
  224B FE22             CPI  22H            ;TEST IF WAITING ANSWER
  224D CA0322           JZ   CKTMR          ;IGNORE -COULD BE RING
  2250 FE1E             CPI 1EH
  2252 CA0322           JZ CKTMR ; IGNORE INDIAL RINGBACK
  2255 3E02             MVI A,2
  2257 C30B23           JMP SPDONE;
                ;
                ;
```

```
                    LS120:
225A 7E                       MOV A,M
225B E6FC                     ANI 0FCH          ; CLEAR 60 COUNTER
225D 77                       MOV M,A
225E 3E0C                     MVI A,0CH         ; TIME SILENT
2260 C3A020                   JMP LSZ
                    LS60:
2263 7E                       MOV A,M
2264 E6F3                     ANI 0F3H          ;CLEAR 120 COUNTER
2266 77                       MOV M,A
2267 3E0D                     MVI A,0DH         ; TIME SILENT
2269 C3A020                   JMP LSZ
                    LSTRNG:
226C 7E                       MOV A,M
226D E6F0                     ANI 0F0H          ; CLEAR 60,120 CTR
226F 77                       MOV M,A
2270 3E0E                     MVI A,0EH
2272 C3A020                   JMP LSZ
                    LSTC:                       ; TIME BUSY 120 SILENT
                    LSTD:                       ; TIME 60 BUSY SILENT
                    LSTE:                       ; TIME RING SILENT
2275 CD2523                   CALL TRANS        ;TEST HOOK TRANSITION
2278 C23223                   JNZ CHECK         ;TRANSITION
227B 21760A                   LXI H,TIMEX
227E 09                       DAD B
227F 34                       INR M
2280 CD5826                   CALL DIALT
2283 CAEE22                   JZ CKOFF          ; STILL SILENT
                    ;TONE BACK ON, CHECK OFF TIME
2286 21760A                   LXI H,TIMEX
2289 09                       DAD B
228A 7E                       MOV A,M
228B DE09                     SBI 9
228D FAA222                   JM CK120          ; 160-320
2290 DE08                     SBI 8
2292 FABF22                   JM CK60 ; 320-640
2295 DE2C                     SBI 44            ; <2.4SEC
2297 FAE821                   JM LST9
229A DE41                     SBI 65
229C FAD922                   JM  CKRG          ;2.4-5S RING
229F C3E821                   JMP LST9          ; IGNORE >5SECS
                              CK120:
22A2 210009                   LXI H,LSTAT
22A5 09                       DAD B
22A6 7E                       MOV A,M
22A7 FE0C                     CPI 0CH           ; WAITING FOR 120?
22A9 C2E821                   JNZ LST9          ;IGNORE
22AC 21970A                   LXI H,SPCTR
22AF 09                       DAD B
22B0 7E                       MOV A,M
                    ;COUNT
22B1 E60C                     ANI 0CH
22B3 FE0C                     CPI 0CH
22B5 CAE821                   JZ LST9           ; 4 BUSY CYCLES
                                                ;120 IPM BUSY BYPASSED***
22B8 7E                       MOV A,M
22B9 C604                     ADI 4
22BB 77                       MOV M,A
22BC C3ED21                   JMP LST9T         ; NEXT
                    CK60:
22BF 210009                   LXI H,LSTAT
22C2 09                       DAD B
22C3 7E                       MOV A,M
22C4 FE0D                     CPI 0DH           ;WAITING FOR 60/
22C6 C2E821                   JNZ LST9          ; IGNORE
22C9 21970A                   LXI H,SPCTR
22CC 09                       DAD B
22CD 7E                       MOV A,M
22CE E603                     ANI 3
22D0 FE03                     CPI 3
22D2 CA0923                   JZ BZ             ;4 BUSY CYCLES
22D5 34                       INR M    ; INCREMENT 60 IPS COUNTER
22D6 C3ED21                   JMP LST9T         ;NEXT
                    CKRG:
22D9 210009                   LXI H,LSTAT
```

```
22DC 09                    DAD B
22DD 7E                    MOV A,M
22DE FE0E                  CPI 0EH         ; WAITING FOR RING
22E0 C2E821                JNZ LST9        ; IGNORE
22E3 21970A                LXI H,SPCTR
22E6 09                    DAD B
22E7 7E                    MOV A,M
22E8 C610                  ADI 10H         ; INCREMENT RING COUNT
22EA 77                    MOV M,A
22EB C3ED21                JMP LST9T
                   ; NO TONES-
                   ;CHECK IF 8 SECONDS UP
                   CKOFF:
I 22EE 21760A              LXI H,TIMEX
22F1 09                    DAD B
22F2 7E                    MOV A,M
22F3 DEC8                  SBI 200
22F5 DAA420                JC NXTLN        ;KEEP GOING
22F8 21970A                LXI H,SPCTR
22FB 09                    DAD B
22FC 7E                    MOV A,M
22FD E6F0                  ANI 0F0H
22FF FE30                  CPI 30H ;3RINGS
2301 FAE821                JM LST9
                   ;ANSWER
2304 3E06          ANS:    MVI A,6
2306 C30B23                JMP SPDONE
                   ;BUSY
2309 3E03          BZ:     MVI A,3
230B 21550A        SPDONE: LXI H,SPV
230E 09                    DAD B
230F 77                    MOV M,A         ; SET REPLY
2310 3E0F                  MVI A,0FH       ; WAIT FOR REG
2312 C3A020                JMP LSZ
                   ;
                   LSTF:
2315 CDB920                CALL GREG
2318 C3A420                JMP NXTLN
231B 214909                LXI H,TIME3     ;ZERO TIMER TO CALL CALL PROC
231E 09                    DAD B
231F 70                    MOV M,B
2320 3E03                  MVI A,3
2322 C3A020                JMP LSZ
                   ;
                   ; CHECK FOR TRANSITION OF HOOK
                   TRANS:
2325 21550A                LXI H,SPV
2328 09                    DAD B
2329 C22F23                JNZ HON
232C 7E                    MOV A,M
232D 3C                    INR A
232E C9                    RET
232F 7E            HON:    MOV A,M
2330 B7                    ORA A
2331 C9                    RET
                   ;
                   ;TRANSITION HAS OCCURRED
                   CHECK:
2332 3E0E                  MVI A,0EH       ;560MS
2334 12                    STAX D          ;HOOKT
2335 3E10                  MVI A,10H       ; TIME TRANSITION
2337 C3A020                JMP LSZ
                   ;STATE 10- TIME TRANSITION
                   LST10:
233A F5                    PUSH PSW        ;HOOK
233B 1A                    LDAX D          ;TEST TIMEOUT
233C B7                    ORA A
233D CA4623                JZ LS10A        ;HANG UP OR ANS
2340 F1                    POP PSW
2341 3E09                  MVI A,9         ;GLITCH
2343 C3A020                JMP LSZ; RESET ALGORITM
                   LS10A:
2346 F1                    POP PSW
2347 C20423                JNZ ANS         ;ANSWER
234A 3E05                  MVI A,5
```

```
2340 C3A020              JMP LSZ ; HANGUP- CLEAR MATRIX
                                         ;HANG UP
234F AF         SPCQ:    XRA A           ;NO DETECT
2350 C30B23              JMP SPDONE      ;
                ;STATE 5-CLEAR MATRIX
2353 DB1B       LST5: IN 1BH
2355 E608                ANI 8; MATRIX READY
2357 CAA420              JZ NXTLN ; WAIT
235A 2100C0              LXI H,0C000H
235D 71                  MOV M,C ; SET POINT
235E 3E01                MVI A,1
2360 C30B23              JMP SPDONE
                ;
                         ;
                         ;
                         ;
                                         ; REGISTER
                         ;THIS ROUTINE SCANS FOUR REGISTERS EVERY TEN
                         ;MILLISECONDS FOR ACTIVITY.
                REGSR:
2363 21B509              LXI   H,MSGUN
2366 35                  DCR   M
2367 C28123              JNZ   REG
236A 3664                MVI   M,100     ;SET TIMER TO 1 SECOND
236C 210608              LXI   H,REGTM
236F 7E         SLOOP:   MOV   A,M
2370 B7                  ORA   A
2371 CA7823              JZ    NEXTT     ;ZERO - LEAVE IT ALONE
2374 FA7823              JM    NEXTT     ;IDLE
2377 35                  DCR   M         ;DECR TIMER
                NEXTT:
2378 3E20                MVI   A,20H     ;NEXT TIMER INDEX
237A 85                  ADD   L
237B 6F                  MOV   L,A
237C FE06                CPI   6
237E C26F23              JNZ   SLOOP     ;IF ZERO - DONE
                REG:
2381 110000              LXI   D,0       ;CLEAR D&E
2384 210108              LXI   H,INLIN
2387 19                  DAD D
2388 7E                  MOV   A,M       ;PUT LINE NR IN A
2389 4F                  MOV   C,A
238A 07                  RLC
238B B7                  ORA   A         ;IS A LINE ASSIGNED?
238C F29723              JP    PREG      ;YES, PROCESS REGISTER
                RST9:
                RSTA:
                RST0:
                RST5:
                NXREG:
238F 7B                  MOV   A,E       ;NO, GOT TO NEXT REG

2390 C620                ADI   20H       ;NEXT REGISTER BASE INDEX
2392 5F                  MOV   E,A
2393 C8                  RZ              ;YES, EXIT
2394 C38423              JMP   REG+3     ;NO, CHECK NEXT REGISTER
                ; - - - - - - - - - - - - - - - - - - - - - - - - - - - -
                PREG:
                         ;D&E HAS REGISTER BASE.  C HAS LINE NR
2397 42                  MOV   B,D       ;CLEAR B
2398 210608              LXI   H,REGTM
239B 19                  DAD   D
239C 7E                  MOV   A,M
239D B7                  ORA   A         ;SET FLAGS
239E CAF624              JZ    STETX;REGISTER TIME OUT
23A1 79                  MOV   A,C
23A2 07                  RLC
23A3 E630                ANI   30H       ;WORD NR IN A FOR HOOK BITS
23A5 F608                ORI   8
23A7 260C                MVI   H,0CH
23A9 6F                  MOV   L,A
23AA 7E                  MOV   A,M       ;NEW HOOK BITS
23AB 2F                  CMA
23AC 21B80A              LXI   H,RMASK
23AF 09                  DAD   B
```

```
        23B0 A6                ANA   M
        23B1 CAB623            JZ    PREGA       ;HOOK
        23B4 0640              MVI   B,40H       ;SET RFLAG BIT 6
                     PREGA:
        23B6 211F08            LXI   H,ROLDST    ;OLD HOOK BIT
        23B9 19                DAD   D
        23BA BE                CMP   M           ;SAME AS OLD?
        23BB CAC323            JZ    PREG2       ;YES, CHECK TONES
        23BE 77                MOV   M,A         ;NO, UPDATE ROLDST
        23BF 3E01              MVI   A,1
        23C1 80                ADD   B
        23C2 47                MOV   B,A         ;SET RFLAG BIT 0
                     PREG2:
        23C3 C5                PUSH  B
        23C4 42                MOV B,D
        23C5 216F09           LXI H,REGAS
        23C8 09               DAD B
        23C9 7E               MOV A,M
        23CA D330             OUT 30H; SELECT
                                       ;REGISTER
        23CC DB27             IN 27H  ;GET TONES
        23CE B7                ORA   A
        23CF C1                POP   B
        23D0 CAD723            JZ    PREG3       ;NO TONES
        23D3 3E02              MVI   A,2
        23D5 80                ADD   B
        23D6 47                MOV   B,A         ;SET BIT 1 = 1
                     PREG3:
        23D7 210708            LXI   H,GENTM
        23DA 19                DAD   D
        23DB 7E                MOV   A,M
        23DC B7                ORA   A           ;SET FLAGS
        23DD CAEA23            JZ    PREG4       ;TIMER ALREADY ZERO
        23E0 FAEE23            JM    PREG5       ;TIMMER SET TO FF
        23E3 35                DCR   M
        23E4 CAEA23            JZ PREG4
        23E7 C3EE23            JMP   PREG5
                     PREG4:
        23EA 3E80              MVI   A,80H
        23EC 80                ADD   B
        23ED 47                MOV   B,A         ;SET BIT
                    PREG5:
        23EE 3EBF             MVI A,0BFH       ;MASK OUT HOOK STATE
        23F0 A0               ANA B
        23F1 CA8F23           JZ NXREG
        23F4 78               MOV A,B
        23F5 32D90A            STA   RFLAG
        23F8 42                MOV   B,D
        23F9 216F09           LXI H,REGAS
        23FC 09               DAD B
        23FD 7E               MOV A,M
        23FE D330             OUT 30H ;  SELECT REGISTER CARD
        2400 210408            LXI   H,REGST     ;GET REG STATE BASE
        2403 19                DAD   D
        2404 7E                MOV   A,M         ;REGISTER STATE
        2405 07                RLC
        2406 212424            LXI   H,RSTAB     ;GET REG STATE TABLE ADR
        2409 85                ADD   L
        240A 6F                MOV   L,A
        240B D20F24           JNC P5A
        240E 24               INR H
                    P5A:
        240F 7E                MOV   A,M
        2410 2C                INR   L
        2411 66                MOV   H,M
        2412 6F                MOV   L,A
        2413 E9                PCHL              ;GO TO STATE
                                                 ;
                                                 ;
                     RSI:                        ;
        2414 210408            LXI   H,REGST     ;STATE ADR
        2417 19                DAD   D
        2418 34                INR   M           ;INCREMENT STATE
        2419 C38F23            JMP   NXREG
                     RSZ:
```

```
241C 210408         LXI  H,REGST    ;MUST COMPUTE FOR EXIT FROM
                                    ;STETX SUB ROUTINE
241F 19             DAD D           ;STATE ADR
2420 77             MOV  M,A        ;SET STATE
2421 C38F23         JMP  NXREG
                                    ;
                                    ;
              RSTAB:
2424 8F23           DW   RST0
2426 5224           DW  RST1
2428 7A24            DW  RST2
242A 9424           DW  RST3
242C BF24           DW  RST4
242E 8F23           DW  RST5
2430 8925           DW  RST6
2432 0C26           DW  RST7
2434 1926           DW  RST8
2436 8F23           DW  RST9 ;WAIT DIAL TONE IDLE
2438 8F23           DW  RSTA ;WAIT 600 MS IDLE
U 243A 0000         DW  RSTB
U 243C 0000         DW  RSTC
U 243E 0000         DW  RSTD
U 2440 0000         DW  RSTE
U 2442 0000         DW  RSTF
2444 2326           DW  RST10
2446 4326           DW  RST11
2448 6926           DW  RST12
244A 6027           DW  RST13
244C 9D27           DW  RST14
244E C027           DW  RST15
2450 CA27           DW  RST16
              ;- - - - - - - - - - - - - - - - - - - - - - - - - - -
                                  ;REGISTER STATE 1
                    ;D,E  HAVE INDEX OF REGISTER BEING PROCESSED
                    ;B,C HAVE LINE NR ASGD.   RFLAG HAS HOOK,REGTM,T



              RST1:
2452 D322           OUT 22H ;  START DIAL TONE
2454 79             MOV  A,C
2455 E618           ANI  18H
2457 07             RLC
2458 C609           ADI  09H           ;FORM DIAL TONE ADDRESS
245A 6F             MOV  L,A
245B 260C           MVI  H,0CH      ;LINE CARD LOCATION
245D 7E             MOV  A,M        ;SUPV TONES
245E 2F             CMA
245F 21B80A         LXI  H,RMASK
2462 09             DAD  B
2463 A6             ANA  M
2464 CA8F23         JZ   NXREG      ;WAIT FOR DIAL TONE
2467 210008         LXI  H,DIGAD
246A 19             DAD  D
246B 6E             MOV  L,M        ;DIGIT LOCATION
246C 25             DCR H;  7
246D 72             MOV  M,D        ;CLEAR DIGIT
246E 210608         LXI  H,REGTM
2471 19             DAD  D
2472 361E           MVI  M,30       ;SET REG TIME =30 SECONDS
2474 23             INX  H
2475 36FF           MVI  M,0FFH     ;STOP GEN TIMER
2477 C31424         JMP  RSI
              ; - - - - - - - - - - - - - - - - - - - - - - - - - -
                                    ;REGISTER STATE 2
                    ;B, C HAVE LINE NR ASGD.   D, E HAVE INDEX OF RE
                    ;BEING PROC.   RFLAG HAS HOOK, REGTM, TONE STATU
                    ;WAIT FOR DIALING


              RST2:
247A D323           OUT 23H ; STOP DIAL TONE
247C 3AD90A         LDA  RFLAG
247F 1F             RAR
2480 1F             RAR
```

```
2481 D28924          JNC   RST2A
2484 3E06            MVI   A,06H       ;STATE 6-DTMF
2486 C31C24          JMP   RSZ         ;IF NOT DTMF THEN HOOK TRANSIT
                                       ;TO BREAK
               RST2A:                  ;PULSE
2489 210708          LXI   H,GENTM
248C 19              DAD   D
               RAA:
248D 360A            MVI   M,0AH        ;SET GENTM = 100 MSEC
248F 3E03            MVI   A,3
2491 C31C24          JMP   RSZ         ;STATE 3
               ;- - - - - - - - - - - - - - - - - - - - - - - - - - - -
                                       ;REGISTER STATE 3
                     ;B&C HAVE LINE NR ASGD.  D&E HAVE INDEX OF REG
                     ;BEING PROC.  RFLAG HAS HOOK, TONE, REGTM STATU
                     ;TIME BREAK
               RST3:
2494 3AD90A          LDA   RFLAG
2497 B7              ORA   A
2498 210708          LXI   H,GENTM     ;THEN HOOK MUST HAVE TRANSIT
249B 19              DAD   D
249C FAB824          JM    RST3A       ;TIME OUT ERROR
249F 7E              MOV   A,M
24A0 FE07            CPI   07H
24A2 D28F23          JNC   NXREG
24A5 210008          LXI   H,DIGAD
24A8 19              DAD   D
24A9 6E              MOV   L,M
24AA 25              DCR H; 7
24AB 34              INR   M           ;INCREMENT DIGIT
24AC 210608          LXI   H,REGTM
24AF 19              DAD   D
24B0 361E            MVI   M,30
24B2 2C              INR   L
24B3 3610            MVI   M,16
24B5 C31424          JMP   RSI
               RST3A:
24B8 3608            MVI   M,8         ;SET GENTM = 80 MSEC
24BA 3E08            MVI   A,8         ;STATE 8
24BC C31C24          JMP   RSZ
               ;- - - - - - - - - - - - - - - - - - - - - - - - - - - -
                                       ;REGISTER STATE 4
                                       ;REGISTER STATE 4
               ;
                     ;B&C HAVE LINE NR ASGD.  D&E HAVE INDEX OF RE
                     ;BEING PROC.  RFLAG HAS KOOK, TONE, REGTM STATU
                     ;TIME MAKE
               RST4:
24BF 3AD90A          LDA   RFLAG
24C2 B7              ORA   A
24C3 FA2C25          JM    RST4R       ;TIME OUT - IDP
                           ;TEST ROTARY ADN AND IDD
24C6 210708          LXI   H,GENTM
24C9 19              DAD   D
24CA 7E              MOV   A,M         ;HOOK IS ZERO, CHECK TIMER VALU
24CB FE0F            CPI   0FH
24CD D28F23          JNC   NXREG       ;LESS THAN 30 MSEC
24D0 FE08            CPI   8
24D2 DAF624          JC    STETX       ;MORE THAN 60 MSEC, ERROR CONDX
24D5 C38D24          JMP   RAA
               RST4A:
24D8 210008          LXI   H,DIGAD
24DB 19              DAD   D
24DC 7E              MOV   A,M
24DD 34              INR   M           ;INCR DIGAD
24DE 25              DCR H; 7
24DF 6F              MOV   L,A         ;PUT DIGIT ADR IN H,L
24E0 7E              MOV   A,M         ;DIGIT
```

```
24E1 F680           ORI  80H          ;MAKE ASCII
24E3 77             MOV  M,A          ;STORE DIGIT
24E4 2C             INR  L
24E5 72             MOV  M,D          ;CLEAR NEXT DIGIT LOCATION
24E6 7D            MOV A,L
24E7 E61F          ANI 1FH
24E9 FE1F          CPI 1FH; TEST END OF BUFFER
24EB CAF624         JZ   STETX        ;YES, STORE ETX
24EE 210308         LXI  H,MXDIG
24F1 19             DAD  D
24F2 35             DCR  M            ;IS MXDIG ZERO?
24F3 C21325         JNZ  RST4B        ;NO, SET UP FOR NXDIGIT
              STETX:
24F6 210208         LXI  H,RSTAT
24F9 19             DAD  D
24FA 3E01           MVI  A,01H
24FC B6             ORA  M            ;SET DIALING COMPLETE BIT
24FD 77             MOV  M,A
24FE 210008         LXI  H,DIGAD
2501 19             DAD  D
2502 6E             MOV  L,M
2503 25            DCR H; 7
2504 3603           MVI  M,ETX
             CLRX:
2506 210608         LXI  H,REGTM
2509 19             DAD  D
250A 36FF           MVI  M,0FFH       ;STOP TIMER
250C 23             INX  H            ;GENTM
250D 36FF           MVI  M,0FFH       ;STOP TIMER
250F AF             XRA  A            ;CLEAR A
2510 C31C24         JMP RSZ           ;STATE 0

              RST4B:
2513 FE10          CPI 10H; 1ST OF LAST 5 IDD DIGITS
2515 DA1D25        JC RST4C
2518 3E05          MVI A,5 ; 5 SEC TIMER FOR LAST 4 DIGITS
251A C31F25        JMP RST4D
251D 3E1E    RST4C: MVI A,30
             RST4D:
251F 210608         LXI  H,REGTM
2522 19             DAD  D
2523 77             MOV M,A         ;SET REGTM= 30 SEC
             ;OR 5 SEC IF LAST 4 DIGITS OF IDDD
2524 2C             INR  L
2525 36FF           MVI  M,0FFH       ;STOP GENTM
2527 3E02           MVI  A,2          ;STATE 2
2529 C31C24        JMP RSZ

             ;*************

             ;ROTARY ADN
             ;****************
             ;END OF DIGIT,CHECK IF WAITING FOR CALLED NO,
             ;AND IF SECOND DIGIT IS NOT 1 0R 0
             ;REPACK IN ADN FORMAT AND SEND MESSAGE

252C 21000A  RST4R:  LXI H,CPSTAT     ; CALL PROC STATE
252F 09            DAD B
2530 7E            MOV A,M
2531 FE06          CPI 6    ;WAITING CALLED NO
2533 C2D824        JNZ RST4A ; STORE DIGIT
2536 210008        LXI H,DIGAD
2539 19            DAD D
253A 7E            MOV A,M ;DIGIT ADR
253B 6F            MOV L,A
253C E61F          ANI 1FH
253E FE04          CPI 4H   ; SECOND DIGIT
2540 CA6625        JZ RST4S          ;CHECK ROTARY ADN
             ;*****************
             ;IDD CHECK
             ;******************
2543 FE05          CPI 5H   ;3RD DIGIT
2545 C2D824        JNZ RST4A ; NO
             ;; CHECK IDD CODE
2548 25            DCR H;7
```

```
2549 7E              MOV A,M ; 3RD DIGIT
254A FE01            CPI 1
254C C2D824          JNZ RST4A
254F 2D              DCR L    ; 2ND DIGIT
2550 7E              MOV A,M
2551 FE81            CPI 81H
2553 C2D824          JNZ RST4A
2556 2D              DCR L    ;1ST DIGIT
2557 7E              MOV A,M
2558 FE8A            CPI 8AH ; 0
255A C2D824          JNZ RST4A
              ;ROTARY
              ;IDD CODE 011 DIALED
255D 210308          LXI H,MXDIG ; NO. TO EXPECT
2560 19              DAD D
2561 3610            MVI M,16 ; EXPECT 15 MORE
2563 C3D824          JMP RST4A
              ;CHECK ROTARY ADN-2ND DIGIT
2566 25       RST4S: DCR H; 7
2567 7E              MOV A,M ; DIGIT
2568 FE01            CPI 1
256A CAD824          JZ RST4A
256D FE0A            CPI 0AH ; 10
256F CAD824          JZ RST4A
              ;ADN ENTERED
2572 F680            ORI 80H ; ASCII
2574 2D              DCR L
2575 4E              MOV C,M ; 1ST DIGIT
2576 368B            MVI M,8BH;*
2578 2C              INR L
2579 71              MOV M,C ; 1ST DIGIT
257A 2C              INR L
257B 77              MOV M,A ; 2ND DIGIT
257C 2C              INR L
257D 368C            MVI M,8CH;#
257F 210008          LXI H,DIGAD
2582 19              DAD D
2583 34              INR M
2584 34              INR M
2585 34              INR M
2586 C3F624          JMP STETX
              ;- - - - - - - - - - - - - - - - - - - - - - - - - - -

                                    ;REGISTER STATE 6

                     ;B&C HAVE LINE NR ASGD.  D&E HAVE REG INDEX.
                     ;RFLAG HAS HOOK, TONE AND REGTM STATUS.
                     ;
                     ;TONE DIALING
              RST6:
2589 3AD90A          LDA  RFLAG
258C 1F              RAR
258D 1F              RAR              ;TONES BIT
258E D28F23          JNC  NXREG
2591 DB27             IN 27H        ;READ DTMF ONCE. RET W/BITS IN A
2593 CDFA27          CALL DTMFC       ;RETURNS WITH VALUE IN A
2596 F680            ORI  80H         ;MAKE IT ASCII
2598 210008          LXI  H,DIGAD
259B 19              DAD  D
259C E5              PUSH  H
259D 6E              MOV  L,M         ;STORE DIGIT
259E 25             DCR H;7
259F 77              MOV  M,A
25A0 FE8C            CPI  POUND
25A2 CAEA25          JZ  RST6B        ;FORST OR LAST DIGIT
25A5 FE8B            CPI  STAR
25A7 CAF925          JZ  RST6C        ;RESET MXDIG= 10
25AA 7D              MOV  A,L
25AB E61F            ANI  1FH         ;TAKE OUT REG NR
25AD FE1E            CPI  1EH         ;IS IT END OF REG?
25AF F5             PUSH PSW
              ;CHECK FOR IDDD
25B0 FE05           CPI 5H  ; 3RD DIGIT
25B2 C2CF25         JNZ RSTU
```

```
25B5 7E             MOV A,M
25B6 FE81           CPI 81H
25B8 C2CF25         JNZ RSTU
25BB 2D             DCR L ; 2ND
25BC 7E             MOV A,M
25BD FE81           CPI 81H
25BF C2CF25         JNZ RSTU
25C2 2D             DCR L
25C3 7E             MOV A,M
25C4 FE8A           CPI 8AH ; 0
25C6 C2CF25         JNZ RSTU
            ;IDD CODE
25C9 210308         LXI H,MXDIG
25CC 19                     DAD D
25CD 3610           MVI M,16 ; EXPEXT 15 MORE
            RSTT:
            RSTU:
25CF F1             POP  PSW
25D0 E1              POP  H
25D1 F5              PUSH PSW
25D2 34              INR  M          ;ADVANCE DIGIT ADR
25D3 F1              POP PSW
25D4 CAF624          JZ   STETX      ;YES, END OF REG
             RST6A:
25D7 210308          LXI  H,MXDIG
25DA 19              DAD  D
25DB 35              DCR  M          ;DECREMENT MAX DIGIT
25DC CAF624          JZ   STETX
25DF 210608          LXI  H,REGTM
25E2 19              DAD  D
25E3 361E            MVI  M,30       ;SET REGTM= 30 SEC
25E5 2C              INR  L          ;GENTM
25E6 72              MOV  M,D        ;ZERO TIMER
25E7 C31424          JMP  RSI
             RST6B:         ;#
25EA E1              POP  H          ;DIGAD
25EB 7E              MOV  A,M
25EC E61F            ANI  1FH        ;TAKE OUT REG NR
25EE FE03            CPI  3H        ;FIRST DIGIT LOCATION
25F0 F5              PUSH PSW
25F1 34              INR  M          ;ADVANCE DIGAD
25F2 F1              POP PSW
25F3 C2F624          JNZ  STETX      ;NO, STORE ETX
25F6 C3D725          JMP  RST6A
             RST6C:         ;*
25F9 7D             MOV A,L
25FA E61F           ANI 1FH
25FC FE1E           CPI 1EH
25FE CACF25         JZ RSTT
2601 E1              POP  H
2602 34              INR  M          ;ADVANCE DIGAD
2603 210308          LXI  H,MXDIG
2606 19              DAD  D
2607 360B            MVI  M,11       ;SET MXDIG= 10
2609 C3D725          JMP  RST6A

             ; - - - - - - - - - - - - - - - - - - - - - - - - - - -

                                     ;REGISTER  STATE  7

                     ;B&C HAVE LINE NR ASGD.  D&E HAVE  REGISTER BAS
                     ;RFLAG HAS HOOK, REGTM AND TONE STATUS.
                     ;
                     ;WAIT FOR TONE TO STOP

             RST7:
260C 3AD90A          LDA  RFLAG
260F 1F              RAR
2610 1F              RAR
2611 DA8F23          JC   NXREG      ;TONES PRESENT?
2614 3E06            MVI  A,06H      ;NO, STATE 6
2616 C31C24          JMP  RSZ
             ; - - - - - - - - - - - - - - - - - - - - - - - - - - -
```

```
                  ;REGISTER STATE 8
                          ;ERROR TIME OUT
                          ;ENTERRED WHEN GENTM = 0 OR WHEN TRANSIT TO
                          ;OFF HOOK FROM STATE 3 WHEN ON HOOK FOR
                          ;MORE THAN 100 MSEC
                          ;
                          ;
                  RST8:
2619 3AD90A               LDA RFLAG
261C B7                   ORA  A
261D FA0625               JM   CLRX       ;RESET TIMERS AND GO TO IDLE
2620 C3F624               JMP  STETX       ;YES, ERROR
                  ;- - - - - - - - - - - - - - - - - - - - - - - - - - -
                  ; - - - - - - - - - - - - - - - - - - - - - - - - - - -
                  ;REGISTER STATE 10
                          ;B,C HAVE LINE NR ASGD,   D,E HAVE INDEX OF
                          ;REGISTER BEING PROCESSED.   REQUIEST FOR
                          ;SERVICE WAS SENT TO PBX WHEN REGISTER WAS CONN
                          ;TO THE INPUT LINE;
                          ;
                          ;
                  RST10:                      ;ENTRY FOR DIALING AN EXTENSION
2623 210008               LXI H,DIGAD
2626 19                   DAD D
2627 7D                   MOV A,L
2628 C604                 ADI 4H
262A 77                   MOV M,A
262B 211E08               LXI  H,ROLDST-1
262E 19.                  DAD  D
262F 3601                 MVI  M,01H      ;SET DIAL IN FLAG
                  ;  GO OFF HOOK TO PBX AND WAIT
2631 3E01                 MVI A,1
2633 D5                   PUSH D
2634 2E02                 MVI L,2 ;  SET L TO DIAL IN
2636 CF                   RST 1
2637 D1                   POP D
                  RS17A:
2638 210708               LXI H,GENTM
263B 19                   DAD D
263C 3600                 MVI M,0
263E 3E12                 MVI A,12H
2640 C31C24               JMP RSZ
                  ; - - - - - - - - - - - - - - - - - - - - - - - - - - -
                                        ;REGISTER STATE 11
                  RST11:
                  ; ENTRY FOR OUTWARD DIALING
2643 210107               LXI  H,MSG0+1
2646 19                   DAD  D
2647 7E                   MOV  A,M
2648 FE46                 CPI  'F'        ;IS IT F?
264A CA3826              JZ RS17A        ; WAIT 600MS
264D 210008               LXI  H,DIGAD
2650 19                   DAD  D
2651 7D                   MOV  A,L
2652 C604                 ADI  4H
2654 77                   MOV  M,A        ;SET DIGAD = STX+4
2655 C33826               JMP  RS17A
                  ; - - - - - - - - - - - - - - - - - - - - - - - - - - -
                  DIALT:                      ;LOOK FOR DIAL TONE
2658 79                   MOV A,C
2659 07                   RLC
265A E630                 ANI  30H
265C F609                ORI 09H;        SPV TONES
265E 6F                   MOV  L,A
265F 260C                 MVI  H,0CH
2661 7E                   MOV  A,M
2662 2F                   CMA
```

```
2663 21B80A          LXI  H,RMASK
2666 09              DAD  B
2667 A6              ANA  M
2668 C9              RET             ;RETURNS WITH DIAL TONE BIT
                                     ;0= NO DIAL TONE
                 ; - - - - - - - - - - - - - - - - - - - - - - - - -

                                    ;REGISTER STATE 12
                     ;B,C HAVE LINE NR ASGD.  D,E HAVE INDEX OF
                     ;REGISTER BEING PROCESSED.

                     ;SET UP OUTPULSE
                 RST12:
2669 3AD90A          LDA RFLAG
266C E681            ANI  81H
266E CA8F23          JZ   NXREG      ;FALSE ENTRY, EXIT
2671 210008          LXI  H,DIGAD
2674 19              DAD  D
2675 6E              MOV  L,M
2676 25             DCR H ;7
2677 7E              MOV  A,M
2678 F5              PUSH PSW        ;SAVE DIGIT
2679 FE8B            CPI  STAR
267B CAEA26          JZ   RS12A
267E FE03            CPI  ETX
2680 CAF426          JZ   RS12B      ;OUT DIALING COMPLETE
2683 E660            ANI  60H        ;WAIT BITS
2685 C21C27          JNZ  RS12D      ;PROCESS WAIT
2688 210708          LXI  H,GENTM
268B 19              DAD  D
268C 3606            MVI  M,6        ;SET GENTM =60 MSEC
268E 79              MOV  A,C
268F E618            ANI  18H
2691 0F              RRC
2692 0F              RRC
2693 0F              RRC
2694 21E409          LXI  H,CLASS
2697 85               ADD  L
                 ; INPUT OR OUTPUT LINE CLASS
2698 F5              PUSH PSW
2699 211E08          LXI H,ROLDST-1
269C 19              DAD D
269D 7E              MOV A,M
269E 1F              RAR
269F DAA626          JC RSA   ; DIAL IN
26A2 F1              POP PSW
26A3 C3B326          JMP RSB
26A6 F1          RSA:  POP PSW
26A7 6F             MOV L,A
26A8 2609           MVI H,9 ; ***
26AA 7E             MOV A,M
26AB 21B80A         LXI H,RMASK
26AE 09             DAD B
26AF A6             ANA M   ;BY INPUT LINE
26B0 C3D326         JMP RSC
                 RSB:
                ;OUTPUT LINE
26B3 21C309         LXI H,OULIN
26B6 09             DAD B
26B7 7E             MOV A,M ; OUTPUT LINE NO.
26B8 E618           ANI 18H
26BA 0F             RRC
26BB 0F             RRC
26BC 0F             RRC
26BD 21E409         LXI H,CLASS
26C0 85             ADD L
26C1 C604           ADI 4
26C3 6F              MOV L,A
26C4 2609           MVI H,9         ;***WATCH OUT
26C6 7E             MOV A,M
26C7 C5             PUSH B
26C8 21C309         LXI H,OULIN
26CB 09             DAD B
26CC 4E             MOV C,M
```

```
26CD 21B80A         LXI   H,RMASK
26D0 09             DAD   B; OUTPUT LINE
26D1 C1             POP B
26D2 A6             ANA   M
               RSC:
26D3 C20627         JNZ RS12C          ;DTMF
26D6 211E08         LXI   H,ROLDST-1
26D9 19             DAD   D
26DA F1             POP PSW
26DB 7E             MOV   A,M
26DC 1F             RAR                ;CARRY SET IF DI
26DD 78             MOV   A,B          ;RESET TO BREAK
26DE 68             MOV L,B           ; SET L TO DO FUNCTION
26DF D2E426         JNC   $+5          ;NO CARRY = DO
26E2 2E02           MVI   L,2          ;SET L TO DI FUNCT
26E4 D5             PUSH D
26E5 CF             RST   1
26E6 D1             POP D
26E7 C31424         JMP   RSI
               RS12A:
26EA 210008         LXI   H,DIGAD
26ED 19             DAD   D
26EE 34             INR   M            ;INCR DIGAD
26EF 211E08         LXI   H,ROLDST-1
26F2 19             DAD   D
26F3 70             MOV   M,B          ;CLEAR DIAL IN FLAG
                    ;
               RS12B:         ;OUTDIALING COMPLETE
26F4 F1             POP   PSW
26F5 210208         LXI   H,RSTAT
26F8 19             DAD   D
26F9 7E             MOV   A,M
26FA F608           ORI   08H          ;OUTDIALING COMPLETE BIT
26FC 77             MOV   M,A          ;SET OUT DIALING COMPL
26FD 214909         LXI   H,TIME3
2700 09             DAD B
2701 70             MOV   M,B          ;SET TIME3-0
2702 AF             XRA A
2703 C31C24         JMP RSZ
               RS12C:         ;OUTPUT DTMF
2706 F1             POP   PSW
2707 210708         LXI   H,GENTM
270A 19             DAD   D
270B 360A           MVI   M,10          ;SET GENTM=100 MSEC
270D 21ED27         LXI   H,STBL       ;CONVERT TO DTMF
2710 E60F           ANI   0FH          ;REMOVE ASCII BIT
2712 85             ADD   L
2713 6F             MOV   L,A
2714 7E             MOV   A,M          ;DTMF BITS
2715 D320           OUT 20H; LOAD DTMF
2717 3E16           MVI   A,16H
2719 C31C24         JMP RSZ
               RS12D:         ;CHECK WAIT BITS
271C E620           ANI   20H          ;DIAL TONE BIT
271E E5             PUSH H
271F C22B27          JNZ  RS12F
               ;WAIT 600 MS BIT SET
2722 210408         LXI H,REGST
2725 19             DAD  D
2726 360A           MVI M,0AH; 600 MS WAIT
2728 C33127         JMP RS12E
               RS12F:
272B 210408         LXI H,REGST
272E 19             DAD  D
272F 3609           MVI M,09H; DIAL TONE WAIT
               RS12E:
2731 E1             POP H
2732 F1             POP  PSW
2733 E69F           ANI  09FH
2735 77             MOV M,A ; RESTORE DIGIT W/O WAIT BIT SET
2736 210009         LXI H,LSTATE
2739 09             DAD B
273A 3609           MVI M,9
273C 219009         LXI H,HOOKT
273F 09             DAD B
```

```
2740 70              MOV M,B ; CALL UP ST 9 EVERY 40MS
2741 214909          LXI H,TIME3
2744 09              DAD B
2745 3606            MVI M,6 ; 6 SEC TIMEOUT
             ;SET SPV PER IN OR OUT DIAL
2747 21000A          LXI H,CPSTAT
274A 09              DAD B
274B 7E              MOV A,M
274C FE20            CPI 20H ; OUTDIALING
274E F5              PUSH PSW
274F 21550A          LXI H,SPV
2752 09              DAD B
2753 F1              POP PSW
2754 C25B27          JNZ RS12G
             ;OFF HOOK
2757 70              MOV M,B ; OFF HOOK SET SPV
2758 C35D27          JMP RS12H
275B 36FF    RS12G:  MVI M,0FFH ; FLAG ON HOOK
275D C38F23  RS12H:  JMP NXREG; WAIT DIAL TONE OR 600MS
                        ;CALL PROC GETS CALLED UP AT NODE
                        ;AND RESTARTS DIALING
             ; - - - - - - - - - - - - - - - - - - - - - - - - - - - - -

                                      ;REGISTER STATE 13

                     ;
                     ;TIME BREAK
             RST13:
2760 3AD90A          LDA RFLAG
2763 E601            ANI 1 ; TRANSITION
2765 C28F23          JNZ NXREG; GLITCH-FALSE ENTRY
2768 210708           LXI  H,GENTM
276B 19               DAD  D
276C 3604             MVI  M,4        ;YES,  SET GENTM = 40 MSEC
276E E5               PUSH  H
276F 210008           LXI  H,DIGAD
2772 19               DAD  D
2773 6E               MOV  L,M
2774 25              DCR H ; 7
2775 7E               MOV A,M
2776 E60F             ANI 0FH         ; STRIP ASCII
2778 77               MOV M,A
2779 35               DCR  M          ;DECREMENT DIGIT
277A E1               POP  H
277B C28627           JNZ  RS13A      ;PULSE COUNT IS NOT ZERO
             ; TIME IDG
277E 363C             MVI  M,60       ;PULSE COUNT ZERO, SET GENTM -6
2780 210408           LXI H,REGST     ; SET REG STATE 14
2783 19               DAD D
2784 3614             MVI M,14H       ; SO IT GOES TO 15 NEXT
             RS13A:
2786 211E08           LXI  H,ROLDST-1 ;DI  FLAG INDEX
2789 19               DAD  D
278A 7E               MOV  A,M
278B B7               ORA  A  ;SET FLAGS
278C 3E01            MVI  A,1
278E CA9627          JZ   RS13B      ;DIAL OUT
2791 2E02             MVI  L,2        ;SET DIAL IN
2793 C39727           JMP RS13C
             RS13B:
2796 68               MOV  L,B        ;SET DIAL OUT
2797 D5      RS13C:   PUSH D
2798 CF               RST  1
2799 D1               POP D
279A C31424           JMP  RSI
             ;  --  --  --  --  --  --  --  ---  ---  ---  ---   ---

                                      ;REGISTER STATE 14

                     ;

                     ;TIME MAKE
             RST14:
279D 3AD90A          LDA RFLAG
27A0 E601            ANI 1 ; TRANSITION
```

```
     27A2 C28F23          JNZ NXREG; GLITCH-FALSE ENTRY
     27A5 210708          LXI  H,GENTM
     27A8 19              DAD  D
     27A9 3606            MVI  M,6         ;YES, SET GENTM = 60 MSEC
     27AB 211E08          LXI  H,ROLDST-1
     27AE 19              DAD  D
     27AF 7E              MOV A,M
     27B0 B7              ORA  A           ;SET FLAGS
     27B1 78              MOV  A,B         ;RESET DIALING
     27B2 2E02            MVI  L,2         ;SET DIAL IN
     27B4 C2B827          JNZ   RS14A      ;DIAL IN
     27B7 68              MOV  L,B         ;SET DIAL OUT
                  RS14A:
     27B8 D5              PUSH D
     27B9 CF              RST  1
     27BA D1              POP D
     27BB 3E13            MVI  A,13H
     27BD C31C24          JMP  RSZ
                  ; - - - - - - - - - - - - - - - - - - - - - - - - - - -
                                    ;REGISTER STATE 15
                          ;
                          ;IDP

                  RST15:            ;WAIT 600 MSEC

     27C0 210008          LXI  H,DIGAD
     27C3 19              DAD  D
     27C4 34              INR  M           ;ADVANCE DIGAD TO NXT DIGIT
                  RS15A:
     27C5 3E12            MVI  A,12H
     27C7 C31C24          JMP  RSZ
                  ; - - - - - - - - - - - - - - - - - - - - - - - - - - -
                                    ;REGISTER STATE 16
                          ;
                          ;
                  RST16:            ;STOP DTMF AFTER 80 MSEC
     27CA 210708          LXI  H,GENTM
     27CD 19              DAD  D
     27CE 7A              MOV  A,D
     27CF B6              ORA  M
     27D0 C28F23          JNZ  NXREG       ;IGNORE OWN TONE
     27D3 360A            MVI  M,10        ;SET GENTM = 100 MSEC
     27D5 D321            OUT 21H ; RESET DTMF
     27D7 210008          LXI  H,DIGAD     ;ADVANCE DIGAD TO NXT DIGIT
     27DA 19              DAD  D
     27DB 34              INR  M
     27DC C3C527          JMP RS15A        ;SET STATE 12
                  DTBL:                    ;RECIEVE DIGIT TABLE
     27DF FF              DB   0FFH        ;DUMMY
     27E0 11              DB   11H         ;1
     27E1 12              DB   12H         ;2
     27E2 14              DB   14H         ;3
     27E3 21              DB   21H         ;4
     27E4 22              DB   22H         ;5
     27E5 24              DB   24H         ;6
     27E6 41              DB   41H         ;7
     27E7 42              DB   42H         ;8
     27E8 44              DB   44H         ;9
     27E9 82              DB   82H         ;0(A)
     27EA 81              DB   81H         ;STAR
     27EB 84              DB   84H         ;POUND
     27EC 00              DB   00H         ;END OF TABLE
                  STBL:                    ;SEND DIGIT TABLE
     27ED FF              DB   0FFH        ;DUMMY
     27EE EE              DB   0EEH        ;1
     27EF DE              DB   0DEH        ;2
     27F0 BE              DB   0BEH        ;3
     27F1 ED              DB   0EDH        ;4
     27F2 DD              DB   0DDH        ;5
     27F3 BD              DB   0BDH        ;6
     27F4 EB              DB   0EBH        ;7
     27F5 DB              DB   0DBH        ;8
     27F6 BB              DB   0BBH        ;9
     27F7 D7              DB   0D7H        ;0 (A)
```

```
27F8 E7                   DB    0E7H         ;STAR
27F9 B7                   DB    0B7H         ;POUND
                ;
                DTMFC:
                                             ;A HAS BITS FROM DTMF RCVR.
                                             ;LOOK UP BINARY VALUE.
27FA 47                   MOV   B,A          ;SAVE BITS
27FB 21DF27               LXI   H,DTBL
27FE 55                   MOV   D,L          ;SAVE L
                MFC3:
27FF 7E                   MOV   A,M          ;GET TABLE VALUE
2800 B8                   CMP   B            ;IST IT THIS DIGIT?
2801 CA0C28               JZ    MFC1         ;YES RETURN
2804 B7                   ORA   A            ;NO, END OF TABLE?
2805 CA1128               JZ    MFC2         ;YES, STORE ETX
2808 2C                   INR   L
2809 C3FF27               JMP   MFC3         ;NO, CHECK NEXT ENTR MSEC
                MFC1:
280C 7D                   MOV   A,L          ;TABLE PSN
280D 92                   SUB   D            ;SUBTRACT STARTING PSN
280E 1600                 MVI   D,0
2810 C9                   RET
                MFC2:
2811 F1                   POP   PSW          ;ERROR
2812 C3F624               JMP   STETX        ;STORE ETX
                BEEP:
2815 D5                   PUSH D

2816 AF                   XRA A
2817 2E05                 MVI L,5
2819 CF                   RST 1
281A 3E01                 MVI A,1
281C 2E05                 MVI L,5
281E CF                   RST 1
281F D1                   POP D
2820 C9                   RET
                ;
0000                      END
```

```
                ;CALL PROCESSING ROUTINES- PHASE 2
                          ; SOURCE W TDXII1
                          ; OBJECT WC TDXII1
                          ; LISTING LIST TDXII4
                ;         DATE 25 OCT 76

0000                      ORG 0700H
0700            MSG0:     DS 32   ;MESSAGE BUFFERS
0720            MSG1:     DS 32
0740            MSG2:     DS 32
0760            MSG3:     DS 32
0780            MSG4:     DS 32
07A0            MSG5:     DS 32
07C0            MSG6:     DS 32
07E0            MSG7:     DS 32
0800                              ORG 0800H
                                          ;REGISTER SPACE
                                          ;REGISTER 0
                REG0:
0800 00         DIGAD:    DB      0       ;DIGIT ADRESS
0801 00         INLIN:    DB      0       ;LINE NUMBER ASGD
0802 00         RSTAT:    DB      0       ;REGISTER STATUS
                          ;STATUS FLAG BITS -CALL UP CALL PROC
                          ;BIT 0- 01H DIALING COMPLETE
                          ;BIT 1-02H LINE ON HOOK
                          ;BIT 2- 04H MESSAGE RECEIVED IN BUFFER
                          ;BIT 3- 08H OUTDIALING COMPLETE
                          ;BIT 4- 10H MATRIX SWITCHING DONE
                          ;BIT 5-20H RECALL TIMER DONE
                          ;BIT 6- 40H STAR TONES RECEIVED
                          ;BIT 7- 80H QUEUE UP MESSAGE
0803 00         MXDIG:    DB      0       ;MAX NR OF DIGITS EXPECTED
0804 00         REGST:    DB      0       ;REGISTER SENDER STATE
0805 00         MATR:     DB      0       ;MATRIX CONTROL WORD
0806 00         REGTM:    DB      0       ;REGISTER TIMER
0807 00         GENTM:    DB      0       ;GENERAL TIMER
```

```
0808            DIGIT:  DS      23      ; MOVED MESSAGES TO BANK 7
                        ;
081F 00         ROLDST: DB      0       ;REGISTER OLD STATUS
0820            REG1:   DS      20H
0840            REG2:   DS      20H
0860            REG3:   DS      20H
0880            REG4:   DS      20H
08A0            REG5:   DS      20H
08C0            REG6:   DS      20H
08E0            REG7:   DS      20H
                                        ;LTNE SCANNER TABLES
                                        ;STORED BY WORD (8LINES PER WORD
0900                    ORG  0900H
                                        ;STORED BY LINE
0900            LSTATE: DS   33D        ;LINE SCANNER STATE
0921 0000       TIMADR: DW 0            ;ADDR OF NEXT TIMER TO BE UPDATE
0923            T10MS:  DS      38D     ;165 MS TIMER
                                        ;TIME3 MUST FOLLOW T10MS
0949            TIME3:  DS   33D        ;3 MINUTE TIMER
096A 00         NODR:   DB 0    ; IF ZERO- 10 SEC SINCE DR
096B 00         CART1: DB 0 ; TIMERER FFOR DEDICATED CARRIER
096C 00         CART2: DB 0 ; TIMER FOR BACKUP CARRIER
096D 00         CART3:  DB 0
096E 00         CART4:  DB 0
096F            REGAS:  DS   33D        ;REGISTER NUMBER ASSIGNED
0990            HOOKT:  DS 33   ;HOOK TIMER
09B1 00         LINR:   DB   0          ;LINE NUMBER
09B2 00         LPROC:  DB   0          ;LINES TO BE PROCESSED
09B3 0000       NWSTA:  DW   0          ;NEW STATE ADDRESS
09B5 0100       MSGUN:  DW   1          ;ONE TENTH MIN TIMER INIT TO 258
09B7 00         CURST:  DB   0          ;CURRENT HOOK STATUS
09B8 0000       LINST:  DW   0          ;ADR OF STATE OF LINE BEING PROC
09BA 00         MASK:   DB   0          ;MASK OF LINE BEING PROCESSED
09BB            OLDST:  DS   4D         ;OLD STATUS
09BF            NEWST:  DS   4D         ;NEW STATUS
09C3            OULIN:  DS      33D     ;OUT LINE CONNECTED TO
                                                ;INLINE
                                        ;SET ON CONNECT, RESET BY DISCON
09E4            CLASS:  DS 8
09EC                    ORG  0A00H
                                        ;CALL PROCESSING TABLES
                                        ;STORED BY LINE
0A00            CPSTAT: DS   33D        ;CALL PROCESSOR STATE


                                        ;INTERUPT FLAGS
0A21 00         ERRFLG: DB   0          ;RCV DATA ERROR
0A22 00         THREFL: DB   0          ;TRAN HLDG REG EMPTY
0A23 00         DRFLG:  DB   0          ;RCV DATA READY
0A24 00         INTLEV: DB 0;           CURRENT INTERRUPT STATUS

                                        ;COMMUNICATIONS
0A25 00         COMFLG: DB   0          ;STATUS FLAG
                                        ;0=NO COMM IN PROG
                                        ;1=SENDING
                                        ;2=RECEIVING
0A26 0000       REGCOM: DW   0          ;ADR OF STATUS WORD, REGISTER IN
0A28 0000       CHTCOM: DW   0          ;CHARACTER ADDRESS
0A2A 0000       REPST:  DW   0          ;LOCATION WHERE REPLY IS TO BE P
0A2C 0000       TRNST:  DW   0          ;START OF MSG TO TRANSMIT
                                        ;MATRIX SWITCHING
                                        ; ADDRESS OF CONTROL WORD OF
0A2E 0000       MATREG: DW   0          ;REGISTER BEING PROCESSED BY SWI
0A30            TRY:    DS   33         ;1ST OR SECOND TRY - 1 BYTE PER
0A51 0000       RGSTAT: DW 0; ADDRESS OF REGISTER STATUS WORD
0A53 0000       RGSTX: DW 0 ; ADDRESS OF STX OF CURRENT REGISTER

0A55            SPV:    DS    33        ;0=NONE
                                        ;1=HANGUP
                                        ;2=DIAL TONE
                                        ;3=BUSY
                                        ;6=ANSWER
0A76            TIMEX:  DS 33           ;TIMER FOR SUPERVISORY TONES ROU
0A97            SPCTR:  DS 33           ;COUNTER FOR BUSY AND RING
                                        ;2BITS EA FOR 60 AND 120 IPS AND
```

```
112   0040          BLANK     EQU     40H
113   008B          STAR      EQU     8BH
114   008C          POUND     EQU     8CH
115   0002          STX       EQU     02H
116   0003          ETX       EQU     03H
117   0001          NULL      EQU     01H
118   0006          ACK       EQU     06H
119   0015                    NAK EQU 15H
120   0AB8          RMASK:    DS  33                ;MASK FOR LINE ASGD
121   0AD9 00       RFLAG:    DB     0              ;REGISTER FLAGS
122                                                 ;0 BIT=HOOK TRANSITION
123                                                 ;1 BIT - TONES
124                                                 ;  6 BIT - HOOK STATE
125                                                 ;7 BIT - REG TIME OUT
126   0ADA 00       LSTRG: DB 0
127
128   0ADB 00       RGFLG: DB 0 ; 0 IF SENDING RE,FOR REG BUSY
129   0ADC                    ORG 400H
130   0400          INLET:    DS 4 ; INLET TIE LINE =1
131   0404          TIE: DS 4 ; OUTLET TIE LINE =1
132   0408 00       RGPRES: DB 0 ; REGISTERS PRESENT, 1=NOT
133   0409 00       RGBUSY: DB 0 ; REGISTERS BUSY, 1=BUSY
134   040A 00       RGUSE: DB 0 ; REGISTERS ASSIGNED, 1=ASSIGNED
135   040B 00       RGROT: DB 0 ; ROTARY BIT FOR REGISTER SELECTION
136   040C 00       WFLG: DB 0 ; 1=WAITINNG FOR REGISTER RELEASE
137                                 ;FOR WAIT CONTROL
138   040D          BTIME: DS 33 ; SET TO 3 MIN FOR 3 MIN BEEP
139                                 ;OR FF FOR NO BEEP
140   042E 00       CRST1: DB 0 ; CARRIER STATE S DEDICATED
141   042F 00       CRST2: DB 0 ; CARRIER STATE BACKUP
142   0430 00       CARSW: DB 0 ; SWITCH FOR TOGGLING BIT
143   0431 00       RSAVE: DB 0; TEMP STORAGE FOR RGBUSY
144   0432          NODE: DS 33 ; NUMBER OF NODE REACHED
145   0453          DELAY:    DS 33
146*  0474                    ORG 0
147                                                 ;RESTART 0 - POWER UP
148   0000 31FF0B   INT0:               LXI   SP,0BFFH    ;SET STACK POINTER TO
149                                                 ;TOP OF RAM.
150   0003 0600               MVI   B,0             ;SET UP TO CLEAR RAM & HARWARE
151                                                 ;MEMORY.
152   0005 C33E01             JMP   INIT            ;PROGRAM INITIALIZATION
153                                                 ;  RESTART 1- SUBROUTINE TO
154                                                 ;  COMPUTE MEMORY ADDRESS
155                                                 ;  SEE DETAIL AT REST1
156   0008 5F                 MOV E,A               ;  SAVE FLAG
157   0009 79                 MOV A,C               ;LINE NO
158   000A 07                 RLC
159   000B E630               ANI 30H               ;WORD NO
160   000D C33E00             JMP REST1             ;  A HAS LOW ORDER ADR OF STATUS
161                           ;
162                 ; RESTART 2- RESET SUB TIMER
163   0010 212309             LXI H,T10MS
164   0013 09                 DAD B
165   0014 3605               MVI M,5
166   0016 C9                 RET
167   0017 00                 DB 0
168                 ;
169                                                 ;RESTART 3 - RECEIVE DATA ERROR
170   0018 F5       INT3:     PUSH PSW                    ;SAVE A AND FLAGS
171   0019 D34B               OUT 4BH ; MASTER RESET UART
172   001B 3E01               MVI   A,1
173   001D C35900             JMP   INTR3
174   0020                    DS 8 ;RESTART 4-SPARE
175
176                                                 ; RST 5- SPARE
177   0028 021503   NAKR:     DB STX,NAK,ETX
178   002B                    DS 5
179                                                 ;RESTART 6 - DATA READY

146     0480*                 *NAK FLG:  DW00
prime
```

```
0066        C3
 67         DØ                     PATCH 1 Ø3DØ
 68         Ø3
 RETURN

Ø3DØ
PATCH 1:  C2, 18, Ø1                    JNZ RETN
          3A, 8Ø, Ø4                    LDA NAKFLG
          B7                            ORA A
          CA  69  ØØ                    JZ RETURN TO INLINE--BACK
          DB  18                        IN 18H; DON'T STORE CHAR.
          FE  03                        CPI ETX
          C2  E6  ØØ                    JNZ SNAK
          3E, ØØ                        MVI A, ØØ
          32, 8Ø, Ø4                    STA NAKFLG; CLEAR FLAG
          C3, E6, ØØ                    JMP RESEND

006B        C3
 6C         E9
 6D         Ø3                     PATCH 2
 RETURN

PATCH 2:
Ø3E9      2A, 28, ØA                    LHLD CHTCOM
          FE  15                        CPI NAK
          C2, 6E, ØØ                    JNZ INLINE TO STORE CHAR.
          32, 8Ø, Ø4                    STA NAKFLG
          C3, 18, 01                    JMP RETN; WAIT NEXT CHAR.
```

```
0030 F5        INT6:    PUSH PSW            ;SAVE A AND FLAGS
0031 E5                 PUSH H          ;SAVE H AND L
0032 D5                 PUSH D          ;SAV  D AND E
0033 C35F00             JMP  INTR6
0036 0000               DW   0
                                        ;RESTART 7 - THRE
0038 F5        INT7:    PUSH PSW            ;SAVE A AND FLAGS
0039 E5                 PUSH H          ;SAVE H AND L
003A D5                 PUSH D          ;SAVE D AND E
003B C30201             JMP  INTR7
               ;--------------------
               ; SUBROUTINE TO COMPUTE MEMORY ADDRESS
               ; AND BIT POSITION FOR IO
                                ;ON ENTRY, A=0 RESET- 1 SET
               ; ENTER WITH FUNCTION IN L
               ; RETURNS WITH H,L SET TO MEM ADR
               ; AND A=MASK
               ; FROM RESTART 1
                                ;MOV E,A ;  SET RESET FLAG
               ; MOV A,C; LINE NO
               ; RLC
               ; ANI 30H; WD NO
               ; JMP REST1
003E B5        REST1:   ORA L           ; OR WORD WITH FUNCTION
003F 21B80A             LXI H,RMASK     ; MASK BIT
0042 09                 DAD B   ; INDEX BY LINE
0043 46                 MOV B,M         ; MASK
0044 6F                 MOV L,A         ; LOW ADDR OF IO
0045 260B               MVI H,0BH       ;HIGH ADDR
0047 78                 MOV A,B         ;PUT MASK IN A
0048 2F                 CMA
0049 A6                 ANA M           ; CLEAR BIT
004A 57                 MOV D,A
```

```
0048 7B              MOV A,E ;SET RESET
004C B7              ORA A   ; SET STATUS FLAG
004D 78              MOV A,B ; GET MASK
004E C25300          JNZ SKIP ; LEAVE BIT RESET
0051 B2              ORA D   ; SET BIT
0052 57              MOV D,A
              SKIP:
0053 72              MOV M,D ; UPDATE IT
0054 24              INR H
0055 72              MOV M,D            ; SET FUNCTION
0056 0600            MVI B,0
0058 C9              RET
              ;------
                                        ;PART OF RESTART 3 - RECEIVE DAT
0059 32210A   INTR3: STA  ERRFLG        ;SET ERROR FLAG
005C C31A01          JMP RETX           ; ENABLE INTS AND RETN
                                        ;RECEIVE DATA READY - PART OF RS
005F D349     INTR6: OUT  49H           ;RESET DATA READY FF
0061 3A250A          LDA  COMFLG        ;VERIFY RECEIVING  MODE
0064 FE02            CPI  2
0066 C21801          JNZ  RETN          ;IGNORE - RETURN
0069 DB18            IN   18H           ;INPUT CHAR FROM UART
006B 2A280A          LHLD CHTCOM
006E 77              MOV  M,A           ;STORE CHARACTER IN MEMORY
006F FE03            CPI ETX
0071 CA8100          JZ RDONE
0074 23              INX H   ;ADVANCE ADDRESS
```

```
            0066      C3
            67        DØ          PATCH 1 Ø3DØ
            68        Ø3
            RETURN

Ø3DØ
PATCH 1:    C2, 18, Ø1            JNZ RETN
            3A, 8Ø, Ø4            LDA NAKFLG
            B7                    ORA A
            CA  69  ØØ            JZ RETURN TO INLINE--BACK
            DB  18                IN 18H; DON'T STORE CHAR.
            FE  03                CPI ETX
            C2  E6  ØØ            JNZ SNAK
            3E, ØØ                MVI A, ØØ
            32, 8Ø, Ø4            STA NAKFLG; CLEAR FLAG
            C3, E6, ØØ            JMP RESEND

            006B      C3
            6C        E9
            6D        Ø3          PATCH 2
            RETURN

PATCH 2:
Ø3E9        2A, 28, ØA            LHLD CHTCOM
            FE  15                CPI NAK
            C2, 6E, ØØ            JNZ INLINE TO STORE CHAR.
            32, 8Ø, Ø4            STA NAKFLG
            C3, 18, 01            JMP RETN; WAIT NEXT CHAR.
```

```
0075 7D              MOV A,L
0076 E61F            ANI 1FH
0078 CAEC00          JZ SNAK ; MESSAGE EXEEDS 32 CHAR
007B 22280A          SHLD CHTCOM
007E C31801          JMP  RETN          ;WAIT FOR NEXT CHARACTER
              RDONE:                    ;ETX RECEIVED
```

```
0081 3EFF               MVI A,0FFH          ; TURN OFF TIMER
0083 326A09             STA NODR
0086 3A210A             LDA ERRFLG
0089 B7                 ORA  A
008A C2EC00             JNZ  SNAK           ;SEND NAK
008D 2A260A             LHLD REGCOM         ;  ADDR OF STATUS WORD
0090 25                 DCR H ; BANK 7
0091 7D                 MOV A,L
0092 E6E0               ANI 0E0H
0094 6F                 MOV L,A ;  START OF BUFFER 0,20 ETC
0095 7E                 MOV A,M
0096 FE02               CPI STX
0098 C2EC00             JNZ SNAK ;  SEND NAK- FIRST CHAR NOT STX
009B 00                 NOP
009C 00                 NOP
009D 0000               NOP
009F 0000               NOP
00A2 2A260A             LHLD REGCOM         ;ADDR OF STATUS WORD OF
                                            ;REGISTER IN COMMUNICATION
00A5 3E04               MVI  A,4            ;SET MSG RECEIVED IN BUFFER
00A7 B6                 ORA  M
00A8 E67F               ANI  177Q
                        ;RESET BUSY BIT
00AA 77                 MOV  M,A
                                            ;SCAN QUEVE TO SEE IF ANY OTHER
                                            ;MESSAGES TO SEND
00AB 1608      FINDR:   MVI  D,8            ;CHECK 7 OTHER REGISTERS
00AD 7D                 MOV  A,L
00AE C620               ADI  20H
00B0 6F                 MOV  L,A            ;ADDR.  OF NXT STATUS WORD
00B1 7E                 MOV  A,M
00B2 B7                 ORA  A
00B3 FAC100             JM   SEND
00B6 15                 DCR  D
00B7 C2AD00             JNZ FINDR+2
               FINDX:
00BA AF                 XRA A               ;QUEUE IS EMPTY
00BB 32250A             STA COMFLG
00BE C31801             JMP RETN
                                            ;
00C1 22260A    SEND:    SHLD REGCOM         ;SAVE ADDR OF STATUS WORD
                                            ;OF REGESTER IN COMMUNICATION
00C4 25                 DCR H ; BANK 7
00C5 7D                 MOV  A,L            ;
00C6 E6E0               ANI  0E0H              ;START OF MSG
00C8 6F                 MOV  L,A
00C9 222A0A             SHLD REPST          ;INIT ADDRESS OF
00CC 222C0A             SHLD TRNST          ;MESSAGE TO SEND
               SENDA:
00CF DB1B               IN 1BH
00D1 E603               ANI 3 ;  CHECK CARRIER
00D3 CABA00             JZ FINDX ;  DONT START COMM IF NO CARRIER
00D6 22280A             SHLD CHTCOM
00D9 3E01        MVI   A,1
00DB 32250A             STA  COMFLG         ;SET SENDING BIT
00DE 3E08               MVI  A,8            ;SET INT LEVEL 8
00E0 32240A             STA INTLEV
00E3 C31801             JMP  RETN           ;RETURN
                                            ;
00E6 2A2C0A    RESEND:  LHLD TRNST          ;RESET MESSAGE ADDRESS
00E9 C3CF00             JMP  SENDA
                                            ;
               SNAK:                        ;SEND NAK
00EC 212800             LXI H,NAKR          ;MESSAGE ADDRESS
00EF C3CF00             JMP  SENDA
00F2 F5        STCOM:   PUSH PSW                    ;START COMMUNICATON
00F3 E5                 PUSH H
00F4 D5                 PUSH D
00F5 3A250A             LDA  COMFLG
00F8 B7                 ORA  A
00F9 C21801             JNZ  RETN           ;COMM IN PROGR
00FC 210208             LXI  H,RSTAT        ;INIT.  DATA LINK
00FF C3AB00             JMP  FINDR          ;FIND QUEUE ENTRY
                                            ;THRE - PART OF RST 7
```

```
0102 3A250A   INTR7:  LDA COMFLG
0105 3D               DCR A    ; TEST IF SENDING
0106 C23601           JNZ NOTSEND
0109 2A280A   INT7A:  LHLD CHTCOM       ;CHARACTER ADDRESS
010C 7E               MOV  A,M          ;LOAD CHARACTER
010D D348             OUT  48H          ;LOAD UART TRANSMITTER
010F 23               INX  H            ;INCREMENT ADDRESS
0110 22280A           SHLD CHTCOM       ;STORE
0113 FE03             CPI  ETX          ;CHECK FOR END OF MSG
0115 CA2201           JZ   TRDON
                                        ;
                                        ;RETURN FROM INT 6,7
0118 D1       RETN:   POP  D            ;RESTORE D AND E
0119 E1               POP  H            ;RESTORE H AND L
              RETX:                     ; ENTRY FROM OTHER INTERRUPTS
011A 3A240A           LDA INTLEV        ; LOAD CURRENT INTERRUPT STATUS
011D D34A             OUT 4AH
011F F1               POP PSW           ; RESTORE A AND FLAGS
0120 FB               EI
0121 C9       RET
                                        ;
0122 AF       TRDON:  XRA  A
0123 32210A           STA  ERRFLG       ;CLEAR ERROR FLAG
0126 2A2A0A           LHLD REPST        ;SET ADDRESS TO PLACE REPLY
0129 22280A           SHLD CHTCOM
012C 3E02             MVI  A,2          ;SET FLAG TO RECEIVING
012E 32250A           STA  COMFLG
0131 3E2D              MVI  A,45        ;SET 30 SEC. TIMER
0133 326A09           STA  NODR
              NOTSEND:
0136 3E07             MVI  A,7          ;SET INT LEVEL 7
0138 32240A           STA INTLEV
013B C31801           JMP  RETN         ;WAIT FOR REPLY
                                        ;PROGRAM STARTUP
              ; - - - - - - - - - - - - - - - - - - - - - - - - -
                                        ;RESTART 0
              INIT:                     ;PROGRAM INITALIZATION
013E DB51             IN 51H
0140 E63C             ANI 3CH
0142 C24901           JNZ INIT5
0145 3E0A             MVI A,0AH ;POWER UP-SET DEDICATED MODE
0147 D350             OUT 50H
              INIT5:
0149 210004           LXI  H,0400H      ;START OF RAM
014C 7C       IN1:    MOV  A,H
014D FE0D             CPI  0DH          ;TEST END OF RAM AND HARDWARE
                                        ;MEMORY
014F CA5701           JZ   IN2          ;
0152 70               MOV  M,B          ;CLEAR LOCATON
0153 23               INX  H
0154 C34C01           JMP  IN1          ;CONTINUE LOOP
                      ;
              IN2:
0157 210208           LXI H,0802H
015A 22510A           SHLD RGSTAT       ; INIT ADDR OF REG STAT WD
015D 2E05             MVI L,5
015F 222E0A           SHLD MATREG       ; ADDR OF CONTROL WD OF
                                        ; LAST REG PROCESSED BY SWITCHIN
0162 212309           LXI H,T10MS
0165 222109           SHLD TIMADR
                       ; INIT ADDR OF TIMER
                                        ;SET REGISTER  TIMER TO FF
                                        ;SET GENERAL TIMER, LINE NO ASSI
                                        ;AND REGISTER TIMER TO FF
0168 0E20             MVI C,20H
016A 1600             MVI  D,0
016C 5A               MOV E,D           ; REG BASE
016D 06FF             MVI  B,0FFH
016F 210608   IN2A:   LXI  H,REGTM
0172 19               DAD  D
0173 70               MOV  M,B          ;SET REGISTER TIMER TO FF
0174 210708           LXI  H,GENTM
0177 19               DAD  D
```

```
0178 70               MOV  M,B          ;SET GENERAL TIMER TO FF
0179 210108           LXI  H,INLIN
017C 19               DAD  D
017D 70               MOV  M,B          ;SET LINE NUMBER ASSIGNED TO FF
017E 7B               MOV A,E
017F 81               ADD C             ; ADD 20 TO BASE
0180 5F               MOV E,A
0181 C26F01           JNZ IN2A          ;NEXT REGISTER
                                        ;
                                        ;SET HOOK TIMER AND TIME3
                                        ;AND REGAS
0184 1E65      IN3:   MVI  E,101        ;NO. LOCS TO CLEAR -1

0186 214909    IN3A:  LXI  H,TIME3
0189 19               DAD  D
018A 70               MOV  M,B          ;SET  TO FFH
018B 1D               DCR  E
018C F28601           JP   IN3A
018F 3E30             MVI  A,30H
0191 32200A           STA  CPSTAT+20H
0194 3E03             MVI A,3
0196 326909           STA TIME3+20H
               ; INITIALIZATION OF CARRIER STATES
0199 3E02             MVI A,2
019B 322E04           STA CRST1; DEDICATED SET TO CARRIER ON-WAITING
                                ;BREAK
019E DB51             IN 51H ; TEST MODE
01A0 E601             ANI 1 ; MODE
01A2 C2AC01           JNZ INBACK
               ; DEDICATED LINE
01A5 AF               XRA A
01A6 322F04           STA CRST2; BACKUP STATE
                               ;IDLE
01A9 C3B101           JMP IN3A1
               INBACK:
01AC 3E02             MVI A,2
01AE 322F04           STA CRST2; BACKUP STATE=CARRIER ON
               ;
               IN3A1:
                                        ;
01B1 D349             OUT  49H          ;RESET UART RCV DATA READY
01B3 3E07             MVI  A,7
01B5 D34A             OUT  4AH          ;SET INTERRUPT MASK TO LEVEL 7
01B7 32240A           STA INTLEV        ; INIT CURRENT STATUS
01BA D34B             OUT  4BH          ;RESET MATRIX READY FF
01BC D34C             OUT  4CH          ;RESET RTC FF
                               ;8 DATABITS, EVEN PARITY,1 STOP
01BE 3E17             MVI A,17H
01C0 D34D             OUT  4DH          ;UART CONTROL WORD
01C2 D34B             OUT 4BH ; UART MASTER RESET
                                        ;RESET TONES
01C4 3E08             MVI A,8
01C6 3D        IN3B: DCR A
01C7 FAD501           JM IN3C
01CA D330             OUT 30H; SELECT REGISTER
01CC D321             OUT 21H ; RESET DTMF
01CE D323             OUT 23H; STOP DIAL TONE
01D0 D325             OUT 25H ; RESET BUSY LAMP
01D2 C3C601           JMP IN3B
               IN3C:
01D5 3E01             MVI A,1 ; INIT TO 1
01D7 320B04           STA RGROT
01DA AF               XRA A
01DB 32DB0A           STA RGFLG ; FIRST TIME-BUSY REGS
               GO:
               ; INHTIALIZE RMASK
01DE 21B80A           LXI H,RMASK
01E1 3E01             MVI A,1
01E3 0621             MVI B,33
01E5 77        N1: MOV M,A
01E6 07               RLC
01E7 2C               INR L
01E8 05               DCR B
01E9 C2E501           JNZ N1
               ;
                                        ;
```

```
01EC FB                   EI              ;ENABLE INTERRUPTS
                                          ;RESET MATRIX
                  ;CLEAR INPUT LINES IN MATRIX WHICH ARE ON HOOK
                  ; FOR OFF HOOK LINES, SET LINE SCANNER STATE=6
                  ; AND CALL PROCESSING STATE =26
01ED 0600                 MVI B,0
01EF 0E1F                 MVI C,1FH       ; LINE NO
01F1 79           SETX:   MOV A,C         ;GET WORD NO
01F2 E618                 ANI 18H         ;WORD NO
01F4 07                   RLC
01F5 F608                 ORI 8H
01F7 6F                   MOV L,A         ; HOOK STATUS WORD
01F8 260C                 MVI H,0CH
01FA 7E                   MOV A,M
                          ; HOOK STATUS
01FB 21B80A               LXI H,RMASK
01FE 09                   DAD B
01FF A6                   ANA M
0200 CA0A02               JZ OFFHK
                  ; ON HOOK- CLEAR INPUT LINE
0203 2100C0               LXI H,0C000H    ; RESET INPUT LINE
0206 71                   MOV M,C ;SET POINT
0207 C31602               JMP WAITX       ;WAIT SWITHING DONE
                  ; OFF HOOK- INIT CONNECTED
020A 210009       OFFHK:  LXI H,LSTATE    ; LINE SCANNER
020D 09                   DAD B
020E 3607                 MVI M,7
0210 21000A               LXI H,CPSTAT    ; CALL PROC STATE
0213 09                   DAD B
0214 3626                 MVI M,26H
                  ;
0216 DB1B         WAITX:  IN 1BH
0218 E608                 ANI 8; MATRIX READY

021A CA1602               JZ WAITX        ;WAIT MATRIX READY
021D 0D                   DCR C   ;LINE NO
021E F2F101               JP SETX         ;NEXT LINE

                  ; - - - - - - - - - - - - - - - - - - - - - - - - -
                  EXEC:
0221 DB1B                 IN 1BH
0223 E604                 ANI 4; TEST IF RTC FLAG IS UP
0225 CA2102               JZ   EXEC       ;WAIT
0228 D34C                 OUT 4CH ; RESET REAL TIME CLOCK FF
                                          ;10 MS IS UP
                  ; PROGRAM TO UPDATE TIME 3 EVERY 1 SEC (990MS)
                  TIMEIT:
022A 2A2109               LHLD TIMADR     ; ADDR OF TIMER
022D 1602                 MVI D,2         ; DO 2 TIMERS
022F 1E26                 MVI E,38
                          ;
0231 35           TM1:    DCR M           ;TIMER
0232 F24502               JP TNXT ;ADVANCE TO NEXT
0235 3605                 MVI M,5
0237 7D                   MOV A,L
0238 83                   ADD E           ;
0239 6F                   MOV L,A         ; ADDRESS OF TIME3
023A 7E                   MOV A,M
023B B7                   ORA A
023C CA4502               JZ TNXT         ; IF ZERO, LEAVE IT ALONE
023F FEFF                 CPI 0FFH
0241 CA4502               JZ TNXT
0244 35                   DCR M
                          ; DECREMENT 1 SEC TIMER
0245 2A2109       TNXT:   LHLD TIMADR     ; ADVANCE ADDR TO TIME3
0248 23                   INX H
0249 7D                   MOV A,L
024A FE49                 CPI TIME3-0900H ; TEST IF AT END
024C C25102               JNZ TNX2
024F 2E23                 MVI L,T10MS-0900H       ; RESET TO START OF TABL
                  TNX2:
0251 222109               SHLD TIMADR
0254 15                   DCR D           ; TEST IF DONE
0255 C23102               JNZ TM1         ; DO SECOND OF SERIES
```

```
                        ;
                        ;WAIT CONTROL
                        ;ALLOWS PROCESSOR TO BE PLACED IN WAIT STATE
                        ;TO ALLOW REGISTERS TO BE REMOVED
                        ; PART OF EXECUTIVE LOOP
0258 3A0C04                     LDA WFLG ; TEST IF WAIT SWITCHWAS PREVIOUSLY SET
025B B7                         ORA A
025C C27802                     JNZ EX1A ; WAITING- YES
025F DB1B                       IN 1BH ; NOT WAITING-TEST SWITCH
0261 B7                         ORA A
0262 F2B102                     JP EX1D ; SWITCH NOT SET
0265 3E01                       MVI A,1 ; SWITCH SET
0267 320C04                     STA WFLG ; SET FLAG
026A 3A0904                     LDA RGBUSY; SAVE BUSY STATUS
026D 323104                     STA RSAVE
0270 3EFF                       MVI A,0FFH
0272 320904                     STA RGBUSY ; MAKE ALL REGS BUSY
                                        ;SO PROGRAM WONT ASSIGN
                                ;AND WIAT NO REGS ASSIGNED    .
0275 C3B102                     JMP EX1D
                        ;WAITING FOR REGISTERS TO FREE UP
                        EX1A:
0278 DB1B                       IN 1BH ; TEST SWITCH
027A B7                         ORA A
027B F2A702                     JP EX1C ; SWITCH RELEASED-RET TO NORMAL
                        ;STILL SET, TEST IF REGS IN USE
027E 3A0A04                     LDA RGUSE ; REGISTERS IN USE
0281 B7                         ORA A
0282 C2B102                     JNZ EX1D ; NOT ALL FREE
                        ;REGISTERS NOT IN USE
                        ;GO DIRECCTLY TO WAIT
                        ;DO NOT PROCESS ANY INSTRUCTIONS
0285 D34E                       OUT 4EH ; WAIT
0287 00                         NOP
                        ;INITIALIZE BUSY LAMPS AFTER WAIT
0288 1680                       MVI D,80H ;MSB
028A 1E08                       MVI E,8 ; REG NO
028C 1D                 X1:     DCR E
028D FAA702                     JM EX1C ; DONE
0290 7B                         MOV A,E ; REG NO
0291 D330                       OUT 30H ; SELECT REG
0293 3A3104                     LDA RSAVE
0296 A2                         ANA D
0297 C29F02                     JNZ X4 ; BUSY ON
029A D325                       OUT 25H; LAMP OFF
029C C3A102                     JMP X5
029F D324               X4:     OUT 24H
02A1 7A                 X5:     MOV A,D
02A2 0F                         RRC ; SHIFT RIGHT
02A3 57                         MOV D,A
02A4 C38C02                     JMP X1 ;NEXT
                        ;SWITCH RELEASED -BEFORE OR AFTER WAIT
                        EX1C:
02A7 3A3104                     LDA RSAVE ; RESTORE REGISTER BUSY WD
02AA 320904                     STA RGBUSY
02AD AF                         XRA A
02AE 320C04                     STA WFLG ; RESET FLG
                        EX1D:
                        ;1 MINUTE MESSAGE CALLUP REGISTER
02B1 3A8F09                     LDA REGAS+20H
02B4 B7                         ORA A
02B5 F2D402                     JP EX1G; REG ASSIGNED
02B8 3A6909                     LDA TIME3+20H
02BB B7                         ORA A
02BC C2E202                     JNZ EXEC2; NOT 1 MINUTE YET
02BF 11B009                     LXI D,HOOKT+20H
02C2 012000                     LXI B,20H ; LINE 20
02C5 CD2F33                     CALL GREG
02C8 C3CE02                     JMP EX1F ; REG NOT AVAIL
02CB C3D402                     JMP EX1G ; REG AVAIL
                        EX1F:
02CE 3E01                       MVI A,1 ; WAIT 1 SECOND
02D0 326909                     STA TIME3+20H
02D3 D7                         RST 2; RESET SUB TIMER
```

```
                    EX1G:
02D4 21DB0A                 LXI H,RGFLG
02D7 7E                     MOV A,M
02D8 B7                     ORA A
02D9 C2E202                 JNZ EXEC2 ; NOT SENDING RE
02DC 34                     INR M
02DD 3EFF                   MVI A,0FFH
02DF 320904                 STA RGBUSY ; INITIALLY BUSY OUT REGISTERS
                                        ; TEST IF NO DR FOR 10 SEC
02E2 3A6A09         EXEC2:  LDA NODR
02E5 B7                     ORA A
02E6 CA0000                 JZ 0000; RESTART PROGRAM
                    EXEC3:
                            ;
02E9 CD0320                 CALL LSCNR      ;GO TO LINE SCANNER- 8 LINES
                                            ;
02EC CD0020                 CALL REGSR      ;REGISTER/SENDERS
                                            ;
02EF CD8829                 CALL CPROC      ; CALL PROCESSING 1 REG
02F2 CDF200                 CALL STCOM      ; START COMM IF REQUIRED
02F5 CD0103                 CALL MATSW      ; MATRIX SWITCHING
02F8 CD2503                 CALL LINKS ; DATA LINK CONTROL (BACKUP/DEDICATED

                    EXIT:
02FB AF                     XRA A
02FC D34F                   OUT  4FH        ;PMA
02FE C32102                 JMP  EXEC
2003                LSCNR EQU 2003H
2000                REGSR EQU 2000H

                    ; MATRIX SWITCHING ROUTINE
                    ; CHECKS 1 REG EVERY 10MS
                    ; WHEN CONTROL WORD IS NON ZERO
                    ; THE POINT IS SET
0301 DB1B           MATSW: IN 1BH
0303 E608                   ANI 8 ; MATRIX READY
0305 C8                     RZ    ; MATRIX BUSY
0306 2A2E0A                 LHLD MATREG     ; ADDR OF CONTOL WD
                                            ; OF LAST REG CHECKED
0309 7D                     MOV A,L
030A C620                   ADI 20H
030C 6F                     MOV L,A
030D 222E0A                 SHLD MATREG
0310 56                     MOV D,M         ; CONTROL WORD
0311 7A                     MOV A,D
0312 B7                     ORA A
0313 C8                     RZ              ; CONTROL WORD ZERO
0314 0600                   MVI B,0
0316 70                     MOV M,B         ; CLEAR CONTROL WORD
0317 7D                     MOV A,L
0318 D604                   SUI 4
031A 6F                     MOV L,A
031B 7E                     MOV A,M         ; INPUT LINE NO.
031C 4F                     MOV C,A
031D 21C309                 LXI H,OULIN
0320 09                     DAD B
0321 6E                     MOV L,M         ; OUTPUT LINE NUMBER
0322 62                     MOV H,D         ; CONTROL WORD
0323 77                     MOV M,A         ; SET POINT
                                            ; STORE INPUT LINE NO.
                                            ; A=LINE NO. , H=CONTROL,L=OUTPUT
0324 C9                     RET
                    ;
                    ;*********
                    ; DEDICATED AND BACKUP LINE  CONTROL
                    ;SWITCHES LINES AND CONTROLS
                    ;BACKUPDIALING UNIT
                    LINKS:
0325 3A3004                 LDA CARSW; TOGGLE
0328 3C                     INR A
0329 323004                 STA CARSW
032C E601                   ANI 1
032E CA0029                 JZ LID ; DEDICATED
                    LIB:    ;BACKUP
0331 3A2F04                 LDA CRST2; BACKUP STATE
```

```
0334 07              RLC ; DOUBLE
0335 213F03          LXI H,TABB
0338 85              ADD L
0339 6F              MOV L,A
                 ;:: WATCH OUT FOR ROM BOUNDARY
033A 5E              MOV E,M; LOW ADDR
033B 2C              INR L
033C 56              MOV D,M ; HIGH ADDR
033D EB              XCHG
033E E9              PCHL ; GO TO STATE
                 TABB:
033F 4B03            DW BST0
0341 4C03            DW BST1
0343 4D03            DW BST2

0345 5D03            DW BST3
0347 8F03            DW BST4
0349 BB03            DW BST5
                 ;**********
                 ;BACKUP LINE STSATES
                 ;::::::
                 BST0:
034B C9              RET ; IDLE
                 ;::
                 BST1:
034C C9              RET ; NO STATE 1
                 ;::
                 BST2:         ;CARRIER ON-BACKUP LINE
034D DB1B            IN 1BH
034F E602            ANI 2; CARRIER DETECT
0351 C0              RNZ ; CARRIER ON
0352 3E02            MVI A,2
0354 326C09          STA CART2; 2 SEC TIMER
0357 3E03            MVI A,3
                 BST2A:
0359 322F04          STA CRST2; SET STSATE 2
035C C9              RET
                 ;**
                 BST3:                    ;TIME CARRIER OFF
035D DB1B            IN 1BH
035F E602            ANI 2; CARRIER DETECT
0361 CA6E03          JZ BST3A ; STILL OFF
0364 3EFF            MVI A,0FFH
0366 326C09          STA CART2 ; RESET TI EMR
0369 3E02            MVI A,2
036B C35903          JMP BST2A ; SET STATE 2
036E 3A6C09      BST3A: LDA CART2
0371 B7              ORA A
0372 C0              RNZ ; NOT TIMED OUT
                 ; LOSS OF BACKUP CARRIER
                 ;CHECK MODE
                 BST3C:
0373 DB51            IN 51H
0375 E601            ANI 1
0377 C27D03          JNZ BST3B; BACKUP
                               ;CARRIER DROPPED BECAUSE DEDICATED RETUR
037A C35903          JMP BST2A; SET STATE 0
                 BST3B:
037D 3E02            MVI A,2; STOP BACKUP
037F D350            OUT 50H
0381 3E01            MVI A,1; START BACKUP
0383 D350            OUT 50H
0385 3EFF            MVI A,0FFH
0387 326C09          STA CART2; TIMER
                 BST3D:
038A 3E04            MVI A,4
038C C35903          JMP BST2A ;;SET STATE 4
                               ;WAIT RETURN OF CARRIER AFTER DIALING
                 ;**
                 BST4:         ;BACKUP BEING DIALED
038F DB51            IN 51H
0391 E602            ANI 2
0393 C0              RNZ ; DIALING NOT COMPLETE
0394 3A6C09          LDA CART2
0397 FEFF            CPI 0FFH
```

```
  0399 C2A203          JNZ BST41
  039C 3E14            MVI A,20
  039E 326C09          STA CART2
  03A1 C9              RET
                BST41:
  03A2 DB1B            IN 1BH
  03A4 E602            ANI 2; CARRIER DETECT

  03A6 C2B103          JNZ BST4A; CARRIER DETECTED
  03A9 3A6C09          LDA CART2; TIMER
  03AC B7              ORA A
  03AD C0              RNZ ; NOT TIMED OUT
  03AE C37303          JMP BST3C ; RESTART BACKUP
  03B1 3E02     BST4A: MVI A,2
  03B3 326D09          STA CART3
  03B6 3E05            MVI A,5
  03B8 C35903          JMP BST2A ; SET STATE TO TIM CARRIER ON
                ;**
                BST5:          ;TIME CARRIER ON
  03BB DB1B            IN 1BH
  03BD E602            ANI 2
  03BF CA8A03          JZ BST3D; CARRIER LOST-RET. TO STATE 4
  03C2 3A6D09          LDA CART3 ; TIMER
  03C5 B7              ORA A
  03C6 C0              RNZ ; STILL RUNNING
                ;2SECS OF BACKUP CARRIER SEEN
  03C7 3E05            MVI A,5
  03C9 D350            OUT 50H; SET BACKUP MODE
  03CB C30000          JMP 0000 ; RESTART PTOGRAM TO
                               ;SEND RE ON BACKUP LINE
                ;********************
  03CE                 ORG 2900H
                ;************************
                ;
                ;
                ;
                LID:                       ;DEDICATED
I 2900 3A2E04          LDA CRST1; DEEICATED STATE
  2903 07              RLC ; DOUBLE
  2904 210E29          LXI H,TABD
  2907 85              ADD L
  2908 6F              MOV L,A
                ;:*WATCH OUT FOR ROM BOUNDARY
  2909 5E              MOV E,M ; LOW ADDR
  290A 2C              INR L
  290B 56              MOV D,M ; HIGK
  290C EB              XCHG
  290D E9              PCHL
                TABD:
  290E 1629            DW DST0
  2910 2629            DW DST1
  2912 4229            DW DST2
  2914 5129            DW DST3
                ;*****
                ; DEDICATED LINE STATES
                ;*****
                DST0:          ;CARRIER OFF
  2916 DB1B            IN 1BH
  2918 E601            ANI 1
  291A C8              RZ ; CARRIER OFF
  291B 3E02            MVI A,2
  291D 326B09          STA CART1 ; 2 SEC TIMER
  2920 3E01            MVI A,1
  2922 322E04   DST0A: STA CRST1 ; SET STATE
  2925 C9              RET
                ;
                DST1:          ;TIME CARRIER ON
  2926 DB1B            IN 1BH
  2928 E601            ANI 1
  292A C23629          JNZ DST1A; CARRIER STILL ON
  292D 3EFF            MVI A,0FFH
  292F 326B09          STA CART1 ; RESET TIMER
  2932 AF              XRA A
  2933 C32229          JMP DST0A ; RETURN TO STATE 0
```

```
                    DST1A:
2936 3A6B09                LDA CART1 ; TIMER
2939 B7             ORA A
293A C0                    RNZ ; NOT TIMED OUT
                    ;RETURN OF CARRIER AFTER LOSS
293B 3E0A                  MVI A,0AH ; SET DEDICATED MODE
                                     ;AND STOP BACKUP UNIT
293D D350                  OUT 50H
293F C30000                JMP 0000 ; SEND RE ON DEDICATED LINE
                    ;
                    ;****
                    DST2:                      ;CARRIER ON ON DEDICATED
                                     ;LINE- SET BY INIT
2942 DB1B                  IN 1BH
2944 E601                  ANI 1
2946 C0                    RNZ ; CARRIER OMN -NORMAL
2947 3E02                  MVI A,2
2949 326B09                STA CART1 ; TIMER
294C 3E03                  MVI A,3
294E C32229                JMP DST0A ; TIME CARRIER OFF
                    ;
                    DST3:                      ; TIME CARRIER OFF
2951 DB1B                  IN 1BH
2953 E601                  ANI 1
2955 CA6229                JZ DST3A ; STILL OFF
2958 3EFF                  MVI A,0FFH
295A 326B09                STA CART1; RESET TIMER
295D 3E02                  MVI A,2
295F C32229                JMP DST0A; RETURN TO STATE 2
2962 3A6B09         DST3A: LDA CART1
2965 B7                    ORA A
2966 C0                    RNZ ; TIMER STILL RUNNING
                    ;LOSS OF CARRIER
2967 DB51                  IN 51H
2969 E601                  ANI 1
296B CA7229                JZ DST3B; DEDICATED CARRIER IS LOST
                                     ;AND IN DEDICATED MODE
                    ; MODE IS BACKUP-IGNORE BREAK OF DEDICATED CARRIER
296E AF                    XRA A
296F C32229                JMP DST0A ; WAIT RETURN OF DEDICATED CARRIER
                    DST3B:
2972 3E02                  MVI A,2
2974 D350                  OUT 50H ; STOP BACKUP
2976 3E01                  MVI A,1 ; START BACKUP
2978 D350                  OUT 50H
297A 3E04                  MVI A,4
297C 322F04                STA CRST2; LET BACKUP WAIT FOR CARRIER
297F 3EFF                  MVI A,0FFH
2981 326C09                STA CART2 ; WITH 20 SEC TIMEOUT
2984 AF                    XRA A
2985 C32229                JMP DST0A ; WAIT RETURN OF CARRIER
                    ;
                    ;************************
                    ;*****************************
                      ;CALL PROCESSING
                    ;*************************
                                     ;CALL PROCESSING ROUTINE THIS
                                     ;ROUTINE SCANS 8 REGISTERS FOR
                                     ;ACTIVITY. WHEN A REGISTER
                                     ;HAS BEEN CALLED UP IT IS
                                     ;PROCESSED AND THEN THE PROGRAM
                                     ;RETURNS TO THE EXEC. ONLY 1
                                     ;REG IS PROCESSED AT A TIME.
                                     ;THUS IF MORE THAN 1 REGISTER
                                     ; IS ACTIVE, PROCESSING TAKES
                                     ;LONGER A REGISTER IS CALLED UP
                                     ;UPON COMPLETION OF AN ACTIVITY
                                     ;SUCH AS DIALING OR DATA LINK
                                               ;COMMUNICATION
2988 1E08           CPROC: MVI E,8             ;NO OF REGISTERS
298A 0600                  MVI B,0
298C 2A510A                LHLD RGSTAT         ;ADDR OF STATUS WORD OF LAST
                                     ;REG PROCESSED
298F 7D                    MOV A,L             ;ADVANCE WITH WRAPAROUND
```

```
2990 C620            ADI 20H
2992 6F              MOV L,A
2993 22510A          SHLD RGSTAT     ;ADVANCE TO NEXT REGISTER
2996 25              DCR H; 7
2997 E6E0            ANI 0E0H
2999 6F              MOV L,A
299A 22530A          SHLD RGSTX      ;SAVE ADDR OF STX
299D 2A510A          LHLD RGSTAT
29A0 2D              DCR L ; ADDR OF INDEX
29A1 4E              MOV C,M         ;LINE ASSINGED
29A2 2C              INR L
29A3 7E              MOV A,M ;REGISTER STATUS WORD
29A4 E67F            ANI 177Q
29A6 C2BD29          JNZ CSCHED      ;REGISTER HAS BEEN SCHEDULED
29A9 79              MOV A,C
29AA E6C0            ANI 0C0H        ;TEST LINE FF
29AC C2B829          JNZ NOLIN       ;NO LINE ASSIGNED
29AF 214909          LXI H,TIME3     ;TEST IF TIMER RAN OUT
29B2 09              DAD B   ; INDEX BY LINE NO
29B3 7E              MOV A,M         ;TEST IF TIMER RAN OUT
29B4 B7              ORA A
29B5 CABD29          JZ CSCHED
              NOLIN:
29B8 1D              DCR E           ;CHECK IF ALL 8 TESTED
29B9 C8              RZ              ;8 CHECKED-TRY LATER
29BA C38A29          JMP CPROC+2     ;TEST NEXT REG

              CSCHED:
29BD 21000A          LXI H,CPSTAT ; CALL PROCESSING STATE
29C0 09              DAD B           ;INDEX BY LINE
29C1 5E              MOV E,M         ;CALL PROC STATE
29C2 21D329          LXI  H,CTAB     ;STATE TABLE INDEX
29C5 50              MOV  D,B        ;ZERO
29C6 19              DAD  D
29C7 5E              MOV  E,M        ;LOW ADDR
29C8 23              INX H   ; TO TAKE CARE OF CROSSING PAGE BOUNDARY
29C9 56              MOV  D,M
29CA 2A510A          LHLD RGSTAT; ADDRESS OF REGISTER STATUS WORD
29CD 7E              MOV A,M; REGISTER STATUS WORD
29CE E602            ANI 2           ; NON ZERO FLAG SET IF HUNG UP
29D0 7E              MOV A,M
29D1 EB              XCHG            ;MOVE TO D,E
29D2 E9              PCHL
                                     ;ON ENTRY TO EACH STATE,
                                     ;B,C CONTAIN LINE NO. INDEX
                                     ;REGSTAT CONTAINS ADDRESS OF
                                     ;STATUS WORD
                                     ; D,E CONTAINS ADDRES OF STATUS
                                     ; A CONTAINS STATUS
                                     ;----------------------------
              CTAB:
29D3 222A            DW CPX0 ; STATE 0- REGISTER ASSIGNED
29D5 612A            DW CPX2 ; STATE 2- ACCOUNT NO. ENTERED
29D7 E92B            DW CPX4 ; STATE 4- REPLY REC TO ACCNT NO
29D9 722C            DW CPX6 ; STATE 6- DIALING COMPLETE
29DB 2231            DW CPX8
29DD 8E2C            DW CPXA
29DF E52C            DW CPXC
29E1 1F2D             DW CPXE        ;WAIT REG RELEASE(CALL WAITING)

29E3 7D2C            DW CPX10; STATE 10- HANG UP
29E5 E92B            DW CPX12; STATE 12- REPLY RECEIVED
29E7 1B2E            DW CPX14; ATB- * ENTERED
29E9 2E2E            DW CPX16; DIALING OF CALLBACK
29EB EC2B            DW CPX18
29ED 3B2E            DW CPX1A; CPS INITIATED CALLBACK
29EF 132F            DW CPX1C; INWARD DIALING DONE
29F1 5F2F            DW CPX1E; CALLED EXTENSION ANSWERED
29F3 862F            DW CPX20; OUTWARD DIALING DONE
29F5 9030            DW CPX22; ANSWER RECIEVED
29F7 A530            DW CPX24; WAIT REPLY TO CC
29F9 2A31            DW CPX26; CALL IN PROGRESS
29FB EC2B            DW CPX28; REPLY TO CT
29FD F730            DW CPX2A        ; REGISTER RECALL DIALING
```

```
2 9FF 482D                DW CPX2C ;CALL WAITING

2A01 C330                 DW CPX2E                       ;
                                         ;CARRIER DETECT STATES
2A03 AB31                 DW CPX30                 ;  CARRIER IS OFF
2A05 E131                 DW CPX32                 ;  INIT MSG IS IN BUFFER
2A07 5032                 DW CPX34      ;NORMAL- CALLED UP 3 MIN OR LOSS
2A09 9832                 DW CPX36                 ;  TIME CARRIER LOSS
2A0B 7E2B                 DW CPX38      ;BEEP
2A0D 7E2B                 DW CPX3A      ;BEEP
2A0F 7E2B                 DW CPX3C      ;BEEP
2A11 0E2E                 DW CPX3E ;  LONG BEEP FOR DDD
2A13 FA2F                 DW CPX40 ;  WAIT FINAL DIAL TONE FOR TIE LINE
                                        ;CALL PROCESSING EXITS
2A15 21000A     CPSI:     LXI H,CPSTAT            ;ENTRY TO ADD 2 TO STATE
2A18 09                   DAD B;  CP STATE INDEX BY LINE
2A19 34                   INR M
2A1A 34                   INR M
2A1B C9                   RET
2A1C 21000A     CPSZ:     LXI H,CPSTAT    ;ENTRY WITH STATE IN A
2A1F 09                   DAD B
2A20 77                   MOV M,A
2A21 C9                   RET     ;  RETURN TO EXECUTIVE
                                        ;  ---------
                                        ;STATE 0 -
                                        ;  ENTERED ON INITIAL FIRST DIAL
                                        ;REGISTER HAS BEEN ASSIGNED
                CPX0:
2A22 CDC132               CALL SETREG     ;SET UP REGISTER
2A25 80                   DB 80H ;  FLAG TO READ INPUT PORT
2A26 03                   DB ETX
2A27 FF                   DB 0FFH
2A28 EB                   XCHG            ;  H,L TO DIGADDR
2A29 2C                   INR L
2A2A 2C                   INR L
2A2B 3680                 MVI  M,200Q     ;QUEVE UP MESSAGE
2A2D 216F09               LXI H,REGAS
2A30 09                   DAD B
2A31 5E                   MOV E,M ;  REG NO
2A32 21300A               LXI H,TRY
2A35 09                   DAD B    ;BY LINE
2A36 70                   MOV M,B ;  RESET
2A37 7B                   MOV A,E;  REG NO
2A38 F6D0                 ORI 0D0H ;  CONNECT INPUT TO REGISTER
                                   ;CONTROL WORD
2A3A 2A510A               LHLD RGSTAT
2A3D 2C                   INR L
2A3E 2C                   INR L
2A3F 2C                   INR L
2A40 77                   MOV  M,A        ;STORE CONTROL WORD
                ;  IF INLET TIE LINE, SET DI RELAY ON HOOK
2A41 79                   MOV A,C ;  INPUT LINE NO
2A42 E618                 ANI 18H ;  EXTRACT WORD NO
2A44 0F                   RRC
2A45 0F                   RRC
2A46 0F                   RRC
2A47 6F                   MOV L,A ;  WORD NO
2A48 2604                 MVI H,4 ;  BANK 4 *****
2A4A 7E                   MOV A,M ;  INLET TIE LINE STATUS WORD
2A4B 21B80A               LXI H,RMASK
2A4E 09                   DAD B
2A4F A6                   ANA M
2A50 CA582A               JZ CPX0A ;  NOT INLET TIE LINE
2A53 2E02                 MVI L,2 ;  SET DI ON HOOK
2A55 3E00                 MVI A,0
2A57 CF                   RST 1
                CPX0A:
2A58 214909               LXI H,TIME3
2A5B 09                   DAD B
2A5C 36FF                 MVI M,0FFH      ;  TURN OFF TIMER
2A5E C3152A               JMP  CPSI       ;ADVANCE TO STATE 2
                                          ;MATRIX SWITCHING WILL CONNECT
                                          ;REG.
                                          ;REG. PROCESSOR APPLIES DIAL
                                          ;TONE AND VERIFIES
```

```
                                                ;IT BEFORE PROCEEDING
                                                ;TO GET DELAY.
                                                ;
                                                ;
                                                ;CALL PROCESSING STATE 2
                                                ;ENTERED ON
                                                ;  -DIALING OF ACCOUNT NUMBER
                                                ;   DONE
                                                ;  -HANG UP
                                                ;  -REPLY TO STX IN ETX
                                                ;   RECEIVED
                  CPX2:
2A61 C22231               JNZ CPDT              ;HUNG UP
2A64 F5                   PUSH PSW               ;REGISTER STATUS WORD
2A65 214909               LXI H,TIME3
2A68 09                   DAD B
2A69 7E                   MOV A,M
2A6A B7                   ORA A
2A6B C2722A               JNZ CPS21
                  ; TIMER RAN OUT  REENTRY
                  ; TO FIRST DIAL TONE
2A6E 36FF                 MVI M,0FFH
2A70 F1                   POP PSW
2A71 C9                   RET
                  CPS21:
2A72 F1                   POP PSW               ; REGISTER STATUS WORD
2A73 E604                 ANI  4                ;REPLY RECEIVED
2A75 CA7B2A               JZ  CPS22             ;NO
2A78 EB                   XCHG
2A79 70                   MOV M,B               ; REPLY RECEIVED- RESET BIT
2A7A C9                   RET
                                                ;COMPLETE
                  CPS22:           ;DIAL COMPLETE - PERFORM
                                                ;CHECKSUM
                  ; DELAY FIRST BEEP UNTIL TONE GOES AWAY
2A7B 216F09               LXI H,REGAS
2A7E 09                   DAD B
2A7F 7E                   MOV A,M
2A80 D330                 OUT 30H ; SELECT REGISTER
2A82 DB27                 IN 27H ; READ DTMF TONES
2A84 B7                   ORA A
2A85 C0                   RNZ ; WAIT FOR NO TONES
2A86 215304               LXI H,DELAY
2A89 09                   DAD B
2A8A 7E                   MOV A,M
2A8B B7                   ORA A
2A8C C2922A               JNZ D22
2A8F 3614                 MVI M,20 ; SET DELAY (WILL VARY WITH ACTIVITY)
2A91 C9                   RET
2A92 35           D22: DCR M
2A93 C0                   RNZ ; WAIT DONE
2A94 F3                   DI
2A95 216F09               LXI H,REGAS
2A98 09                   DAD B
2A99 7E                   MOV A,M ; REGISTER NO
2A9A 2A530A               LHLD RGSTX
2A9D 2C                   INR L ;   REG NO
2A9E F6C0                 ORI 0C0H
2AA0 77                   MOV M,A ; RESET REG NO
2AA1 2C                   INR L
2AA2 79                   MOV A,C               ; RESET LINE NO
2AA3 F680                 ORI 80H
2AA5 77                   MOV M,A
2AA6 2C                   INR L
2AA7 3601                 MVI M,NULL
2AA9 2C                   INR L                 ; ADDR OF FIRST DIGIT
2AAA FB                   EI
                  ; COMPUTE CHECK DIGIT AND VALIDATE
                  ;NO. TO EXPECT MUST BE 1,3,4,5 AND NOTHING ELSE
2AAB 3A400C               LDA 0C40H ; ;NO OF DIGITS
2AAE E60F                 ANI 0FH
2AB0 D601                 SUI 1
2AB2 57                   MOV D,A
2AB3 CA4C2B               JZ CP22E ; IF 1 DIGIT, ITS GOOD
                  ;COMPUTE CHECKSUM
```

```
2AB6 7E        MOV A,M ; 1ST DIGIT
2AB7 E60F      ANI 0FH
2AB9 C602      ADI 2 ; OFFSET
2ABB 5F        MOV E,A
2ABC 2C        INR L
2ABD 7E        MOV A,M
2ABE FE03      CPI ETX
2AC0 CA682B    JZ CPS23         ;TOO SHORT
2AC3 E60F      ANI 0FH
2AC5 77        MOV M,A ; STRIP OFF ASCII
2AC6 7B        MOV A,E
2AC7 96        SUB M ; 2ND DIGIT
2AC8 5F        MOV E,A
2AC9 7E        MOV A,M ; RESTORE ASCII
2ACA F680      ORI 80H
2ACC 77        MOV M,A
2ACD 15        DCR D
2ACE 2C        INR L ; NO 2 DIGIT NUMBERS ALLOED
2ACF 7E        MOV A,M
2AD0 FE03      CPI ETX
2AD2 CA682B    JZ CPS23 ; TOO SHORT
2AD5 E60F      ANI 0FH
2AD7 77        MOV M,A
2AD8 7B        MOV A,E
2AD9 86        ADD M ; 3RD DIGIT
2ADA 5F        MOV E,A
2ADB 7E        MOV A,M
2ADC F680      ORI 80H
2ADE 77        MOV M,A
2ADF 15        DCR D ; TEST IF LAST DIGIT
2AE0 CA332B    JZ CK ; CHECK 3RD DIGIT
2AE3 2C        INR L
2AE4 7E        MOV A,M
2AE5 FE03      CPI ETX
2AE7 CA682B    JZ CPS23 ; TOO SHORT
2AEA E60F      ANI 0FH
2AEC 77        MOV M,A
2AED 7B        MOV A,E
2AEE 96        SUB M ; 4TH DIGIT
2AEF 5F        MOV E,A
2AF0 7E        MOV A,M
2AF1 F680      ORI 80H
2AF3 77        MOV M,A
2AF4 15        DCR D ; TEST IF LAST DIGIT
2AF5 CA332B    JZ CK ; CHECK 4 DIG NO
2AF8 2C        INR L
2AF9 7E        MOV A,M
2AFA FE03      CPI ETX
2AFC CA682B    JZ CPS23 ; TOO SHORT
2AFF E60F      ANI 0FH
2B01 77        MOV M,A
2B02 7B        MOV A,E
2B03 86        ADD M ; 5TH DIGIT
2B04 5F        MOV E,A
2B05 7E        MOV A,M
2B06 F680      ORI 80H
2B08 77        MOV M,A
2B09 15        DCR D ; TEST IF LAST DIGIT
2B0A CA332B    JZ CK ; CHECK 5 DIGIT NO
2B0D 2C        INR L
2B0E 7E        MOV A,M
2B0F FE03      CPI ETX
2B11 CA682B    JZ CPS23 ; TOO SHORT
2B14 E60F      ANI 0FH
2B16 77        MOV M,A
2B17 7B        MOV A,E
2B18 96        SUB M ; 6TH DIGIT
2B19 5F        MOV E,A
2B1A 7E        MOV A,M
2B1B F680      ORI 80H
2B1D 77        MOV M,A
2B1E 15        DCR D ; TEST IF LAST DIGIT
2B1F CA332B    JZ CK ; CHECK 6 DIGIT NO
2B22 2C        INR L
```

```
2B23 7E               MOV A,M
2B24 FE03             CPI ETX
2B26 CA682B           JZ CPS23;  TOO SHORT
2B29 E60F             ANI 0FH
2B2B 77               MOV M,A
2B2C 7B                       MOV A,E
2B2D 86               ADD M ;  7TH DIGIT
2B2E 5F               MOV E,A
2B2F 7E               MOV A,M
2B30 F680             ORI 80H
2B32 77               MOV M,A
2B33 7B       CK:     MOV A,E
2B34 B7               ORA A
              ; ROUND OFF AT 10
2B35 F23A2B           JP CP22A
2B38 2F               CMA
2B39 3C               INR A
2B3A CA4C2B   CP22A:  JZ CP22E          ;GOOD CHECKSUM
2B3D FE0A             CPI 10
2B3F CA4C2B           JZ CP22E ;  GOOD
2B42 FE14             CPI 20
2B44 CA4C2B           JZ CP22E ;  GOOD
2B47 FE1E             CPI 30
2B49 C2682B           JNZ CPS23         ;BAD CHECKSUM
                                        ;GOOD CHECKSUM
              CP22E:
2B4C 2A510A           LHLD RGSTAT
2B4F 3680             MVI  M,200Q       ;SCHEDULE ACCT NO.  MSG
2B51 C3152A           JMP  CPSI         ;STATE 4 - WAIT REPLY TO ACCT
                                        ;NO.
                                        ;
              RECC:                     ;  REJECT RETRY RFECEIVED
2B54 21000A           LXI H,CPSTAT
2B57 09               DAD B
2B58 7E               MOV A,M
2B59 FE04             CPI 4             ;  REPLY TO ACCT NO
2B5B CA632B           JZ CP23A          ;  RET TO 1ST DIAL TONE
                                        ;  RET TO 2ND DIAL TONE
2B5E 3638             MVI M,38H
2B60 C36E2B           JMP BEEP1
              CP23A:
2B63 21300A           LXI H,TRY
2B66 09               DAD B
2B67 70               MOV M,B ;RESET TRY
              CPS23:
2B68 21000A           LXI H,CPSTAT
2B6B 09               DAD B
2B6C 363C             MVI M,3CH
                      ;TURN ON HOWLER
              BEEP1:
2B6E AF               XRA A
2B6F 2E03             MVI L,3;  HOWLER
2B71 CF               RST 1;  SET IO
2B72 2A510A           LHLD RGSTAT
2B75 70               MOV M,B
2B76 214909           LXI H,TIME3
2B79 09               DAD B
2B7A 3601             MVI M,1
2B7C D7               RST 2 ;  RESET SUB TIMER
2B7D C9               RET
                                        ;AND EXECUTE
                                        ;  DETERMINE IF REJECT RETRY TO F
                                        ;  DIAL TONE OR JUST BAD CHECKSUM

              CPX38:
              CPX3A:
              CPX3C:
2B7E F5               PUSH PSW
              ;TURN OFF HOWLER
2B7F 3E01             MVI A,1
2B81 2E03             MVI L,3
2B83 CF               RST 1
2B84 F1               POP PSW
```

```
2B85 C22231            JNZ CPDT ; HUNG UP
2B88 214909            LXI H,TIME3
2B8B 09                DAD B
2B8C 36FF              MVI M,0FFH
2B8E 21000A            LXI H,CPSTAT     ; CALL PROCESSING STATE
2B91 09                DAD B
2B92 7E                MOV A,M
2B93 FE3A              CPI 3AH
2B95 CADF2B            JZ CPHU          ;REJECT DISCONNECT
2B98 FE3C              CPI 3CH
2B9A C2682C            JNZ RECA2        ; REJECT RETRY FOR CALLED NO> ET
                                        ; RETURN TO SECOD DIAL TONE
                                        ; BAD ACCT CHECKSUM OR REJ RETRY
                                        ;DETERMINE IF FIRST OR
                                        ;SECOND TRY
                                        ; IF REJ RETRY TRY=0
                  C23A:
2B9D 21300A            LXI  H,TRY       ;1ST OR 2ND TRY
2BA0 09                DAD  B           ;INDEXED BY LINE
2BA1 7E                MOV  A,M
2BA2 B7                ORA  A
2BA3 C2BC2B            JNZ  CPS24       ;ILLEGAL ATTEMPT
2BA6 34                INR  M           ;ADD 1 TO TRY
                                        ; FIRST TRY
2BA7 2A510A       C24A: LHLD RGSTAT     ;CLEAR STATUS
2BAA 70                MOV M,B
2BAB 214909            LXI  H,TIME3     ;SET TIME INCRIMENTED
2BAE 09                DAD  B           ;INDEX BY LINE
2BAF 3601              MVI  M,1         ;1 SEC
                  ; STX IN ETX NOT SENT ON REENTRY TO FIRST DIAL TONE
2BB1 CDC132            CALL SETREG
2BB4 80                DB 80H ; SET FLAG SO IT READS NO OF DIGS TO EXPE
                               ;INPUT PORT
2BB5 01                DB NULL
2BB6 FF                DB 0FFH
                                        ;SET STATE 2, RETURN TO DIAL
                                        ;TONE
2BB7 3E02              MVI A,2
2BB9 C31C2A            JMP  CPSZ
                                        ;REJECT RETRY ENTRY
                               ; SECOND TRY
                  CPS24:                ;ILLEGAL ATTEMPT
2BBC 70                MOV  M,B         ;RESET TRY
2BBD 2A510A            LHLD RGSTAT      ;ADDRESS OF STATUS WORD
2BC0 3680              MVI  M,200Q
                                        ; SCHED MSG
2BC2 2A530A            LHLD RGSTX
2BC5 5D                MOV E,L
2BC6 3A400C            LDA 0C40H ; NO DIGITS IN ACCT NO
2BC9 E60F              ANI 0FH
2BCB 83                ADD E
2BCC C603              ADI 3
2BCE 6F                MOV L,A
2BCF 364C              MVI  M,'L'       ;STORE ILLEGAL ATTEMPT CODE.
2BD1 2C                INR L
2BD2 3603              MVI M,ETX        ;IN CASE ITS OVERWRITTEN
2BD4 3E04              MVI A,4          ;STATE 4
2BD6 C31C2A            JMP CPSZ         ;MUST BE ABSOLUTE
                  ACKHU:
2BD9 210009            LXI H,LSTAT      ; FLAG DT ALREADY SENT
2BDC 09                DAD B
2BDD 3602              MVI M,2
                  CPHU:
2BDF 2A510A            LHLD RGSTAT
2BE2 3601              MVI M,1          ; SO IT CALLS UP NEXT STATE
2BE4 3E10              MVI  A,10H       ;WAIT REPLY AND HANG UP LINE
2BE6 C31C2A            JMP  CPSZ
                                        ;------------------------------
                                        ;CALL PROCESSING STATE 4
                                        ;REPLY RECEIVED TO ACCOUNT
                                        ;NUMBER OR SUBSCRIBER HUNG UP
                   CPX4:
                  CPX12:      ;ADDRESS OF REGISTER STATUS
                                        ;WORD
```

```
                                              ; TEST IF HUNG UP
2BE9 C22231              JNZ CPDT             ;HUNG UP
                CPX18:
2BEC EB         CPX28:   XCHG
2BED 2A530A     CPS41:   LHLD RGSTX
2BF0 2C                  INR L
2BF1 7E                  MOV  A,M
                                              ;BRANCH TO PROCESSING ROUTINE
                                              ;INDICATED BY RECEIVED CODE
2BF2 FE06                CPI ACK
2BF4 CAD92B              JZ ACKHU
2BF7 D641                SUI 'A'
2BF9 DA2231              JC WHAT              ; UNEXPECTED REPLY
2BFC CA682C              JZ RECA              ;PROCEED TO 2ND DIAL TONE
2BFF 3D                  DCR A
2C00 CA4E2D              JZ RECB ; PROCEED WITH CONNECT
2C03 3D                  DCR A
2C04 CA542B              JZ RECC ; REJECT RETRY
2C07 3D                  DCR A
2C08 CA5F2C              JZ RECD              ; REJECT DISCONNECT
2C0B 3D                  DCR A
2C0C CAD02C              JZ RECE              ; PROCESS ATB
2C0F 3D                  DCR A
2C10 CA9131              JZ RECF              ; CALLBACK
2C13 3D                  DCR A
2C14 CAD02C              JZ RECG ; SHORT TERM QUEUING
2C17 3D                  DCR A
2C18 CA1E2C              JZ RECH ; REGISTER BUSY OUT
2C1B C32231              JMP CPDT ; UNEXPECTED MESSAGE
                ; REGISTER BUSY OUT MESSAGE
                ;RECEIVED IN REPLY TO AO CT MESSAGE
                RECH:
2C1E 2C                  INR L
2C1F 7E                  MOV A,M; LS 4 BITS
2C20 E60F                ANI 0FH
2C22 57                  MOV D,A
2C23 2C                  INR L
2C24 7E                  MOV A,M; MS 4 BITS
2C25 E60F                ANI 0FH
2C27 07                  RLC
2C28 07                  RLC
2C29 07                  RLC
2C2A 07                  RLC
2C2B B2                  ORA D
2C2C 320904              STA RGBUSY; SET REG BUSY OUT WORD
                ;SET EACH BUSY LAMP TO PROPER STATE UNLESS ITS REGISTER
2C2F 1680                MVI D,80H ; MSB
2C31 1E08                MVI E,8 ; REG NO
2C33 1D         RECH1:  DCR E
2C34 F23E2C              JP RECHX             ;CONTINUE
2C37 2A510A              LHLD RGSTAT
2C3A 70                  MOV M,B
2C3B C33132              JMP MIN1             ;WAIT 1 MIN MESSAGE
                                   ;AND SEND AOCT AGAIN
                RECHX:
2C3E 7B                  MOV A,E; REG NO
2C3F D330                OUT 30H; SELECT REG
2C41 3A0A04              LDA RGUSE
2C44 A2                  ANA D; TEST IF IN USE
2C45 CA4E2C              JZ RECH3 ; NOT IN USE SET BZOUT
                RECH2:
2C48 7A                  MOV A,D
                                   ;SHIFT MASK RIGHT
2C49 0F                  RRC
2C4A 57                  MOV D,A
2C4B C3332C              JMP RECH1
                RECH3:
2C4E 3A0904              LDA RGBUSY ; BUSY FLAG
2C51 A2                  ANA D ; BIT
2C52 C25A2C              JNZ RECH4; BUSY ON
2C55 D325                OUT 25H ; TURN OFF BUSY LAMP
2C57 C3482C              JMP RECH2
2C5A D324       RECH4:   OUT 24H; TURN ON BUSY LAMP
2C5C C3482C              JMP RECH2;
```

```
                      ;
                      RECD:
                      CP2B:
                                                  ; 2 BEEPS AND WAIT HANG UP
2C5F 21000A                   LXI H,CPSTAT
2C62 09                       DAD B
2C63 363A                     MVI M,3AH
2C65 C36E2B                   JMP BEEP1
                      RECA:                       ; PROCERS PROCEED TO 2ND DIAL TO
                      RECA2:             ; ENTRY FOR 2 BEEPS AND SECOND DIAL TONE
                                                  ;EXECUTE SET UP REGISTER FOR
                                                  ;DIALING
2C68 CDC132                   CALL SETREG
2C6B 0A                       DB 10;  EXPECT 10 DIGITS
2C6C FF                       DB  0FFH            ;
2C6D 3E06                     MVI A,6             ;MUST SET ABSOLUTE
2C6F C31C2A                   JMP  CPSZ           ;WAIT DIALING COMPLETE
                                                  ;-------------------------------
                                                  ;CALL PROCESSING STATE 6
                                                  ;DIALING COMPLETE
                                                  ;CALLED NO.  OR SYSTEM COMMAND
                      CPX6:
2C72 EB                       XCHG                ;ADDRESSS OF REFISTER STATUS WD
2C73 C22231                    JNZ  CPDT
2C76 3680             CPS61:  MVI  M,2000         ;SCHEDULE MESSAGE TO SEND TO
                                                  ;CPS
2C78 3E12                     MVI  A,12H          ;SET STATE 12
2C7A C31C2A                   JMP  CPSZ
                                                  ;------------------------------
                                                  ; CALL PROCESSING STATE 8
                                                  ; SEND DT MSG
                                                  ;------------------------------
                                                  ;CALL PROCESSING STATE 10
                                                  ;HANG UP BEFORE CALL IN PROGRESS
                                                  ;SUBSCRIBER HUNG UP OR WE
                                                  ;HUNG HIM UP.
                      CPX10:
                                                  ;RELEASE REGISTER
2C7D 79                       MOV A,C
2C7E FE20                     CPI 20H ; TEST IF REPLY TO 1 MIN MESSAGE
2C80 CA8E2C                   JZ CPXA
2C83 EB                       XCHG;   ADDR OF STAT WD
2C84 2C                       INR L
2C85 2C                       INR L
2C86 2C                       INR L
2C87 36C0                     MVI M,0C0H;       DISCONNECT LINE
2C89 3E0A                     MVI A,0AH
2C8B C31C2A                   JMP CPSZ;         REMAINDER OF DISCONNECT
                      CPXA:
2C8E EB                       XCHG
2C8F 2C                       INR L
2C90 2C                       INR L
2C91 2C                       INR L               ;CONTROL WD
2C92 7E                       MOV A,M
2C93 B7                       ORA A
2C94 C0                       RNZ;        WAIT MATRIX SWITCHING DONE
2C95 2D                       DCR L
2C96 70                       MOV M,B             ; ZERO REGISTER STATE
2C97 2D                       DCR L
2C98 2D                       DCR L   ;ADDR OF REG STATUS WD
2C99 70                       MOV  M,B            ;CLEAR STATUS
2C9A 2D                       DCR  L              ;INLIN ADDRESS
2C9B 36FF                     MVI  M,0FFH         ;CLEAR LINE NO ASSIGNED
2C9D CD0733                   CALL CLRREG ;CLEAR ASSIGNED REG,SET BZ LAMP AND
2CA0 219009                   LXI H,HOOKT
2CA3 09                       DAD B
2CA4 70                       MOV M,B             ; ZERO SO STATE 6 GETS CALLED
2CA5 210009                   LXI  H,LSTAT        ;LINE SCANNER STATE
2CA8 09                       DAD  B              ;INDEX BY LINE
2CA9 7E                       MOV A,M
2CAA FE02                     CPI 2               ; TEST IF DT ALREADY SENT
2CAC CAB92C                   JZ CPXA1
2CAF FE07                     CPI 7
2CB1 C2CA2C                   JNZ CPXA2
2CB4 3E26                     MVI A,26H
```

```
2CB6 C31C2A                JMP CPSZ
                CPXA1:
2CB9 70                    MOV M,B         ;IDLE
2CBA 219009                LXI H,HOOKT
2CBD 09                    DAD B
2CBE 360E                  MVI M,0EH; 560MS-IN CASE TRANSITION MISSED
2CC0 79                    MOV A,C
2CC1 FE20                  CPI 20H
2CC3 CA3132                JZ MIN1 ; ACK REPLY TO 1 MIN MSG
                                   ;RET TO STATE 34
2CC6 AF                    XRA A   ;IDLE
2CC7 C31C2A                JMP CPSZ
2CCA 3606       CPXA2:          MVI  M,6        ;WAIT HANGUP
2CCC 7E                    MOV A,M         ;
2CCD C31C2A                JMP  CPSZ
                                           ;--------------------------------
                ;ATB MESSAGE PROCESSING
                RECG:
                RECE:                      ;PROCESS ATB
                ; REGISTER IS STILL CONNECTED
2CD0 214909                LXI H,TIME3
2CD3 09                    DAD B
2CD4 3601                  MVI M,1
2CD6 2A510A                LHLD RGSTAT
2CD9 70                    MOV M,B         ; CLEAR STATUS
2CDA 21300A                LXI H,TRY
2CDD 09                    DAD B
2CDE 3604                  MVI M,4         ; SET TO OUTPUT 3 BEEP PAIRS
2CE0 3E0C                  MVI A,0CH
2CE2 C31C2A                JMP CPSZ
                ;
                CPXC:
2CE5 C22231                JNZ CPDT
2CE8 21300A                LXI H,TRY
2CEB 09                    DAD B
2CEC 35                    DCR M
2CED CAFA2C                JZ REL          ; 3 BEEPS DONE RELEASE REG
2CF0 CD2C33                CALL BEEP
2CF3 214909                LXI H,TIME3
2CF6 09                    DAD B
2CF7 3601                  MVI M,1
2CF9 C9                    RET
                           REL:
2CFA 2A530A                LHLD RGSTX ;TEST IF SHORT TERM QUEUING
2CFD 23                    INX H
2CFE 7E                    MOV A,M
2CFF FE47                  CPI 'G'
2D01 CA142D                JZ REL2 ; RELEASE REGISTER

2D04 2A510A                LHLD RGSTAT
2D07 3640                  MVI M,40H       ;GIVE DIAL TONE AFTER 4 BEEPS
                           ; SET STATE TO WAIT FOR RECALL OR HANGUP OR TIME
2D09 214909                LXI H,TIME3
2D0C 09                    DAD B
2D0D 361E                  MVI M,30
2D0F 3E14                  MVI A,14H
2D11 C31C2A                JMP CPSZ        ; WAIT ENTRY OF EXTENSION NO
2D14 2A510A     REL2:      LHLD RGSTAT
2D17 2C                    INR L
2D18 2C                    INR L
2D19 2C                    INR L ;MAT SW CONTROL WD
2D1A 36C0                  MVI M,0C0H; CLEAR LINE
2D1C C3152A                JMP CPSI ; STATE 0E; WAIT REG RELEASE
                ;
                ;STAT 0E
                ;WAIT REGISTER RELEASE (SHORT TERM QUEUING)
                CPXE:
2D1F C22231                JNZ CPDT        ;HUNG UP
2D22 EB                    XCHG
2D23 2C                    INR L
2D24 2C                    INR L
2D25 2C                    INR L
2D26 7E                    MOV A,M
2D27 B7                    ORA A
```

```
2D28 C0             RNZ ; WAIT SWITCHING DONE
2D29 2D             DCR L
2D2A 2D             DCR L
2D2B 2D             DCR L
2D2C 2D             DCR L
2D2D 36FF           MVI M,0FFH; CLEAR INLIN
2D2F CD0733         CALL CLRREG; CLEAR REG ASSIGNED,SET LAMP AND CLE
2D32 219009         LXI H,HOOKT
2D35 09             DAD B
2D36 70             MOV M,B; CALL LS EVERY 40
2D37 210009         LXI H,LSTAT;LINE SCANNER STATE
2D3A 09                     DAD B
2D3B 3607           MVI M,7 ; WAIT TIME 3= 0
2D3D 214909         LXI H,TIME3
2D40 09             DAD B
2D41 361E           MVI M,30 ; RECALL IN 30 SECS
                            ;TO SEND CALL WAITING MESSAGE
2D43 3E2C           MVI A,2CH
2D45 C31C2A         JMP CPSZ
             ;
             ;STATE 2C
             ;CALL WAITING
             ;CALLED UP IN 30 SEC
             CPX2C:
2D48 C22231         JNZ CPDT ; HUNG UP
I 2D4B C34531       JMP CPSCW; SEND CALL WAITING
             ;
             RECB:                  ; PROCESS CONNECT
             ;CONNECT MESSAGE RECIEVED
             ;CHECK IF MESSAGE IS FOR LINE ASSIGNED YO THID REGIDTER
2D4E 2A530A         LHLD RGSTX
2D51 2C             INR L
2D52 2C             INR L
2D53 7E             MOV A,M ;INPUT LINR ASSIGNED
2D54 E61F           ANI 1FH
2D56 50             MOV D,B
                            ;CLEAR
2D57 5F             MOV E,A
2D58 2A510A         LHLD RGSTAT
2D5B 2D             DCR L
2D5C 7E             MOV A,M ; LINE ASSIGNED TO REGISTER
2D5D E63F           ANI 3FH
2D5F BB             CMP E;COMPARE WITH SPECIFIED LINE
2D60 CAA62D         JZ CP121;PROCESS CONNECT
             ;NOT SAME LINE NO. CHECK IF ASSIGNED TO OTHER REG
2D63 216F09         LXI H,REGAS
2D66 19             DAD D
2D67 7E             MOV A,M; REG ASSIGNED TO SPECIFIEDD LINE
2D68 B7             ORA A
2D69 F2BA2E         JP SENDBI;ASSIGNED TO OTHER REGISTER
                            ;SPECIAL MESSAGES HANDLING ROUTINE REQIR
                            ;LINE IS NOT ASSIGNED TO TEHIS REFG
             ;TRANSFER SPECIFIED LINE TO THIS REGISTER
             ;AND RETURN ORIG LINE TO IDLE OR 1 MIN MSG
2D6C 79             MOV A,C        ;LINE ASSIGNED TO REGISTER
2D6D FE20           CPI 20H ; LINE 20
2D6F CA912D         JZ SET2 ; SET STATE TO 1 MIN MSG
2D72 210009         LXI H,LSTAT ; CLEAR LS STATE
2D75 09             DAD B; FOR ORIG LINE
2D76 70             MOV M,B
2D77 21000A         LXI H,CPSTAT ; CALL POROC
2D7A 09             DAD B ; IDLE
2D7B 70             MOV M,B
             ;TRANSFER REGISTER
             XFER2:
2D7C 216F09         LXI H,REGAS
2D7F 09             DAD B; LINE ATTACHED TO REG
2D80 7E             MOV A,M
2D81 36FF           MVI M,0FFH
2D83 216F09         LXI H,REGAS
2D86 19             DAD D ; SPECIFIED LINE
2D87 77             MOV M,A ; SET REG ASSIGNED TO SPECIFIED LINE
2D88 2A510A         LHLD RGSTAT
2D8B 2D             DCR L
```

```
2D8C 73                 MOV M,E; INLIN
2D8D 4B                 MOV C,E ; SET TO SPECIFIED LINE
2D8E C3A62D             JMP CP121; PROCESS CONNEDT
               ; RESET ORIGINAL LINE TO 1 MINUTE MESSAGE STATE
2D91 210009    SET2:    LXI H,LSTAT ; LINE SCANNNR STATE
2D94 09                 DAD B
2D95 360F               MVI M,0FH
2D97 21000A             LXI H,CPSTAT ; CALL PROC
2D9A 09                 DAD B
2D9B 3634               MVI M,34H ; 1 MIN MSG
2D9D 214909             LXI H,TIME3
2DA0 09                 DAD B
2DA1 363C               MVI M,60 ; 1 MIN
2DA3 C37C2D             JMP XFER2; TRANSFER REGISTER
               ;
               CP121:
2DA6 2A530A             LHLD RGSTX
2DA9 2C                 INR L
               ;
               CP122:
                                        ;CONNECT OUT LINE
                                        ; CONNECT OUTPUT LINE
                                        ; PUT D0H PLUS REG NO IN CONTROL
                                        ; AND OUTPUT LINE NUMBER IN OULI
2DAA 2C                 INR L           ; INPUT LINE NUMBER
2DAB 2C                 INR L           ; OUTPUT LINE NO.
2DAC 7E                 MOV A,M
2DAD 210D04             LXI H,BTIME
2DB0 09                 DAD B
2DB1 57                 MOV D,A
2DB2 E620               ANI 20H
2DB4 CABC2D             JZ C122B;3 MIN BEEP
2DB7 36FF               MVI M,0FFH; NO BEEP
2DB9 C3BE2D             JMP C122C
2DBC 36B4      C122B: MVI M,180 ; 3 MIN
               C122C:
2DBE 7A                 MOV A,D ; RESTORE OUT LINE NO
2DBF E61F               ANI 1FH
2DC1 21C309             LXI H,OULIN     ; OUTPUT LINE NO.
2DC4 09                 DAD B   ; INDEX BY INPUT LINE
2DC5 77                 MOV M,A         ; STORE
               ;
               ;DDD TEST
2DC6 7A                 MOV A,D ; OUTPUT LINE NO
2DC7 E640               ANI 40H ; TEST DDD TONE BIT
2DC9 CAE02D             JZ CP123; NOT DDD
2DCC AF                 XRA A
2DCD 2E05               MVI L,5; TURN ON BEEP
2DCF CF                 RST 1 ; TURN ON BEEP
2DD0 214909             LXI H,TIME3
2DD3 09                 DAD B
2DD4 3601               MVI M,1
2DD6 D7                 RST 2; RESET SUB TIMER
2DD7 2A510A             LHLD RGSTAT
2DDA 70                 MOV M,B; CLEAR
2DDB 3E3E               MVI A,3EH
2DDD C31C2A             JMP CPSZ; WAIT BEEP DONE
               CP123:
2DE0 216F09             LXI H,REGAS
2DE3 09                 DAD B
2DE4 3EF0               MVI A,0F0H      ; CONNECT INPUT,OUTPUT, REGISTER
2DE6 B6                 ORA M
2DE7 2A510A             LHLD RGSTAT
2DEA 57                 MOV D,A
2DEB 70                 MOV M,B         ; CLEAR STATUS
2DEC 2C                 INR L
2DED 2C                 INR L
2DEE 3611               MVI M,11H       ; START SENDER
2DF0 2C                 INR L           ; MATRIX CONTROL WD
2DF1 72                 MOV M,D
2DF2 2C                 INR L; REG TIMERF
2DF3 2C                 INR L; GN TIMER
2DF4 70                 MOV M,B; ZERO
2DF5 214909                     LXI H,TIME3     ;SET 15 SEC TIME
```

```
2DF8 09              DAD  B            ;INDEX BY LINE
2DF9 360F            MVI  M,15
               ;SET SPLIT
2DFB 2E01            MVI L,1
2DFD AF              XRA A
2DFE CF              RST 1
2DFF 213204          LXI H,NODE        ;CLEAR NODE NUMBER
2E02 09              DAD B
2E03 70              MOV M,B
2E04 21550A          LXI H,SPV         ;FOR INDIAL W/0 WAIT BITS
2E07 09              DAD B
2E08 70              MOV M,B
2E09 3E20            MVI  A,20H        ;SET STATE 20 - CONNECT CALL
2E0B C31C2A          JMP  CPSZ
               ;STATE 3E        ;LONG BEEP FOR DDD
               CPX3E:
2E0E F5              PUSH PSW
2E0F 3E01            MVI A,1
2E11 2E05            MVI L,5
2E13 CF              RST 1; TURN OFF BEEP
2E14 F1              POP PSW
2E15 C22231          JNZ CPDT ; HUNG UP
2E18 C3E02D          JMP CP123; PROCEED WITH CONNECT CALL
                                       ;------------------------------
                                       ;CALL PROCESSOR STATE 14
                                       ;ATB CALL BACK IN PROGRESS
                                       ;ENTERED AFTER 3 BEEPS OR HANGUP
               ; REGISTER STILL CONNECTED
               CPX14:
2E1B EB              XCHG              ;ADDR OF REG STATUS WD
2E1C C22231          JNZ   CPDT        ;HANG UP - GO TO STATE 8
2E1F 7E              MOV   A,M
2E20 E640            ANI   40H         ;15 SEC TIMEOUT
2E22 CA5F2C          JZ CP2B           ;SEND 2BEEPS, WAIT ON HOOK,THEN
               CPSTR:                             ;INITIALIZE REGISTER
                                                  ;TO RECEIVE CALLBACK
2E25 CDC132          CALL SETREG       ;SET UP REG
                          ;SET TO 8 SO WONT GET DIAL
                          ; TONE BACK AFTER 7 ENTERED
2E28 08              DB 8 ; EXPECT 7
2E29 46              DB 'F'
2E2A FF              DB 0FFH
2E2B C3582A          JMP CPX0A ; SET TIME3 TO FF AND GO TO NEXT STATE

                                       ;COMPLETE
                                       ;------------------------------
                                       ;CALL PROCESSING STATE 16
                                       ;ATB CAMP ON IN PROGRESS
                                       ;DIALING OF CALL BACK
                                       ;EXTENSION DONE .
               CPX16:
                                       ;REGISTER DID NOT CLOSE OUT
                                       ;WITH ETX
                                       ;AS SUBSCRIBER HUNG UP
2E2E EB              XCHG    ;ADDR OF REGISTER STATUS WORD
2E2F 3680            MVI  M,200Q       ;SCHEDULE MSG
2E31 2D              DCR  L
2E32 2D              DCR  L            ;ADDRESS OF DIGIT ADDRESS
2E33 6E              MOV  L,M          ;ADDRESS OF WHERE ETX GOES
2E34 2607            MVI H,7 ; MESSAGE BANK
2E36 3603            MVI  M,ETX        ;RET ETX IN MESSAGE
2E38 C3152A          JMP  CPSI         ;WAIT REPLY TO MESSAGE.
                                       ;------------------------------
                                       ;------------------------------
                                       ;CALL PROCESSING STATE 1A
                                       ;CPS HAS INITIATED EXTENSION
                                       ;CALLBACK
                                       ;CALL BACK MSG IS IN BUFFER
               CPX1A:
               ;CHECK IF MESSAGE IS FOR LINE ASSIGNED TO THEIS REGISGST
2E3B 2A530A          LHLD RGSTX
2E3E 2C              INR L
2E3F 2C              INR L
```

```
2E40 7E          MOV A,M; INPUT LINE NO SPECIFIED
2E41 E61F        ANI 1FH
2E43 50          MOV D,B;CLEAR
2E44 5F          MOV E,A
2E45 2A510A      LHLD RGSTAT
2E48 2D          DCR L
2E49 7E          MOV A,M; LINE ASSIGNED TO REGISTER
2E4A E63F        ANI 3FH
2E4C BB          CMP E ; COMPARE WITH LINE SPECIFIED
2E4D CAA52E      JZ CKHK; SAME LINE-CHECK HOOK
                 ;NOT SAME LINE-CHACK IF ASSIGNED TO OTHER REGISTER
2E50 216F09      LXI H,REGAS
2E53 19          DAD D
2E54 7E          MOV A,M ; REG ASSIGNED TO SPECIFIED DLINE
2E55 B7          ORA A
2E56 F2BA2E      JP SENDBI; ASSIGNED TO OTHER REGISTER;CHECK HOOK
2E59 7B          MOV A,E; SPECIFIED LINE
2E5A E618        ANI 18H
2E5C 07          RLC
2E5D F608        ORI 8
2E5F 6F          MOV L,A
2E60 260C        MVI H,0CH
2E62 7E          MOV A,M ; HOOK DETECT
2E63 21B80A      LXI H,RMASK
2E66 19          DAD D
2E67 A6          ANA M
2E68 CABA2E      JZ SENDBI; OFF HOOK
                 ;TRANSFER SPECIFIED LINE TO THIS REGISTER
                 ;AND RETURN ORIGINAL LINE TO IDLE OR 1 MIN MESSAGE
2E6B 79          MOV A,C ; LINE NO ASSIGNED TO REG
2E6C FE20        CPI 20H ; LINE 20
2E6E CA902E      JZ SET1; RETURN STATE TO 1 MIN MSG
2E71 210009      LXI H,LSTAT; CLEAR LS STATE
2E74 09          DAD B
2E75 70          MOV M,B
2E76 21000A      LXI H,CPSTAT
2E79 09          DAD B
2E7A 70          MOV M,B; CALL PROC STATE
                 ;TRANSFER REG
2E7B 216F09      XFER1: LXI H,REGAS
2E7E 09          DAD B; LINE ATTACHED TO REG
2E7F 7E          MOV A,M
2E80 36FF        MVI M,0FFH
2E82 216F09      LXI H,REGAS
2E85 19          DAD D; SPECIFIED LINE
2E86 77          MOV M,A; SET REG ASSIGNED TO SPECIFIEDLINE
2E87 2A510A      LHLD RGSTAT
2E8A 2D          DCR L
2E8B 73          MOV M,E ; INLIN
2E8C 4B          MOV C,E ;SET TO SPECIFIED LINE
2E8D C3EB2E      JMP CP1A1; PROCESS CALLBACK

                 ;RESET ORIGINAL LINE TO 1 MIN STATE
2E90 210009      SET1: LXI H,LSTAT; LINE SCANNNER STATE
2E93 09          DAD B
2E94 360F        MVI M,0FH
2E96 21000A      LXI H,CPSTAT; CALL PROC
2E99 09          DAD B
2E9A 3634        MVI M,34H; 1 MIN MSG
2E9C 214909      LXI H,TIME3
2E9F 09          DAD B
2EA0 363C        MVI M,60; 1 MIN
2EA2 C37B2E      JMP XFER1; TRANSFER REGISTER
                 ;SAME LINE-CHECK HOOK BIT
2EA5 79          CKHK: MOV A,C
2EA6 E618        ANI 18H
2EA8 07          RLC
I 2EA9 F608      ORI 8
2EAB 6F          MOV L,A
I 2EAC 260C      MVI H,0CH
2EAE 7E          MOV A,M ; HOOK DETECT
2EAF 21B80A      LXI H,RMASK
2EB2 09          DAD B
2EB3 A6          ANA M
```

```
2EB4 CA3331          JZ CPSBI; OFF HOOK
2EB7 C3EB2E          JMP CP1A1       ;PROCEED WITH CALLBACK
                ;SEND BI MESSAGE FOR SPECIFIED LINE
                ;NOT SAME AS LINE ASSIGNED TO REGISTER
                SENDBI:
2EBA 2A510A          LHLD RGSTAT ; ADDR OF STATUS WORD
2EBD 3680            MVI M,200Q;SCHEDULE MESSAGE
2EBF 2C              INR L
2EC0 2C              INR L
2EC1 70              MOV M,B ; CLEAR
2EC2 2A530A          LHLD RGSTX; START OF MESSAGE
2EC5 3602            MVI M,STX
2EC7 2C              INR L
2EC8 E5              PUSH H
2EC9 216F09          LXI H, REGAS
2ECC 09              DAD B
2ECD 7E              MOV A,M
2ECE E1              POP H
2ECF F6C0            ORI 0C0H
2ED1 77              MOV M,A ; REG NO
2ED2 2C              INR L
2ED3 7B              MOV A,E ; SPECIFIED LINE NO
2ED4 F680            ORI 80H
2ED6 77              MOV M,A; INP8UT LINE NO
2ED7 2C              INR L
2ED8 3642            MVI M,'B'
2EDA 2C              INR L
2EDB 3649            MVI M,'I'
2EDD 2C              INR L
2EDE 3603            MVI M,ETX
2EE0 214909          LXI H,TIME3
2EE3 09              DAD B
2EE4 36FF            MVI M,0FFH
2EE6 3E28            MVI A,28H
2EE8 C31C2A          JMP CPSZ; WAIT REPLY
                ;
                                     ;CONNECT INPUT LINE TO
                                     ;REGISTER
                CP1A1:
2EEB 210009          LXI H,LSTAT
2EEE 09              DAD B
2EEF 3603            MVI M,3          ; MAKE LS IDLE
2EF1 216F09          LXI H,REGAS
2EF4 09              DAD B
2EF5 7E              MOV A,M          ; REG NO
2EF6 F6D0            ORI 0D0H         ; UPPER BYTE
2EF8 47              MOV B,A          ; CONTROL WORD
2EF9 2A510A          LHLD RGSTAT           ;STATUS WORD ADDR
2EFC 72              MOV M,D
2EFD 2C              INR L
2EFE 2C              INR L
2EFF 3610            MVI M,10H        ;START SENDER
2F01 2C              INR L
2F02 70              MOV M,B          ; STOE
2F03 0600            MVI B,0
2F05 2C              INR L
2F06 2C              INR L
2F07 70              MOV M,B
2F08 214909          LXI  H,TIME3     ;TIMER
2F0B 09              DAD B            ;INDEXED BY LINE
2F0C 360F            MVI  M,15        ;15 SECOND TIMEOUT ON DIALING
2F0E 3E1C            MVI A,01CH; MUST SET ABSOLUTE
2F10 C31C2A          JMP CPSZ
                                     ;-----------------------------
                                     ;CALL PROCESSING STATE 1C
                                     ;INWARD DIALING DONE
2F13 EB         CPX1C: XCHG    ;ADDR OF STATTUS WD
2F14 E608            ANI  10Q         ;TEST IF TIMER RAN OUT
2F16 C2262F          JNZ CP1CA
                ;TEST IF WAITING DIAL TONE OR 600MS
2F19 2C              INR L
2F1A 2C              INR L
2F1B 7E              MOV A,M ; REG STATE
2F1C FE09            CPI 9
```

```
2F1E CA352F              JZ C1CA; WAITING DIAL TONE
2F21 FE0A                CPI 0AH
2F23 CA3F2F              JZ C1CC; WAITING 600MS
                                 ;  DIALING COMPLETE NOT SET-
                 CP1CA:
2F26 214909              LXI H,TIME3
2F29 09                  DAD B
2F2A 3619                MVI M,25; 25 SEC NA
2F2C 21550A              LXI H,SPV
2F2F 09                  DAD B
2F30 36FF                MVI M,0FFH       ; FLAG ON HOOK
2F32 C37E30              JMP CP20T
                 C1CA:           ;WAITING DIAL TONE-
2F35 21550A              LXI H,SPV
2F38 09                  DAD B
2F39 7E                  MOV A,M
2F3A FE02                CPI 2
                                 ;DIAL TONE
2F3C C25131              JNZ CPSIP ; NO DIAL TONE
                 ;RET TO STATE 12 REGISTER
                 C1CC:           ; DIAL TONE DETECTED OR 600MS BLIND WAIT
                 ; RETURN TO STATE 12 REGISTER(INWARD DIAL)
2F3F 214909              LXI H,TIME3
2F42 09                  DAD B
2F43 36FF                MVI M,0FFH ; RESET TIMER
2F45 219009              LXI H,HOOKT
2F48 09                  DAD B
2F49 36FF                MVI M,0FFH
2F4B 213204              LXI H,NODE
2F4E 09                  DAD B
2F4F 34                  INR M ; ADVANCE NODE NUMBER
2F50 2A510A              LHLD RGSTAT
2F53 70                  MOV M,B ; CLEAR STATUS
2F54 2C                  INR L
2F55 2C                  INR L
2F56 3612                MVI M,12H ; REGISTER STATE
2F58 210009              LXI H,LSTATE
2F5B 09                  DAD B
2F5C 3603                MVI M,3
2F5E C9                  RET
                                          ;ANSWER RECEIVED
                                          ;------------------------------
                                          ;CALL PROCESSING STATE 1E
                                          ;CALLED EXTENSION ANSWERED
                 CPX1E:                   ;OR TIMER RAN OUT
                                          ;SET LINE SCANNER STATE 3
2F5F 210009              LXI H,LSTAT
2F62 09                  DAD B
2F63 3603                MVI M,3

2F65 21550A              LXI  H,SPV       ;SUPERVISORY TONES
2F68 09                  DAD  B
2F69 7E                  MOV  A,M         ;SUPERVISORY TONE
2F6A FE06                CPI  6           ;CHECK FOR ANSWER
2F6C CAA62D              JZ CP121 ; ANSWERED-PROCEED TO OUTDIAL
2F6F FE02                CPI 2 ; DIAL TONE DETECTED
2F71 CA5131              JZ CPSIP ; PROBABLY DID NOT BREAK
2F74 FE03        CP1E1:  CPI  3
2F76 CA3F31              JZ   CPSBO       ;BUSY
2F79 21970A              LXI H,SPCTR
2F7C 09                  DAD B
2F7D 7E                  MOV A,M
2F7E E6F0                ANI 0F0H
2F80 CA5131              JZ CPSIP ; NO RING DETECTED
2F83 C33931              JMP  CPSNA       ;NO ANSWER
                                           ;------------------------------
                                          ;CALL PROCESSING STATE 20
                                          ;OUTWARD DIALING DONE OR 10SEC
                                          ;TIMEOUT
                                 ;OR NODE
2F86 EB          CPX20:  XCHG    ;ADDR OF REG STATUS WD
2F87 F5                  PUSH PSW
2F88 E5                  PUSH H
2F89 21550A              LXI H,SPV
```

```
2F8C 09                 DAD B
2F8D 7E                 MOV A,M
2F8E FE01               CPI 1 ; HUNG UP
2F90 C29C2F             JNZ CX20A ; NOT HUNG UP
2F93 E1                 POP H
2F94 F1                 POP PSW
2F95 2E01               MVI L,1
2F97 7D                 MOV A,L ; RESET SPLIT
2F98 CF                 RST 1
2F99 C32231             JMP CPDT
               CX20A:
2F9C E1                 POP H
2F9D F1                 POP PSW
2F9E F5                 PUSH PSW
2F9F E5                 PUSH H
2FA0 2C                 INR L
2FA1 2C                 INR L
               ;TEST IF INTERMEDIATE NODE WAS REACHED
2FA2 7E                 MOV A,M ; REG STATE
2FA3 FE09               CPI 9
2FA5 CA2730             JZ CP20A ; WAITING FOR DIAL TONE
2FA8 FE0A               CPI 0AH
2FAA CA5430             JZ CP20C; WAITING 600MS
               ; DIALING COMPLETE
               ; STOP REGISTER
2FAD 70                 MOV M,B
                                  ;TURN OFF DTMF
2FAE 216F09             LXI H,REGAS
2FB1 09                 DAD B
2FB2 7E                 MOV A,M ;REG NO.
2FB3 D330               OUT 30H; SELECT REGISTER
2FB5 D321               OUT 21H; RESET DTMF
                                  ;RESET SPLIT
2FB7 2E01               MVI L,1 ;SPLIT
2FB9 7D                 MOV A,L ;RESET
2FBA CF                 RST 1
2FBB 2E00               MVI L,0 ; DIAL OUT
2FBD 3E01               MVI A,1 ; SET DO
2FBF CF                 RST 1 ; TO INITIALIZE AFTER DIALING
2FC0 E1                 POP H
2FC1 F1                 POP PSW
               ;TIE LINE TEST
2FC2 E5                 PUSH H
2FC3 21C309             LXI H,OULIN
2FC6 09                 DAD B
2FC7 7E                 MOV A,M
2FC8 5F                 MOV E,A
2FC9 50                 MOV D,B
2FCA E618               ANI 18H;EXTRACT WD NO
2FCC 0F                 RRC
2FCD 0F                 RRC
2FCE 0F                 RRC
2FCF C604               ADI 4
2FD1 6F                 MOV L,A;WORD NO
2FD2 2604               MVI H,4; BANK4*****
2FD4 7E                 MOV A,M ; TIE LINE STATUS WORD
2FD5 21B80A             LXI H,RMASK
2FD8 19                 DAD D; INDEX BY OUT LIN
2FD9 A6                 ANA M
2FDA E1                 POP H
2FDB CA1D30             JZ C20F; NOT TIE LINE
               ;;TIE LINE CALL AND OUTDIALING DONE
2FDE 70                 MOV M,B ; RGSTAT
2FDF 21550A             LXI H,SPV
2FE2 09                 DAD B
2FE3 70                 MOV M,B
2FE4 214909             LXI H,TIME3
2FE7 09                 DAD B
2FE8 3606               MVI M,6
2FEA 210009             LXI H,LSTAT
2FED 09                 DAD B
2FEE 3609               MVI M,9
2FF0 219009             LXI H,HOOKT
2FF3 09                 DAD B
```

```
2FF4 70             MOV M,B
2FF5 3E40           MVI A,40H
2FF7 C31C2A         JMP CPSZ;WAIT FINAL DIAL TONE
                ; WAIT FINAL DIAL TONE FOR OUTPUT TIE LINE
                CPX40:
2FFA 21550A         LXI H,SPV
2FFD 09             DAD B
2FFE 7E             MOV A,M
2FFF FE01           CPI 1
3001 CA2231         JZ CPDT ; HUNG UP
3004 21550A         LXI H,SPV
3007 09             DAD B
3008 7E             MOV A,M
3009 FE02           CPI 2
300B CA1931         JZ CPSCC
300E 210009         LXI H,LSTAT
3011 09             DAD B
3012 3601           MVI M,1
3014 219009         LXI H,HOOKT
3017 09             DAD B
3018 36FF           MVI M,0FFH
301A C34B31         JMP CPSBZ
                ;
                    ; RELEASE REGISTER
                C20F:
301D 2C             INR L
301E 2C             INR L
301F 2C             INR L; MATRIX SW CONTROL
3020 36E0           MVI M,0E0H      ; CONNECT INPUT,OUTPUT,RELEASE R
3022 3E2E           MVI A,2EH       ;WAIT REG
3024 C31C2A         JMP CPSZ        ;DISCONNECT
                CP20A:              ;WAITING DIAL TONE -NODE
3027 E1             POP H
3028 F1             POP PSW
3029 21550A         LXI H,SPV
302C 09             DAD B
302D 7E             MOV A,M
302E B7             ORA A
302F FE02           CPI 2; DIAL TONE
3031 C26230         JNZ CPBZ
                ;RETURN TO STATE 12 REG
                CP20B:
3034 214909         LXI H,TIME3
3037 09             DAD B ;
3038 36FF           MVI M,0FFH ; RESET TIMER
303A 219009         LXI H,HOOKT
303D 09             DAD B
303E 36FF           MVI M,0FFH
3040 213204         LXI H,NODE
3043 09             DAD B
3044 34             INR M ; ADVANCE NODE NUMBER
3045 2A510A         LHLD RGSTAT
3048 70             MOV M,B ; CLEAR STATUS
3049 2C             INR L
304A 2C             INR L
304B 3612           MVI M,12H; REGISTER STATE
304D 210009         LXI H,LSTATE
3050 09             DAD B
3051 3601           MVI M,1
3053 C9             RET
                CP20C:              ;TIMEOUT-NODE
3054 E1             POP H
3055 F1             POP PSW
3056 21550A         LXI H,SPV
3059 09             DAD B
305A 7E             MOV A,M
305B B7             ORA A
305C C26230         JNZ CPBZ; ANY TONES
305F C33430         JMP CP20B
                ;ERROR CONDITIONS DETECTED AT NODE OR INITIAL DIGIT
                ; IF WAITING FOR DIAL TONE, NONE WAS REPORTED OR BUSY
                ; IF WAITING 600MS, BUSY OR OTHER TONES WERE DETECTED
                CPBZ:
3062 210009         LXI H,LSTAT
```

```
3065 09                 DAD B
3066 3601               MVI M,1
3068 219009             LXI H,HOOKT
306B 09                 DAD B
306C 36FF               MVI M,0FFH
                        ;RESET SPLIT
306E 2E01               MVI L,1 ; SPLIT
3070 7D                 MOV A,L ; RESET
3071 CF                 RST 1
                ; TEST IF INITIAL DIGIT
3072 213204             LXI H,NODE ; NUMBER OF NODE
3075 09                 DAD B
3076 7E                 MOV A,M
3077 B7                 ORA A
3078 CA5D31             JZ CPSOP ; FIRST DIGIT,UNABLE TO DIAL
307B C34B31             JMP CPSBZ ; NODE IN TIE LINE NET OTHER THAN FIRS
                CP20T:
307E 2A510A             LHLD RGSTAT
3081 70                 MOV M,B ; CLEAR STATUS
3082 210009             LXI H,LSTAT
3085 09                 DAD B
3086 3609               MVI M,9         ;START TONE ANALYZER
3088 219009             LXI H,HOOKT
308B 09                 DAD B
308C 70                 MOV M,B         ; CALL UP EVERY 40MS
308D C3152A             JMP CPSI;       WAIT ANSWER


                                        ;--------------------------------
                                        ;CALL PROCESSING STATE 22
                                        ;ANSWER RECEIVED ON OUTWARD
                                        ;TRUNK
                                        ;DIAL TONE NOT REPORTED BY SPV R
                CPX22:
3090 21550A             LXI  H,SPV      ;SUPERVISORY TONES
3093 09                 DAD B
3094 7E                 MOV  A,M        ;SUPERVISORY TONE
3095 FE06               CPI  6          ;ANSWER
3097 CA1931             JZ   CPSCC     ;CONNECT CALL
309A B7                 ORA  A
309B CA1331             JZ CPSCQ        ; NO DETECT
309E 3D                 DCR A
309F CA2231             JZ CPDT         ;HANGUP
30A2 C35731             JMP CPSOC       ;BUSY
                                        ;-------------------------------
                                        ;CALL PROCESSING STATE 24
                                        ;WAIT REPLY TO CC
                                        ;ENTERED ON REPLY RECEIVED
                                        ; OR HANG UP
                                        ; PART OF STATE 28 REPLY
                CPX24:
30A5 C22A31       JNZ CPSCT
30A8 EB                 XCHG            ; CLEAR REG ST WD
30A9 210009             LXI H,LSTAT     ;LINE SCANNER STATE
30AC 09                 DAD B
30AD 3607               MVI M,7         ;WAIT HANGUP
30AF 219009             LXI H,HOOKT
30B2 09                 DAD B
30B3 70                 MOV M,B         ; CALL LS EVERY 40
30B4 210D04             LXI H,BTIME
30B7 09                 DAD B
30B8 7E                 MOV A,M; BEEP TIME,SET ON REEIPT OF B,F
30B9 214909             LXI H,TIME3
30BC 09                 DAD B
30BD 77                 MOV M,A ; SET BEEP TIMER TO 3 MIN OR OFF
30BE 3E0A               MVI A,0AH       ; RELEASE REGISTER
30C0 C31C2A             JMP CPSZ
                ; STATE 2E-- WAIT REG DISCONNECT AFTER OUTPULSING
                CPX2E:
30C3 C22231             JNZ CPDT ; HUNG UP
30C6 EB                 XCHG
30C7 2C                 INR L
30C8 2C                 INR L
30C9 2C                 INR L
```

```
30CA 7E              MOV A,M
30CB B7              ORA A
30CC C0              RNZ      ; WAIT SWITCHING DONE
30CD 2D              DCR L
30CE 2D              DCR L
30CF 2D              DCR L
30D0 2D              DCR  L
30D1 36FF            MVI  M,0FFH      ;CLEAR INLIN
30D3 CD0733          CALL CLRREG ; CLEAR REGASSIGNED,SETLAMP,CLEAR RE
30D6 21550A          LXI H,SPV
30D9 09              DAD B
30DA 70              MOV M,B          ; INIT FLAG TO OFF HOOK
30DB 214909          LXI H,TIME3
30DE 09              DAD B
30DF 3632            MVI M,50         ; NO DETECT TIMER(1MIN CORR)
30E1 21000A          LXI H,CPSTAT
30E4 09              DAD B
30E5 3620            MVI M,20H
30E7 C37E30          JMP CP20T        ;WAIT ANSWER SUPERVISIOM
            CLRIN:
30EA 2A510A          LHLD RGSTAT
30ED 2C              INR L
30EE 2C              INR L
30EF 2C              INR L
30F0 36C0            MVI M,0C0H       ; SET MATRIX CONTROL TO CLEAR IN
30F2 3E2A            MVI A,2AH
30F4 C31C2A          JMP CPSZ
            ;WAIT FOR LINE TO CLEAR
            CPX2A:
30F7 EB              XCHG
30F8 2C              INR L
30F9 2C              INR L
30FA 2C              INR L
30FB 7E              MOV A,M
30FC B7              ORA A
30FD C0              RNZ      ; WAIT SW DONE
30FE 21550A          LXI H,SPV
3101 09              DAD B
3102 7E              MOV A,M
3103 B7              ORA A
3104 CA0D31          JZ MDT
3107 114354          LXI D,'CT'
310A C36031          JMP MSG
310D 114454 MDT:     LXI D,'DT'
3110 C36031          JMP MSG
            ;
                              ; ROUTINE TO OUTPUT MESSAGE AND SET STAT
            ;
3113 114351 CPSCQ:   LXI D,'CQ'
3116 C31C31          JMP CPSC2
3119 114343 CPSCC:   LXI D,'CC'
            CPSC2:
311C 3E24            MVI A,24H        ; NEXT STATE
311E F5              PUSH PSW
311F C36331          JMP MSG2A
            CPX8:
            WHAT:
            CPDT:
3122 21550A CPSDT:   LXI H,SPV
3125 09              DAD B
3126 70              MOV M,B          ;FLAG DT
3127 C3EA30          JMP CLRIN
            CPX26:
312A 21550A CPSCT: LXI H,SPV
312D 09              DAD B
312E 3601            MVI M,1          ; FLAG CT
3130 C3EA30          JMP CLRIN
3133 114249 CPSBI:   LXI D,'BI'
3136 C36031          JMP MSG
3139 114E41 CPSNA:   LXI D,'NA'
313C C36031          JMP MSG
313F 11424F CPSBO:   LXI D,'BO'
3142 C36031          JMP MSG
3145 114357 CPSCW: LXI D,'CW'
```

```
3148 C36031              JMP MSG
314B 11425A    CPSBZ:    LXI D,'BZ'
314E C36031              JMP MSG
3151 114950    CPSIP:    LXI D,'IP'
3154 C36031              JMP MSG
3157 114F43    CPSOC:    LXI D,'OC'
315A C36031              JMP MSG
315D 114F50    CPSOP:    LXI D,'OP'
               MSG:               ; FORM MESSAGE
3160 3E28                MVI A,28H        ; NEXT STATE
3162 F5                  PUSH PSW
                         MSG2A:

3163 2A510A              LHLD RGSTAT; ADDR OF STAT WD
3166 3680                MVI M,200Q       ; SCHEDULE MESSAGE
3168 2C                  INR L
3169 2C                  INR L
316A 70                  MOV M,B ;CLEAR
316B 2A530A              LHLD RGSTX       ; START OF MESSAGE
316E 3602                MVI M,STX
3170 2C                  INR L
3171 E5                  PUSH H
3172 216F09              LXI H,REGAS
3175 09                  DAD B
3176 7E                  MOV A,M
3177 E1                  POP H
3178 F6C0                ORI 0C0H
317A 77                  MOV M,A; STORE REG NO IN EA MSG
317B 2C                  INR L
317C 79                  MOV A,C
317D F680                ORI 80H
317F 77                  MOV M,A; INLIN
3180 2C                  INR L
3181 73                  MOV M,E          ; STORE CODE
3182 2C                  INR L
3183 72                  MOV M,D
3184 2C                  INR L
3185 3603                MVI M,ETX
3187 214909              LXI H,TIME3
318A 09                  DAD B
318B 36FF                MVI M,0FFH
318D F1                  POP PSW          ; SET NEXT STATE
318E C31C2A              JMP CPSZ;        WAIT REPLY
               ;
               ; - - - - - - - - - - - - - - - - - - - - - - - - - -
               ;
               ;
               ;
               ;
               RECF:                      ;PROCESS CALLBACK
3191 2A510A              LHLD RGSTAT
3194 70                  MOV M,B
3195 79                  MOV A,C
3196 FE20                CPI 20H
3198 CAA031              JZ RECF1
319B 2C                  INR L
319C 2C                  INR L
319D 2C                  INR L
319E 36C0                MVI M,0C0H       ;SET MATRIX CONTROL TO CLEAR INP
               RECF1:
31A0 214909              LXI H,TIME3
31A3 09                  DAD B
31A4 3602                MVI M,2          ; DELAY BEFORE CALLBACK
31A6 3E1A                MVI A,1AH        ;PROCESS CALLBACK
31A8 C31C2A              JMP CPSZ
               ;- - - - - - - - - - - - - - - - - - ---
               ; CARRIER DETECT STATES
               ;- - - - - - - - - - - - - - - - - - - - - - -
               ;STATE 30- CARRIER IS OFF
               CPX30:
               ; SET UP RESTART MESSAGE
31AB 2A530A              LHLD RGSTX
31AE 3602                MVI M,STX
```

```
31B0 2C                 INR L
31B1 3652               MVI M,'R'
31B3 2C                 INR L
31B4 3645               MVI M,'E'
31B6 2C                 INR L
                       ;3 DIGIT SAT ID
31B7 3A500C    LDA 0C50H
31BA E60F               ANI 0FH
31BC F630               ORI 30H
31BE 77                 MOV M,A
31BF 2C                 INR L
31C0 3A600C             LDA 0C60H
31C3 E60F               ANI 0FH
31C5 F630               ORI 30H
31C7 77                 MOV M,A
31C8 2C                 INR L
31C9 3A700C             LDA 0C70H
31CC E60F               ANI 0FH
31CE F630               ORI 30H
31D0 77                 MOV M,A
31D1 2C                 INR L
31D2 3603               MVI M,ETX
31D4 2A510A             LHLD RGSTAT
31D7 3680               MVI M,200Q       ;SCHEDULE MESSAGE
31D9 3EFF               MVI A,0FFH       ; SET TIMER TO FF
31DB 326909             STA TIME3+20H
31DE C3152A             JMP CPSI;        WAIT REPLY
               ; - - - - - - - - - - - - - - - - - - - - - - - -
               ; STATE 32 - INIT MSG IS IS BUFFER
               CPX32:
31E1 70                 MOV M,B ; CLEAR STATUS WORD
31E2 C5                 PUSH B
               ; SEND LINES EQ MSG
               ;TRANSFER STATUS TO RAM
31E3 0608               MVI B,8
31E5 2A530A             LHLD RGSTX
31E8 23                 INX H
31E9 11E409             LXI D,CLASS
31EC 05        C32A:    DCR B
31ED FA0332             JM SENDEQ
31F0 7E                 MOV A,M
               ; MERGE 2 BYTES INTO 1
31F1 E60F               ANI 0FH
31F3 4F                 MOV C,A
31F4 23                 INX H
31F5 7E                 MOV A,M
31F6 E60F               ANI 0FH
31F8 07                 RLC
31F9 07                 RLC
31FA 07                 RLC
31FB 07                 RLC
31FC B1                 ORA C
31FD 12                 STAX D
31FE 23                 INX H
31FF 13                 INX D
3200 C3EC31             JMP C32A
               ; SET UP LINES EQUIPPED MSG
3203 AF        SENDEQ:  XRA A
3204 2A530A             LHLD RGSTX
3207 23                 INX H
3208 01080C             LXI B,0C08H
320B 0A        XFER:    LDAX B
320C 2F                 CMA
320D CD3B32             CALL SPLIT       ; SPLIT INTO 2 BYTES
3210 79                 MOV A,C
3211 C610               ADI 10H
3213 4F                 MOV C,A
3214 FE4C               CPI 4CH
3216 CA2432             JZ XDONE
3219 FE48               CPI 48H
321B C20B32             JNZ XFER
321E 010C0C             LXI B,0C0CH ; CARD PRESENT
3221 C30B32             JMP XFER
```

```
                    XDONE:
3224 3603                   MVI M,ETX
3226 2A510A                 LHLD RGSTAT
3229 3680                   MVI M,200Q ; SCHEDULE MESSAGE
322B C1                     POP B
322C 3E36                   MVI A,36H
322E C31C2A                 JMP CPSZ
3231 3E3C           MIN1:   MVI A,60        ; 1 MINUTES
3233 326909                 STA TIME3+20H    ; FOR AUTO DISC ON 20H
                                             ; GENERATES POLL MSG
3236 3E34                   MVI A,34H        ;WAIT FOR LOSS OF CARRIER
3238 C31C2A                 JMP CPSZ;        NORMAL STATE
                    ; SUBROUTINE TO SPLIT BYTE INTO 2 BYTES FOR XMISSION
                    SPLIT:
323B C5                     PUSH B
323C 47                     MOV B,A
323D E60F                   ANI 0FH; LOW 4
323F F680                   ORI 80H; SET MSB
3241 77                     MOV M,A
3242 78                     MOV A,B
3243 E6F0                   ANI 0F0H
3245 07                     RLC
3246 07                     RLC
3247 07                     RLC
3248 07                     RLC
3249 F680                   ORI 80H
324B 2C                     INR L
324C 77                     MOV M,A
324D 2C                     INR L
324E C1                     POP B
324F C9                     RET
                    ;
                    ;- - - -- -- - - - - - - - - - - - - - - - -
                    ; STATE 34 - CALLED UP IN 1 MIN
                    CPX34:
3250 70                     MOV M,B;        CLEAR STATUS WORD
                    ; SCHEDULE CT LINE FF
3251 2A530A                 LHLD RGSTX
3254 3602                   MVI M,STX
3256 2C                     INR L
3257 E5                     PUSH H
3258 216F09                 LXI H,REGAS
325B 09                     DAD B
325C 7E                     MOV A,M
325D F6C0                   ORI 0C0H
325F E1                     POP H
3260 77                     MOV M,A; REGISTER NO
3261 2C                     INR L
3262 36A0                   MVI M,0A0H
3264 2C                     INR L
3265 3643                   MVI M,'C'
3267 2C                     INR L
3268 3654                   MVI M,'T'
326A 2C                     INR L
                    ;3 DIGIT SAT ID
326B 3A500C                 LDA 0C50H
326E E60F                   ANI 0FH
3270 F630                   ORI 30H
3272 77                     MOV M,A
3273 2C                     INR L
3274 3A600C                 LDA 0C60H
3277 E60F                   ANI 0FH
3279 F630                   ORI 30H
327B 77                     MOV M,A
327C 2C                     INR L
327D 3A700C                 LDA 0C70H
3280 E60F                   ANI 0FH
3282 F630                   ORI 30H
```

```
3284 77              MOV M,A
3285 2C              INR L
3286 3603            MVI M,ETX
3288 2A510A          LHLD RGSTAT; COULD BE ANY REGISTER
328B 3680            MVI M,200Q
328D 214909          LXI H,TIME3
3290 09              DAD B
3291 36FF            MVI M,0FFH ; TURN OFF TIMER
                     ; SCHEDULE MESSAGE
3293 3E28            MVI A,28H
3295 C31C2A          JMP CPSZ
             ;*****************
             ;STATE 36- MESSAGE CONTAINING
             ;INLET AND OUTLET TIE LINE ASSIGNMWENTS IS IN BUFFER
             CPX36:
             ; TRANSFER TO RAM
3298 C5              PUSH B
3299 0608            MVI B,8
329B 2A530A          LHLD RGSTX
329E 23              INX H
329F 110004          LXI D,INLET
             C36A:
32A2 05              DCR B
32A3 FAB932          JM YDONE
32A6 7E              MOV A,M
             ;MERGE 2 BYTES INTO 1
32A7 E60F            ANI 0FH
32A9 4F              MOV C,A
32AA 23              INX H
32AB 7E              MOV A,M
32AC E60F            ANI 0FH
32AE 07              RLC
32AF 07              RLC
32B0 07              RLC
32B1 07              RLC
32B2 B1              ORA C
32B3 12              STAX D
32B4 23              INX H
32B5 13              INX D
32B6 C3A232          JMP C36A
32B9 C1      YDONE:  POP B
32BA AF              XRA A
32BB 320904          STA RGBUSY ; FREE UP REGISTERS
32BE C33132          JMP MIN1; SET UP FOR 1 MINUTE MESSAGE
             ;SUBROUTINE TO INITIALIZE REGISTER TO RECEIVE
             ;DIAL DIGITS
             ; SETS MAX DIGIT, REG STATE, STX IN CHAR, AND
             ; SETS FIGIT ADDR
             ;       CALL SETREG
             ;       DB MAX DIGIT EXPECTED
             ;      DB CHAR TO ENTER
             ;       DB FF; TERMINATOR
             SETREG:
32C1 E3              XTHL     ; GET TOP OF STACK
32C2 EB              XCHG     ;MOVE TO D ADDR OF FIRST PARAMETER
32C3 2A510A          LHLD RGSTAT      ;ADDR OF REG STATUS WORD
32C6 70              MOV M,B
32C7 2C              INR L            ; MAX DIGIT ADDRESS
32C8 1A              LDAX D           ; PARAMETER
32C9 B7              ORA A
32CA F2D232          JP SETR1
32CD 3A400C          LDA 0C40H ; LOAD INPUT PORT NO DIGITS TO EXPECT
32D0 E607            ANI 7
             SETR1:
32D2 77              MOV M,A          ;STORE MAX DIGITS TO EXPECT
32D3 2C              INR L            ; REGISTER STATE
32D4 34              INR M            ; SET REGISTER STATE 1
```

```
32D5 2C              INR L           ; MATRIX CONTROL WORD
32D6 2C              INR L           ; REGISTER TIMER
32D7 2C              INR L           ; GENERAL TIMER
32D8 70              MOV M,B         ; ZERO
32D9 25              DCR H ; 7
32DA 7D              MOV A,L
32DB E6E0            ANI 0E0H
32DD 6F              MOV L,A ; START OF DIGIT SPACE
32DE 3602             MVI M,STX
                     ;STORE REGISTER NO IN MESSAGE
32E0 2C              INR L
32E1 E5              PUSH H
32E2 216F09          LXI H,REGAS
32E5 09              DAD B
32E6 7E              MOV A,M
32E7 F6C0            ORI 0C0H
32E9 E1              POP H
32EA 77              MOV M,A ; REGISTER NUMBER
32EB 2C              INR L
32EC 79              MOV A,C         ;INPUT LINE NUMBER
32ED F680            ORI 80H         ;FORM ASCII
32EF 77              MOV M,A         ; STORE IN
32F0 13       ADV:   INX D           ; NEXT PARAMETER
32F1 2C              INR L
32F2 1A              LDAX D
32F3 FEFF            CPI 0FFH        ; TEST IF DONE
32F5 CAFC32          JZ SETDA        ; SET DIGIT ADR
32F8 77              MOV M,A         ;STORE CHARACTER
32F9 C3F032          JMP ADV         ;IN REG
32FC 7D       SETDA: MOV A,L         ; LOCATION WHERE FIRST DIGIT GOE
32FD 2A510A          LHLD RGSTAT     ;ADDR OF REG STATUS WD
3300 2D              DCR L
3301 2D              DCR L           ; ADDR OF DIGIT ADDR
3302 77              MOV M,A         ;STORE DIGIT ADDR
3303 13              INX D           ; SET D TO RETURN ADDRESS
3304 EB              XCHG
3305 E3              XTHL            ; PUT RETURN ON STACK
3306 C9              RET

              ;
              ;CLEAR REGISTER ASSIGNED, SET LAMPS
              ; AND CLEAR REGAS
              CLRREG:
3307 216F09          LXI H,REGAS
330A 09              DAD B
330B 7E              MOV A,M ; REG NO
330C D330            OUT 30H ; SELECT REG
330E 36FF            MVI M,0FFH ; CLEAR REGAS
3310 C5              PUSH B
3311 4F              MOV C,A ; REG NO
3312 21B80A          LXI H,RMASK
3315 09              DAD B
3316 46              MOV B,M ; BIT
3317 3A0A04          LDA RGUSE ; REGS ASSIGNED
331A A8              XRA B
331B 320A04          STA RGUSE ;FLIP BIT WHICH SHOULD CLEAR IT
331E 3A0904          LDA RGBUSY
3321 A0              ANA B ; BIT
3322 C1              POP B
3323 C22933          JNZ CLR4 ; BUSY ON
3326 D325            OUT 25H; TURN OFF BUSY LAMP
3328 C9              RET
              CLR4:
3329 D324            OUT 24H ; TURN ON BUSY LAMP
332B C9              RET
332C C31528   BEEP: JMP 2815H ; ************ABSOLUTE REFERENCE
332F C3B920   GREG:  JMP 20B9H ; **********ABSOLUTE REF
0000                 END
```

What is claimed:

1. A telephone communication lines control system for controllably connecting local subscriber telephone units to long distance lines comprising:

a plurality of remote switching means for connecting local subscriber telephone units to selected long distance telephone lines;

a central control means positioned at a location remote from said switching means for controlling the connection of said local subscriber telephone units to said long distance telephone lines at each of said plurality of remote switching means, said central control means including means for selecting said long distance lines with a predetermined priority for each of a plurality of said subscriber telephone units; and means for interconnecting said central control means to said plurality of remote switching means, said interconnecting means transmitting data signals between said remote switching means and said remotely positioned central control means wherein voice communications signals being transmitted by said local subscriber telephone units are connected to selected long distance lines at said remote switching means without being connected through said remotely positioned control means.

2. A telephone communications lines control system for controllably connecting local subscriber telephone units to long distance lines comprising:

a plurality of remote switching means for connecting local subscriber telephone units to selected long distance telephone lines;

a central control means positioned at a location remote from said switching means for controlling the connection of said local subscriber telephone units to said selected long distance telephone lines at each of said plurality of remote switching means, said central control means including means for selecting said long distance lines in the order of the least cost line available first; and means for interconnecting said central control means to said plurality of remote switching means, said interconnecting means transmitting data signals between said remote switching means and said remotely positioned central control means wherein voice communications signals being transmitted by said local subscriber telephone units are connected to selected long distance lines at said remote switching means without being connected through said remotely positioned control means.

3. A telephone communications control system for controlling the connection of local subscriber telephone units to long distance lines comprising:

a plurality of remote switching means for connecting said local subscriber telephone units to selected long distance telephone lines, said switching means including a switching matrix and means for operating said switching matrix;

a central control means positioned at a location remote from said switching means for controlling said operating means at each of said plurality of remote switching means, said central control means including means for selecting said long distance lines in the priority of least cost lines first; and means responsive to said switching matrix operating means for interconnecting said central control means to said plurality of remote switching means, said interconnecting means transmitting data signals between said remote switching means and said remotely positioned central control means wherein voice communications signals being transmitted by said local subscriber telephone units are connected to selected long distance lines at said remote switching means without being connected through said remotely positioned control means.

4. The system of claim 3 wherein said plurality of remote switching means each comprises means for detecting the condition of a local subscriber telephone unit, means responsive to said detecting means for accessing said central control means and for informing said central control means of the long distance telephone number being called, and means for indicating the status of the call being placed.

5. The telephone communications control system of claim 3 wherein said switching matrix operating means at each of said remote switching means includes means for generating central control means access signals when a local subscriber telephone unit goes off-hook, said central control means including means for instructing said switching matrix operating means to operate said switching matrix to selectively connect a long distance line to said local subscriber.

6. The telephone communications control system of claim 5 further comprising means for determining when a least cost telephone line is not available, means responsive to said determining means for storing the long distance telephone number to be accessed, means for continually determining the status of and when a least cost long distance line is available, and means for placing said call automatically on a long distance telephone line when a least cost telephone line becomes available.

7. The telephone communications control system of claim 5 further comprising means for determining when a least cost telephone line is not available, means responsive to determining means for storing the long distance telephone number to be accessed, means for continually determining the status of and when a least cost long distance line is available, means for calling back said local subscriber when a least cost telephone line is available, and means for placing said call automatically on a long distance telephone line when a least cost line becomes available.

8. The telephone communications control system of claim 7 wherein said means for interconnecting said central control means to said plurality of remote switching means comprises means for converting digital information and control signals at said central control means and at said remote switching means to signals transmittable over telephone lines, and at least one dedicated data line interconnecting said central control means and said remote switching means.

9. A telephone communications lines control system for connecting local subscriber units to selected long distance telephone lines comprising:

a plurality of remote switching means for connecting voice communications signals transmitted by said local subscriber units directly to selected long distance telephone lines at said remote switching means, a central control means positioned remote from said plurality of remote switching means for controlling said remote switching means to connect said voice communications signals transmitted by said local subscriber units to said selected long distance telephone lines, said central control means including means for selecting the long distance lines connected to said subscriber units with a predetermined long distance line selection priority for each of said remote switching means, and means interconnecting said central control means to each of said remote switching means for receiving data signals from said remote switching means and sending switch control signals back to said remote switching means for connecting voice communication signals transmitted by said local subscriber units directly to selected long distance telephone lines at said remote switching means without being coupled through said central control means.

10. A telephone communications lines control system for connecting local subscriber units to selected long distance telephone lines comprising:

a plurality of remote switching means for connecting said local subscriber units to selected long distance telephone lines at said remote switching means to thereby connect voice communications signals transmitted by said local subscriber units directly to said selected long distance telephone lines, a central control means positioned at a location remote from each of said plurality of switching means for controlling said switching means to connect said local subscriber units to selected long distance telephone lines, said central control means including means for selecting said long distance lines to be connected to said local subscriber units in the order of the least cost line available first, and means interconnecting said remotely located central control means to each of said switching means for receiving data signals from said switching means and sending switch control signals back to said switching means for connecting voice communications signals transmitted by said local subscriber units directly to selected long distance telephone lines at said switching means without being coupled through said central control means.

11. A telephone communications lines control system for connecting local subscriber units to selected long distance telephone lines comprising:

a plurality of remote switching means for connecting said local subscriber units to selected long distance telephone lines at said remote switching means to thereby connect voice communications signals transmitted by said local subscriber units directly to said selected long distance telephone lines, a central control means positioned at a location remote from each of said plurality of switching means for controlling said switching means to connect said local subscriber units to selected long distance telephone lines, said central control means including means for selecting said long distance lines to be connected to said local subscriber units at each of said remote switching means in a predetermined selection priority individual to each of said remote switching means, and means interconnecting said central control means to each of said remote switching means for receiving data signals from said remote switching means and sending switch control signals back to said remote switching means for connecting voice communication signals transmitted by said local subscriber units directly to selected long distance telephone lines at said remote switching means without being coupled through said central control means.

* * * * *